US012475635B2

(12) United States Patent
Lemay et al.

(10) Patent No.: US 12,475,635 B2

(45) Date of Patent: Nov. 18, 2025

(54) METHODS FOR DISPLAYING AND REPOSITIONING OBJECTS IN AN ENVIRONMENT

(71) Applicant: Apple Inc., Cupertino, CA (US)

(72) Inventors: Stephen O. Lemay, Palo Alto, CA (US); Shih-Sang Chiu, San Francisco, CA (US); Benjamin H. Boesel, Jackson, WY (US); Jonathan Perron, Felton, CA (US); Christopher D. McKenzie, Burlingame, CA (US); Dorian D. Dargan, San Ramon, CA (US); Nathan Gitter, Cupertino, CA (US); Jonathan Ravasz, Sunnyvale, CA (US); Benjamin Hylak, San Francisco, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/157,040

(22) Filed: Jan. 19, 2023

(65) Prior Publication Data

US 2023/0316634 A1 Oct. 5, 2023

Related U.S. Application Data

(60) Provisional application No. 63/301,020, filed on Jan. 19, 2022, provisional application No. 63/377,002, (Continued)

(51) Int. Cl.

| | |
|---|---|
| ***G06T 15/20*** | (2011.01) |
| ***G06F 3/01*** | (2006.01) |
| ***G06F 3/04815*** | (2022.01) |

(52) U.S. Cl.

CPC .............. *G06T 15/20* (2013.01); *G06F 3/013* (2013.01); *G06F 3/017* (2013.01); *G06F 3/04815* (2013.01)

(58) Field of Classification Search

CPC ......... G06T 15/20; G06F 3/013; G06F 3/017; G06F 3/04815; G06F 3/011

See application file for complete search history.

(56) References Cited

U.S. PATENT DOCUMENTS

| | | | |
|---|---|---|---|
| 1,173,824 | A | 2/1916 | Mckee |
| 5,015,188 | A | 5/1991 | Pellosie et al. |

(Continued)

FOREIGN PATENT DOCUMENTS

| | | | |
|---|---|---|---|
| CA | 3033344 | A1 | 2/2018 |
| CN | 102298493 | A | 12/2011 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.

(Continued)

*Primary Examiner* — Benyam Ketema

(74) *Attorney, Agent, or Firm* — Kubota & Basol LLP

(57) ABSTRACT

In some embodiments, a computer system selectively recenters virtual content to a viewpoint of a user, in the presence of physical or virtual obstacles, and/or automatically recenters one or more virtual objects in response to the display generation component changing state, selectively recenters content associated with a communication session between multiple users in response detected user input, changes the visual prominence of content included in virtual objects based on viewpoint and/or based on a detected user attention of a user, modifies visual prominence of one or more virtual (Continued)

objects to resolve apparent obscuring of the one or more virtual objects, modifies visual prominence based on user viewpoint relative to virtual objects, concurrently modifies visual prominence based various types of user interaction, and/or changes an amount of visual impact of an environmental effect in response to detected user input.

51 Claims, 161 Drawing Sheets

Related U.S. Application Data filed on Sep. 23, 2022, provisional application No. 63/480,494, filed on Jan. 18, 2023.

(56) References Cited

U.S. PATENT DOCUMENTS

| | | | | |
|---|---|---|---|---|
| 5,422,812 | A | 6/1995 | Knoll et al. | |
| 5,515,488 | A | 5/1996 | Hoppe et al. | |
| 5,524,195 | A | 6/1996 | Clanton et al. | |
| 5,610,828 | A | 3/1997 | Kodosky et al. | |
| 5,737,553 | A | 4/1998 | Bartok | |
| 5,740,440 | A | 4/1998 | West | |
| 5,751,287 | A | 5/1998 | Hahn et al. | |
| 5,758,122 | A | 5/1998 | Corda et al. | |
| 5,794,178 | A | 8/1998 | Caid et al. | |
| 5,809,267 | A | 9/1998 | Moran et al. | |
| 5,877,766 | A | 3/1999 | Bates et al. | |
| 5,900,849 | A | 5/1999 | Gallery | |
| 5,933,143 | A | 8/1999 | Kobayashi | |
| 5,990,886 | A | 11/1999 | Serdy et al. | |
| 6,061,060 | A | 5/2000 | Berry et al. | |
| 6,078,310 | A | 6/2000 | Tognazzini | |
| 6,108,004 | A | 8/2000 | Medl | |
| 6,112,015 | A | 8/2000 | Planas et al. | |
| 6,154,559 | A | 11/2000 | Beardsley | |
| 6,167,433 | A | 12/2000 | Maples et al. | |
| 6,295,069 | B1 | 9/2001 | Shirur | |
| 6,323,846 | B1 | 11/2001 | Westerman et al. | |
| 6,426,745 | B1 | 7/2002 | Isaacs et al. | |
| 6,456,296 | B1 | 9/2002 | Cataudella et al. | |
| 6,570,557 | B1 | 5/2003 | Westerman et al. | |
| 6,584,465 | B1 | 6/2003 | Zhu et al. | |
| 6,677,932 | B1 | 1/2004 | Westerman | |
| 6,750,873 | B1 | 6/2004 | Bernardini et al. | |
| 6,756,997 | B1 | 6/2004 | Ward et al. | |
| 7,035,903 | B1 | 4/2006 | Baldonado | |
| 7,096,120 | B2 | 8/2006 | Hull | |
| 7,134,130 | B1 | 11/2006 | Thomas | |
| 7,137,074 | B1 | 11/2006 | Newton et al. | |
| 7,230,629 | B2 | 6/2007 | Reynolds et al. | |
| 7,298,370 | B1 | 11/2007 | Middler et al. | |
| 7,580,576 | B2 | 8/2009 | Wang et al. | |
| 7,614,008 | B2 | 11/2009 | Ording | |
| 7,633,076 | B2 | 12/2009 | Huppi et al. | |
| 7,634,718 | B2 | 12/2009 | Nakajima | |
| 7,653,883 | B2 | 1/2010 | Hotelling et al. | |
| 7,657,849 | B2 | 2/2010 | Chaudhri et al. | |
| 7,663,607 | B2 | 2/2010 | Hotelling et al. | |
| 7,706,579 | B2 | 4/2010 | Oijer | |
| 7,721,226 | B2 | 5/2010 | Barabe et al. | |
| 7,844,914 | B2 | 11/2010 | Andre et al. | |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,341,541 | B2 | 12/2012 | Holecek et al. | |
| 8,381,135 | B2 | 2/2013 | Hotelling et al. | |
| 8,436,872 | B2 | 5/2013 | Wright et al. | |
| 8,479,122 | B2 | 7/2013 | Hotelling et al. | |
| 8,593,558 | B2 | 11/2013 | Gardiner et al. | |
| 8,724,856 | B1 | 5/2014 | King | |
| 8,730,156 | B2 | 5/2014 | Weising et al. | |
| 8,793,620 | B2 * | 7/2014 | Stafford | G06F 3/04842<br>715/858 |
| 8,793,729 | B2 | 7/2014 | Adimatyam et al. | |
| 8,803,873 | B2 | 8/2014 | Yoo et al. | |
| 8,866,880 | B2 | 10/2014 | Tan et al. | |
| 8,896,632 | B2 * | 11/2014 | MacDougall | G06V 40/165<br>715/702 |
| 8,947,323 | B1 * | 2/2015 | Raffle | G02B 27/0093<br>345/157 |
| 8,970,478 | B2 | 3/2015 | Johansson | |
| 8,970,629 | B2 | 3/2015 | Kim et al. | |
| 8,994,718 | B2 * | 3/2015 | Latta | G06F 3/0485<br>345/419 |
| 9,007,301 | B1 | 4/2015 | Raffle et al. | |
| 9,108,109 | B2 | 8/2015 | Pare et al. | |
| 9,158,115 | B1 | 10/2015 | Worley et al. | |
| 9,164,975 | B2 | 10/2015 | Milewski et al. | |
| 9,183,672 | B1 | 11/2015 | Hickman et al. | |
| 9,185,062 | B1 | 11/2015 | Yang et al. | |
| 9,189,611 | B2 | 11/2015 | Wssingbo | |
| 9,196,072 | B2 | 11/2015 | Oh et al. | |
| 9,201,500 | B2 | 12/2015 | Srinivasan et al. | |
| 9,214,137 | B2 | 12/2015 | Bala et al. | |
| 9,230,368 | B2 | 1/2016 | Keane et al. | |
| 9,237,334 | B2 | 1/2016 | Cheng et al. | |
| 9,241,149 | B2 | 1/2016 | Redmann | |
| 9,245,388 | B2 * | 1/2016 | Poulos | G06F 3/011 |
| 9,256,785 | B2 | 2/2016 | Qvarfordt | |
| 9,293,118 | B2 * | 3/2016 | Matsui | G09G 5/377 |
| 9,294,757 | B1 | 3/2016 | Lewis et al. | |
| 9,298,334 | B1 | 3/2016 | Zimmerman et al. | |
| 9,316,827 | B2 * | 4/2016 | Lindley | G06F 3/167 |
| 9,348,458 | B2 | 5/2016 | Hotelling et al. | |
| 9,383,189 | B2 | 7/2016 | Bridges et al. | |
| 9,384,594 | B2 | 7/2016 | Maciocci et al. | |
| 9,396,580 | B1 | 7/2016 | Nowrouzezahrai et al. | |
| 9,400,559 | B2 | 7/2016 | Latta et al. | |
| 9,426,193 | B2 | 8/2016 | Goodman | |
| 9,436,357 | B2 | 9/2016 | Pallakoff et al. | |
| 9,437,047 | B2 | 9/2016 | Chang et al. | |
| 9,448,635 | B2 | 9/2016 | Macdougall et al. | |
| 9,448,687 | B1 | 9/2016 | Mckenzie et al. | |
| 9,465,479 | B2 | 10/2016 | Cho et al. | |
| 9,519,371 | B2 | 12/2016 | Nishida | |
| 9,526,127 | B1 | 12/2016 | Taubman et al. | |
| 9,544,257 | B2 | 1/2017 | Ogundokun et al. | |
| 9,563,331 | B2 | 2/2017 | Poulos et al. | |
| 9,575,559 | B2 | 2/2017 | Andrysco | |
| 9,588,651 | B1 | 3/2017 | Buchanan et al. | |
| 9,612,722 | B2 | 4/2017 | Miller et al. | |
| 9,619,105 | B1 | 4/2017 | Dal Mutto | |
| 9,619,519 | B1 | 4/2017 | Dorner | |
| 9,672,588 | B1 * | 6/2017 | Doucette | G06F 3/011 |
| 9,681,112 | B2 | 6/2017 | Son | |
| 9,684,372 | B2 | 6/2017 | Xun et al. | |
| 9,704,230 | B2 | 7/2017 | Hofmann et al. | |
| 9,734,402 | B2 | 8/2017 | Jang et al. | |
| 9,778,814 | B2 | 10/2017 | Ambrus et al. | |
| 9,779,512 | B2 | 10/2017 | Tomlin et al. | |
| 9,829,708 | B1 | 11/2017 | Asada | |
| 9,851,866 | B2 | 12/2017 | Goossens et al. | |
| 9,864,498 | B2 | 1/2018 | Olsson et al. | |
| 9,870,130 | B2 | 1/2018 | Schubert et al. | |
| 9,886,087 | B1 | 2/2018 | Wald et al. | |
| 9,911,232 | B2 | 3/2018 | Shapira et al. | |
| 9,933,833 | B2 | 4/2018 | Tu et al. | |
| 9,933,937 | B2 | 4/2018 | Lemay et al. | |
| 9,934,614 | B2 | 4/2018 | Ramsby et al. | |
| 9,952,042 | B2 | 4/2018 | Abovitz et al. | |
| 10,026,209 | B1 | 7/2018 | Dagley et al. | |
| 10,049,460 | B2 | 8/2018 | Romano et al. | |
| 10,101,803 | B2 | 10/2018 | Faaborg et al. | |
| 10,175,483 | B2 | 1/2019 | Salter et al. | |
| 10,192,347 | B2 | 1/2019 | Bui et al. | |
| 10,203,764 | B2 | 2/2019 | Katz et al. | |
| 10,307,671 | B2 | 6/2019 | Barney et al. | |
| 10,339,721 | B1 | 7/2019 | Dascola et al. | |
| 10,353,532 | B1 * | 7/2019 | Holz | G06F 3/04847 |
| 10,373,381 | B2 | 8/2019 | Nuernberger et al. | |

(56) References Cited

U.S. PATENT DOCUMENTS 10,394,320 B2 8/2019 George-svahn et al.
10,448,189 B2 10/2019 Link
10,488,941 B2 11/2019 Lam et al.
10,499,044 B1 12/2019 Giokaris et al.
10,534,439 B2 1/2020 Raffa et al.
10,545,584 B2 1/2020 Tome et al.
10,564,714 B2 2/2020 Marggraff et al.
10,565,448 B2 2/2020 Bell et al.
10,642,368 B2 5/2020 Chen
10,664,043 B2 5/2020 Ikuta et al.
10,664,048 B2 5/2020 Cieplinski et al.
10,664,050 B2 5/2020 Alcaide et al.
10,671,241 B1 6/2020 Jia et al.
10,678,403 B2 6/2020 Duarte et al.
10,691,216 B2 6/2020 Geisner et al.
10,699,488 B1 6/2020 Terrano
10,708,965 B1 7/2020 Subramanian et al.
10,712,900 B2 7/2020 Osman et al.
10,732,721 B1 8/2020 Clements
10,754,434 B2 8/2020 Hall et al.
10,762,716 B1 9/2020 Paul et al.
10,768,421 B1 9/2020 Rosenberg et al.
10,768,693 B2 9/2020 Powderly et al.
10,776,933 B2 9/2020 Faulkner
10,846,864 B2 11/2020 Kim et al.
10,852,814 B1 12/2020 Caron et al.
10,861,242 B2 12/2020 Lacey et al.
10,890,967 B2 1/2021 Stellmach et al.
10,922,744 B1 2/2021 Mahajan
10,929,099 B2 2/2021 Querze et al.
10,936,148 B1 3/2021 Merkl et al.
10,956,724 B1 3/2021 Terrano
10,983,663 B2 4/2021 Iglesias
11,003,308 B1 5/2021 Dryer et al.
11,023,035 B1 6/2021 Atlas et al.
11,055,920 B1 7/2021 Bramwell et al.
11,079,995 B1 8/2021 Hulbert et al.
11,082,463 B2 8/2021 Felman
11,112,875 B1 9/2021 Zhou et al.
11,138,798 B2 10/2021 Paul et al.
11,146,909 B1 10/2021 Pinto et al.
11,175,791 B1 11/2021 Patnaikuni et al.
11,176,755 B1 11/2021 Tichenor et al.
11,199,898 B2 12/2021 Blume et al.
11,200,742 B1 12/2021 Post et al.
11,204,678 B1 12/2021 Baker et al.
11,232,643 B1 1/2022 Stevens et al.
11,243,734 B2 2/2022 Boissière et al.
11,249,556 B1 2/2022 Schwarz et al.
11,262,885 B1 3/2022 Burckel
11,294,472 B2 4/2022 Tang et al.
11,294,475 B1 4/2022 Pinchon et al.
11,307,653 B1 4/2022 Qian et al.
11,340,756 B2 5/2022 Faulkner et al.
11,343,420 B1 5/2022 Herz et al.
11,347,319 B2 5/2022 Goel et al.
11,348,300 B2 5/2022 Zimmermann et al.
11,379,033 B2 7/2022 O'hern et al.
11,380,323 B2 7/2022 Shin et al.
11,409,363 B2 8/2022 Chen et al.
11,416,080 B2 8/2022 Heo et al.
11,432,095 B1 8/2022 Satongar et al.
11,461,973 B2 10/2022 Pinchon
11,496,571 B2 11/2022 Berliner et al.
11,531,402 B1 12/2022 Stolzenberg
11,531,459 B2 12/2022 Poupyrev et al.
11,557,102 B2 1/2023 Palangie et al.
11,567,625 B2 1/2023 Faulkner et al.
11,573,363 B2 2/2023 Zou et al.
11,574,452 B2 2/2023 Berliner et al.
11,599,239 B2 3/2023 Rockel et al.
11,615,596 B2 3/2023 Faulkner et al.
11,641,460 B1 5/2023 Geusz et al.
11,669,155 B2 6/2023 Bowman et al.
11,720,171 B2 8/2023 Pastrana Vicente et al.
11,726,577 B2 8/2023 Katz
11,730,226 B2 8/2023 Stolarz et al.
11,733,824 B2 8/2023 Iskandar et al.
11,762,457 B1 9/2023 Ikkai et al.
11,762,473 B2 9/2023 Cipoletta et al.
11,768,544 B2 9/2023 Schwarz et al.
11,847,748 B2 12/2023 Liu et al.
11,861,136 B1 1/2024 Faulkner et al.
11,875,013 B2 1/2024 Lemay et al.
11,886,643 B2 1/2024 Irie et al.
11,899,845 B2 2/2024 Chung et al.
11,909,453 B2 2/2024 Javaudin et al.
11,914,759 B2 2/2024 Klein et al.
11,922,588 B2 3/2024 Fillhardt et al.
11,928,263 B2 3/2024 Jung et al.
11,934,569 B2 3/2024 Pastrana Vicente et al.
11,954,242 B2 4/2024 Dascola et al.
11,983,326 B2 5/2024 Lacey
11,988,832 B2 5/2024 Singh et al.
11,989,965 B2 5/2024 Tarighat Mehrabani
11,995,301 B2 5/2024 Hylak et al.
12,032,803 B2 7/2024 Pastrana Vicente et al.
12,062,127 B2 8/2024 Park et al.
12,099,653 B2 9/2024 Chawda et al.
12,099,695 B1 9/2024 Smith et al.
12,113,948 B1 10/2024 Smith et al.
12,118,200 B1 10/2024 Shutzberg et al.
12,154,236 B1 11/2024 Herman et al.
12,236,546 B1 2/2025 Lipton
2001/0047250 A1 11/2001 Schuller et al.
2002/0015024 A1 2/2002 Westerman et al.
2002/0024675 A1 2/2002 Foxlin
2002/0030692 A1 3/2002 Griesert
2002/0044152 A1* 4/2002 Abbott, III ............ G06T 19/006
345/629
2002/0065778 A1 5/2002 Bouet et al.
2003/0038754 A1 2/2003 Goldstein et al.
2003/0151611 A1 8/2003 Turpin et al.
2003/0222924 A1 12/2003 Baron
2004/0059784 A1 3/2004 Caughey
2004/0104806 A1 6/2004 Yui et al.
2004/0230912 A1 11/2004 Clow et al.
2004/0243926 A1 12/2004 Trenbeath et al.
2005/0044510 A1 2/2005 Yi
2005/0062738 A1 3/2005 Handley et al.
2005/0100210 A1 5/2005 Rice et al.
2005/0138572 A1 6/2005 Good et al.
2005/0144570 A1 6/2005 Loverin et al.
2005/0144571 A1 6/2005 Loverin et al.
2005/0175218 A1 8/2005 Vertegaal et al.
2005/0190059 A1 9/2005 Wehrenberg
2005/0198143 A1 9/2005 Moody et al.
2005/0216866 A1 9/2005 Rosen et al.
2005/0248299 A1 11/2005 Chemel et al.
2006/0017692 A1 1/2006 Wehrenberg et al.
2006/0028400 A1 2/2006 Lapstun et al.
2006/0033724 A1 2/2006 Chaudhri et al.
2006/0034590 A1 2/2006 Teramoto
2006/0080702 A1 4/2006 Diez et al.
2006/0156228 A1 7/2006 Gallo et al.
2006/0197753 A1 9/2006 Hotelling
2006/0256083 A1 11/2006 Rosenberg
2006/0283214 A1 12/2006 Donadon et al.
2007/0259716 A1 11/2007 Mattice et al.
2008/0181502 A1 7/2008 Yang
2008/0186255 A1 8/2008 Cohen et al.
2008/0211771 A1 9/2008 Richardson
2008/0310707 A1 12/2008 Kansal et al.
2009/0037844 A1 2/2009 Kim et al.
2009/0049408 A1 2/2009 Naaman et al.
2009/0064035 A1 3/2009 Shibata et al.
2009/0146779 A1 6/2009 Kumar et al.
2009/0231356 A1 9/2009 Barnes et al.
2009/0254843 A1 10/2009 Van et al.
2009/0319181 A1 12/2009 Khosravy et al.
2010/0097375 A1 4/2010 Tadaishi et al.
2010/0115459 A1 5/2010 Kinnunen et al.
2010/0150526 A1 6/2010 Rose et al.
2010/0177049 A1 7/2010 Levy et al.

(56) References Cited

U.S. PATENT DOCUMENTS

2010/0185949 A1 7/2010 Jaeger
2010/0188503 A1* 7/2010 Tsai .................... H04N 21/422 348/142
2010/0188572 A1 7/2010 Card
2010/0269145 A1 10/2010 Ingrassia et al.
2010/0293504 A1 11/2010 Hachiya
2010/0302245 A1 12/2010 Best
2010/0328432 A1 12/2010 Tanaka
2010/0332196 A1 12/2010 Fisker et al.
2011/0018895 A1 1/2011 Buzyn et al.
2011/0018896 A1 1/2011 Buzyn et al.
2011/0098029 A1 4/2011 Rhoads et al.
2011/0142321 A1 6/2011 Huffman
2011/0156879 A1 6/2011 Matsushita et al.
2011/0164163 A1 7/2011 Bilbrey et al.
2011/0169927 A1 7/2011 Mages et al.
2011/0175932 A1 7/2011 Yu et al.
2011/0216060 A1* 9/2011 Weising .................. A63F 13/00 345/419
2011/0243448 A1 10/2011 Kawabuchi et al.
2011/0254865 A1 10/2011 Yee et al.
2011/0289691 A1 12/2011 LaflÈche et al.
2011/0304557 A1* 12/2011 Wilburn ................ G06F 3/0488 715/702
2011/0310001 A1 12/2011 Madau et al.
2011/0320969 A1 12/2011 Hwang et al.
2012/0038751 A1 2/2012 Yuan et al.
2012/0066638 A1 3/2012 Ohri
2012/0075496 A1 3/2012 Akifusa et al.
2012/0086624 A1 4/2012 Thompson et al.
2012/0113223 A1 5/2012 Hilliges et al.
2012/0124525 A1 5/2012 Kang
2012/0131631 A1 5/2012 Bhogal et al.
2012/0151416 A1 6/2012 Bell et al.
2012/0170089 A1 7/2012 Kim et al.
2012/0170840 A1 7/2012 Caruso et al.
2012/0184372 A1 7/2012 Laarakkers et al.
2012/0194547 A1 8/2012 Johnson et al.
2012/0218395 A1 8/2012 Andersen et al.
2012/0249741 A1 10/2012 Maciocci et al.
2012/0256956 A1 10/2012 Kasahara
2012/0256967 A1 10/2012 Baldwin et al.
2012/0257035 A1 10/2012 Larsen
2012/0272179 A1 10/2012 Stafford
2012/0304087 A1 11/2012 Walkin et al.
2013/0010062 A1 1/2013 Redmann
2013/0027860 A1 1/2013 Masaki et al.
2013/0088516 A1 4/2013 Ota et al.
2013/0093727 A1 4/2013 Eriksson et al.
2013/0127850 A1 5/2013 Bindon
2013/0148850 A1 6/2013 Matsuda et al.
2013/0169533 A1 7/2013 Jahnke
2013/0190044 A1 7/2013 Kulas
2013/0211843 A1 8/2013 Clarkson
2013/0222227 A1 8/2013 Johansson et al.
2013/0229345 A1 9/2013 Day et al.
2013/0246955 A1 9/2013 Schwesig et al.
2013/0249922 A1 9/2013 Hachiya
2013/0263016 A1 10/2013 Lehtiniemi et al.
2013/0265227 A1 10/2013 Julian
2013/0271397 A1 10/2013 Hildreth et al.
2013/0278501 A1 10/2013 Bulzacki
2013/0286004 A1 10/2013 Mcculloch et al.
2013/0293456 A1 11/2013 Son et al.
2013/0300648 A1 11/2013 Kim et al.
2013/0300654 A1 11/2013 Seki
2013/0307945 A1 11/2013 Cheng et al.
2013/0321462 A1 12/2013 Salter et al.
2013/0325326 A1 12/2013 Blumenberg et al.
2013/0326341 A1 12/2013 Nonaka
2013/0326364 A1 12/2013 Latta et al.
2013/0328925 A1 12/2013 Latta et al.
2013/0332890 A1 12/2013 Ramic et al.
2013/0342564 A1 12/2013 Kinnebrew et al.
2013/0342570 A1* 12/2013 Kinnebrew ............ G09G 3/003 345/633
2013/0345975 A1 12/2013 Vulcano et al.
2014/0002338 A1 1/2014 Raffa et al.
2014/0002444 A1 1/2014 Bennett et al.
2014/0028548 A1 1/2014 Bychkov et al.
2014/0040832 A1 2/2014 Regelous
2014/0049462 A1 2/2014 Weinberger et al.
2014/0063058 A1 3/2014 Fialho et al.
2014/0068692 A1 3/2014 Archibong et al.
2014/0071241 A1 3/2014 Yang et al.
2014/0075361 A1 3/2014 Reynolds et al.
2014/0078176 A1 3/2014 Kim et al.
2014/0104206 A1 4/2014 Anderson
2014/0108942 A1 4/2014 Freeman et al.
2014/0114845 A1 4/2014 Rogers et al.
2014/0125584 A1 5/2014 Xun et al.
2014/0126782 A1 5/2014 Takai et al.
2014/0129990 A1 5/2014 Xin et al.
2014/0132499 A1 5/2014 Schwesinger et al.
2014/0139426 A1 5/2014 Kryze et al.
2014/0164928 A1 6/2014 Kim
2014/0168453 A1 6/2014 Shoemake et al.
2014/0198017 A1 7/2014 Lamb et al.
2014/0232639 A1 8/2014 Hayashi et al.
2014/0237366 A1 8/2014 Poulos et al.
2014/0247210 A1 9/2014 Henderek et al.
2014/0258942 A1* 9/2014 Kutliroff ............... G06F 3/0488 715/863
2014/0267400 A1 9/2014 Mabbutt et al.
2014/0268054 A1 9/2014 Olsson et al.
2014/0282272 A1 9/2014 Kies et al.
2014/0285641 A1 9/2014 Kato et al.
2014/0298273 A1 10/2014 Blackstone et al.
2014/0304612 A1 10/2014 Collin
2014/0320404 A1* 10/2014 Kasahara .............. G06F 1/1694 345/156
2014/0331187 A1 11/2014 Hicks et al.
2014/0333666 A1 11/2014 Poulos et al.
2014/0347391 A1 11/2014 Keane et al.
2014/0351727 A1 11/2014 Danton et al.
2014/0351753 A1 11/2014 Shin et al.
2014/0362111 A1 12/2014 Kim
2014/0363074 A1 12/2014 Dolfing et al.
2014/0368537 A1 12/2014 Salter et al.
2014/0368620 A1 12/2014 Li et al.
2014/0372957 A1 12/2014 Keane et al.
2014/0375683 A1 12/2014 Salter et al.
2015/0009118 A1 1/2015 Thomas et al.
2015/0035822 A1 2/2015 Arsan et al.
2015/0035832 A1 2/2015 Sugden et al.
2015/0042679 A1 2/2015 Järvenpää
2015/0058718 A1 2/2015 Kim et al.
2015/0067580 A1* 3/2015 Um ....................... G06F 3/0481 715/781
2015/0077335 A1 3/2015 Taguchi et al.
2015/0082180 A1 3/2015 Ames et al.
2015/0095844 A1 4/2015 Cho et al.
2015/0121466 A1 4/2015 Brands et al.
2015/0123890 A1 5/2015 Kapur et al.
2015/0123901 A1 5/2015 Schwesinger et al.
2015/0128075 A1 5/2015 Kempinski
2015/0131850 A1 5/2015 Qvarfordt
2015/0135108 A1 5/2015 Pope et al.
2015/0145887 A1 5/2015 Forutanpour et al.
2015/0149929 A1 5/2015 Shepherd et al.
2015/0153833 A1 6/2015 Pinault et al.
2015/0177937 A1 6/2015 Poletto et al.
2015/0187093 A1 7/2015 Chu et al.
2015/0193982 A1 7/2015 Mihelich et al.
2015/0205106 A1* 7/2015 Norden .................. G06F 3/012 345/7
2015/0212576 A1 7/2015 Ambrus et al.
2015/0220152 A1 8/2015 Tait et al.
2015/0221132 A1 8/2015 Kruglick
2015/0227285 A1 8/2015 Lee et al.
2015/0242095 A1 8/2015 Sonnenberg
2015/0254905 A1 9/2015 Ramsby et al.
2015/0262428 A1 9/2015 Tatzgern et al.

(56) References Cited

U.S. PATENT DOCUMENTS

| | | | |
|---|---|---|---|
| 2015/0317831 | A1 | 11/2015 | Ebstyne et al. |
| 2015/0317832 | A1 | 11/2015 | Ebstyne et al. |
| 2015/0331240 | A1 | 11/2015 | Poulos et al. |
| 2015/0331576 | A1* | 11/2015 | Piya .................... G06F 3/04815 715/850 |
| 2015/0332091 | A1 | 11/2015 | Kim et al. |
| 2015/0370323 | A1 | 12/2015 | Cieplinski et al. |
| 2015/0381974 | A1 | 12/2015 | Hoffman et al. |
| 2016/0015470 | A1 | 1/2016 | Border |
| 2016/0018898 | A1 | 1/2016 | Tu et al. |
| 2016/0018900 | A1 | 1/2016 | Tu et al. |
| 2016/0025971 | A1 | 1/2016 | Crow et al. |
| 2016/0026242 | A1 | 1/2016 | Burns et al. |
| 2016/0026243 | A1 | 1/2016 | Bertram et al. |
| 2016/0026253 | A1* | 1/2016 | Bradski ................ H04N 13/128 345/8 |
| 2016/0050642 | A1 | 2/2016 | Brown et al. |
| 2016/0062636 | A1 | 3/2016 | Jung et al. |
| 2016/0085301 | A1 | 3/2016 | Lopez |
| 2016/0093108 | A1 | 3/2016 | Mao et al. |
| 2016/0098093 | A1 | 4/2016 | Cheon et al. |
| 2016/0098094 | A1 | 4/2016 | Minkkinen |
| 2016/0127690 | A1 | 5/2016 | Kaehler et al. |
| 2016/0133044 | A1 | 5/2016 | Lynch |
| 2016/0133052 | A1 | 5/2016 | Choi et al. |
| 2016/0171304 | A1 | 6/2016 | Golding et al. |
| 2016/0179191 | A1 | 6/2016 | Kim et al. |
| 2016/0179336 | A1 | 6/2016 | Ambrus et al. |
| 2016/0189426 | A1 | 6/2016 | Thomas et al. |
| 2016/0196692 | A1* | 7/2016 | Kjallstrom ............ G06T 19/006 345/633 |
| 2016/0210784 | A1 | 7/2016 | Ramsby et al. |
| 2016/0216768 | A1 | 7/2016 | Goetz et al. |
| 2016/0224122 | A1 | 8/2016 | Dietz et al. |
| 2016/0225012 | A1 | 8/2016 | Ha et al. |
| 2016/0225164 | A1 | 8/2016 | Tomlin et al. |
| 2016/0227267 | A1 | 8/2016 | Tsurutani et al. |
| 2016/0253063 | A1 | 9/2016 | Critchlow |
| 2016/0253821 | A1 | 9/2016 | Romano et al. |
| 2016/0275702 | A1 | 9/2016 | Reynolds et al. |
| 2016/0291922 | A1 | 10/2016 | Montgomerie et al. |
| 2016/0306434 | A1 | 10/2016 | Ferrin |
| 2016/0313890 | A1* | 10/2016 | Walline ............... G06F 3/04812 |
| 2016/0334940 | A1 | 11/2016 | Kandadai et al. |
| 2016/0350973 | A1 | 12/2016 | Shapira et al. |
| 2016/0357266 | A1 | 12/2016 | Patel et al. |
| 2016/0370858 | A1 | 12/2016 | Leppänen et al. |
| 2016/0373647 | A1 | 12/2016 | García Morate et al. |
| 2016/0373714 | A1 | 12/2016 | Lee et al. |
| 2016/0379409 | A1* | 12/2016 | Gavriliuc .............. G06T 19/006 345/8 |
| 2017/0032568 | A1 | 2/2017 | Gharpure et al. |
| 2017/0038829 | A1 | 2/2017 | Lanier et al. |
| 2017/0038837 | A1 | 2/2017 | Faaborg et al. |
| 2017/0038849 | A1 | 2/2017 | Hwang |
| 2017/0039770 | A1* | 2/2017 | Lanier ................... H04W 12/02 |
| 2017/0046872 | A1 | 2/2017 | Geselowitz et al. |
| 2017/0052393 | A1 | 2/2017 | Kweon |
| 2017/0052595 | A1 | 2/2017 | Poulos et al. |
| 2017/0053383 | A1 | 2/2017 | Heo |
| 2017/0060230 | A1* | 3/2017 | Faaborg .................. G06F 3/017 |
| 2017/0061694 | A1 | 3/2017 | Giraldi et al. |
| 2017/0090566 | A1 | 3/2017 | George-svahn et al. |
| 2017/0109930 | A1 | 4/2017 | Holzer et al. |
| 2017/0115728 | A1 | 4/2017 | Park et al. |
| 2017/0123487 | A1 | 5/2017 | Hazra et al. |
| 2017/0131964 | A1* | 5/2017 | Baek ..................... G06F 3/1423 |
| 2017/0132694 | A1 | 5/2017 | Damy |
| 2017/0132822 | A1 | 5/2017 | Marschke et al. |
| 2017/0147180 | A1 | 5/2017 | Yoon et al. |
| 2017/0153866 | A1* | 6/2017 | Grinberg ................. H04S 7/302 |
| 2017/0154326 | A1 | 6/2017 | Jo et al. |
| 2017/0162177 | A1 | 6/2017 | Lebeck et al. |
| 2017/0169616 | A1 | 6/2017 | Wiley et al. |
| 2017/0178392 | A1 | 6/2017 | Zuccarino et al. |
| 2017/0206691 | A1 | 7/2017 | Harrises et al. |
| 2017/0206692 | A1 | 7/2017 | Sheaffer et al. |
| 2017/0212583 | A1 | 7/2017 | Krasadakis |
| 2017/0213388 | A1 | 7/2017 | Margolis et al. |
| 2017/0221264 | A1 | 8/2017 | Perry |
| 2017/0228130 | A1* | 8/2017 | Palmaro ................ G06F 3/0482 |
| 2017/0236332 | A1 | 8/2017 | Kipman et al. |
| 2017/0243352 | A1 | 8/2017 | Kutliroff et al. |
| 2017/0251143 | A1 | 8/2017 | Peruch et al. |
| 2017/0256096 | A1 | 9/2017 | Faaborg et al. |
| 2017/0270715 | A1 | 9/2017 | Lindsay et al. |
| 2017/0285737 | A1 | 10/2017 | Khalid et al. |
| 2017/0287215 | A1 | 10/2017 | Lalonde et al. |
| 2017/0302903 | A1 | 10/2017 | Ng et al. |
| 2017/0308163 | A1 | 10/2017 | Cieplinski et al. |
| 2017/0315715 | A1 | 11/2017 | Fujita et al. |
| 2017/0326457 | A1 | 11/2017 | Tilton et al. |
| 2017/0344223 | A1 | 11/2017 | Holzer et al. |
| 2017/0351094 | A1 | 12/2017 | Poulos et al. |
| 2017/0357389 | A1 | 12/2017 | Fleizach et al. |
| 2017/0358141 | A1 | 12/2017 | Stafford et al. |
| 2017/0364198 | A1 | 12/2017 | Yoganandan et al. |
| 2018/0005433 | A1 | 1/2018 | Kohler et al. |
| 2018/0045963 | A1 | 2/2018 | Hoover et al. |
| 2018/0075658 | A1 | 3/2018 | Lanier et al. |
| 2018/0077383 | A1 | 3/2018 | Akao et al. |
| 2018/0081519 | A1 | 3/2018 | Kim |
| 2018/0084287 | A1 | 3/2018 | Shimura |
| 2018/0088787 | A1 | 3/2018 | Bereza et al. |
| 2018/0095634 | A1 | 4/2018 | Alexander |
| 2018/0095635 | A1 | 4/2018 | Valdivia et al. |
| 2018/0095636 | A1 | 4/2018 | Valdivia et al. |
| 2018/0101223 | A1 | 4/2018 | Ishihara et al. |
| 2018/0103209 | A1 | 4/2018 | Fischler et al. |
| 2018/0114364 | A1 | 4/2018 | Mcphee et al. |
| 2018/0120944 | A1 | 5/2018 | Wang et al. |
| 2018/0122138 | A1 | 5/2018 | Piya et al. |
| 2018/0130255 | A1 | 5/2018 | Hazeghi et al. |
| 2018/0136815 | A1 | 5/2018 | Tomizuka et al. |
| 2018/0143693 | A1 | 5/2018 | Calabrese et al. |
| 2018/0150204 | A1 | 5/2018 | Macgillivray |
| 2018/0150997 | A1* | 5/2018 | Austin .................. G06F 3/0346 |
| 2018/0157332 | A1 | 6/2018 | Nie |
| 2018/0158222 | A1 | 6/2018 | Hayashi |
| 2018/0165853 | A1 | 6/2018 | Inagi et al. |
| 2018/0173404 | A1 | 6/2018 | Smith |
| 2018/0181199 | A1 | 6/2018 | Harvey et al. |
| 2018/0181272 | A1 | 6/2018 | Olsson et al. |
| 2018/0188802 | A1 | 7/2018 | Okumura |
| 2018/0197336 | A1 | 7/2018 | Rochford et al. |
| 2018/0197341 | A1 | 7/2018 | Loberg et al. |
| 2018/0210628 | A1* | 7/2018 | McPhee .............. G06F 3/04883 |
| 2018/0218214 | A1 | 8/2018 | Pestun et al. |
| 2018/0220195 | A1 | 8/2018 | Panchaksharaiah et al. |
| 2018/0239144 | A1 | 8/2018 | Woods et al. |
| 2018/0247449 | A1 | 8/2018 | Park et al. |
| 2018/0275753 | A1 | 9/2018 | Publicover et al. |
| 2018/0286126 | A1 | 10/2018 | Schwarz et al. |
| 2018/0300023 | A1 | 10/2018 | Hein |
| 2018/0300952 | A1 | 10/2018 | Evans et al. |
| 2018/0302687 | A1 | 10/2018 | Bhattacharjee et al. |
| 2018/0315248 | A1* | 11/2018 | Bastov ................ G06F 3/04815 |
| 2018/0322701 | A1 | 11/2018 | Pahud et al. |
| 2018/0330544 | A1 | 11/2018 | Corso et al. |
| 2018/0348861 | A1 | 12/2018 | Uscinski et al. |
| 2018/0348986 | A1 | 12/2018 | Sawaki |
| 2018/0350099 | A1 | 12/2018 | Yerkes et al. |
| 2018/0350119 | A1 | 12/2018 | Kocharlakota et al. |
| 2019/0018479 | A1 | 1/2019 | Minami |
| 2019/0018498 | A1 | 1/2019 | West et al. |
| 2019/0034076 | A1* | 1/2019 | Vinayak ................ G06T 19/006 |
| 2019/0043259 | A1 | 2/2019 | Wang et al. |
| 2019/0050062 | A1 | 2/2019 | Chen et al. |
| 2019/0056785 | A1 | 2/2019 | Suk |
| 2019/0065027 | A1 | 2/2019 | Hauenstein et al. |
| 2019/0073109 | A1 | 3/2019 | Zhang et al. |
| 2019/0080572 | A1 | 3/2019 | Kim et al. |
| 2019/0088149 | A1 | 3/2019 | Fink et al. |
| 2019/0094963 | A1 | 3/2019 | Nijs |

(56) References Cited

U.S. PATENT DOCUMENTS

2019/0094979 A1 3/2019 Hall et al.
2019/0096134 A1 3/2019 Amacker et al.
2019/0101991 A1 4/2019 Brennan
2019/0102953 A1 4/2019 Lindsay et al.
2019/0130622 A1 5/2019 Hoover et al.
2019/0130633 A1* 5/2019 Haddad .................. G06T 15/30
2019/0130733 A1 5/2019 Hodge
2019/0138183 A1 5/2019 Rosas et al.
2019/0146128 A1 5/2019 Cao et al.
2019/0155495 A1 5/2019 Klein et al.
2019/0164340 A1 5/2019 Pejic et al.
2019/0172261 A1 6/2019 Alt et al.
2019/0172262 A1 6/2019 Mchugh et al.
2019/0188895 A1 6/2019 Miller et al.
2019/0188918 A1 6/2019 Brewer et al.
2019/0204906 A1 7/2019 Ross et al.
2019/0212827 A1 7/2019 Kin et al.
2019/0213389 A1 7/2019 Peruch et al.
2019/0227763 A1 7/2019 Kaufthal
2019/0228503 A1 7/2019 Tokuchi
2019/0228589 A1 7/2019 Dascola et al.
2019/0238818 A1 8/2019 Held et al.
2019/0251884 A1 8/2019 Burns et al.
2019/0258365 A1 8/2019 Zurmoehle et al.
2019/0266774 A1 8/2019 Sommerlade et al.
2019/0279407 A1 9/2019 Mchugh et al.
2019/0294312 A1 9/2019 Rohrbacher
2019/0302977 A1 10/2019 Pendergast et al.
2019/0310757 A1 10/2019 Lee et al.
2019/0324529 A1 10/2019 Stellmach et al.
2019/0325654 A1 10/2019 Stisser et al.
2019/0332244 A1 10/2019 Beszteri et al.
2019/0339770 A1 11/2019 Kurlethimar et al.
2019/0340816 A1 11/2019 Rogers
2019/0340832 A1 11/2019 Srinivasan et al.
2019/0346678 A1 11/2019 Nocham
2019/0346922 A1 11/2019 Young et al.
2019/0349575 A1 11/2019 Knepper et al.
2019/0354259 A1 11/2019 Park
2019/0361521 A1 11/2019 Stellmach et al.
2019/0362557 A1* 11/2019 Lacey ....................... G06T 5/20
2019/0362560 A1 11/2019 Choi et al.
2019/0369569 A1 12/2019 Olsen et al.
2019/0370492 A1 12/2019 Falchuk et al.
2019/0371072 A1 12/2019 Lindberg et al.
2019/0371279 A1 12/2019 Mak
2019/0377487 A1 12/2019 Bailey et al.
2019/0379765 A1 12/2019 Fajt et al.
2019/0384406 A1* 12/2019 Smith .................. G06V 40/113
2020/0004401 A1 1/2020 Hwang et al.
2020/0005539 A1 1/2020 Hwang et al.
2020/0012341 A1 1/2020 Stellmach et al.
2020/0020157 A1 1/2020 Powers et al.
2020/0026349 A1 1/2020 Fontanel et al.
2020/0038120 A1 2/2020 Ziraknejad et al.
2020/0043243 A1* 2/2020 Bhushan ............... G06F 1/1686
2020/0045249 A1 2/2020 Francois et al.
2020/0048825 A1 2/2020 Schultz et al.
2020/0051527 A1 2/2020 Ngo
2020/0081526 A1 3/2020 Walker et al.
2020/0082602 A1 3/2020 Jones
2020/0089314 A1 3/2020 Poupyrev et al.
2020/0092537 A1 3/2020 Sutter et al.
2020/0098140 A1 3/2020 Jagnow et al.
2020/0098173 A1 3/2020 Mccall
2020/0099989 A1 3/2020 Niemirska et al.
2020/0106965 A1 4/2020 Malia et al.
2020/0117213 A1* 4/2020 Tian ..................... G05D 1/0274
2020/0128227 A1 4/2020 Chavez et al.
2020/0128232 A1 4/2020 Hwang et al.
2020/0129850 A1 4/2020 Ohashi
2020/0135141 A1 4/2020 Day et al.
2020/0159017 A1 5/2020 Lin et al.
2020/0214682 A1 7/2020 Zaslavsky et al.
2020/0218074 A1 7/2020 Hoover et al.
2020/0225735 A1 7/2020 Schwarz
2020/0225746 A1 7/2020 Bar-zeev et al.
2020/0225747 A1 7/2020 Bar-zeev et al.
2020/0225830 A1 7/2020 Tang et al.
2020/0226814 A1 7/2020 Tang et al.
2020/0226823 A1 7/2020 Stachniak et al.
2020/0242844 A1 7/2020 Bae et al.
2020/0257245 A1 8/2020 Linville et al.
2020/0257484 A1 8/2020 Qian et al.
2020/0272303 A1 8/2020 Jia et al.
2020/0285314 A1 9/2020 Cieplinski et al.
2020/0286299 A1 9/2020 Wang et al.
2020/0319704 A1 10/2020 Kathuria et al.
2020/0328913 A1 10/2020 Wyas et al.
2020/0356221 A1 11/2020 Behzadi et al.
2020/0357374 A1 11/2020 Verweij et al.
2020/0363867 A1 11/2020 Azimi et al.
2020/0371602 A1 11/2020 Kanda
2020/0371673 A1 11/2020 Faulkner
2020/0379626 A1 12/2020 Guyomard et al.
2020/0387214 A1 12/2020 Ravasz et al.
2020/0387228 A1* 12/2020 Ravasz ................... G06F 3/012
2020/0387287 A1 12/2020 Ravasz et al.
2021/0011556 A1 1/2021 Atlas et al.
2021/0034163 A1 2/2021 Goel et al.
2021/0034319 A1 2/2021 Wang et al.
2021/0055789 A1 2/2021 Tsai et al.
2021/0067418 A1 3/2021 Ely et al.
2021/0074062 A1 3/2021 Madonna et al.
2021/0090337 A1 3/2021 Ravasz et al.
2021/0090348 A1 3/2021 Croxford et al.
2021/0096726 A1 4/2021 Faulkner et al.
2021/0097766 A1 4/2021 Palangie et al.
2021/0102820 A1 4/2021 Le et al.
2021/0103333 A1 4/2021 Cieplinski et al.
2021/0125414 A1 4/2021 Berkebile
2021/0142552 A1 5/2021 Kimura et al.
2021/0158624 A1 5/2021 Moon et al.
2021/0165484 A1 6/2021 Suguhara et al.
2021/0165923 A1 6/2021 Johnston
2021/0166437 A1 6/2021 Legendre et al.
2021/0173340 A1 6/2021 Kim
2021/0173536 A1 6/2021 Kondo
2021/0191600 A1* 6/2021 Lemay .................... G06F 3/013
2021/0225043 A1 7/2021 Tang et al.
2021/0227601 A1 7/2021 Eom et al.
2021/0241483 A1 8/2021 Dryer et al.
2021/0248674 A1 8/2021 Ogunbunmi
2021/0272367 A1 9/2021 Richter
2021/0279967 A1 9/2021 Gernoth et al.
2021/0287439 A1 9/2021 Goodrich et al.
2021/0295592 A1 9/2021 Von Cramon
2021/0295602 A1 9/2021 Scapel et al.
2021/0303074 A1 9/2021 Vanblon et al.
2021/0303107 A1 9/2021 Pla I Conesa et al.
2021/0312713 A1 10/2021 Peri et al.
2021/0312717 A1 10/2021 Mao
2021/0319617 A1 10/2021 Ahn et al.
2021/0326094 A1 10/2021 Buerli et al.
2021/0327140 A1 10/2021 Rothkopf et al.
2021/0331069 A1 10/2021 Gustafson et al.
2021/0333864 A1 10/2021 Harvey et al.
2021/0339134 A1 11/2021 Knoppert
2021/0350564 A1 11/2021 Peuhkurinen et al.
2021/0350604 A1 11/2021 Pejsa et al.
2021/0358294 A1 11/2021 Parashar et al.
2021/0366440 A1 11/2021 Burns et al.
2021/0368136 A1 11/2021 Chalmers et al.
2021/0374221 A1 12/2021 Markhasin et al.
2021/0375022 A1 12/2021 Lee et al.
2021/0383097 A1 12/2021 Guerard et al.
2021/0400744 A1 12/2021 Chen et al.
2021/0402306 A1 12/2021 Huang
2021/0405760 A1 12/2021 Schoen
2022/0011577 A1 1/2022 Lawver et al.
2022/0011855 A1 1/2022 Hazra et al.
2022/0012002 A1 1/2022 Bar-zeev et al.
2022/0028108 A1 1/2022 Haapoja et al.
2022/0030197 A1 1/2022 Ishimoto

(56) References Cited

U.S. PATENT DOCUMENTS

2022/0070241 A1 3/2022 Yerli
2022/0076496 A1 3/2022 Palangie et al.
2022/0083145 A1 3/2022 Matsunaga et al.
2022/0083197 A1* 3/2022 Rockel ................. G06T 19/006
2022/0084279 A1 3/2022 Lindmeier et al.
2022/0091722 A1 3/2022 Faulkner et al.
2022/0091723 A1 3/2022 Faulkner et al.
2022/0092862 A1* 3/2022 Faulkner ................ G06V 40/18
2022/0100265 A1 3/2022 Kies et al.
2022/0100270 A1 3/2022 Pastrana Vicente et al.
2022/0101593 A1* 3/2022 Rockel ................. A63F 13/655
2022/0101612 A1 3/2022 Palangie et al.
2022/0104910 A1 4/2022 Shelton et al.
2022/0121344 A1 4/2022 Pastrana Vicente et al.
2022/0124286 A1 4/2022 Punwani et al.
2022/0130107 A1 4/2022 Lindh
2022/0130126 A1 4/2022 Delgado et al.
2022/0137701 A1 5/2022 Bowman et al.
2022/0137705 A1 5/2022 Hashimoto et al.
2022/0148257 A1 5/2022 Boubekeur et al.
2022/0155909 A1 5/2022 Kawashima et al.
2022/0157083 A1 5/2022 Jandhyala et al.
2022/0165013 A1 5/2022 Velez et al.
2022/0179503 A1 6/2022 Timonen et al.
2022/0187907 A1 6/2022 Lee et al.
2022/0191570 A1 6/2022 Reid et al.
2022/0197403 A1 6/2022 Hughes et al.
2022/0198755 A1 6/2022 Pinchon
2022/0206298 A1 6/2022 Goodman
2022/0214743 A1 7/2022 Dascola et al.
2022/0221976 A1 7/2022 Agarwal et al.
2022/0229524 A1* 7/2022 Mckenzie ........... G06F 3/04886
2022/0229534 A1* 7/2022 Terre .................. G06F 3/04815
2022/0232191 A1 7/2022 Kawakami et al.
2022/0239718 A1 7/2022 Song et al.
2022/0244536 A1 8/2022 Sha et al.
2022/0245888 A1 8/2022 Singh et al.
2022/0253125 A1 8/2022 Wallen et al.
2022/0253136 A1 8/2022 Holder et al.
2022/0253149 A1 8/2022 Berliner et al.
2022/0253194 A1 8/2022 Berliner et al.
2022/0255995 A1 8/2022 Berliner et al.
2022/0276720 A1 9/2022 Yasui
2022/0279303 A1 9/2022 Marculescu et al.
2022/0287676 A1 9/2022 Steines et al.
2022/0291808 A1 9/2022 Stevens et al.
2022/0292783 A1 9/2022 Jayaram et al.
2022/0292784 A1 9/2022 Jayaram et al.
2022/0292785 A1 9/2022 Jayaram et al.
2022/0295032 A1 9/2022 Jayaram et al.
2022/0295040 A1 9/2022 Jayaram et al.
2022/0295139 A1 9/2022 Jayaram et al.
2022/0301264 A1 9/2022 O'Leary et al.
2022/0303680 A1 9/2022 Ahmed et al.
2022/0311950 A1 9/2022 Ith et al.
2022/0317776 A1 10/2022 Sundstrom et al.
2022/0326837 A1 10/2022 Dessero et al.
2022/0335697 A1 10/2022 Harding et al.
2022/0365595 A1 11/2022 Cieplinski et al.
2022/0365740 A1 11/2022 Chang et al.
2022/0374136 A1 11/2022 Chang et al.
2022/0382385 A1 12/2022 Chen et al.
2022/0383592 A1 12/2022 Hare et al.
2022/0397962 A1 12/2022 Goel et al.
2022/0408164 A1 12/2022 Lee et al.
2022/0413691 A1* 12/2022 Becker ................ G06F 3/04815
2022/0414975 A1 12/2022 Becker et al.
2022/0414999 A1 12/2022 Ravasz et al.
2022/0415094 A1 12/2022 Kim et al.
2023/0004216 A1 1/2023 Rodgers et al.
2023/0007335 A1 1/2023 Gupta et al.
2023/0008537 A1 1/2023 Henderson et al.
2023/0021861 A1 1/2023 Fujiwara et al.
2023/0027040 A1 1/2023 Wang et al.
2023/0030699 A1 2/2023 Zion et al.
2023/0031832 A1 2/2023 Lipton et al.
2023/0032545 A1 2/2023 Mindlin et al.
2023/0032771 A1 2/2023 Zion et al.
2023/0068660 A1 3/2023 Brent et al.
2023/0069764 A1 3/2023 Jonker et al.
2023/0074080 A1 3/2023 Miller et al.
2023/0076326 A1 3/2023 Xu et al.
2023/0092282 A1 3/2023 Boesel et al.
2023/0092874 A1 3/2023 Krivoruchko et al.
2023/0093979 A1* 3/2023 Stauber ................... G06T 15/50
345/419
2023/0100610 A1 3/2023 Pastrana Vicente et al.
2023/0100689 A1 3/2023 Chiu et al.
2023/0103161 A1 3/2023 Li et al.
2023/0114080 A1 4/2023 Yang et al.
2023/0119162 A1 4/2023 Lipton et al.
2023/0120052 A1 4/2023 Wallen et al.
2023/0133579 A1 5/2023 Chang et al.
2023/0152889 A1 5/2023 Cieplinski et al.
2023/0152935 A1 5/2023 Mckenzie et al.
2023/0154122 A1 5/2023 Dascola et al.
2023/0163987 A1 5/2023 Young et al.
2023/0168745 A1 6/2023 Yoda
2023/0168788 A1 6/2023 Faulkner et al.
2023/0176806 A1 6/2023 Chen et al.
2023/0185426 A1 6/2023 Rockel et al.
2023/0186577 A1 6/2023 Rockel et al.
2023/0206572 A1 6/2023 Pazmino et al.
2023/0221833 A1 7/2023 Holder et al.
2023/0244857 A1 8/2023 Weiss et al.
2023/0259265 A1 8/2023 Krivoruchko et al.
2023/0260240 A1 8/2023 Jayaram et al.
2023/0266859 A1 8/2023 Day et al.
2023/0273706 A1* 8/2023 Smith ................. G06F 3/04815
345/419
2023/0274504 A1 8/2023 Ren et al.
2023/0290042 A1 9/2023 Casella et al.
2023/0308610 A1 9/2023 Henderson et al.
2023/0315385 A1 10/2023 Akmal et al.
2023/0325004 A1 10/2023 Burns et al.
2023/0325046 A1 10/2023 De Almeida E De Vincenzo et al.
2023/0333646 A1 10/2023 Pastrana Vicente et al.
2023/0334808 A1 10/2023 Sundstrom et al.
2023/0341932 A1 10/2023 Silva et al.
2023/0343049 A1 10/2023 Boesel et al.
2023/0350539 A1 11/2023 Owen et al.
2023/0351702 A1 11/2023 Tan et al.
2023/0353398 A1 11/2023 White
2023/0359199 A1 11/2023 Adachi et al.
2023/0377259 A1 11/2023 Becker et al.
2023/0377295 A1 11/2023 Angevine et al.
2023/0377299 A1 11/2023 Becker et al.
2023/0377300 A1 11/2023 Becker et al.
2023/0384907 A1 11/2023 Boesel et al.
2023/0388357 A1 11/2023 Faulkner et al.
2023/0394755 A1 12/2023 Negoita et al.
2023/0396854 A1 12/2023 Sanders et al.
2024/0037886 A1 2/2024 Chiu et al.
2024/0062279 A1 2/2024 Scully et al.
2024/0070948 A1 2/2024 Bradley et al.
2024/0086031 A1 3/2024 Palangie et al.
2024/0086032 A1 3/2024 Palangie et al.
2024/0087256 A1 3/2024 Hylak et al.
2024/0094863 A1 3/2024 Smith et al.
2024/0094866 A1 3/2024 Lemay et al.
2024/0094882 A1 3/2024 Brewer et al.
2024/0095984 A1 3/2024 Ren et al.
2024/0102821 A1 3/2024 Vallet et al.
2024/0103613 A1 3/2024 Chawda et al.
2024/0103616 A1* 3/2024 Yerkes ................ G06F 3/04842
2024/0103636 A1 3/2024 Lindmeier et al.
2024/0103676 A1 3/2024 Pastrana Vicente et al.
2024/0103684 A1 3/2024 Yu et al.
2024/0103685 A1 3/2024 Pazmino et al.
2024/0103686 A1 3/2024 Pazmino et al.
2024/0103687 A1 3/2024 Pastrana Vicente et al.
2024/0103701 A1 3/2024 Pastrana Vicente et al.
2024/0103704 A1 3/2024 Pastrana Vicente et al.

(56) References Cited

U.S. PATENT DOCUMENTS

| | | | |
|---|---|---|---|
| 2024/0103707 | A1 | 3/2024 | Henderson et al. |
| 2024/0103716 | A1 | 3/2024 | Pastrana Vicente et al. |
| 2024/0103803 | A1 | 3/2024 | Krivoruchko et al. |
| 2024/0104836 | A1 | 3/2024 | Dessero et al. |
| 2024/0104843 | A1 | 3/2024 | Mckenzie et al. |
| 2024/0104870 | A1 | 3/2024 | Fuste Lleixa et al. |
| 2024/0104873 | A1 | 3/2024 | Pastrana Vicente et al. |
| 2024/0104875 | A1 | 3/2024 | Couche et al. |
| 2024/0104876 | A1 | 3/2024 | Couche et al. |
| 2024/0104877 | A1 | 3/2024 | Henderson et al. |
| 2024/0111479 | A1 | 4/2024 | Paul |
| 2024/0119682 | A1 | 4/2024 | Rudman et al. |
| 2024/0135612 | A1 | 4/2024 | Hold-geoffroy et al. |
| 2024/0152256 | A1 | 5/2024 | Dascola et al. |
| 2024/0185514 | A1 | 6/2024 | Singh et al. |
| 2024/0192764 | A1 | 6/2024 | Dascola et al. |
| 2024/0193892 | A1 | 6/2024 | Lutter et al. |
| 2024/0200967 | A1 | 6/2024 | Arroyo et al. |
| 2024/0203066 | A1 | 6/2024 | Kawashima et al. |
| 2024/0205509 | A1 | 6/2024 | Kim et al. |
| 2024/0221273 | A1 | 7/2024 | Dusseau et al. |
| 2024/0221291 | A1 | 7/2024 | Henderson et al. |
| 2024/0233097 | A1 | 7/2024 | Ngo et al. |
| 2024/0233288 | A1 | 7/2024 | Stauber et al. |
| 2024/0265656 | A1 | 8/2024 | Victor-faichney et al. |
| 2024/0265796 | A1 | 8/2024 | Ippadi Veerabhadre Gowda et al. |
| 2024/0272722 | A1 | 8/2024 | Gitter et al. |
| 2024/0272782 | A1 | 8/2024 | Pastrana Vicente et al. |
| 2024/0273838 | A1 | 8/2024 | Palangie et al. |
| 2024/0281108 | A1 | 8/2024 | Krivoruchko et al. |
| 2024/0281109 | A1 | 8/2024 | Manjunath et al. |
| 2024/0291953 | A1 | 8/2024 | Cerra et al. |
| 2024/0310971 | A1 | 9/2024 | Kawashima et al. |
| 2024/0338104 | A1* | 10/2024 | Salter .................. G06F 3/04815 |
| 2024/0338921 | A1 | 10/2024 | Burgner et al. |
| 2024/0361832 | A1 | 10/2024 | Calderone et al. |
| 2024/0361833 | A1 | 10/2024 | Calderone et al. |
| 2024/0361835 | A1 | 10/2024 | Hylak et al. |
| 2024/0393876 | A1 | 11/2024 | Chawda et al. |
| 2024/0402800 | A1 | 12/2024 | Shutzberg et al. |
| 2024/0402821 | A1 | 12/2024 | Meyer et al. |
| 2024/0403080 | A1 | 12/2024 | Laurita et al. |
| 2024/0404206 | A1 | 12/2024 | Chiu et al. |
| 2024/0404207 | A1 | 12/2024 | Laurita et al. |
| 2024/0404232 | A1 | 12/2024 | Rockwell et al. |
| 2024/0404233 | A1 | 12/2024 | Boesel et al. |
| 2024/0411444 | A1 | 12/2024 | Shutzberg et al. |
| 2024/0420435 | A1 | 12/2024 | Gitter et al. |
| 2024/0428488 | A1 | 12/2024 | Ren et al. |
| 2025/0005855 | A1 | 1/2025 | Holder et al. |
| 2025/0005864 | A1 | 1/2025 | Dessero et al. |
| 2025/0008057 | A1 | 1/2025 | Chiu et al. |
| 2025/0013343 | A1 | 1/2025 | Smith et al. |
| 2025/0013344 | A1 | 1/2025 | Smith et al. |
| 2025/0024008 | A1 | 1/2025 | Cerra et al. |
| 2025/0028423 | A1 | 1/2025 | Dessero et al. |
| 2025/0029319 | A1 | 1/2025 | Boesel et al. |
| 2025/0029328 | A1 | 1/2025 | Smith et al. |
| 2025/0031002 | A1 | 1/2025 | Hawkins et al. |
| 2025/0036253 | A1 | 1/2025 | Stauber et al. |
| 2025/0036255 | A1 | 1/2025 | Pastrana Vicente et al. |
| 2025/0069328 | A1 | 2/2025 | Herscher et al. |
| 2025/0077060 | A1 | 3/2025 | Becker et al. |
| 2025/0077066 | A1 | 3/2025 | Lutter |
| 2025/0078420 | A1 | 3/2025 | Dessero et al. |
| 2025/0078429 | A1 | 3/2025 | Dascola et al. |
| 2025/0103132 | A1 | 3/2025 | Rickwald et al. |
| 2025/0104335 | A1 | 3/2025 | Huang et al. |
| 2025/0104367 | A1 | 3/2025 | Huang et al. |
| 2025/0106581 | A1 | 3/2025 | Lutter et al. |
| 2025/0106582 | A1 | 3/2025 | Lutter et al. |
| 2025/0110605 | A1 | 4/2025 | Huang et al. |
| 2025/0111472 | A1 | 4/2025 | Lutter et al. |
| 2025/0111605 | A1 | 4/2025 | Huang et al. |
| 2025/0111622 | A1 | 4/2025 | Stern et al. |
| 2025/0117079 | A1 | 4/2025 | Chiu et al. |
| 2025/0118038 | A1 | 4/2025 | Sorrentino et al. |
| 2025/0130707 | A1 | 4/2025 | Stauber et al. |
| 2025/0156031 | A1 | 5/2025 | Holder et al. |
| 2025/0157136 | A1 | 5/2025 | Lindmeier et al. |
| 2025/0165069 | A1 | 5/2025 | Calderone et al. |

FOREIGN PATENT DOCUMENTS

| | | | |
|---|---|---|---|
| CN | 104714771 | A | 6/2015 |
| CN | 104981681 | A | 10/2015 |
| CN | 105264461 | A | 1/2016 |
| CN | 105264478 | A | 1/2016 |
| CN | 106990838 | A | 7/2017 |
| CN | 108519818 | A | 9/2018 |
| CN | 108633307 | A | 10/2018 |
| CN | 110413171 | A | 11/2019 |
| CN | 110476142 | A | 11/2019 |
| CN | 110673718 | A | 1/2020 |
| CN | 111580652 | A | 8/2020 |
| CN | 111913565 | A | 11/2020 |
| CN | 112068757 | A | 12/2020 |
| CN | 109491508 | B | 8/2022 |
| CN | 115309271 | A | 11/2022 |
| CN | 116132905 | A | 5/2023 |
| CN | 117043722 | A | 11/2023 |
| CN | 117857981 | A | 4/2024 |
| CN | 118102204 | A | 5/2024 |
| EP | 0816983 | A2 | 1/1998 |
| EP | 1530115 | A2 | 5/2005 |
| EP | 1562021 | A1 | 8/2005 |
| EP | 2393056 | A1 | 12/2011 |
| EP | 2458486 | A1 | 5/2012 |
| EP | 2551763 | A1 | 1/2013 |
| EP | 2741175 | A2 | 6/2014 |
| EP | 2893297 | A1 | 7/2015 |
| EP | 2947545 | A1 | 11/2015 |
| EP | 3088997 | A1 | 11/2016 |
| EP | 3118722 | A1 | 1/2017 |
| EP | 3249497 | A1 | 11/2017 |
| EP | 3316075 | A1 | 5/2018 |
| EP | 3336805 | A1 | 6/2018 |
| EP | 3451135 | A1 | 3/2019 |
| EP | 3503101 | A1 | 6/2019 |
| EP | 3506151 | A1 | 7/2019 |
| EP | 3570144 | A1 | 11/2019 |
| EP | 3588255 | A1 | 1/2020 |
| EP | 3654147 | A1 | 5/2020 |
| EP | 4155867 | A1 | 3/2023 |
| EP | 3688726 | B1 | 8/2023 |
| GB | 2540791 | A | 2/2017 |
| JP | H06-4596 | A | 1/1994 |
| JP | H10-51711 | A | 2/1998 |
| JP | H10-78845 | A | 3/1998 |
| JP | H11-289555 | A | 10/1999 |
| JP | 2005-215144 | A | 8/2005 |
| JP | 2005-333524 | A | 12/2005 |
| JP | 2006-004093 | A | 1/2006 |
| JP | 2006-107048 | A | 4/2006 |
| JP | 2006-146803 | A | 6/2006 |
| JP | 2006-295236 | A | 10/2006 |
| JP | 2011-203880 | A | 10/2011 |
| JP | 2012-234550 | A | 11/2012 |
| JP | 2013-178639 | A | 9/2013 |
| JP | 2013-196158 | A | 9/2013 |
| JP | 2013-254358 | A | 12/2013 |
| JP | 2013-257716 | A | 12/2013 |
| JP | 2014-21565 | A | 2/2014 |
| JP | 2014-59840 | A | 4/2014 |
| JP | 2014-71663 | A | 4/2014 |
| JP | 2014-99184 | A | 5/2014 |
| JP | 2014-514652 | A | 6/2014 |
| JP | 2014-514653 | A | 6/2014 |
| JP | 2015-56173 | A | 3/2015 |
| JP | 2015-515040 | A | 5/2015 |
| JP | 2015-118332 | A | 6/2015 |
| JP | 2016-96513 | A | 5/2016 |
| JP | 2016-194744 | A | 11/2016 |
| JP | 2017-27206 | A | 2/2017 |

(56) References Cited

FOREIGN PATENT DOCUMENTS

| | | | |
|---|---|---|---|
| JP | 2017-58528 | A | 3/2017 |
| JP | 2017-126009 | A | 7/2017 |
| JP | 2017-531221 | A | 10/2017 |
| JP | 2018-5516 | A | 1/2018 |
| JP | 2018-5517 | A | 1/2018 |
| JP | 2018-41477 | A | 3/2018 |
| JP | 2018-514005 | A | 5/2018 |
| JP | 2018-88118 | A | 6/2018 |
| JP | 2018-101019 | A | 6/2018 |
| JP | 2018-106499 | A | 7/2018 |
| JP | 2019-40333 | A | 3/2019 |
| JP | 2019-169154 | A | 10/2019 |
| JP | 2019-175449 | A | 10/2019 |
| JP | 2019-527881 | A | 10/2019 |
| JP | 2019-532382 | A | 11/2019 |
| JP | 2019-536131 | A | 12/2019 |
| JP | 2020-503595 | A | 1/2020 |
| JP | 2020-86913 | A | 6/2020 |
| JP | 2022-53334 | A | 4/2022 |
| JP | 2022-175629 | A | 11/2022 |
| JP | 2023-52278 | A | 4/2023 |
| KR | 10-2011-0017236 | A | 2/2011 |
| KR | 10-2014-0097654 | A | 8/2014 |
| KR | 10-2016-0012139 | A | 2/2016 |
| KR | 10-2017-0027240 | A | 3/2017 |
| KR | 10-2018-0102171 | A | 9/2018 |
| KR | 10-2019-0100957 | A | 8/2019 |
| KR | 10-2020-0010296 | A | 1/2020 |
| KR | 10-2020-0035103 | A | 4/2020 |
| KR | 10-2020-0110788 | A | 9/2020 |
| KR | 10-2020-0135496 | A | 12/2020 |
| KR | 10-2021-0083016 | A | 7/2021 |
| WO | 2010/026519 | A1 | 3/2010 |
| WO | 2011/008638 | A1 | 1/2011 |
| WO | 2012/145180 | A1 | 10/2012 |
| WO | 2013/169849 | A2 | 11/2013 |
| WO | 2014/105276 | A1 | 7/2014 |
| WO | 2014/203301 | A1 | 12/2014 |
| WO | 2015/195216 | A1 | 12/2015 |
| WO | 2016/118344 | A1 | 7/2016 |
| WO | 2017/024142 | A1 | 2/2017 |
| WO | 2017/088487 | A1 | 6/2017 |
| WO | 2018/046957 | A2 | 3/2018 |
| WO | 2018/090060 | A1 | 5/2018 |
| WO | 2018/175735 | A1 | 9/2018 |
| WO | 2019/074771 | A1 | 4/2019 |
| WO | 2019/142560 | A1 | 7/2019 |
| WO | 2019/172678 | A1 | 9/2019 |
| WO | 2019/213111 | A1 | 11/2019 |
| WO | 2019/217163 | A1 | 11/2019 |
| WO | 2020/066682 | A1 | 4/2020 |
| WO | 2020/121483 | A1 | 6/2020 |
| WO | 2020/179027 | A1 | 9/2020 |
| WO | 2021/061349 | A1 | 4/2021 |
| WO | 2021/061351 | A1 | 4/2021 |
| WO | 2021/133053 | A1 | 7/2021 |
| WO | 2021/173839 | A1 | 9/2021 |
| WO | 2021/202783 | A1 | 10/2021 |
| WO | 2022/046340 | A1 | 3/2022 |
| WO | 2022/055821 | A1 | 3/2022 |
| WO | 2022/055822 | A1 | 3/2022 |
| WO | 2022/066399 | A1 | 3/2022 |
| WO | 2022/066535 | A2 | 3/2022 |
| WO | 2022/067075 | A1 | 3/2022 |
| WO | 2022/067343 | A2 | 3/2022 |
| WO | 2022/072187 | A2 | 4/2022 |
| WO | 2022/146936 | A1 | 7/2022 |
| WO | 2022/146938 | A1 | 7/2022 |
| WO | 2022/147146 | A1 | 7/2022 |
| WO | 2022/164881 | A1 | 8/2022 |
| WO | 2022/192040 | A1 | 9/2022 |
| WO | 2022/208797 | A1 | 10/2022 |
| WO | 2023/043646 | A1 | 3/2023 |
| WO | 2023/096940 | A2 | 6/2023 |
| WO | 2023/141535 | A1 | 7/2023 |

OTHER PUBLICATIONS

Corrected Notice of Allowability received for U.S. Appl. No. 17/448,875, mailed on Apr. 24, 2024, 4 pages.

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Corrected Notice of Allowability received for U.S. Appl. No. 18/154,757, mailed on Aug. 30, 2024, 2 pages.

Corrected Notice of Allowability received for U.S. Appl. No. 18/421,827, mailed on Aug. 29, 2024, 2 pages.

Corrected Notice of Allowability received for U.S. Appl. No. 18/465,098, mailed on Mar. 13, 2024, 3 pages.

Corrected Notice of Allowance received for U.S. Appl. No. 17/478,593, mailed on Dec. 21, 2022, 2 pages.

European Search Report received for European Patent Application No. 21791153.6, mailed on Mar. 22, 2024, 5 pages.

European Search Report received for European Patent Application No. 21801378.7, mailed on Jul. 10, 2024, 5 pages.

Extended European Search Report received for European Patent Application No. 23158818.7, mailed on Jul. 3, 2023, 12 pages.

Extended European Search Report received for European Patent Application No. 23158929.2, mailed on Jun. 27, 2023, 12 pages.

Extended European Search Report received for European Patent Application No. 23197572.3, mailed on Feb. 19, 2024, 7 pages.

Final Office Action received for U.S. Appl. No. 17/448,875, mailed on Mar. 16, 2023, 24 pages.

Final Office Action received for U.S. Appl. No. 17/580,495, mailed on May 13, 2024, 29 pages.

Final Office Action received for U.S. Appl. No. 17/659,147, mailed on Oct. 4, 2023, 17 pages.

Final Office Action received for U.S. Appl. No. 18/182,300, mailed on Feb. 16, 2024, 32 pages.

Final Office Action received for U.S. Appl. No. 18/375,280, mailed on Jul. 12, 2024, 19 pages.

Home | Virtual Desktop [online], Virtual Desktop, Available online at: <https://www.vrdesktop.net>, [retrieved on Jun. 29, 2023], 4 pages.

International Search Report received for PCT Application No. PCT/US2022/076603, mailed on Jan. 9, 2023, 4 pages.

International Search Report received for PCT Application No. PCT/US2023/017335, mailed on Aug. 22, 2023, 6 pages.

Search Report received for PCT Application No. PCT/US2023/018213, mailed on Jul. 26, 2023, 6 pages.

International Search Report received for PCT Application No. PCT/US2023/019458, mailed on Aug. 8, 2023, 7 pages.

Search Report received for PCT Application No. PCT/US2023/060943, mailed on Jun. 6, 2023, 7 pages.

Pfeuffer et al., "Gaze + Pinch Interaction in Virtual Reality", In Proceedings of SUI '17, Brighton, United Kingdom, Oct. 16-17, 2017, pp. 99-108.

Search Report received for PCT Patent Application No. PCT/US2021/050948, mailed on Mar. 4, 2022, 6 pages.

McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.

Search Report received for PCT Patent Application No. PCT/US2021/071595, mailed on Mar. 17, 2022, 7 pages.

Search Report received for PCT Patent Application No. PCT/US2021/071596, mailed on Apr. 8, 2022, 7 pages.

Search Report received for PCT Patent Application No. PCT/US2022/013208, mailed on Apr. 26, 2022, 7 pages.

Search Report received for PCT Patent Application No. PCT/US2022/071704, mailed on Aug. 26, 2022, 6 pages.

Search Report received for PCT Patent Application No. PCT/US2023/074257, mailed on Nov. 21, 2023, 5 pages.

Search Report received for PCT Patent Application No. PCT/US2023/074950, mailed on Jan. 3, 2024, 9 pages.

Search Report received for PCT Patent Application No. PCT/US2023/074979, mailed on Feb. 26, 2024, 6 pages.

(56) References Cited

OTHER PUBLICATIONS

Lin et al., "Towards Naturally Grabbing and Moving Objects in VR", IS&T International Symposium on Electronic Imaging and The Engineering Reality of Virtual Reality, 2016, 6 pages.
Office Action received for U.S. Appl. No. 17/448,875, mailed on Oct. 6, 2022, 25 pages.
Office Action received for U.S. Appl. No. 17/448,875, mailed on Sep. 29, 2023, 30 pages.
Office Action received for U.S. Appl. No. 17/580,495, mailed on Aug. 15, 2024, 28 pages.
Non-Final Office Action received for U.S. Appl. No. 18/305,201, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Notice of Allowance received for U.S. Appl. No. 18/154,757, mailed on Aug. 26, 2024, 12 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Extended European Search Report received for European Patent Application No. 25169060.8, mailed on May 12, 2025, 10 pages.
Extended European Search Report received for European Patent Application No. 25169059.0, mailed on May 12, 2025, 11 pages.
Non-Final Office Action received for U.S. Appl. No. 18/473,197, mailed on May 1, 2025, 14 pages.
Non-Final Office Action received for U.S. Appl. No. 18/473,187, mailed on May 16, 2025, 15 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Final Office Action received for U.S. Appl. No. 17/933,020, mailed on May 21, 2025, 28 pages.
Non-Final Office Action received for U.S. Appl. No. 18/317,886, mailed on Apr. 30, 2025, 34 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/043470, mailed on Oct. 29, 2024, 4 pages.
International Search Report received for PCT Patent Application No. PCT/US2023/074960, mailed on Feb. 12, 2024, 6 pages.
Extended European Search Report received for European Patent Application No. EP24221722.2, mailed on Apr. 17, 2025, 7 pages.
International Search Report received for PCT Patent Application No. PCT/US2023/074973, mailed on Mar. 7, 2024, 7 pages.
Non-Final Office Action received for U.S. Appl. No. 18/882,622, mailed on May 22, 2025, 8 pages.
Notice of Allowance received for U.S. Appl. No. 17/655,521, mailed on Apr. 16, 2025, 8 pages.
Notice of Allowance received for U.S. Appl. No. 18/473,179, mailed on May 8, 2025, 9 pages.
Final Office Action received for U.S. Appl. No. 17/655,521, mailed on Apr. 10, 2024, 18 pages.
International Search Report received for PCT Patent Application No. PCT/US2022/071228, mailed on Aug. 25, 2022, 6 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
Non-Final Office Action received for U.S. Appl. No. 17/655,521, mailed on Aug. 23, 2023, 13 pages.

(56) References Cited

OTHER PUBLICATIONS

Non-Final Office Action received for U.S. Appl. No. 17/655,521, mailed on Nov. 27, 2024, 17 pages.
3D Flow, "Coloring a Point Cloud Using 3DF Zephyr Pro", Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Berard, Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Capturing Reality, "Data Sheet RealityCapture Tarasque 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Lachambre, et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lor Cas, "Reality Capture: Exporting Mesh", Youtube, https://www.youtube.com/watch?v=PdvTRa2B_s0, Dec. 10, 2020, 2 pages.
Pi3dscan, "Process a 3D Scan With Projection in Reality Capture (RC)", Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Schuetz, Markus, "Interactive Exploration of Point Clouds", Technische Universitat Wien, reposiTUm, https://doi.org/10.34726/hss.2021.91668, Mar. 8, 2021, 119 pages.
Tolle, et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/.
Notice of Allowance received for U.S. Appl. No. 18/322,469, mailed on Mar. 19, 2025, 14 pages.
Corrected Notice of Allowability received for U.S. Appl. No. 18/146,234, mailed on Mar. 20, 2025, 2 pages.
Corrected Notice of Allowability received for U.S. Appl. No. 18/473,180, mailed on Apr. 1, 2025, 2 pages.
Non-Final Office Action received for U.S. Appl. No. 18/174,403, mailed on Mar. 20, 2025, 26 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/032153, mailed on Nov. 11, 2024, 6 pages.
Notice of Allowance received for U.S. Appl. No. 18/473,182, mailed on Apr. 23, 2025, 8 pages.
Notice of Allowance received for U.S. Appl. No. 18/427,434, mailed on Apr. 17, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 17/479,791, mailed on May 19, 2023, 2 pages.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/146,234, mailed on Feb. 6, 2025, 2 pages.
Corrected Notice of Allowability received for U.S. Appl. No. 18/174,337, mailed on Jan. 15, 2025, 2 pages.
Corrected Notice of Allowability received for U.S. Appl. No. 18/463,739, mailed on Oct. 4, 2024, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
European Search Report received for European Patent Application No. 22703771.0, mailed on Feb. 26, 2025, 4 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24159868.9, mailed on Oct. 9, 2024, 13 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.

(56) References Cited

OTHER PUBLICATIONS

Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/407,675, mailed on May 22, 2024, 18 pages.
Final Office Action received for U.S. Appl. No. 17/469,788, mailed on Nov. 16, 2023, 24 pages.
Final Office Action received for U.S. Appl. No. 17/580,495, mailed on Feb. 12, 2025, 29 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/816,314, mailed on Jan. 20, 2023, 11 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 17/935,095, mailed on Dec. 29, 2023, 15 pages.
Final Office Action received for U.S. Appl. No. 18/182,300, mailed on Oct. 31, 2024, 34 pages.
Final Office Action received for U.S. Appl. No. 18/327,844, mailed on Nov. 29, 2024, 25 pages.
Final Office Action received for U.S. Appl. No. 18/473,196, mailed on Dec. 6, 2024, 22 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Application No. PCT/US2023/060052, mailed on May 24, 2023, 6 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/049520, mailed on Apr. 8, 2022, 8 pages.
International Search Report received for PCT Patent Application No. PCT/US2021/071518, mailed on Feb. 25, 2022, 7 pages.
International Search Report received for PCT Patent Application No. PCT/US2022/071208, mailed on Aug. 18, 2022, 9 pages.
Yue et al., "Optimal Region Selection for Stereoscopic Video Subtitle Insertion", IEEE Transactions on Circuits and Systems for Video Technology, vol. 28, No. 11, Nov. 2018, 13 pages.
International Search Report received for PCT Patent Application No. PCT/US2022/076808, mailed on Mar. 28, 2023, 6 pages.
International Search Report received for PCT Patent Application No. PCT/US2022/076985, mailed on Feb. 20, 2023, 5 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074793, mailed on Feb. 6, 2024, 6 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/026102, mailed on Aug. 26, 2024, 5 pages.
International Search Report received for PCT Patent Application No. PCT/US2024/030661, mailed on Nov. 4, 2024, 5 pages.
International Search Report received for PCT Patent Application No. PCT/US2024/032455, mailed on Sep. 25, 2024, 4 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Letter Restarting Period for Response received for U.S. Appl. No. 15/644,639, mailed on Sep. 28, 2018, 8 pages.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/479,791, mailed on May 11, 2022, 18 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/905,483, mailed on Mar. 27, 2024, 16 pages.
Non-Final Office Action received for U.S. Appl. No. 17/933,020, mailed on Jan. 30, 2025, 26 pages.

(56) References Cited

OTHER PUBLICATIONS

Non-Final Office Action received for U.S. Appl. No. 17/934,104, mailed on Mar. 25, 2024, 26 pages.
Non-Final Office Action received for U.S. Appl. No. 17/935,095, mailed on Jun. 22, 2023, 15 pages.
Non-Final Office Action received for U.S. Appl. No. 18/119,219, mailed on Mar. 28, 2024, 15 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/154,697, mailed on Nov. 24, 2023, 10 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/322,469, mailed on Nov. 15, 2024, 34 pages.
Non-Final Office Action received for U.S. Appl. No. 18/327,844, mailed on May 17, 2024, 20 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/424,644, mailed on Jan. 29, 2025, 18 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Non-Final Office Action received for U.S. Appl. No. 18/473,196, mailed on Aug. 16, 2024, 21 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 17/816,314, mailed on Jan. 4, 2024, 6 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2025, 12 pages.
Notice of Allowance received for U.S. Appl. No. 18/174,337, mailed on Jan. 2, 2025, 8 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/336,770, mailed on Nov. 29, 2024, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/515,188, mailed on Nov. 27, 2024, 9 pages.
Notice of Allowance received for U.S. Appl. No. 18/668,032, mailed on Jan. 16, 2025, 9 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light | Precision 0.05mm), Revpoint [online]. Revopoint 3D,, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.

(56) References Cited

OTHER PUBLICATIONS

Restriction Requirement received for U.S. Appl. No. 17/905,483, mailed on Dec. 7, 2023, 7 pages.
Restriction Requirement received for U.S. Appl. No. 18/473,187, mailed on Dec. 30, 2024, 5 pages.
Search Report received for United Kingdom Patent Application No. GB2210885.6, mailed on Jan. 27, 2023, 1 page.
ShareVOX, Phoria [online]. Phoria Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
Supplemental Notice of Allowance received for U.S. Appl. No. 14/531,874, mailed on Jul. 26, 2017, 5 pages.
Supplemental Notice of Allowance received for U.S. Appl. No. 18/515,188, mailed on Dec. 12, 2024, 2 pages.
VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Cas and Chary XR, "Oculus Go & Your Phone As 2nd Controller !!—An Inexpensive Way To Play PC VR Games", posted on Mar. 8, 2019, https://www.youtube.com/watch?v=i_iRVa0kemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Fatima et al., "Eye Movement Based Human Computer Interaction", 3rd International Conference On Recent Advances In Information Technology (RAIT), Mar. 3, 2016, pp. 489-494.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Lin et al., "Ubii: Physical World Interaction Through Augmented Reality", Publisher: IEEE, vol. 16, No. 3, DOI: 10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.
Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Pfeuffer et al., "Gaze and Touch Interaction on Tablets", UIST '16, Tokyo, Japan, ACM, Oct. 16-19, 2016, pp. 301-311.
Qi et al., "PointNet++: Deep Hierarchical Feature Learning on Point Sets in a Metric Space", Stanford University, Jun. 7, 2017, 14 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Schenk et al., "Spock: A Smooth Pursuit Oculomotor Control Kit", CHI'16 Extended Abstracts, San Jose, CA, USA, ACM, May 7-12, 2016, pp. 2681-2687.
Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).

* cited by examiner

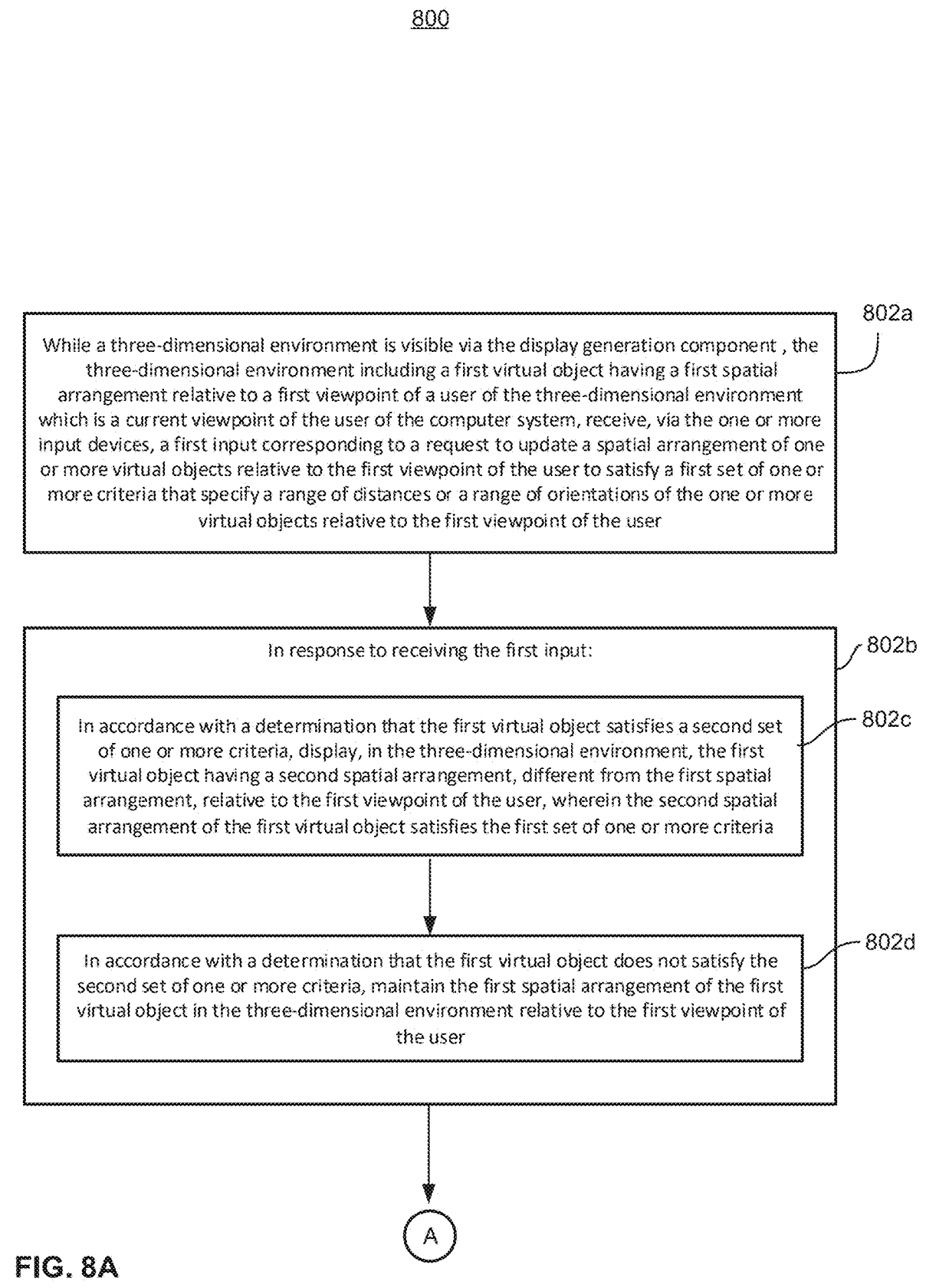

800

802a

While a three-dimensional environment is visible via the display generation component , the three-dimensional environment including a first virtual object having a first spatial arrangement relative to a first viewpoint of a user of the three-dimensional environment which is a current viewpoint of the user of the computer system, receive, via the one or more input devices, a first input corresponding to a request to update a spatial arrangement of one or more virtual objects relative to the first viewpoint of the user to satisfy a first set of one or more criteria that specify a range of distances or a range of orientations of the one or more virtual objects relative to the first viewpoint of the user 802b In response to receiving the first input:

802c

In accordance with a determination that the first virtual object satisfies a second set of one or more criteria, display, in the three-dimensional environment, the first virtual object having a second spatial arrangement, different from the first spatial arrangement, relative to the first viewpoint of the user, wherein the second spatial arrangement of the first virtual object satisfies the first set of one or more criteria 802d In accordance with a determination that the first virtual object does not satisfy the second set of one or more criteria, maintain the first spatial arrangement of the first virtual object in the three-dimensional environment relative to the first viewpoint of the user

A

FIG. 8A

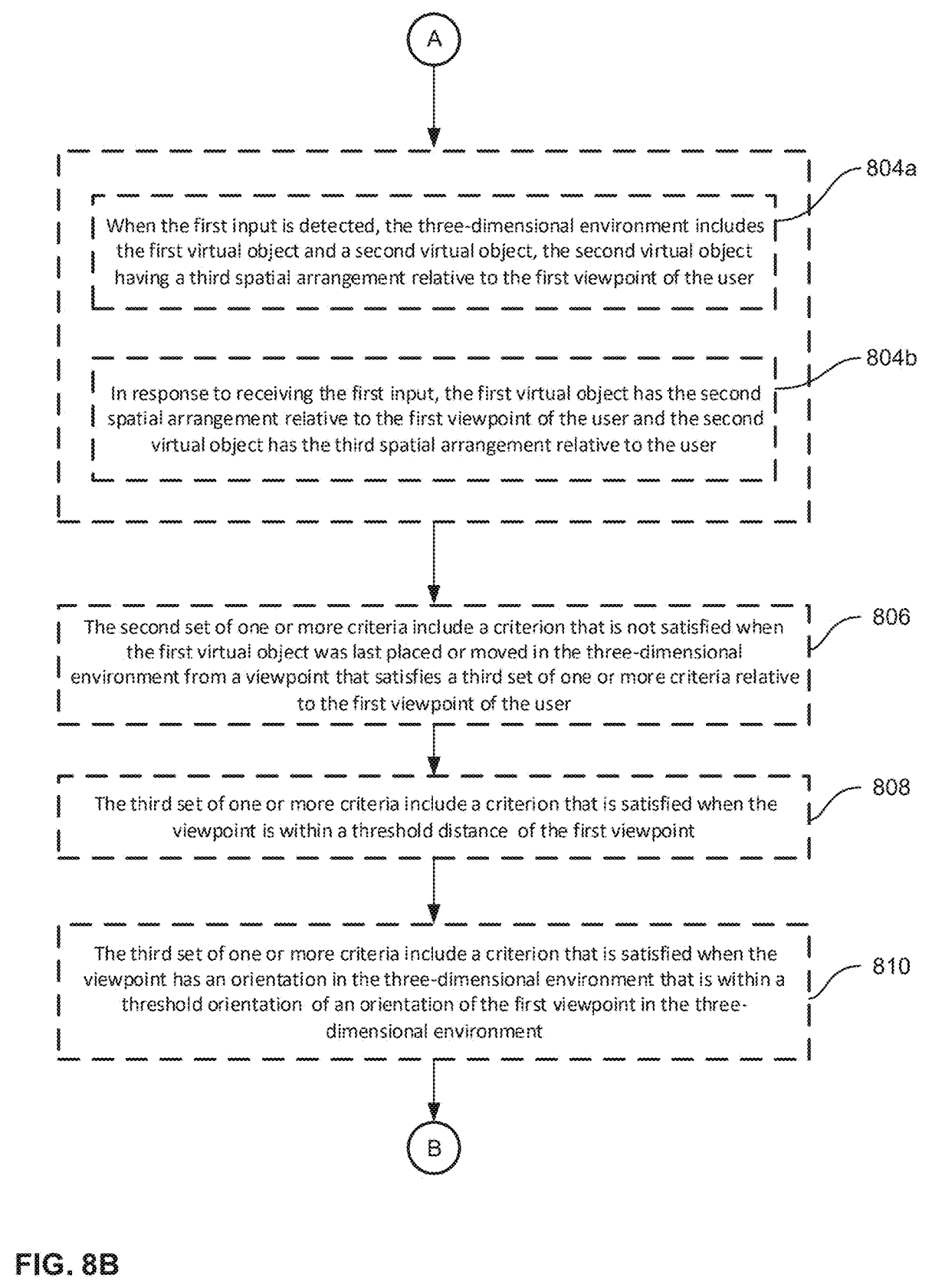

A

804a: When the first input is detected, the three-dimensional environment includes the first virtual object and a second virtual object, the second virtual object having a third spatial arrangement relative to the first viewpoint of the user 804b: In response to receiving the first input, the first virtual object has the second spatial arrangement relative to the first viewpoint of the user and the second virtual object has the third spatial arrangement relative to the user 806: The second set of one or more criteria include a criterion that is not satisfied when the first virtual object was last placed or moved in the three-dimensional environment from a viewpoint that satisfies a third set of one or more criteria relative to the first viewpoint of the user 808: The third set of one or more criteria include a criterion that is satisfied when the viewpoint is within a threshold distance of the first viewpoint 810: The third set of one or more criteria include a criterion that is satisfied when the viewpoint has an orientation in the three-dimensional environment that is within a threshold orientation of an orientation of the first viewpoint in the three-dimensional environment

B

FIG. 8B

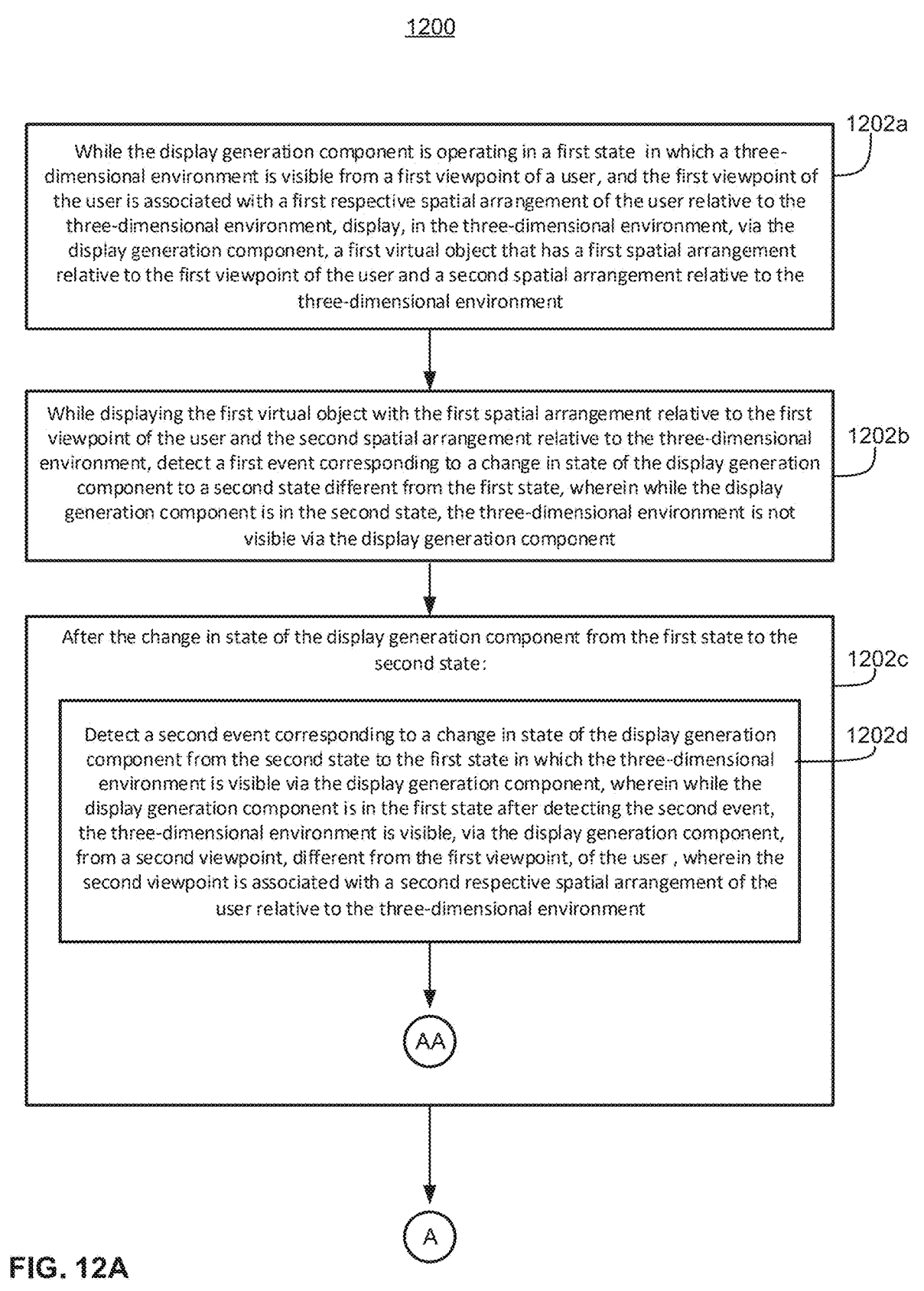

1200

1202a

While the display generation component is operating in a first state in which a three-dimensional environment is visible from a first viewpoint of a user, and the first viewpoint of the user is associated with a first respective spatial arrangement of the user relative to the three-dimensional environment, display, in the three-dimensional environment, via the display generation component, a first virtual object that has a first spatial arrangement relative to the first viewpoint of the user and a second spatial arrangement relative to the three-dimensional environment

↓

1202b

While displaying the first virtual object with the first spatial arrangement relative to the first viewpoint of the user and the second spatial arrangement relative to the three-dimensional environment, detect a first event corresponding to a change in state of the display generation component to a second state different from the first state, wherein while the display generation component is in the second state, the three-dimensional environment is not visible via the display generation component

↓

1202c

After the change in state of the display generation component from the first state to the second state:

1202d

Detect a second event corresponding to a change in state of the display generation component from the second state to the first state in which the three-dimensional environment is visible via the display generation component, wherein while the display generation component is in the first state after detecting the second event, the three-dimensional environment is visible, via the display generation component, from a second viewpoint, different from the first viewpoint, of the user , wherein the second viewpoint is associated with a second respective spatial arrangement of the user relative to the three-dimensional environment

↓

AA

↓

A

FIG. 12A

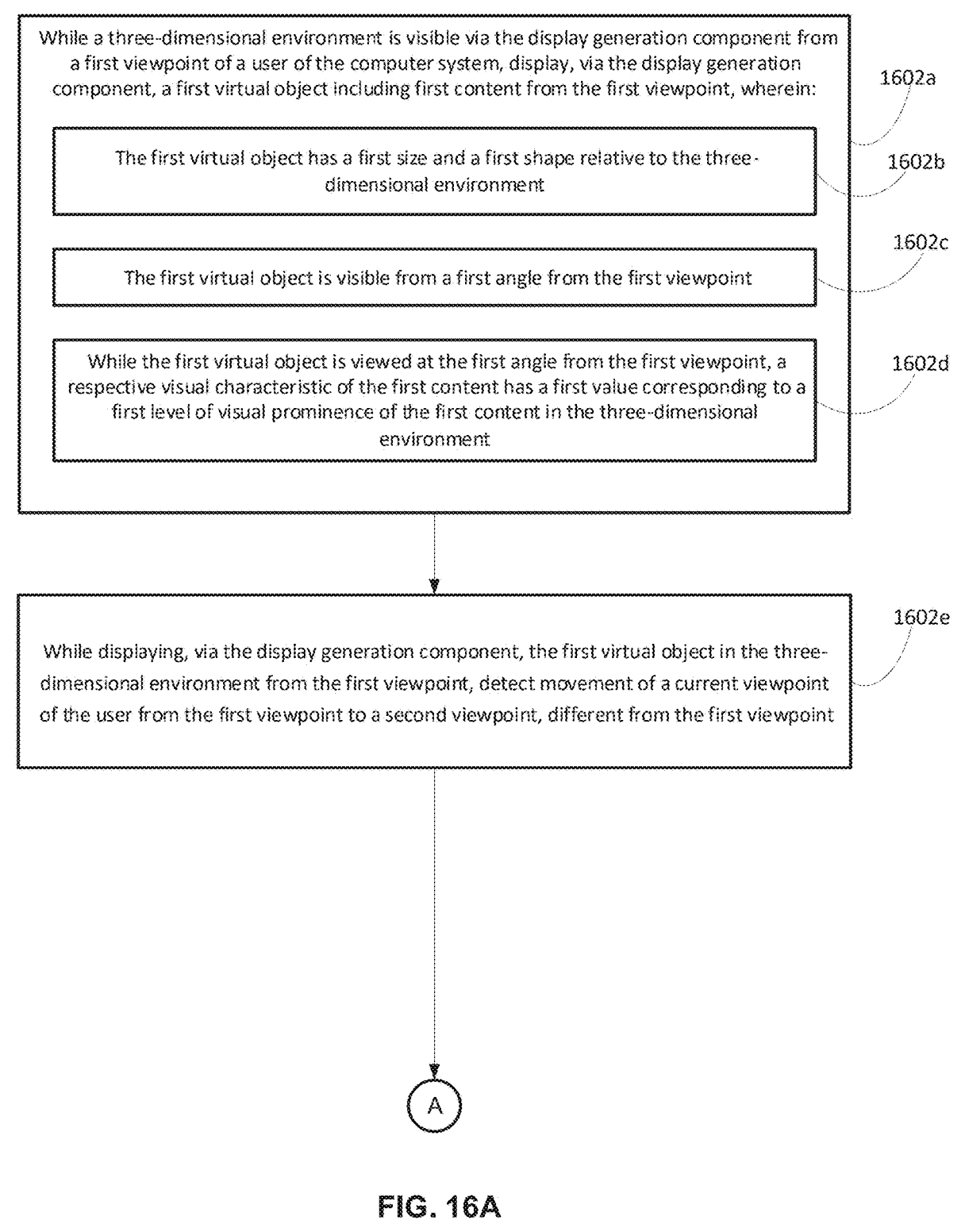

While a three-dimensional environment is visible via the display generation component from a first viewpoint of a user of the computer system, display, via the display generation component, a first virtual object including first content from the first viewpoint, wherein: 1602a The first virtual object has a first size and a first shape relative to the three-dimensional environment 1602b The first virtual object is visible from a first angle from the first viewpoint 1602c While the first virtual object is viewed at the first angle from the first viewpoint, a respective visual characteristic of the first content has a first value corresponding to a first level of visual prominence of the first content in the three-dimensional environment 1602d While displaying, via the display generation component, the first virtual object in the three-dimensional environment from the first viewpoint, detect movement of a current viewpoint of the user from the first viewpoint to a second viewpoint, different from the first viewpoint 1602e

A

FIG. 16A

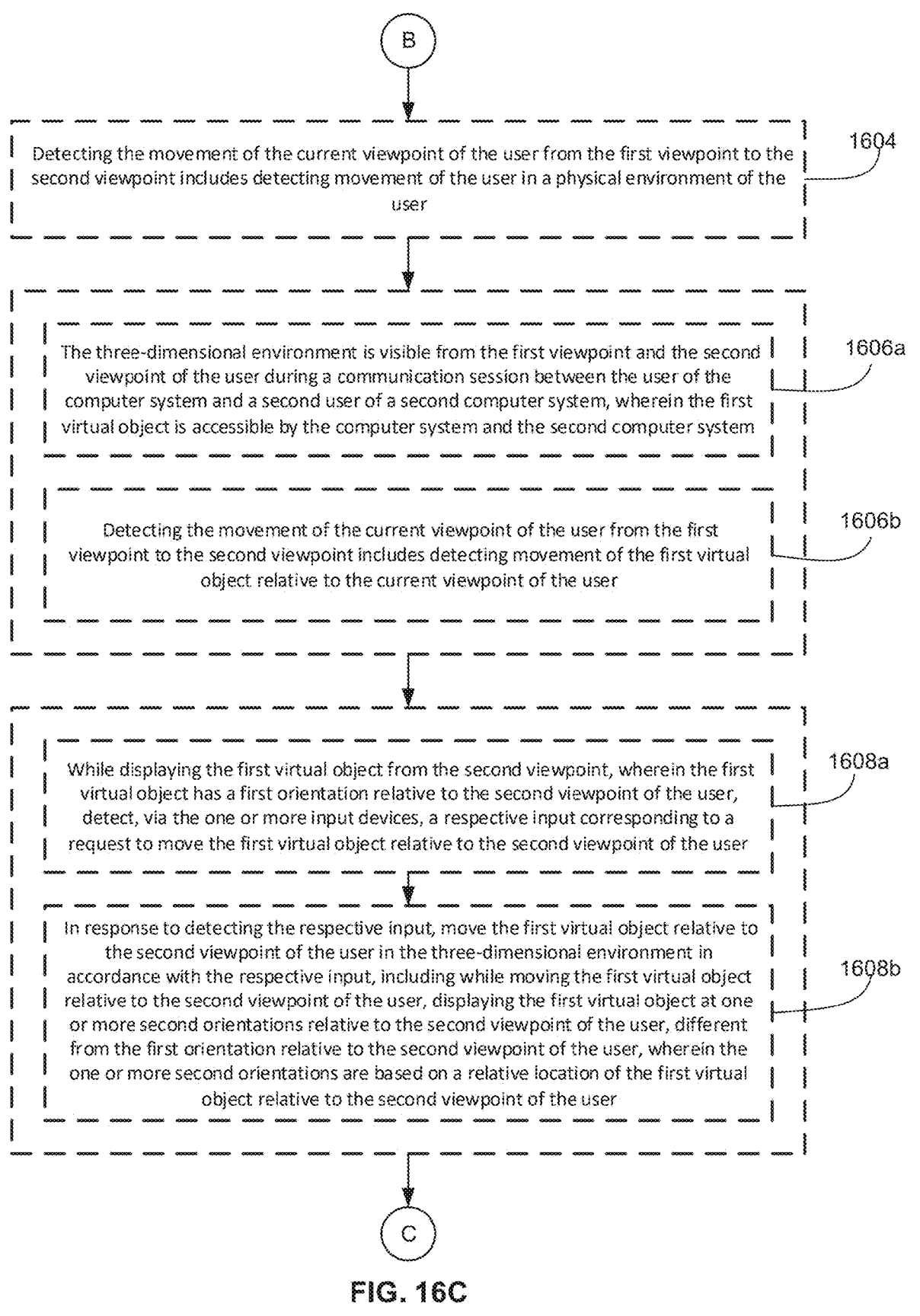

B

1604: Detecting the movement of the current viewpoint of the user from the first viewpoint to the second viewpoint includes detecting movement of the user in a physical environment of the user 1606a: The three-dimensional environment is visible from the first viewpoint and the second viewpoint of the user during a communication session between the user of the computer system and a second user of a second computer system, wherein the first virtual object is accessible by the computer system and the second computer system 1606b: Detecting the movement of the current viewpoint of the user from the first viewpoint to the second viewpoint includes detecting movement of the first virtual object relative to the current viewpoint of the user 1608a: While displaying the first virtual object from the second viewpoint, wherein the first virtual object has a first orientation relative to the second viewpoint of the user, detect, via the one or more input devices, a respective input corresponding to a request to move the first virtual object relative to the second viewpoint of the user 1608b: In response to detecting the respective input, move the first virtual object relative to the second viewpoint of the user in the three-dimensional environment in accordance with the respective input, including while moving the first virtual object relative to the second viewpoint of the user, displaying the first virtual object at one or more second orientations relative to the second viewpoint of the user, different from the first orientation relative to the second viewpoint of the user, wherein the one or more second orientations are based on a relative location of the first virtual object relative to the second viewpoint of the user

C

FIG. 16C

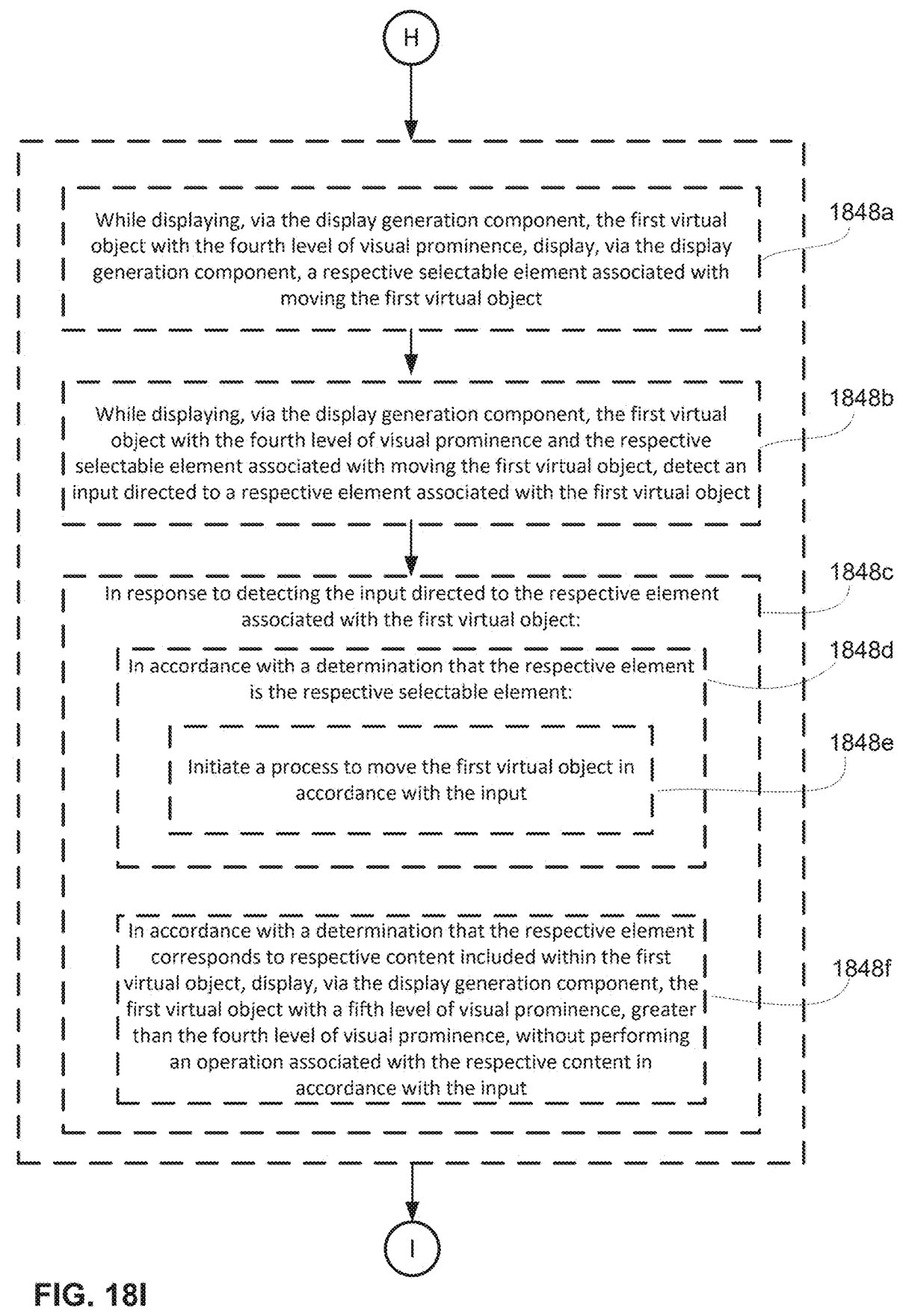

H

1848a: While displaying, via the display generation component, the first virtual object with the fourth level of visual prominence, display, via the display generation component, a respective selectable element associated with moving the first virtual object 1848b: While displaying, via the display generation component, the first virtual object with the fourth level of visual prominence and the respective selectable element associated with moving the first virtual object, detect an input directed to a respective element associated with the first virtual object 1848c: In response to detecting the input directed to the respective element associated with the first virtual object:

1848d: In accordance with a determination that the respective element is the respective selectable element:

1848e: Initiate a process to move the first virtual object in accordance with the input 1848f: In accordance with a determination that the respective element corresponds to respective content included within the first virtual object, display, via the display generation component, the first virtual object with a fifth level of visual prominence, greater than the fourth level of visual prominence, without performing an operation associated with the respective content in accordance with the input

I

FIG. 18I

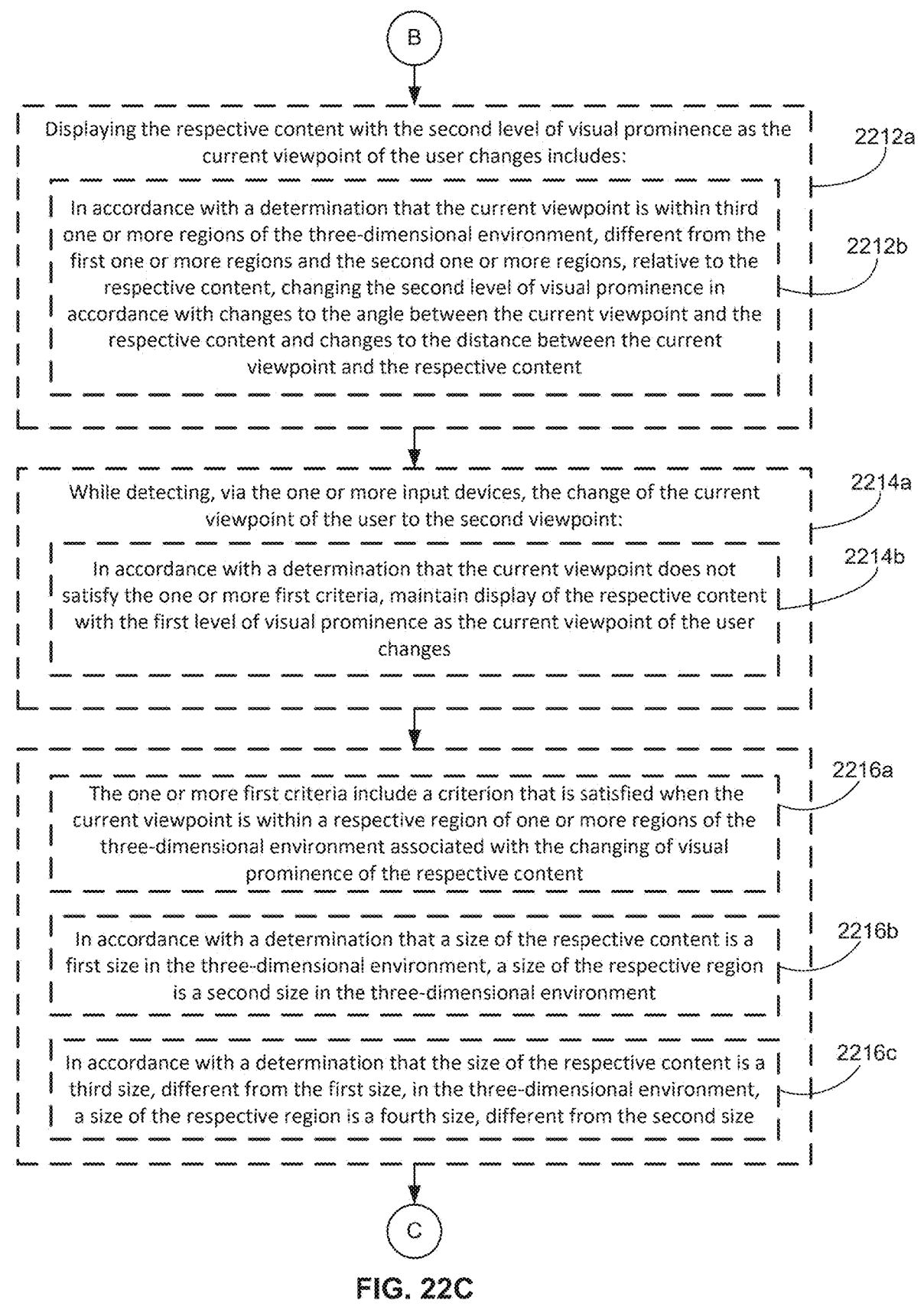

B

2212a: Displaying the respective content with the second level of visual prominence as the current viewpoint of the user changes includes:

2212b: In accordance with a determination that the current viewpoint is within third one or more regions of the three-dimensional environment, different from the first one or more regions and the second one or more regions, relative to the respective content, changing the second level of visual prominence in accordance with changes to the angle between the current viewpoint and the respective content and changes to the distance between the current viewpoint and the respective content 2214a: While detecting, via the one or more input devices, the change of the current viewpoint of the user to the second viewpoint:

2214b: In accordance with a determination that the current viewpoint does not satisfy the one or more first criteria, maintain display of the respective content with the first level of visual prominence as the current viewpoint of the user changes 2216a: The one or more first criteria include a criterion that is satisfied when the current viewpoint is within a respective region of one or more regions of the three-dimensional environment associated with the changing of visual prominence of the respective content 2216b: In accordance with a determination that a size of the respective content is a first size in the three-dimensional environment, a size of the respective region is a second size in the three-dimensional environment 2216c: In accordance with a determination that the size of the respective content is a third size, different from the first size, in the three-dimensional environment, a size of the respective region is a fourth size, different from the second size

C

FIG. 22C

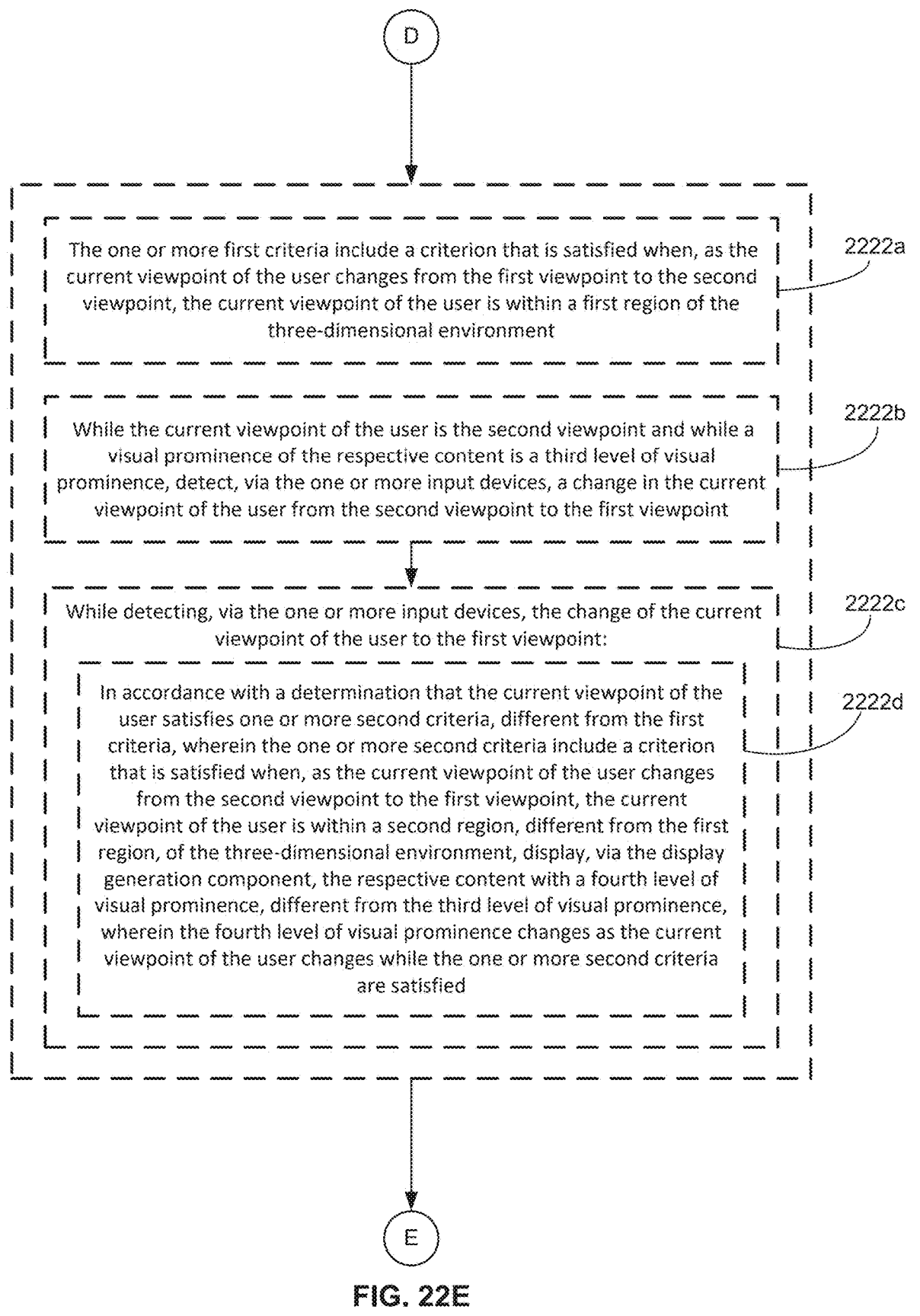

D

2222a: The one or more first criteria include a criterion that is satisfied when, as the current viewpoint of the user changes from the first viewpoint to the second viewpoint, the current viewpoint of the user is within a first region of the three-dimensional environment 2222b: While the current viewpoint of the user is the second viewpoint and while a visual prominence of the respective content is a third level of visual prominence, detect, via the one or more input devices, a change in the current viewpoint of the user from the second viewpoint to the first viewpoint 2222c: While detecting, via the one or more input devices, the change of the current viewpoint of the user to the first viewpoint:

2222d: In accordance with a determination that the current viewpoint of the user satisfies one or more second criteria, different from the first criteria, wherein the one or more second criteria include a criterion that is satisfied when, as the current viewpoint of the user changes from the second viewpoint to the first viewpoint, the current viewpoint of the user is within a second region, different from the first region, of the three-dimensional environment, display, via the display generation component, the respective content with a fourth level of visual prominence, different from the third level of visual prominence, wherein the fourth level of visual prominence changes as the current viewpoint of the user changes while the one or more second criteria are satisfied

E

FIG. 22E

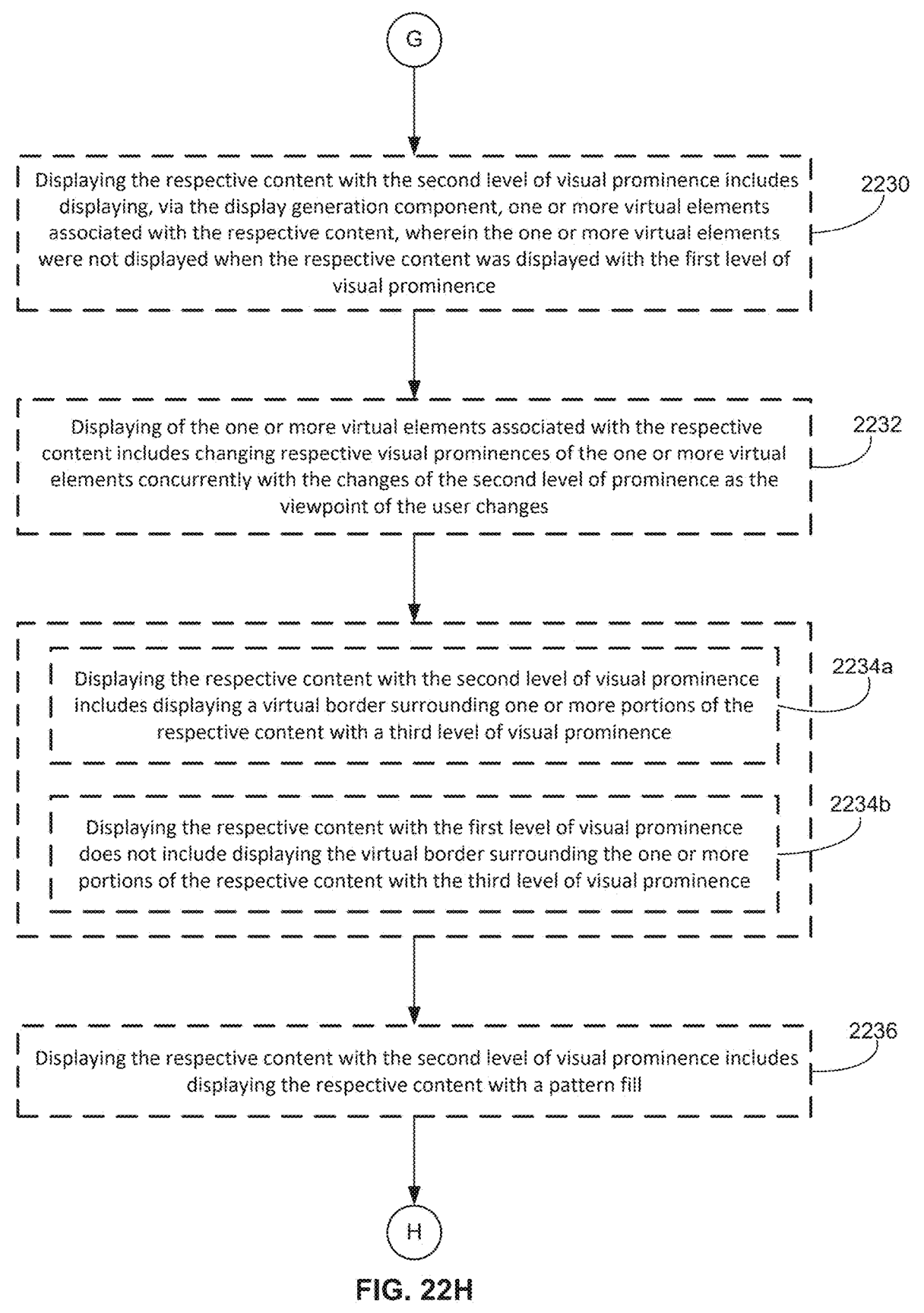

G

Displaying the respective content with the second level of visual prominence includes displaying, via the display generation component, one or more virtual elements associated with the respective content, wherein the one or more virtual elements were not displayed when the respective content was displayed with the first level of visual prominence 2230

Displaying of the one or more virtual elements associated with the respective content includes changing respective visual prominences of the one or more virtual elements concurrently with the changes of the second level of prominence as the viewpoint of the user changes 2232

Displaying the respective content with the second level of visual prominence includes displaying a virtual border surrounding one or more portions of the respective content with a third level of visual prominence 2234a Displaying the respective content with the first level of visual prominence does not include displaying the virtual border surrounding the one or more portions of the respective content with the third level of visual prominence 2234b Displaying the respective content with the second level of visual prominence includes displaying the respective content with a pattern fill 2236

H

FIG. 22H

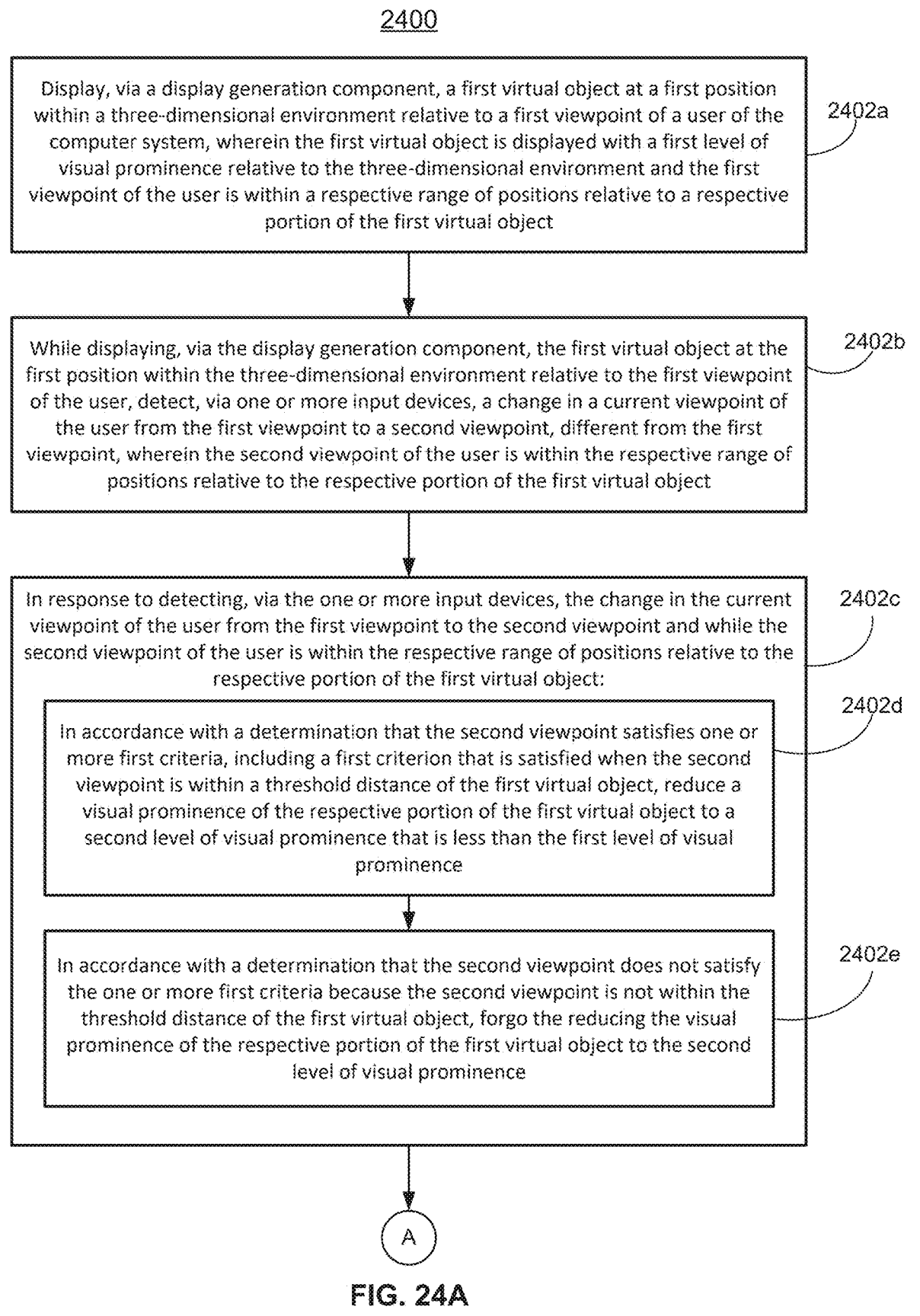

2400

Display, via a display generation component, a first virtual object at a first position within a three-dimensional environment relative to a first viewpoint of a user of the computer system, wherein the first virtual object is displayed with a first level of visual prominence relative to the three-dimensional environment and the first viewpoint of the user is within a respective range of positions relative to a respective portion of the first virtual object (2402a)

While displaying, via the display generation component, the first virtual object at the first position within the three-dimensional environment relative to the first viewpoint of the user, detect, via one or more input devices, a change in a current viewpoint of the user from the first viewpoint to a second viewpoint, different from the first viewpoint, wherein the second viewpoint of the user is within the respective range of positions relative to the respective portion of the first virtual object (2402b)

In response to detecting, via the one or more input devices, the change in the current viewpoint of the user from the first viewpoint to the second viewpoint and while the second viewpoint of the user is within the respective range of positions relative to the respective portion of the first virtual object: (2402c)

In accordance with a determination that the second viewpoint satisfies one or more first criteria, including a first criterion that is satisfied when the second viewpoint is within a threshold distance of the first virtual object, reduce a visual prominence of the respective portion of the first virtual object to a second level of visual prominence that is less than the first level of visual prominence (2402d)

In accordance with a determination that the second viewpoint does not satisfy the one or more first criteria because the second viewpoint is not within the threshold distance of the first virtual object, forgo the reducing the visual prominence of the respective portion of the first virtual object to the second level of visual prominence (2402e)

A

FIG. 24A

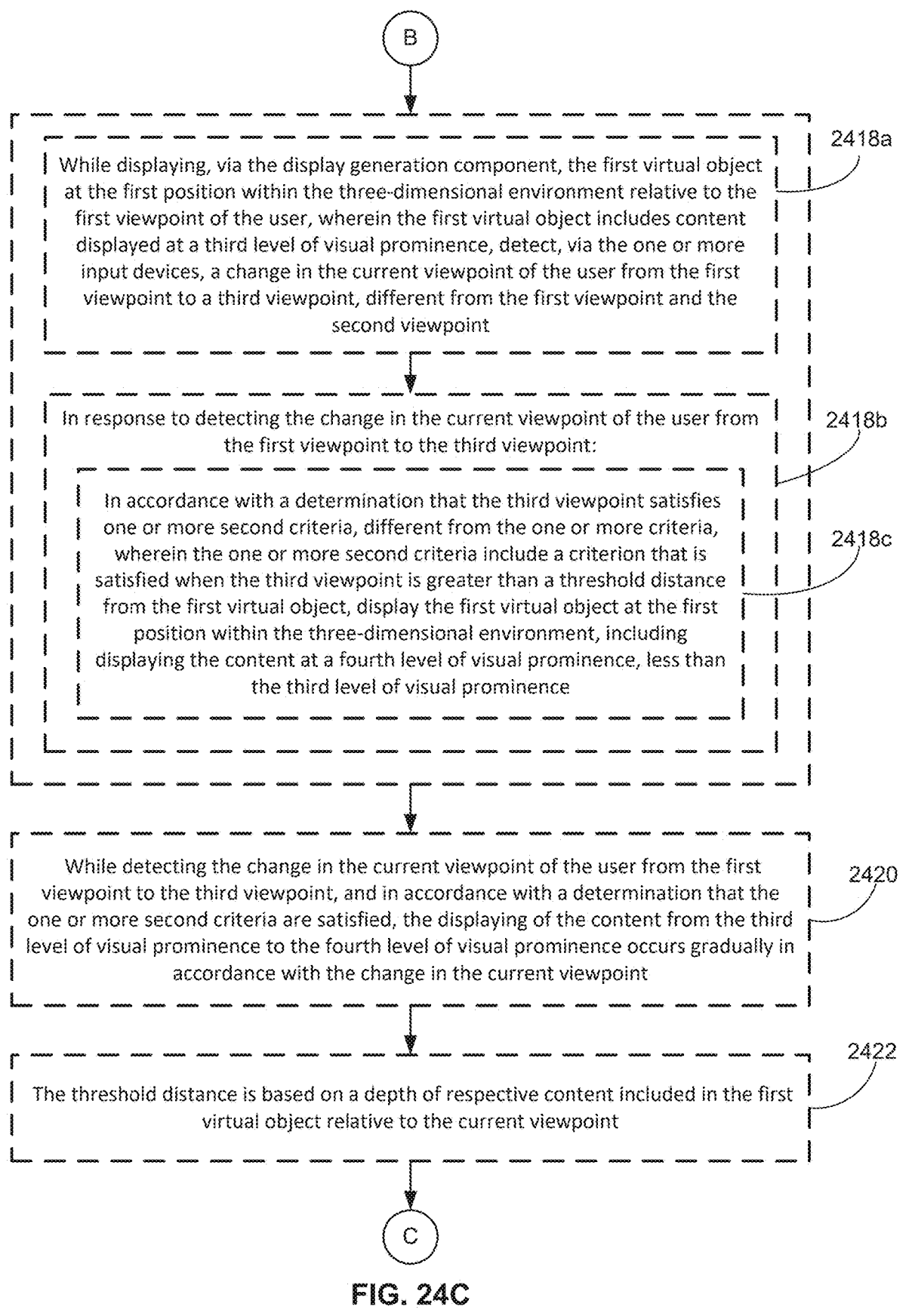

B

2418a
While displaying, via the display generation component, the first virtual object at the first position within the three-dimensional environment relative to the first viewpoint of the user, wherein the first virtual object includes content displayed at a third level of visual prominence, detect, via the one or more input devices, a change in the current viewpoint of the user from the first viewpoint to a third viewpoint, different from the first viewpoint and the second viewpoint 2418b
In response to detecting the change in the current viewpoint of the user from the first viewpoint to the third viewpoint:

2418c
In accordance with a determination that the third viewpoint satisfies one or more second criteria, different from the one or more criteria, wherein the one or more second criteria include a criterion that is satisfied when the third viewpoint is greater than a threshold distance from the first virtual object, display the first virtual object at the first position within the three-dimensional environment, including displaying the content at a fourth level of visual prominence, less than the third level of visual prominence 2420
While detecting the change in the current viewpoint of the user from the first viewpoint to the third viewpoint, and in accordance with a determination that the one or more second criteria are satisfied, the displaying of the content from the third level of visual prominence to the fourth level of visual prominence occurs gradually in accordance with the change in the current viewpoint 2422
The threshold distance is based on a depth of respective content included in the first virtual object relative to the current viewpoint

C

FIG. 24C

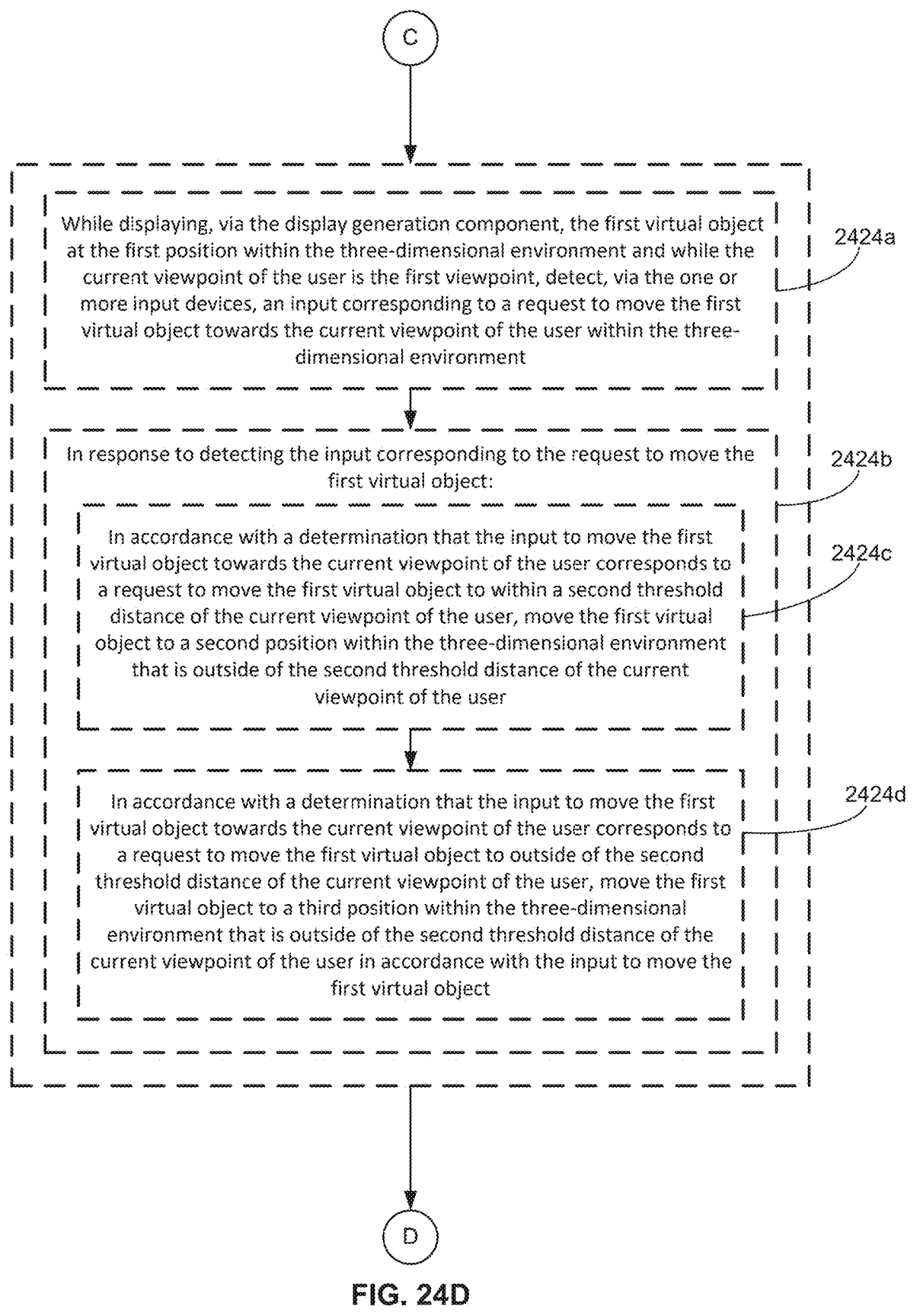

C

2424a
While displaying, via the display generation component, the first virtual object at the first position within the three-dimensional environment and while the current viewpoint of the user is the first viewpoint, detect, via the one or more input devices, an input corresponding to a request to move the first virtual object towards the current viewpoint of the user within the three-dimensional environment 2424b
In response to detecting the input corresponding to the request to move the first virtual object:

2424c
In accordance with a determination that the input to move the first virtual object towards the current viewpoint of the user corresponds to a request to move the first virtual object to within a second threshold distance of the current viewpoint of the user, move the first virtual object to a second position within the three-dimensional environment that is outside of the second threshold distance of the current viewpoint of the user 2424d
In accordance with a determination that the input to move the first virtual object towards the current viewpoint of the user corresponds to a request to move the first virtual object to outside of the second threshold distance of the current viewpoint of the user, move the first virtual object to a third position within the three-dimensional environment that is outside of the second threshold distance of the current viewpoint of the user in accordance with the input to move the first virtual object

D

FIG. 24D

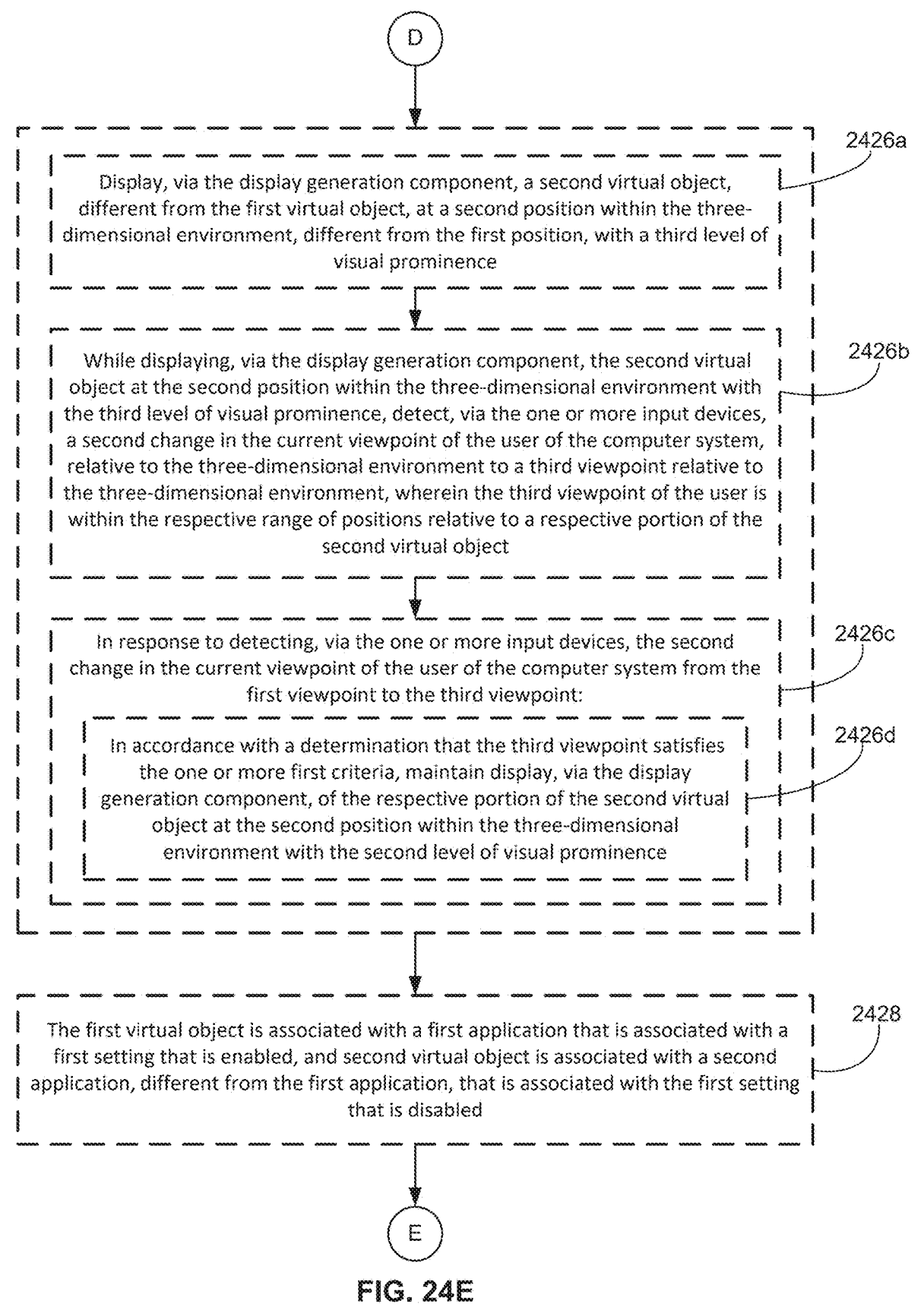

D

2426a: Display, via the display generation component, a second virtual object, different from the first virtual object, at a second position within the three-dimensional environment, different from the first position, with a third level of visual prominence 2426b: While displaying, via the display generation component, the second virtual object at the second position within the three-dimensional environment with the third level of visual prominence, detect, via the one or more input devices, a second change in the current viewpoint of the user of the computer system, relative to the three-dimensional environment to a third viewpoint relative to the three-dimensional environment, wherein the third viewpoint of the user is within the respective range of positions relative to a respective portion of the second virtual object 2426c: In response to detecting, via the one or more input devices, the second change in the current viewpoint of the user of the computer system from the first viewpoint to the third viewpoint:

2426d: In accordance with a determination that the third viewpoint satisfies the one or more first criteria, maintain display, via the display generation component, of the respective portion of the second virtual object at the second position within the three-dimensional environment with the second level of visual prominence 2428: The first virtual object is associated with a first application that is associated with a first setting that is enabled, and second virtual object is associated with a second application, different from the first application, that is associated with the first setting that is disabled

E

FIG. 24E

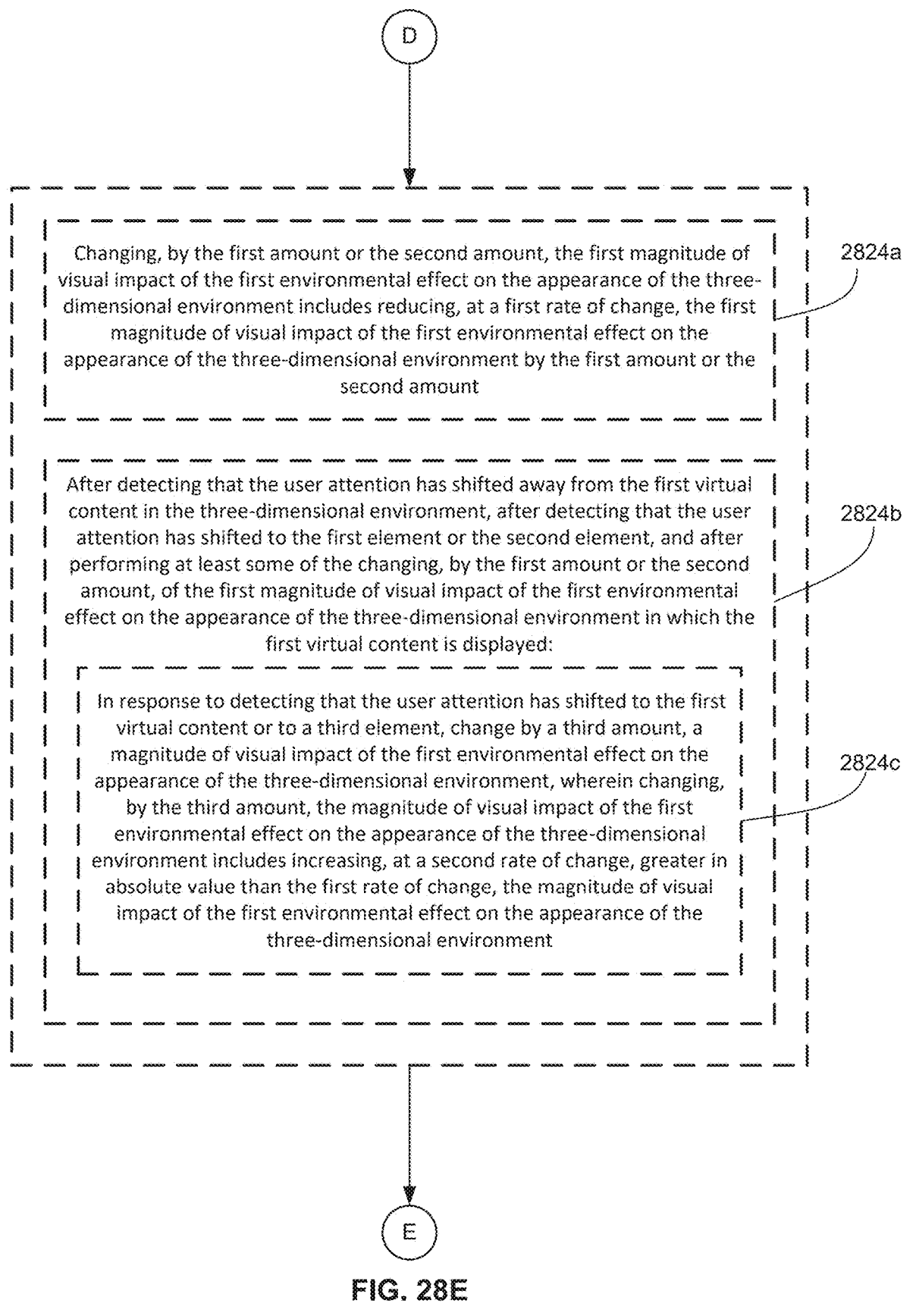

D

2824a
Changing, by the first amount or the second amount, the first magnitude of visual impact of the first environmental effect on the appearance of the three-dimensional environment includes reducing, at a first rate of change, the first magnitude of visual impact of the first environmental effect on the appearance of the three-dimensional environment by the first amount or the second amount 2824b
After detecting that the user attention has shifted away from the first virtual content in the three-dimensional environment, after detecting that the user attention has shifted to the first element or the second element, and after performing at least some of the changing, by the first amount or the second amount, of the first magnitude of visual impact of the first environmental effect on the appearance of the three-dimensional environment in which the first virtual content is displayed:

2824c
In response to detecting that the user attention has shifted to the first virtual content or to a third element, change by a third amount, a magnitude of visual impact of the first environmental effect on the appearance of the three-dimensional environment, wherein changing, by the third amount, the magnitude of visual impact of the first environmental effect on the appearance of the three-dimensional environment includes increasing, at a second rate of change, greater in absolute value than the first rate of change, the magnitude of visual impact of the first environmental effect on the appearance of the three-dimensional environment

E

FIG. 28E

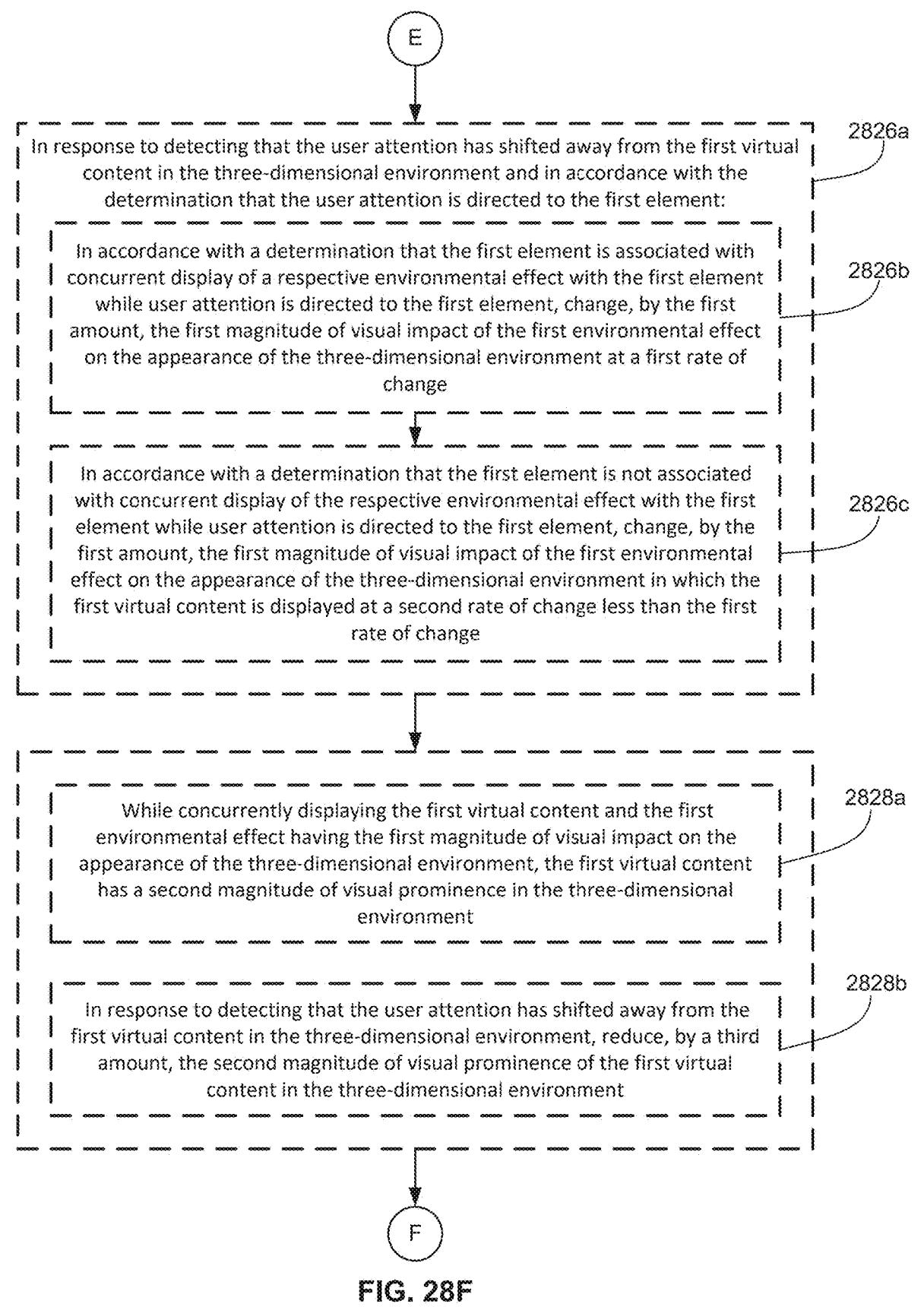

E

2826a
In response to detecting that the user attention has shifted away from the first virtual content in the three-dimensional environment and in accordance with the determination that the user attention is directed to the first element:

2826b
In accordance with a determination that the first element is associated with concurrent display of a respective environmental effect with the first element while user attention is directed to the first element, change, by the first amount, the first magnitude of visual impact of the first environmental effect on the appearance of the three-dimensional environment at a first rate of change 2826c
In accordance with a determination that the first element is not associated with concurrent display of the respective environmental effect with the first element while user attention is directed to the first element, change, by the first amount, the first magnitude of visual impact of the first environmental effect on the appearance of the three-dimensional environment in which the first virtual content is displayed at a second rate of change less than the first rate of change 2828a
While concurrently displaying the first virtual content and the first environmental effect having the first magnitude of visual impact on the appearance of the three-dimensional environment, the first virtual content has a second magnitude of visual prominence in the three-dimensional environment 2828b
In response to detecting that the user attention has shifted away from the first virtual content in the three-dimensional environment, reduce, by a third amount, the second magnitude of visual prominence of the first virtual content in the three-dimensional environment

F

FIG. 28F

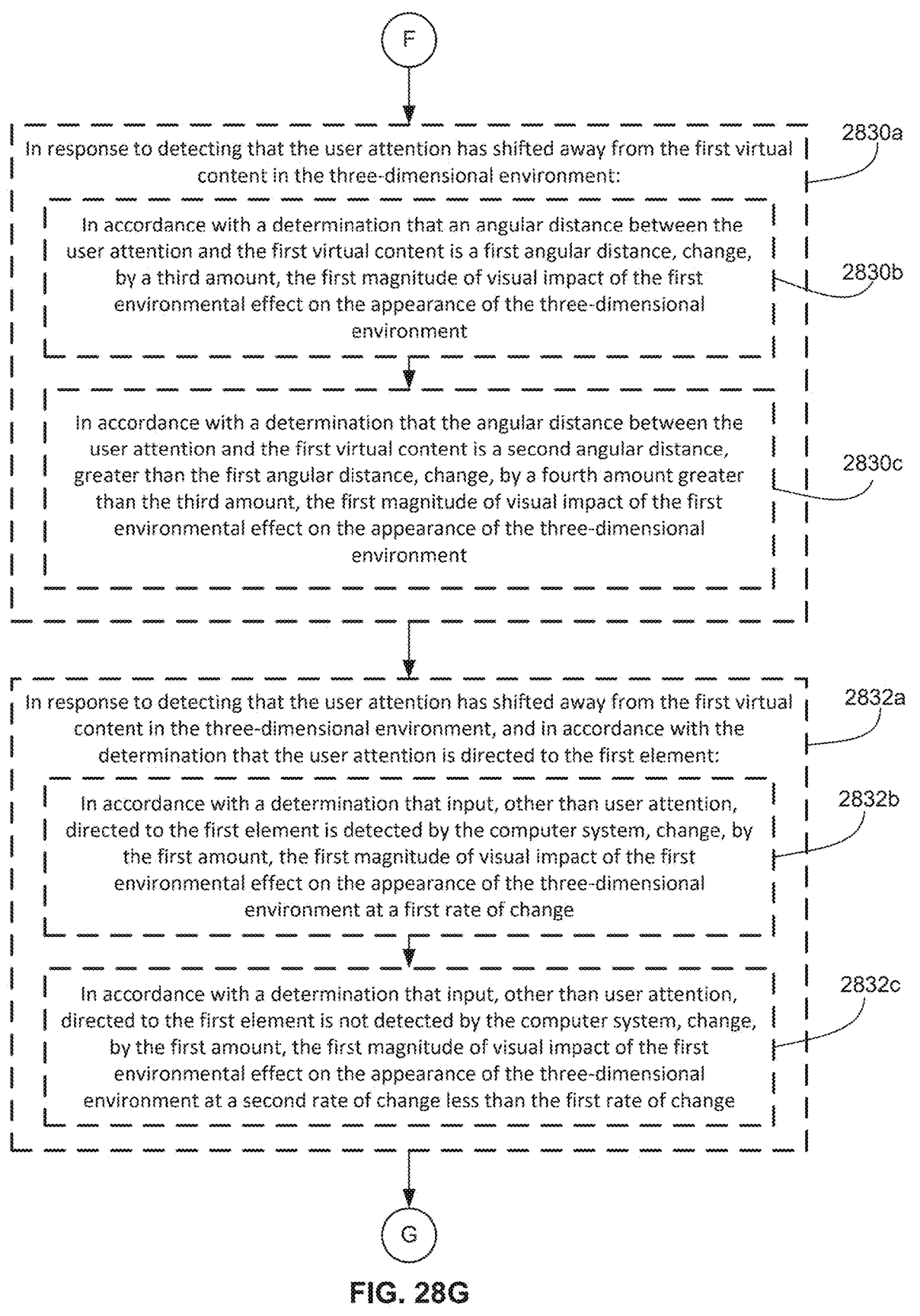

F

2830a In response to detecting that the user attention has shifted away from the first virtual content in the three-dimensional environment:

2830b In accordance with a determination that an angular distance between the user attention and the first virtual content is a first angular distance, change, by a third amount, the first magnitude of visual impact of the first environmental effect on the appearance of the three-dimensional environment 2830c In accordance with a determination that the angular distance between the user attention and the first virtual content is a second angular distance, greater than the first angular distance, change, by a fourth amount greater than the third amount, the first magnitude of visual impact of the first environmental effect on the appearance of the three-dimensional environment 2832a In response to detecting that the user attention has shifted away from the first virtual content in the three-dimensional environment, and in accordance with the determination that the user attention is directed to the first element:

2832b In accordance with a determination that input, other than user attention, directed to the first element is detected by the computer system, change, by the first amount, the first magnitude of visual impact of the first environmental effect on the appearance of the three-dimensional environment at a first rate of change 2832c In accordance with a determination that input, other than user attention, directed to the first element is not detected by the computer system, change, by the first amount, the first magnitude of visual impact of the first environmental effect on the appearance of the three-dimensional environment at a second rate of change less than the first rate of change

G

FIG. 28G

METHODS FOR DISPLAYING AND REPOSITIONING OBJECTS IN AN ENVIRONMENT

CROSS-REFERENCE TO RELATED APPLICATIONS

This application claims the benefit of U.S. Provisional Application No. 63/301,020, filed Jan. 19, 2022, U.S. Provisional Application No. 63/377,002, filed Sep. 23, 2022, and U.S. Provisional Application No. 63/480,494, filed Jan. 18, 2023, the contents of which are incorporated herein by reference in their entireties for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system selectively recenters virtual content to a viewpoint of a user. In some embodiments, a computer system recenters one or more virtual objects in the presence of physical or virtual obstacles. In some embodiments, a computer system selectively automatically recenters one or more virtual objects in response to the display generation component changing state. In some embodiments, a computer system selectively recenters content associated with a communication session between multiple users in response to an input detected at the computer system. In some embodiments, a computer system changes the visual prominence of content included in virtual objects based on viewpoint. In some embodiments, a computer system modifies visual prominence of one or more virtual objects based on a detected attention of a user. In some embodiments, a computer system modifies visual prominence of one or more virtual objects to resolve apparent obscuring of the one or more virtual objects. In some embodiments, a computer system modifies visual prominence of one or more virtual objects gradually in accordance with a determination that a viewpoint of a user corresponds to different regions of the three-dimensional environment. In some embodiments, a computer system modifies visual prominence of one or more portions of a virtual object when a viewpoint of a user is in proximity to the virtual object. In some embodiments, a computer system modifies visual prominence of a virtual object when one or more concurrent types of user interaction are detected. In some embodiments, a computer system changes an amount of visual impact of an environmental effect on a three-dimensional environment in which virtual content is displayed in response to detecting input(s) (e.g., user attention) shifting to different elements in the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8I is a flowchart illustrating an exemplary method of selectively recentering virtual content to a viewpoint of a user in accordance with some embodiments.

FIGS. 12A-12E is a flowchart illustrating a method of selectively automatically recentering one or more virtual objects in response to the display generation component changing state in accordance with some embodiments.

FIGS. 18A-18K is a flowchart illustrating a method of modifying visual prominence of virtual objects based on attention of a user in accordance with some embodiments.

FIGS. 22A-22J is a flowchart illustrating a method of gradually modifying visual prominence of respective virtual objects in accordance with changes in viewpoint of a user in accordance with some embodiments.

FIGS. 24A-24F is a flowchart illustrating a method of modifying visual prominence of respective virtual objects based on proximity of a user to the respective virtual objects in accordance with some embodiments.

FIG. 28A-28I is a flowchart illustrating a method of dynamically displaying environmental effects with different amounts of visual impact on an appearance of a three-dimensional environment in which virtual content is displayed in response to detecting inputs (e.g., user attention) shifting to different elements in the three-dimensional environment in accordance with some embodiments.

DESCRIPTION OF EMBODIMENTS

Figure 1:
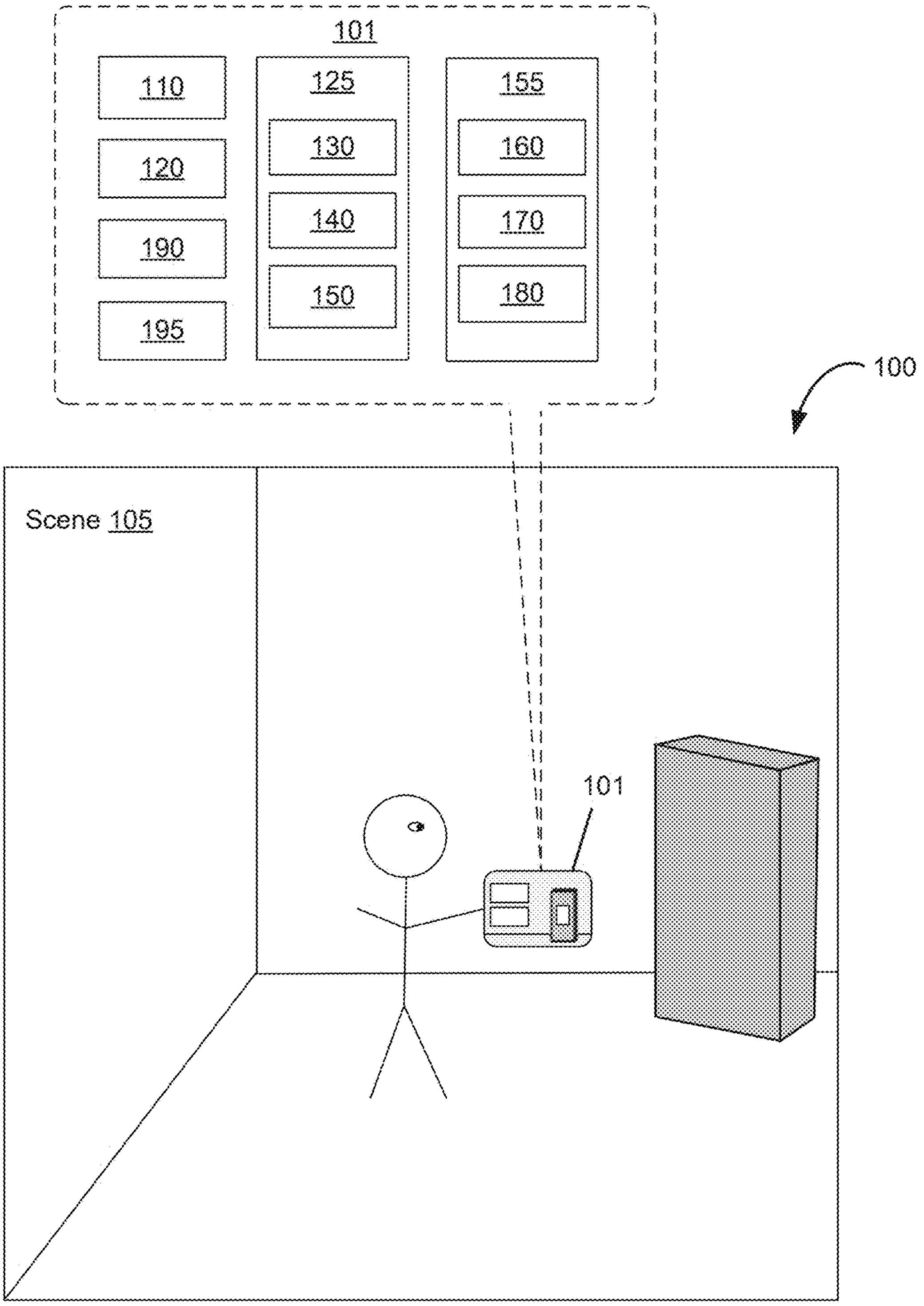
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein provide improved ways for an electronic device to facilitate interaction with and manipulate objects in a three-dimensional environment.

In some embodiments, a computer system displays virtual objects in an environment. In some embodiments, in response to an input to recenter virtual objects to a viewpoint of the user, the computer system recenters those virtual objects that meet certain criteria and does not recenter those virtual objects that do not meet such criteria. In some embodiments, virtual objects that are snapped to portions of the physical environment are not recentered. In some embodiments, virtual objects that were last placed or moved in the environment from the current viewpoint of the user are not recentered.

In some embodiments, a computer system displays virtual objects in an environment. In some embodiments, in response to an input to recenter virtual objects to a viewpoint of the user, the computer system avoids physical objects when recentering those virtual objects. In some embodiments, the computer system avoid virtual objects when recentering other virtual objects.

In some embodiments, a computer system displays virtual objects in an environment from a first viewpoint. In some embodiments, when a state of the computer system changes (e.g., from being turned on to being turned off, and then being turned on again), the computer system automatically recenters virtual objects to a new viewpoint depending on one or more characteristics of the new viewpoint. In some embodiments, the computer system does not automatically recenter the virtual objects to the new viewpoint.

In some embodiments, a computer system displays virtual objects in an environment where the virtual objects are accessible to a plurality of computer systems. In some embodiments, in response to an input to recenter virtual objects to a viewpoint of the user, the computer system does not alter the spatial arrangement of virtual objects accessible to a plurality of computer systems relative to viewpoints associated with those plurality of computer systems. In some embodiments, the computer system does alter the spatial arrangement of virtual objects not accessible to other computer systems relative to the viewpoint associated with the present computer system.

In some embodiments, a computer system displays virtual objects that include content in an environment. In some embodiments, the computer system displays the content with different visual prominence depending on the angle from which the content is visible from the current viewpoint of the user. In some embodiments, the visual prominence is greater the closer the angle is to head-on, and the visual prominence is less the further the angle is from head-on. In some embodiments, a computer system modifies visual prominence of one or more virtual objects based on a detected attention of a user. In some embodiments, a computer system modifies visual prominence of one or more virtual objects to resolve apparent obscuring of the one or more virtual objects.

Figure 9A:
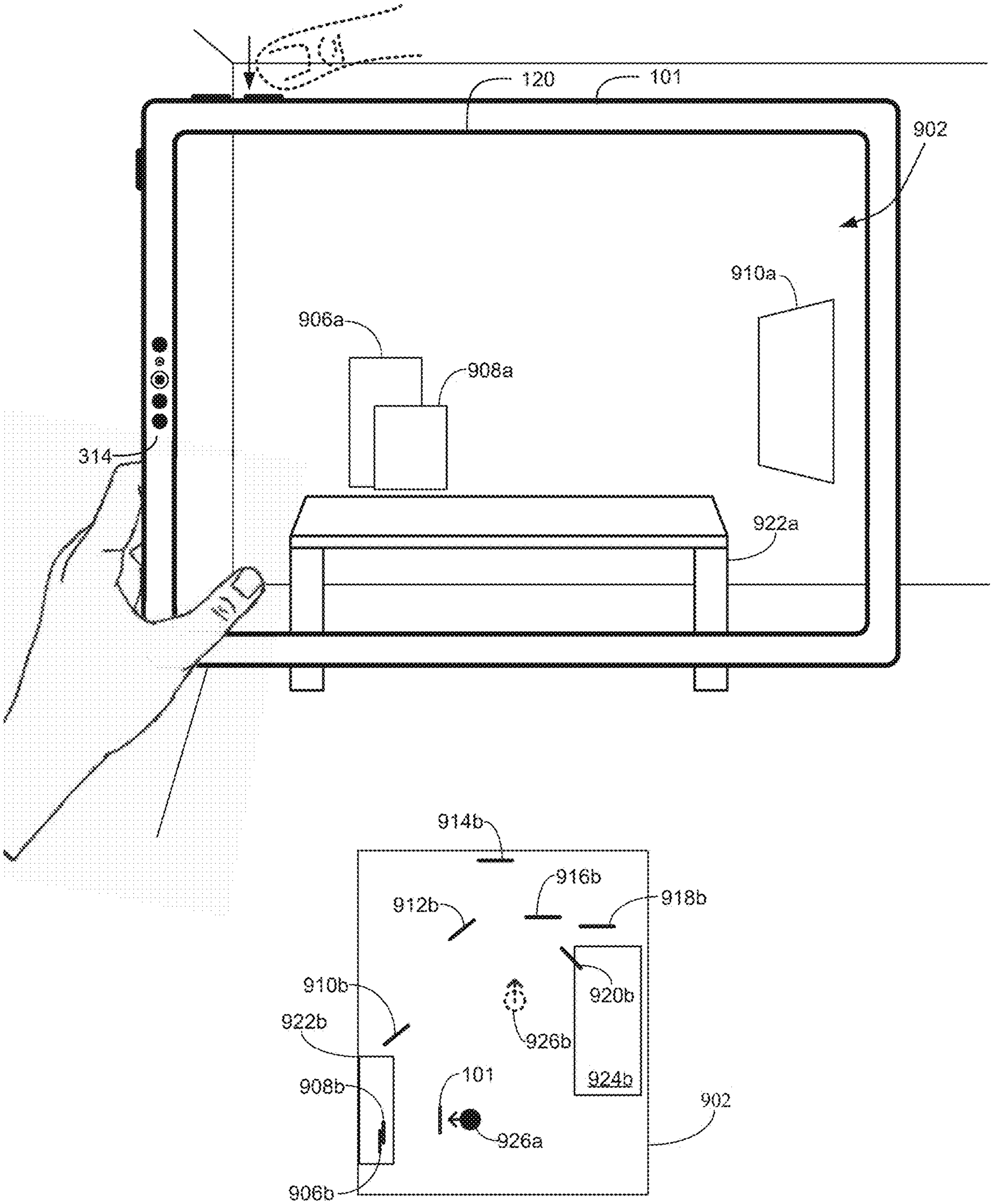
FIGS. 9A-9C illustrate examples of a computer system recentering one or more virtual objects in the presence of physical or virtual obstacles in accordance with some embodiments.
Figure 9B:
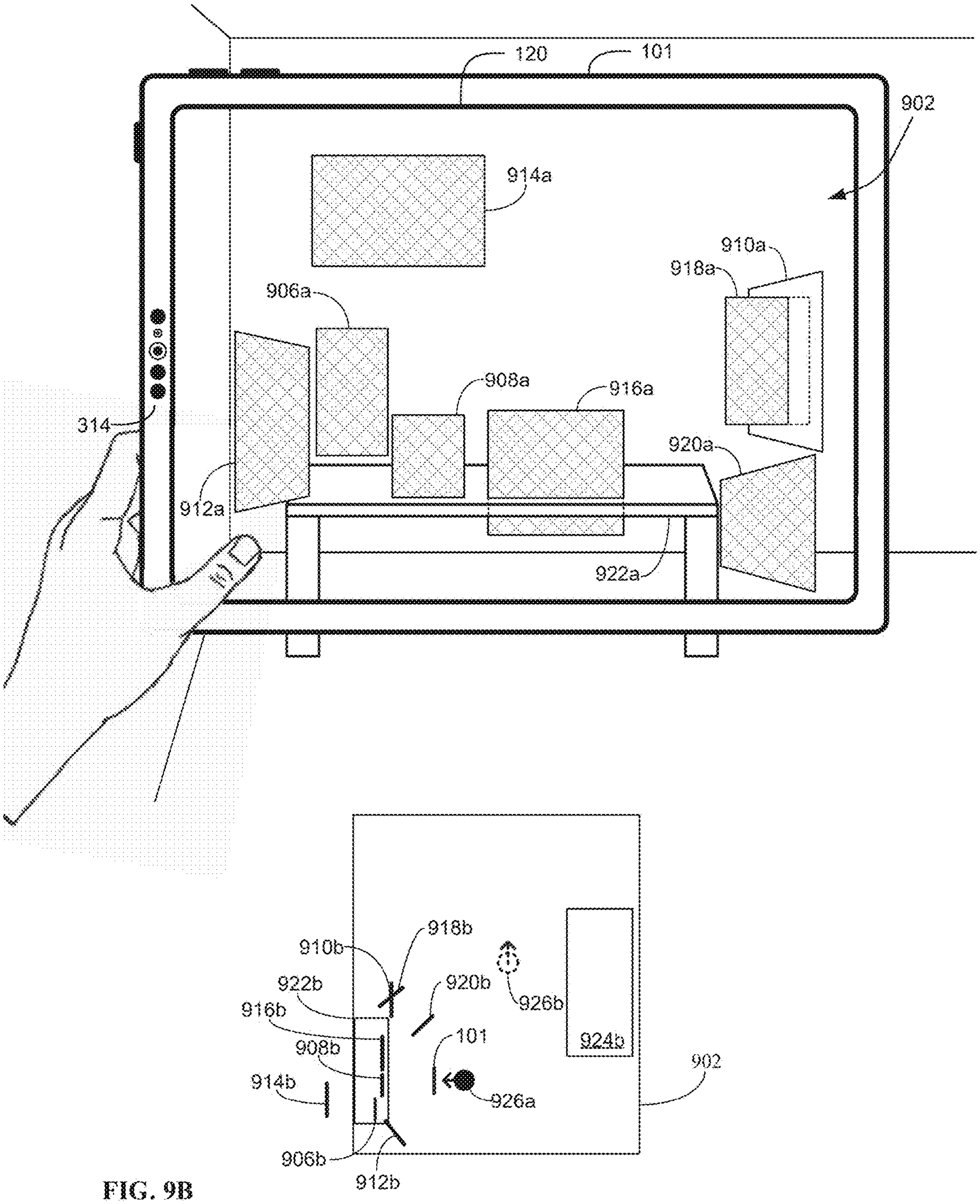
Figure 9C:
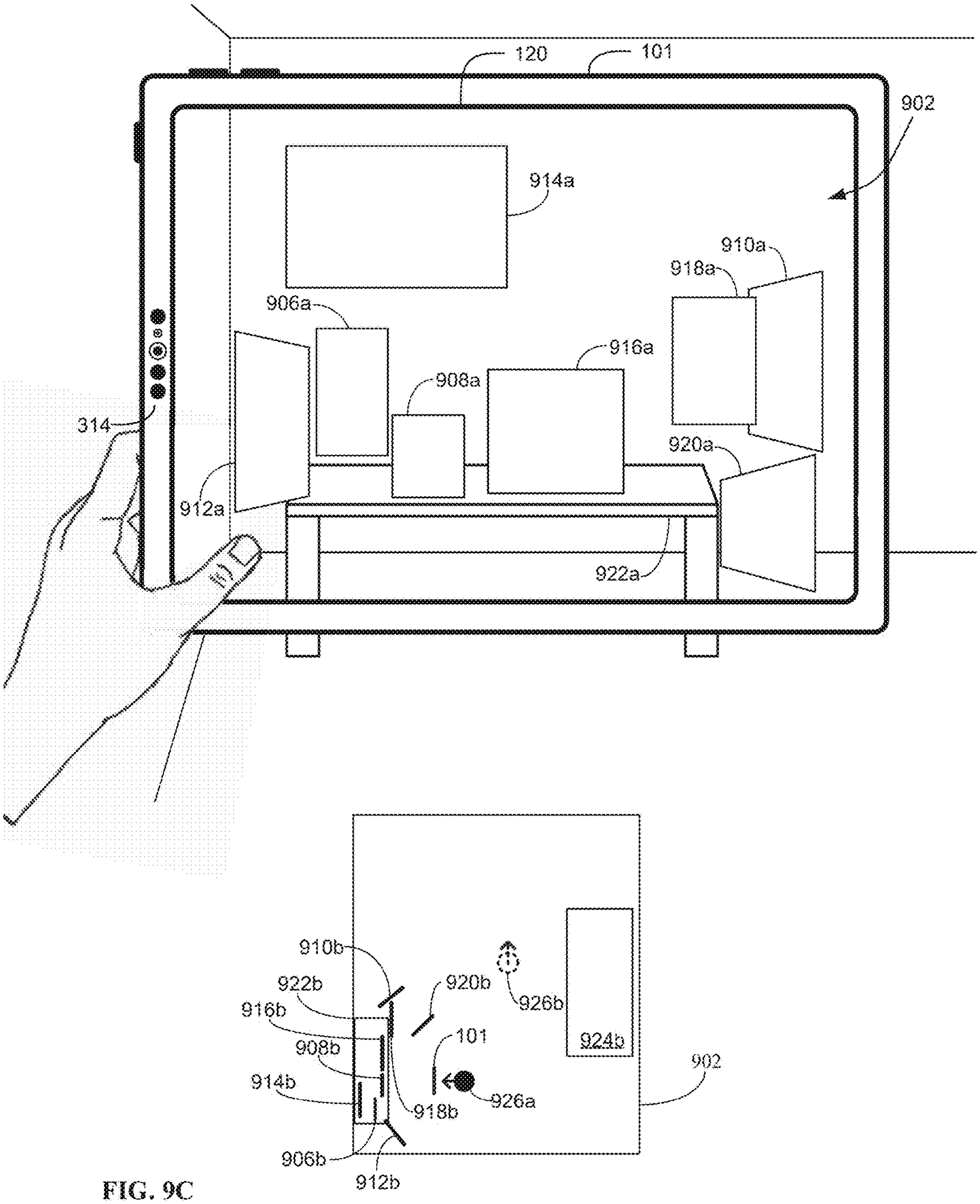
Figure 10A:
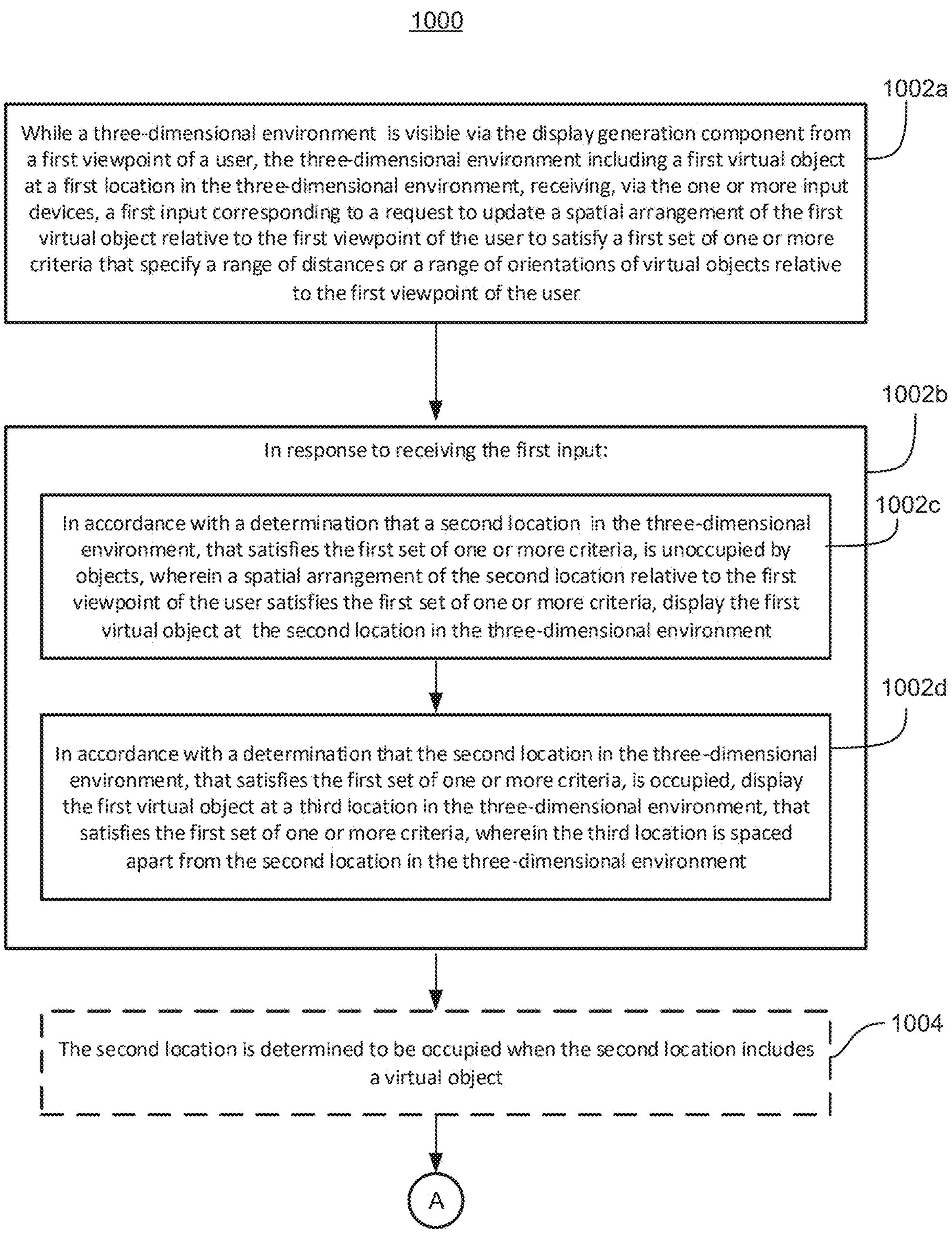
FIGS. 10A-10G is a flowchart illustrating a method of recentering one or more virtual objects in the presence of physical or virtual obstacles in accordance with some embodiments.
Figure 10B:
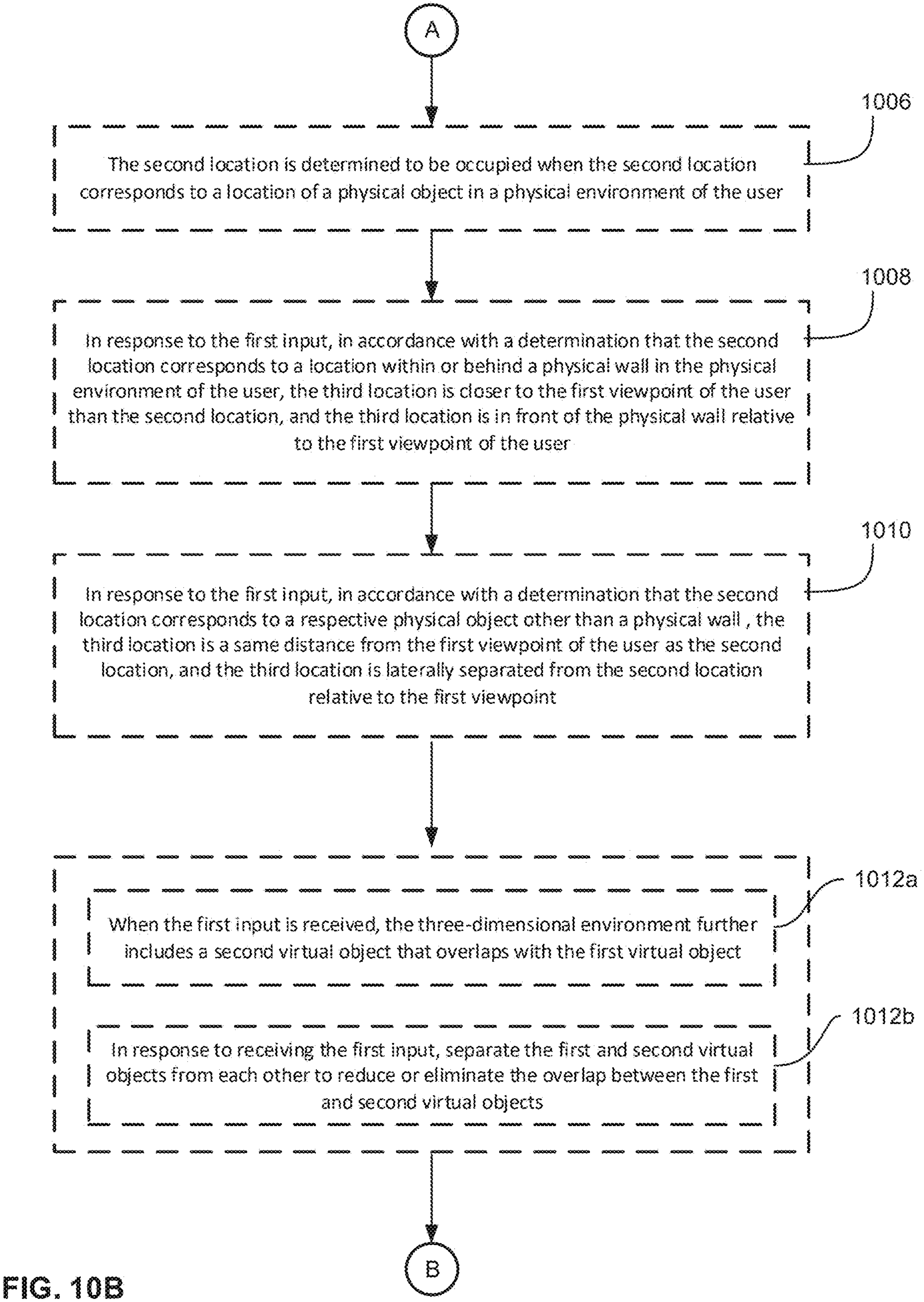
Figure 10C:
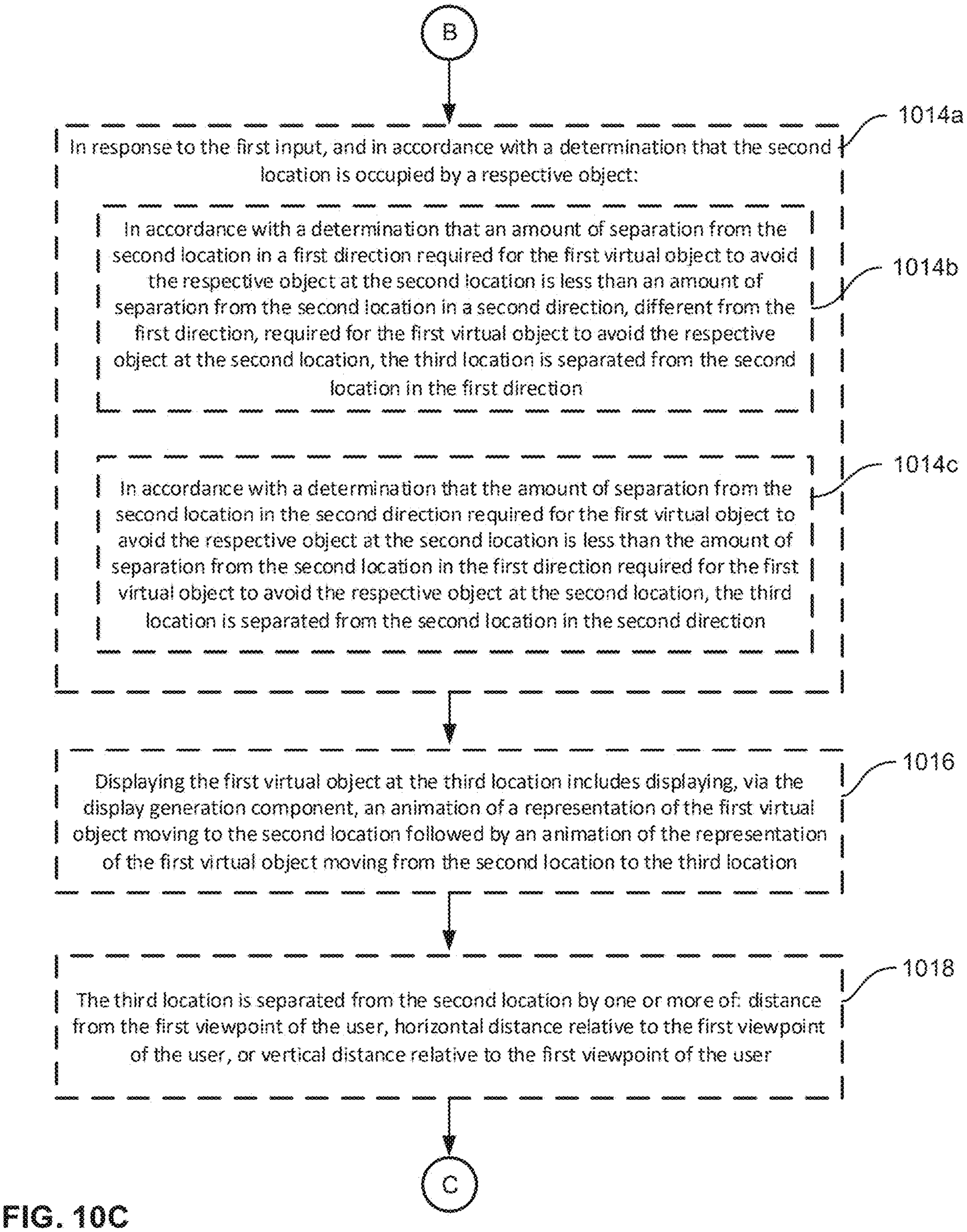
Figure 10D:
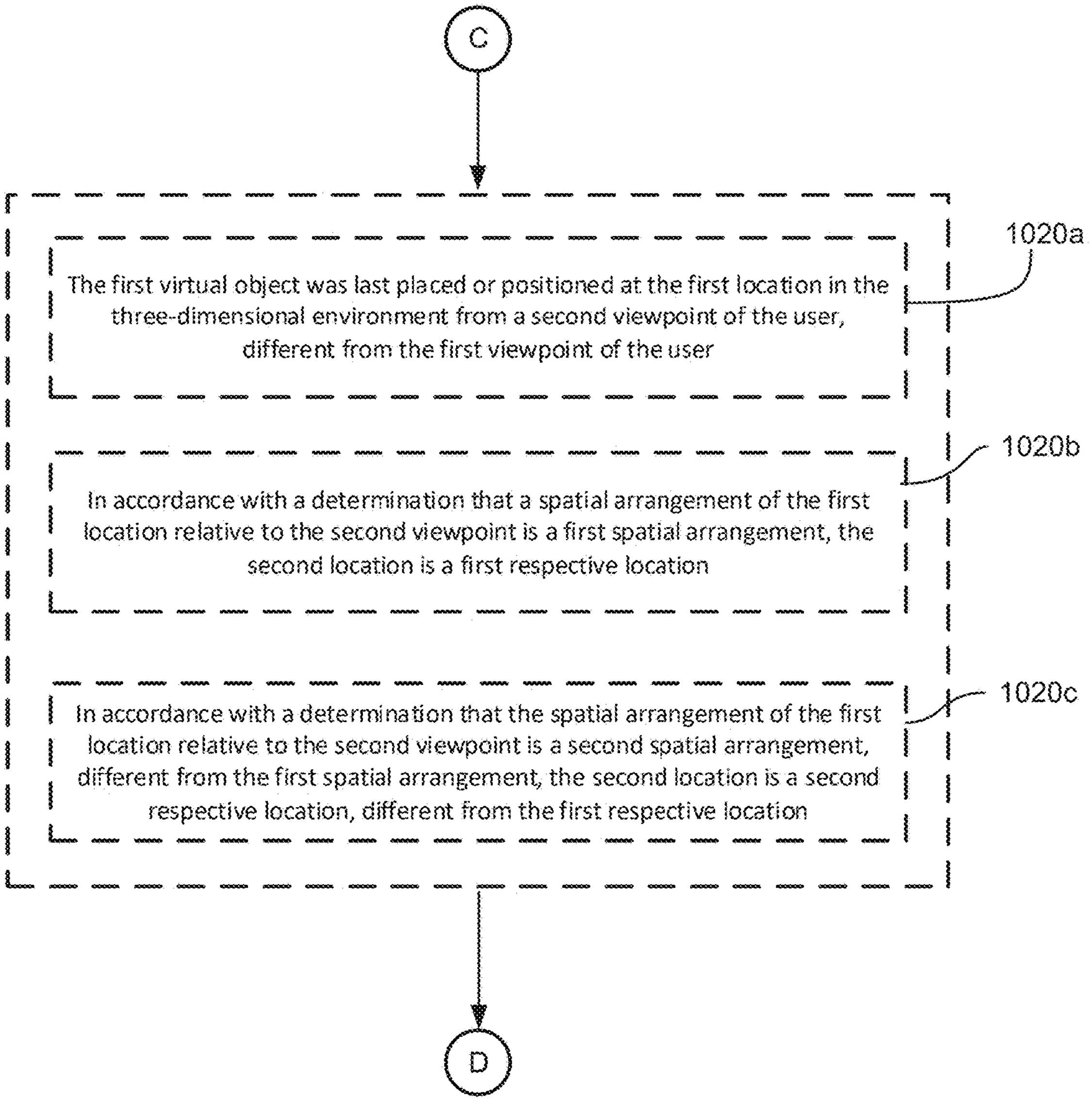
Figure 10E:
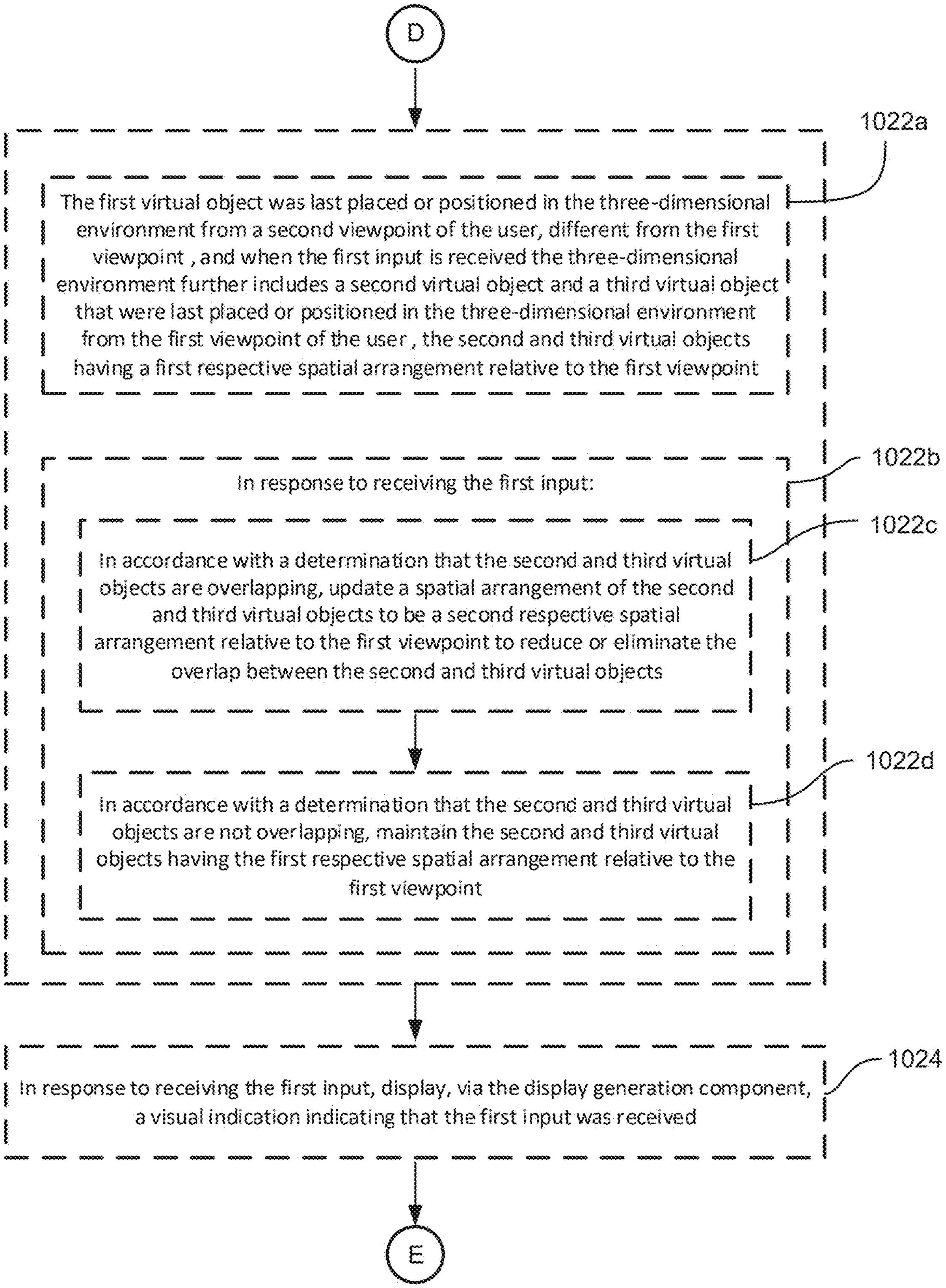
Figure 10F:
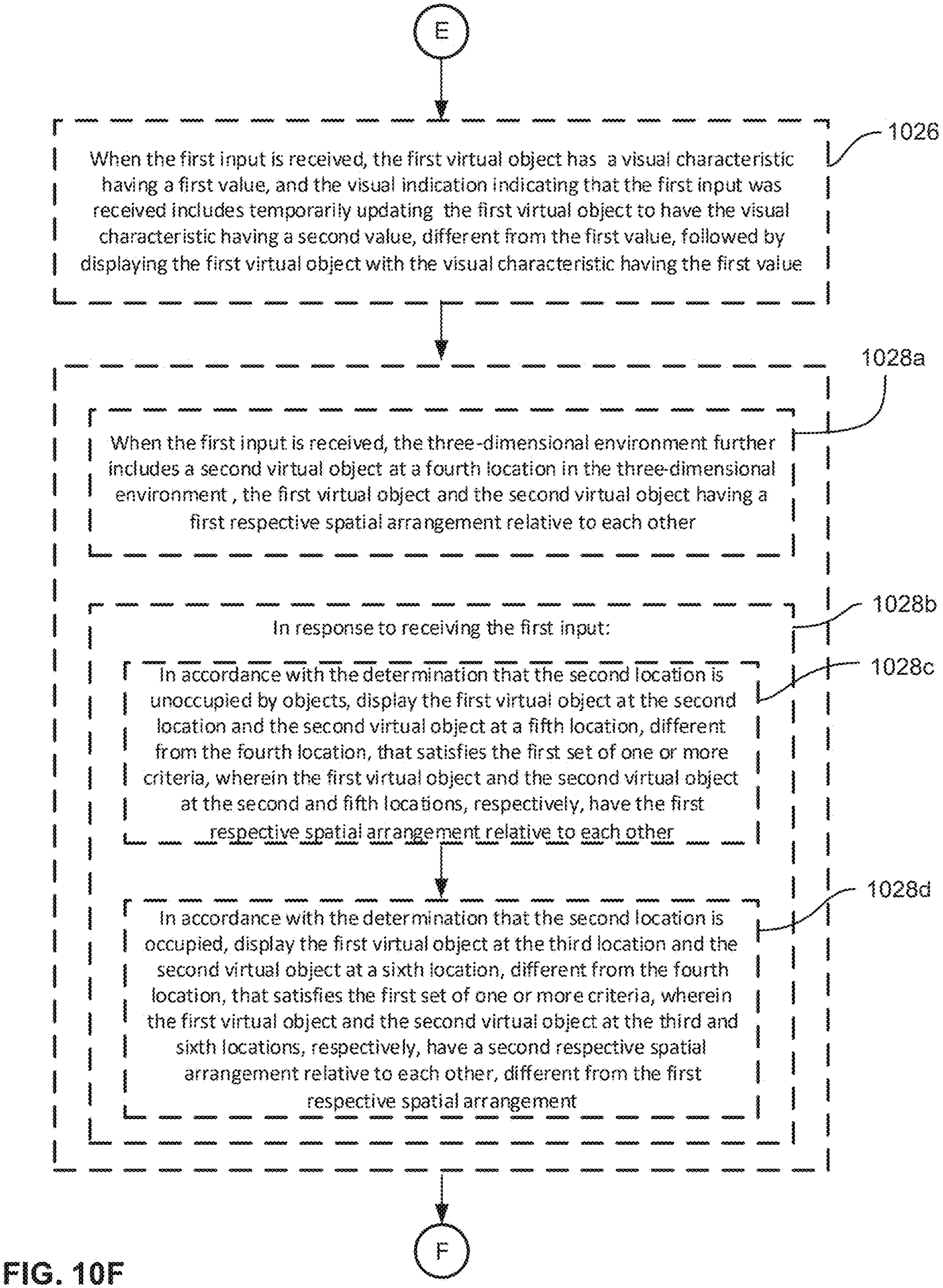
Figure 10G:
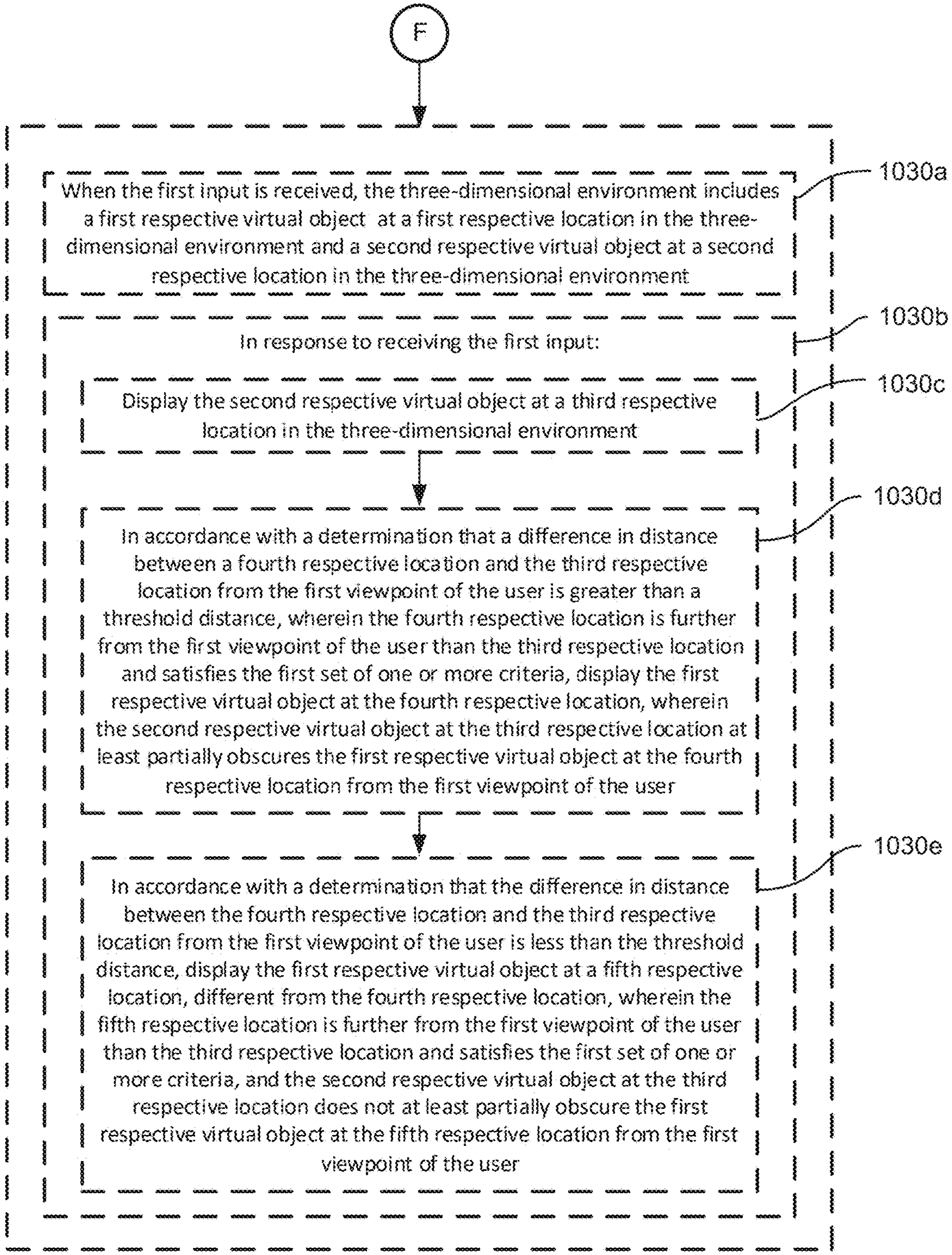
Figure 13A:
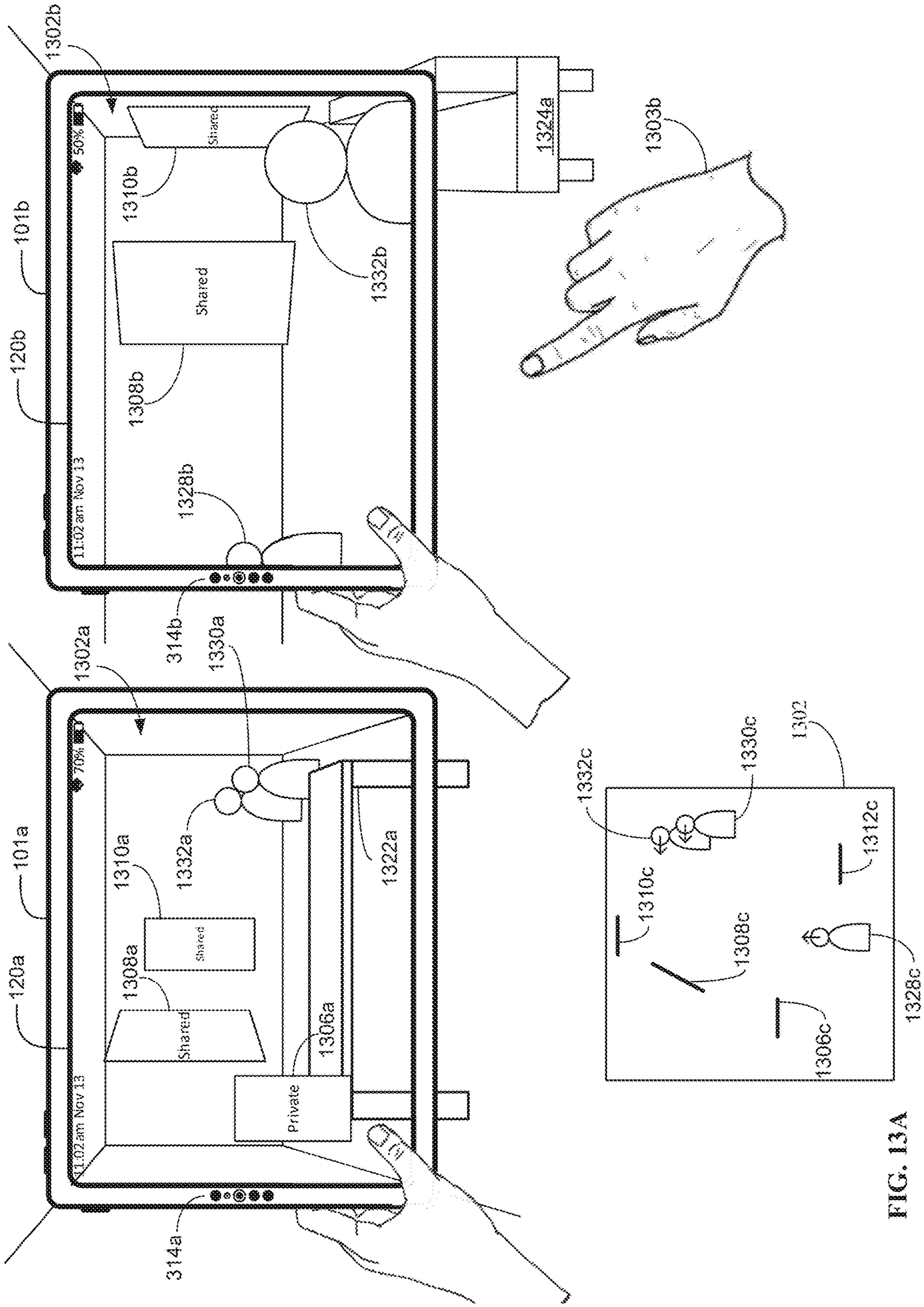
FIGS. 13A-13C illustrate examples of a computer system selectively recentering content associated with a communication session between multiple users in response to an input detected at the computer system in accordance with some embodiments.
Figure 13B:
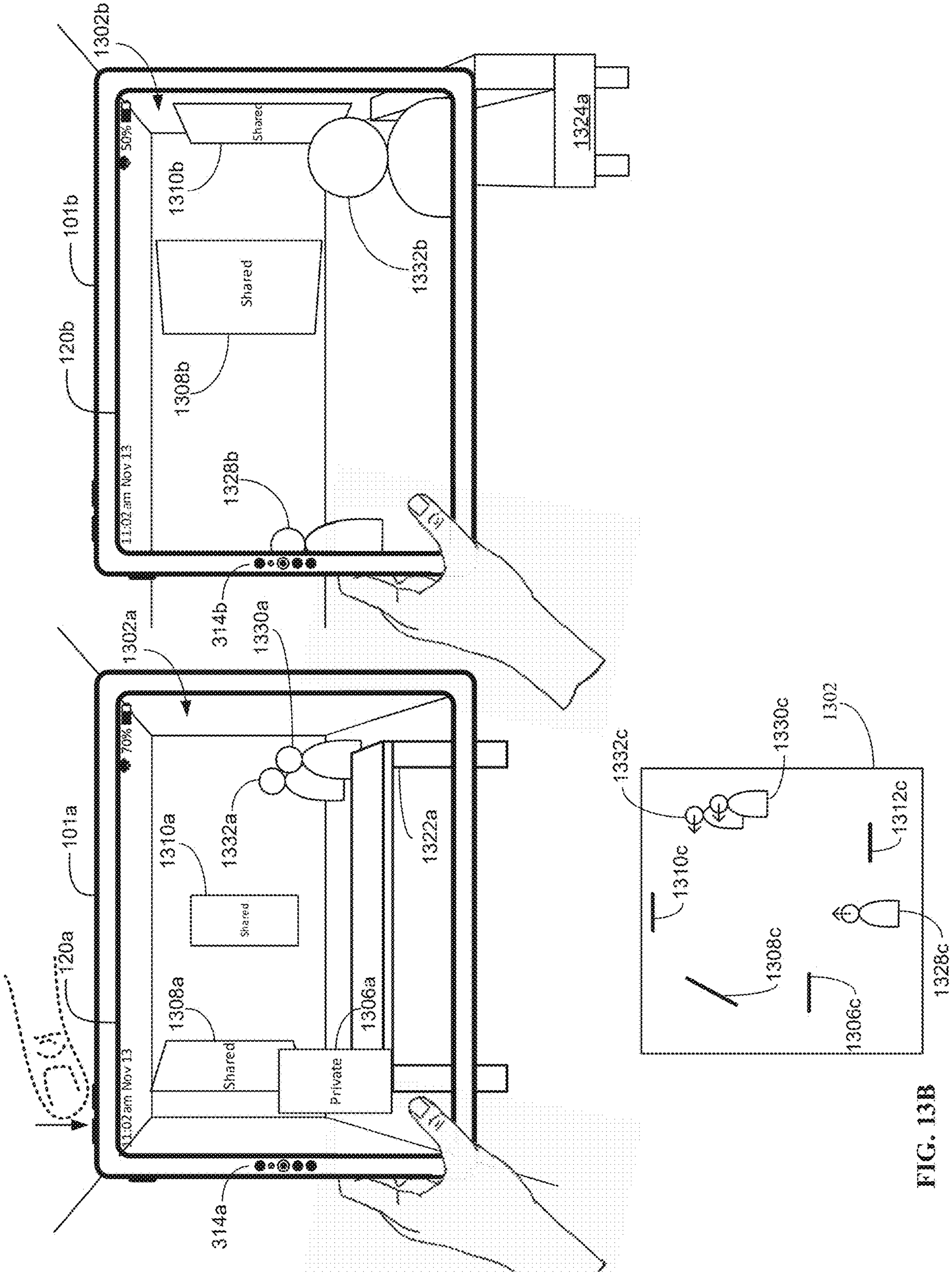
Figure 13C:
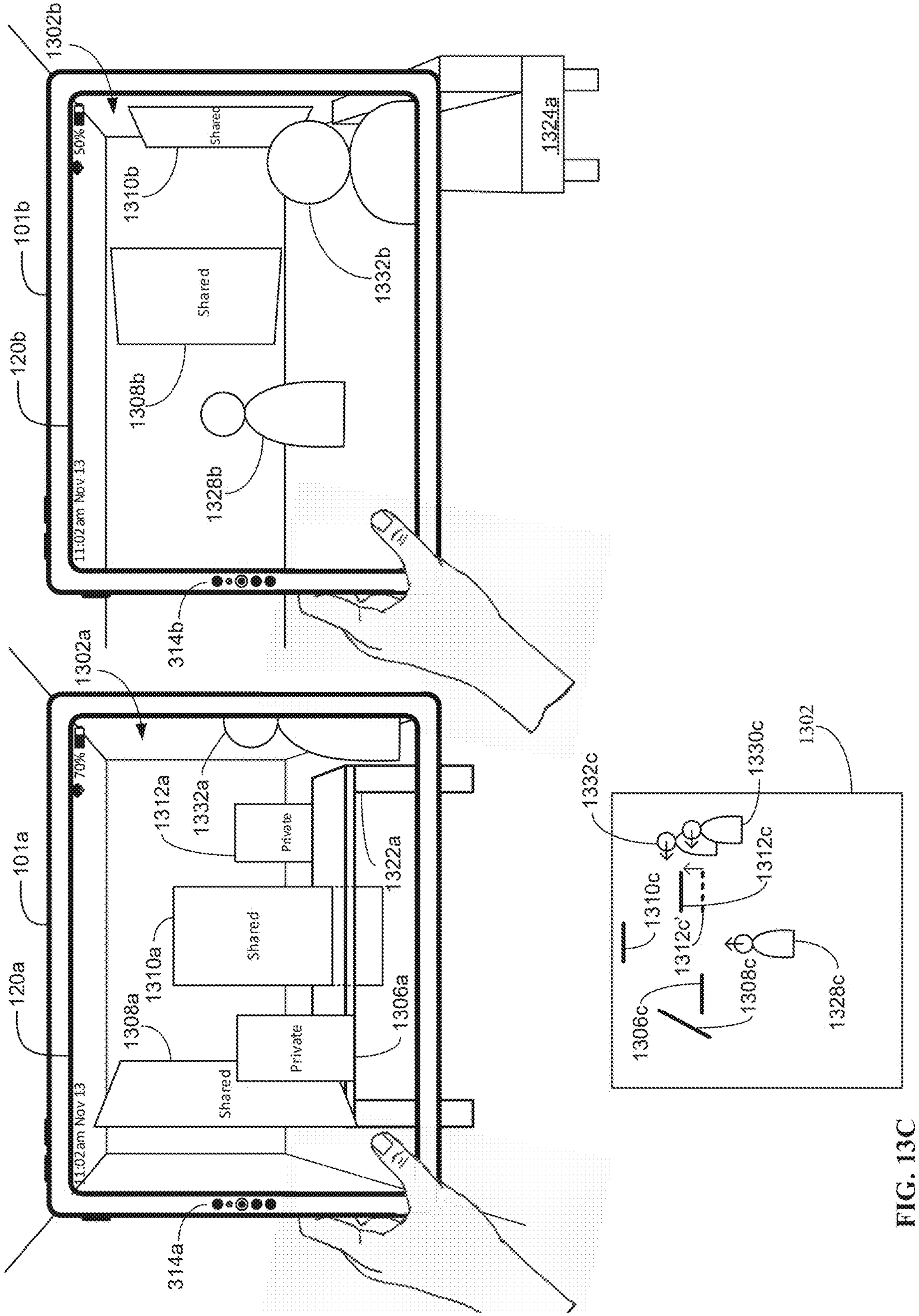
Figure 14A:
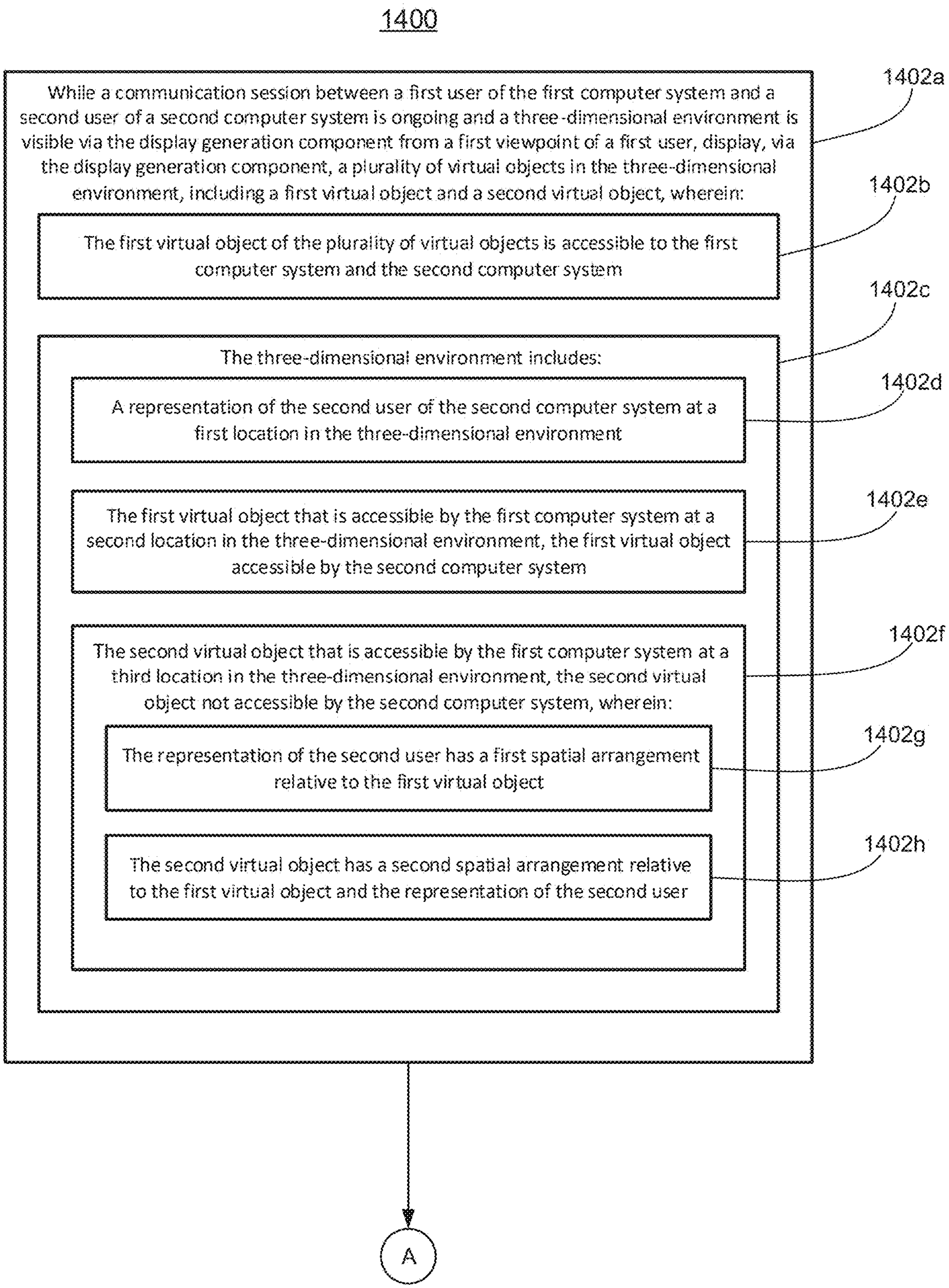
FIGS. 14A-14E is a flowchart illustrating a method of selectively recentering content associated with a communication session between multiple users in response to an input detected at the computer system in accordance with some embodiments.
Figure 14B:
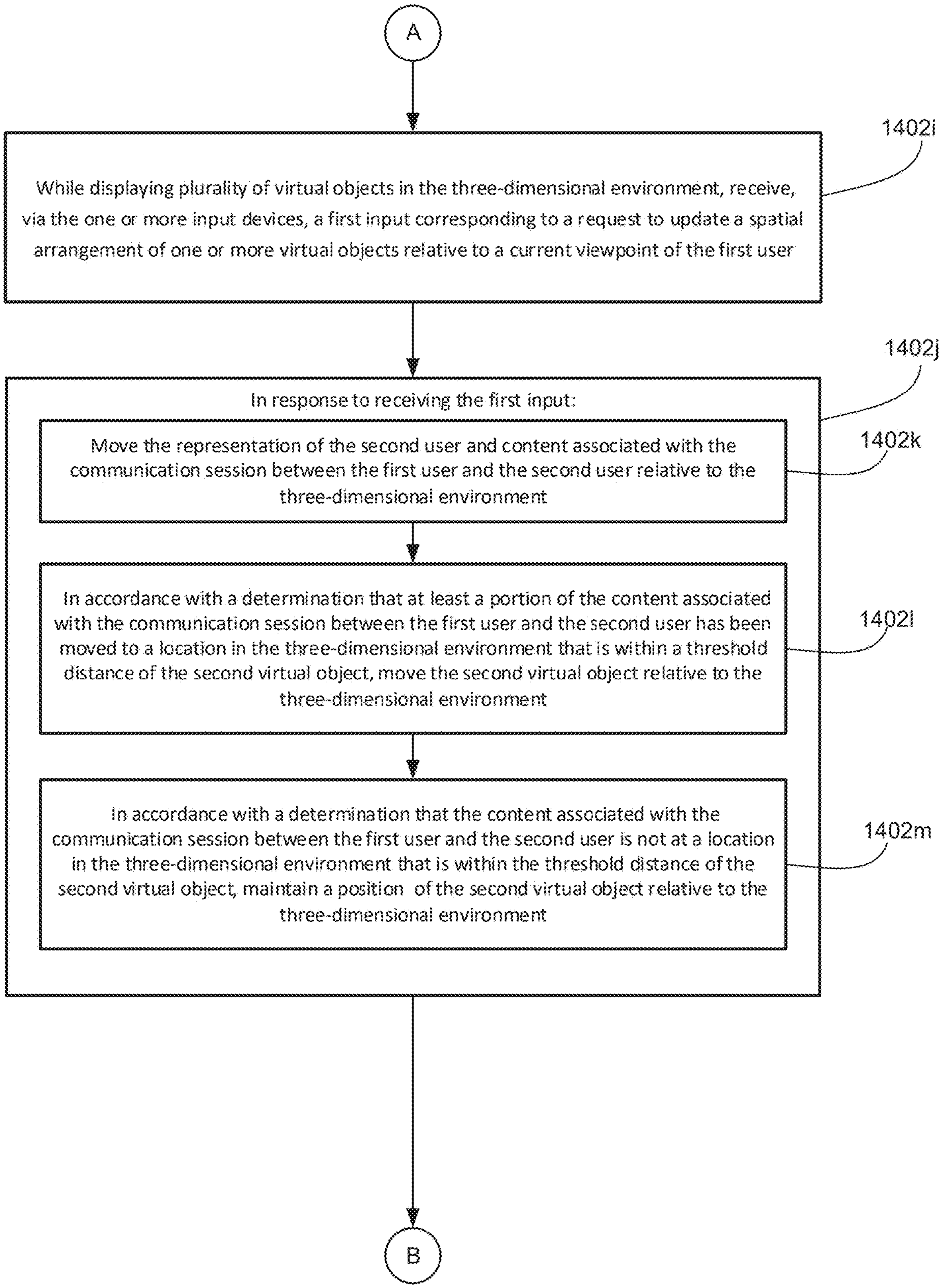
Figure 14C:
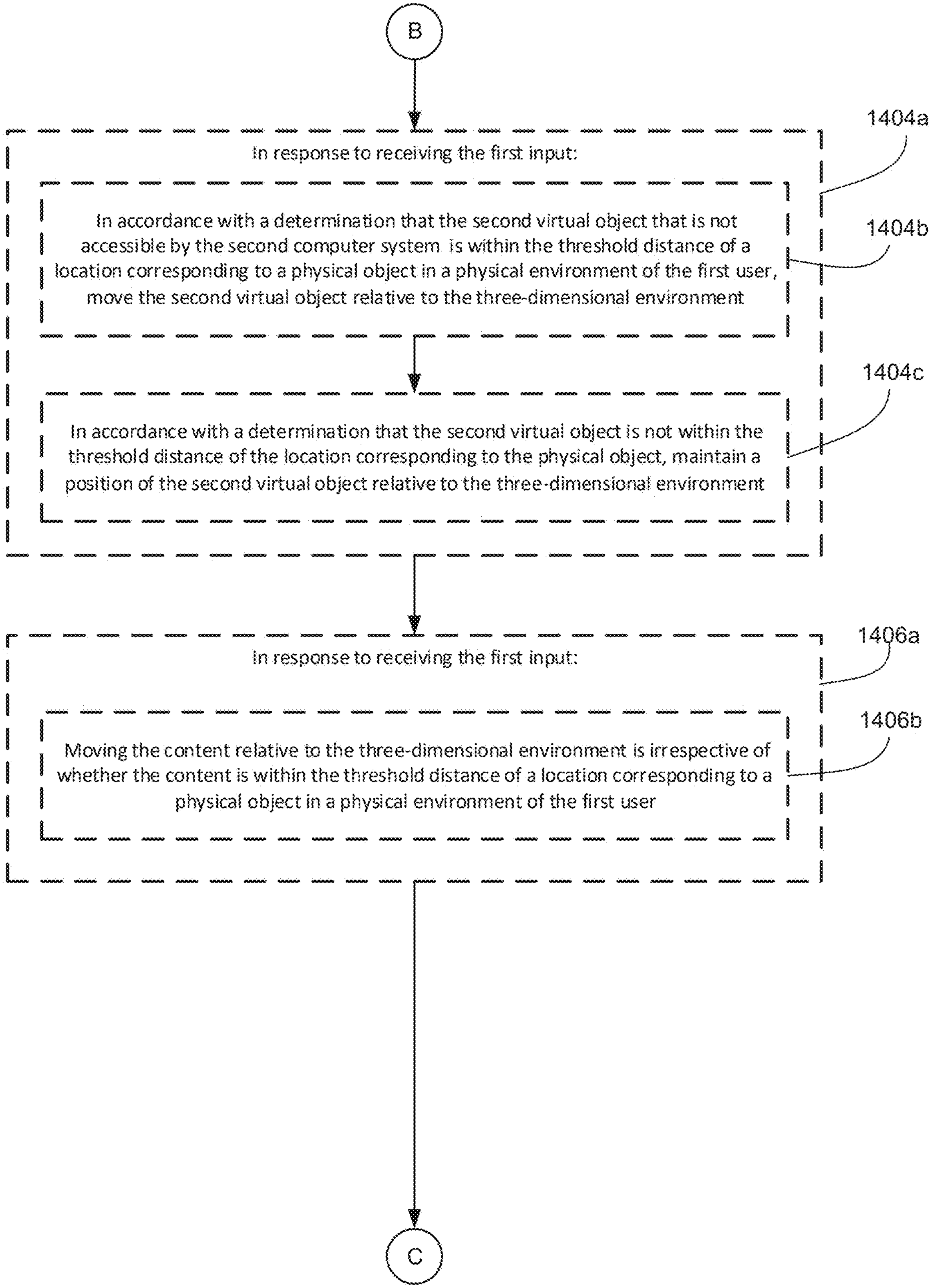
Figure 14D:
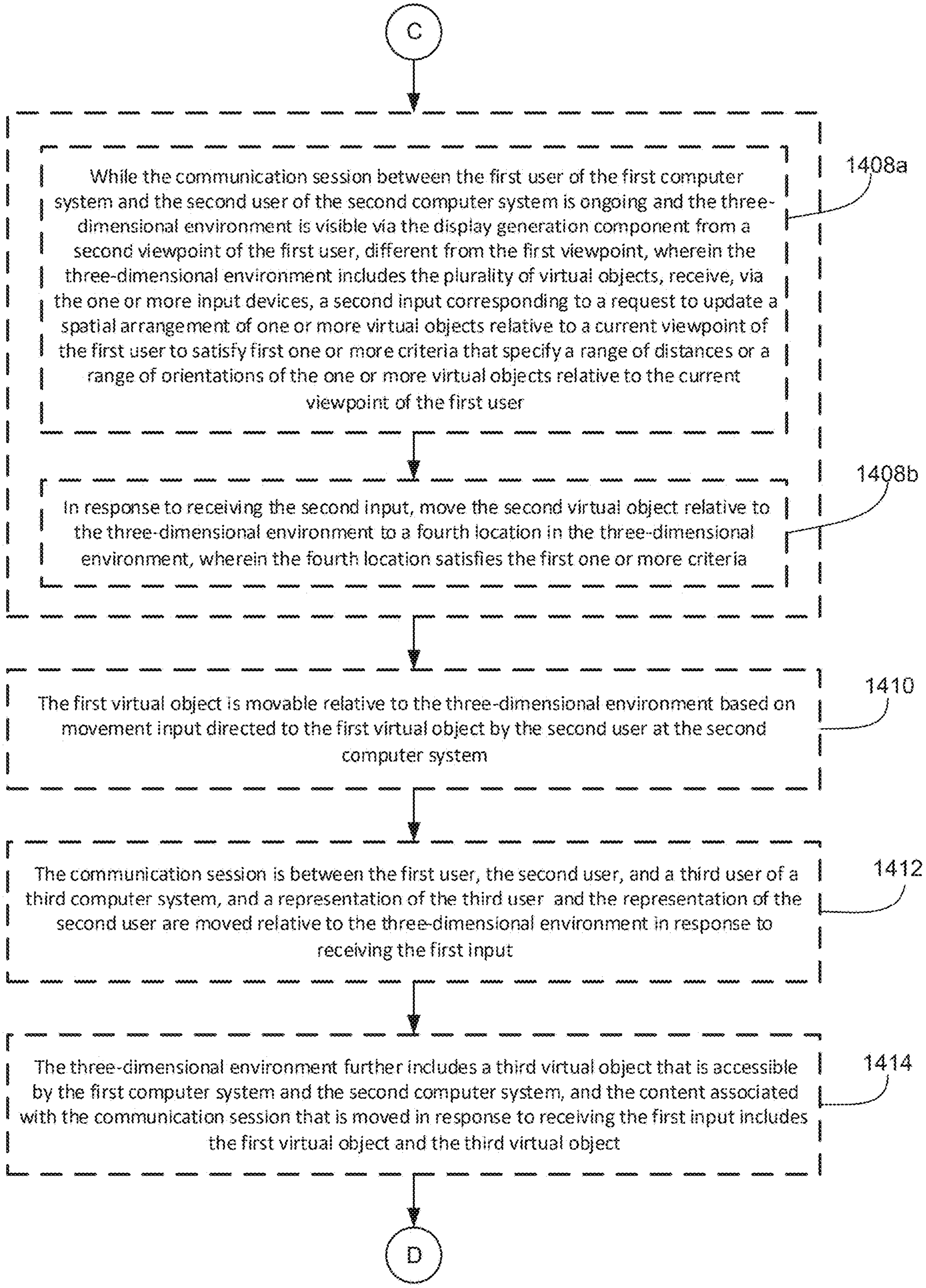
Figure 14E:
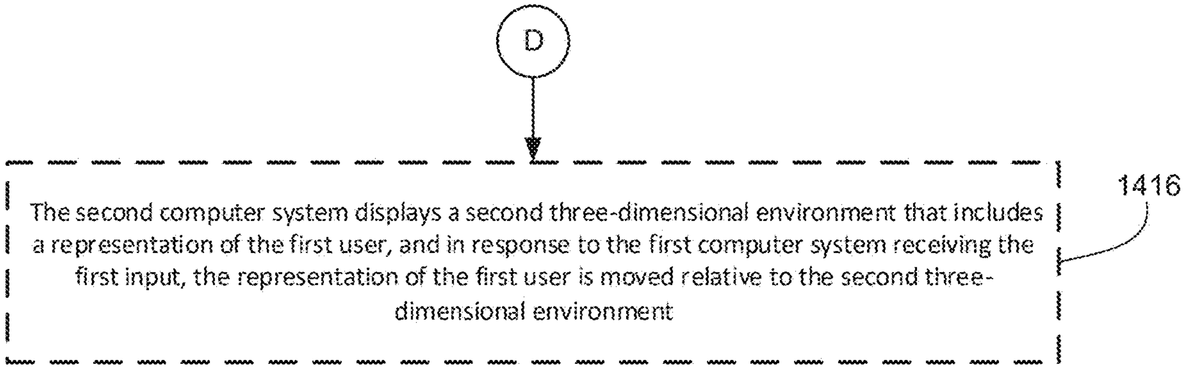
Figure 25A:
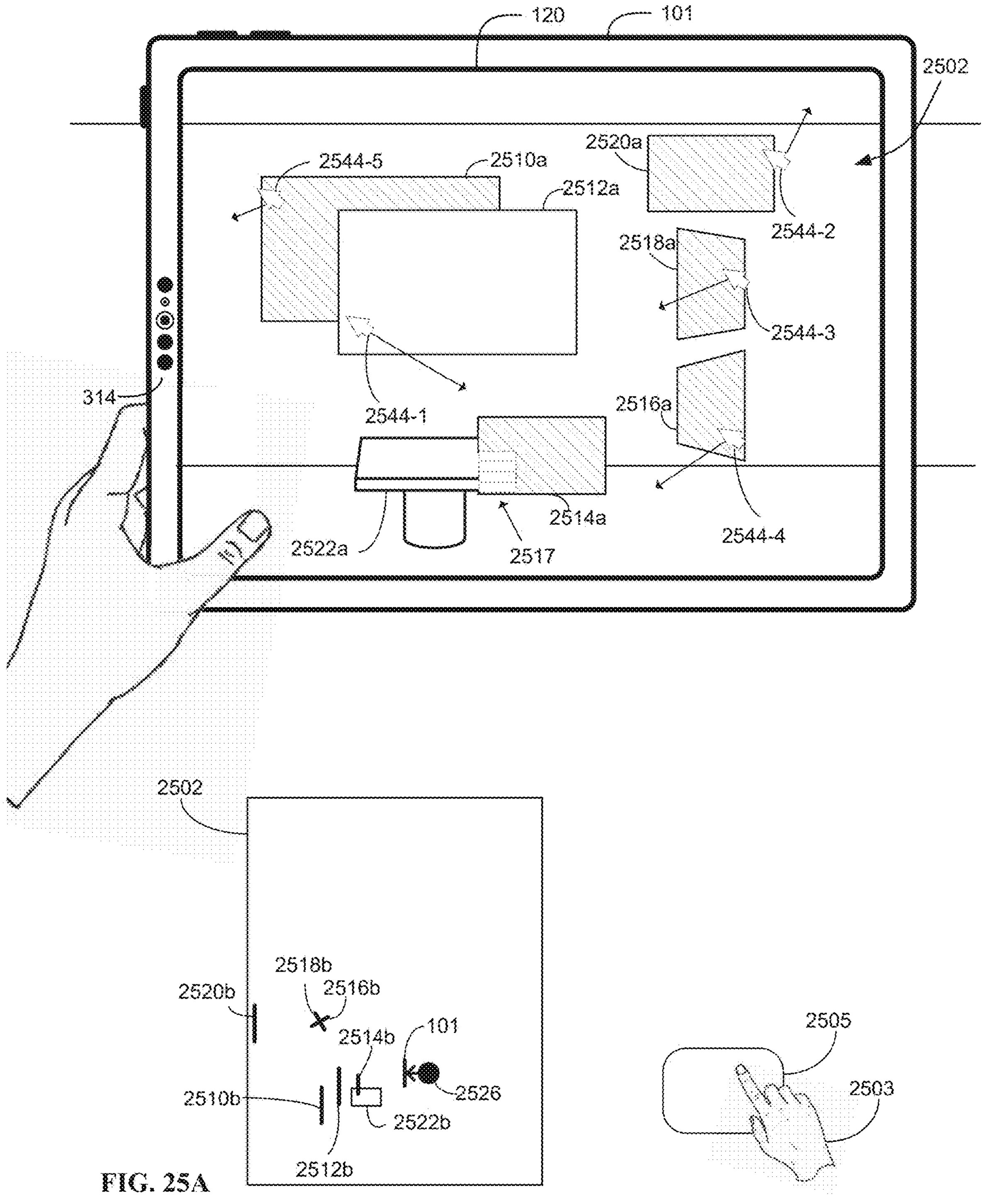
FIGS. 25A-25C illustrate examples of a computer system modifying visual prominence of respective virtual objects based on one or more concurrent types of user interaction in accordance with some embodiments.
Figure 25B:
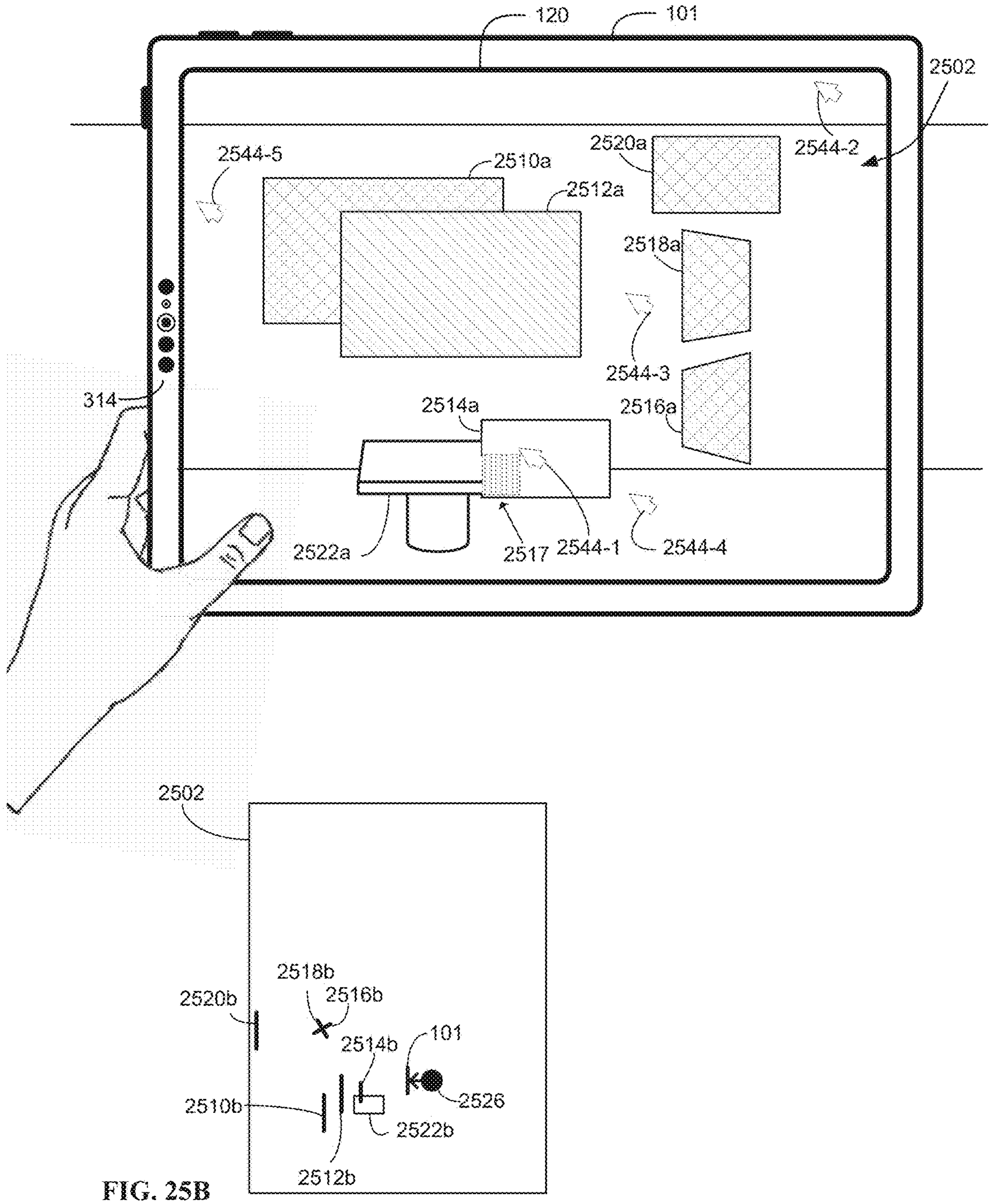
Figure 25C:
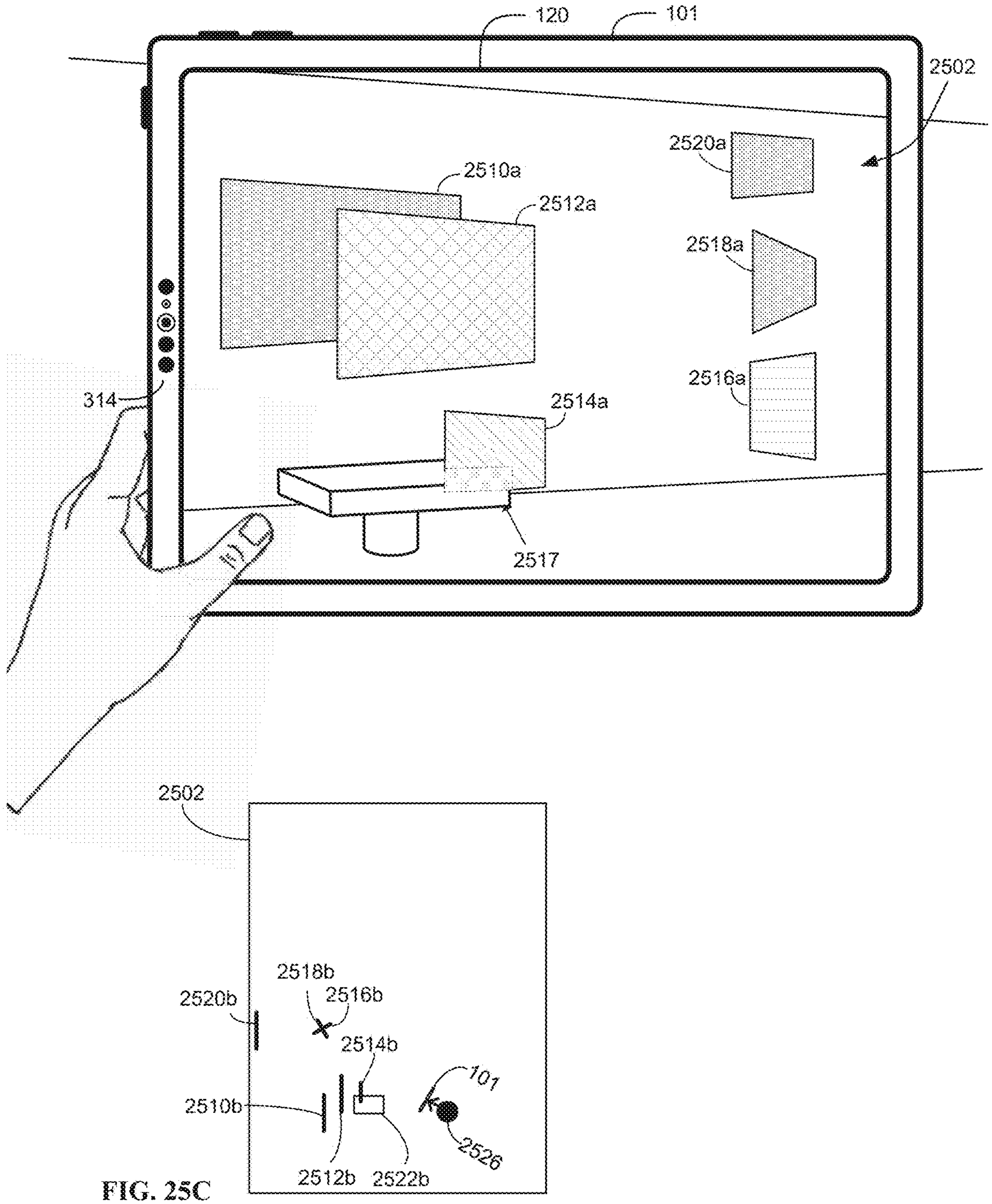
Figure 26A:
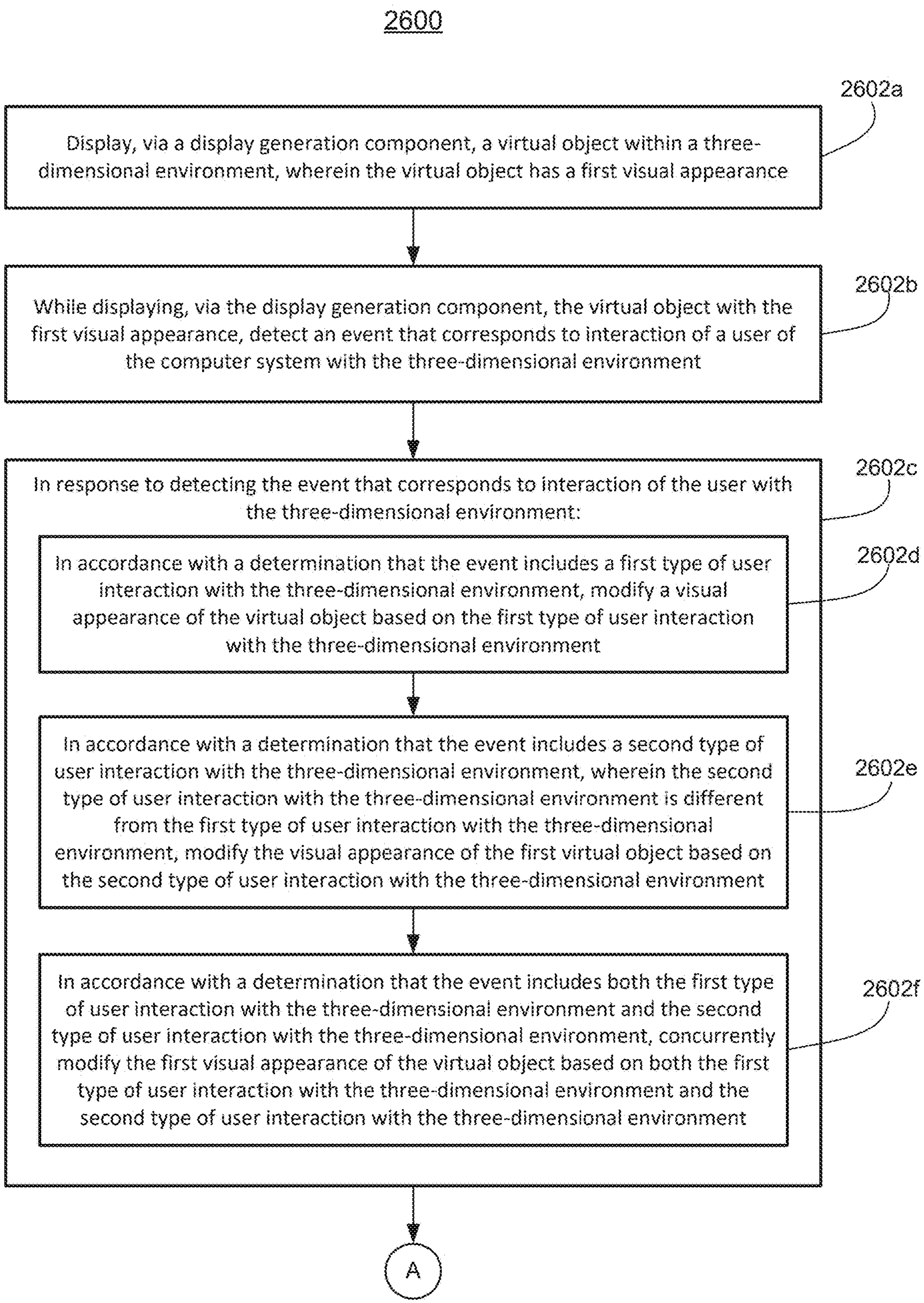
FIGS. 26A-26D is a flowchart illustrating a method of modifying visual prominence of respective virtual objects based on one or more concurrent types of user interaction in accordance with some embodiments.
Figure 26B:
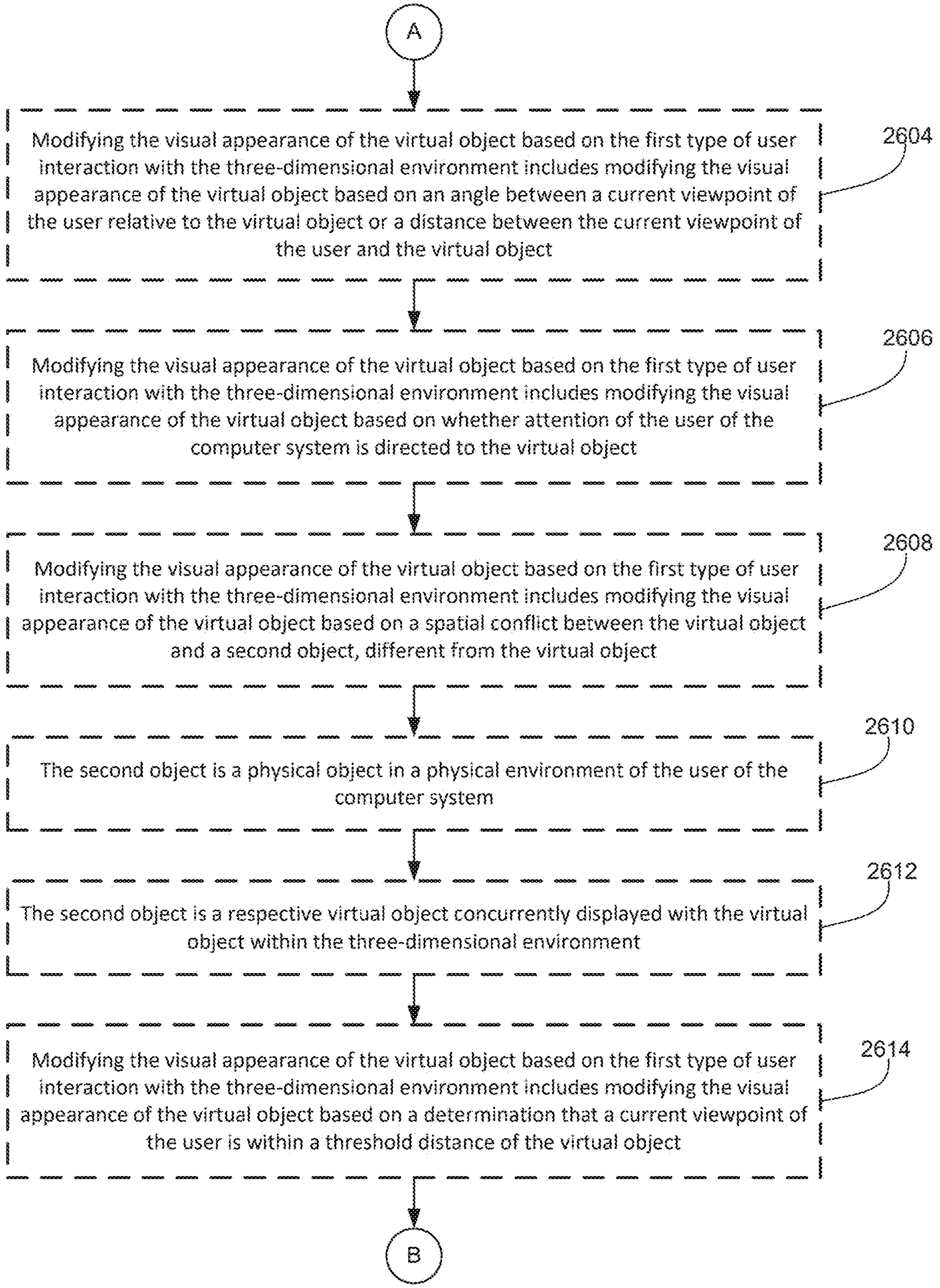
Figure 26C:
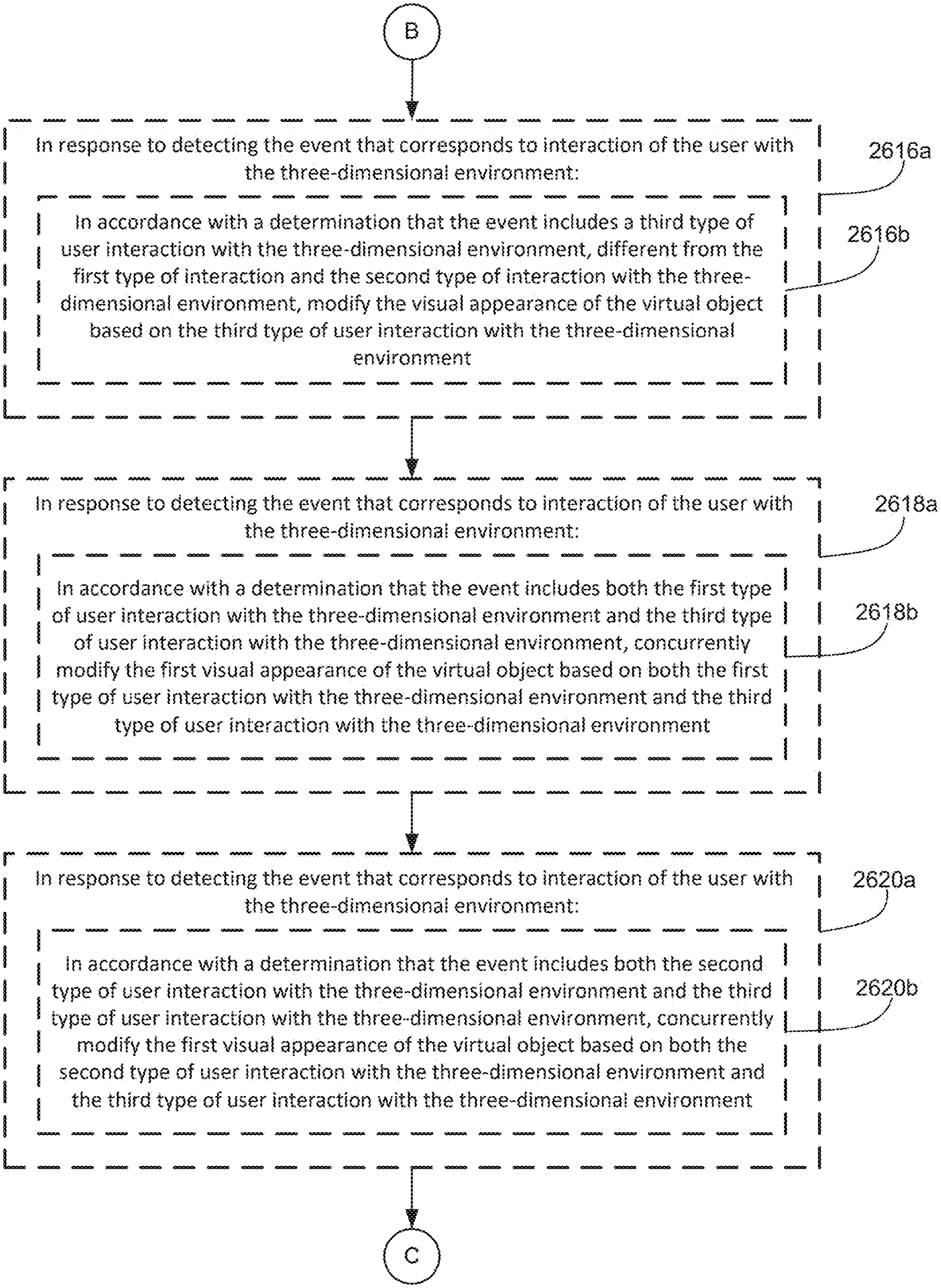
Figure 26D:
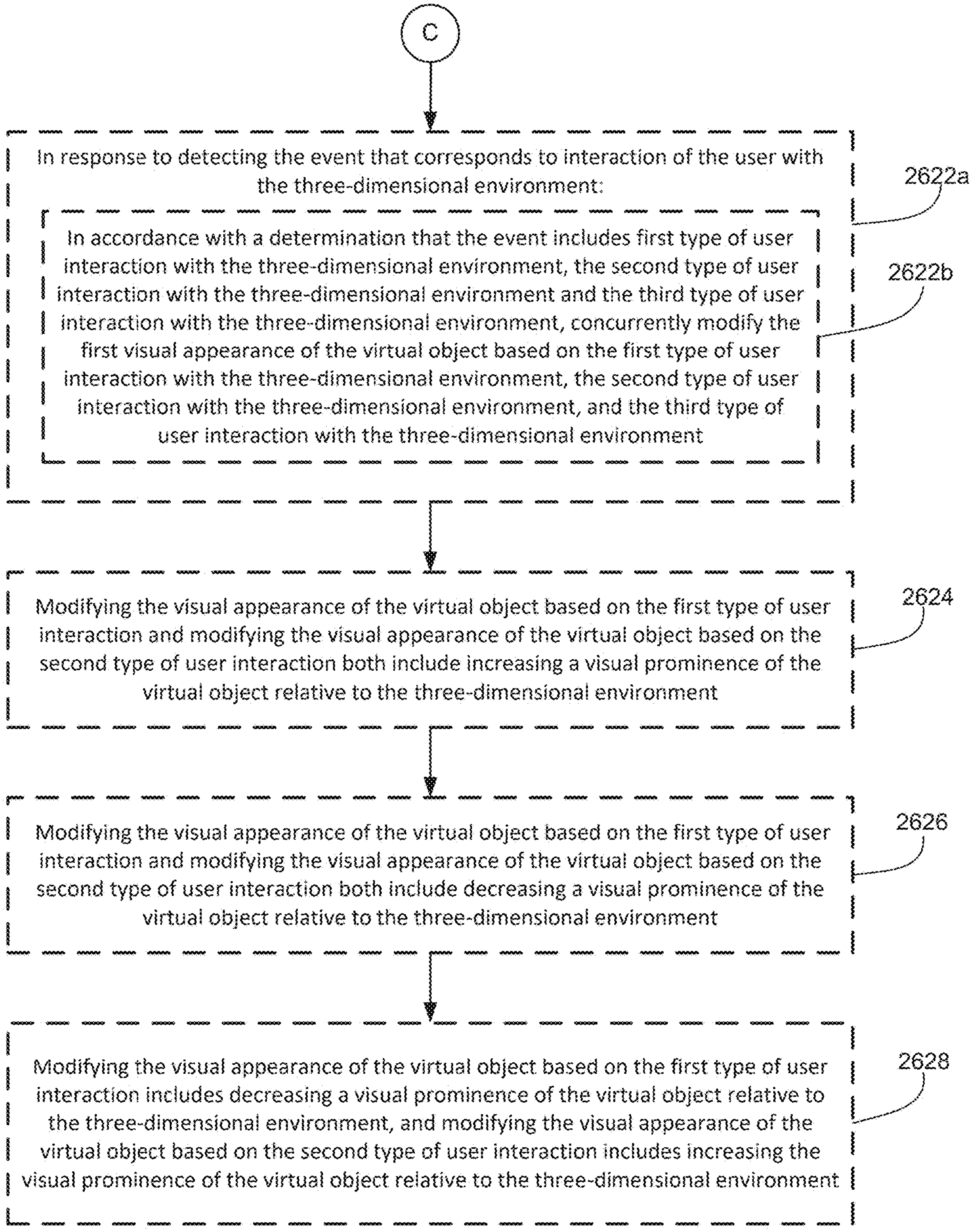

FIGS. 1-6 provide a description of example computer systems for providing XR experiences to users (such as described below with respect to methods 800, 1000, 1200, 1400, 1600, 1800, and/or 2000). FIGS. 7A-7F illustrate examples of a computer system selectively recentering virtual content to a viewpoint of a user in accordance with some embodiments. FIGS. 8A-8I is a flowchart illustrating an exemplary method of selectively recentering virtual content to a viewpoint of a user in accordance with some embodiments. The user interfaces in FIGS. 7A-7F are used to illustrate the processes in FIGS. 8A-8I. FIGS. 9A-9C illustrate examples of a computer system recentering one or more virtual objects in the presence of physical or virtual obstacles in accordance with some embodiments. FIGS. 10A-10G is a flowchart illustrating a method of recentering one or more virtual objects in the presence of physical or virtual obstacles in accordance with some embodiments. The user interfaces in FIGS. 9A-9C are used to illustrate the processes in FIGS. 10A-10G. FIGS. 11A-11E illustrate examples of a computer system selectively automatically recentering one or more virtual objects in response to the display generation component changing state in accordance with some embodiments. FIGS. 12A-12E is a flowchart illustrating a method of selectively automatically recentering one or more virtual objects in response to the display generation component changing state in accordance with some embodiments. The user interfaces in FIGS. 11A-11E are used to illustrate the processes in FIGS. 12A-12E. FIGS. 13A-13C illustrate examples of a computer system selectively recentering content associated with a communication session between multiple users in response to an input detected at the computer system in accordance with some embodiments. FIGS. 14A-14E is a flowchart illustrating a method of selectively recentering content associated with a communication session between multiple users in response to an input detected at the computer system in accordance with some embodiments. The user interfaces in FIGS. 13A-13C are used to illustrate the processes in FIGS. 14A-14E. FIGS. 15A-15J illustrate examples of a computer system changing the visual prominence of content included in virtual objects based on viewpoint in accordance with some embodiments. FIGS. 16A-16P is a flowchart illustrating a method of changing the visual prominence of content included in virtual objects based on viewpoint in accordance with some embodiments. The user interfaces in FIGS. 15A-15J are used to illustrate the processes in FIGS. 16A-16P FIGS. 17A-17E illustrate examples of a computer system changing the visual prominence of content included in virtual objects based on attention of a user of the computer system in accordance with some embodiments. FIGS. 18A-18K is a flowchart illustrating a method of modifying visual prominence of virtual objects based on attention of a user in accordance with some embodiments. The user interfaces in FIGS. 17A-17E are used to illustrate the processes in FIGS. 18A-18K. FIGS. 19A-19E illustrate examples of a computer system modifying visual prominence of respective virtual objects to modify apparent obscuring of the respective virtual objects by virtual content in accordance with some embodiments. FIGS. 20A-20F is a flowchart illustrating a method of modifying visual prominence of respective virtual objects to modify apparent obscuring of the respective virtual objects by virtual content in accordance with some embodiments. The user interfaces in FIGS. 19A-19E are used to illustrate the processes in FIGS. 20A-20F. FIGS. 21A-21L illustrate examples of a computer system gradually modifying visual prominence of respective virtual objects in accordance with changes in viewpoint of a user in accordance with some embodiments. FIGS. 22A-22J is a flowchart illustrating a method of gradually modifying visual prominence of respective virtual objects in accordance with changes in viewpoint of a user in accordance with some embodiments. The user interfaces in FIGS. 21A-21L are used to illustrate the processes in FIGS. 22A-22J. FIGS. 23A-23E illustrate examples of a computer system modifying visual prominence of respective virtual objects based on proximity of a user to the respective virtual objects in accordance with some embodiments. FIGS. 24A-24F is a flowchart illustrating a method of modifying visual prominence of respective virtual objects based on proximity of a user to the respective virtual objects in accordance with some embodiments. The user interfaces in FIGS. 23A-23E are used to illustrate the processes in FIGS. 24A-24F. FIGS. 25A-25C illustrate examples of a computer system modifying visual prominence of respective virtual objects based on one or more concurrent types of user interaction in accordance with some embodiments. FIGS. 26A-26D is a flowchart illustrating a method of modifying visual prominence of respective virtual objects based on one or more concurrent types of user interaction in accordance with some embodiments. The user interfaces in FIGS. 25A-25C are used to illustrate the processes in FIGS. 26A-26D. FIGS. 27A-27J illustrate examples of a computer system changing an amount of visual impact of an environmental effect on an appearance of a three-dimensional environment in which a first virtual content is displayed in response to detecting input, such as user attention, having shifted away from the first virtual content, and/or other input different from user attention directed to an element that is different from the first virtual content in accordance with some embodiments. FIGS. 28A-28I is a flowchart illustrating a method of dynamically displaying environmental effects with different amounts of visual impact on an appearance of a three-dimensional environment in which virtual content is displayed in response to detecting inputs (e.g., user attention) shifting to different elements in the three-dimensional environment in accordance with some embodiments. The user interfaces in FIGS. 27A-27J are used to illustrate the processes in FIGS. 28A-28I.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, or a touch-screen), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, or velocity sensors), and optionally one or more peripheral devices 195 (e.g., home appliances or wearable devices). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR Include Virtual Reality and Mixed Reality

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of Mixed Realities Include Augmented Reality and Augmented Virtuality Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server or central server). In some embodiments, the controller 110 is communicatively coupled with the display generation component 120 (e.g., an HMD, a display, a projector, or a touch-screen) via one or more wired or wireless communication channels 144 (e.g., BLUETOOTH, IEEE 802.11x, IEEE 802.16x, or IEEE 802.3x). In another example, the controller 110 is included within the enclosure (e.g., a physical housing) of the display generation component 120 (e.g., an HMD, or a portable electronic device that includes a display and one or more processors), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head or on his/her hand). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the MID relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
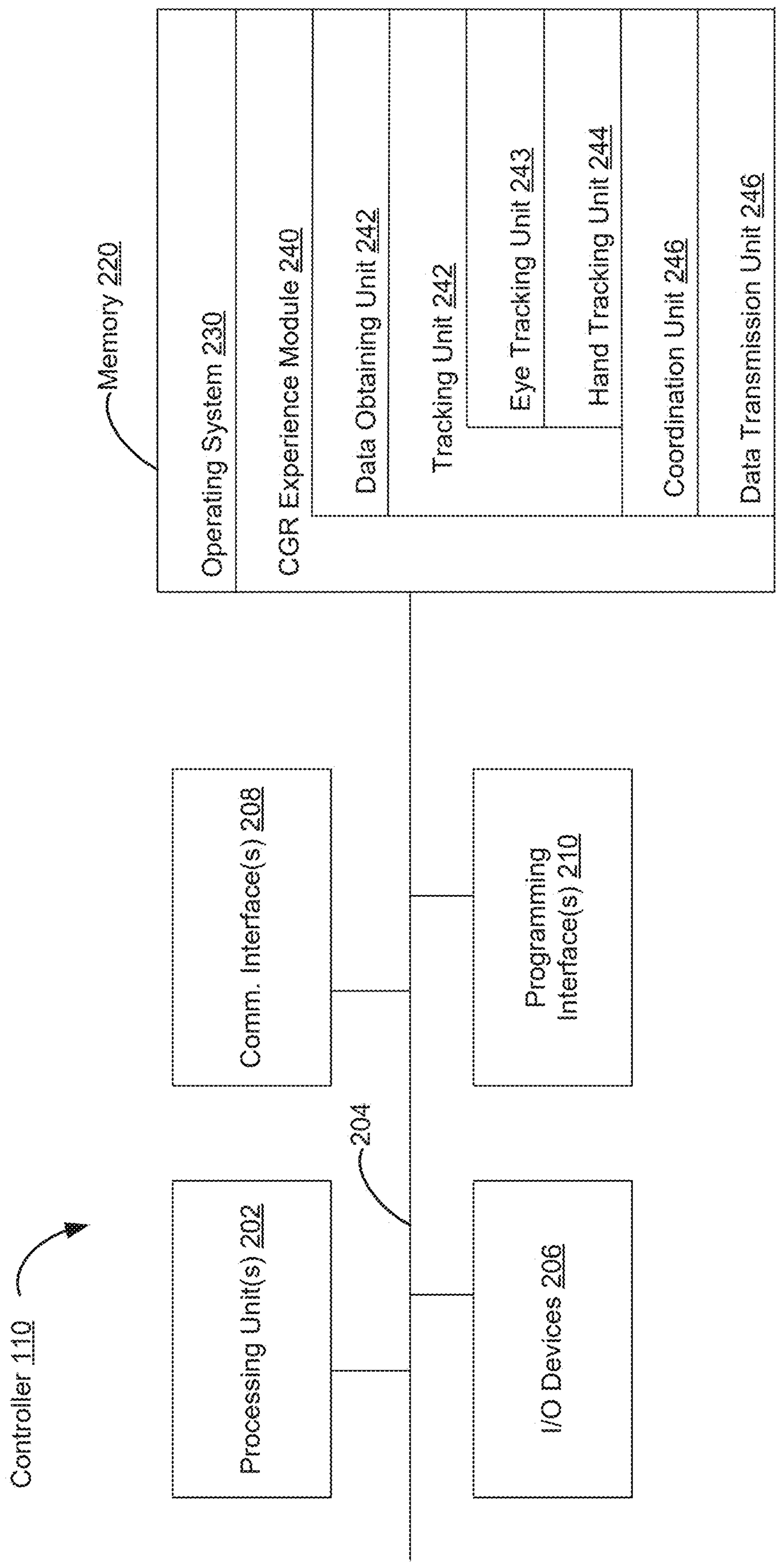
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, or location data) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data or location data) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
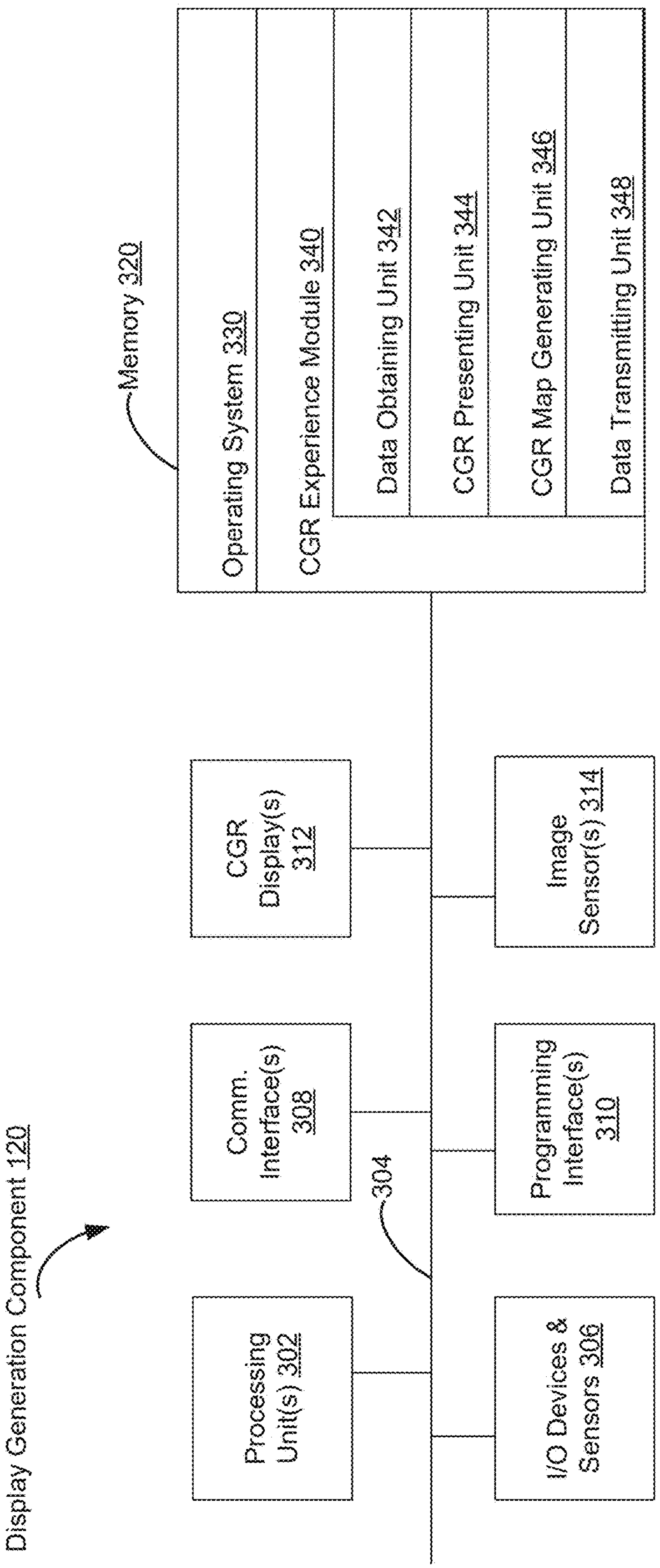
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., MID) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, or blood glucose sensor), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, and/or holographic. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, or location data) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data or location data) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
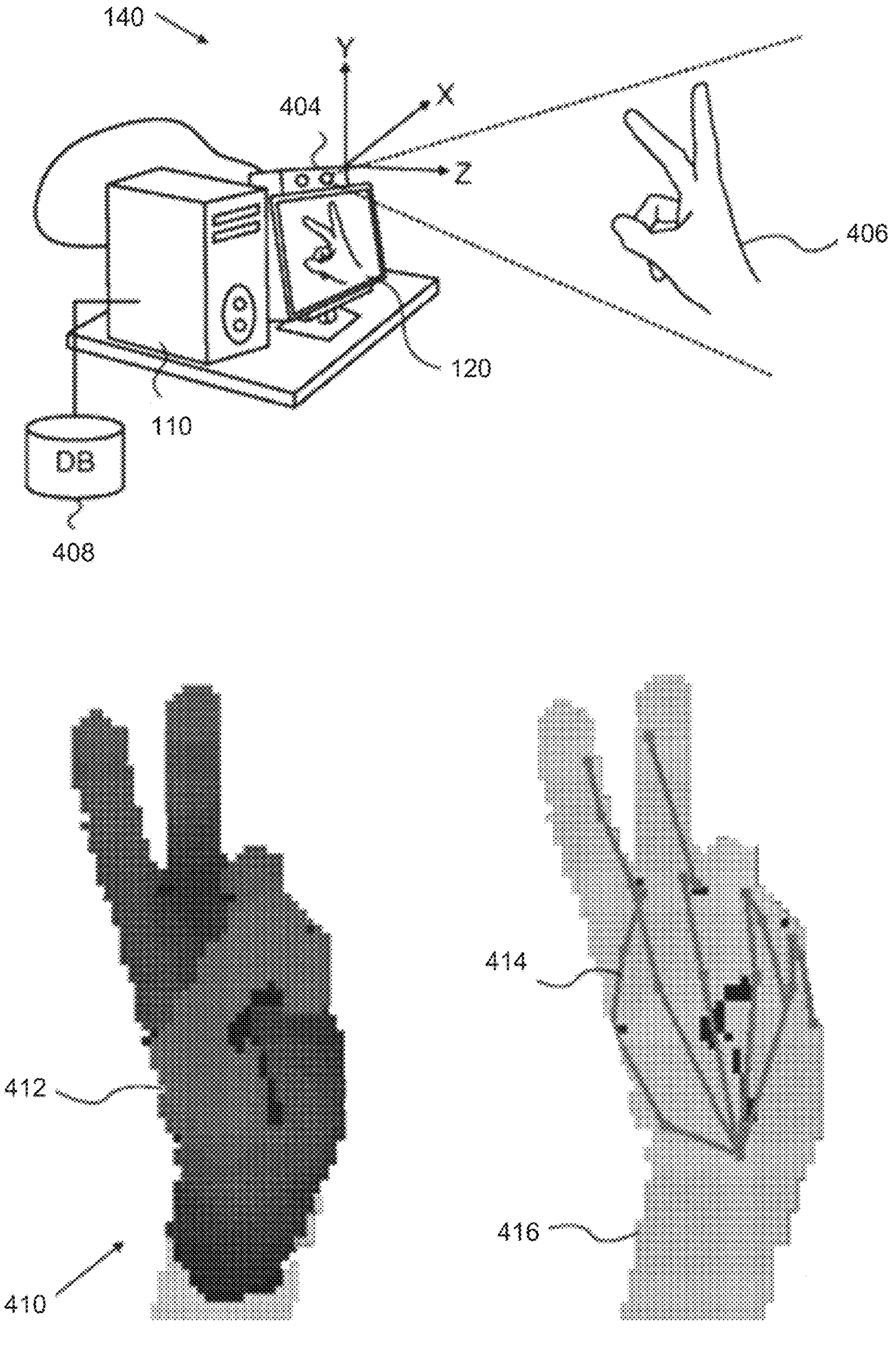
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, or end of the hand connecting to wrist) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
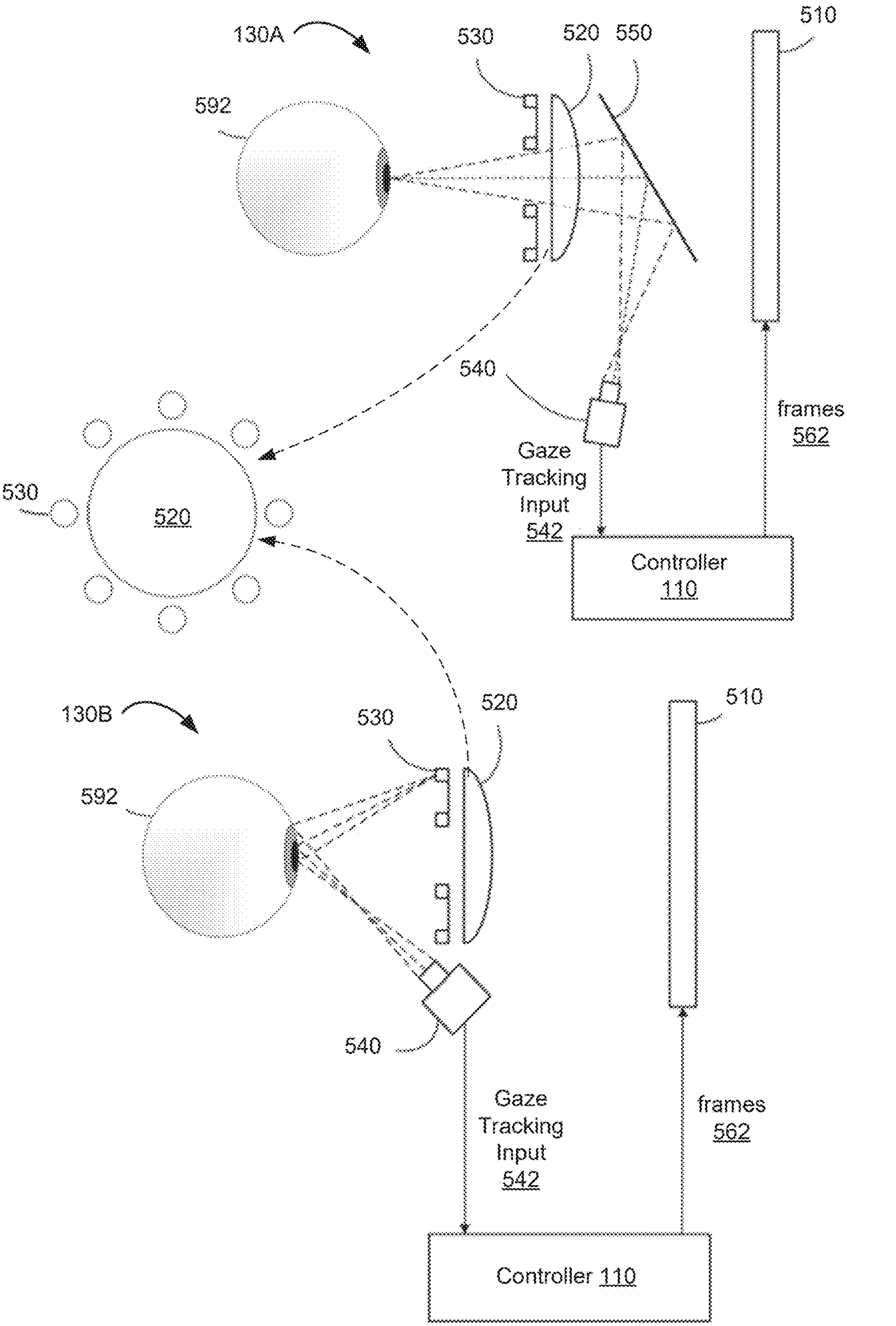
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NTR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, and/or eye spacing. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, or a projector) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
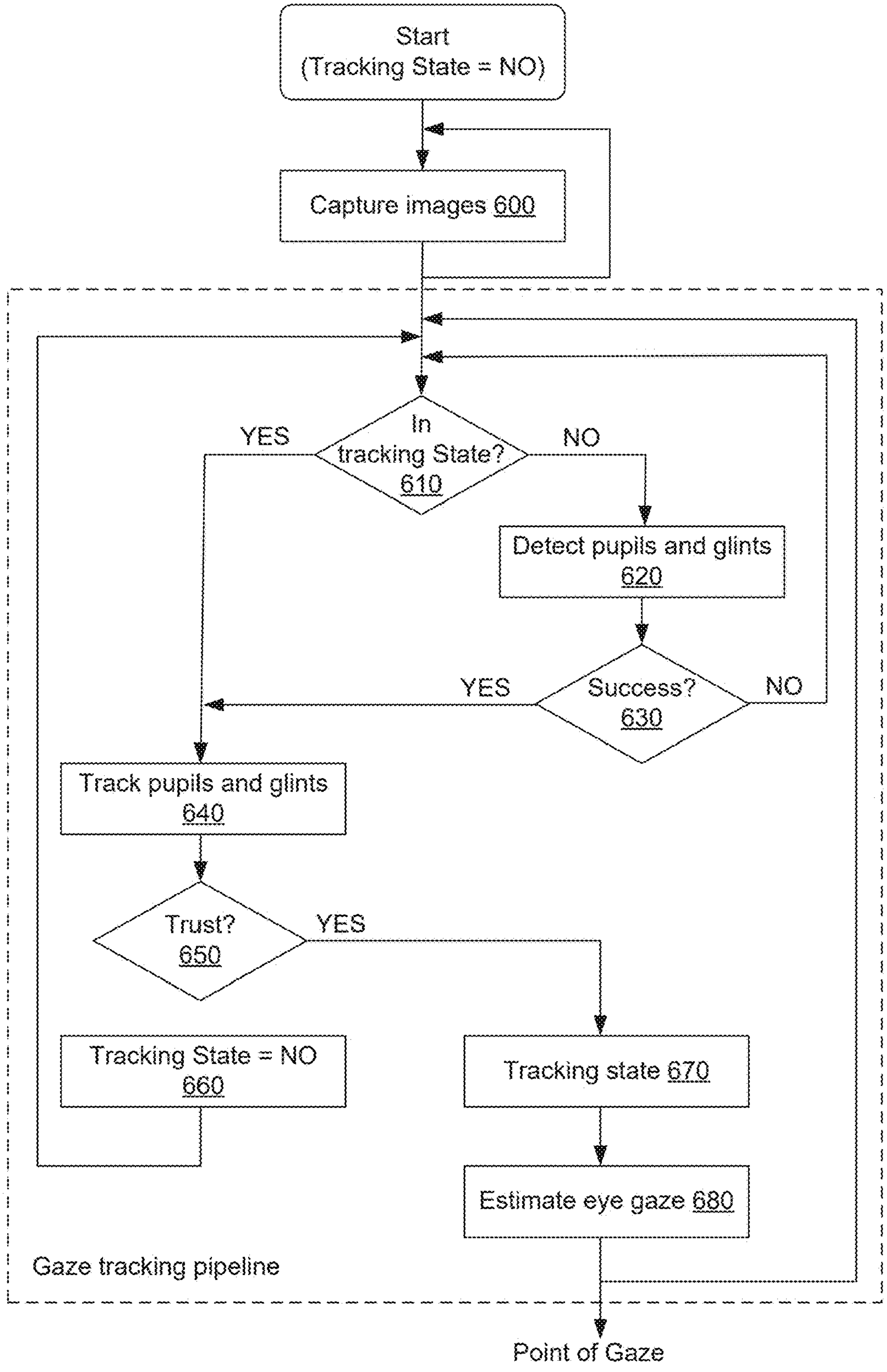
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, or holding, a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7F illustrate examples of a computer system selectively recentering virtual content to a viewpoint of a user in accordance with some embodiments.

Figure 7A:
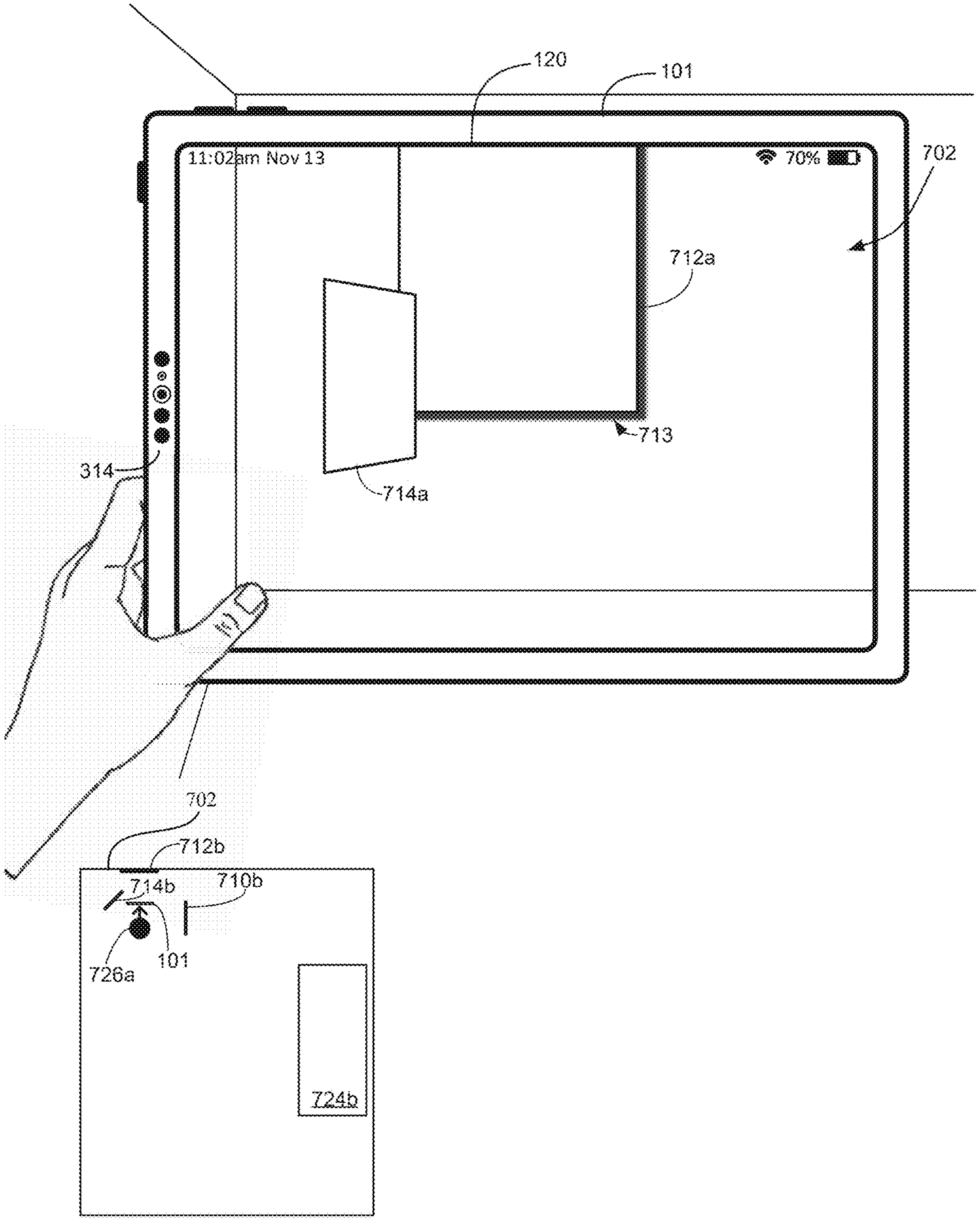
FIGS. 7A-7F illustrate examples of a computer system selectively recentering virtual content to a viewpoint of a user in accordance with some embodiments.

FIG. 7A illustrates a three-dimensional environment 702 visible via a display generation component (e.g., display generation component 120 of FIG. 1) of a computer system 101, the three-dimensional environment 702 visible from a viewpoint 726*a* of a user illustrated in the overhead view (e.g., facing the back wall of the physical environment in which computer system 101 is located, and near the back left corner of the physical environment). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 and/or the physical environment is visible in the three-dimensional environment 702 via the display generation component 120. For example, three-dimensional environment 702 visible via display generation component 120 includes representations of the physical floor and back and side walls of the room in which computer system 101 is located. Three-dimensional environment 702 also includes sofa 724*b* (shown in the overhead view), which is not visible via the display generation component 120 from the viewpoint 726*a* of the user in FIG. 7A.

In FIG. 7A, three-dimensional environment 702 also includes virtual objects 712*a* (corresponding to object 712*b* in the overhead view), and 714*a* (corresponding to object 714*b* in the overhead view) that are visible from viewpoint 726*a*. Three-dimensional environment 702 also includes virtual object 710*b* (shown in the overhead view), which is not visible via the display generation component 120 from the viewpoint 726*a* of the user in FIG. 7A. In FIG. 7A, objects 712*a*, 714*a* and 710*b* are two-dimensional objects. It is understood that the examples of the disclosure optionally apply equally to three-dimensional objects. Virtual objects 712*a*, 714*a* and 710*b* are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101.

In some embodiments, virtual objects that were last placed or repositioned from a particular prior viewpoint (or multiple prior viewpoints) of the user can be recentered to a new, current viewpoint of the user, as will be described in more detail below. For example, in FIG. 7A, virtual objects 712*a*, 714*a* and 710*a* were placed and/or positioned at their current locations and/or orientations in three-dimensional environment 702—as reflected in the overhead view—from viewpoint 726*a* of the user. Further, virtual object 712*a* has been snapped or anchored to the back wall of the physical environment, as shown in FIG. 7A. A virtual object optionally becomes snapped or anchored to a physical object in response to being moved, in response to user input, to a location within a threshold distance (e.g., 0.1, 0.3, 0.5, 1, 3, 5, 10, 20, 50 or 100 cm) of the physical object in three-dimensional environment 702, as described in more detail with reference to method 800. Further, in some embodiments, computer system 101 displays a visual indication in three-dimensional environment 702 that indicates that a virtual object is snapped or anchored to a physical object. For example, in FIG. 7A, computer system 101 is displaying a virtual drop shadow 713 on the back wall of the room of the physical environment as if generated by virtual object 712*a* (e.g., the virtual object that is snapped or anchored to the physical object). In some embodiments, computer system 101 does not display such a visual indication for virtual object 714*a*, because it is optionally not snapped to or anchored to a physical object.

Figure 7B:
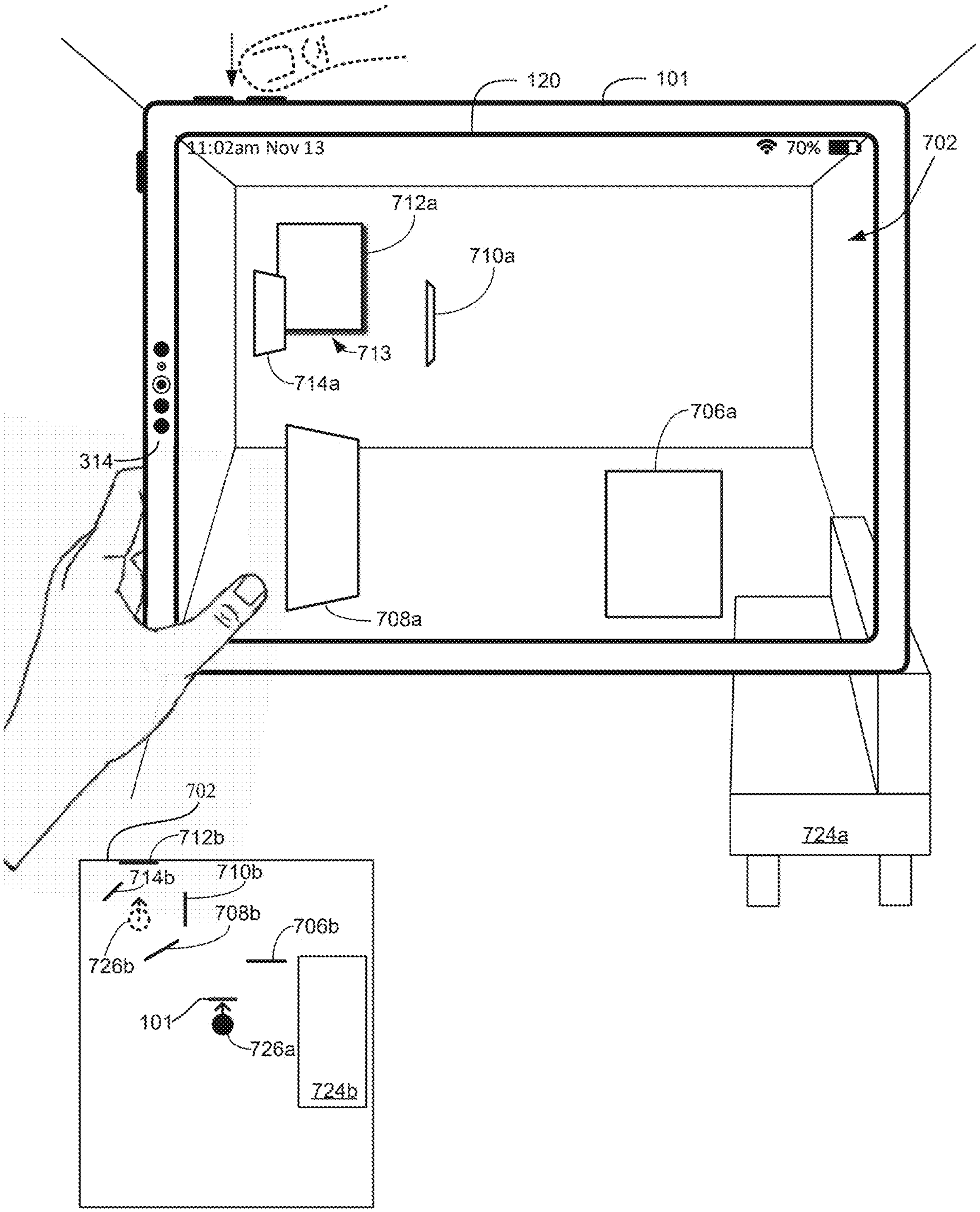

In FIG. 7B, viewpoint 726*a* of the user in three-dimensional environment 702 has changed to be further away from the back and left walls of the room of the physical environment, and more towards the center of the room as shown in the overhead view. Viewpoint 726*b* in the overhead view corresponds to the previous viewpoint of the user shown in FIG. 7A. The viewpoint 726*a* of the user optionally changes in ways described with reference to method 800, including movement of the user in the physical environment of the user towards the center of the room in the physical environment. Viewpoint 726*a* of the user in FIG. 7B is still oriented towards the back wall of the room.

From viewpoint 726*a* shown in FIG. 7B, virtual objects 710*a*, 712*a* and 714*a* (which were last placed or positioned in three-dimensional environment 702 from viewpoint 726*b*, as described with reference to FIG. 7A) are displayed at their same locations and/or orientations in three-dimensional environment 702, just from a greater distance from viewpoint 726*a*. Further, the user has placed or positioned virtual objects 706*a* (corresponding to 706*b* in the overhead view) and 708*a* (corresponding to 708*b* in the overhead view) in three-dimensional environment 702 from viewpoint 726*a* in FIG. 7B.

In FIG. 7B, computer system 101 detects an input to recenter one or more virtual objects to viewpoint 726*a* of the user (e.g., selection of a physical button of computer system 101), such as described in more detail with reference to method 800. In some embodiments, virtual objects 706*a* and 708*a* are not moved in three-dimensional environment 702 in response to the input, because those virtual objects were last placed or repositioned in three-dimensional environment from the current viewpoint 726*a* of the user. However, one or more virtual objects that were last placed or repositioned in three-dimensional environment 702 from prior viewpoint(s) of the user (e.g., viewpoint 726*b*) are optionally recentered to viewpoint 726*a*, as will be described below and as described in more detail with reference to method 800.

Figure 7C:
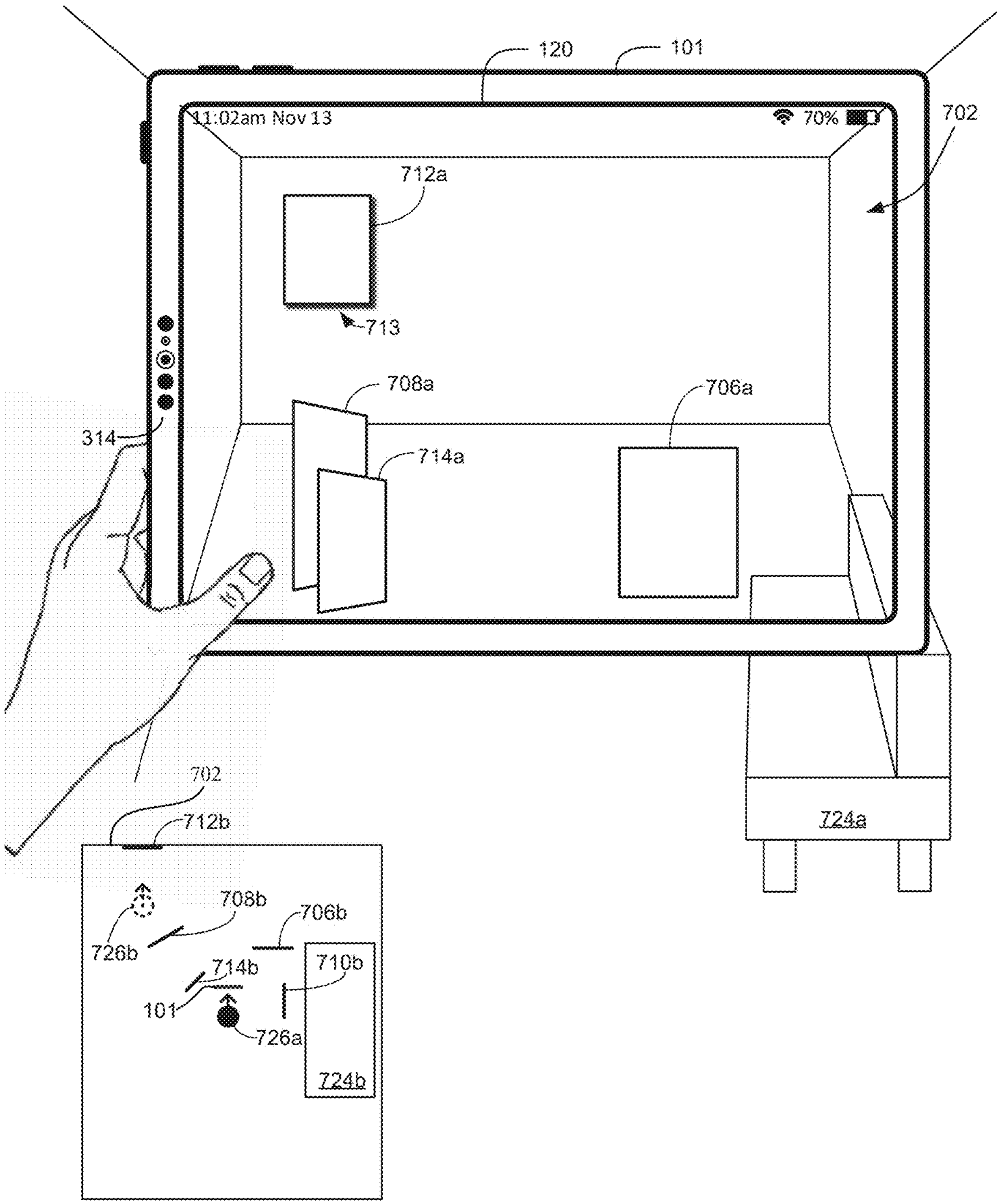

For example, FIG. 7C illustrates an example result of the input illustrated in FIG. 7B. In FIG. 7C, objects 706*a* and 708*a* have remained at their locations and/or orientations in three-dimensional environment 702 in response to the recentering input. Object 712*a*, despite having been last placed or repositioned in three-dimensional environment 702 from prior viewpoint 726*b*, has also remained at its location and/or orientation in three-dimensional environment 702 in response to the recentering input, because object 712*a* is snapped or anchored to the back wall of the physical environment of computer system 101.

In contrast, objects 710*b* and 714*a* have been recentered to viewpoint 726*a* of the user. In some embodiments, the relative locations and/or orientations of objects 710*b* and 714*a* relative to viewpoint 726*a* are the same as the relative locations and/or orientations of objects 710*b* and 714*a* relative to viewpoint 726*b*. For example, object 714*a* is optionally displayed at the same location relative to viewpoint 726*a* in FIG. 7C as it was in FIG. 7A-additionally, object 710*b* is optionally not visible from viewpoint 726*a* in FIG. 7C as it was in FIG. 7A. Further, the spatial arrangement of objects 710*b* and 714*a* relative to one another is optionally also maintained before and after the recentering input. Additional details about the movements of objects 710*b* and 714*a* in response to the recentering input are described with reference to method 800. In this way, virtual objects associated with prior viewpoints of the user can be easily moved to the current viewpoint of the user to facilitate interaction with and/or visibility of those virtual objects.

Figure 7D:
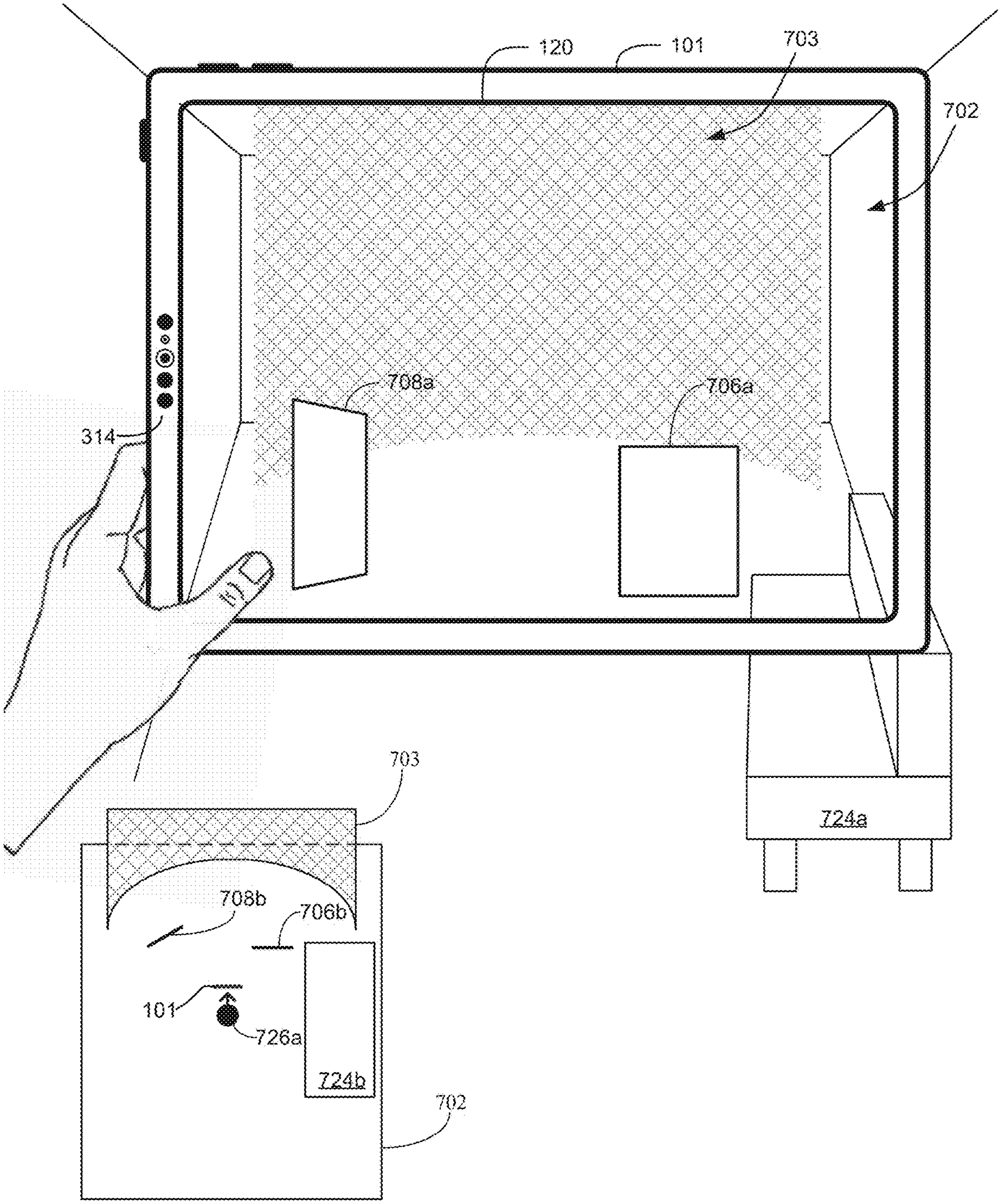

In some embodiments, simulated environments can also be recentered to a new, current viewpoint of the user in ways similar to the ways in which virtual objects are recentered to such a viewpoint. For example, in FIG. 7D, the viewpoint 726*a* of the user is as shown in the overhead view. The user has provided input to place or reposition virtual objects 706*a* and 708*a* at their current positions and/or orientations in three-dimensional environment 702 from viewpoint 726*a* as shown in FIG. 7D. Further, the user has provided input to cause computer system to display simulated environment 703 from viewpoint 726*a*. Simulated environment 703 optionally consumes a portion of three-dimensional environment 702, as shown in the overhead view. Additional details about simulated environment 703 are described with reference to method 800.

Figure 7E:
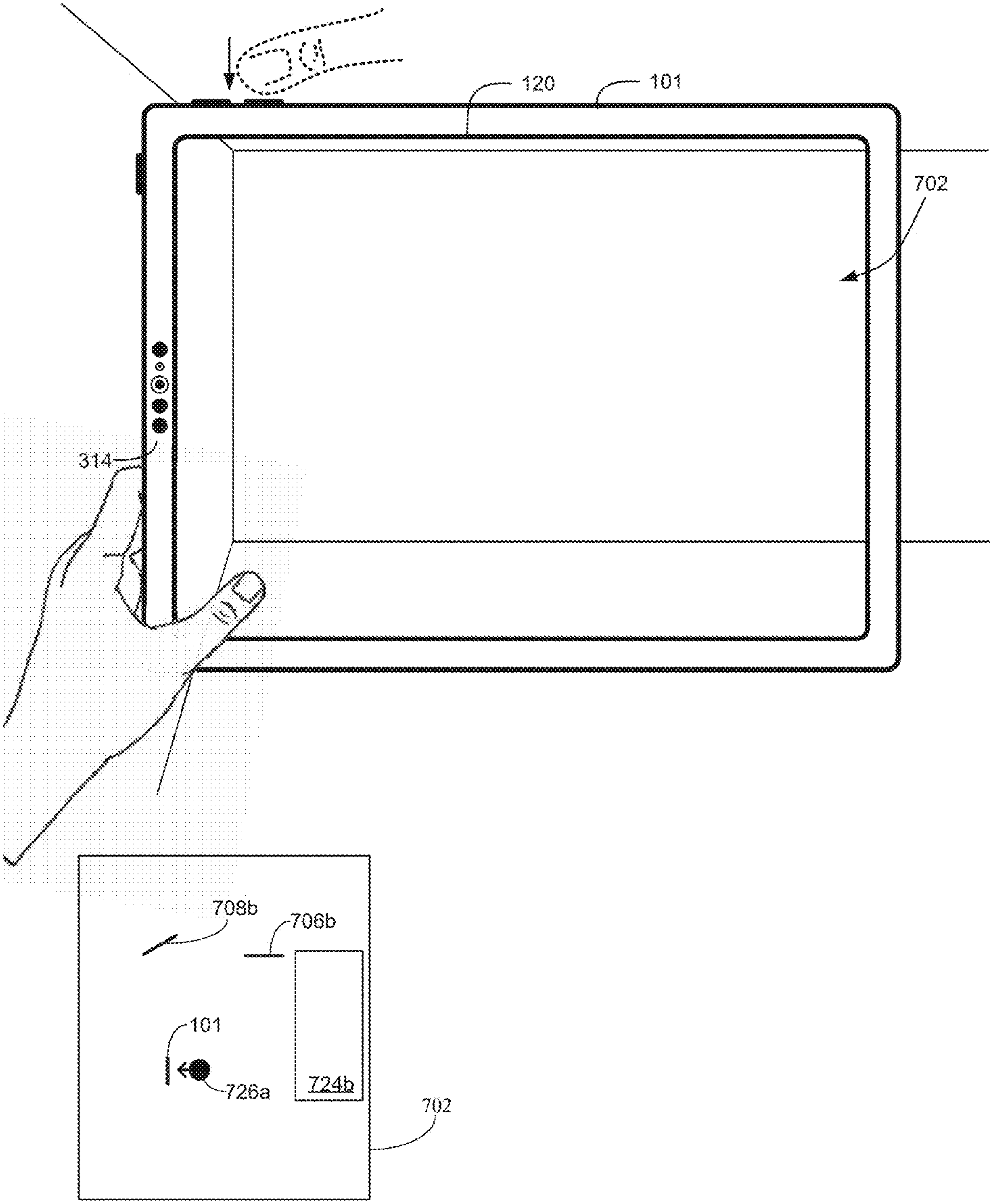

In FIG. 7E, viewpoint 726*a* has changed to that illustrated in the overhead view (e.g., moved down and oriented towards the left wall rather than the back wall in the physical environment). Viewpoint 726*a* optionally moves in the ways previously described and/or as described with reference to method 800. Virtual objects 706*a* and 708*a* are no longer visible via the display generation component 120. Further, in some embodiments, computer system 101 removes simulated environment 703 from three-dimensional environment 702 in response to the movement of the viewpoint 726*a* of the user, as shown in the overhead view. In some embodiments, computer system 101 maintains simulated environment 703 in three-dimensional environment 702 in response to the movement of the viewpoint 726*a* of the user, though simulated environment 703 is no longer in the field of view of the three-dimensional environment 702 from the current viewpoint 726*a* of the user. In FIG. 7E, virtual objects 706*b* and 708*b* are also not in the field of view of the three-dimensional environment 702 from the current viewpoint 726*a* of the user.

In FIG. 7E, computer system 101 is able to detect at least two different inputs: 1) a recentering input (e.g., as described previously); or 2) an input to increase a level of immersion at which three-dimensional environment 702 is displayed. Immersion and levels of immersion are described in more detail with reference to method 800. The recentering input is optionally depression of an input element (e.g., a depressible dial that is also rotatable, as will be described below). The input to increase the level of immersion is optionally rotation of the input element in a particular direction. Additional details about the above inputs are provided with reference to method 800. Computer system 101 optionally responds differently to the two inputs above, as described below.

Figure 7F:
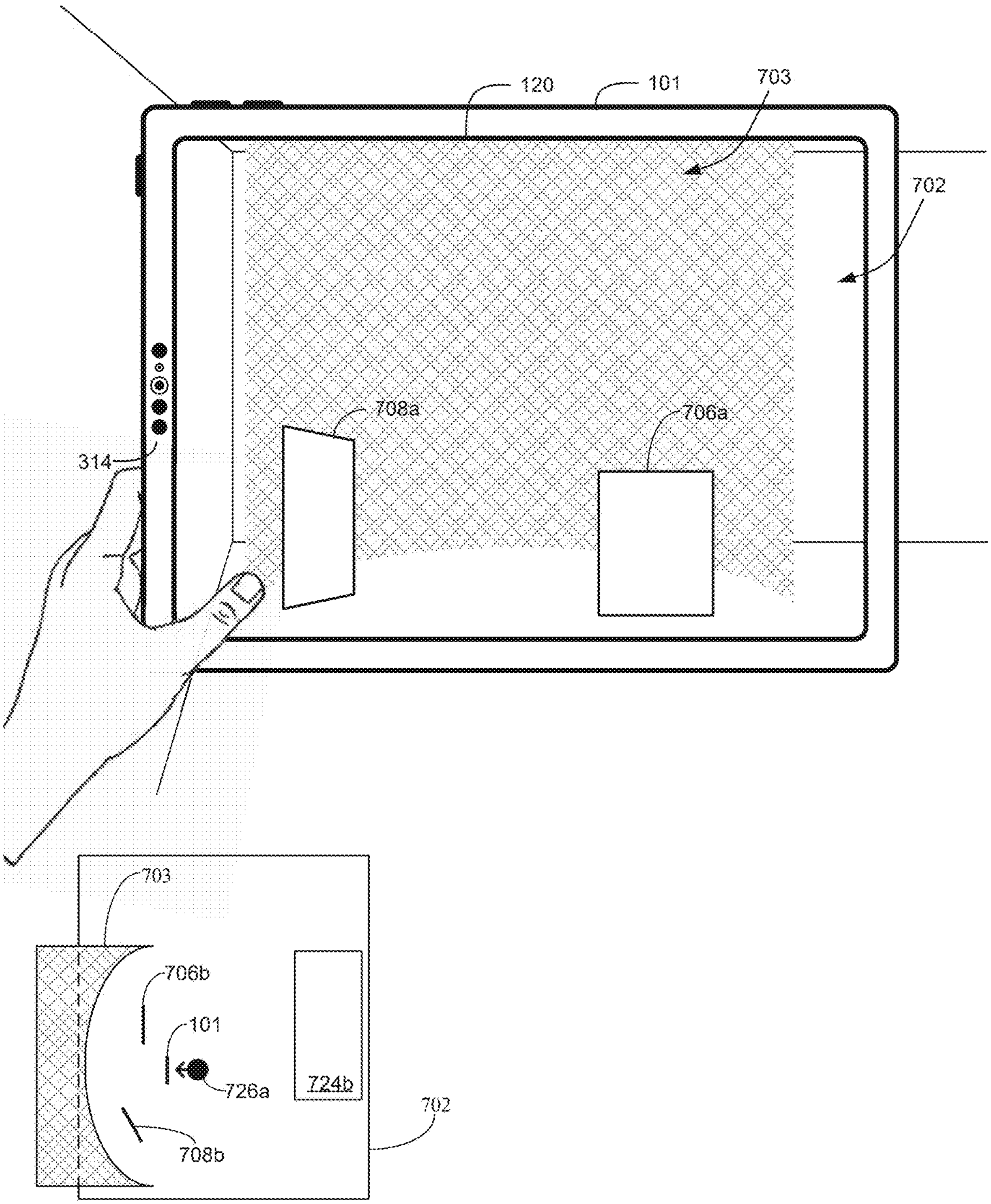
Figure 8C:
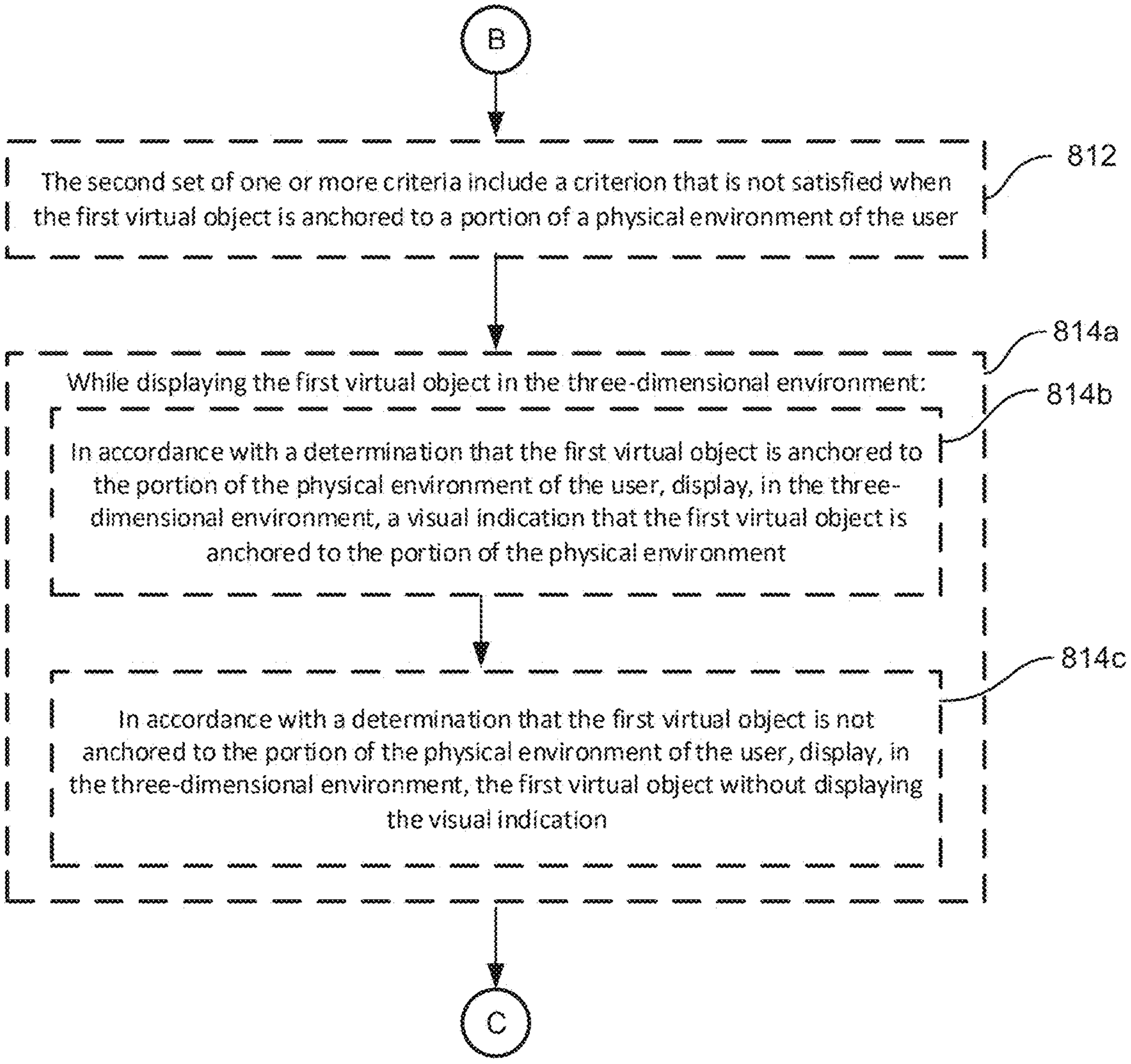
Figure 8D:
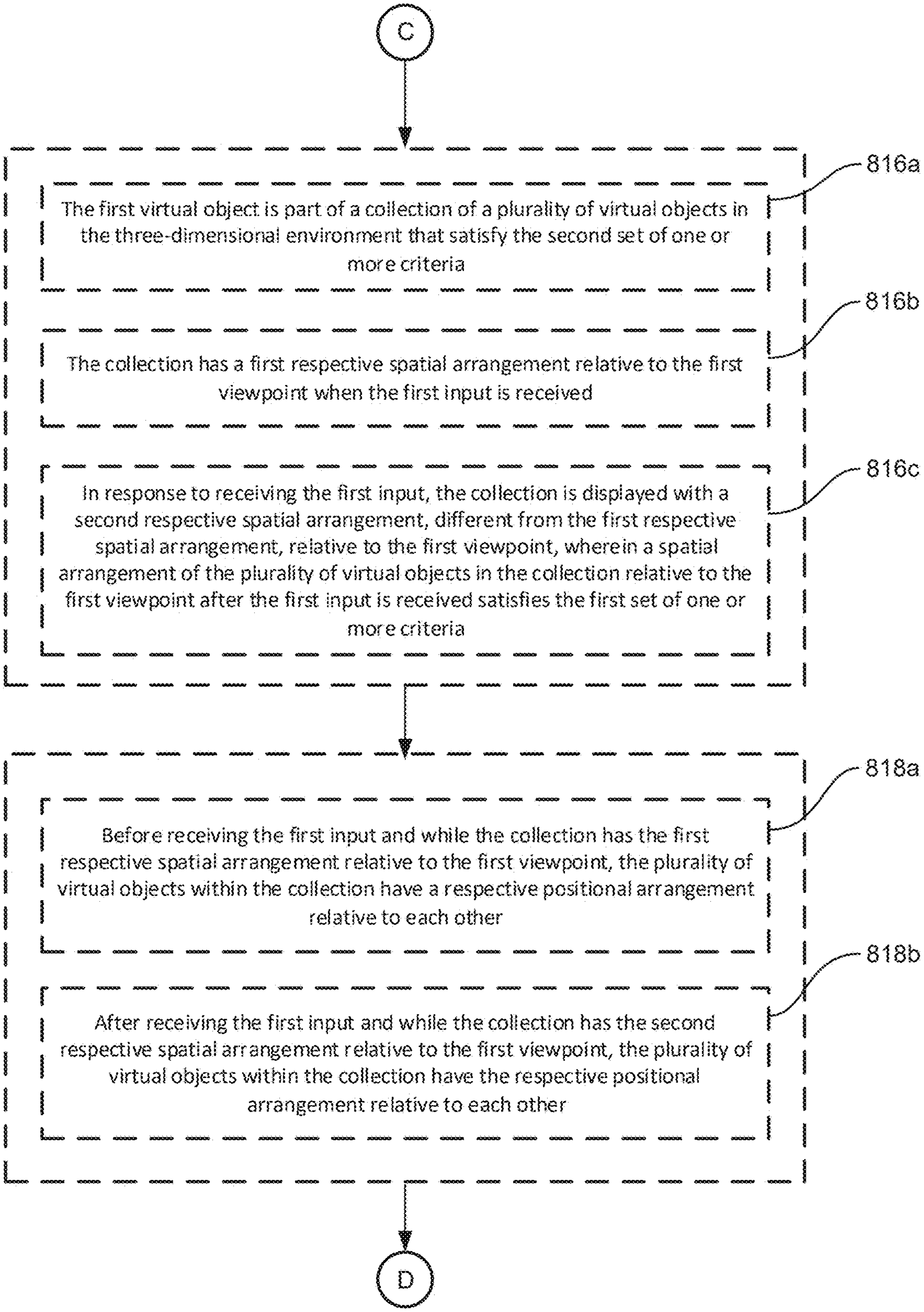
Figure 8E:
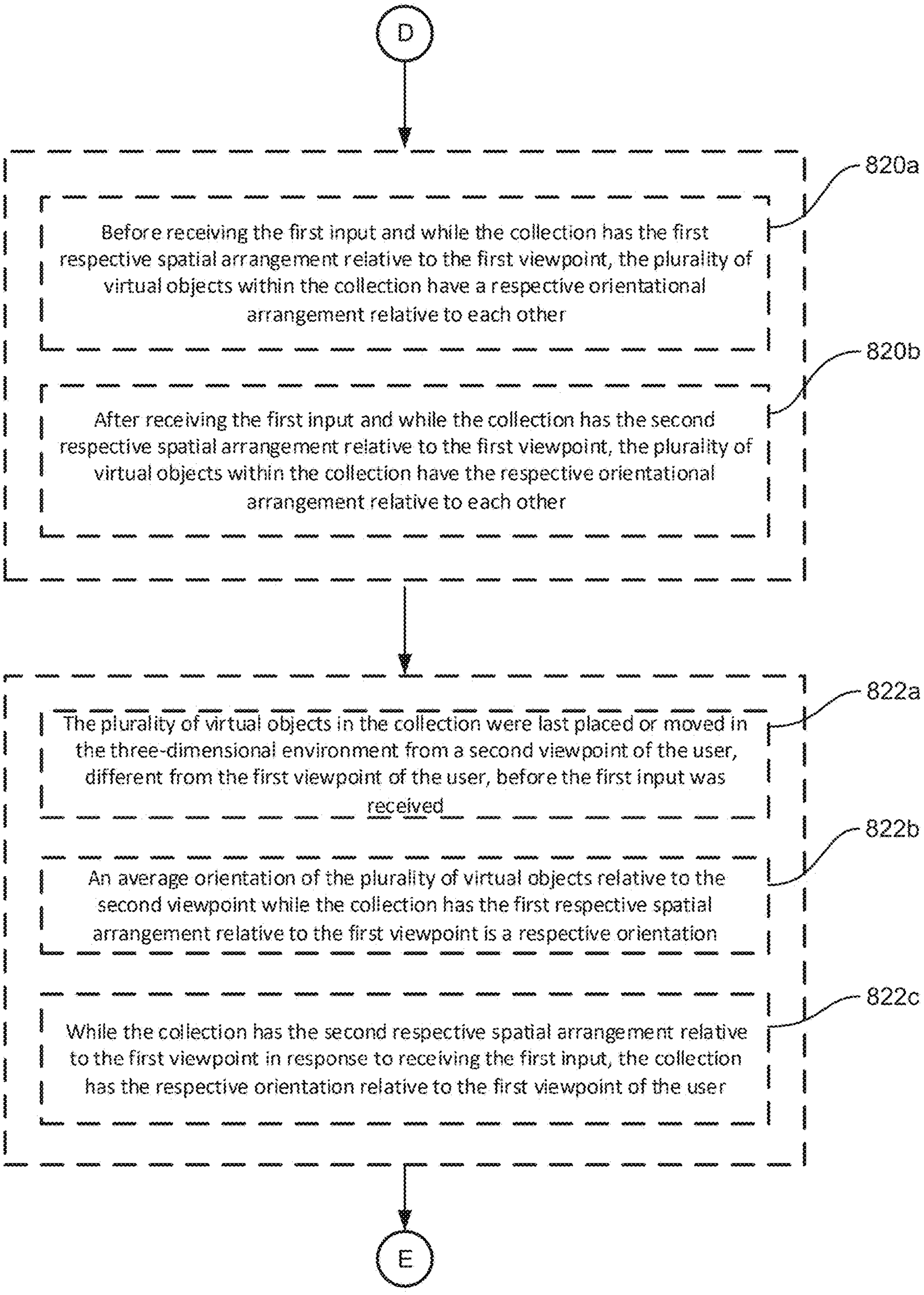
Figure 8F:
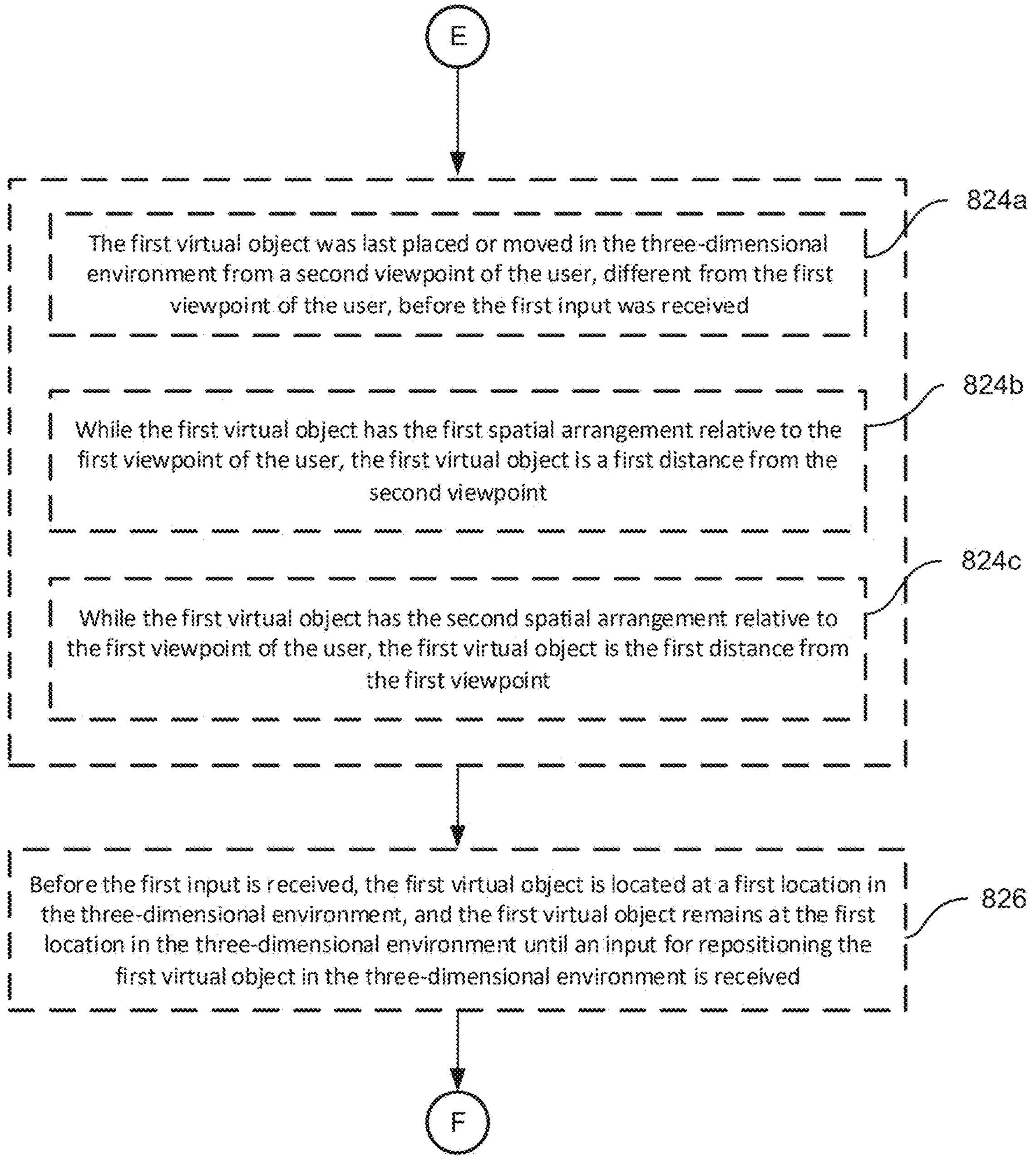
Figure 8G:
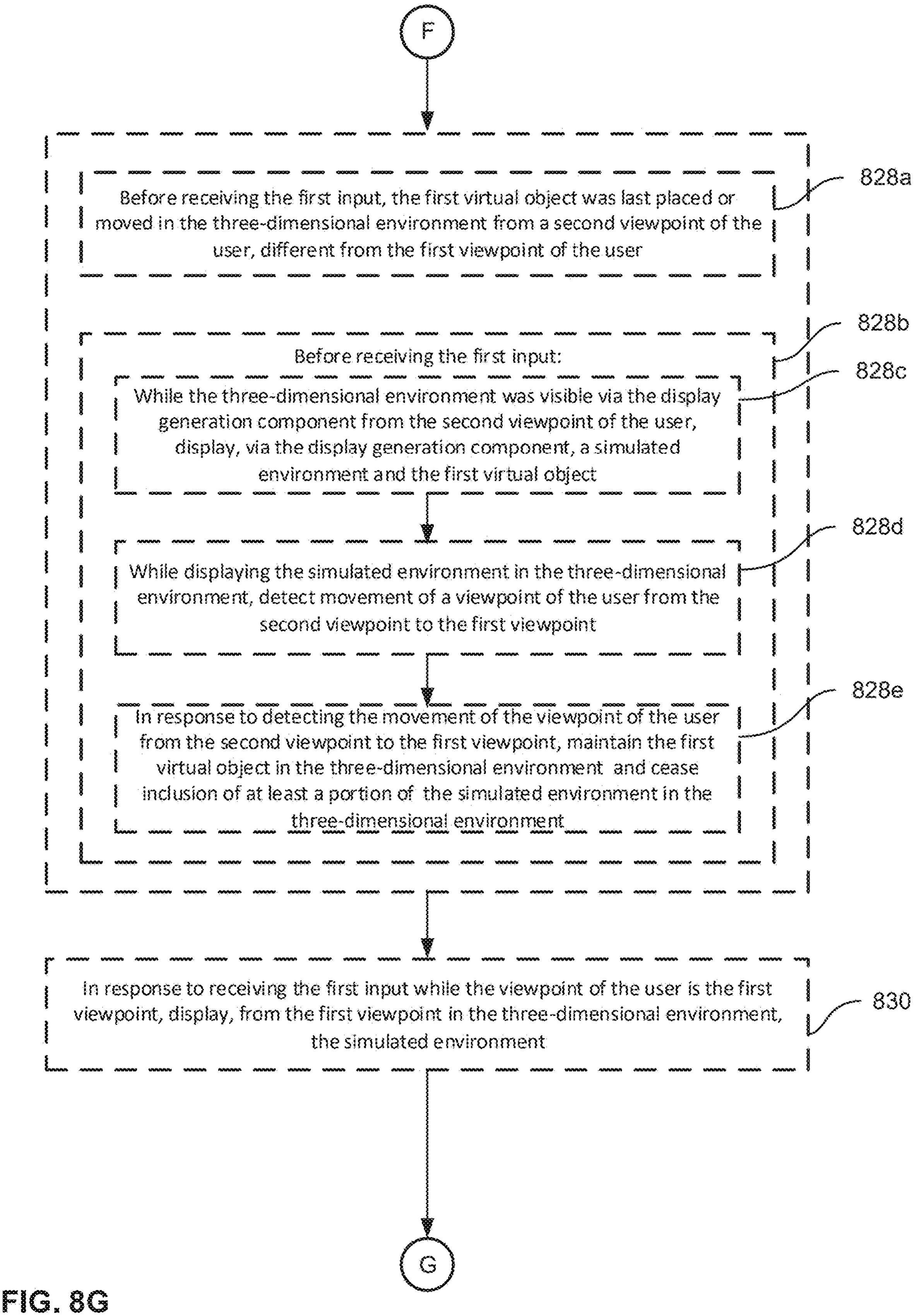
Figure 8H:
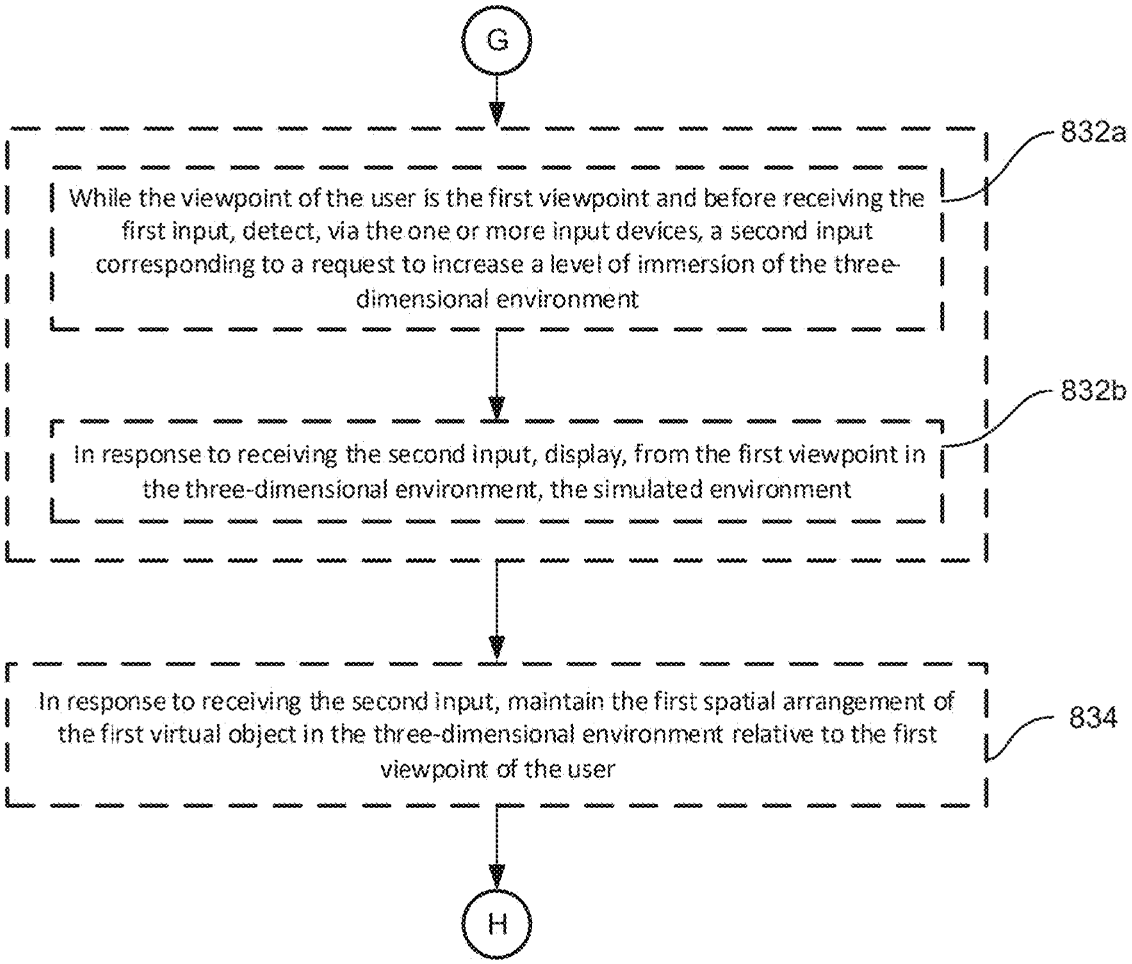
Figure 8I:
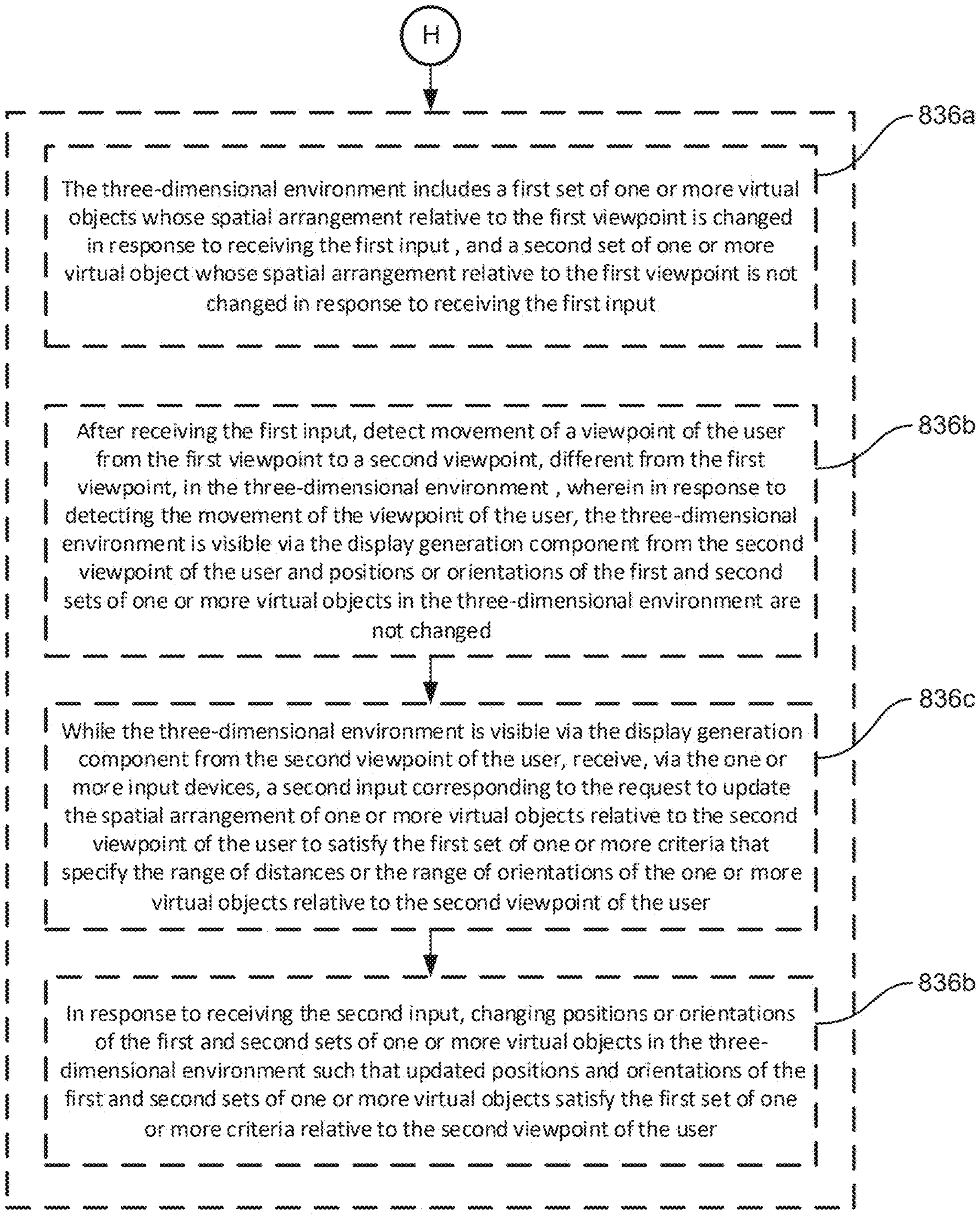

FIG. 7F illustrates an example result of the recentering input described with reference to FIG. 7E. In FIG. 7F, objects 706*a* and 708*a* have been recentered to viewpoint 726*a* of the user. In some embodiments, the relative locations and/or orientations of objects 706*a* and 708*a* relative to viewpoint 726*a* in FIG. 7F are the same as the relative locations and/or orientations of objects 706*a* and 708*a* relative to viewpoint 726*a* in FIG. 7D. For example, object 706*a* is optionally displayed at the same location relative to viewpoint 726*a* in FIG. 7F as it was in FIG. 7D. Further, the relative spatial arrangement of objects 706*a* and 708*a* relative to one another is optionally also maintained before and after the recentering input. Additional details about the movements of objects 706*a* and 708*a* in response to the recentering input are described with reference to method 800.

In addition to objects 706*a* and 708*a* becoming recentered to viewpoint 726*a* in FIG. 7F in response to the recentering input, computer system 101 redisplays simulated environment 703 in three-dimensional environment 702. As shown in FIG. 7F, computer system 101 has placed simulated environment 703 at a different position in three-dimensional environment 702 (e.g., occupies a different portion of three-dimensional environment 702) than it was in FIG. 7D. In some embodiments, the position and/or orientation of simulated environment 703 is based on the location and/or orientation of viewpoint 726*a* in FIG. 7F. For example, simulated environment 703 is optionally placed at the same distance from viewpoint 726*a* in FIG. 7F as it was from viewpoint 726*a* in FIG. 7D. Additionally or alternatively, simulated environment 703 is optionally centered on viewpoint 726*a* in FIG. 7F and/or is oriented towards viewpoint 726*a* in FIG. 7F (e.g., the orientation of viewpoint 726*a* is directed towards the center of simulated environment 703 and/or the orientation of simulated environment 703 is directed towards viewpoint 726*a*). Additional details about the display of simulated environment 703 in response to the recentering input are provided with reference to method 800.

In contrast to the recentering input, if computer system 101 in FIG. 7E had detected an input to increase the level of immersion at which computer system was displaying three-dimensional environment 702, computer system 101 would have optionally redisplayed simulated environment 703 in the ways described above-however, virtual objects 706*a* and 708*a* would have optionally not been recentered to the viewpoint 726*a* in FIG. 7F. For example, objects 706*a* and 708*a* would have optionally remained at their positions and/or orientations in three-dimensional environment illustrated in FIG. 7E. Additional details of the response of computer system 101 to detecting such an input to increase the level of immersion of three-dimensional environment 702 are provided with reference to method 800.

FIGS. 8A-8I is a flowchart illustrating an exemplary method of selectively recentering virtual content to a viewpoint of a user in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input or detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while a three-dimensional environment (e.g., 702) is visible via the display generation component (e.g., the three-dimensional environment is generated, displayed, or otherwise caused to be viewable by the computer system (e.g., a computer-generated reality (CGR) environment such as a virtual reality (VR) environment, a mixed reality (MR) environment, or an augmented reality (AR) environment)), the three-dimensional environment including a first virtual object having a first spatial arrangement relative to a first viewpoint of a user of the three-dimensional environment which is a current viewpoint of the user of the computer system, such as objects 706*a*-714*a* relative to the viewpoint 726*a* in FIG. 7B (e.g., the first virtual object is a certain distance from the current viewpoint of the user, and a certain orientation relative to the current viewpoint of the user (e.g., higher and to the right of the current viewpoint of the user). In some embodiments, the first virtual object was placed at its current location in the three-dimensional environment by the user of the computer system, whether the viewpoint of the user was the current viewpoint of the user or a previous viewpoint of the user. In some embodiments, the first viewpoint of the user corresponds to a current location and/or orientation of the user in a physical environment of the user, computer system and/or display generation component, and the computer system displays at least some portions of the three-dimensional environment from a viewpoint corresponding to the current location and/or orientation of the user in the physical environment. In some embodiments, the first virtual object is a user interface of an application, a representation of content (e.g., image, video, audio, or music), a three-dimensional rendering of an object (e.g., a tent, a building, or a car) or any other object that does not exist in the physical environment of the user), the computer system (e.g., 101) receives (802*a*), via the one or more input devices, a first input corresponding to a request to update a spatial arrangement of one or more virtual objects relative to the first viewpoint of the user to satisfy a first set of one or more criteria that specify a range of distances or a range of orientations of the one or more virtual objects relative to the first viewpoint of the user, such as in the input detected in FIG. 7B (e.g., a "recentering" input, as described in more detail below and/or methods 1000 and/or 1400). In some embodiments, the three-dimensional environment includes one or more virtual objects (e.g., the first virtual object), such as application windows, operating system elements, representations of other users, and/or content items. In some embodiments, the three-dimensional environment includes representations of physical objects in the physical environment of the computer system. In some embodiments, the representations of physical objects are displayed in the three-dimensional environment via the display generation component (e.g., virtual or video passthrough). In some embodiments, the representations of physical objects are views of the physical objects in the physical environment of the computer system visible through a transparent portion of the display generation component (e.g., true or real passthrough). In some embodiments, the computer system displays the three-dimensional environment from the viewpoint of the user at a location in the three-dimensional environment corresponding to the physical location of the computer system, user and/or display generation component in the physical environment of the computer system. In some embodiments, the input corresponding to the request to update the spatial arrangement of the objects relative to the viewpoint of the user to satisfy the first one or more criteria is an input directed to a hardware button, or switch. in communication with (e.g., incorporated with) the computer system. In some embodiments, the first input is an input directed to a selectable option displayed via the display generation component. In some embodiments, the first one or more criteria include criteria satisfied when an interactive portion of the virtual objects are oriented towards the viewpoint of the user, the virtual objects do not obstruct the view of other virtual objects from the viewpoint of the user, the virtual objects are within a threshold distance (e.g., 10, 20, 30, 40, 50, 100, 200, 300, 400, 500, 1000 or 2000 centimeters) of the viewpoint of the user, and/or the virtual objects are within a threshold distance (e.g., 1, 5, 10, 20, 30, 40, 50, 100, 200, 300, 400, 500, 1000 or 2000 centimeters) of each other, and/or the like. In some embodiments, the first input is different from an input requesting to update the positions of one or more objects in the three-dimensional environment (e.g., relative to the viewpoint of the user), such as inputs for manually moving the objects in the three-dimensional environment.

In some embodiments, in response to receiving the first input (802*b*), in accordance with a determination that the first virtual object satisfies a second set of one or more criteria, such as objects 714*a* and 710*a* in FIG. 7B (e.g., as will be described in more detail below, the second one or more criteria are optionally satisfied when the first virtual object was last placed or moved in the three-dimensional environment while the viewpoint of the user was a different viewpoint than the first viewpoint and/or when the prior viewpoint from which the first virtual object was last placed or moved in the three-dimensional environment is greater than a threshold distance (e.g., 1, 3, 5, 10, 20, 30, 50, 100, 200, 500 or 1000 cm) from the first viewpoint), the computer system (e.g., 101) displays (802*c*), in the three-dimensional environment, the first virtual object having a second spatial arrangement, different from the first spatial arrangement, relative to the first viewpoint of the user, wherein the second spatial arrangement of the first virtual object satisfies the first set of one or more criteria, such as objects 714*a* and 710*a* in FIG. 7C. In some embodiments, displaying the first virtual object with the second spatial arrangement includes updating the location (e.g., and/or pose) of the first virtual object while maintaining the first viewpoint of the user at a constant location in the three-dimensional environment. In some embodiments, in response to the first input, the computer system updates the position of the first virtual object from a location not necessarily oriented around the first viewpoint of the user to a location oriented around the first viewpoint of the user.

In some embodiments, in response to receiving the first input (802*b*), in accordance with a determination that the first virtual object does not satisfy the second set of one or more criteria, such as objects 706*a* and 708*a* in FIG. 7B, the computer system (e.g., 101) maintains (802*d*) the first spatial arrangement of the first virtual object in the three-dimensional environment relative to the first viewpoint of the user, such as shown with objects 706*a* and 708*a* in FIG. 7C (e.g., not changing the location of the first virtual object in the three-dimensional environment). In some embodiments, the first virtual object is visible via the display generation component from the current viewpoint of the user. In some embodiments, the first virtual object is not visible via the display generation component from the current viewpoint of the user. In some embodiments, the computer system similarly changes (or does not change) the locations of other virtual objects in the three-dimensional environment in response to the first input. In some embodiments, inputs described with reference to method 800 are or include air gesture inputs. Changing the location of some, but not all, objects in the three-dimensional environment in response to the first input reduces the number of inputs needed to appropriately place objects relative to the viewpoint of the user in response to the first input.

In some embodiments, when the first input is detected, the three-dimensional environment includes the first virtual object and a second virtual object, such as objects 714*a* and 706*a* in FIG. 7B, respectively (e.g., having one or more characteristics of the first virtual object), the second virtual object having a third spatial arrangement relative to the first viewpoint of the user (e.g., the second virtual object is a certain distance from the current viewpoint of the user, and a certain orientation relative to the current viewpoint of the user) (804*a*).

In some embodiments, in response to receiving the first input, the first virtual object has the second spatial arrangement relative to the first viewpoint of the user and the second virtual object has the third spatial arrangement relative to the user (804*b*), such as shown with objects 714*a* and 706*a* in FIG. 7C. In some embodiments, the first virtual object is recentered in response to the first input as described above, but the second virtual object is not recentered in response to the first input (e.g., remains at its current location and/or orientation relative to the first viewpoint of the user). In some embodiments, the second virtual object is not recentered because its current location and/or orientation already satisfy the first set of one or more criteria. In some embodiments, the second virtual object is not recentered because it was last placed or positioned in the three-dimensional environment from the first viewpoint of the user or is anchored to a physical object, both of which are described in greater detail below. Changing the location of some, but not all, objects in the three-dimensional environment in response to the first input reduces the number of inputs needed to appropriately place objects relative to the viewpoint of the user in response to the first input.

In some embodiments, the second set of one or more criteria include a criterion that is not satisfied when the first virtual object was last placed or moved in the three-dimensional environment from a viewpoint that satisfies a third set of one or more criteria relative to the first viewpoint of the user, such as objects 706*a* and 708*a* being last placed or moved in environment 702 from viewpoint 726*a* in FIG. 7B (e.g., corresponding to a current physical position or orientation of the user in a physical environment of the user) (806). In some embodiments, the current viewpoint of the user (e.g., the location and/or orientation of the current viewpoint) correspond to a current location and/or orientation of the user (e.g., the head or torso of the user) in the physical environment of the user. In some embodiments, virtual objects that were last placed or positioned in the three-dimensional environment from the first viewpoint of the user (e.g., within a threshold distance of and/or within a threshold orientation of the current viewpoint of the user, as described in more detail below) are not recentered in response to the first input, whereas virtual objects that were last placed or positioned in the three-dimensional environment from a viewpoint different from the first viewpoint of the user (or sufficiently different in location and/or orientation from the first viewpoint of the user) are recentered in response to the first input. Changing the location of objects last placed or positioned from a prior viewpoint of the user in the three-dimensional environment in response to the first input reduces the number of inputs needed to appropriately place objects relative to the viewpoint of the user in response to the first input.

In some embodiments, the third set of one or more criteria include a criterion that is satisfied when the viewpoint is within a threshold distance (e.g., 3, 5, 50, 100, 1000, 5000 or 10000 cm) of the first viewpoint (808), such as if objects 706*a* and 708*a* were last placed or moved in environment 702 from a viewpoint within the threshold distance of viewpoint 726*a* in FIG. 7B. Thus, in some embodiments, if the viewpoint from which the first virtual object was last placed or positioned in the three-dimensional environment is further than the threshold distance from the current viewpoint of the user, the criterion is not satisfied, and if the viewpoint from which the first virtual object was last placed or positioned in the three-dimensional environment is closer than the threshold distance from the current viewpoint of the user, the criterion is satisfied. Changing the location of objects last placed or positioned from a prior viewpoint of the user that is relatively far from the current viewpoint in the three-dimensional environment in response to the first input reduces the number of inputs needed to appropriately place objects relative to the viewpoint of the user in response to the first input.

In some embodiments, the third set of one or more criteria include a criterion that is satisfied when the viewpoint has an orientation in the three-dimensional environment that is within a threshold orientation (e.g., within 1, 3, 5, 10, 20, 30, 45 or 90 degrees) of an orientation of the first viewpoint in the three-dimensional environment (810), such as if objects 706*a* and 708*a* were last placed or moved in environment 702 from a viewpoint within the threshold orientation of viewpoint 726*a* in FIG. 7B. Thus, in some embodiments, if the orientation of the viewpoint from which the first virtual object was last placed or positioned in the three-dimensional environment is greater than the threshold orientation away from the orientation of the current viewpoint of the user, the criterion is not satisfied, and if the orientation of the viewpoint from which the first virtual object was last placed or positioned in the three-dimensional environment is less than the threshold orientation away from the orientation of the current viewpoint of the user, the criterion is satisfied. Changing the location of objects last placed or positioned from a prior viewpoint of the user that is relatively off-angle relative to the current viewpoint in the three-dimensional environment in response to the first input reduces the number of inputs needed to appropriately place objects relative to the viewpoint of the user in response to the first input.

In some embodiments, the second set of one or more criteria include a criterion that is not satisfied when the first virtual object is anchored to a portion of a physical environment of the user, such as object 712*a* being anchored to the back wall of the room in FIG. 7B (e.g., anchored to a surface of a physical object in the physical environment of the user, such as a wall surface, or a table surface) (812). In some embodiments, the first virtual object becomes anchored to a portion of (e.g., a surface of) a physical object in response to the computer system detecting input for moving the first virtual object to within a threshold distance (e.g., 0.1, 0.3, 0.5, 1, 3, 5, 10, 20, 30 or 50 cm) of the portion of the physical object, which optionally causes the first virtual object to snap to the location and/or orientation of the portion of the physical object. Objects that are thus anchored to a physical object are optionally not recentered in response to the first input. In some embodiments, the criterion is satisfied if the first virtual object is not anchored to a physical object. Changing the location of objects that are not anchored to physical objects in the three-dimensional environment in response to the first input reduces the number of inputs needed to appropriately place objects relative to the viewpoint of the user in response to the first input.

In some embodiments, while displaying the first virtual object in the three-dimensional environment (814*a*), in accordance with a determination that the first virtual object is anchored to the portion of the physical environment of the user, the computer system (e.g., 101) displays (814*b*), in the three-dimensional environment, a visual indication that the first virtual object is anchored to the portion of the physical environment, such as virtual drop shadow 713 in FIGS. 7A-7B (e.g., a virtual drop shadow of the first virtual object displayed on the portion of the physical environment as if the drop shadow were cast onto the portion of the physical environment by the first virtual object and/or an icon displayed in association with the first virtual object indicating that the first virtual object is anchored or pinned to the portion of the physical environment (e.g., a pin icon)); and In some embodiments, while displaying the first virtual object in the three-dimensional environment (814*a*), in accordance with a determination that the first virtual object is not anchored to the portion of the physical environment of the user, the computer system (e.g., 101) displays (814*c*), in the three-dimensional environment, the first virtual object without displaying the visual indication, such as displaying object 714*a* without a virtual drop shadow in FIGS. 7A-7B (e.g., the drop shadow and/or the icon are not displayed unless or until the first virtual object is anchored to a portion of the physical environment). Indicating the anchor status of the first virtual object provides feedback about the state of the first virtual object.

In some embodiments, the first virtual object is part of a collection of a plurality of virtual objects in the three-dimensional environment that satisfy the second set of one or more criteria, such as the collection of objects 710*a* and 714*a* in FIG. 7B (e.g., the plurality of virtual objects were last placed or positioned in the three-dimensional environment from the same prior viewpoint of the user) (816*a*).

In some embodiments, the collection has a first respective spatial arrangement relative to the first viewpoint when the first input is received (816*b*), such as the spatial arrangement of the collection of objects 710*a* and 714*a* relative to viewpoint 726*a* in FIG. 7B.

In some embodiments, in response to receiving the first input, the collection is displayed with a second respective spatial arrangement, different from the first respective spatial arrangement, relative to the first viewpoint, such as the spatial arrangement of the collection of objects 710*a* and 714*a* relative to viewpoint 726*a* in FIG. 7C (e.g., the collection of the plurality of virtual objects is recentered (e.g., moved and/or reoriented), as a group, in response to the first input), wherein a spatial arrangement of the plurality of virtual objects in the collection relative to the first viewpoint after the first input is received satisfies the first set of one or more criteria (e.g., the virtual objects within the collection are recentered to positions and/or orientations that satisfy the first set of one or more criteria) (816*c*). In some embodiments, virtual objects are recentered in or based on groups in response to a recentering input. Groups of virtual objects that were last placed or positioned in the three-dimensional environment from the same prior viewpoint of the user are optionally recentered to the first viewpoint as a group, together (e.g., the virtual objects are moved to their updated locations and/or orientations together). In some embodiments, the three-dimensional environment includes a plurality of different collections of virtual objects that were last placed or positioned in the three-dimensional environment from different shared prior viewpoints of the user, and that are concurrently recentered as groups of virtual objects in response to the first input. In some embodiments, the three-dimensional environment includes a collection of virtual objects that were last placed or positioned in the three-dimensional environment from the first viewpoint of the user, and thus are not recentered as a group in response to the first input. Recentering virtual objects as groups of objects reduces the number of inputs needed to appropriately place objects relative to the viewpoint of the user in response to the first input.

In some embodiments, before receiving the first input and while the collection has the first respective spatial arrangement relative to the first viewpoint, the plurality of virtual objects within the collection have a respective positional arrangement relative to each other, such as the positional arrangement between objects 710*a* and 714*a* in FIG. 7B (e.g., the virtual objects in the collection have particular positions relative to one another, such as four virtual objects being positioned at the vertices of a square arrangement) (818*a*)

In some embodiments, after receiving the first input and while the collection has the second respective spatial arrangement relative to the first viewpoint, the plurality of virtual objects within the collection have the respective positional arrangement relative to each other (818*b*), such as the positional arrangement between objects 710*a* and 714*a* in FIG. 7C. For example, the relative positions of the virtual objects in the collection of virtual objects are maintained in response to the first input, even though the collection of virtual objects is repositioned and/or reoriented in the three-dimensional environment in response to the first input (e.g., the four virtual objects remain positioned at the vertices of the same square arrangement in response to the first input, though the square arrangement has a different position and/or orientation in the three-dimensional environment). Maintaining the positional arrangement of the virtual objects in the collection reduces the number of inputs needed to appropriately place objects relative to the viewpoint of the user in response to the first input.

In some embodiments, before receiving the first input and while the collection has the first respective spatial arrangement relative to the first viewpoint, the plurality of virtual objects within the collection have a respective orientational arrangement relative to each other, such as the orientational arrangement between objects 710*a* and 714*a* in FIG. 7B (e.g., the virtual objects in the collection have particular orientations relative to one another, such as four virtual objects being oriented such that the virtual objects are parallel to each other) (820*a*)

In some embodiments, after receiving the first input and while the collection has the second respective spatial arrangement relative to the first viewpoint, the plurality of virtual objects within the collection have the respective orientational arrangement relative to each other (820*b*), such as the orientational arrangement between objects 710*a* and 714*a* in FIG. 7C. For example, the relative orientations of the virtual objects in the collection of virtual objects are maintained in response to the first input, even though the collection of virtual objects is repositioned and/or reoriented in the three-dimensional environment in response to the first input (e.g., the four virtual objects remain parallel to each other, though the virtual objects have new positions and/or orientations in the three-dimensional environment). Maintaining the orientational arrangement of the virtual objects in the collection reduces the number of inputs needed to appropriately place objects relative to the viewpoint of the user in response to the first input.

In some embodiments, the plurality of virtual objects in the collection were last placed or moved in the three-dimensional environment from a second viewpoint of the user, different from the first viewpoint of the user, before the first input was received, such as from viewpoint 726*a* in FIG. 7A or viewpoint 726*b* in FIG. 7B (e.g., the second viewpoint is sufficiently different from the first viewpoint, as previously described, to result in the collection of virtual objects to be recentered in response to the first input) (822*a*).

In some embodiments, an average orientation of the plurality of virtual objects relative to the second viewpoint while the collection has the first respective spatial arrangement relative to the first viewpoint is a respective orientation (822*b*), such as the average orientation of objects 714*a* and 710*a* relative to viewpoint 726*a* in FIG. 7A. For example, the collection of virtual objects includes three virtual objects that have their own respective orientations relative to the second viewpoint of the user (e.g., a first of the objects was relatively head on and/or in the center of the second viewpoint, a second of the objects was approximately 45 degrees to the right of center of the second viewpoint, and a third of the objects was approximately 60 degrees to the right of center of the second viewpoint). The relative orientation of the respective virtual objects is optionally relative to and/or corresponds to the orientation of the shoulders, head and/or chest of the user when the user last placed or positioned the respective virtual objects from the second viewpoint. In some embodiments, the average of the above orientations is the average of the orientations of the three virtual objects described above.

In some embodiments, while the collection has the second respective spatial arrangement relative to the first viewpoint in response to receiving the first input, the collection has the respective orientation relative to the first viewpoint of the user (822*c*), such as the average orientation of objects 714*a* and 710*a* relative to viewpoint 726*a* in FIG. 7C. For example, the group or collection of virtual objects that is recentered to the first viewpoint in response to the first input is placed in the three-dimensional environment at an orientation relative to the first viewpoint that corresponds to the average of the relative orientations of the virtual objects in the collection of virtual objects relative to the second viewpoint (e.g., when those objects were last placed or positioned in the three-dimensional environment). Thus if the average orientation of the virtual objects relative to the second viewpoint was 30 degrees to the right of the center line of the second viewpoint, the collection of virtual object is optionally oriented/placed 30 degrees to the right of the center line of the first viewpoint (e.g., while the relative positions and/or orientations of the virtual objects within the collection remain unchanged). Placing the collection of virtual objects at an average orientation relative to the first viewpoint reduces the number of inputs needed to appropriately place objects relative to the viewpoint of the user in response to the first input.

In some embodiments, the first virtual object was last placed or moved in the three-dimensional environment from a second viewpoint of the user, different from the first viewpoint of the user, before the first input was received, such as from viewpoint 726*a* in FIG. 7A or viewpoint 726*b* in FIG. 7B (e.g., the second viewpoint is sufficiently different from the first viewpoint, as previously described, to result in the collection of virtual objects to be recentered in response to the first input) (824*a*).

In some embodiments, while the first virtual object has the first spatial arrangement relative to the first viewpoint of the user, the first virtual object is a first distance from the second viewpoint (e.g., and a different distance from the first viewpoint) (824*b*), such as the distance of object 714*a* from viewpoint 726*a* in FIG. 7A.

In some embodiments, while the first virtual object has the second spatial arrangement relative to the first viewpoint of the user, the first virtual object is the first distance from the first viewpoint (e.g., and a different distance from the second viewpoint) (824*c*), such as the distance of object 714*a* from viewpoint 726*a* in FIG. 7C. Thus, in some embodiments, when virtual objects are recentered, their distance(s) from the current viewpoint of the user is (are) based on (e.g., the same as) their distance(s) from the prior viewpoint of the user from which those virtual objects were last placed or positioned in the three-dimensional environment. Placing recentered virtual objects at distances from the viewpoint corresponding to their prior distances from a prior viewpoint of the user reduces the number of inputs needed to appropriately place objects relative to the viewpoint of the user in response to the first input.

In some embodiments, before the first input is received, the first virtual object is located at a first location in the three-dimensional environment, such as the location of object 714*a* in FIG. 7B, and the first virtual object remains at the first location in the three-dimensional environment until an input for repositioning the first virtual object in the three-dimensional environment is received (826). In some embodiments, the first virtual object remains at its location in the three-dimensional environment (e.g., is not recentered) until an input for recentering is received or an input for moving the first virtual object (e.g., individually, separate from a recentering input) in the three-dimensional environment is received. In some embodiments, other inputs, such as an input for changing the viewpoint of the user, do not cause the first virtual object to change its location in the three-dimensional environment. Maintaining the position and/or orientation of the first virtual object in the three-dimensional environment if no recentering input is received reduces the number of inputs needed to appropriately place objects relative to the viewpoint of the user in response to the first input.

In some embodiments, before receiving the first input, the first virtual object was last placed or moved in the three-dimensional environment from a second viewpoint of the user, different from the first viewpoint of the user (828*a*), such as object 708*a* placed from viewpoint 726*a* in FIG. 7D.

In some embodiments, before receiving the first input (828*b*), while the three-dimensional environment was visible via the display generation component from the second viewpoint of the user, the computer system (e.g., 101) displays (828*c*), via the display generation component, a simulated environment and the first virtual object, such as simulated environment 703 in FIG. 7D. For example, while the viewpoint of the user was the second viewpoint, the user provided input to the computer system to display a simulated environment in the three-dimensional environment that was visible from the second viewpoint of the user. In some embodiments, the simulated environment occupies a portion of the three-dimensional environment that is visible via the display generation component.

In some embodiments, before receiving the first input (828*b*), while displaying the simulated environment in the three-dimensional environment, the computer system (e.g., 101) detects (828*d*) movement of a viewpoint of the user from the second viewpoint to the first viewpoint, such as from FIG. 7D to 7E (e.g., movement and/or change in orientation of the user in the physical environment of the user corresponding to movement of the viewpoint of the user from the second viewpoint to the first viewpoint).

In some embodiments, before receiving the first input (828*b*), in response to detecting the movement of the viewpoint of the user from the second viewpoint to the first viewpoint, the computer system (e.g., 101) maintains (828*e*) the first virtual object in the three-dimensional environment, such as shown in the overhead view in FIG. 7E (e.g., maintaining the location and/or orientation of the first virtual object in the three-dimensional environment) and ceases inclusion of at least a portion of (or all of) the simulated environment in the three-dimensional environment, such as shown with the absence of simulated environment 703 in the overhead view in FIG. 7E (e.g., the simulated environment ceases being in existence in the three-dimensional environment). In some embodiments, the change in the viewpoint from the second viewpoint to the first viewpoint must be sufficiently large (e.g., as described previously with respect to the third set of one or more criteria) for the computer system to cease inclusion of the simulated environment in the three-dimensional environment in response to the change in the viewpoint of the user. In some embodiments, the simulated environment remains in the three-dimensional environment in response to the change in the viewpoint of the user, but is no longer visible via the display generation component (e.g., because the simulated environment is out of the field of view of the user). Ceasing inclusion of the simulated environment causes the computer system to automatically reduce resource usage and clutter in the three-dimensional environment.

In some embodiments, in response to receiving the first input while the viewpoint of the user is the first viewpoint, such as in FIG. 7E, the computer system (e.g., 101) displays (830), from the first viewpoint in the three-dimensional environment, the simulated environment, such as in FIG. 7F (e.g., optionally without changing a level of immersion of the three-dimensional environment, as described below). In some embodiments, the simulated environment is redisplayed and/or recentered to the first viewpoint in the three-dimensional environment (e.g., the new location and/or orientation at which the simulated environment is displayed in the three-dimensional environment is different from the location and/or orientation in the three-dimensional environment at which the simulated environment was last displayed from the second viewpoint of the user). For example, if the simulated environment was last displayed facing a first wall of a physical room of the user and occupying a first portion of the three-dimensional environment, when the simulated environment is redisplayed from the first viewpoint, the simulated environment is facing a second wall (different from the first) of the physical room of the user and occupying a second portion (different from the first) of the three-dimensional environment. The simulated environment is optionally redisplayed such that it is facing the first viewpoint of the user, and is centered on the first viewpoint of the user. The simulated environment is optionally redisplayed and/or recentered along with the recentering of the first virtual object, as previously described. Redisplaying the simulated environment in response to the first input reduces the number of inputs needed to view the simulated environment in the three-dimensional environment.

In some embodiments, while the viewpoint of the user is the first viewpoint and before receiving the first input, the computer system (e.g., 101) detects (832*a*), via the one or more input devices, a second input corresponding to a request to increase a level of immersion of the three-dimensional environment, such as receiving an input to increase immersion in FIG. 7E. In some embodiments, the second input includes rotation of a rotatable mechanical input element that is integrated with and/or in communication with the computer system. In some embodiments, rotating the rotatable mechanical input element in a first direction is an input to increase the level of immersion at which the three-dimensional environment is visible via the display generation component. In some embodiments, rotating the rotatable mechanical input element in the opposite direction is an input to decrease the level of immersion at which the three-dimensional environment is visible via the display generation component.

In some embodiments, a level of immersion includes an associated degree to which the content displayed by the computer system (e.g., a simulated environment or virtual objects, otherwise referred to as "virtual content") obscures background content (e.g., content other than the virtual content) around/behind the virtual content, optionally including the number of items of background content that are visible and the visual characteristics (e.g., colors, contrast, opacity) with which the background content is visible, and/or the angular range of the content displayed via the display generation component (e.g., 60 degrees of content displayed at low immersion, 120 degrees of content displayed at medium immersion, 180 degrees of content displayed at high immersion), and/or the proportion of the field of view visible via the display generation occupied by the virtual content (e.g., 33% of the field of view occupied by the virtual content at low immersion, 66% of the field of view occupied by the virtual content at medium immersion, 100% of the field of view occupied by the virtual content at high immersion). In some embodiments, the background content is included in a background over which the virtual content is displayed. In some embodiments, the background content includes user interfaces (e.g., user interfaces generated by the computer system corresponding to applications), virtual objects (e.g., files or representations of other users, generated by the computer system), and/or real objects (e.g., pass-through objects corresponding to real objects in the physical environment around a viewpoint of a user that are visible via the display generation component and/or visible via a transparent or translucent display generation component because the computer system does not obscure/prevent visibility of them through the display generation component). In some embodiments, at a first (e.g., low) level of immersion, the background, virtual and/or real objects are visible in an unobscured manner. For example, a simulated environment with a low level of immersion is optionally concurrently visible with the background content, which is optionally visible with full brightness, color, and/or translucency. In some embodiments, at a second (e.g., higher) level of immersion, the background, virtual and/or real objects are visible in an obscured manner (e.g., dimmed, blurred, or removed from display). For example, a respective simulated environment with a high level of immersion is displayed without the background content being concurrently visible (e.g., in a full screen or fully immersive mode). As another example, a simulated environment displayed with a medium level of immersion is concurrently visible with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, visible with increased transparency) more than one or more second background objects, and one or more third background objects cease to be visible.

In some embodiments, in response to receiving the second input, the computer system (e.g., 101) displays (832*b*), from the first viewpoint in the three-dimensional environment, the simulated environment, such as shown in FIG. 7F (e.g., and optionally displaying the three-dimensional environment at a higher level of immersion than before the second input was received). Thus, in some embodiments, in response to the second input, the simulated environment is redisplayed and/or recentered to the first viewpoint of the user in the same or similar ways as described above with respect to redisplaying and/or recentering the simulated environment in response to the first input. Redisplaying the simulated environment in response to the second input reduces the number of inputs needed to view the simulated environment in the three-dimensional environment.

In some embodiments, in response to receiving the second input, the electronic device maintains the first spatial arrangement of the first virtual object in the three-dimensional environment relative to the first viewpoint of the user, such as if objects 706*a* and 708*a* in FIG. 7F had instead remained at their locations in environment 702 in FIG. 7E (e.g., the first virtual object is not moved or reoriented in the three-dimensional environment in response to the second input) (834). Not recentering the first virtual object in response to the second input reduces the number of inputs needed to appropriately position virtual elements in the three-dimensional environment.

In some embodiments, the three-dimensional environment includes a first set of one or more virtual objects whose spatial arrangement relative to the first viewpoint is changed in response to receiving the first input, such as objects 710*a* and 714*a* in FIG. 7B (e.g., because these virtual objects were last placed or positioned in the three-dimensional environment from a prior viewpoint of the user that is sufficiently different from the first viewpoint of the user, such as described with reference to the third set of one or more criteria), and a second set of one or more virtual object whose spatial arrangement relative to the first viewpoint is not changed in response to receiving the first input, such as objects 706*a* and 708*a* in FIG. 7B (e.g., because these virtual objects were last placed or positioned in the three-dimensional environment from the first viewpoint or from a prior viewpoint of the user that is not sufficiently different from the first viewpoint of the user, such as described with reference to the third set of one or more criteria) (836*a*).

In some embodiments, after receiving the first input (e.g., after recentering the first set of virtual objects in the manners described above, and not recentering the second set of virtual objects, and while the first set and the second set of virtual objects are at their resulting locations and/or orientations resulting from the first input), the computer system (e.g., 101) detects (836*b*) movement of a viewpoint of the user from the first viewpoint to a second viewpoint (e.g., the second viewpoint is optionally sufficiently different from the first viewpoint of the user to allow for recentering), different from the first viewpoint, in the three-dimensional environment (e.g., corresponding to a change in orientation and/or position of the user in a physical environment of the user), wherein in response to detecting the movement of the viewpoint of the user, the three-dimensional environment is visible via the display generation component from the second viewpoint of the user and positions or orientations of the first and second sets of one or more virtual objects in the three-dimensional environment are not changed, such as movement of viewpoint 726*a* away from its location in FIG. 7C after computer system 101 displays environment 702 as in FIG. 7C.

In some embodiments, while the three-dimensional environment is visible via the display generation component from the second viewpoint of the user, the computer system (e.g., 101) receives (836*c*), via the one or more input devices, a second input corresponding to the request to update the spatial arrangement of one or more virtual objects relative to the second viewpoint of the user to satisfy the first set of one or more criteria that specify the range of distances or the range of orientations of the one or more virtual objects relative to the second viewpoint of the user, such as an input similar to or the same as the input in FIG. 7B (e.g., a recentering input subsequent to the recentering input described previously).

In some embodiments, in response to receiving the second input, changing positions or orientations of the first and second sets of one or more virtual objects in the three-dimensional environment such that updated positions and orientations of the first and second sets of one or more virtual objects satisfy the first set of one or more criteria relative to the second viewpoint of the user, such as recentering 706*a*, 708*a*, 710*a* and 714*a* in response to the second input (e.g., recentering both the first and the second set of virtual object in response to the subsequent recentering input in one or more of the manners described previously) (836*d*). Thus, while two different groups or collections of virtual objects (e.g., as previously described) are optionally treated differently in response to a first recentering input (e.g., one collection is recentered while a second collection is not recentered), in response to the first recentering input, the two collections are optionally combined and treated as a single collection going forward (e.g., according to the collection rules previously described). Thus, in response to a subsequent recentering input, the virtual objects in the combined collection of virtual objects are optionally recentered together subject to the various conditions for recentering previously described. Recentering groups of virtual objects together in response to further recentering inputs reduces the number of inputs needed to appropriately position virtual elements in the three-dimensional environment.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9C illustrate examples of a computer system recentering one or more virtual objects in the presence of physical or virtual obstacles in accordance with some embodiments.

FIG. 9A illustrates a three-dimensional environment 902 visible via a display generation component (e.g., display generation component 120 of FIG. 1) of a computer system 101, the three-dimensional environment 902 visible from a viewpoint 926*a* of a user illustrated in the overhead view (e.g., facing the left wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 9A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 902 and/or the physical environment is visible in the three-dimensional environment 902 via the display generation component 120. For example, three-dimensional environment 902 visible via display generation component 120 includes representations of the physical floor and back and side walls of the room in which computer system 101 is located. Three-dimensional environment 902 also includes table 922*a* (corresponding to 922*b* in the overhead view), which is visible via the display generation component from the viewpoint 926*a* in FIG. 9A, and sofa 924*b* (shown in the overhead view), which is not visible via the display generation component 120 from the viewpoint 926*a* of the user in FIG. 9A.

In FIG. 9A, three-dimensional environment 902 also includes virtual objects 906*a* (corresponding to object 906*b* in the overhead view), 908*a* (corresponding to object 908*b* in the overhead view), and 910*a* (corresponding to object 910*b* in the overhead view) that are visible from viewpoint 926*a*. Three-dimensional environment 902 also includes virtual objects 912*b*, 914*b*, 916*b*, 918*b* and 920*b* (shown in the overhead view), which are not visible via the display generation component 120 from the viewpoint 926*a* of the user in FIG. 9A. Virtual objects 912*b*, 914*b*, 916*b*, 918*b* and 920*b* are optionally virtual objects that were last placed or positioned in three-dimensional environment 902 from viewpoint 926*b* (e.g., a prior viewpoint of the user), similar to as described with reference to FIGS. 7A-7F and/or method 800. In FIG. 9A, objects 906*a*, 908*a*, 910*a*, 912*b*, 914*b*, 916*b*, 918*b* and 920*b* are two-dimensional objects, but the examples of the disclosure optionally apply equally to three-dimensional objects. Virtual objects 906*a*, 908*a*, 910*a*, 912*b*, 914*b*, 916*b*, 918*b* and 920*b* are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101.

As described with reference to FIGS. 7A-7F and/or method 800, in some embodiments, virtual objects that were last placed or repositioned from a particular prior viewpoint (or multiple prior viewpoints) of the user can be recentered to a new, current viewpoint of the user. However, in some circumstances, locations to which those virtual objects would otherwise be recentered in the current viewpoint may already be occupied by other objects (virtual or physical) in the current viewpoint. As such, computer system 101 computer system may need to adjust or shift the locations to which the above-mentioned virtual objects will be recentered, as will be discussed in more detail below and with reference to method 1000.

For example, in FIG. 9A, computer system 101 detects a recentering input (e.g., as described in more detail with reference to method 1000). In some embodiments, in response to such a recentering input, computer system 101 displays an animation of the virtual objects being recentered moving to their initial target locations for recentering, and then shifting away from those initial target locations to final target locations if those initial target locations are already occupied by objects, as is shown in FIGS. 9B-9C. In some embodiments, computer system 101 instead merely displays (an animation of) the virtual objects being recentered moving to their final target locations (e.g., as illustrated in FIG. 9C) without displaying the virtual objects moving to their initial target locations (e.g., as illustrated in FIG. 9B).

Referring to FIG. 9B, in some embodiments, computer system 101 displays the virtual objects being recentered being moved to their initial target locations in response to the recentering input in FIG. 9A. For example, virtual objects 912*a*, 914*a*, 916*a*, 918*a* and 920*a* are illustrated in FIG. 9B at their initial (e.g., the locations to which the objects would have been recentered if not already occupied by virtual or physical objects) and/or final target locations for recentering. Virtual object 912*a*, for example, was optionally animated as moving from its location in FIG. 9A to its location in FIG. 9B in response to the recentering input of FIG. 9A. The location and/or orientation of virtual object 912*a* shown in FIG. 9B is optionally determined by computer system 101 in one or more of the ways described with reference to method 800. The location of virtual object 912*a* in FIG. 9B is optionally its final target location because the location is not occupied by another object, whether virtual or physical.

Virtual object 920*a* was optionally animated as moving from its location in FIG. 9A to its location in FIG. 9B in response to the recentering input of FIG. 9A. The location and/or orientation of virtual object 920*a* shown in FIG. 9B is optionally determined by computer system 101 in one or more of the ways described with reference to method 800. The location of virtual object 920*a* in FIG. 9B is optionally its final target location because the location is not occupied by another object, whether virtual or physical.

Virtual objects 914*a*, 916*a* and 918*a* were optionally animated as moving from their locations in FIG. 9A to their locations in FIG. 9B in response to the recentering input of FIG. 9A. The locations and/or orientations of virtual objects 914*a*, 916*a* and 918*a* shown in FIG. 9B are optionally determined by computer system 101 in one or more of the ways described with reference to method 800. The location of virtual objects 914*a*, 916*a* and 918*a* in FIG. 9B are optionally their initial target locations, and not their final target locations, because the locations are occupied by other objects, whether virtual or physical. For example, virtual object 914*a* has been recentered—optionally according to one or more features of method 800—to a location that is within and/or behind and/or occupied by the left wall of the physical environment of computer system 101. Virtual object 916*a* has been recentered—optionally according to one or more features of method 800—to a location that is within and/or occupied by table 922*a*. Finally, virtual object 918*a* has been recentered—optionally according to one or more features of method 800—to a location that is within and/or occupied by virtual object 910*a*.

Further, in some embodiments, virtual objects that were last placed or repositioned in three-dimensional environment 902 from the current viewpoint 926*a* that are not overlapping and/or colliding with others of those virtual objects are not moved in three-dimensional environment 902 in response to the recentering input, such as reflected by virtual object 910*a* not moving in response to the recentering input. However, in some embodiments, virtual objects that were last placed or repositioned in three-dimensional environment 902 from the current viewpoint 926*a* that are overlapping and/or colliding with others of those virtual objects are moved in three-dimensional environment 902 in response to the recentering input, such as reflected by virtual objects 906*a* and 908*a*. For example, in FIG. 9A, virtual object 908*a* was obscuring virtual object 906*a* from viewpoint 926*a*. Therefore, in response to the recentering input, computer system 101 has moved virtual objects 906*a* and 908*b* apart so as to reduce and/or eliminate the obstruction of virtual object 906*a* by virtual object 908*a*. Additional details about how computer system 101 shifts such overlapping or colliding virtual objects are provided with reference to method 800.

In some embodiments, in response to receiving the recentering input and/or during the movement of the virtual objects in response to the recentering input, computer system 101 modifies display of virtual objects to indicate that recentering will be, is and/or has occurred, as reflected by the cross-hatched pattern of the one or more virtual objects displayed by computer system 101 in FIG. 9B. For example, computer system 101 optionally reduces an opacity of, reduces a brightness of, reduces a color saturation of, increases a blurriness or and/or otherwise reduces the visual prominence of one or more virtual objects being displayed by computer system 101. In some embodiments, computer system 101 applies the above-mentioned visual modification to all virtual objects displayed by computer system 101, whether or not those virtual objects are being moved in response to the recentering input. In some embodiments, computer system 101 applies the above-mentioned visual modification to virtual objects that are being moved in response to the recentering input—whether or not those virtual objects were last placed or positioned in three-dimensional environment 902 from the current viewpoint 926*a* or a prior viewpoint 926*b*—but not virtual objects that are not being moved in response to the recentering input. In some embodiments, computer system 101 applies the above-mentioned visual modification to virtual objects that were last placed or positioned in three-dimensional environment 902 from a prior viewpoint 926*b* (e.g., the virtual objects that are being recentered to viewpoint 926*a*) but not to virtual objects that were last placed or positioned in three-dimensional environment 902 from the current viewpoint 926*a*—even if such virtual objects are moving in response to the recentering input (e.g., virtual objects 906*a* and/or 908*a*).

In some embodiments, as mentioned previously, computer system 101 shifts those virtual objects that have been recentered to an initial target location that includes another object to a final target location to reduce and/or eliminate the collision(s) of those recentered virtual objects with the objects that occupy their initial target locations, as described in more detail with reference to method 1000. Computer system 101 optionally shifts the recentered virtual objects differently depending on the type of object with which the recentered virtual objects are colliding. For example, the initial target location of virtual object 914*a* shown in FIG. 9B is occupied by a physical wall in the physical environment of computer system 101. Therefore, computer system 101 optionally moves virtual object 914*a* towards viewpoint 926*a* (optionally not up, down, left and/or right relative to viewpoint 926*a*) to a final target location that is clear of the physical wall, as shown in FIG. 9C.

In contrast, the initial target location of virtual object 916*a* shown in FIG. 9B is occupied by physical table 922*a*. Therefore, computer system 101 optionally moves virtual object 916*a* up, down, left and/or right relative to viewpoint 926*a* (optionally not towards viewpoint 926*a*) to a final target location that is clear of the physical table 922*a*, as shown in FIG. 9C. In some embodiments, computer system 101 moves the virtual object in one or more of the above directions that require the least amount of movement of the virtual object to clear the colliding object. For example, from FIG. 9B to FIG. 9C, computer system 101 has moved virtual object 916*a* up to a final target location at which virtual object 916*a* is no longer colliding with physical table 922*a*.

As a final example, the initial target location of virtual object 918*a* shown in FIG. 9B is occupied by virtual object 910*a*. Therefore, computer system 101 optionally moves virtual object 918*a* up, down, left, and/or right relative to, and/or towards or away from, viewpoint 926*a* to a final target location that is clear of virtual object 910*a*, as shown in FIG. 9C. In some embodiments, computer system 101 moves the virtual object in one or more of the above directions that require the least amount of movement of the virtual object to clear the colliding object. For example, from FIG. 9B to FIG. 9C, computer system 101 has moved virtual object 918*a* left to a final target location at which virtual object 918*a* is no longer colliding with virtual object 910*a*.

As mentioned above, virtual objects other than virtual objects 914*a*, 916*a* and 918*a* are optionally not moved by computer system 101 from FIG. 9B to 9C. Computer system 101 optionally at least partially or fully reverses the visual modification of a given virtual object described with reference to FIG. 9B in response to the virtual object reaching its final target location. In some embodiments, computer system 101 at least partially or fully reverses the visual modification of the virtual objects described with reference to FIG. 9B in response to every virtual object reaching their final target location. The partial or full reversal of the visual modification of virtual objects described with reference to FIG. 9B is optionally reflected in FIG. 9C by the lack of cross-hatched pattern in the displayed virtual objects.

FIGS. 10A-10G is a flowchart illustrating a method of recentering one or more virtual objects in the presence of physical or virtual obstacles in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1000 are, optionally, combined and/or the order of some operations is, optionally, changed.

In some embodiments, method 1000 is performed at a computer system (e.g., 101) in communication with a display generation component and one or more input devices. In some embodiments, the computer system has one or more characteristics of the computer system of method 800. In some embodiments, the display generation component has one or more characteristics of the display generation component of method 800. In some embodiments, the one or more input devices have one or more of the characteristics of the one or more input devices of method 800.

In some embodiments, while a three-dimensional environment (e.g., 902) (e.g., the three-dimensional environment optionally has one or more characteristics of the three-dimensional environment of method 800) is visible via the display generation component from a first viewpoint of a user (e.g., such as described with reference to method 800), such as viewpoint 926*a* in FIG. 9A, the three-dimensional environment including a first virtual object at a first location in the three-dimensional environment, such as object 916*a* in FIG. 9A (e.g., the first virtual object optionally has one or more characteristics of the first virtual object in method 800. In some embodiments, the first virtual object was placed, last reoriented or last moved at the first location in the three-dimensional environment by the user of the computer system while the viewpoint of the user was a viewpoint prior to the first viewpoint), the computer system (e.g., 101) receives (1002*a*), via the one or more input devices, a first input corresponding to a request to update a spatial arrangement of the first virtual object relative to the first viewpoint of the user to satisfy a first set of one or more criteria that specify a range of distances or a range of orientations of virtual objects relative to the first viewpoint of the user, such as the input in FIG. 9A (e.g., such as described with reference to method 800. The first input optionally has one or more of the characteristics of the first input (e.g., a recentering input) described with reference to methods 800 and/or 1400).

In some embodiments, in response to receiving the first input (1002*b*), in accordance with a determination that a second location (e.g., the location to which the computer system will move the first virtual object if no object already exists at the second location, such as according to one or more aspects of method 800) in the three-dimensional environment, that satisfies the first set of one or more criteria, is unoccupied by objects, such as the location at which object 912*a* is shown in FIG. 9B (e.g., does not include a respective object whether virtual or physical, does not include any virtual or physical objects of a respective type, or does not include any virtual or physical objects), wherein a spatial arrangement of the second location relative to the first viewpoint of the user satisfies the first set of one or more criteria (e.g., the distance and/or orientation of the second location relative to the first viewpoint of the user satisfies the first one or more criteria, such as described with reference to method 800. In some embodiments, the spatial arrangement of the second location relative to the first viewpoint corresponds to (e.g., is the same as) the spatial arrangement of the first location relative to the prior viewpoint of the user from which the first virtual object was last placed or moved), the computer system (e.g., 101) displays (1002*c*) the first virtual object at (e.g., moving the first virtual object to) the second location in the three-dimensional environment, such as the location at which object 912*a* is shown in FIG. 9C. In some embodiments, the orientation of the first virtual object at the second location relative to the first viewpoint corresponds to (e.g., is the same as) the orientation of the first virtual object at the first location when the first input was received relative to the prior viewpoint of the user from which the first virtual object was last placed or moved.

In some embodiments, in response to receiving the first input (1002*b*), in accordance with a determination that the second location in the three-dimensional environment, that satisfies the first set of one or more criteria, is occupied, such as the location at which object 916*a* is shown in FIG. 9B (e.g., includes at least one respective object whether physical or virtual, or includes one or more virtual or physical objects of the respective type), the computer system (e.g., 101) displays (1002*d*) the first virtual object at (e.g., moving the first virtual object to) a third location in the three-dimensional environment, that satisfies the first set of one or more criteria, wherein the third location is spaced apart from the second location in the three-dimensional environment, such as the location at which object 916*a* is shown in FIG. 9C. In some embodiments, the orientation of the first virtual object at the third location relative to the first viewpoint corresponds to (e.g., is the same as) the orientation of the first virtual object at the first location when the first input was received relative to the prior viewpoint of the user from which the first virtual object was last placed or moved. In some embodiments, the orientation of the first virtual object at the third location relative to the first viewpoint is different from the orientation of the first virtual object at the first location when the first input was received relative to the prior viewpoint of the user from which the first virtual object was last placed or moved. In some embodiments, the spatial arrangement of the third location relative to the first viewpoint is different from the spatial arrangement of the first location relative to the prior viewpoint of the user from which the first virtual object was last placed or moved. In some embodiments, the distance and/or orientation of the third location relative to the first viewpoint of the user satisfies the first one or more criteria, such as described with reference to method 800. In some embodiments, the computer system selects the third location to be sufficiently far from the second location such that the first virtual object at the third location does not occupy any volume of the three-dimensional environment also occupied by the respective object at the second location, as will be described in more detail below. In some embodiments, inputs described with reference to method 1000 are or include air gesture inputs. Shifting the location to which a virtual object is recentered causes the computer system to automatically avoid collisions between objects in the three-dimensional environment.

In some embodiments, the second location is determined to be occupied when the second location includes a virtual object, such as the location at which object 918*a* is shown in FIG. 9B, and is occupied by object 910*a* (e.g., a virtual object that has one or more of the characteristics of other virtual objects described herein and/or methods 800, 1200, 1400 and/or 1600) (1004). In some embodiments, the second location is determined to be occupied if the first virtual object, if displayed at the second location, would collide with (any part of) the virtual object. In some embodiments, the second location is determined to be occupied if the first virtual object, if displayed at the second location, would obscure (any part of) or would be obscured by (at least in part) the virtual object, whether or not the first virtual object would collide with the virtual object. Thus, in some embodiments, a recentered virtual object will be shifted to avoid collision with an existing virtual object at the second location. Shifting the location to which a virtual object is recentered causes the computer system to automatically avoid collisions between virtual objects in the three-dimensional environment.

In some embodiments, the second location is determined to be occupied when the second location corresponds to a location of a physical object in a physical environment of the user, such as the location at which object 916*a* is shown in FIG. 9B, and is occupied by table 922*a* (e.g., a wall or a table) (1006). In some embodiments, the second location is determined to be occupied if the first virtual object, if displayed at the second location, would collide with (any part of) the physical object. The physical object is optionally visible via the display generation component at the second location and/or a representation of the physical object is displayed via the display generation component at the second location. In some embodiments, the second location is determined to be occupied if the first virtual object, if displayed at the second location, would obscure (any part of) or would be obscured by (at least in part) the physical object, whether or not the first virtual object would collide with the physical object. Thus, in some embodiments, a recentered virtual object will be shifted to avoid collision with an existing physical object at the second location. Shifting the location to which a virtual object is recentered causes the computer system to automatically avoid collisions between a virtual object and a physical object in the three-dimensional environment.

In some embodiments, in accordance with a determination that the second location corresponds to a location within or behind a physical wall in the physical environment of the user, such as the location at which object 914*a* is shown in FIG. 9B (e.g., the surface of the wall facing the viewpoint of the user is closer to the viewpoint of the user than the second location, such that the first virtual object if displayed at the second location would be displayed within or behind the physical wall in the three-dimensional environment), the third location is closer to the first viewpoint of the user than the second location, and the third location is in front of the physical wall relative to the first viewpoint of the user (1008), such as the location at which object 914*a* is shown in FIG. 9C. In some embodiments, if a recentered virtual object collides with a physical wall and/or is behind a physical wall in the three-dimensional environment, the computer system avoids the collision by shifting the location for the recentered virtual object closer to the viewpoint of the user (e.g., and not shifting the location for the recentered virtual object laterally with respect to the viewpoint of the user). The computer system optionally additionally performs the above in the case of other physical objects that are wall-like objects while not being walls (e.g., objects that are relatively vertical relative to the viewpoint of the user and have a size or area greater than a threshold size or area-such as 0.2, 0.5, 1, 3, 5 or 10 meters vertically and/or horizontally or 0.04, 0.25, 1, 9, 25 or 100 meters square). Shifting the location to which a virtual object is recentered towards the viewpoint of the user in the case of a wall reduces the number of inputs needed to ensure visibility and/or interactability with the virtual object in the three-dimensional environment, as lateral shifting of the location for the virtual object will not likely resolve the collision of the virtual object with the wall.

In some embodiments, in response to the first input, in accordance with a determination that the second location corresponds to a respective physical object other than a physical wall, such as the location at which object 916*a* is shown in FIG. 9B, and is occupied by table 922*a* (e.g., the first virtual object at the second location collides with a table, a desk, a chair, or other physical object other than a wall or wall-like physical object), the third location is a same distance from the first viewpoint of the user as the second location, and the third location is laterally separated from the second location relative to the first viewpoint (1010), such as the location at which object 916*a* is shown in FIG. 9C. In some embodiments, if a recentered virtual object collides with a physical object other than a wall in the three-dimensional environment, the computer system avoids the collision by shifting the location for the recentered virtual object laterally (e.g., up, down, left and/or right) with respect to the viewpoint of the user (e.g., and not shifting the location for the recentered virtual object towards or away from the viewpoint of the user). Shifting the location to which a virtual object is recentered laterally with respect to the viewpoint of the user in the case of a non-wall object reduces the number of inputs needed to ensure visibility and/or interactability with the virtual object in the three-dimensional environment.

In some embodiments, when the first input is received, the three-dimensional environment further includes a second virtual object that overlaps with the first virtual object, such as objects 906*a* and 908*a* in FIG. 9A (e.g., the first and second virtual objects at least partially collide with one another and/or the first virtual object at least partially obscures the second virtual object from the first viewpoint or the second virtual object at least partially obscures the first virtual object from the first viewpoint) (1012*a*).

In some embodiments, in response to receiving the first input, the computer system (e.g., 101) separates (1012*b*) the first and second virtual objects from each other (e.g., laterally with respect to the first viewpoint and/or towards or away from the first viewpoint) to reduce or eliminate the overlap between the first and second virtual objects, such as shown in FIG. 9C with respect to objects 906*a* and 908*a*. In some embodiments, both virtual objects are moved to achieve the above separation. In some embodiments, only one of the virtual objects is moved to achieve the above separation. In some embodiments, the first and second virtual objects are both recentered in response to the first input, and in the process, are separated relative to one another to achieve the above separation. Separating overlapping virtual objects reduces the number of inputs needed to ensure visibility and/or interactability with the virtual objects in the three-dimensional environment.

In some embodiments, in response to the first input, and in accordance with a determination that the second location is occupied by a respective object (e.g., a physical object such as a wall or non-wall object, or a virtual object) (1014*a*), in accordance with a determination that an amount of separation from the second location in a first direction required for the first virtual object to avoid the respective object at the second location is less than an amount of separation from the second location in a second direction, different from the first direction, required for the first virtual object to avoid the respective object at the second location, the third location is separated from the second location in the first direction (1014*b*), such as shifting object 916*a* upward rather than downward from the location at which object 916*a* is shown in FIG. 9B. For example, if shifting the location for the first virtual object in the first direction (e.g., right, left, up, down, away from the viewpoint or towards the viewpoint, or any combination of these directions) to avoid the collision or overlap of the first virtual object with the respective object requires a shift of a smaller magnitude than shifting the location for the first virtual object in the second direction (e.g., right, left, up, down, away from the viewpoint or towards the viewpoint, or any combination of these directions) to avoid the collision or overlap of the first virtual object with the respective object, the computer system optionally shifts the location for the first virtual object in the first direction (e.g., by the smaller magnitude).

In some embodiments, in response to the first input, and in accordance with a determination that the second location is occupied by a respective object (e.g., a physical object such as a wall or non-wall object, or a virtual object) (1014*a*), in accordance with a determination that the amount of separation from the second location in the second direction required for the first virtual object to avoid the respective object at the second location is less than the amount of separation from the second location in the first direction required for the first virtual object to avoid the respective object at the second location, the third location is separated from the second location in the second direction (1014*c*), such as if shifting object 916*a* downward rather than upward from the location at which object 916*a* is shown in FIG. 9B would avoid table 922*a* with less movement of object 916*a*. For example, if shifting the location for the first virtual object in the second direction to avoid the collision or overlap of the first virtual object with the respective object requires a shift of a smaller magnitude than shifting the location for the first virtual object in the first direction to avoid the collision or overlap of the first virtual object with the respective object, the computer system optionally shifts the location for the first virtual object in the second direction (e.g., by the smaller magnitude). Therefore, in some embodiments, the computer system shifts the location for the first virtual object in the direction that requires less (e.g., the least) amount of shifting of the location for the first virtual object to avoid the collision or overlap of the first virtual object with the respective object. Shifting the first virtual object in the direction that requires less shifting automatically causes the computer system to appropriately place the first virtual object to avoid collision while maintaining the first virtual object closer to (e.g., as close as possible to) its initial target location.

In some embodiments, displaying the first virtual object at the third location includes displaying, via the display generation component, an animation of a representation of the first virtual object moving to the second location followed by an animation of the representation of the first virtual object moving from the second location to the third location (1016), such as the animation of object 916*a* moving to the location shown in FIG. 9B, and then an animation of object 916*a* moving to the location shown in FIG. 9C. In some embodiments, the computer system displays an animation of the first virtual object (e.g., a faded, visually deemphasized, darker, blurred, unsaturated and/or more translucent representation of the first virtual object) originally moving to the second location in the three-dimensional environment in response to the first input, and then subsequently displays an animation of the first virtual object (e.g., the faded, visually deemphasized, darker, blurred, unsaturated and/or more translucent representation of the first virtual object) moving from the second location to the third location in the three-dimensional environment. In some embodiments, the first and second animations occur after the first input (e.g., in response to the first input) without further input being detected. In some embodiments, when the first virtual object reaches the third location, the computer system displays the first virtual object as unfaded, no longer visually deemphasized, brighter, less blurred, with increased saturation and/or less translucent (e.g., the visual appearance the first virtual object had when the first input was received). Displaying the animation of the first virtual object first moving to the second location and then moving to the third location provides feedback about the original recentering location for the first virtual object.

In some embodiments, the third location is separated from the second location by one or more of: distance from the first viewpoint of the user, horizontal distance relative to the first viewpoint of the user, or vertical distance relative to the first viewpoint of the user (1018). For example, the computer system optionally shifts the location for the first virtual object in any direction from the second location, such as towards or away from the viewpoint of the user, horizontally with respect to the viewpoint or the user, vertically with respect to the viewpoint of the user, or any combination of the above. Shifting the location for the first virtual object in the above directions reduces the number of inputs needed to appropriately place the first virtual object in the three-dimensional environment.

In some embodiments, the first virtual object was last placed or positioned at the first location in the three-dimensional environment from a second viewpoint of the user, different from the first viewpoint of the user (e.g., such as from a viewpoint sufficiently different from the current viewpoint of the user, as described in more detail with reference to method 800) (1020*a*)

In some embodiments, in accordance with a determination that a spatial arrangement of the first location relative to the second viewpoint is a first spatial arrangement, the second location is a first respective location (1020*b*), such as object 920*a* in FIG. 9C. For example, if the location and/or orientation of the first virtual object relative to the second viewpoint (e.g., the viewpoint from which the first virtual object was last placed or positioned in the three-dimensional environment) was such that the first virtual object was to the right and upward relative to the second viewpoint, the computer system selects the second location such that the location and/or orientation of the first virtual object at the second location relative to the first viewpoint is also to the right and upward relative to the first viewpoint (e.g., the same relative location and/or orientation). In some embodiments, the magnitudes of the relative location and/or orientation of the second location relative to the first viewpoint is also maintained with respect to the relative location and/or orientation of the first location relative to the second viewpoint.

In some embodiments, in accordance with a determination that the spatial arrangement of the first location relative to the second viewpoint is a second spatial arrangement, different from the first spatial arrangement, the second location is a second respective location, different from the first respective location (1020*c*), such as if object 920*a* had a different spatial arrangement relative to viewpoint 926*b* in FIG. 9A, object 920*a* would optionally have that different spatial arrangement relative to viewpoint 926*a* in FIG. 9C. For example, if the location and/or orientation of the first virtual object relative to the second viewpoint was such that the first virtual object was to the left and downward relative to the second viewpoint, the computer system selects the second location such that the location and/or orientation of the first virtual object at the second location relative to the first viewpoint is also to the left and downward relative to the first viewpoint (e.g., the same relative location and/or orientation). In some embodiments, the magnitudes of the location and/or orientation of the second location relative to the first viewpoint is also maintained with respect to the relative location and/or orientation of the first location relative to the second viewpoint. Setting the target location for a recentered virtual object that is based on a location of the virtual object relative to a prior viewpoint of the user when the virtual object was last positioned in the three-dimensional environment causes the computer system to automatically place the virtual object at a prior-provided relative location for the virtual object.

In some embodiments, the first virtual object was last placed or positioned in the three-dimensional environment from a second viewpoint of the user, different from the first viewpoint (e.g., such as from a viewpoint sufficiently different from the current viewpoint of the user, as described in more detail with reference to method 800), and when the first input is received the three-dimensional environment further includes a second virtual object and a third virtual object that were last placed or positioned in the three-dimensional environment from the first viewpoint of the user (or a viewpoint of the user not sufficiently different from the current viewpoint of the user, as described in more detail with reference to method 800), the second and third virtual objects having a first respective spatial arrangement relative to the first viewpoint (1022*a*), such as objects 906*a*, 908*a* and/or 910*a* in FIG. 9A and their spatial arrangement relative to viewpoint 926*a* in FIG. 9A.

In some embodiments, in response to receiving the first input (1022*b*), in accordance with a determination that the second and third virtual objects are overlapping, such as objects 906*a* and 908*a* overlapping in FIG. 9A (e.g., are at least partially colliding with each other in the three-dimensional environment and/or are at least partially obscuring each other from the first viewpoint of the user), the computer system (e.g., 101) updates (1022*c*) a spatial arrangement of the second and third virtual objects to be a second respective spatial arrangement relative to the first viewpoint to reduce or eliminate the overlap between the second and third virtual objects, such as shown with objects 906*a* and 908*a* in FIGS. 9B and 9C (e.g., moving and/or changing the orientations of the first, the second or both the first and second virtual objects such that the (e.g., horizontal, vertical and/or depth) distance between the objects relative to the first viewpoint increases to reduce or eliminate the collision between the two objects and/or the obscuring of the two objects).

In some embodiments, in response to receiving the first input (1022*b*), in accordance with a determination that the second and third virtual objects are not overlapping, such as if objects 906*a* and 908*a* were not overlapping in FIG. 9A (e.g., are not at least partially colliding with each other in the three-dimensional environment and/or are not at least partially obscuring each other from the first viewpoint of the user), the computer system (e.g., 101) maintains (1022*d*) the second and third virtual objects having the first respective spatial arrangement relative to the first viewpoint, such as not moving objects 906*a* and/or 908*a* in response to the input of FIG. 9A (e.g., not moving or changing the orientations of the first and the second virtual objects in the three-dimensional environment). Thus, in some embodiments, virtual objects that were last placed or positioned in the three-dimensional environment from the current viewpoint of the user do not response to the first input unless they are overlapping in the three-dimensional environment. Shifting the first and/or second virtual objects only if they are overlapping reduces the number of inputs needed to appropriately place the first and second virtual objects in the three-dimensional environment.

In some embodiments, in response to receiving the first input, the computer system (e.g., 101) displays (1024), via the display generation component, a visual indication indicating that the first input was received, such as the modification of the visual appearances of objects 906*a*, 908*a* and/or 910*a* from FIG. 9A to FIG. 9B. In some embodiments, the visual indication is displayed for a predetermined amount of time (e.g., 0.3, 0.5, 1, 2, 3, 5 or 10 seconds) after the first input is received. In some embodiments, the visual indication is displayed for the duration of the movement of the virtual object(s) in the three-dimensional environment in response to the first input, and ceases display in response to the end of that movement. In some embodiments, the visual indication is or includes modification of the visual appearance of one or more elements that were included in the three-dimensional environment when the first input is received (e.g., modification of the visual appearance of one or more of the virtual objects that were included in the three-dimensional environment when the first input was received, as will be described in more detail below). In some embodiments, the visual indication is or includes display of an element (e.g., a notification) that was not displayed or included in the three-dimensional environment when the first input was received. Displaying an indication of the first input provides feedback about a current status of the computer system as recentering one or more virtual objects in the three-dimensional environment.

In some embodiments, when the first input is received, the first virtual object has (e.g., is displayed with) a visual characteristic having a first value (e.g., has a first brightness, has a first opacity, has a first blurriness, and/or has a first color saturation), and the visual indication indicating that the first input was received includes temporarily updating (and/or displaying) the first virtual object to have the visual characteristic having a second value, different from the first value, such as the visual appearance of object 916*a* in FIG. 9B (e.g., a second brightness less than the first brightness, a second opacity less than the first opacity, a second blurriness more than the first blurriness and/or a second color saturation less than the first color saturation), followed by displaying the first virtual object with the visual characteristic having the first value, such as the visual appearance of object 916*a* in FIG. 9C (e.g., reverting the first virtual object to having its initial visual appearance) (1026). In some embodiments, in response to the first input, the first virtual object is temporarily visually deemphasized in the three-dimensional environment (e.g., relative to the remainder of the three-dimensional environment and/or relative to parts of the three-dimensional environment that are not changing position and/or orientation in response to the first input). In some embodiments, the change in visual appearance of the first virtual object described above is maintained for the duration of the movement of the virtual object(s) in the three-dimensional environment in response to the first input, and is reverted in response to the end of that movement. In some embodiments, the above change in visual appearance additionally or alternatively applies to other virtual objects that are moved/reoriented in the three-dimensional environment in response to the first input. In some embodiments, the above change in visual appearance additionally or alternatively applies to virtual objects that are not moved/reoriented in the three-dimensional environment in response to the first input. In some embodiments, the virtual objects that are changed in visual appearance are partially or fully faded out in the three-dimensional environment in response to the first input until they become unfaded as described above. Adjusting the visual appearance of virtual object(s) in response to the first input provides feedback about a current status of the computer system as recentering one or more virtual objects in the three-dimensional environment.

In some embodiments, when the first input is received, the three-dimensional environment further includes a second virtual object at a fourth location in the three-dimensional environment (e.g., the second virtual object is an object that will be recentered in the three-dimensional environment along with the first virtual object in response to the first input), the first virtual object and the second virtual object having a first respective spatial arrangement relative to each other (1028*a*), such as objects 912*a* and 920*a* in FIG. 9A having a spatial arrangement relative to each other.

In some embodiments, in response to receiving the first input (1028*b*), in accordance with the determination that the second location is unoccupied by objects, the computer system (e.g., 101) displays (1028*c*) the first virtual object at the second location and the second virtual object at a fifth location, different from the fourth location, that satisfies the first set of one or more criteria (e.g., moving and/or reorienting both the first and the second virtual objects in the three-dimensional environment in response to the first input as previously described and/or as described with reference to method 800), wherein the first virtual object and the second virtual object at the second and fifth locations, respectively, have the first respective spatial arrangement relative to each other, such as objects 912*a* and 920*a* having the same spatial arrangement relative to each other in FIG. 9C as in FIG. 9A (e.g., the relative orientations and/or positions of the first and second virtual objects are maintained in response to recentering those virtual objects, as described in more detail with reference to method 800).

In some embodiments, in response to receiving the first input (1028*b*), in accordance with the determination that the second location is occupied, such as with respect to object 918*a* in FIG. 9B, the computer system (e.g., 101) displays (1028*d*) the first virtual object at the third location and the second virtual object at a sixth location, different from the fourth location (e.g., optionally the same as or different from the fifth location), that satisfies the first set of one or more criteria (e.g., moving and/or reorienting both the first and the second virtual objects in the three-dimensional environment in response to the first input as previously described and/or as described with reference to method 800, except that the locations for the first virtual object and optionally the second virtual object have been shifted by the computer system because the target location(s) for those object(s) are occupied by other objects, as previously described), wherein the first virtual object and the second virtual object at the third and sixth locations, respectively, have a second respective spatial arrangement relative to each other, different from the first respective spatial arrangement, such as objects 918*a* and 920*a* having a different spatial arrangement relative to each other in FIG. 9C than in FIG. 9A (e.g., if the target location(s) for the virtual object(s) are occupied when the first input is received, the virtual objects optionally do not maintain their relative orientations and/or positions in response to recentering those virtual objects). Maintaining the relative spatial arrangements of recentered virtual objects if possible reduces the number of inputs needed to appropriately place objects relative to the viewpoint of the user in response to the first input.

In some embodiments, when the first input is received, the three-dimensional environment includes a first respective virtual object (e.g., the first virtual object or a different virtual object) at a first respective location in the three-dimensional environment and a second respective virtual object at a second respective location in the three-dimensional environment (e.g., the first respective virtual object is being recentered in response to the first input, and the second respective virtual object is optionally being recentered in response to the first input or is optionally not being recentered in response to the first input) (1030*a*).

In some embodiments, in response to receiving the first input (1030*b*), the computer system (e.g., 101) displays (1030*c*) the second respective virtual object at a third respective location in the three-dimensional environment (e.g., different from the second respective location if the second respective virtual object is recentered in response to the first input, or the same as the second respective location if the second respective virtual object is not recentered in response to the first input).

In some embodiments, in response to receiving the first input (1030*b*), in accordance with a determination that a difference in distance between a fourth respective location and the third respective location from the first viewpoint of the user is greater than a threshold distance (e.g., 0.1, 0.3, 0.5, 1, 3, 5, 10, 20, 50, 100, 500, 1000 or 5000 cm difference in distance from the first viewpoint of the user), wherein the fourth respective location is further from the first viewpoint of the user than the third respective location and satisfies the first set of one or more criteria (e.g., the fourth respective location is the initial target location for the first respective virtual object in response to the first input in the ways described above and/or with reference to method 800), the computer system (e.g., 101) displays (1030*d*) the first respective virtual object at the fourth respective location, wherein the second respective virtual object at the third respective location at least partially obscures the first respective virtual object at the fourth respective location from the first viewpoint of the user, such as if object 918*a* were recentered to and remained at a location behind object 910*a* and obscured by object 910*a* in FIG. 9B because that location behind object 910*a* was separated from object 910*a* by at least the threshold distance (and optionally the first and second respective virtual objects do not collide in the three-dimensional environment when displayed at the fourth respective location and the third respective location, respectively). For example, the computer system recenters the first respective virtual object to the fourth respective location even if the second respective virtual object at least partially obscures the first respective virtual object from the first viewpoint of the user. Thus, in some embodiments, the computer system will shift the target locations for virtual objects in response to the first input if those virtual objects will collide with other virtual objects, but will not shift the target locations for those virtual objects in response to the first input based on virtual objects obscuring (but not colliding with) other virtual objects (or vice versa) from the viewpoint of the user, if the two objects are sufficiently separated from each other in depth with respect to the viewpoint of the user.

In some embodiments, in response to receiving the first input (1030*b*), in accordance with a determination that the difference in distance between the fourth respective location and the third respective location from the first viewpoint of the user is less than the threshold distance (e.g., 0.1, 0.3, 0.5, 1, 3, 5, 10, 20, 50, 100, 500, 1000 or 5000 cm difference in distance from the first viewpoint of the user), the computer system (e.g., 101) displays (1030*e*) the first respective virtual object at a fifth respective location, different from the fourth respective location, wherein the fifth respective location is further from the first viewpoint of the user than the third respective location and satisfies the first set of one or more criteria (e.g., the fifth respective location is the shifted target location for the first respective virtual object in response to the first input in the ways described above and/or with reference to method 800), and the second respective virtual object at the third respective location does not at least partially obscure the first respective virtual object at the fifth respective location from the first viewpoint of the user, such as if object 918*a* were recentered to a location behind object 910*a* in FIG. 9B but that location behind object 910*a* was not separated from object 910*a* by at least the threshold distance, and computer system 101 were to therefore change the location of object 918*a* so that it was not obscured by object 910*a* (and optionally the first and second respective virtual objects do not collide in the three-dimensional environment when displayed at the fifth respective location and the third respective location, respectively). For example, the computer system recenters the first respective virtual object to the fifth respective location, which is selected by the computer system such that the second respective virtual object does not even partially obscure the first respective virtual object from the viewpoint of the user. Thus, in some embodiments, the computer system will shift the target locations for virtual objects in response to the first input if those virtual objects will collide with other virtual objects and/or if they will obscure other virtual objects (or vice versa) from the viewpoint of the user if the two objects are insufficiently sufficiently separated from each other in depth with respect to the viewpoint of the user. Shifting recenter locations based on collisions or line of sigh obstruction depending on the separation (in depth) of virtual objects in response to recentering reduces the number of inputs needed to appropriately place objects relative to the viewpoint of the user in response to the first input.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11E illustrate examples of a computer system selectively automatically recentering one or more virtual objects in response to the display generation component changing state in accordance with some embodiments.

Figure 11A:
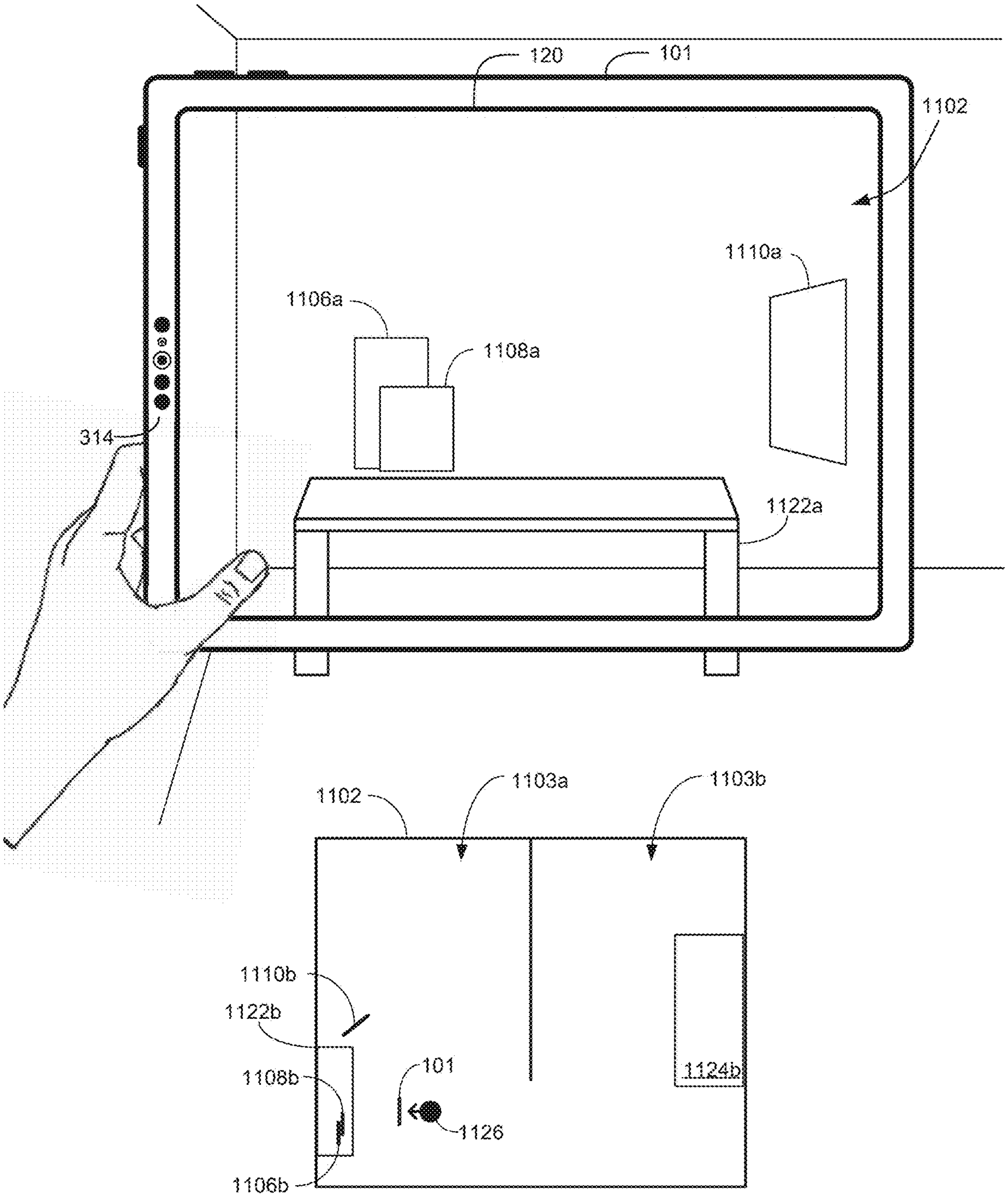
FIGS. 11A-11E illustrate examples of a computer system selectively automatically recentering one or more virtual objects in response to the display generation component changing state in accordance with some embodiments.

FIG. 11A illustrates a three-dimensional environment 1102 visible via a display generation component (e.g., display generation component 120 of FIG. 1) of a computer system 101, the three-dimensional environment 1102 visible from a viewpoint 1126 of a user illustrated in the overhead view (e.g., facing the left wall of a first room 1103*a* in the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 11A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1102 and/or the physical environment is visible in the three-dimensional environment 1102 via the display generation component 120. For example, three-dimensional environment 1102 visible via display generation component 120 includes representations of the physical floor and back and side walls of the room 1103*a* in which computer system 101 is located. Three-dimensional environment 1102 also includes table 1122*a* (corresponding to 1122*b* in the overhead view), which is visible via the display generation component from the viewpoint 1126 in FIG. 11A, and sofa 1124*b* (shown in the overhead view) in a second room 1103*b* in the physical environment, which is not visible via the display generation component 120 from the viewpoint 1126 of the user in FIG. 11A.

In FIG. 11A, three-dimensional environment 1102 also includes virtual objects 1106*a* (corresponding to object 1106*b* in the overhead view), 1108*a* (corresponding to object 1108*b* in the overhead view), and 1110*a* (corresponding to object 1110*b* in the overhead view) that are visible from viewpoint 1126. Virtual objects 1106*a*, 1108*a* and 1110*a* are optionally virtual objects that were last placed or positioned in three-dimensional environment 1102 from viewpoint 1126 in FIG. 11A, similar to as described with reference to FIGS. 7A-7F and/or method 800. In FIG. 11A, objects 1106*a*, 1108*a* and 1110*a* are two-dimensional objects, but the examples of the disclosure optionally apply equally to three-dimensional objects. Virtual objects 1106*a*, 1108*a* and 1110*a* are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101.

As described with reference to FIGS. 7A-7F and/or method 800, in some embodiments, virtual objects that were last placed or repositioned from a particular prior viewpoint (or multiple prior viewpoints) of the user can be recentered to a new, current viewpoint of the user. Thus, in some embodiments, if the viewpoint of the user changes from that illustrated in FIG. 11A and computer system 101 detects a recentering input, computer system 101 recenters virtual objects 1106*a*, 1108*a* and 1110*a* to that changed viewpoint as described with reference to FIGS. 7A-7F and/or method 800. However, in some embodiments, computer system 101 automatically recenters virtual objects 1106*a*, 1108*a* and 1110*a* to the changed viewpoint of the user if the changed viewpoint of the user is sufficiently different (e.g., in location and/or orientation, such as described in more detail with reference to method 1200) from the prior viewpoint of the user. Further, in some embodiments, computer system 101 performs (or does not perform) such automatic recentering in response to display generation component 120 transitioning from a second state (e.g., a powered-off or off state in which three-dimensional environment 1102 is not visible via the display generation component 120) to a first state (e.g., a powered-on or on state in which three-dimensional environment 1102 is visible via the display generation component 120), as will be discussed in more detail below and with reference to method 1200. In the case of a wearable device (e.g., a head-mounted device), the display generation component is optionally in the first state while the device is being worn on the head of the user, the display generation component optionally transitions to the second state in response to detecting that the device has been removed from the head of the user, and the display generation component optionally transitions back to the first state in response to (and optionally remains in the first state while) detecting that the device has been placed on and is being worn on the head of the user.

Figure 11B:
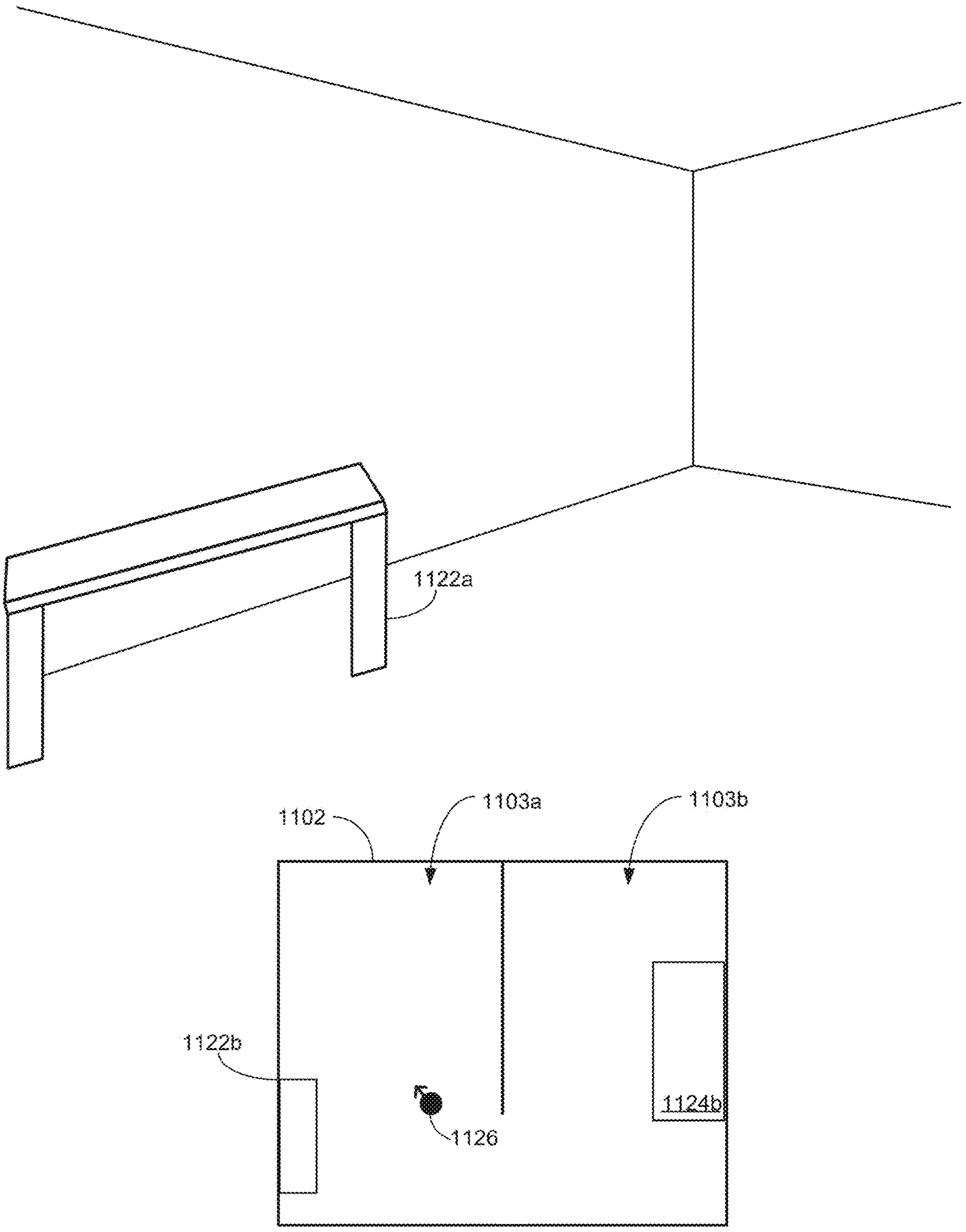

For example, from FIG. 11A to 11B, display generation component 120 has transitioned from the first state to the second state, and the user has moved to a new location (e.g., new location and/or new orientation) in the physical environment of the user as compared with FIG. 11A. For example, in FIG. 11B, the user has moved to a new location, corresponding to a new viewpoint 1126, in the first room 1103*a* in the physical environment, and is facing the back-left wall of that room 1103*a*. Three-dimensional environment 1102 is not visible or displayed via computer system 101, because computer system 101 is optionally in an off state and/or is not being worn on the head of the user. Therefore, no virtual objects are illustrated in FIG. 11B.

Figure 11C:
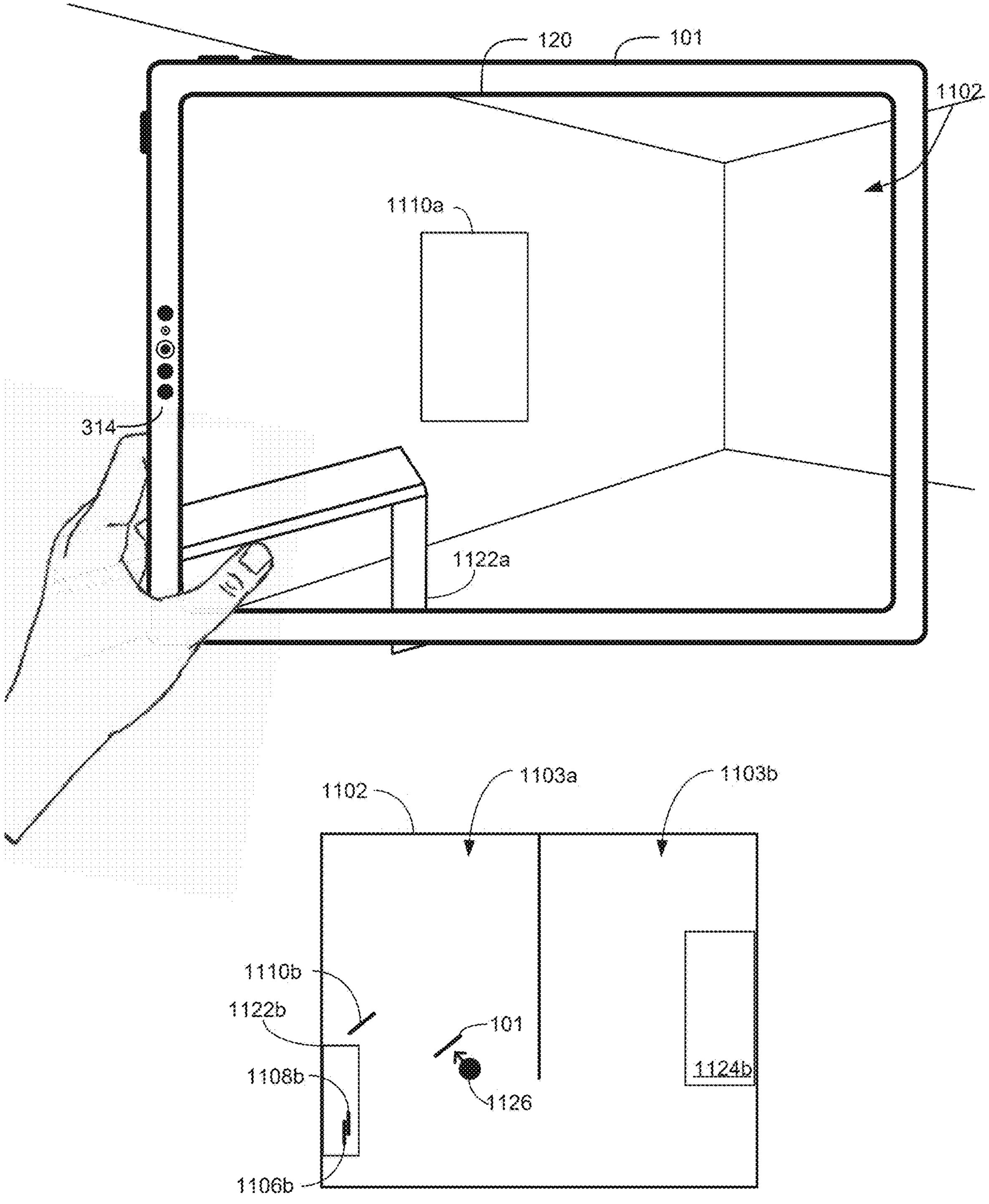

From FIG. 11B to 11C, display generation component 120 has transitioned from the second state to the first state while the user is at the location in the physical environment shown in FIG. 11B (and FIG. 11C). As shown in FIG. 11C, three-dimensional environment 1102 is again visible via display generation component 120 of computer system 101. Further, the viewpoint of the user in three-dimensional environment 1102 corresponds to the updated location and/or orientation of the user in the physical environment. In FIG. 11C, the updated location and/or orientation of the user in the physical environment and/or the viewpoint of the user in the three-dimensional environment 1102 in FIGS. 11B and 11C is optionally not sufficiently different from that in FIG. 11A-therefore, computer system 101 has not automatically recentered virtual objects 1106*a*, 1108*a* and 1110*a* to the updated viewpoint of the user in response to display generation component 120 transitioning from the second state to the first state. For example, because the user remains in the same room 1103*a* in the physical environment as in FIG. 11A, computer system 101 optionally has not automatically recentered virtual objects 1106*a*, 1108*a* and 1110*a* to the updated viewpoint of the user. Additional or alternative criteria for automatically recentering virtual objects 1106*a*, 1108*a* and 1110*a* to the updated viewpoint of the user are described with reference to method 1200. As a result, in FIG. 11C, three-dimensional environment 1102 is optionally merely visible from a different viewpoint than in FIG. 11A, rather than being recentered to the different viewpoint in FIG. 11C.

Figure 11D:
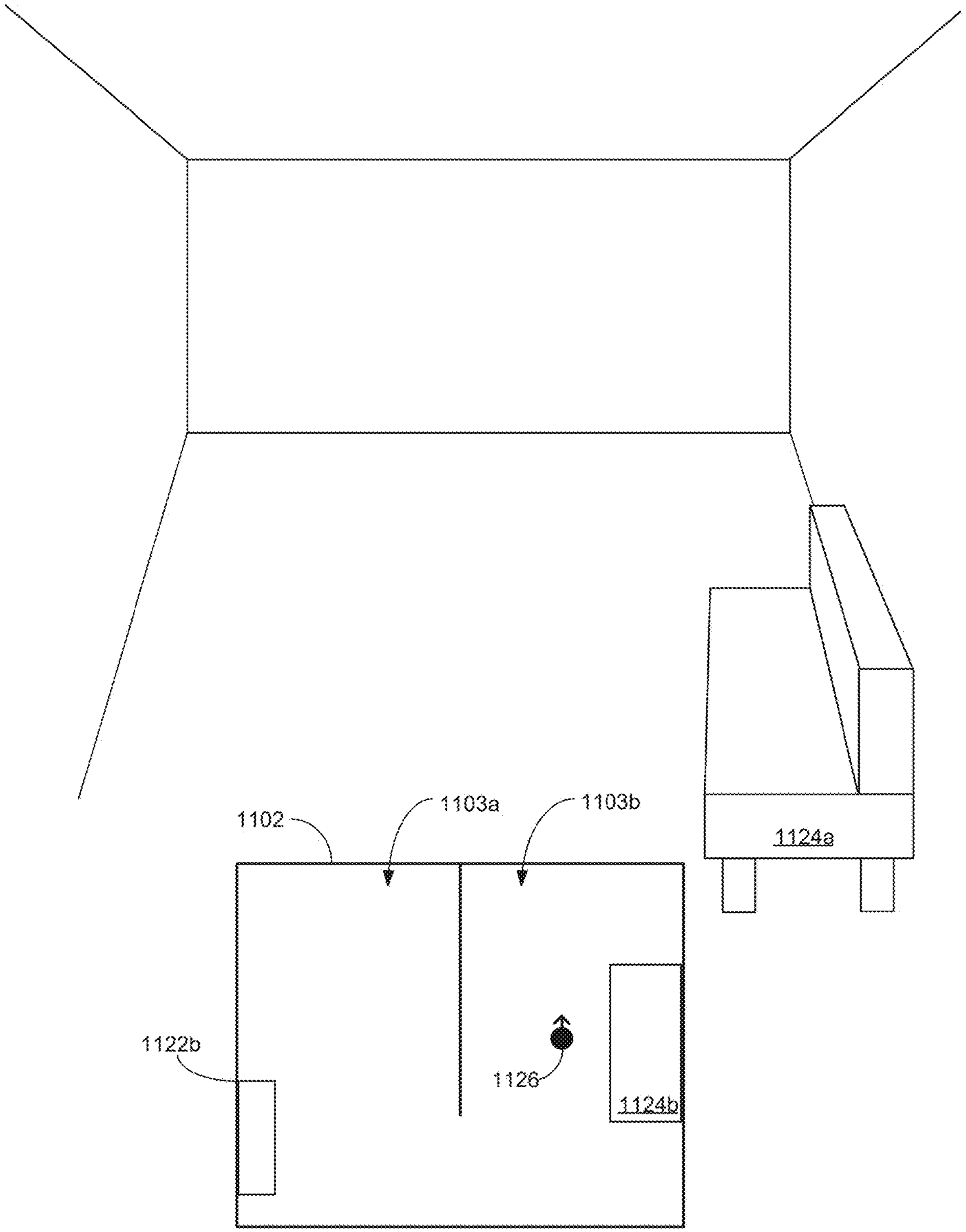

In contrast to FIGS. 11B and 11C, in FIG. 11D display generation component 120 has transitioned from the first state to the second state, and the user has moved to a new location (e.g., new location and/or new orientation) in the physical environment of the user as compared with FIG. 11A or FIG. 11C. For example, in FIG. 11D, the user has moved to a new location, corresponding to a new viewpoint 1126, in the second room 1103*b* in the physical environment, and is facing the back wall of that room 1103*b*. Three-dimensional environment 1102 is not visible or displayed via computer system 101, because computer system 101 is optionally in an off state and/or is not being worn on the head of the user. Therefore, no virtual objects are illustrated in FIG. 11D.

Figure 11E:
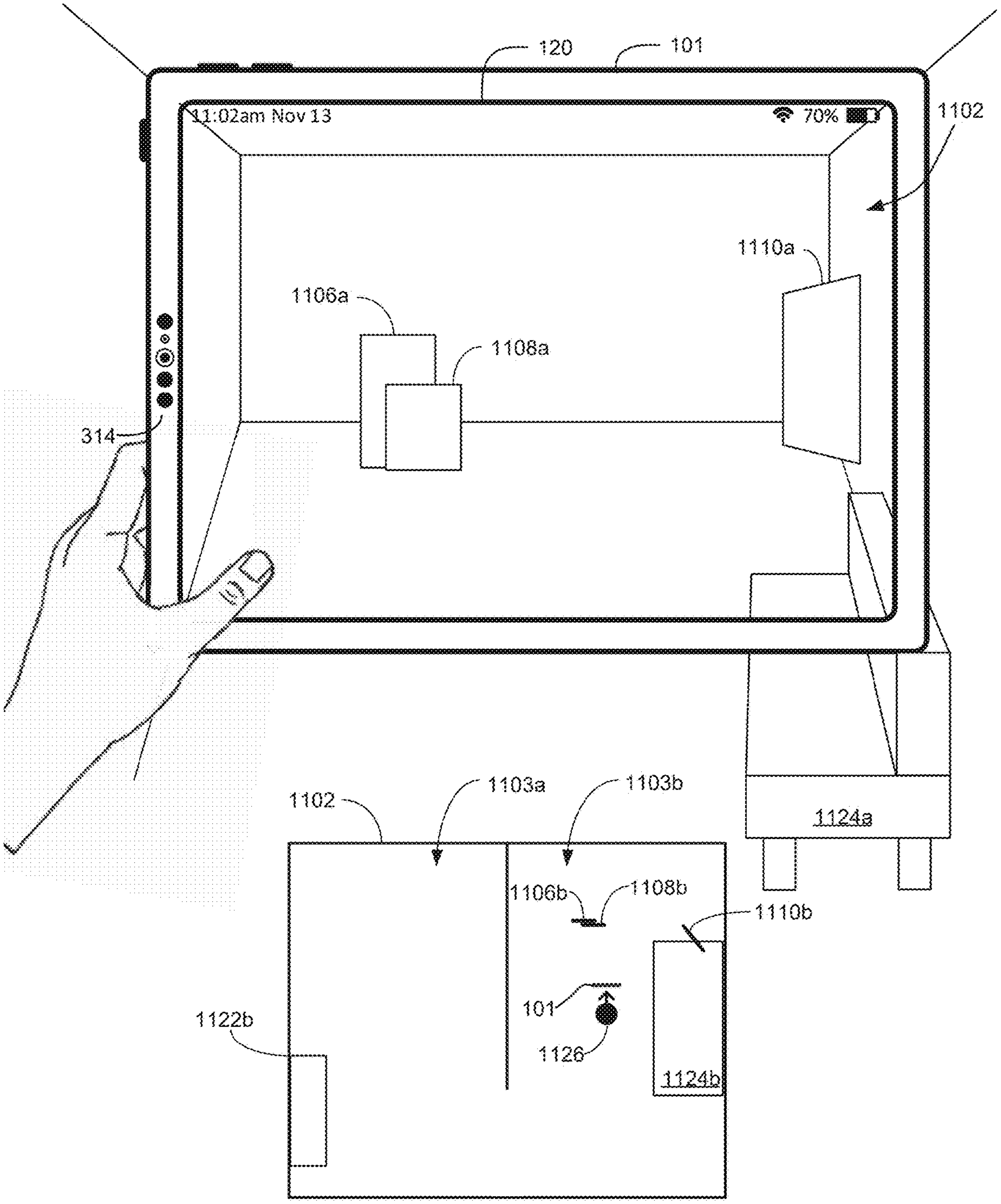
Figure 12B:
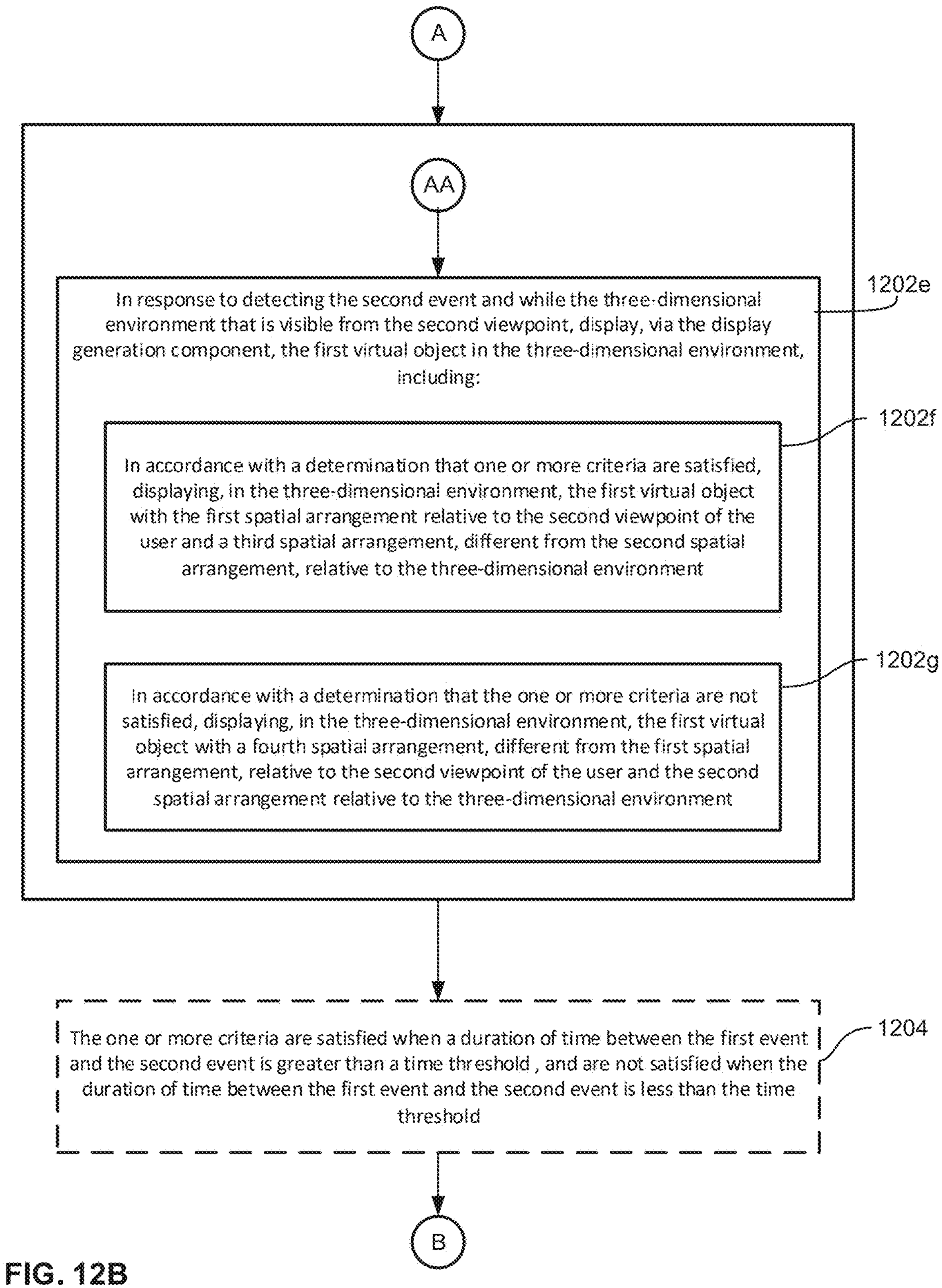
Figure 12C:
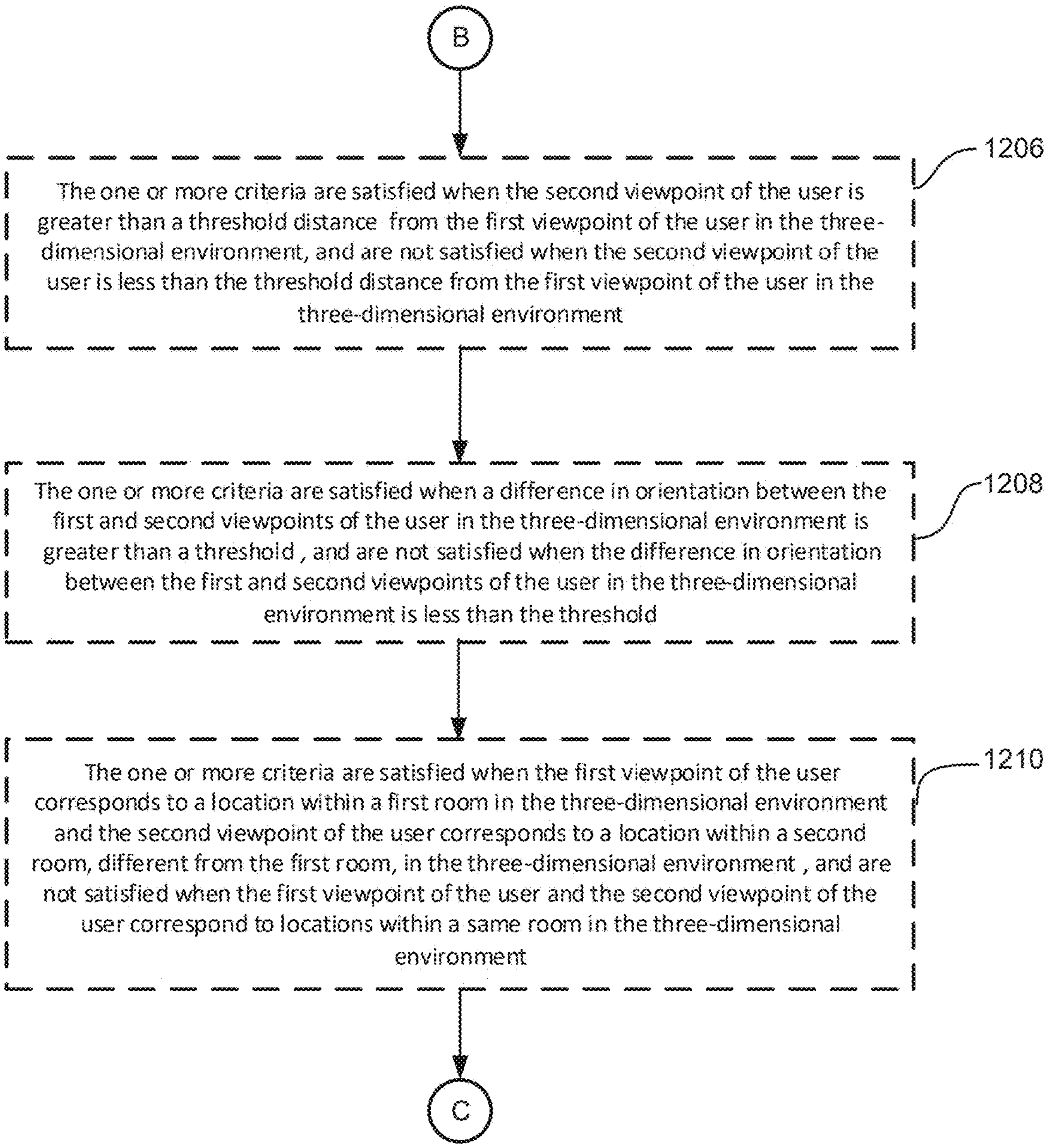
Figure 12D:
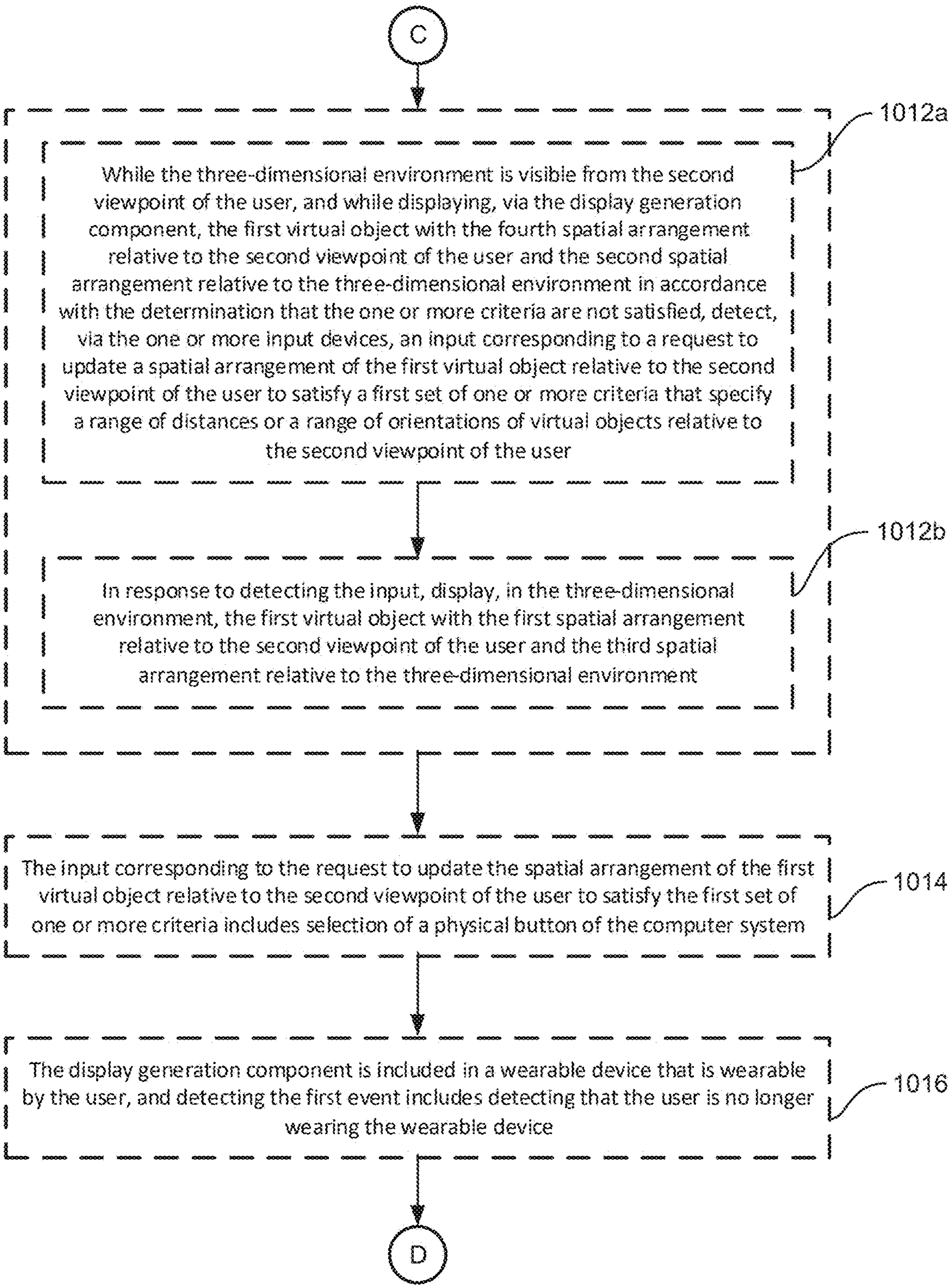
Figure 12E:
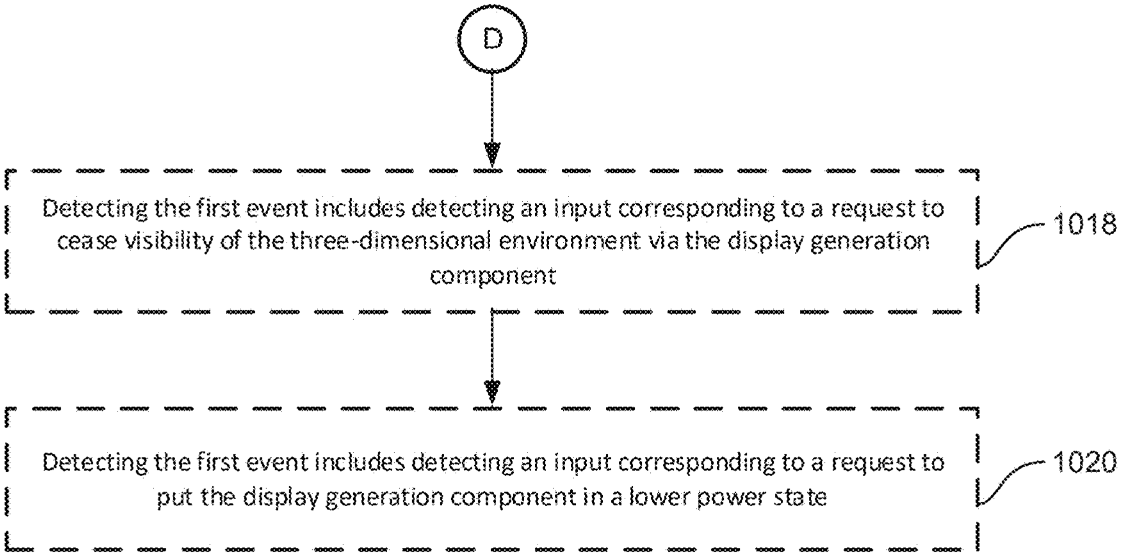

From FIG. 11D to 11E, display generation component 120 has transitioned from the second state to the first state while the user is at the location in the physical environment shown in FIG. 11D (and FIG. 11E). As shown in FIG. 11E, three-dimensional environment 1102 is again visible via display generation component 120 of computer system 101. Further, the viewpoint of the user in three-dimensional environment 1102 corresponds to the updated location and/or orientation of the user in the physical environment. In FIG. 11E, the updated location and/or orientation of the user in the physical environment and/or the viewpoint of the user in the three-dimensional environment 1102 in FIGS. 11D and 11E is optionally sufficiently different from that in FIG. 11A (and/or FIG. 11C)—therefore, computer system 101 has automatically recentered virtual objects 1106*a*, 1108*a* and 1110*a* to the updated viewpoint of the user in response to display generation component 120 transitioning from the second state to the first state. For example, because the user has moved to the second room 1103*b* in the physical environment, computer system 101 optionally has automatically recentered virtual objects 1106*a*, 1108*a* and 1110*a* to the updated viewpoint of the user as shown in FIG. 11E. Details about how virtual objects 1106*a*, 1108*a* and 1110*a* are recentered to the updated viewpoint of the user are provided with reference to methods 800 and/or 1000. Additional or alternative criteria for automatically recentering virtual objects 1106*a*, 1108*a* and 1110*a* to the updated viewpoint of the user are described with reference to method 1200. As a result, in FIG. 11E, three-dimensional environment 1102 is optionally recentered to and visible from a different viewpoint than in FIG. 11A (and/or FIG. 11C).

In some embodiments, computer system 101 does not automatically recenter the virtual objects and/or three-dimensional environment to the updated viewpoint of the user unless the display generation component transitions from the second state to the first state while the user is at the updated location and/or viewpoint (optionally after having transitioned from the first state to the second state). For example, if the user had moved from the location and/or viewpoint illustrated in FIG. 11A to the location and/or viewpoint illustrated in FIG. 11E while display generation component 120 remained in the first state, computer system 101 would optionally not automatically recenter virtual objects 1106*a*, 1108*a* and 1110*a* to the updated viewpoint of the user-instead, three-dimensional environment 1102 would optionally merely be visible from the updated viewpoint of the user while virtual objects 1106*a*, 1108*a* and 1110*a* remained at their locations in three-dimensional environment 1102 shown in FIG. 11A. Thus, in some embodiments, a required condition for automatically recentering the three-dimensional environment and/or virtual objects to the updated viewpoint of the user is that the display generation component transitions from the second state to the first state while the user is at a location and/or viewpoint that satisfies automatic recentering criteria (e.g., sufficiently different from a prior viewpoint of the user, as described in more detail with reference to method 1200).

FIGS. 12A-12E is a flowchart illustrating a method of selectively automatically recentering one or more virtual objects in response to the display generation component changing state in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1200 are, optionally, combined and/or the order of some operations is, optionally, changed.

In some embodiments, method 1200 is performed at a computer system (e.g., 101) in communication with a display generation component and one or more input devices. In some embodiments, the computer system has one or more characteristics of the computer system of methods 800 and/or 1000. In some embodiments, the display generation component has one or more characteristics of the display generation component of methods 800 and/or 1000. In some embodiments, the one or more input devices have one or more of the characteristics of the one or more input devices of methods 800 and/or 1000.

In some embodiments, while the display generation component is operating in a first state (e.g., a state in which the display generation component is active and/or on) in which a three-dimensional environment (e.g., 1102) (e.g., the three-dimensional environment optionally has one or more characteristics of the three-dimensional environment of methods 800 and/or 1000, and optionally includes at least a portion of a physical environment of a user of the computer system. In some embodiments, the (portion of the) physical environment is displayed in the three-dimensional environment via the display generation component (e.g., virtual or video passthrough). In some embodiments, the (portion of the) physical environment is a view of the (portion of the) the physical environment of the computer system visible through a transparent portion of the display generation component (e.g., true or real passthrough) is visible from a first viewpoint of a user (e.g., such as described with reference to methods 800 and/or 1000), and the first viewpoint of the user is associated with a first respective spatial arrangement of the user relative to the three-dimensional environment, such as in FIG. 11A (e.g., the viewpoint from which the three-dimensional environment is displayed and/or is visible corresponds to the location and/or orientation of the user in the three-dimensional environment and/or physical environment of the user, such that if the user were to rotate their head and/or torso and/or move in the three-dimensional environment and/or their physical environment, a corresponding different portion of the three-dimensional environment would be displayed and/or visible via the display generation component), the computer system (e.g., 101) displays (1202*a*), in the three-dimensional environment, via the display generation component, a first virtual object that has a first spatial arrangement relative to the first viewpoint of the user and a second spatial arrangement relative to the three-dimensional environment, such as objects 1106*a*, 1108*a* and/or 1110*a* in FIG. 11A. The first virtual object optionally has one or more characteristics of the first virtual object in methods 800 and/or 1000. The first spatial arrangement optionally corresponds to the relative location and/or relative orientation (optionally including the orientation of the first virtual object itself) of the first virtual object relative to the first viewpoint of the user in the three-dimensional environment (e.g., 10 feet from the first viewpoint, and 30 degrees to the right of the center line of the first viewpoint). The second spatial arrangement optionally corresponds to the relative location and/or relative orientation (optionally including the orientation of the first virtual object itself) of the first object relative to a reference point (e.g., the location of the user in the physical environment, the orientation of the head and/or torso of the user in the three-dimensional environment, the center of the room in which the user is located or the location of the viewpoint of the user in the three-dimensional environment) in the three-dimensional environment and/or physical environment of the user (e.g., 10 feet from the center of the room, and 30 degrees to the right of the line from the center of the room to the back wall of the room, and normal to the back wall of the room). Thus, in some embodiments, the first virtual object having a relative location in the three-dimensional environment relative to the viewpoint of the user also has a relative location relative to the physical environment that is optionally visible via the display generation component. In some embodiments, the first spatial arrangement satisfies the one or more criteria, of methods 800 and/or 1000, that specify a range of distances or a range of orientations of virtual objects relative to the viewpoint of the user. In some embodiments, the first spatial arrangement does not satisfy those one or more criteria of methods 800 and/or 1000.

In some embodiments, while displaying the first virtual object with the first spatial arrangement relative to the first viewpoint of the user and the second spatial arrangement relative to the three-dimensional environment, the computer system (e.g., 101) detects (1202*b*) a first event corresponding to a change in state of the display generation component to a second state different from the first state (e.g., a state in which the display generation component is inactive or off), wherein while the display generation component is in the second state, the three-dimensional environment is not visible via the display generation component, such turning off computer system 101 from FIG. 11A to FIG. 11B. For example, the second state is optionally activated in response to an input (e.g., first event) detected by the computer system to cease displaying and/or exit the three-dimensional environment (e.g., selection of a displayed selectable option, or selection of a hardware button included on the computer system). In some embodiments, the display generation component is included in a head-mounted device that is worn on the user's head, and when worn on the user's head, the display generation component is in the first state and the user is able to view the three-dimensional environment that is visible via the display generation component. In some embodiments, in response to detecting that the head-mounted device has been removed from the user's head (e.g., is no longer being worn by the user)—for example, the first event—the computer system transitions the display generation component to the second state.

In some embodiments, after the change in state of the display generation component from the first state to the second state (e.g., after the user has changed orientation and/or moved to a different location in the physical environment after the change in state of the display generation component from the first state to the second state) (1202*c*), the computer system (e.g., 101) detects (1202*d*) a second event corresponding to a change in state of the display generation component from the second state to the first state in which the three-dimensional environment is visible via the display generation component, wherein while the display generation component is in the first state after detecting the second event, the three-dimensional environment is visible, via the display generation component, from a second viewpoint, different from the first viewpoint, of the user (e.g., corresponding to the user's changed orientation and/or location in the physical environment), wherein the second viewpoint is associated with a second respective spatial arrangement of the user relative to the three-dimensional environment, such as viewpoint 1126 in FIG. 11C. For example, the second event is optionally an input detected by the computer system to redisplay and/or enter the three-dimensional environment (e.g., selection of a displayed selectable option, or selection of a hardware button included on the computer system). In some embodiments, the second event is detecting that the head-mounted device has been placed on the user's head (e.g., is once again being worn by the user). For example, the computer system now displays the three-dimensional environment from the updated viewpoint of the user (e.g., having an updated location and/or orientation in the three-dimensional environment that corresponds to the new location and/or orientation of the user in the physical environment of the user).

In some embodiments, after the change in state of the display generation component from the first state to the second state (e.g., after the user has changed orientation and/or moved to a different location in the physical environment after the change in state of the display generation component from the first state to the second state) (1202*c*), in response to detecting the second event and while the three-dimensional environment is visible from the second viewpoint (e.g., the computer system transitions the display generation component to the first state in response to detecting the second event), the computer system displays, via the display generation component, the first virtual object in the three-dimensional environment (1202*e*), including in accordance with a determination that one or more criteria are satisfied (e.g., one or more criteria for recentering the three-dimensional environment—such as described with reference to methods 800 and/or 1000—including the first virtual object, to the updated viewpoint of the user. The one or more criteria will be described in more detail below), displaying (1202*f*), in the three-dimensional environment, the first virtual object with the first spatial arrangement relative to the second viewpoint of the user and a third spatial arrangement, different from the second spatial arrangement, relative to the three-dimensional environment, such as with respect to objects 1106*a*, 1108*a* and/or 1110*a* in FIG. 11E. For example, because the one or more criteria are satisfied, the computer system displays the first virtual object at the same relative location and/or orientation relative to the second viewpoint as the first virtual object was displayed relative to the first viewpoint from which the three-dimensional environment was last displayed (e.g., at a different location and/or with a different orientation in the three-dimensional environment than before). In some embodiments, because the user is now in a different orientation and/or location in the three-dimensional environment and/or physical environment (e.g., the second viewpoint corresponds to the different orientation and/or location), and because the first virtual object is displayed at the same first spatial arrangement relative to the second viewpoint as it was before, the first virtual object is now displayed with a different spatial arrangement relative to the three-dimensional environment and/or physical environment that it was before (e.g., the first virtual object is no longer displayed over a physical table in the physical environment, but is now displayed over a physical sofa in the physical environment).

In some embodiments, after the change in state of the display generation component from the first state to the second state (e.g., after the user has changed orientation and/or moved to a different location in the physical environment after the change in state of the display generation component from the first state to the second state) (1202*c*), in response to detecting the second event and while the three-dimensional environment is visible from the second viewpoint (e.g., the computer system transitions the display generation component to the first state in response to detecting the second event), the computer system displays, via the display generation component, the first virtual object in the three-dimensional environment (1202*e*), including in accordance with a determination that the one or more criteria are not satisfied, displaying (1202*g*), in the three-dimensional environment, the first virtual object with a fourth spatial arrangement, different from the first spatial arrangement, relative to the second viewpoint of the user and the second spatial arrangement relative to the three-dimensional environment, such as with respect to object 1110*a* in FIG. 11C. For example, because the one or more criteria are not satisfied, the computer system displays the first virtual object at a different relative location and/or orientation relative to the second viewpoint than when the first virtual object was displayed relative to the first viewpoint from which the three-dimensional environment was last displayed (e.g., at the same location and/or with the same orientation in the three-dimensional environment as before). Thus, because the first virtual object is not repositioned in the three-dimensional environment, the first virtual object is optionally displayed with the same second spatial arrangement relative to the three-dimensional environment and/or physical environment as it was before (e.g., the first virtual object is still displayed over the physical table in the physical environment). In some embodiments, inputs described with reference to method 1200 are or include air gesture inputs. Selectively recentering objects based on an updated viewpoint of a user reduces the number of inputs needed to make objects accessible to the user when initiating display of the three-dimensional environment.

In some embodiments, the one or more criteria are satisfied when a duration of time between the first event and the second event is greater than a time threshold (e.g., 5 minutes, 30 minutes, 1 hr., 3 hrs., 6 hrs., 12 hrs., 24 hrs., 48 hrs., 96 hrs. or 192 hrs.), such as between FIGS. 11A and 11D/E, and are not satisfied when the duration of time between the first event and the second event is less than the time threshold (1204), such as between FIGS. 11A and 11B/C. For example, the computer system optionally does not automatically recenter the three-dimensional environment to the new viewpoint of the user in response to detecting the second event if the time since detecting the first event has been less than the time threshold, and optionally does automatically recenter the three-dimensional environment to the new viewpoint of the user in response to detecting the second event if the time since detecting the first event is greater than the time threshold. Selectively recentering objects to an updated viewpoint of a user based on time enables recentering to be performed when appropriate without displaying additional controls.

In some embodiments, the one or more criteria are satisfied when the second viewpoint of the user is greater than a threshold distance (e.g., 0.1, 0.5, 1, 3, 5, 10, 20, 50, 100 or 300 meters) from the first viewpoint of the user in the three-dimensional environment, such as between FIGS. 11A and 11D/E, and are not satisfied when the second viewpoint of the user is less than the threshold distance from the first viewpoint of the user in the three-dimensional environment (1206), such as between FIGS. 11A and 11B/C. For example, when the second event is detected if the user has moved more than the threshold distance away from a location in the user's physical environment at which the first event was detected, the computer system optionally does automatically recenter the three-dimensional environment to the new viewpoint of the user in response to detecting the second event. On the other hand, when the second event is detected if the user has not moved more than the threshold distance away from the location in the user's physical environment at which the first event was detected, the computer system optionally does not automatically recenter the three-dimensional environment to the new viewpoint of the user in response to detecting the second event. Selectively recentering objects to an updated viewpoint of a user based on distance enables recentering to be performed when appropriate without displaying additional controls.

In some embodiments, the one or more criteria are satisfied when a difference in orientation between the first and second viewpoints of the user in the three-dimensional environment is greater than a threshold (e.g., the orientation of the second viewpoint is more than 5, 10, 20, 30, 45, 90, 120 or 150 degrees rotated relative to the orientation of the first viewpoint), such as between FIGS. 11A and 11D/E, and are not satisfied when the difference in orientation between the first and second viewpoints of the user in the three-dimensional environment is less than the threshold (1208), such as between FIGS. 11A and 11B/C. For example, when the second event is detected if the user has moved and/or reoriented their head, body, shoulders and/or torso more than the threshold orientation away from the orientation of the user (e.g., user's head, body, shoulders and/or torso) in the user's physical environment at which the first event was detected, the computer system optionally does automatically recenter the three-dimensional environment to the new viewpoint of the user in response to detecting the second event. On the other hand, when the second event is detected if the user has not moved and/or reoriented their head, body, shoulders and/or torso more than the threshold orientation away from the orientation of the user (e.g., user's head, body, shoulders and/or torso) in the user's physical environment at which the first event was detected, the computer system optionally does not automatically recenter the three-dimensional environment to the new viewpoint of the user in response to detecting the second event. Selectively recentering objects to an updated viewpoint of a user based on orientation enables recentering to be performed when appropriate without displaying additional controls.

In some embodiments, the one or more criteria are satisfied when the first viewpoint of the user corresponds to a location within a first room in the three-dimensional environment and the second viewpoint of the user corresponds to a location within a second room, different from the first room, in the three-dimensional environment (e.g., when the viewpoint of the user was the first viewpoint, the user is located in a first room of the physical environment of the user, and when the viewpoint of the user is the second viewpoint, the user is located in a second room of the physical environment of the user), such as between FIGS. 11A and 11D/E, and are not satisfied when the first viewpoint of the user and the second viewpoint of the user correspond to locations within a same room in the three-dimensional environment (1210), such as between FIGS. 11A and 11B/C. In some embodiments, the one or more criteria are additionally or alternatively satisfied when the location of the user corresponding to the first viewpoint is separated from the location of the user corresponding to the second viewpoint by at least one wall in the physical environment of the user. For example, when the second event is detected if the user has moved to a different room than the room that includes a location in the user's physical environment at which the first event was detected, the computer system optionally does automatically recenter the three-dimensional environment to the new viewpoint of the user in response to detecting the second event. On the other hand, when the second event is detected if the user has not moved to a different room than the room that includes the location in the user's physical environment at which the first event was detected, the computer system optionally does not automatically recenter the three-dimensional environment to the new viewpoint of the user in response to detecting the second event. Selectively recentering objects to an updated viewpoint of a user based on the user's movement to a different room enables recentering to be performed when appropriate without displaying additional controls.

In some embodiments, while the three-dimensional environment is visible from the second viewpoint of the user, and while displaying, via the display generation component, the first virtual object with the fourth spatial arrangement relative to the second viewpoint of the user and the second spatial arrangement relative to the three-dimensional environment in accordance with the determination that the one or more criteria are not satisfied (e.g., the three-dimensional environment was not automatically recentered to the second viewpoint of the user in response to detecting the second event), such as in FIG. 11C, the computer system (e.g., 101) detects (1012*a*), via the one or more input devices, an input corresponding to a request to update a spatial arrangement of the first virtual object relative to the second viewpoint of the user to satisfy a first set of one or more criteria that specify a range of distances or a range of orientations of virtual objects relative to the second viewpoint of the user, such as such an input being detected in FIG. 11C (e.g., such as described with reference to method 800. The input optionally has one or more of the characteristics of the first input (e.g., a recentering input) described with reference to methods 800, 1000 and/or 1400).

In some embodiments, in response to detecting the input, the computer system (e.g., 101) displays (1012*b*), in the three-dimensional environment, the first virtual object with the first spatial arrangement relative to the second viewpoint of the user and the third spatial arrangement relative to the three-dimensional environment, such as if objects 1106*a*, 1108*a* and/or 1110*a* were displayed in FIG. 11C with spatial arrangements relative to viewpoint 1126 in FIG. 11C that they had relative to viewpoint 1126 in FIG. 11A. Thus, in some embodiments, even though the computer system did not automatically recenter the three-dimensional environment to the second viewpoint of the user in response to detecting the second event, the user is able to subsequent manually recenter the three-dimensional environment by providing input to do so. In some embodiments, the result of recentering in response to the second event and recentering in response to the user input is the same. Providing for manual recentering provides an efficient way to place virtual objects at appropriate positions in the three-dimensional environment.

In some embodiments, the input corresponding to the request to update the spatial arrangement of the first virtual object relative to the second viewpoint of the user to satisfy the first set of one or more criteria includes selection of a physical button of the computer system (1014), such as the input described with reference to FIG. 7B. In some embodiments, the display generation component is included in a device (e.g., a physical device) that includes a physical depressible button. In some embodiments, the button is also rotatable (e.g., to increase or decrease a level of immersion at which the computer system is displaying the three-dimensional environment, as described with reference to method 800). In some embodiments, the device is a head-mounted device, such as a virtual or augmented reality headset. In some embodiments, the input is or includes depression of the button (and does not include rotation of the button). Providing for manual recentering via activation of a physical button provides an efficient way to place virtual objects at appropriate positions in the three-dimensional environment.

In some embodiments, the display generation component is included in a wearable device that is wearable by the user (e.g., a head-mounted device, such as a virtual or augmented reality headset or glasses), and detecting the first event includes detecting that the user is no longer wearing the wearable device (e.g., detecting that the user has removed the head-mounted device from their head, and/or detecting that the head-mounted device is no longer on the user's head) (1016). Other wearable devices are also contemplated, such as a smart watch. In some embodiments, detecting the second event includes detecting that the user has placed the head-mounted device on their head and/or detecting that the head-mounted device is again being worn by the user. Transitioning to the second state of the display generation component based on whether a user is wearing the device reduces the number of inputs needed to transition to the second state.

In some embodiments, detecting the first event includes detecting an input corresponding to a request to cease visibility of the three-dimensional environment via the display generation component (1018). For example, the input is an input to close a virtual or augmented reality experience that is being presented by the computer system. In some embodiments, the virtual or augmented reality experience is being provided by an application being run by the computer system, and the input is an input to close that application. In some embodiments, the input is an input to exit a full screen mode of the virtual or augmented reality experience. In some embodiments, the input is an input to reduce a level of immersion at which the computer system is displaying the three-dimensional environment (e.g., by rotating the physical button previously described in a first direction), such as described with reference to method 800. In some embodiments, the second event is an input to open or initiate the virtual or augmented reality experience. In some embodiments, the second event is an input to open or launch the application providing the virtual or augmented reality experience. In some embodiments, the second event is an input to increase a level of immersion (e.g., above or to a threshold immersion level) at which the computer system is displaying the three-dimensional environment (e.g., by rotating the physical button previously described in a second direction, different from the first direction), such as described with reference to method 800. Transitioning to the second state of the display generation component based on the user input provides an efficient way to transition to the second state.

In some embodiments, detecting the first event includes detecting an input corresponding to a request to put the display generation component in a lower power state (1020). For example, in some embodiments, the display generation component is included in a device (e.g., a head-mounted device) and the input is an input to turn off the power to the device or to put the device in a sleep or low power mode. In some embodiments, the second event is an input to turn on the power to the device or to put the device in a regular power mode (e.g., to exit the sleep or lower power mode). Transitioning to the second state of the display generation component based on whether a user is wearing the device reduces the number of inputs needed to transition to the second state.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

FIGS. 13A-13C illustrate examples of a computer system selectively recentering content associated with a communication session between multiple users in response to an input detected at the computer system in accordance with some embodiments.

FIG. 13A illustrates two three-dimensional environments 1302*a* and 1302*b* visible via respective display generation components 120*a* and 120*b* (e.g., display generation component 120 of FIG. 1) of computer systems 101*a* and 101*b*. Computer system 101*a* is optionally located in a first physical environment, and three-dimensional environment 1302*a* is optionally visible via its display generation component 120*a*, and computer system 101*b* is optionally located in a second physical environment, and three-dimensional environment 1302*b* is optionally visible via its display generation component 120*b*. Three-dimensional environment 1302*a* is visible from a viewpoint 1328*c* of a user illustrated in the overhead view (e.g., facing a wall of the room in which computer system 101*a* is located). Three-dimensional environment 1302*b* is visible from a viewpoint 1330*c* of a user illustrated in the overhead view (e.g., facing a wall of the room in which computer system 101*b* is located). The overhead view optionally corresponds to a layout of the various virtual objects and/or representations of users-both of which will be described in more detail later-relative to each other in three-dimensional environment 1302*a* visible via computer system 101*a*. The overhead view for three-dimensional environment 1302*b* visible via computer system 101*b* would optionally include corresponding elements and/or would reflect corresponding relative layouts. Computer systems 101*a* and 101*b* are optionally participating in a communication session such that the relative locations of representations of users and shared virtual objects relative to one another in the respective three-dimensional environments displayed by the computer systems 101*a* and 101*b* are consistent and/or the same, as will be described in more detail below and with reference to method 1400.

As described above with reference to FIGS. 1-6, the computer system 101*a* and 101*b* optionally include a display generation component (e.g., a touch screen) and a plurality of image sensors 314*a* and 314*b*, respectively (e.g., image sensors 314 of FIG. 3). The image sensors optionally include one or more of a visible light camera, an infrared camera, a depth sensor, or any other sensor the computer systems 101*a* and 101*b* would be able to use to capture one or more images of a user or a part of the user (e.g., one or more hands of the user) while the user interacts with the computer systems 101 or 101*b*. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 13A, computer system 101*a* captures one or more images of the physical environment around computer system 101*a* (e.g., operating environment 100), including one or more objects in the physical environment around computer system 101*a*. In some embodiments, computer system 101*a* displays representations of the physical environment in three-dimensional environment 1302*a* and/or the physical environment is visible in the three-dimensional environment 1302*a* via the display generation component 120*a*. For example, three-dimensional environment 1302*a* visible via display generation component 120*a* includes representations of the physical floor and back and side walls of the room in which computer system 101*a* is located. Three-dimensional environment 1302*a* also includes table 1322*a*, which is visible via the display generation component from the viewpoint 1328*c* in FIG. 13A.

Computer system 101*b* optionally similarly captures one or more images of the physical environment around computer system 101*b* (e.g., operating environment 100), including one or more objects in the physical environment around computer system 101*b*. In some embodiments, computer system 101*b* displays representations of the physical environment in three-dimensional environment 1302*b* and/or the physical environment is visible in the three-dimensional environment 1302*b* via the display generation component 120*b*. For example, three-dimensional environment 1302*b* visible via display generation component 120*b* includes representations of the physical floor and back and side walls of the room in which computer system 101*b* is located. Three-dimensional environment 1302*b* also includes sofa 1324*a*, which is visible via the display generation component from the viewpoint 1330*c* in FIG. 13A.

In FIG. 13A, three-dimensional environment 1302*a* also includes virtual objects 1306*a* (corresponding to object 1306*c* in the overhead view), 1308*a* (corresponding to object 1308*c* in the overhead view), and 1310*a* (corresponding to object 1310*c* in the overhead view) that are visible from viewpoint 1328*c*. In FIG. 13A, objects 1306*a*, 1308*a* and 1310*a* are two-dimensional objects, but the examples of the disclosure optionally apply equally to three-dimensional objects. Three-dimensional environment 1302*a* also includes virtual object 1312*c*, which is optionally not currently visible in three-dimensional environment 1302*a* from the viewpoint 1328*c* of the user of computer system 101*a* in FIG. 13A. Virtual objects 1306*a*, 1308*a*, 1310*a* and 1312*c* are optionally one or more of user interfaces of applications (e.g., messaging user interfaces or content browsing user interfaces), three-dimensional objects (e.g., virtual clocks, virtual balls, or virtual cars) or any other element displayed by computer system 101*a* that is not included in the physical environment of computer system 101*a*. Three-dimensional environment 1302*a* also includes representation 1330*a* of the user of computer system 101*b*, and representation 1332*a* of the user of another computer system also involved in the communication session. Representations of users described herein are optionally avatars or other visual representations of their corresponding users. Additional or alternative details about such representations of users are provided with reference to method 1400.

Three-dimensional environment 1302*b* visible via computer system 101*b* also includes virtual object 1308*b* (corresponding to virtual object 1308*a* and 1308*c*), virtual object 1310*b* (corresponding to virtual object 1310*a* and 1310*c*) and representation 1332*b* (corresponding to representation 1332*a*) of the user of the other computer system (other than computer systems 101*a* and 101*a*) also involved in the communication session. However, virtual objects 1308*b* and 1310*b*, and representation 1332*b*, are visible from a different perspective than via computer system 101*a*, corresponding to the different viewpoint 1330*c* of the user of computer system 101*b* as shown in the overhead view. Three-dimensional environment 1302*b* visible via computer system 101*b* also includes representation 1328*b* of the user of computer system 101*a*, visible from the viewpoint 1330*c* of the user of computer system 101*b*.

Returning to three-dimensional environment 1302*a*, virtual objects 1308*a* and 1310*a* are optionally shared virtual objects (as indicated by the text "shared" in FIGS. 13A-13C). Shared virtual objects are optionally accessible and/or visible to users and/or computer systems with which they are shared in their respective three-dimensional environments. For example, three-dimensional environment 1302*b* includes those shared virtual objects 1308*b* and 1310*b*, as shown in FIG. 13A, because virtual objects 1308*a* and 1310*a* are optionally shared with computer system 101*b*. In contrast, virtual object 1306*a* is optionally private to computer system 101*a* (as indicated by the text "private" in FIGS. 13A-13C). Virtual object 1312*c* is optionally also private to computer system 101*a*. Private virtual objects are optionally accessible and/or visible to the user and/or computer system to which they are private, and are not accessible and/or visible to users and/or computer systems to which they are not private. For example, three-dimensional environment 1302*b* does not include a representation of virtual object 1306*a*, because virtual object 1306*a* is optionally private to computer system 101*a* and not computer system 101*b*. Additional or alternative details about shared and private virtual objects are described with reference to method 1400.

In some embodiments, because shared virtual objects and/or representations of users are accessible and/or visible by multiple users and/or computer systems involved in the communication session, inputs to move such shared virtual objects and/or representations of users relative to the viewpoint of a given user in the communication session optionally preferably avoid moving those shared virtual objects relative to other users' viewpoints in the communication session. Further, private virtual objects are optionally shifted to avoid collisions with shared virtual objects and/or representations of users (e.g., such as described with reference to methods 1000 and/or 1400). Examples of the above will now be described.

In FIG. 13A, computer system 101*b* detects an input from hand 1303*b* of the user of computer system 101*b* to move shared virtual object 1308*b* in three-dimensional environment 1302*b* (e.g., an air gesture input as described with reference to method 1400). In response, computer system 101*b* moves virtual object 1308*b* away from the viewpoint 1330*c* of the user in three-dimensional environment 1302*b* in accordance with the input from hand 1303*b*, as shown in FIG. 13B. As a result, virtual object 1308*a* (corresponding to virtual object 1308*b*) in three-dimensional environment 1302*a* is correspondingly moved leftward in three-dimensional environment 1302*a* by computer system 101*a*, as shown in FIG. 13B, including in the overhead view.

In FIG. 13B, computer system 101*a* detects an input to reposition and/or reorient shared virtual objects 1308*a* and 1310*a* and/or representations 1330*a* and 1332*a* relative to viewpoint 1328*c*. For example, the input is optionally a recentering input detected at computer system 101*a* (e.g., as described with reference to methods 800, 1000, 1200 and/or 1400) to update the relative locations and/or orientations of virtual objects 1306*a*, 1308*a*, 1310*a* and/or 1312*a* and/or representations 1330 and/or 1332*a* relative to viewpoint 1328*c* to satisfy one or more sets of criteria (e.g., as described with reference to methods 800, 1000, 1200 and/or 1400).

In response, computer system 101*a* updates the relative locations and/or orientations of shared virtual objects and representations of users relative to viewpoint 1328*c*, as shown in FIG. 13C. For example, because virtual objects 1308*a* and 1310*a* are shared amongst multiple users in the communication session, computer system 101*a* optionally does not change the relative locations and/or orientations of virtual objects 1308*a* and 1310*a* relative to the viewpoints of users other than the user of computer system 101*a* (e.g., viewpoints 1330*c* and 1332*c*). Rather, computer system 101*a* moves viewpoint 1328*c* such that virtual objects 1308*a* and 1310*a* move relative to viewpoint 1328*c* (e.g., closer to viewpoint 1328*c*), as shown in FIG. 13C. The movement of viewpoint 1328*c* is also optionally relative to viewpoints 1330*c* and 1332*c* and representations 1330*a* (now outside of the field of view of the user from viewpoint 1328*c*) and 1332*a* in the same manner. As a result, from viewpoint 1328*c*, virtual objects 1308*a* and 1310*a* and representations 1330*a* and 1332*a* have moved in three-dimensional environment 1302*a*, but virtual objects 1308*b* and 1310*b* and representation 1332*b* have not moved in three-dimensional environment 1302*b*. The relative movement of viewpoint 1328*c* in FIG. 13C relative to virtual objects 1308*a* and 1310*a* and relative to viewpoints 1330*c* and 1332*c* also causes representation 1328*b* in three-dimensional environment 1302*b* to move accordingly, as shown in FIG. 13C.

Further, because computer system 101*a* optionally does not change the relative positions of virtual objects 1308*a* and 1310*a* relative to viewpoints 1330*c* and 1332*c* (e.g., because they are shared virtual objects), virtual objects 1308*a* and 1310*a* remain at their respective locations and/or orientations in FIG. 13C even if they collide with physical objects (e.g., table 1322*a*) in three-dimensional environment 1302*a*. For example, in FIG. 13C, virtual object 1310*a* is colliding with (e.g., is intersecting) table 1322*a* at its target location in response to the input detected in FIG. 13B. However, computer system 101*a* optionally performs no operation with respect to the location and/or orientation of virtual object 1310*a* to avoid the collision with table 1322*a* (e.g., the movement of viewpoint 1328*c* relative to virtual objects 1308*a* and 1310*a* is independent of and/or does not account for physical objects in three-dimensional environment 1302*a*).

In contrast to shared virtual objects, computer system 101*a* optionally does perform operations to change the locations and/or orientations of private virtual objects to avoid collisions with other virtual objects or physical objects in response to the input detected in FIG. 13B, because changing the locations and/or orientations of private virtual objects does not affect the three-dimensional environments displayed by other computer systems participating in the communication session (e.g., because those private virtual objects are not accessible to those other computer systems). For example, in FIG. 13C, computer system 101*a* has shifted virtual object 1306*a* (e.g., rightward) from its location in FIG. 13B in response to the input detected in FIG. 13B to avoid a collision with virtual object 1308*a* resulting from the input detected in FIG. 13B. Further, with respect to virtual object 1312*a*, its location in response to the input in FIG. 13B would have optionally been as indicated by 1312*c*' in the overhead view—however, at that location it would have optionally collided with table 1322*a*. As a result, computer system 101*a* has shifted virtual object 1312*a* (e.g., away from viewpoint 1328*c*) to avoid a collision with table 1322*a*. The shifting of objects to avoid collisions are optionally performed according to one or more aspects of method 1000 described previously.

FIGS. 14A-14E is a flowchart illustrating a method of selectively recentering content associated with a communication session between multiple users in response to an input detected at the computer system in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1400 are, optionally, combined and/or the order of some operations is, optionally, changed.

In some embodiments, method 1400 is performed at a first computer system (e.g., 101*a*) in communication with a display generation component (e.g., 120*a*) and one or more input devices. In some embodiments, the computer system has one or more characteristics of the computer system of methods 800, 1000 and/or 1200. In some embodiments, the display generation component has one or more characteristics of the display generation component of methods 800, 1000 and/or 1200. In some embodiments, the one or more input devices have one or more of the characteristics of the one or more input devices of methods 800, 1000 and/or 1200.

In some embodiments, while a communication session between a first user of the first computer system and a second user of a second computer system is ongoing, such as with respect to computer systems 101*a* and 101*b* in FIG. 13A, and a three-dimensional environment (e.g., the three-dimensional environment optionally has one or more characteristics of the three-dimensional environment of methods 800, 1000 and/or 1200) is visible via the display generation component from a first viewpoint of a first user (e.g., such as described with reference to methods 800, 1000 and/or 1200), such as three-dimensional environment 1302*a* in FIG. 13A, the computer system displays (1402*a*), via the display generation component, a plurality of virtual objects in the three-dimensional environment, including a first virtual object and a second virtual object, such as objects 1308*a* and 1310*a* in FIG. 13A. In some embodiments, the first virtual object of the plurality of virtual objects is accessible to the first computer system and the second computer system (1402*b*), such as objects 1308*a* and/or 1310*a* in FIG. 13A (and optionally additional computer systems). For example, objects within the three-dimensional environment and/or the three-dimensional environment are being displayed by both the first computer system and the second computer system, concurrently, but from different viewpoints associated with their respective users. The first computer system is optionally associated with a first user, and the second computer system is optionally associated with a second user, different from the first user. In some embodiments, the first and second computer systems are in the same physical environment (e.g., at different locations in the same room). In some embodiments, the first and second computer systems are located in different physical environments (e.g., different cities, different rooms, different states and/or different countries). In some embodiments, the first and second computer systems are in communication with each other such that the display of the objects within the three-dimensional environment and/or the three-dimensional environment by the two computer systems is coordinated (e.g., changes to the objects within the three-dimensional environment and/or the three-dimensional environment made in response to inputs from the first user of the first computer system are reflected in the display of the objects within the three-dimensional environment and/or the three-dimensional environment by the second computer system).

In some embodiments, the three-dimensional environment includes (1402*c*), a representation of the second user of the second computer system at a first location in the three-dimensional environment (1402*d*), such as representations 1330*a* and/or 1332*a* in FIG. 13A (e.g., an avatar corresponding to the user of the second computer system and/or a cartoon or realistic (three-dimensional) model of the user of the second computer system; in some embodiments, the first location corresponds to the location of the viewpoint from which the second computer system is displaying the three-dimensional environment, which optionally corresponds to a physical location in the physical environment of the user of the second computer system). In some embodiments, the first virtual object (e.g., the first virtual object optionally has one or more characteristics of the virtual object(s) in methods 800, 1000, 1200 and/or 1600) that is accessible by the first computer system is displayed at a second location in the three-dimensional environment, such as objects 1308*a* and/or 1310*a* in FIG. 13A, the first virtual object accessible by the second computer system (1402*e*). In some embodiments, the second virtual object (e.g., the second virtual object optionally has one or more characteristics of the virtual object(s) in methods 800, 1000, 1200 and/or 1600) that is accessible by the first computer system is displayed at a third location in the three-dimensional environment, the second virtual object not accessible by the second computer system (1402*f*), such as object 1306*a* in FIG. 13A. In some embodiments, the first virtual object is a shared virtual object (e.g., shared by the user of the first computer system with the user of the second computer system, or vice versa). A shared virtual object is optionally displayed in three-dimensional environments displayed by the computer systems with which it is shared. Thus, the first virtual object is optionally displayed by both the first and the second computer systems at the second location in their respective three-dimensional environments. Further, the users of the computer systems with which the shared virtual object is shared are optionally able to interact with the shared virtual object (e.g., provide inputs to the shared virtual object or move the shared virtual object in the three-dimensional environment(s)). In some embodiments, the second virtual object is a private virtual object (e.g., private to the user of the first computer system). A private virtual object is optionally displayed in the three-dimensional environment only by those computer systems to which it is private. Thus, the second virtual object is optionally displayed by the first computer system at the third location in the three-dimensional environment, but not displayed by the second computer system. In some embodiments, the second computer system displays an outline or other indication of the second virtual object at the third location in the three-dimensional environment displayed by the second computer system without displaying the content of the second virtual object in the three-dimensional environment, while the first computer system does display the content of the second virtual object in the three-dimensional environment displayed by the first computer system. Further, in some embodiments, only the users of the computer systems to which the private virtual object is private are able to interact with the private virtual object (e.g., provide inputs to the private virtual object, move the private virtual object in the three-dimensional environment(s)).

In some embodiments, the representation of the second user has a first spatial arrangement relative to the first virtual object (1402*g*), such as the spatial arrangement of 1332*a* relative to object 1308*a* in FIG. 13A. For example, the orientation of the representation of the second user relative to the orientation of the first virtual object is a particular relative orientation, the distance between the representation of the second user and the first virtual object is a particular distance, the location of the representation of the second user relative to the location of the first virtual object in the three-dimensional environment is a particular relative location and/or the relative heights of the representation of the second user and the first virtual object in the three-dimensional environment are particular relative heights. In some embodiments, the second virtual object has a second spatial arrangement relative to the first virtual object and the representation of the second user (1402*h*), such as the spatial arrangement of object 1306*a* relative to object 1308*a* and representation 1332*a* in FIG. 13A. For example, the orientation of the second virtual object relative to the orientation of the first virtual object and/or the representation of the second user is a particular relative orientation, the distance between the second virtual object and the first virtual object and/or the representation of the second user is a particular distance, the location of the second virtual object relative to the location of the first virtual object and/or the representation of the second user in the three-dimensional environment is a particular relative location and/or the relative heights of the second virtual object and the first virtual object and/or the representation of the second user in the three-dimensional environment are particular relative heights.

In some embodiments, while displaying plurality of virtual objects in the three-dimensional environment, the computer system receives (1402*i*), via the one or more input devices, a first input corresponding to a request to update a spatial arrangement of one or more virtual objects relative to a current viewpoint of the first user, such as the input at computer system 101*a* in FIG. 13B (e.g., such as described with reference to methods 800, 1000 and/or 1200. The first input optionally has one or more of the characteristics of the first input (e.g., a recentering input) described with reference to methods 800 and/or 1000). In some embodiments, in response to receiving the first input (1402*j*), the computer system moves the representation of the second user and content associated with the communication session (e.g., a representation of a user in the communication session or a virtual object that is shared in the communication session, such as the first virtual object) between the first user and the second user relative to the three-dimensional environment, such as shown in FIG. 13C (e.g., the second virtual object has a third spatial arrangement, different from the second spatial arrangement, relative to the first virtual object and the representation of the second user). In some embodiments, in accordance with a determination that at least a portion of the content associated with the communication session between the first user and the second user has been moved to a location in the three-dimensional environment that is within a threshold distance (e.g., 0.1, 0.3, 0.5, 1, 3, 5, 10, 20, 30, 50, 100, 250 or 500 cm) of the second virtual object, the computer system moves (14021) the second virtual object relative to the three-dimensional environment, such as how computer system 101*a* moves virtual object 1306*a* between FIGS. 13B and 13C due to the movement of object 1308*a* between FIGS. 13B and 13C (e.g., moving the second virtual object away from the third location). For example, the second virtual object, which is a private virtual object, has shifted relative to the representation of the second user and/or the first virtual object and/or the current viewpoint of the first user to avoid a collision with the representation of the second user and/or the first virtual object and/or another object (e.g., virtual or physical) in the three-dimensional environment, similar to as described with reference to method 1000.

In some embodiments, in accordance with a determination that the content associated with the communication session between the first user and the second user is not at a location in the three-dimensional environment that is within the threshold distance of the second virtual object, the computer system maintains (1402*m*) a position (e.g., the third location) of the second virtual object relative to the three-dimensional environment, such as if object 1308*a* had not moved within the threshold distance of object 1306*a* between FIGS. 13B and 13C, which would have optionally resulted in object 1306*a* maintaining its position relative to the three-dimensional environment 1302*a* (e.g., none of the content or none of the content of a particular type such as none of the representations of users or none of the shared virtual objects is at or within the threshold distance of the second virtual object in response to the first input). In some embodiments, a spatial arrangement of the representation of the second user and/or the first virtual object relative to the current viewpoint of the first user satisfies first one or more criteria that specify a range of distances or a range of orientations of one or more virtual objects and/or representations of users relative to the current viewpoint of the first user (e.g., such as described with reference to methods 800, 1000 and/or 1200). In some embodiments, the first spatial arrangement of the representation of the second user relative to the first virtual object is maintained in response to the first input (e.g., the relative locations and/or orientations of the representation of the second user and the first virtual object relative to each other is the same as it was before the first input was received-thus, the spatial arrangement of shared virtual objects and/or representations of users other than the user of the first computer system is optionally maintained in response to receiving the first input, even though the spatial arrangement of the viewpoint of the user relative to the shared virtual objects and/or representations of other users has optionally changed). Thus, in some embodiments, private virtual objects are shifted in the three-dimensional environment to avoid collisions with shared items (e.g., representations of users or shared objects), but shared items are not shifted in the three-dimensional environment to avoid collisions with private items. In some embodiments, inputs described with reference to method 1400 are or include air gesture inputs. Shifting private virtual objects in response to a recentering input causes the computer system to automatically avoid conflicts between shared and private virtual objects.

In some embodiments, in response to receiving the first input (1404*a*), in accordance with a determination that the second virtual object that is not accessible by the second computer system (e.g., the second virtual object is private to the first computer system) is within the threshold distance of a location corresponding to a physical object in a physical environment of the first user, such as object 1312*a* relative to table 1322*a* in FIG. 13C (e.g., colliding with a table, colliding with a chair, or within or behind a wall with respect to the first user's current location in the physical environment), the computer system moves (1404*b*) the second virtual object relative to the three-dimensional environment, such as shown with respect to the movement of object 1312*a* away from table 1322*a* in FIG. 13C (e.g., in response to receiving the first input, the first computer system optionally moves private virtual objects away from their current locations in the three-dimensional environment to avoid collisions with physical objects, such as described with reference to method 1000). In some embodiments, in accordance with a determination that the second virtual object is not within the threshold distance of the location corresponding to the physical object (and/or not within the threshold distance of the location corresponding to any physical object), the computer system maintains (1404*c*) a position of the second virtual object relative to the three-dimensional environment, such as if object 1312*a* had not been within the threshold distance of table 1322*a* in response to the input detected in FIG. 13B, and therefore maintaining the location of object 1312*a* in FIG. 13C. In some embodiments, if the second virtual object is not colliding with the (or any) physical object in the physical environment of the first user, the first computer system does not move the second virtual object away from its current location in the three-dimensional environment. Shifting private virtual objects that collide with physical objects causes the computer system to automatically avoid conflicts between the private virtual objects and the physical objects.

In some embodiments, in response to receiving the first input (1406*a*), moving the content (e.g., first virtual object) relative to the three-dimensional environment is irrespective of whether the content is within the threshold distance of a location corresponding to a physical object in a physical environment of the first user (1406*b*), such as shown with object 1310*a* in FIG. 13C colliding with table 1322*a*. Thus, in some embodiments, the first computer system does not account for physical objects when placing and/or moving shared virtual objects in the three-dimensional environment in response to the first input. Placing or moving shared virtual objects without regard to physical objects in the environment of the first user ensures consistency of interaction with shared virtual objects across a plurality of computer systems.

In some embodiments, while the communication session between the first user of the first computer system and the second user of the second computer system is ongoing and the three-dimensional environment is visible via the display generation component from a second viewpoint of the user, different from the first viewpoint (e.g., the first user has moved in their physical environment to cause the viewpoint of the first user into the three-dimensional environment to change corresponding to the changed location and/or orientation of the first user in the physical environment of the first user), wherein the three-dimensional environment includes the plurality of virtual objects, the computer system receives (1408*a*), via the one or more input devices, a second input corresponding to a request to update a spatial arrangement of one or more virtual objects relative to a current viewpoint of the first user to satisfy first one or more criteria that specify a range of distances or a range of orientations of the one or more virtual objects relative to the current viewpoint of the first user (e.g., such as described with reference to methods 800, 1000 and/or 1200. The first input optionally has one or more of the characteristics of the first input (e.g., a recentering input) described with reference to methods 800 and/or 1000). In some embodiments, in response to receiving the second input, the computer system moves (1408*b*) the second virtual object relative to the three-dimensional environment to a fourth location in the three-dimensional environment, wherein the fourth location satisfies the first one or more criteria, such as the movement of object 1312*a* from FIGS. 13B to 13C (e.g., the location and/or orientation of the second virtual object relative to the second viewpoint of the first user satisfies the first one or more criteria, such as described with reference to methods 800, 1000 and/or 1200). For example, recentering the second virtual object, which is a private virtual object private to the first computer system, to the second viewpoint of the first user as described with reference to methods 800, 1000 and/or 1200. In some embodiments, the first virtual object and/or the representation of the second user are also moved relative to the three-dimensional environment in response to the second input, such as in ways similar to as described previously with respect to the first input. Recentering one or more objects to the updated viewpoint of the first user reduces the number of inputs needed to appropriately place objects in the three-dimensional environment of the first user.

In some embodiments, the first virtual object is movable relative to the three-dimensional environment based on movement input directed to the first virtual object by the second user at the second computer system (1410), such as shown with object 1308*a* being moved by the user of computer system 101*b* from FIG. 13A to 13B. For example, the second user of the second computer system, which optionally displays the first virtual object (e.g., a shared virtual object) in a three-dimensional environment displayed by the second computer system, is able to provide input to the second computer system to move the first virtual object in the three-dimensional environment displayed by the second computer system (e.g., an input including a gaze of the second user directed to the first virtual object, a pinch gesture performed by a thumb and index finger of the second user coming together and touching, and while the thumb and index finger of the second user are touching (a "pinch hand shape") movement of the hand of the user). In some embodiments, the first virtual object is moved in the three-dimensional environment displayed by the second computer system in accordance with the movement of the hand of the second user, and the first virtual object is moved correspondingly in the three-dimensional environment displayed by the first computer system. Shared content being movable by shared users causes the first computer system to automatically coordinate the placement of shared content across multiple computer systems.

In some embodiments, the communication session is between the first user, the second user, and a third user of a third computer system (e.g., an additional user and/or computer system, similar to the second user and/or the second computer system), and a representation of the third user (e.g., similar to the representation of the second user, such as an avatar corresponding to the third user, displayed in the three-dimensional environment at a location in the three-dimensional environment displayed by the first computer system corresponding to the location of the viewpoint of the third user in the three-dimensional environment) and the representation of the second user are moved relative to the three-dimensional environment in response to receiving the first input (1412), such as the movement of both representations 1330*a* and 1332*a* from FIGS. 13B to 13C (e.g., the representation of the second user and the representation of the third user will both move (e.g., concurrently) in the three-dimensional environment in response to the first input, analogous to the movement of the representation of the second user in response to the first input). In some embodiments, the relative spatial arrangement of the representation of the first user and the representation of the second user relative to one another remains the same before and after the first input. In some embodiments, the movement (e.g., amount or direction of the movement) of the representations of the first and second users relative to the three-dimensional environment is the same in response to the first input. Moving both (or all) representations of other users in response to the first input causes the first computer system to automatically maintain proper placement of representations of users in response to the first input.

In some embodiments, the three-dimensional environment further includes a third virtual object that is accessible by the first computer system and the second computer system (e.g., an additional shared virtual object, similar to the first virtual object), and the content associated with the communication session that is moved in response to receiving the first input includes the first virtual object and the third virtual object (1414), such as the movement of both objects 1308*a* and 1310*a* from FIGS. 13B to 13C (e.g., the first virtual object and the third virtual object will both move (e.g., concurrently) in the three-dimensional environment in response to the first input, analogous to the movement of the first virtual object in response to the first input). In some embodiments, the relative spatial arrangement of the first virtual object and the third virtual object relative to one another remains the same before and after the first input. In some embodiments, the movement (e.g., amount or direction of the movement) of the first and third virtual objects relative to the three-dimensional environment is the same in response to the first input. Moving both (or all) shared virtual objects in response to the first input causes the first computer system to automatically maintain proper placement of shared virtual objects in response to the first input.

In some embodiments, the second computer system displays a second three-dimensional environment that includes a representation of the first user, such as representation 1328*b* in three-dimensional environment 1302*b* in FIGS. 13A-13C (e.g., the three-dimensional environment displayed by the second computer system includes the shared virtual objects displayed by the first computer system, and representation(s) of user(s) other than the second user. In some embodiments, the relative spatial arrangement of those shared virtual objects and/or representation(s) of user(s) relative to one another is the same in both the three-dimensional environment displayed by the first computer system and the three-dimensional environment displayed by the second computer system. In some embodiments, the representation of the first user is displayed at a location in the second three-dimensional environment corresponding to the location of the viewpoint of the first user in the second three-dimensional environment), and in response to the first computer system receiving the first input, the representation of the first user is moved relative to the second three-dimensional environment (1416), such as the movement of representation 1328*b* from FIGS. 13B to 13C (e.g., such that the representation of the first user appears to be moving in the three-dimensional environment displayed by the second computer system and/or three-dimensional environment(s) displayed by other computer systems other than the first computer system). In some embodiments, the movement of the representation of the first user relative to the second three-dimensional environment corresponds to the movement of the representation of the second user and the content associated with the communication session relative to the three-dimensional environment displayed by the first computer system in response to the first input (e.g., having a direction and/or magnitude based on the direction and/or magnitude of the movement of the representation of the second user and the content associated with the communication session relative to the three-dimensional environment displayed by the first computer system in response to the first input). Moving the representation of the first user in the second three-dimensional environment in response to the first input causes the computer system(s) to automatically maintain proper placement of the representation of the first user relative to shared virtual objects in response to the first input.

It should be understood that the particular order in which the operations in method 1400 have been described is merely exemplary and is not intended to indicate that the described order is the only order in which the operations could be performed. One of ordinary skill in the art would recognize various ways to reorder the operations described herein.

FIGS. 15A-15J illustrate examples of a computer system changing the visual prominence of content included in virtual objects based on viewpoint in accordance with some embodiments.

Figure 15A:
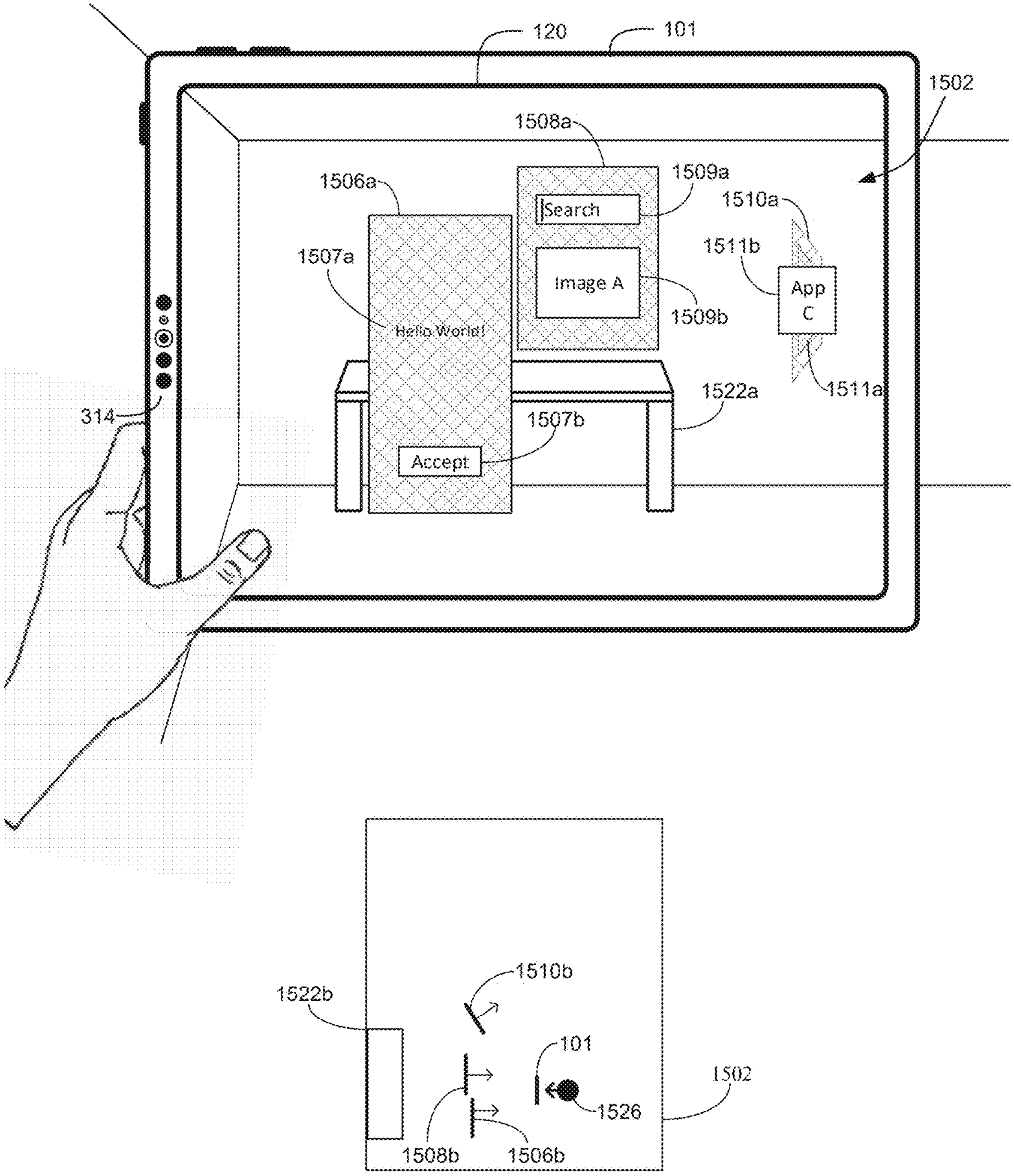
FIGS. 15A-15J illustrate examples of a computer system changing the visual prominence of content included in virtual objects based on viewpoint in accordance with some embodiments.
Figure 16B:
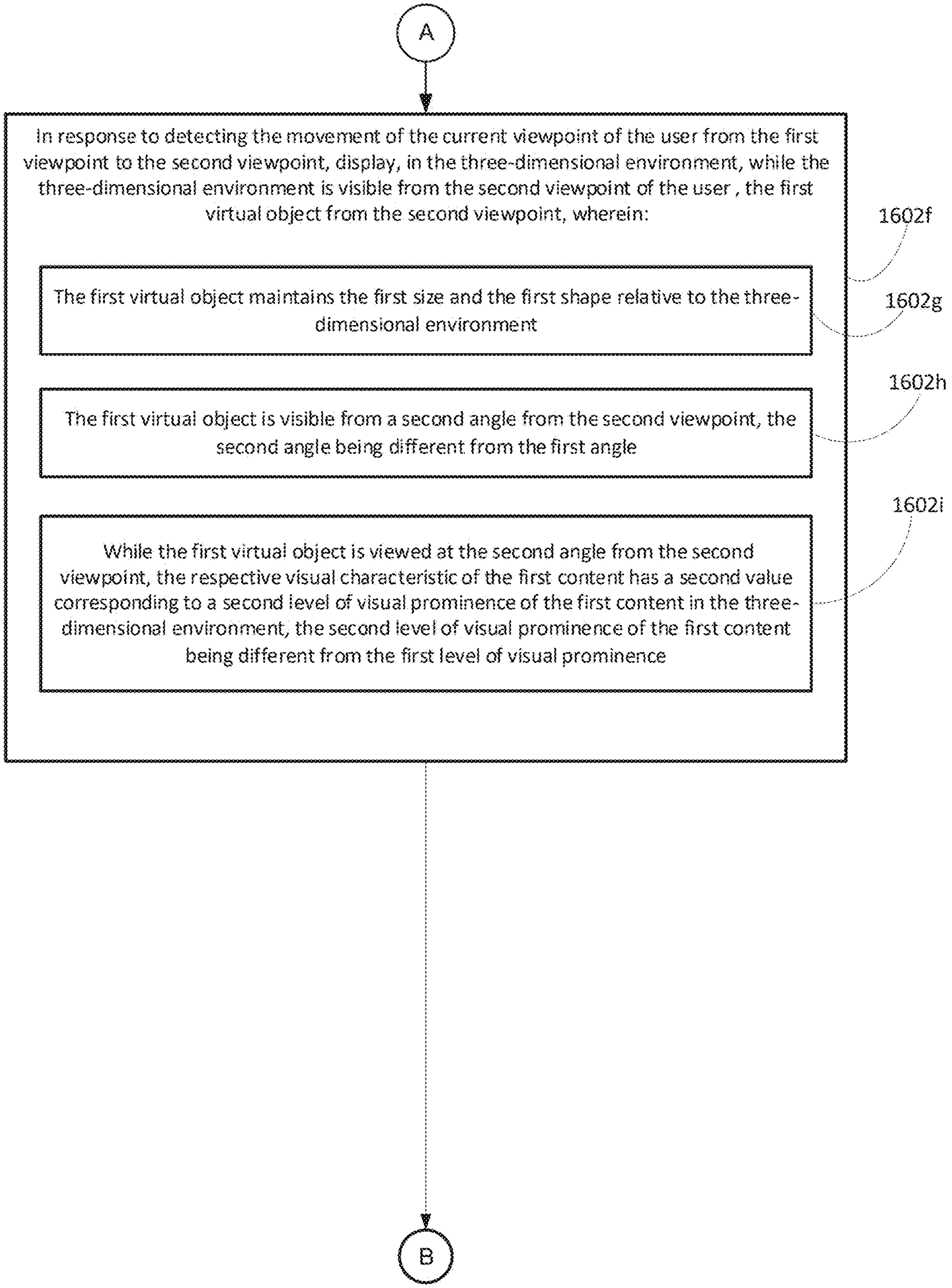
FIGS. 16A-16P is a flowchart illustrating a method of changing the visual prominence of content included in virtual objects based on viewpoint in accordance with some embodiments.
Figure 16D:
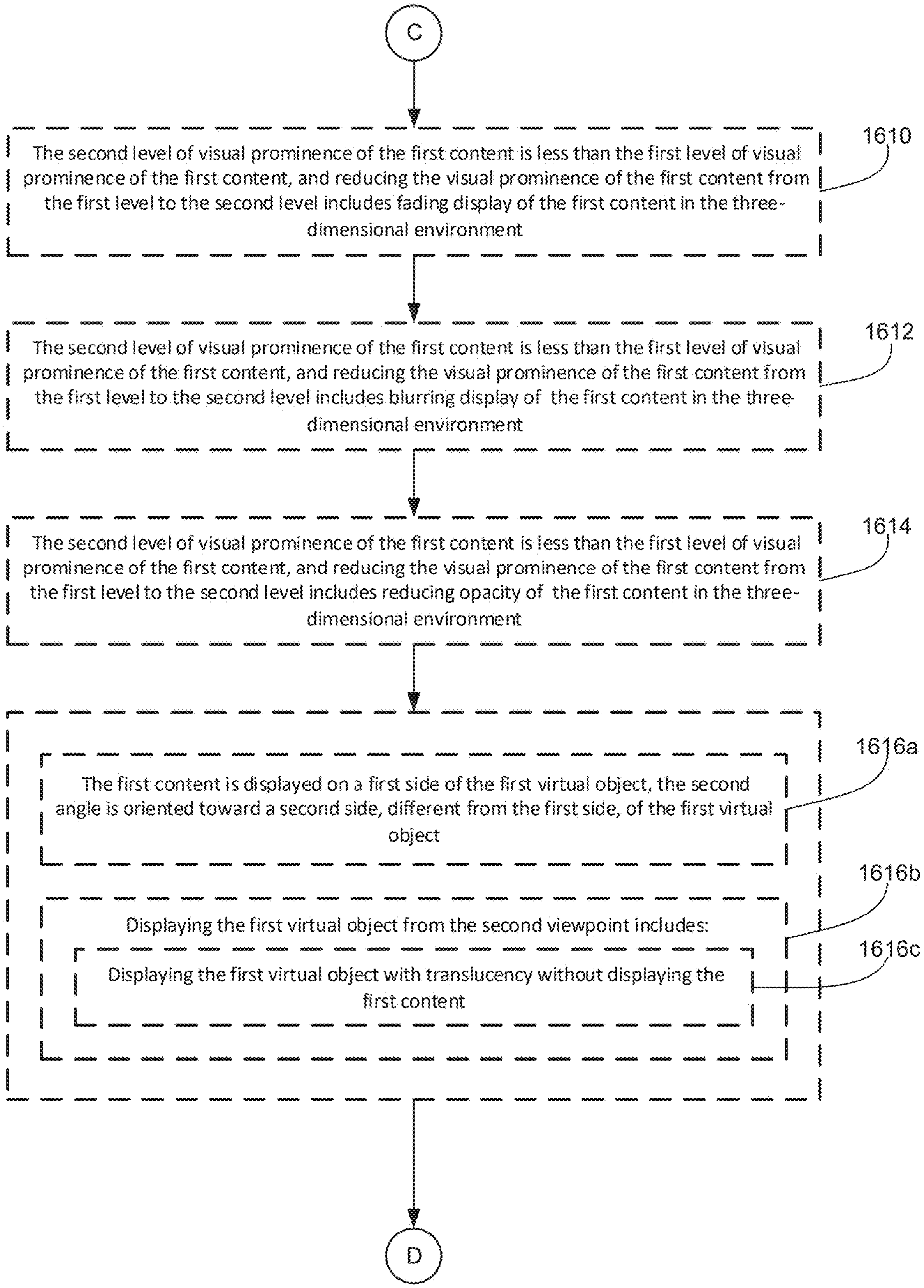
Figure 16E:
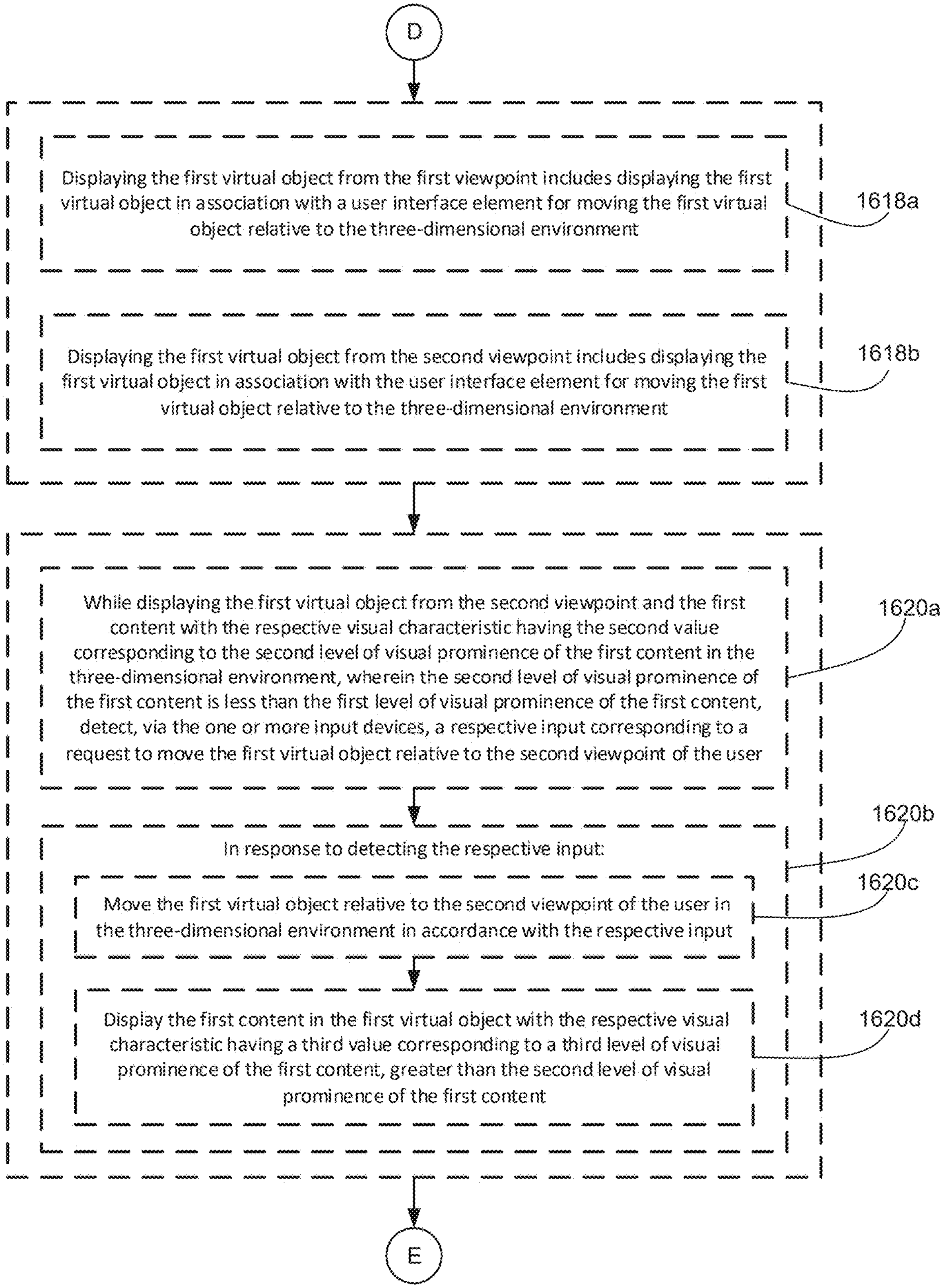
Figure 16F:
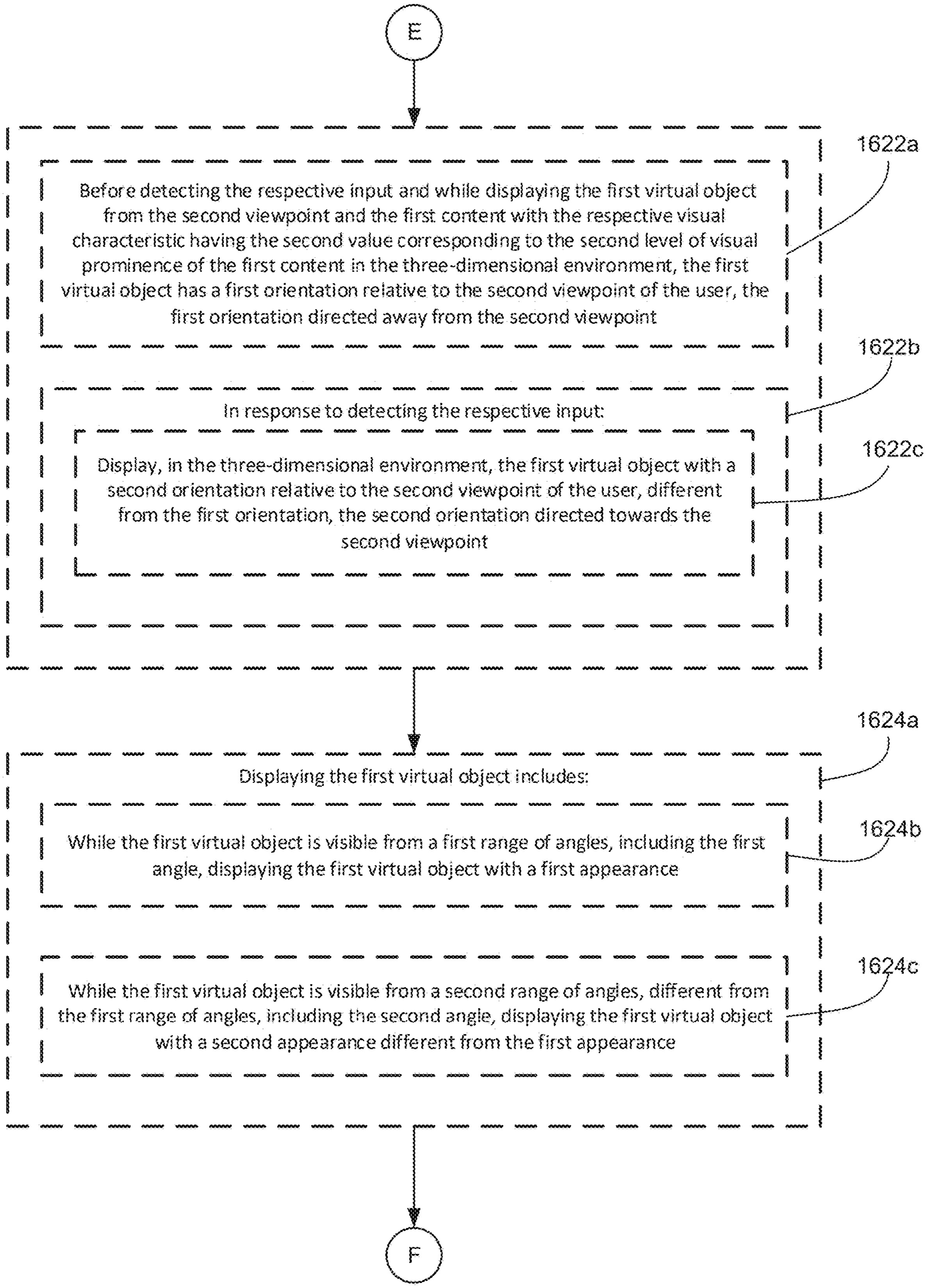
Figure 16G:
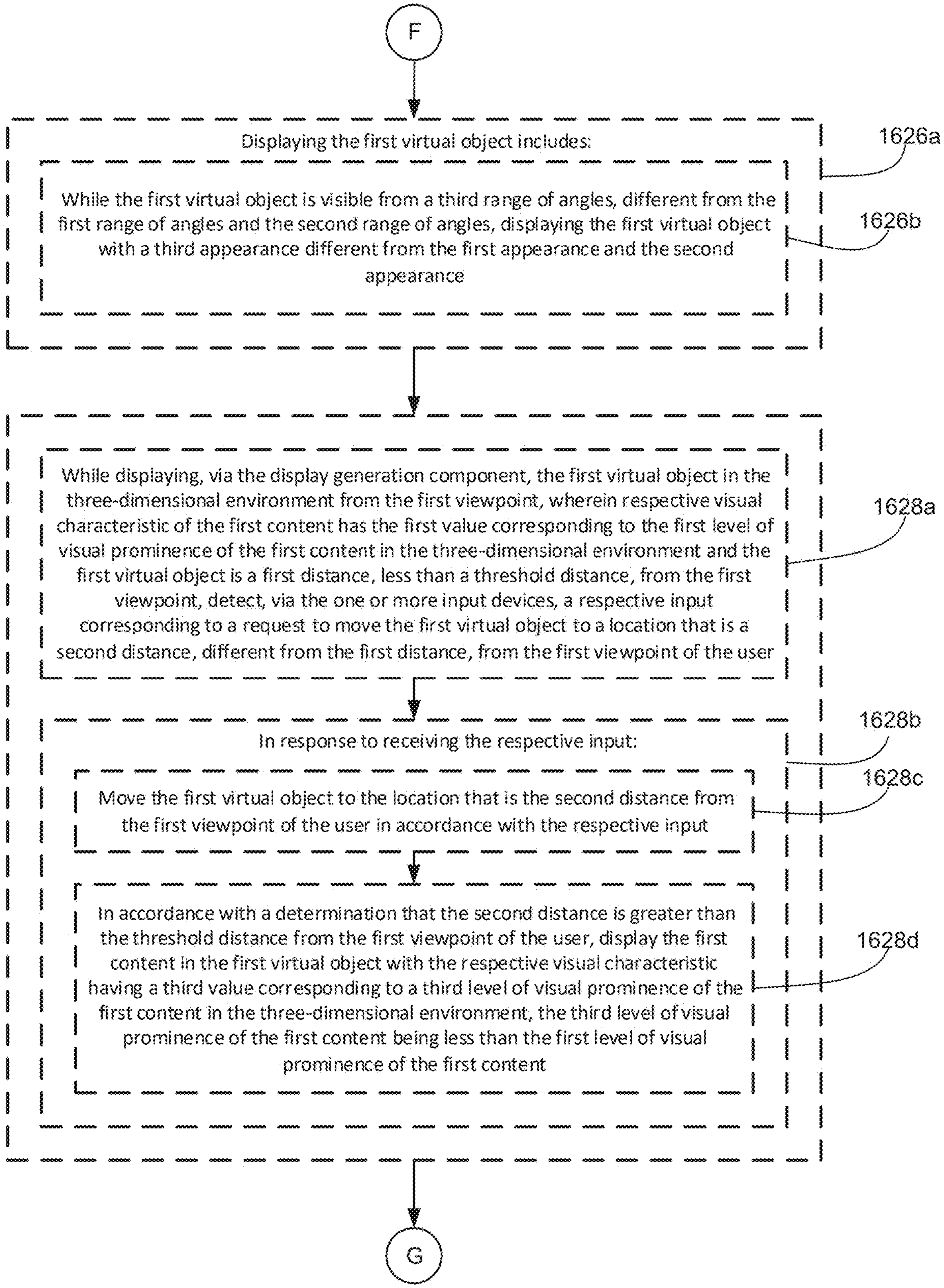
Figure 16H:
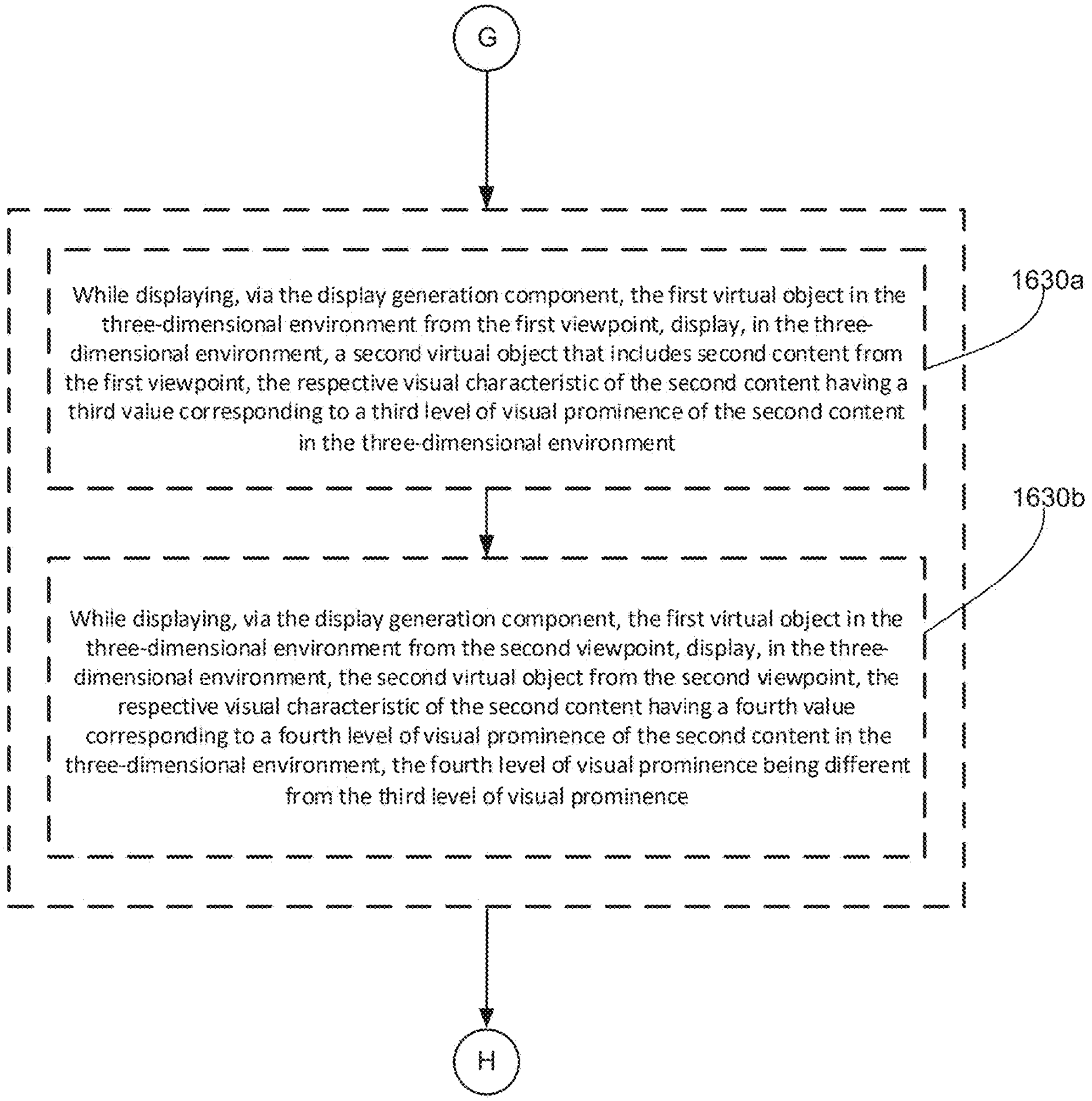
Figure 16I:
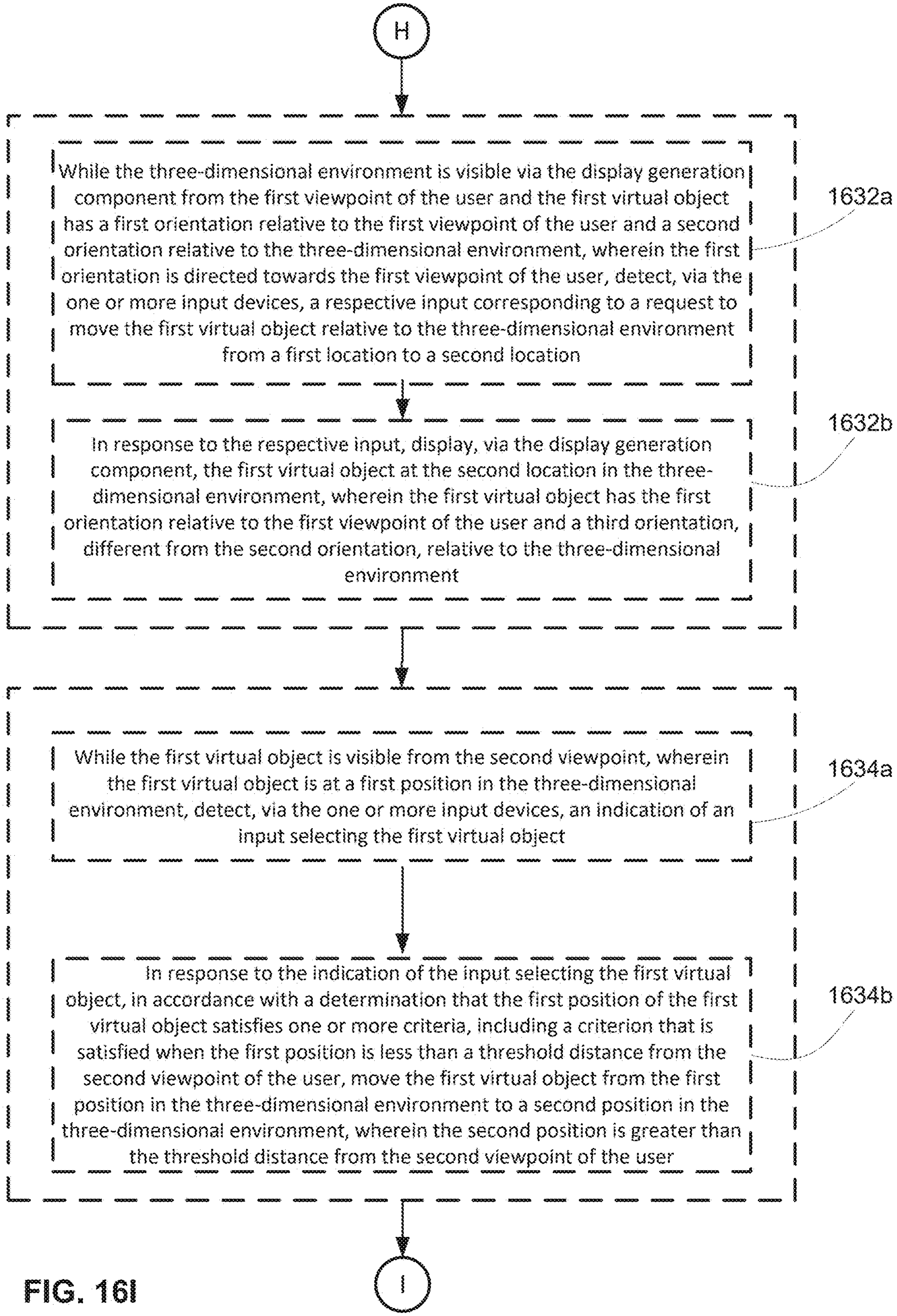
Figure 16J:
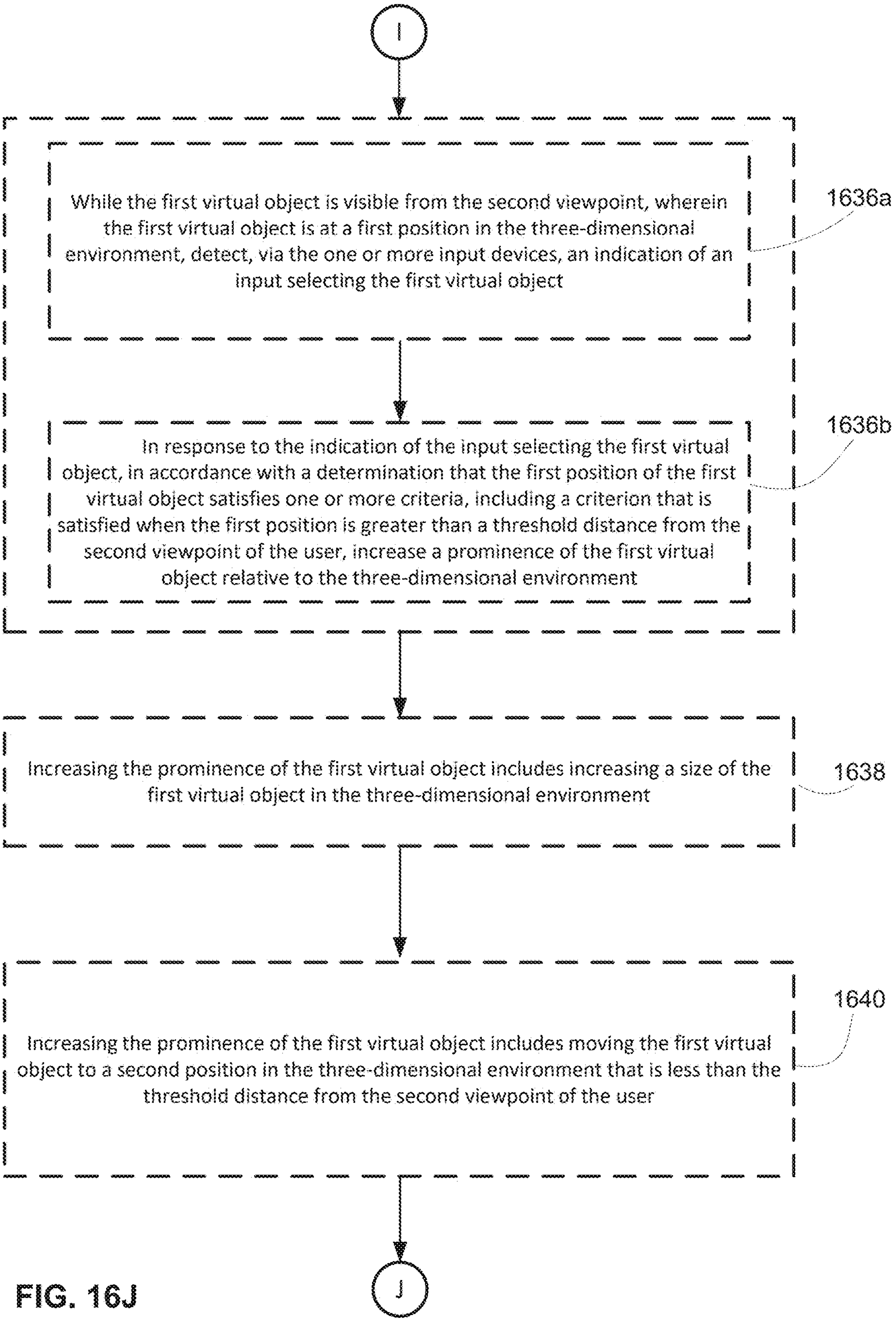
Figure 16K:
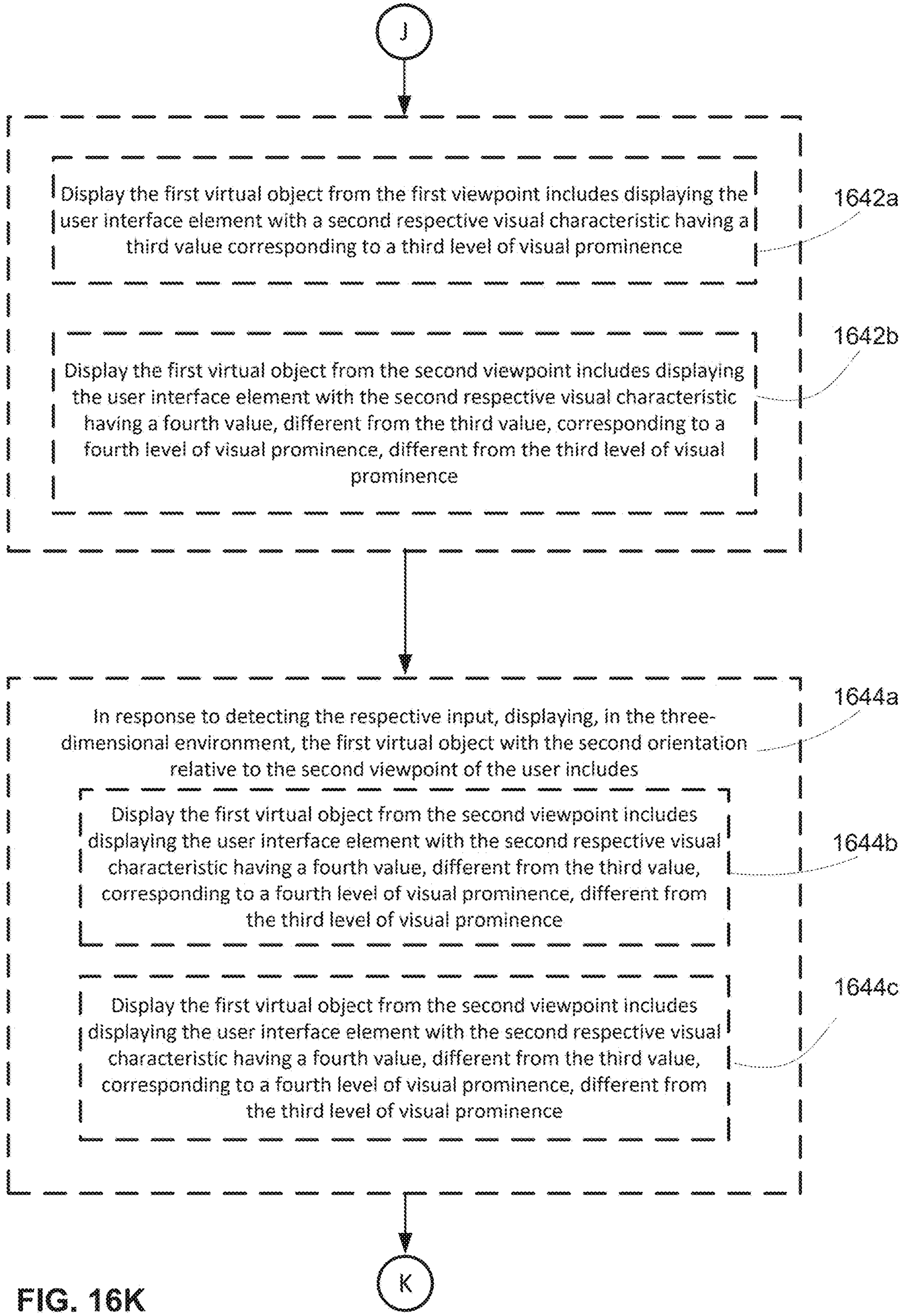
Figure 16L:
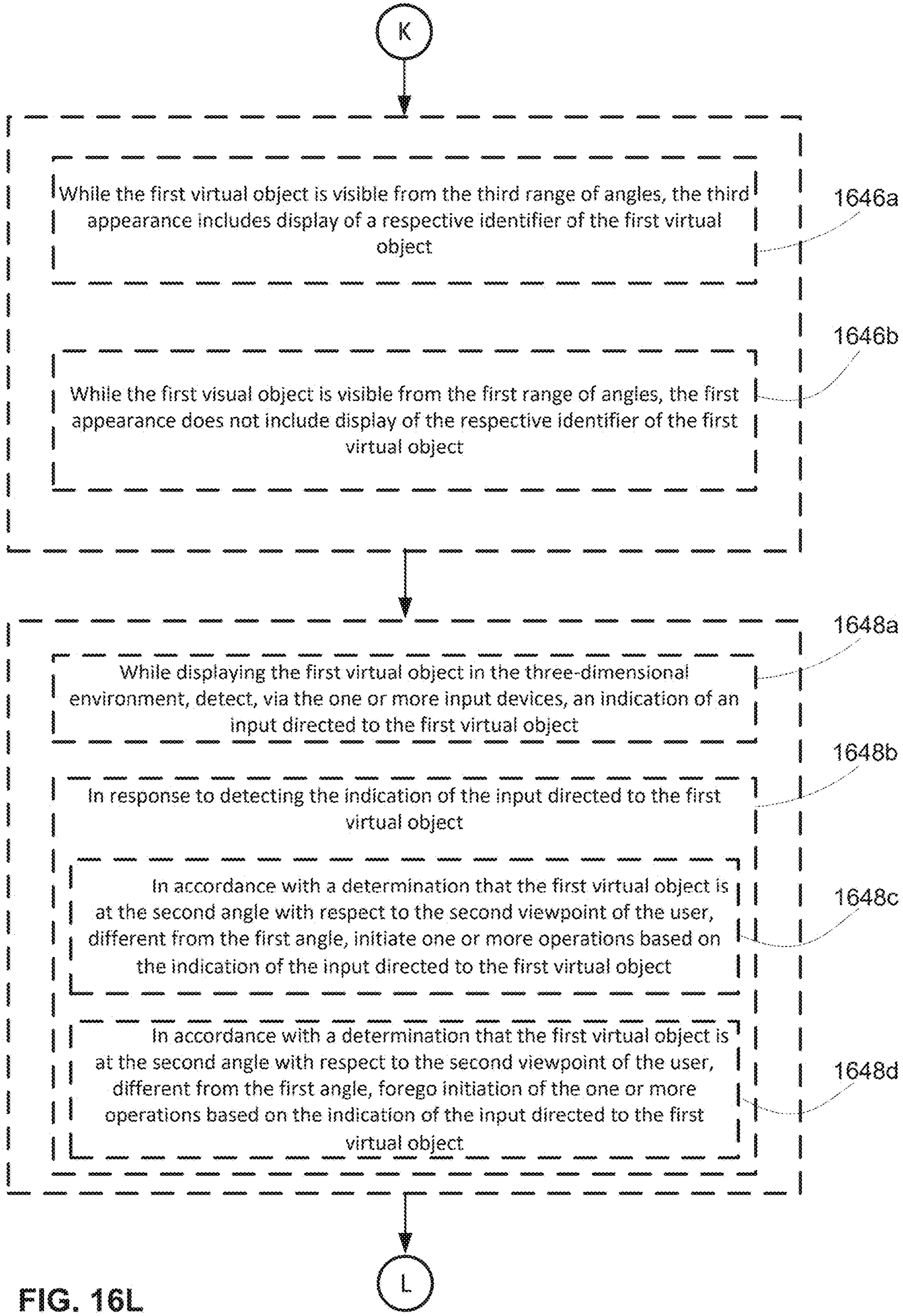
Figure 16M:
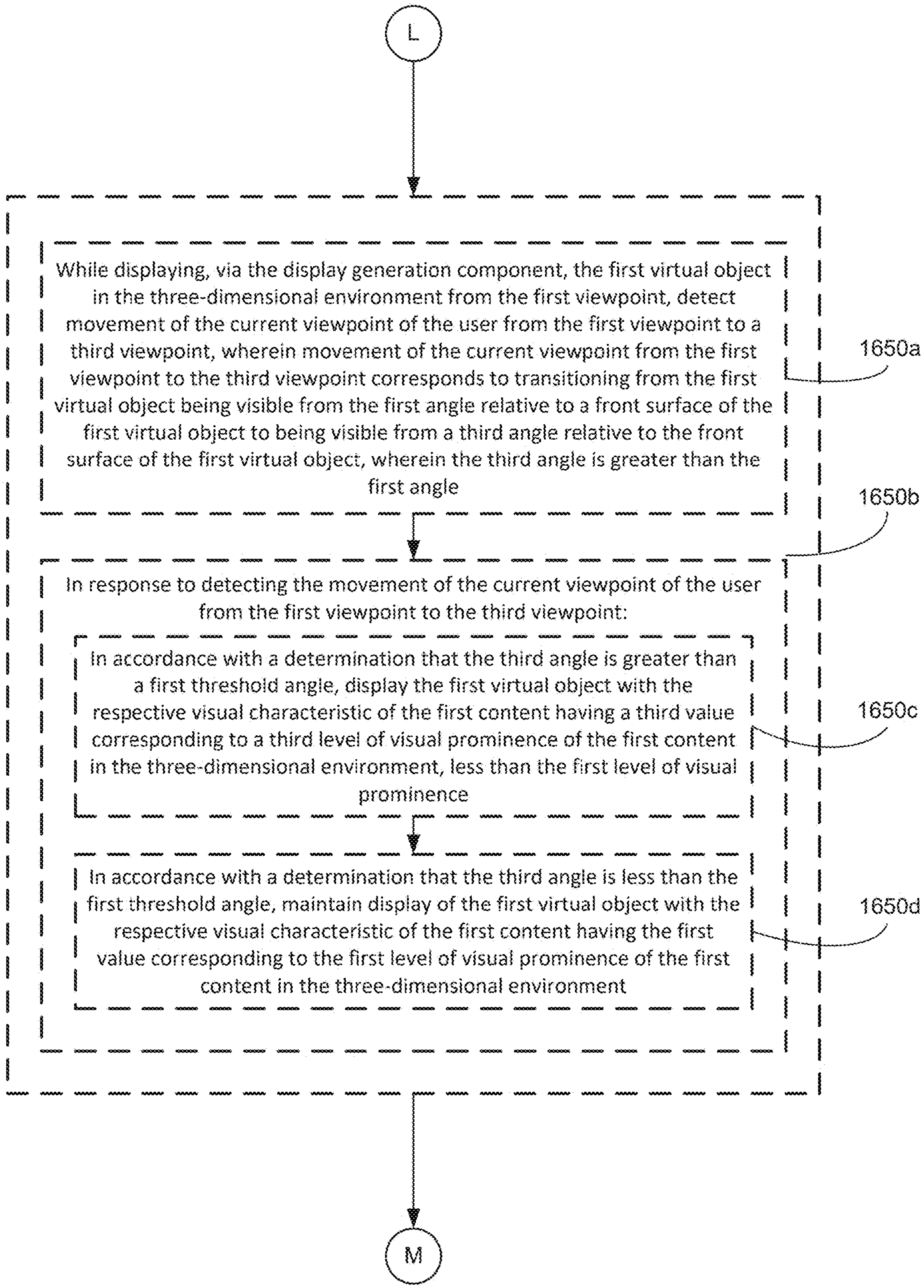
Figure 16N:
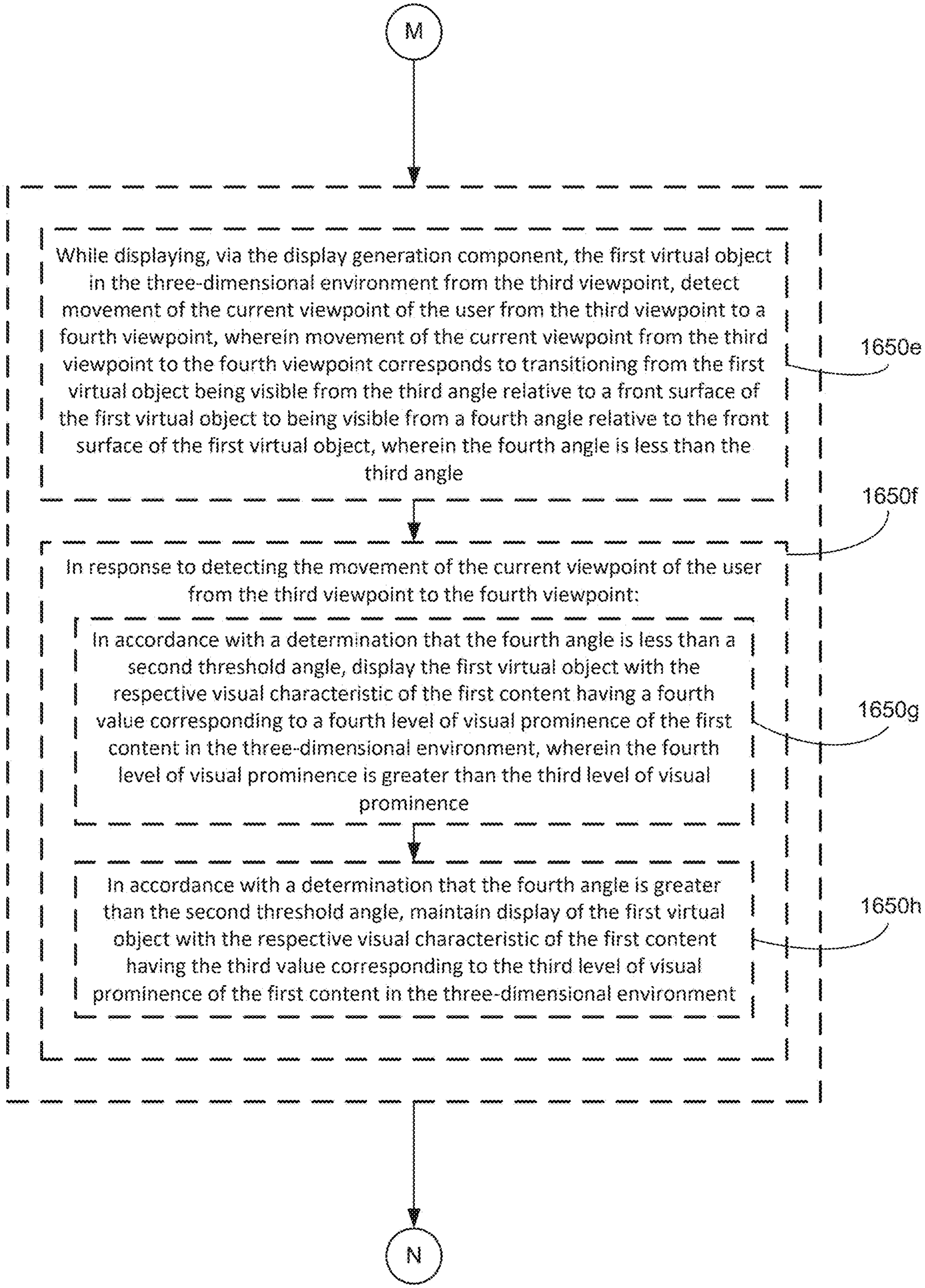
Figure 16O:
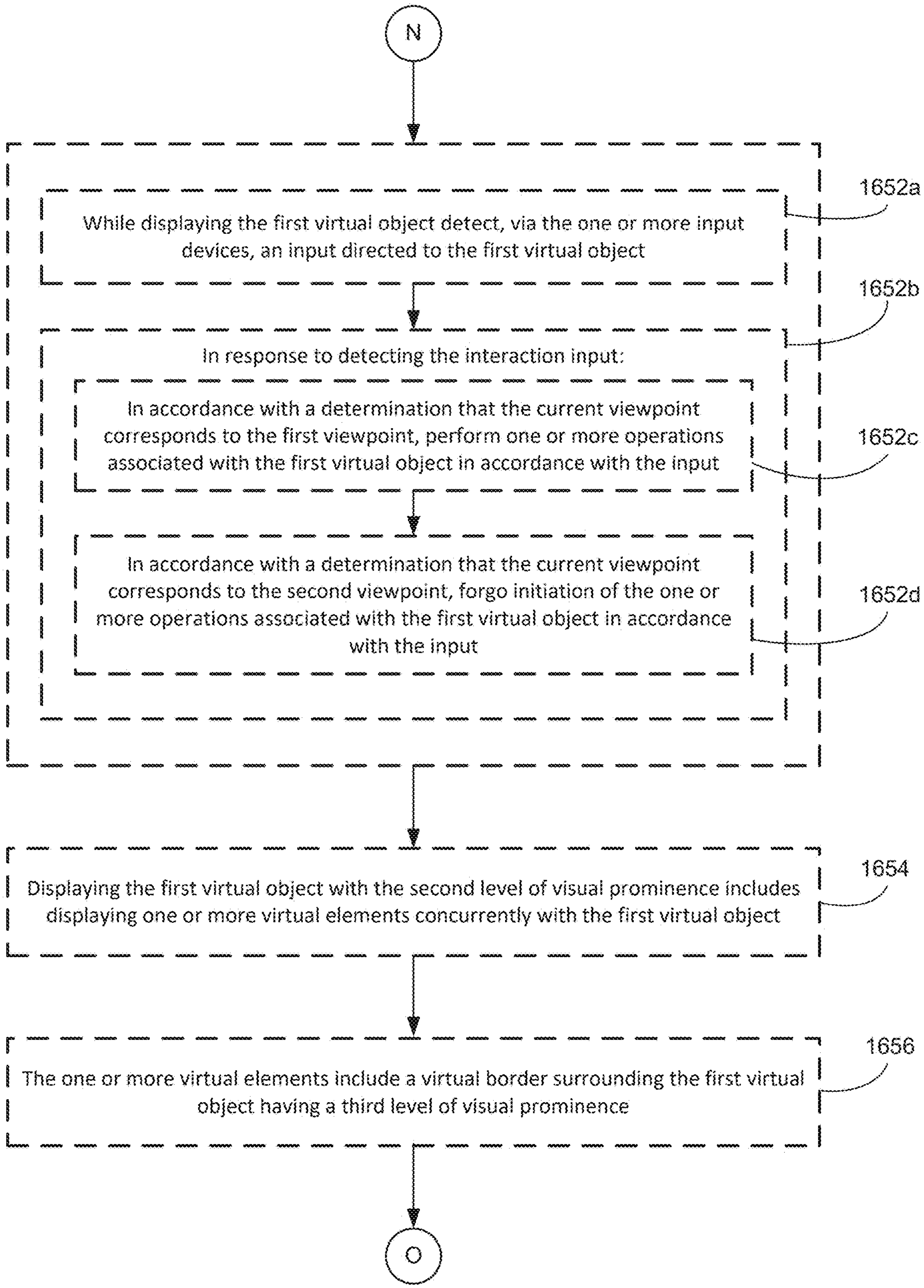
Figure 16P:
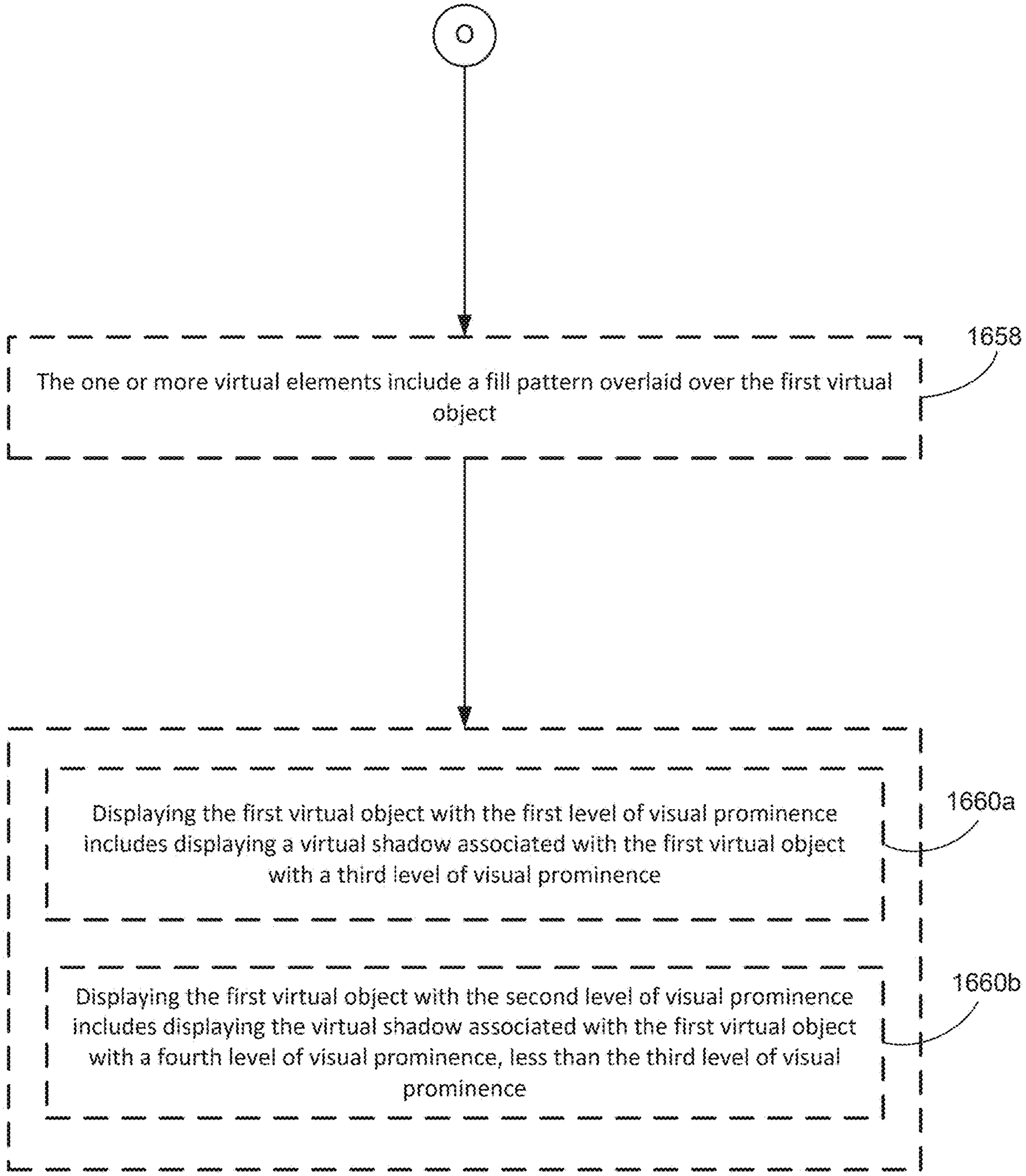

FIG. 15A illustrates a three-dimensional environment 1502 visible via a display generation component (e.g., display generation component 120 of FIG. 1) of a computer system 101, the three-dimensional environment 1502 visible from a viewpoint 1526 of a user illustrated in the overhead view (e.g., facing the left wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 15A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1502 and/or the physical environment is visible in the three-dimensional environment 1502 via the display generation component 120. For example, three-dimensional environment 1502 visible via display generation component 120 includes representations of the physical floor and back and side walls of the room in which computer system 101 is located. Three-dimensional environment 1502 also includes physical object 1522*a* (corresponding to 1522*b* in the overhead view), which is visible via the display generation component from the viewpoint 1526 in FIG. 15A.

In FIG. 15A, three-dimensional environment 1502 also includes virtual objects 1506*a* (corresponding to object 1506*b* in the overhead view), 1508*a* (corresponding to object 1508*b* in the overhead view), and 1510*a* (corresponding to object 1510*b* in the overhead view) that are visible from viewpoint 1526. In FIG. 15A, objects 1506*a*, 1508*a* and 1510*a* are two-dimensional objects, but the examples of the disclosure optionally apply equally to three-dimensional objects. Virtual objects 1506*a*, 1508*a* and 1510*a* are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101.

In FIG. 15A, objects 1506*a*, 1508*a* and 1510*a* optionally include various content on their front-facing surfaces, which are indicated in the overhead view with arrows extending out from those surfaces. For example, object 1506*a* includes text content 1507*a* and content 1507*b* (e.g., a selectable option that is selectable to cause computer system 101 to perform an operation). Object 1508*a* includes an input field 1509*a* (e.g., an input field into which content, such as text, is entered in response to user input) and image content 1509*b*. Object 1510*a* includes content 1511*a*. In some embodiments, the content included in objects 1506*a*, 1508*a* and/or 1510*a* is additionally or alternatively other types of content described with reference to method 1600.

When the front-facing surface of a given virtual object is viewed from viewpoint 1526 from a head-on angle (e.g., normal to the front-facing surface), computer system 101 optionally displays that content with full (or relatively high) visual prominence (e.g., full or relatively high color, full or relatively high opacity and/or no or relatively low blurring). As the viewpoint 1526 of the user changes such that the angle from which computer system 101 displays the virtual object changes, and as that angle deviates more and more from the normal of the front-facing surface, computer system 101 optionally displays the content included in that front-facing surface with less and less visual prominence (e.g., with less and less color, with more and more transparency and/or with more and more blurring). Additionally or alternatively to the change in visual prominence of the content on the front-facing surface of the virtual object, computer system 101 optionally displays the virtual object itself (e.g., the surface of the object and/or the background behind the content) with varying levels of visual prominence as well based on the angle from which computer system 101 is displaying the virtual object. In this way, computer system 101 conveys to the user information about appropriate angles from which to interact with virtual objects.

For example, in FIG. 15A, computer system 101 is displaying three-dimensional environment 1502 from viewpoint 1526 from which the front-facing surfaces of objects 1506*a* and 1508*a* are displayed from a head-on angle. As a result, content 1507*a*, 1507*b*, 1509*a* and 1509*b* is optionally displayed with relatively high visual prominence. Further, objects 1506*a* and 1508*a* and/or the front-facing surfaces of those objects are optionally displayed with relatively high visual prominence (e.g., full or relatively high color, full or relatively high opacity and/or no or relatively low blurring).

In contrast to objects 1506*a* and 1508*a*, the front-facing surface of object 1510*a* is displayed at a relatively off-normal angle in FIG. 15A from viewpoint 1526. As a result, computer system 101 optionally displays content 1511*a* included in object 1510*a* with relatively lower visual prominence as compared with content 1507*a*, 1507*b*, 1509*a* and 1509*b*, and displays object 1510*a* and/or the front-facing surface of object 1510*a* with relatively lower visual prominence as compared with objects 1506*a* and 1508*a*. Further, in some embodiments, when the angle from which the front-facing surface of an object such as object 1510*a* is displayed is greater than a threshold angle or within a particular range of angles greater than the threshold angle such as described with reference to method 1600, computer system 101 also overlays the object with an icon 1511*b* or other representation corresponding to the object 1510*a* (e.g., if object 1510*a* is a user interface of an application, icon 1511*b* is an icon corresponding to the application that identifies the application). Icon 1511*b* optionally obscures at least a portion of content 1511*a* and/or object 1510*a* from viewpoint 1526.

Figure 15B:
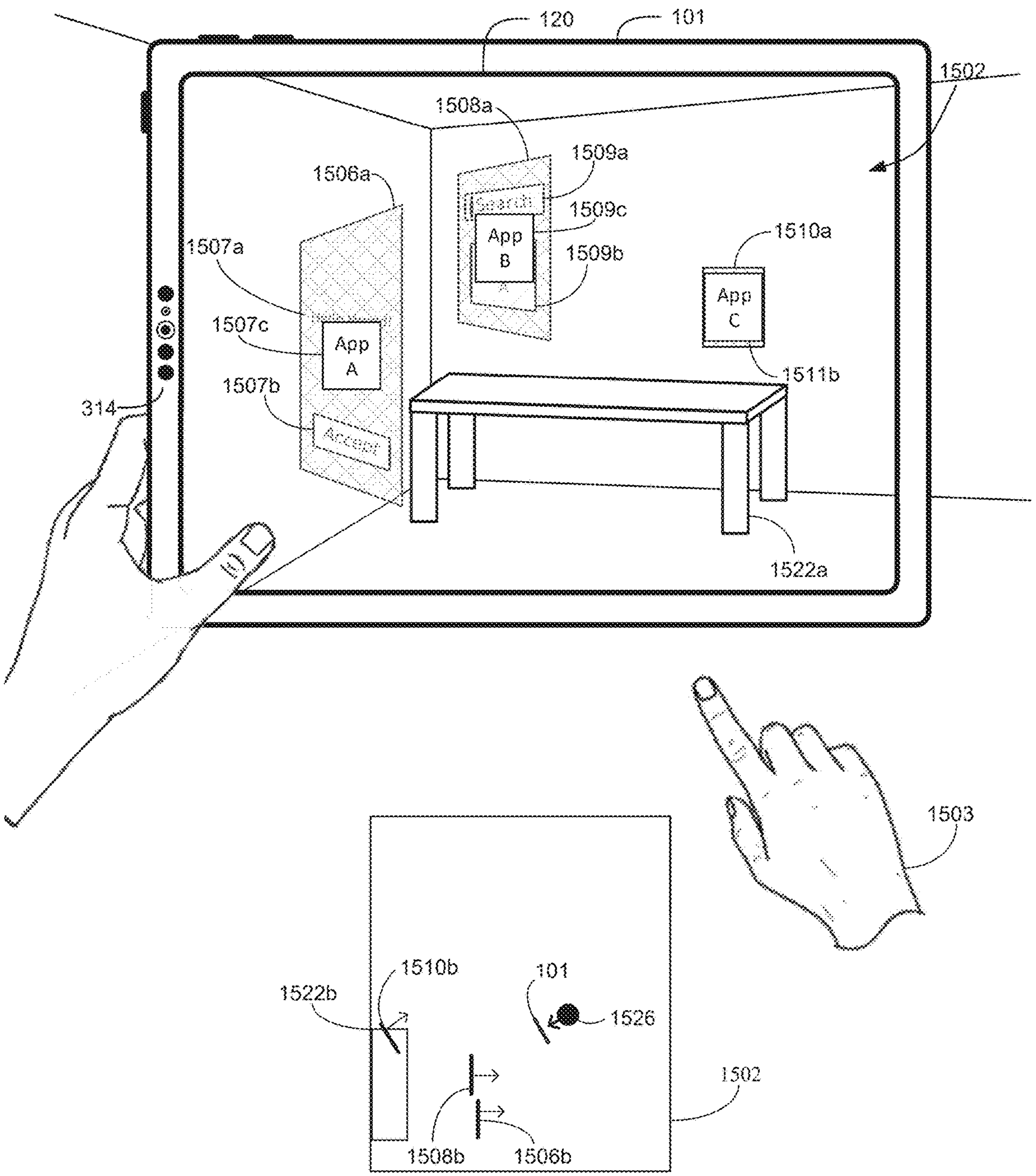

In FIG. 15B, viewpoint 1526 has moved as indicated in the overhead view (e.g., in response to corresponding movement of the user in the physical environment), and as a result computer system 101 is displaying three-dimensional environment 1502 from the updated viewpoint. From viewpoint 1526 in FIG. 15B, the front-facing surfaces of objects 1506*a* and 1508*a* are displayed from more of an off-normal angle than in FIG. 15A. As a result, computer system 101 has reduced the visual prominence of content 1507*a*, 1507*b*, 1509*a* and 1509*b* as compared to FIG. 15A, and has reduced the visual prominence of objects 1506*a* and 1508*a* as compared to FIG. 15A. For example, objects 1506*a* and 1506*b* are displayed with more translucency than they were in FIG. 15A. Further, computer system 101 displays icon 1507*c* overlaying object 1506*a* corresponding to an application associated with object 1506*a*, and icon 1509*c* overlaying object 1508*a* corresponding to an application associated with object 1508*a* (e.g., a different application than is associated with object 1506*a*). Icon 1507*c* optionally obscures at least a portion of content 1507*a* and/or 1507*b* from viewpoint 1526, and icon 1509*c* optionally obscures at least a portion of content 1509*a* and/or 1509*b* from viewpoint 1526.

In FIG. 15B, computer system 101 is displaying three-dimensional environment 1502 from viewpoint 1526 from which the front-facing surface of object 1510*a* is displayed from a head-on angle (e.g., computer system 101 received input, such as from hand 1503, to move object 1510*a* to its location/orientation in FIG. 15B between FIG. 15A and FIG. 15B, such as described in more detail with reference to method 1600). However, object 1510*a* is optionally greater than a threshold distance (e.g., 1, 3, 5, 10, 20, 50, or 100 meters) from viewpoint 1526 in FIG. 15B. In some embodiments, computer system 101 displays objects and/or the content of those objects that are greater than the threshold distance from the viewpoint with the same or similar reduced visual prominence as computer system 101 displays off-angle objects or content. Therefore, in FIG. 15B, computer system 101 displays object 1510*a* and/or its content with reduced visual prominence, and displays icon 1511*b* overlaying at least a portion of object 1510*a*.

Figure 15C:
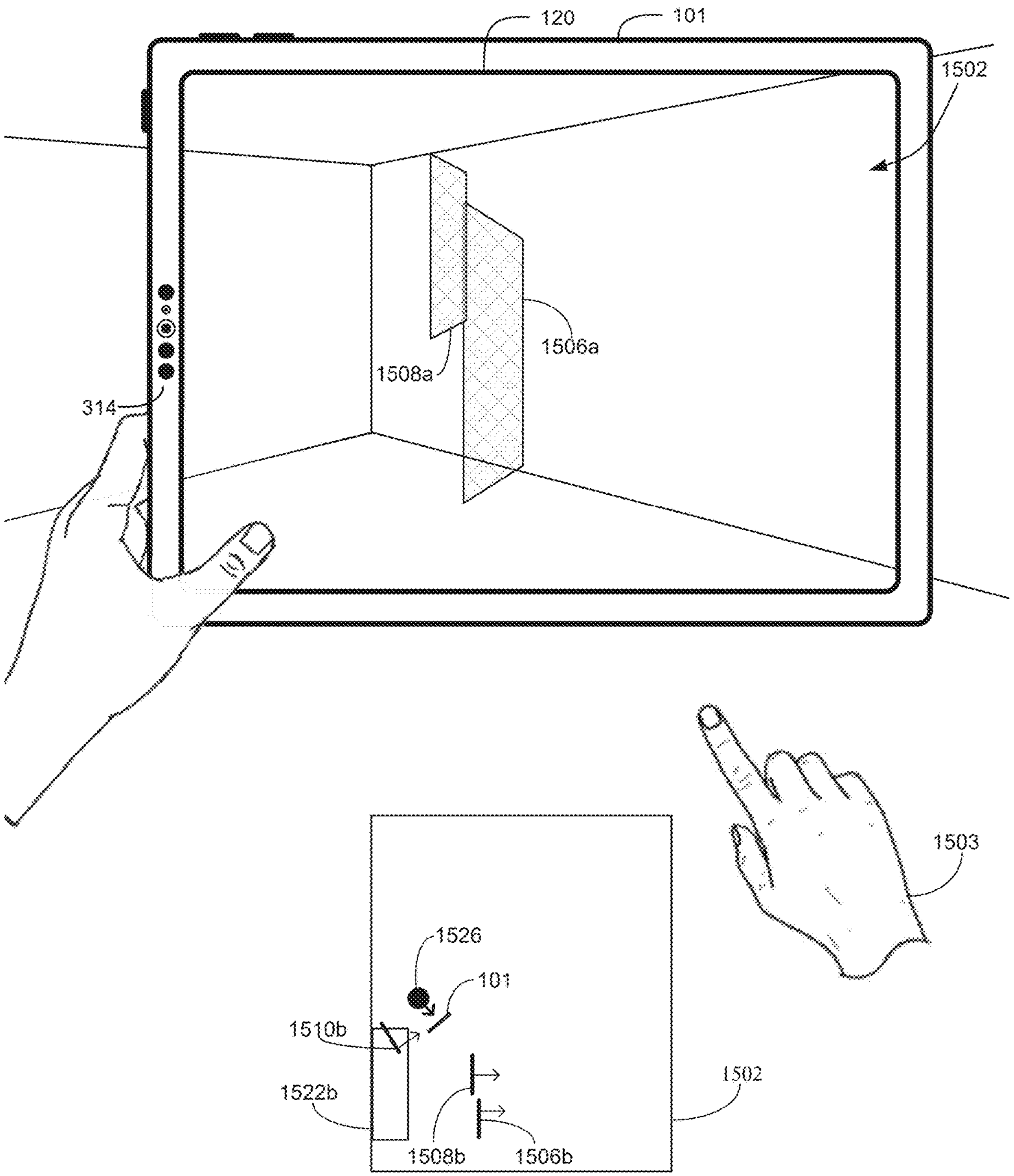

In FIG. 15C, viewpoint 1526 has moved as indicated in the overhead view (e.g., in response to corresponding movement of the user in the physical environment), and as a result computer system 101 is displaying three-dimensional environment 1502 from the updated viewpoint. From viewpoint 1526 in FIG. 15C, computer system is displaying objects 1506*a* and 1508*a* from their back-facing surfaces (e.g., the front-facing surfaces of objects 1506*a* and 1508*a* are oriented away from viewpoint 1526). When computer system 101 is displaying objects 1506*a* and 1508*a* from behind, regardless of the angle from which the back surfaces are visible via computer system 101, computer system 101 optionally ceases display of the content included on the front-facing surfaces of objects 1506*a* and 1508*a* (e.g., content 1507*a*, 1507*b*, 1509*a* and 1509*b*), and continues to display objects 1506*a* and 1508*a* with reduced visual prominence (e.g., with translucency) such as shown in FIG. 15C.

In some embodiments, no indication of content 1507_a_, 1507_b_, 1509_a_ and 1509_b_ is displayed-computer system 101 optionally displays objects 1506_a_ and 1508_a_ as if they are merely objects with translucency that do not include content on their front-facing surfaces. Thus, in some embodiments, portions of the back surfaces of objects 1506_a_ and 1508_a_ that are opposite the portions of the front-facing surfaces of objects 1506_a_ and 1508_a_ that include content 1507_a_, 1507_b_, 1509_a_ and 1509_b_ have the same visual appearance in FIG. 15C as portions of the back surfaces of objects 1506_a_ and 1508_a_ that are opposite the portions of the front-facing surfaces of objects 1506_a_ and 1508_a_ that do not include content 1507_a_, 1507_b_, 1509_a_ and 1509_b_. Computer system 101 optionally does not display icons overlaying objects 1506_a_ and 1508_a_ while displaying those objects from behind.

Figure 15D:
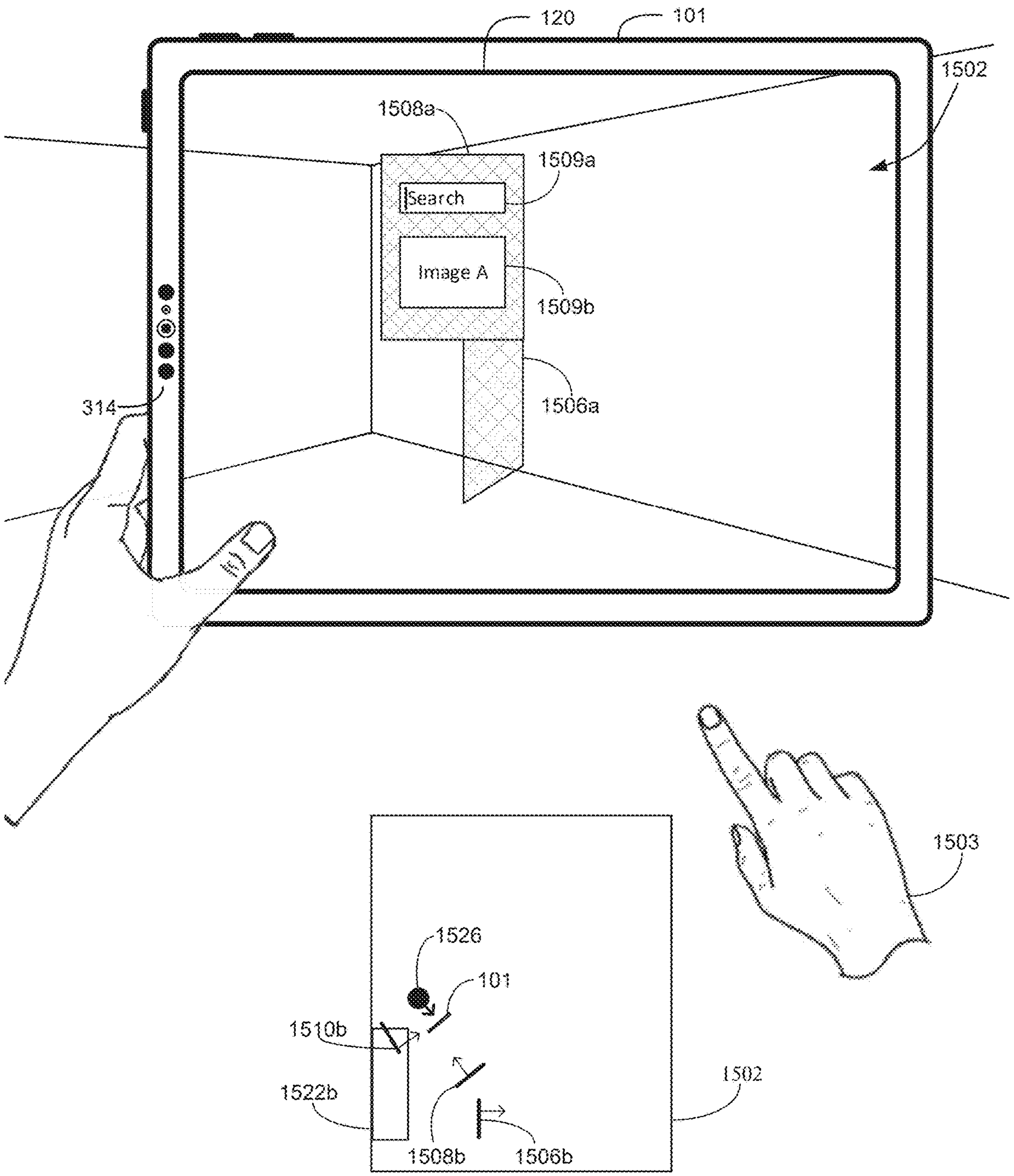

In FIG. 15C, computer system 101 detects an input from hand 1503 to interact with and/or move object 1508_a_. For example, computer system 101 detects hand 1503 performing an air pinch gesture (e.g., the thumb and index finger of hand 1503 coming together and touching) while a gaze of the user is directed to object 1508_a_. Subsequent movement of hand 1503 while maintaining the pinch hand shape (e.g., the thumb and index finger remaining in contact) optionally causes computer system 101 to move object 1508_a_ in accordance with the magnitude and/or direction of the movement of hand 1503, as described in more detail in method 1600. In response to the input in FIG. 15C, computer system 101 automatically reorients object 1508_a_ (e.g., without an orientation control input from hand 1503) such that the front-facing surface of object 1508_a_ is oriented towards viewpoint 1526, as shown in FIG. 15D. Because computer system 101 is now displaying object 1508_a_ from a head-on angle, computer system 101 increases the visual prominence of object 1508_a_ and redisplays content 1509_a_ and 1509_b_ at increased visual prominence. The visual prominence with which computer system 101 is displaying object 1508_a_ and/or content 1509_a_ and 1509_b_ is optionally the same as in FIG. 15A.

Figure 15E:
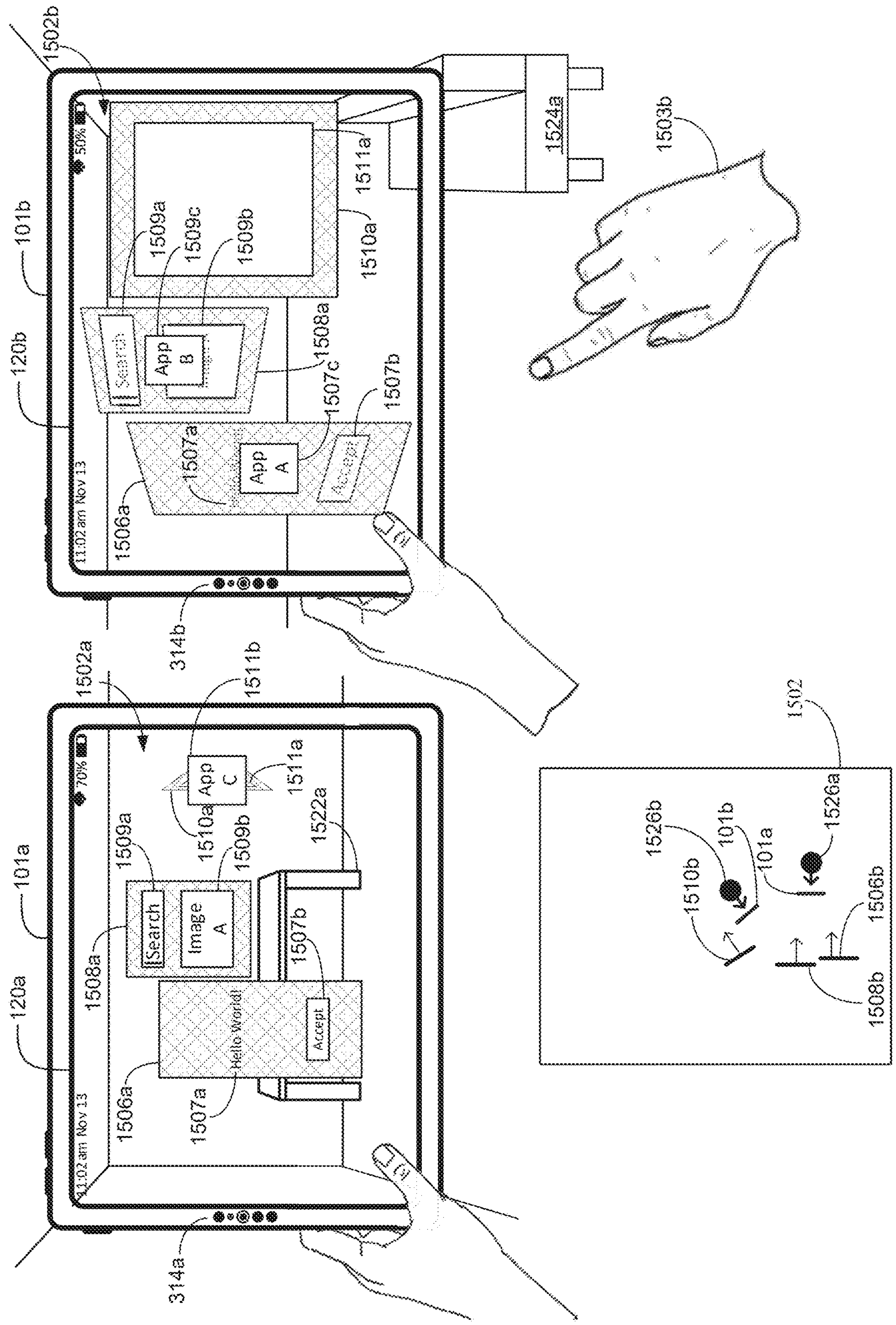

The above-described display of objects and/or content at different visual prominences based on the angle from which computer system 101 is displaying those objects/content optionally also applies to situations in which the objects/content are accessible to a plurality of computer systems. FIG. 15E illustrates two three-dimensional environments 1502_a_ and 1502_b_ visible via respective display generation components 120_a_ and 120_b_ (e.g., display generation component 120 of FIG. 1) of computer systems 101_a_ and 101_b_. Computer system 101_a_ is optionally located in a first physical environment (e.g., the physical environment of FIGS. 15A-15D), and three-dimensional environment 1502_a_ is optionally visible via its display generation component 120_a_, and computer system 101_b_ is optionally located in a second physical environment, and three-dimensional environment 1502_b_ is optionally visible via its display generation component 120_b_. Three-dimensional environment 1502_a_ is visible from a viewpoint 1526_a_ of a user illustrated in the overhead view (e.g., facing a wall of the room in which computer system 101_a_ is located). Three-dimensional environment 1502_b_ is visible from a viewpoint 1526_b_ of a user illustrated in the overhead view (e.g., facing a wall of the room in which computer system 101_b_ is located). Three-dimensional environments 1502_a_ and 1502_b_ optionally both include virtual objects 1506_a_, 1508_a_ and 1510_a_ (and their respective content), which are optionally accessible to both computer system 101_a_ and computer system 101_b_; computer systems 101_a_ and 101_b_ optionally display those objects/content from different angles. The overhead view optionally corresponds to a layout of the various virtual objects and/or viewpoints relative to each other in three-dimensional environments 1502_a_ and 1502_b_. Computer systems 101_a_ and 101_b_ are optionally participating in a communication session such that the relative locations and/or orientations of objects 1506_a_, 1508_a_ and 1510_a_ relative to one another in the respective three-dimensional environments displayed by the computer systems 101_a_ and 101_b_ are consistent and/or the same, as described in more detail with reference to methods 1400 and/or 1600.

In FIG. 15E, computer system 101_a_ is displaying objects 1506_a_, 1508_a_ and 1510_a_ and their respective content from the angles and with the visual prominences and/or appearances as described with reference to FIG. 15A. Computer system 101_b_ is displaying objects 1506_a_ and 1508_a_ from an off-axis angle with respect to the normals of the front-facing surfaces of those objects, such as described with reference to FIG. 15B as a result, computer system 101_b_ is displaying objects 1506_a_ and 1508_a_ and their respective content with the visual prominences and/or appearances as described with reference to FIG. 15B, including displaying icons 1507_c_ and 1509_c_ overlaying objects 1506_a_ and 1508_a_ and their content, respectively. In contrast, computer system 101_b_ is displaying object 1510_a_ from a head-on angle therefore, computer system 101_b_ is displaying object 1510_a_ and its content 1511_a_ at increased visual prominences and without icon 1511_b_ overlaying objects 1510_a_ and/or content 1511_a_. The visual prominence with which computer system 101_b_ is displaying object 1510_a_ and/or its content 1511_a_ is optionally the same visual prominence with which computer system 101_a_ is displaying objects 1506_a_ and 1508_a_ and their respective content.

Figure 15F:
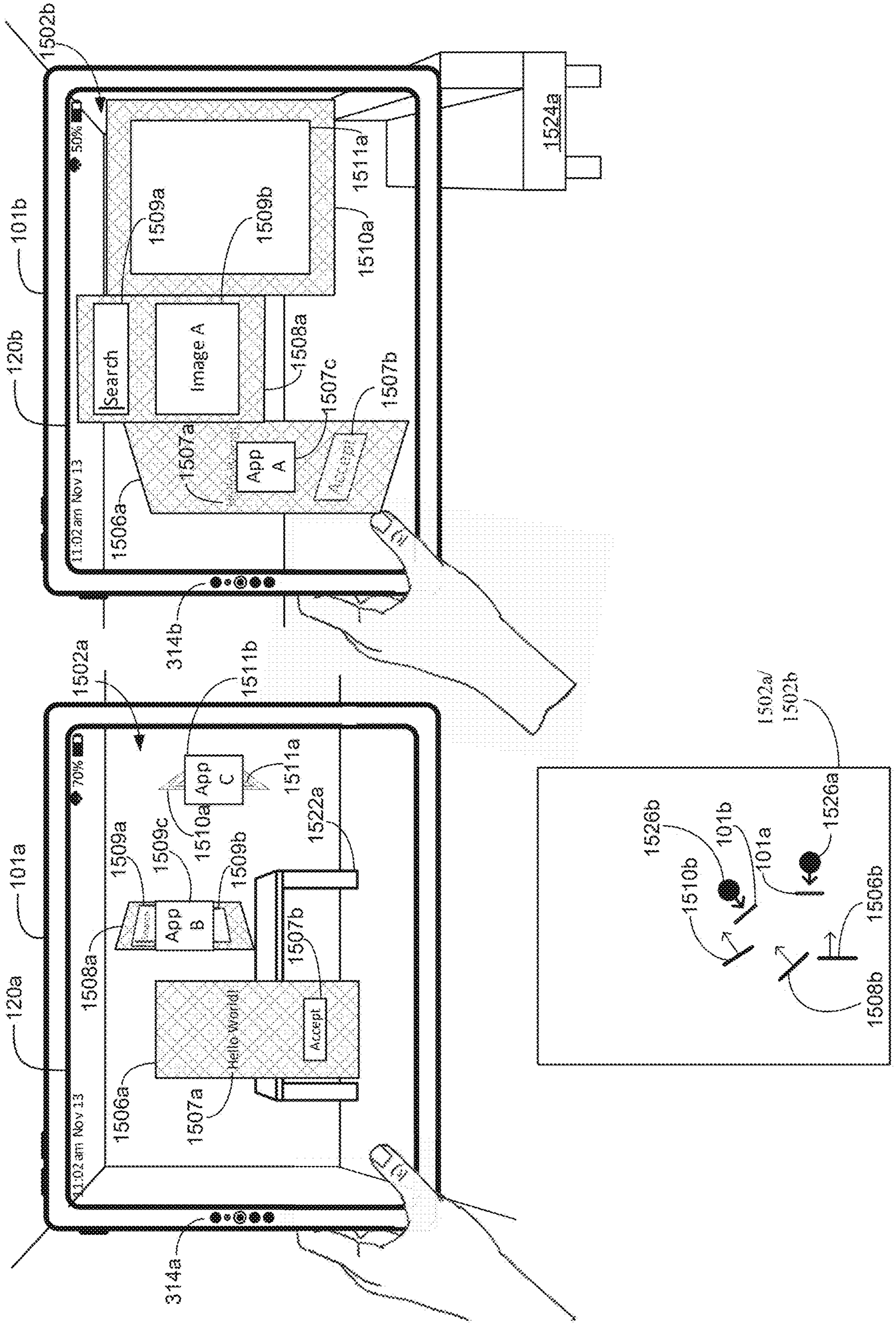

In FIG. 15E, computer system 101_b_ detects an input from hand 1503_b_ to interact with and/or move object 1508_a_. For example, computer system 101 detects hand 1503_b_ performing an air pinch gesture (e.g., the thumb and index finger of hand 1503_b_ coming together and touching) while a gaze of the user is directed to object 1508_a_. Subsequent movement of hand 1503_b_ while maintaining the pinch hand shape (e.g., the thumb and index finger remaining in contact) optionally causes computer system 101_b_ to move object 1508_a_ in accordance with the magnitude and/or direction of the movement of hand 1503_b_, as described in more detail in method 1600. In response to the input in FIG. 15E, computer system 101_b_ automatically reorients object 1508_a_ (e.g., without an orientation control input from hand 1503_b_) such that the front-facing surface of object 1508_a_ is oriented towards viewpoint 1526_b_, as shown in FIG. 15F. Because computer system 101_b_ is now displaying object 1508_a_ from a head-on angle, computer system 101_b_ increases the visual prominence of object 1508_a_ and content 1509_a_ and 1509_b_, and ceases display of icon 1509_c_ overlaying object 1508_a_. The visual prominence with which computer system 101_b_ is displaying object 1508_a_ and/or content 1509_a_ and 1509_b_ is optionally the same as the visual prominence with which computer system 101_b_ is displaying object 1510_a_ and content 1511_a_, and/or with which computer system 101_a_ is displaying object 1506_a_ and content 1507_a_ and 1507_b_.

In FIG. 15F, as a result of the input in FIG. 15E detected at computer system 101_b_ that caused the front-facing surface of object 1508_a_ to be oriented towards viewpoint 1526_b_, the front-facing surface of object 1508_a_ is now no longer head-on with respect to viewpoint 1526_a_, and is being displayed by computer system 101_a_ from an off-axis angle with respect to the normal of that front-facing surface, such as described with reference to FIG. 15B or FIG. 15E with respect to computer system 101*b*. As a result, computer system 101*a* is displaying object 1508*a* and content 1509*a* and 1509*b* with reduced visual prominence and/or appearances, such as the visual prominences and/or appearances as described with reference to FIG. 15B and/or FIG. 15E with respect to computer system 101*b*, including displaying icon 1509*c* overlaying object 1508*a* and its content.

Figure 15G:
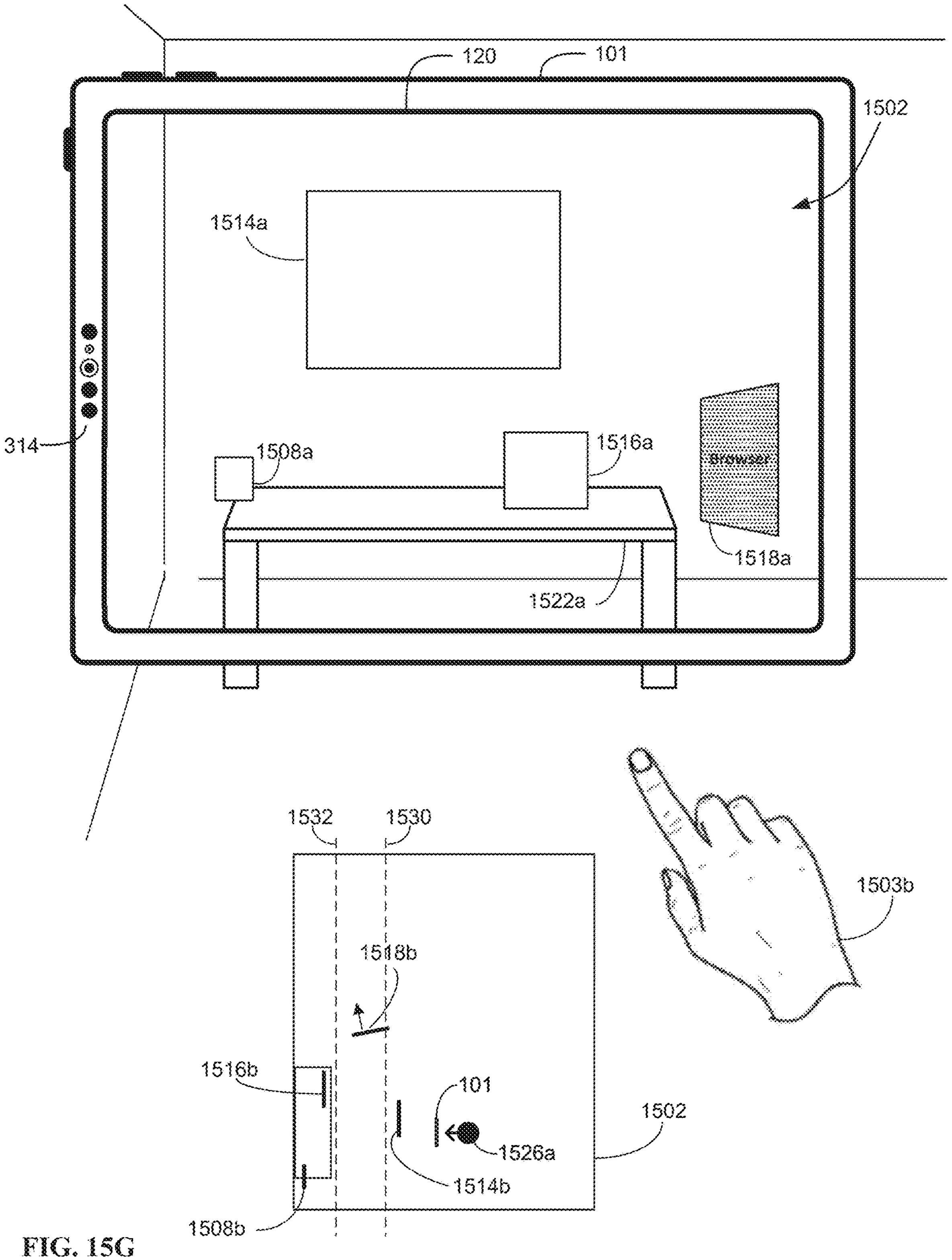
Figure 15H:
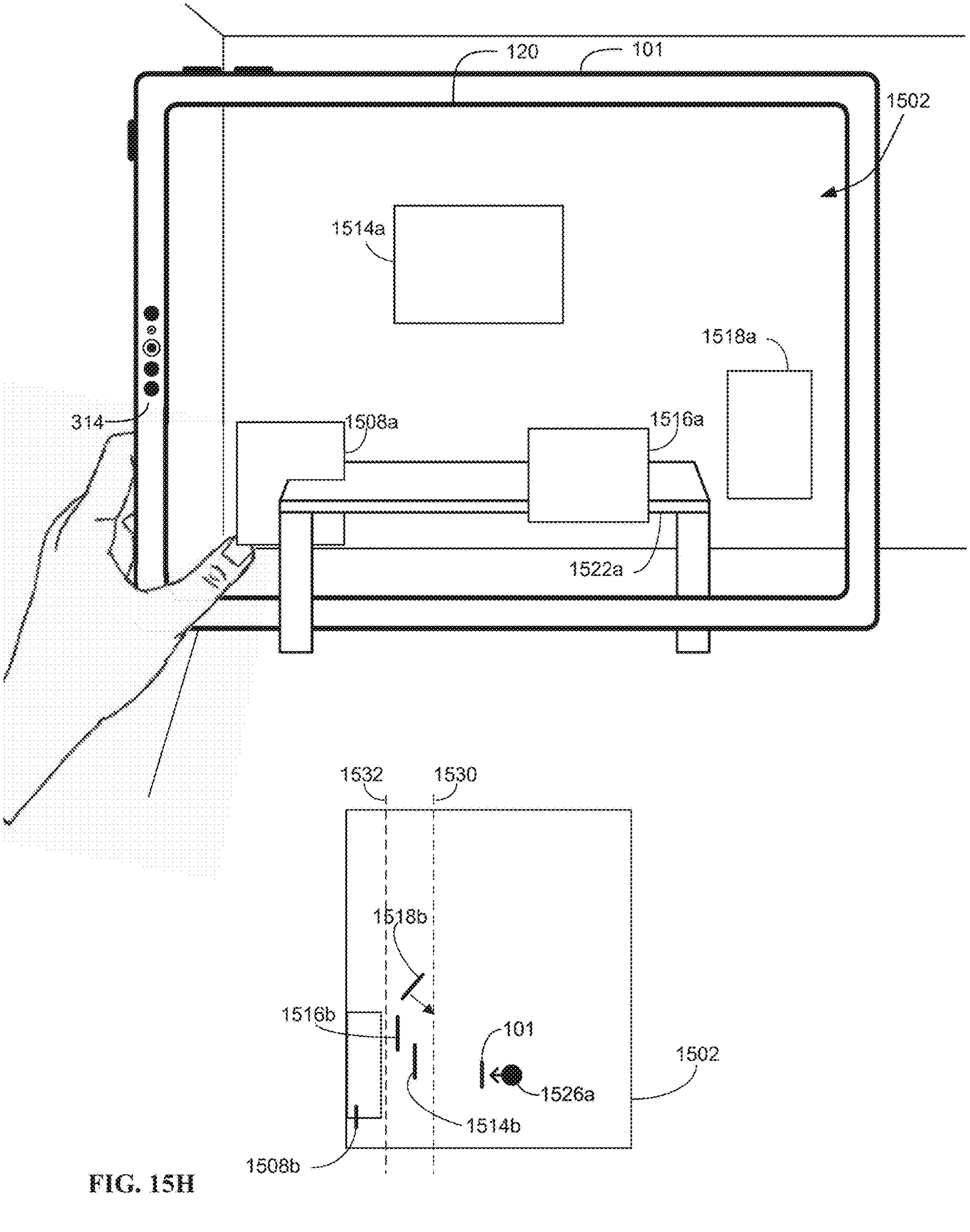

FIGS. 15G-15H illustrate examples of modifying visual prominence of virtual content to improve visibility of such virtual content according to embodiments of the disclosure.

In FIG. 15G, three-dimensional environment 1502 includes virtual objects 1508*a* (corresponding to object 1508*b* in the overhead view), 1514*a* (corresponding to object 1514*b* in the overhead view), 1516*a* (corresponding to object 1516*b* in the overhead view), and 1518*a* (corresponding to object 1518*b* in the overhead view) that are visible from viewpoint 1526*a*. In FIG. 15G, objects 1508*a*, 1514*a* and 1516*a*, and 1518*a* are two-dimensional objects, but the examples of the disclosure optionally apply equally to three-dimensional objects. Virtual objects 1508*a*, 1514*a* and 1516*a*, and 1518*a* are optionally one or more of user interfaces of applications (e.g., messaging user interfaces, content browsing user interfaces, or other application user interfaces), three-dimensional objects (e.g., virtual clocks, virtual balls, virtual cars, or other simulated three-dimensional objects) or any other element displayed by computer system 101 that is not included in the physical environment of computer system 101.

In some embodiments, objects 1508*a*, 1514*a* and 1516*a*, and 1518*a* are displayed at one or more angles and/or positions relative to viewpoint 1526*a* that optionally are suboptimal for viewing respective virtual content included in a respective object. For example, objects 1508*a* and 1516*a* are visible to the user, however, are displayed at a location in the environment 1502 that is relatively far away from the user's viewpoint 1526. Due to the relatively far distance, objects 1508*a* and 1516*a* are optionally hard to see, and/or more difficult to select and/or interact with. As another example, object 1514*a* optionally is relatively close to viewpoint 1526*a*. Consequently, respective virtual content included in object 1514*a* optionally is difficult to view due to the exaggerated dimensions of the respective virtual content relative to viewpoint 1526*a*.

In some embodiments, object 1518*a* is displayed at an orientation such that a first surface (e.g., front surface) of object 1581*a* including respective virtual content optionally is not visible, or difficult to view from viewpoint 1526. For example, as seen in top-down view, an arrow extending normal to the front surface of object 1518*b* indicates that a surface including such respective content is angled away from the user's viewpoint, and as such, computer system 101 optionally displays information such as a descriptor of an application corresponding to object 1518*a* (e.g., the application that is displaying object 1518*a*) overlaid on the back surface of object 1518*a*. In some embodiments, computer system 101 displays object 1518*a* with a visual appearance including respective virtual content if viewpoint 1526 is outside a range of viewing angles relative to object 1518*a*. For example, computer system optionally determines that a difference in angle between viewpoint 1526 and a vector extending normal from the front surface of object 1518*a*, as shown by the arrow displayed extending from top-down view of object 1518*b*, exceeds a threshold amount (e.g., 0, 5, 10, 15, 20, 25, 45, 50, 60, 70, or 80 degrees), and optionally modifies display of object 1518*a*. The modification of display optionally includes ceasing display of respective virtual content within object 1518*a* (e.g., within the front surface of object 1518*a*) that is otherwise visible while viewpoint 1526 is within the range of viewing angles.

Additionally or alternatively, optionally as a part of the modified display of object 1518*a*, computer system 101 displays information describing respective virtual content of object 1518*a*. For example, object 1518*a* optionally includes text specifying that object 1518*a* includes a web browsing interface (e.g., "Browser") such that the user is aware of respective virtual content associated with object 1518*a* despite being unable to view the respective virtual content itself (e.g., unable to view the contents of a web browser). In some embodiments, the displayed information additionally or alternatively includes a graphical indication of virtual content of object 1518*a*, such as an icon associated with object 1518*a* (e.g., the application user interface that object 1518*a* is). In some embodiments, the modified visual appearance of object 1518*a* includes increasing an opacity of a surface of object 1518*a*, such that the surface of object 1518*a* from viewpoint 1526*a* appears mostly or entirely opaque. In some embodiments, at least a portion of the information describing the respective virtual content of object 1518*a* is displayed regardless of viewing angle of object 1518*a*. For example, computer system 101 optionally displays a persistent name of an application associated with object 1518*a*, independent of a viewing angle, orientation, and/or other spatial properties of object 1518*a*.

In some embodiments, the visual appearance including the information optionally suggests that object 1518*a* is angled away from the user's viewpoint and optionally indicates to the user of computer system 101 that interaction with object 1518*a* optionally will affect one or more operations that are different from an interaction with object 1518*a* while object 1518*a* optionally is angled toward viewpoint 1526. For example, an input directed toward object 1518*a* while oriented toward viewpoint 1526 optionally initiates a process to perform one or more functions associated with object 1518*a*, such as a highlighting of text, a communication of a message, and or an initiation of media playback; however, if object 1518*a* is oriented away from viewpoint 1526 when the same input is received, computer system 101 optionally forgoes performance of such one or more functions. Thus, the modified visual appearance of object 1518*a* optionally communicates a lack of functionality and/or a modified functionality of input directed to object 1518*a*.

In some embodiments, computer system 101 detects input directed toward a respective virtual object and initiates one or more operations relative to the virtual object based on a location and/or orientation of the respective virtual object relative to viewpoint 1526. For example, computer system 101 optionally detects input directed to respective virtual object, and initiates a process to scale, move, and/or rotate the respective virtual object such that the user of computer system 101 more easily views respective content included within the respective virtual object. For example, computer system 101 optionally detects hand 1503*b* perform an air gesture such as an air pinch gesture, an air pointing gesture, and/or an air waving gesture while attention of the user is directed to a virtual object. In response to the detection of concurrent attention and air gesture, computer system 101 optionally initiates a moving of the virtual object, an increasing of visual prominence of the virtual object, and/or another operation associated with the virtual object.

FIG. 15H illustrates an enhancing of visibility of content included in virtual objects according to examples of the disclosure. For example, in response to input directed to object 1508*a* in FIG. 15G, as described previously, computer system 101 optionally initiates a scaling of object 1508*a* and/or respective content included in object 1508*a*. In some embodiments, the movement of object 1514*a* and/or 1516*a* occurs in response to initiation of input directed to a respective object. For example, computer system 101 optionally detects an air pinch gesture concurrent with attention of the user directed to a respective object, and optionally performs the movement nearly instantaneously and/or with an animation. In some embodiments, in response to an initial input directed to a respective object, computer system 101 optionally displays a visual indication indicating that the user has selected a candidate for potential movement, and in response to a subsequent input confirming the movement, performs the movement previously described. In some embodiments, the input directed to a respective object includes an input to interact with respective virtual content included in the respective object. For example, the input optionally is a selection of a text entry field, a selection of a selectable option such as a refresh button of a browser, a launching of a control panel associated with virtual content, and/or another suitable function of respective virtual content, and in response the input, computer system 101 optionally performs one or more functions associated with the input (e.g., inserts a text insertion cursor and displays a keyboard for the text entry field, refreshes a web browser, launches a user interface for modifying settings associated with virtual content) and also optionally initiates the described movement(s) of the respective virtual object. Thus, in some embodiments, computer system 101 facilitates an efficient approach for moving virtual content and objects to areas which advantageously allow improved viewing of respective virtual content, and in some embodiments, causes an initiation of interaction with respective virtual content and simultaneously moves the virtual content and/or objects.

For example, computer system 101 optionally detects an input directed to object 1508*a* while object 1508 is further than threshold 1532, and in response to the input and based on the determination that the virtual object further than threshold 1532, enlarges object 1508*a*. In some embodiments the input is detected and object 1508 is enlarged in response to the input, wherein the input additionally or alternatively corresponds to an initiation of interaction with respective content included in object 1508 (e.g., rather than an input to scale object 1508). In some embodiments, the respective location of object 1508*a* is maintained in three-dimensional environment 1502, as shown in the difference between object 1508*b* in the top-down views illustrated in FIG. 15G as compared to in FIG. 15H. In some embodiments, the amount of scaling is such that the from the viewpoint 1526, object 1508*b* has assumed an updated size that corresponds to a predetermined size. For example, computer system 101 optionally scales object 1508*a* such that object 1508*a* optionally appears as large as if object 1508*a* was moved within thresholds 1530 and 1532. In some embodiments, respective virtual content (e.g., media, text, system user interface objects, and/or other virtual content) included in object 1508*a* is similarly scaled. For example, the respective amount of scaling along one or more dimensions of object 1508*a* are similarly applied to a picture that is included in object 1508*a*. In some embodiments, object 1508*a* is scaled such that the object 1508 presents a visual intersection between physical objects such as physical object 1522*a* in the user's environment, if the scaling results in such an intersection. It is understood that a visual intersection optionally refers to apparent intersections displayed by computer system 101 between physical objects in the user's environment a virtual object, to mimic the appearance of an intersection between the physical object in the user's environment and a physical object having the virtual object's size and/or position in the environment. Thus, as shown in FIG. 15H, physical object 1522*a* optionally protrudes into object 1508*a* from the viewpoint 1526*a* of the user.

In some embodiments, virtual object 1516*a* is moved and/or displayed at a new location in response to the inputs described with reference to FIG. 15G. For example, computer system 101 optionally has moved object 1516*a* toward viewpoint 1526, as illustrated by the rightward movement of object 1516*b* in the top-down view from as shown in FIG. 15G to as shown in FIG. 15H. In some embodiments, computer system 101 moves virtual object 1516*a* into an improved viewing area (e.g., in between threshold 1530 and threshold 1532), as reflected by the movement of object 1516*b* in between the dashed lines in the top-down view. In some embodiments, the movement is to a respective location in the three-dimensional environment 1502, such as a midpoint of the improved viewing area. In some embodiments, the movement is to a respective location defined relative to the user's viewpoint 1526*a*. For example, computer system 101 optionally detects a vector extending from position of viewpoint 1526*a* extending toward a respective portion (e.g., a center) of object 1516*a*, and optionally moves object 1516*a* along that vector to a respective location within the improved viewing area (e.g., in between threshold 1530 and threshold 1532). In some embodiments, the movement of object 1516*a* is such that object 1516*a* does not obscure other virtual objects. For example, computer system 101 moves object 1516*a* along the vector described previously, but optionally shifts the object 1516*a* laterally to a position it otherwise would not assume to avoid an apparent visual overlap with another virtual object. In some embodiments, the movement of object 1516*a* optionally is animated, such that the user is able to watch object 1516*a* move through three-dimensional environment 1502. In some embodiments, the movement of object 1516*a* includes a fading out (e.g., increasing transparency) of object 1516*a* at its initial position, followed by fading in (e.g., displaying with an increasing opacity) of object 1516*a* at its updated position.

In some embodiments, virtual object 1514*a* is moved and/or displayed at an updated location relative to viewpoint 1526*a* in between threshold 1530 and threshold 1532 in response to the inputs described with reference to FIG. 15G. For example, computer system 101 optionally has moved object 1514*a* away from viewpoint 1526*a*, as illustrated by the leftward movement of object 1514*b* in the top-down view from as shown in FIG. 15G to as shown in FIG. 15H. In some embodiments, computer system 101 moves virtual object 1514*b* into the improved viewing area (e.g., in between threshold 1530 and threshold 1532), as reflected by the movement of object 1514*b* in the top-down view. In some embodiments, the movement is to a respective location in the three-dimensional environment 1502, such as a midpoint of the improved viewing area (e.g., a midpoint of threshold 1530 and threshold 1532). In some embodiments, the movement is to a respective location defined relative to the user's viewpoint. For example, computer system 101 optionally detects a vector extending from position of viewpoint 1526*a* extending toward a respective portion (e.g., a center) of object 1514*a*, and optionally moves object 1514*a* along that vector to a respective location within the improved viewing area (e.g., a midpoint of boundaries of the improved viewing area). In some embodiments, the movement of object 1514*a* is such that object 1514*a* does not obscure other virtual objects. For example, computer system 101 moves object 1514*a* along the vector described previously, but optionally shifts the object 1514*a* laterally to a position it otherwise would not assume to avoid an apparent visual overlap between another virtual object. In some embodiments, the movement of object 1514*a* optionally is animated, such that the user is able to watch object 1514*a* move through three-dimensional environment 1502. In some embodiments, the movement of object 1514*a* includes a fading out (e.g., increasing transparency) of object 1514*a* at its initial position, followed by fading in (e.g., displaying with an increasing opacity) of object 1514*a* at its updated position. Thus, both objects 1514*a* and 1516*a* optionally are moved to positions within the three-dimensional environment 1502 to improve visibility of the objects and/or respective virtual content included in the objects.

Although the thresholds 1530 and 1532 are shown as a pair of dashed lines extending parallel to a width of computer system 101, it is understood that such illustration is merely one embodiment of any suitable definition of such threshold distances. For example, the threshold distances are optionally circular shaped region having an outer border (e.g., with a radius drawn from viewpoint 1526*a* to threshold 1532) and an inner border (e.g., with a radius drawn from viewpoint 1526*a* to threshold 1530), wherein the region optionally is centered on a respective portion of computer system 101 and/or on a respective portion of a user of computer system 101. Additionally or alternatively, the improved region optionally is a portion of a wedge, the wedge defined by first vectors sharing an origin of a viewpoint vector extending straight ahead from viewpoint 1526*a* and angled symmetrically relative to the viewpoint vector, having an outer arc (e.g., extending from viewpoint 1526*a* to threshold 1532) intersecting the first vectors defining a far boundary of the wedge and an inner arc (e.g., extending from viewpoint 1526*a* to threshold 1532) intersecting the first vectors defining a near boundary of the wedge.

In some embodiments, computer system 101 modifies an orientation including an angle of object 1518*a* relative to viewpoint 1526*a* to improve visibility of respective virtual content included in object 1518*a*. For example, computer system 101 optionally detects an input directed to object 1518*a*, as described with reference to FIG. 15G. In some embodiments, in response to the input, computer system 101 rotates object 1518*a* to an updated orientation such that a front surface of object 1518*a* optionally is directed toward the user's viewpoint 1526. For example, as indicated by a vector normally extending from the front surface of object 1518*b* in the top down view, object 1518*a* optionally is rotated to an updated orientation such that the viewing angle of respective content included in object 1518*b* optionally is improved and/or optimally visible. As one example, object 1518*a* optionally is rotated in response to the input such that a normal vector extending from a center of object 1518*a* is directed to a location of computer system 101 and/or a respective portion of a user of computer system 101. Such rotation optionally is analogous to rotating a flat-panel television about an axis of rotation such that the display of the television is completely oriented toward the user. In some embodiments, the rotation includes rotation along a first axis. For example, object 1518*a* as shown optionally is a two-dimensional object situated in a plane that is normal to the floor of environment 1502. In some embodiments, the axis of rotation of object 1518*a* extends through the plane intersecting a center of virtual object 1518*a*. For example, if the flat panel television were mounted on a pole affixed to a center of a backside of the television, the axis of rotation optionally corresponds to the pole. Additionally or alternatively, computer system 101 optionally rotates object 1518*a* along another axis. For example, computer system 101 optionally rotates object 1518*a* to an updated orientation to tilt the surface of object 1518*a* downward or upward relative to the user's viewpoint 1526. As a more concrete example, if object 1518*a* is displayed above computer system 101 (e.g., displayed above a head of the user of the computer system), in response to the input directed to object 1518*a*, computer system 101 optionally rotates object 1518*a* downward, tilting the front surface of object 1518*a* to point down toward viewpoint 1526. Similarly, if object 1518*a* is displayed at least partially below viewpoint 1526, computer system 101 optionally rotates object 1518*a* upward, thus tilting the front surface of object 1518*a* upward toward viewpoint 1526.

In some embodiments, computer system 101 continuously rotates respective virtual objects while the respective object is being moved. For example, computer system 101 optionally detects an input including a request to move a respective virtual object, and optionally modifies an initial orientation of the respective virtual object relative to three-dimensional environment 1502 to an updated orientation directed toward the viewpoint 1526, as described previously. In some embodiments, the input includes a continued request to move the respective object, and the respective orientation of the respective object optionally is updated in accordance with the continued movement of the respect object such that the respective object continues to be directed toward viewpoint 1526*a* (e.g., the front surface of the object continues to be directed towards viewpoint 1526). For example, while computer system 101 detects an air pinch gesture corresponding to a request to move object 1518*a* that is maintained, computer system 101 optionally continues to move object 1518*a* in accordance with the movement of the hand performing the air pinch gesture, such as a movement from a far left of the user's viewpoint to a far right of the user's viewpoint. While moving object 1518*a* from the left to the right, computer system 101 optionally continuously updates the orientation of object 1518*a* such that the front surface of object 1518*a* continues to be visible and is continuously directed toward viewpoint 1526.

In some embodiments, computer system 101 modifies how rotation of a respective virtual object is displayed based on an orientation of the respective virtual object. For example, if object 1518*a* is within a first range of orientations relative to viewpoint 1526, computer system 101 animates a rotation of the orientation of object 1518*a* including a first animation, optionally expressly illustrating a continuous rotation of object 1518*a* to an updated orientation directed toward viewpoint 1526. If object 1518*a* is not within the first range of orientations (e.g., the backward surface of object 1518*a* is directed toward viewpoint 1526*a* and/or object 1528 is at an orientation primarily directed away from viewpoint 1526), computer system 101 optionally animates the rotation including a second animation, different from the first animation. The first animation, for example, optionally includes rotating object 1518*a* in its entirety, similar to as if object 1518*a* were a physical object that is spun around an axis of rotation, until object 1518*a* is presented at its updated orientation directed toward viewpoint 1526. The second animation, for example, optionally includes a fading out of object 1518*a* (e.g., increasing translucency until the object is no longer visible) followed by a fading in of object 1518*a* at an updated orientation directed toward the user's viewpoint 1526. Thus, if an orientation of a respective virtual object is at an extreme angle such that animating a rotation of the virtual object optionally will be computationally expensive, time consuming, and/or distracting, computer system 101 optionally animates the rotation of the virtual object with an alternative animation.

Figure 15I:
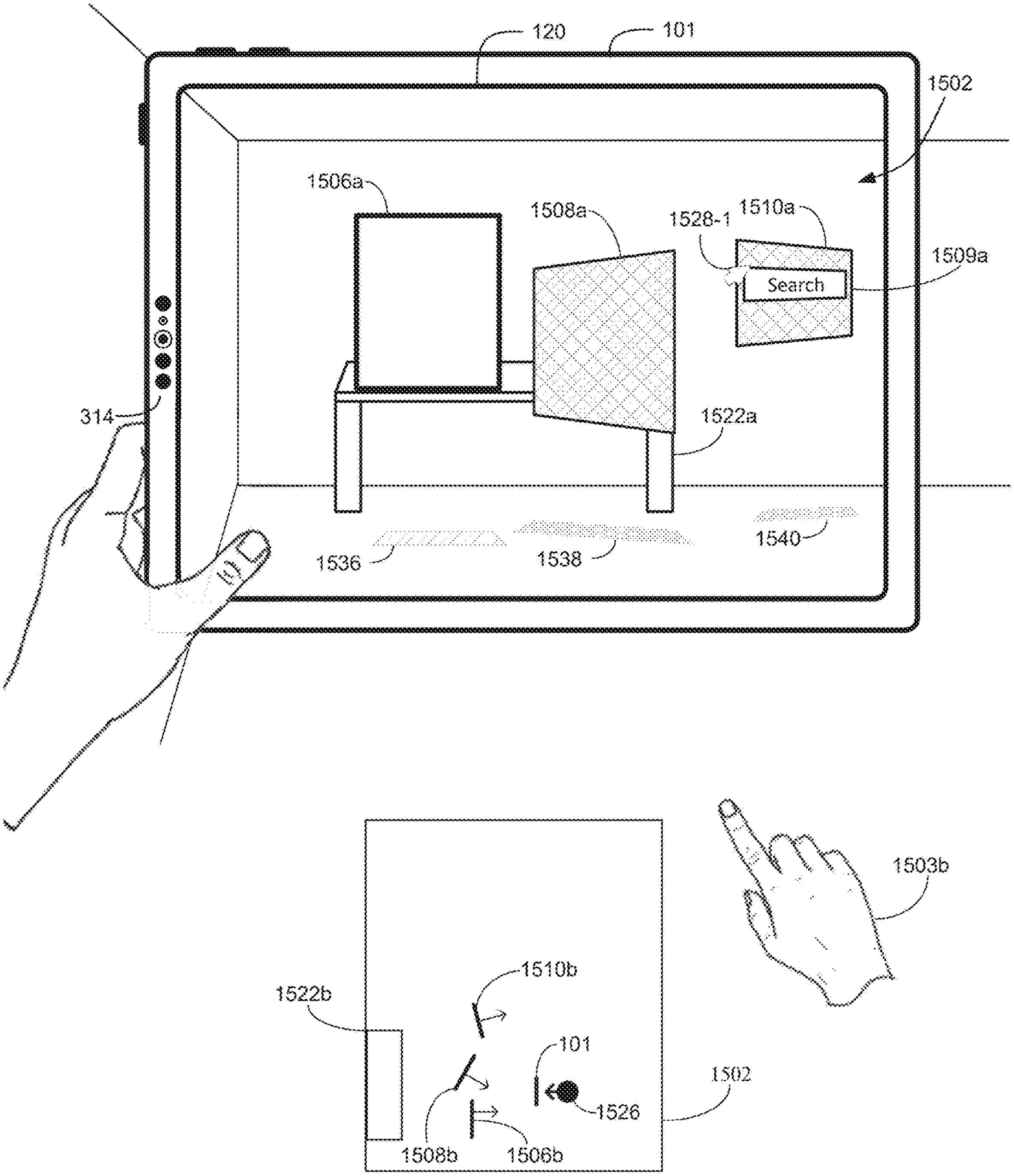

FIG. 15I shows a plurality of virtual objects displayed within a three-dimensional environment 1502 of the user respectively displayed with levels of visual prominence based on viewing angle between the respective virtual objects and the current viewpoint 1526 of the user. For example, virtual object 1506*a* is optionally displayed with a first level of visual prominence corresponding to one of a range of improved viewing angles relative to the current viewpoint 1526 of the user. For example, a vector parallel to a center of viewpoint 1526 in the overhead view is parallel, or nearly parallel to a vector normal to a surface (e.g., surface facing viewpoint 1526) of virtual object 1506*b*. Accordingly, the computer system 101 optionally determines that the viewing angle is suitable for viewing a large portion of respective content included in virtual object 1506*a*, and optionally displays virtual object 1506*a* with the first level of visual prominence. Virtual objects 1508*a* and 1510*a* are similarly displayed with respective levels of visual prominence that are the same or different as each other, but optionally less than the first level of visual prominence because respective viewing angles associated with the virtual objects are not close to parallel, or within a threshold angle of parallel relative to the center of viewpoint 1526, described further with reference to method 1600. As illustrated by the pattern filling virtual objects 1508*a* and 1510*a*, the computer system 101 optionally decreases a level of visual prominence of respective virtual objects when a viewing angle relative to the virtual objects is not preferred (e.g., not parallel, or not nearly parallel to virtual objects). As described previously, a level of visual prominence of respective virtual objects corresponds to respective levels of visual characteristics associated with the respective virtual objects, described further below.

In some embodiments, a level of visual prominence—or the display of—a virtual edge and/or border surrounding one or more portions of a respective virtual object optionally indicate a level of visual prominence of a respective virtual object. For example, the computer system 101 optionally displays virtual object 1506*a* with a first level of visual prominence (illustrated in FIGS. 15I-15J by showing virtual object 1506*a* with a relatively thick and dark border, although other forms of visual prominence could be used, as described in greater detail herein), and displays object 1508*a* corresponding to a second (e.g., lower) level of visual prominence (e.g., with a relatively thinner and/or lighter border). As an additional example, the second level of visual prominence optionally indicates that a user of the computer system 101 is at a not preferred (or preferred) viewing angle. For example, virtual object 1506*a* is optionally displayed with a relatively reduced level of visual prominence (e.g., without a border) when oriented to viewpoint 1526, and virtual object 1508*a* is optionally displayed with a relatively increased level of visual prominence (e.g., with a border) when oriented to viewpoint 1526 as shown in FIG. 15I. In some embodiments, respective virtual objects are displayed with a pattern fill overlaying one or more portions of the virtual objects. For example, the cross-hatching fill of virtual objects 1508*a* and/or 1510*a* are optionally displayed by computer system 101, with respective levels of opacity, saturation, and/or brightness also based on viewing angle between the respective virtual object and viewpoint 1526. Levels of visual prominence are described further with reference to method 1600.

Additionally or alternatively, the computer system 101 optionally displays and/or changes respective levels of visual prominence of a virtual shadow displayed concurrently with and/or at a position associated with a respective virtual object. For example, virtual shadow 1536 is optionally displayed with a third level of visual prominence having one or more characteristics of the levels of visual prominence described with reference to the virtual object(s), and virtual shadows 1538 and 1540 are optionally displayed with respective fourth (and/or fifth) levels of visual prominence. Virtual shadows 1536, 1538 and 1540 in FIG. 15I are virtually cast onto the floor of three-dimensional environment 1502. In some embodiments, a level of visual prominence of a virtual shadow is indicated with and/or corresponds to one or more visual characteristics of the virtual shadow, including an opacity of the shadow, a brightness of a shadow, and/or the sharpness of edges of the shadow. For example, computer system 101 optionally displays a respective virtual shadow at the third level of visual prominence (e.g., relatively increased level of visual prominence) by displaying the virtual shadow as a relatively darker, more opaque, sharp-edged shadow, having a first size and/or having a first shape, as if a simulated light source casting the shadow is relatively close to a corresponding virtual object, and the computer system 101 optionally displays a respective virtual shadow with a fourth, relatively decreased level of visual prominence by displaying the virtual shadow as a relatively lighter, more translucent, diffuse-edged shadow having a second size smaller than the first size and/or having a second shape that is smaller or different than the first shape). Visual characteristics of virtual shadows are described further with reference to method 1600. In some embodiments, the level of visual prominence of a virtual shadow is based on factors used to determine the level of visual prominence of the virtual object (e.g., the viewing angle between viewpoint 1526 and virtual objects 1506*a*-1510*a*), similarly to as described with reference to the levels of visual prominence of the virtual object. For example, the level of shadow visual prominence optionally increases proportionally or by the same amount as an increase level of visual prominence in its associated virtual object, and/or decreases proportionally or by the same amount as a decrease in level of visual prominence of its associated virtual object. In some embodiments, a position, shape, size, and/or orientation of virtual shadows are based on the position of the current viewpoint 1526 of the user, the position of the virtual objects relative to the current viewpoint 1526 and/or the three-dimensional environment 1502, and/or the position(s) of simulated light source(s) and/or real-world light sources relative to the three dimensional environment. For example, virtual objects 1506*a*-1510*a* cast virtual shadows 1536-1540 respectively based on one or more simulated light sources above and behind the respective virtual objects, relative to viewpoint 1526. Virtual shadows are described further with reference to method 1600.

In some embodiments, as described briefly above, changing levels of visual prominence includes modifying one or more visual characteristics of respective virtual content such as virtual object(s) and/or virtual shadow(s). For example, the level of visual prominence of a virtual object and/or shadow optionally includes a level of brightness of content included in the virtual content, a level of opacity of the virtual content, a level of saturation of the virtual content, a degree of a blurring technique applied to the virtual content, a size of a portion of the virtual content subject to the blurring technique, and/or other suitable visual modifications of the content, (e.g., brighter, more opaque, more saturated, less blurred and/or having a smaller sized blurring effect (e.g., less diffuse) when the level of visual prominence is relatively increased, and dimmer, more translucent, less saturated, more blurred, and/or having a larger sized blurring effect (e.g., more diffuse) when the level of visual prominence is relatively decreased), described further with reference to method 1600. In some embodiments, such visual characteristics are changed relative to one or more portions (e.g., a center of content of an application user interface) included in the object; in some embodiments, such visual characteristics are changed relative to the entire virtual object.

In some embodiments, the computer system detects one or more inputs directed to a virtual object, and forgoes performance of one or more operations based on the one or more inputs in accordance with a determination that the target virtual object of the one or more inputs is displayed with a reduced level of visual prominence. For example, in FIG. 15I, cursor 1528-1 is optionally indicative of a selection input (described herein with reference to method 1600) directed to virtual content 1509*a*, such as a search bar, included in virtual object 1510*a*. The selection input is optionally operative to initiate a text entry mode to populate virtual content 1509*a* with a search query; however, as described further with reference to method 1600, one or more operations are not performed by the computer system 101 because virtual object 1510*a* is not displayed with a preferred viewing angle and/or orientation relative to viewpoint 1526, as described further below and with reference to method 1600.

Figure 15J:
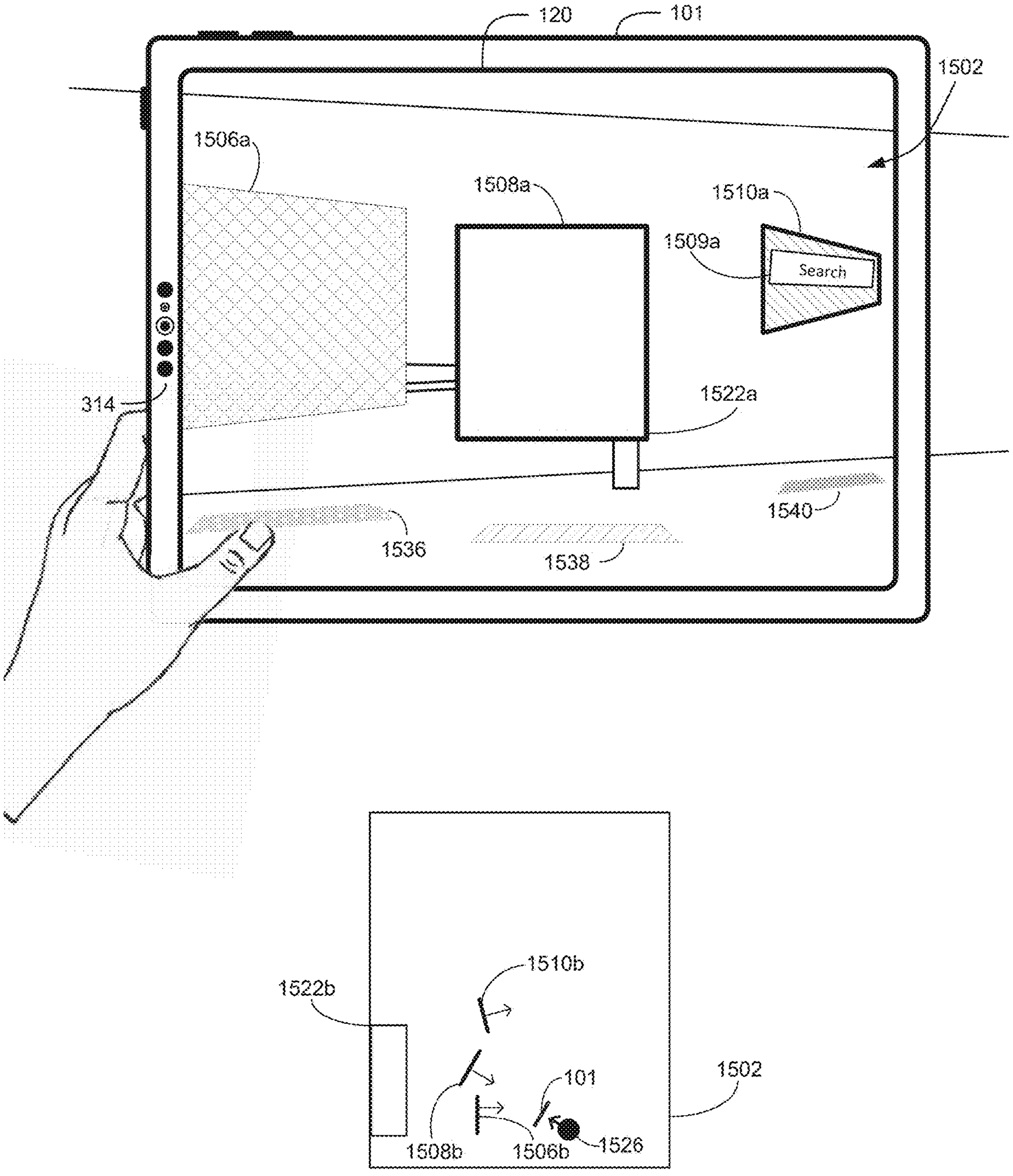

From FIG. 15I to FIG. 15J, viewpoint 1526 of a user of computer system 101 changes. In response to detecting the changed viewpoint, the computer system modifies levels of visual prominence of the virtual objects 1506*a*-1510*a* displayed within three-dimensional environment 1502. For example, the orientations of the respective virtual windows relative to viewpoint 1526 are changed in accordance with the changed viewpoint (e.g., based on a change in distance and/or angle of the changed viewpoint). Respective levels of visual prominence of objects 1506*a* and 1510*a*, for example, are optionally decreased due to the increase in viewing angle formed between the respective objects and viewpoint 1526 as shown in FIG. 15J relative to as shown in FIG. 15I. Object 1508*a*, on the other hand, is optionally increased in level of visual prominence. As described previously, the computer system optionally concurrently changes the level of visual prominence of respective virtual shadows while changing the level of visual prominence of virtual objects. For example, virtual shadow 1536 and virtual shadow 1540 are optionally decreased in visual prominence (e.g., lighter, more diffuse, less saturated, and/or less opaque) in response to the current viewpoint 1526 moving away from the normal extending from virtual object 1506*b* and object 1510*a*, respectively. Virtual shadow 1538 is optionally increased in visual prominence (e.g., is darker, less diffuse, is more saturated, and/or more opaque) in response to the change in viewpoint 1526 because the normal extending from virtual object 1508*a* is closer to parallel to viewpoint 1526. Thus, in FIG. 15J, the level of visual prominence of respective virtual shadows are changed relative to as shown in FIG. 15I. As described previously, the selection input directed to virtual content 1509*a* did not initiate a text entry mode because the input was received while virtual object 1510*a* was displayed with a relatively decreased level of visual prominence. Changes in the level of visual prominence of objects, virtual shadows, and forgoing of operation(s) in response to input(s) based on a level of visual prominence of a respective virtual object are described further with reference to method 1600.

FIGS. 16A-16P is a flowchart illustrating a method of changing the visual prominence of content included in virtual objects based on viewpoint in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1600 are, optionally, combined and/or the order of some operations is, optionally, changed.

In some embodiments, method 1600 is performed at a computer system (e.g., 101) in communication with a display generation component (e.g., 120) and one or more input devices. In some embodiments, the computer system has one or more characteristics of the computer system of methods 800, 1000, 1200, 1400 and/or 1600. In some embodiments, the display generation component has one or more characteristics of the display generation component of methods 800, 1000, 1200, 1400 and/or 1600. In some embodiments, the one or more input devices have one or more of the characteristics of the one or more input devices of methods 800, 1000, 1200, 1400 and/or 1600.

In some embodiments, while a three-dimensional environment (e.g., 1502) is visible via the display generation component from a first viewpoint (e.g., such as described with reference to methods 800, 1000, 1200, 1400 and/or 1600) of a user of the computer system, such as viewpoint 1526 in FIG. 15A (e.g., the three-dimensional environment optionally has one or more characteristics of the three-dimensional environment of methods 800, 1000, 1200, 1400 and/or 1600), the computer system displays (1602*a*), via the display generation component, a first virtual object including first content from the first viewpoint, such as object 1506*a* and content 1507*a* and 1507*b* in FIG. 15A (e.g., the first virtual object is a user interface or application window of an application, such as a web browsing or content browsing application, and the first virtual object includes text content, image content, video content, one or more selectable buttons, or one or more input fields. The first virtual object optionally corresponds to or has one or more characteristics of the objects described in methods 800, 1000, 1200, 1400 and/or 1600). In some embodiments, the first virtual object has a first size and a first shape relative to the three-dimensional environment (1602*b*). In some embodiments, the first virtual object is visible from a first angle from the first viewpoint (1602*c*). In some embodiments, while the first virtual object is viewed at the first angle from the first viewpoint, a respective visual characteristic of the first content has a first value corresponding to a first level of visual prominence of the first content in the three-dimensional environment (1602*d*), such as shown with object 1506*a* and content 1507*a* and 1507*b* in FIG. 13A.

In some embodiments, while displaying, via the display generation component, the first virtual object in the three-dimensional environment from the first viewpoint, the computer system detects (1602*e*) movement of a current viewpoint of the user from the first viewpoint to a second viewpoint, different from the first viewpoint, such as the movement of viewpoint 1526 from FIG. 15A to 15B. For example, the first viewpoint of the user is oriented towards the first content and/or the first side of the first virtual object that includes the first content. For example, the first side of the first virtual object is facing the first viewpoint, and the second opposite side of the first virtual object is facing away from the first viewpoint. In some embodiments, the first viewpoint and/or the first angle is oriented within 90 degrees of the normal of the first side of the first virtual object. The respective visual characteristic is optionally the transparency of the first content, the blurriness of the first content and/or the brightness of the first content, and the first value optionally corresponds to the respective level(s) of those visual characteristic(s). The movement of the viewpoint optionally has one or more characteristics of the movement of the viewpoint(s) described with reference to methods 800, 1000, 1200 and/or 1400.

In some embodiments, in response to detecting the movement of the current viewpoint of the user from the first viewpoint to the second viewpoint, the computer system displays (1602*f*), in the three-dimensional environment, while the three-dimensional environment is visible from the second viewpoint of the user (e.g., the three-dimensional environment is visible from a different perspective corresponding to the second viewpoint, including displaying the first virtual object and/or the first content included in the first virtual object from the different perspective corresponding to the second viewpoint), the first virtual object from the second viewpoint, such as the display of object 1506*a* in FIG. 15B. In some embodiments, the first virtual object maintains the first size and the first shape relative to the three-dimensional environment (1602*g*) (e.g., the movement of the viewpoint of the user does not change the size and/or shape and/or placement of the first virtual object relative to the three-dimensional environment). In some embodiments, the movement of the viewpoint and/or the angle from which the first virtual object and/or the first content is visible does change the angular or display size of the first virtual object and/or first content due to the first virtual object and/or first content occupying more or less of the field of view of the user based on the changes in distance to the first virtual object and/or changes in angle from which the first virtual object is being displayed.

In some embodiments, the first virtual object is visible from a second angle from the second viewpoint, the second angle being different from the first angle (1602*h*), such as shown with object 1506*a* in FIG. 15B. In some embodiments, while the first virtual object is viewed at the second angle from the second viewpoint, the respective visual characteristic of the first content has a second value corresponding to a second level of visual prominence of the first content in the three-dimensional environment (e.g., the second value corresponds to the level of transparency of the first content, the blurriness of the first content and/or the brightness of the first content, different from the first value), the second level of visual prominence of the first content being different from the first level of visual prominence (1602*j*), such as shown with the difference in visual prominence of content 1507*a* and 1507 between FIGS. 15A and 15B. For example, the second angle is further from the normal of the first side of the first virtual object and/or first content than the first angle. In some embodiments, the further the angle of visibility of the first virtual object from viewpoint of the user moves from the normal of the first side of the first virtual object and/or first content, the more the computer system reduces the visual prominence of the first content (e.g., increases the blurriness of the first content, reduces the brightness of the first content and/or increases the transparency of the first content). In some embodiments, the second angle is still oriented within 90 degrees of the normal of the first side of the first virtual object and/or first content. In some embodiments, the visual prominence of the first virtual object is not reduced (e.g., the boundary of the first virtual object is not displayed with a reduced visual prominence in response to the viewpoint of the user moving from the first viewpoint to the second viewpoint, and thus the angle of visibility of the first virtual object moving from the first angle to the second angle). In some embodiments, the angle of visibility of the first virtual object moving to being oriented closer to the normal of the first side of the first virtual object and/or first content causes the visual prominence of the first content to increase. In some embodiments, the reduced or increased visual prominence of the first content is different or separate from and/or in addition to the change in angular or display size of the first content resulting from changing the angle from which the first content is being viewed or displayed in response to the change in the viewpoint of the user. In some embodiments, inputs described with reference to method 1600 are or include air gesture inputs. Changing the level of prominence of content of an object based on the angle of visibility of the first virtual object for the user provides feedback about the relative locations of the object and the viewpoint of the user and/or angle of visibility of the first virtual object.

In some embodiments, detecting the movement of the current viewpoint of the user from the first viewpoint to the second viewpoint includes detecting movement of the user in a physical environment of the user (1604), such as the movement within the room shown from FIGS. 15A to 15B. For example, the head, torso, shoulders and/or body of the user changing location in a physical environment of the user and/or changing orientation in the physical environment of the user optionally corresponds to the movement of the current viewpoint in the three-dimensional environment (e.g., corresponding to the magnitude, direction and/or type of the physical movement of the user). The computer system optionally detects such movement of the user and correspondingly moves the current viewpoint of the user in the three-dimensional environment. Changing a viewpoint of the user based on changes in the position and/or orientation of the user in the physical environment enables viewpoint updates to be performed without displaying additional controls.

In some embodiments, the three-dimensional environment is visible from the first viewpoint and the second viewpoint of the user during a communication session between the user of the computer system and a second user of a second computer system, wherein the first virtual object is accessible by the computer system and the second computer system (1606*a*), such as the communication session between computer systems 101*a* and 101*b* in FIGS. 15E-15F in which objects 1506*a*, 1508*a* and 1510*a* are accessible by computer systems 101*a* and 101*b* (e.g., such as described with reference to method 1400). In some embodiments, detecting the movement of the current viewpoint of the user from the first viewpoint to the second viewpoint includes detecting movement of the first virtual object relative to the current viewpoint of the user (1606*b*), such as the movement of object 1508*a* from FIG. 15E to 15F (e.g., one or more virtual objects—including the first virtual object—and/or representations of other users in the three-dimensional environment are moved relative to the current viewpoint of the user, such as described with reference to method 1400, thus changing the relative spatial arrangement of the viewpoint of the user and the one or more virtual objects and/or representations of other users). In some embodiments, such movement of the one or more virtual objects and/or representations of other users is in response to a recentering input, such as the first input described with reference to method 1400. In some embodiments, such movement of the one or more virtual objects and/or representations of other users is in response to an input by another user to which the first virtual object is accessible to move the first virtual object (e.g., using a gaze, pinch and movement input, such as described throughout this application). Updating the location of the first virtual object relative to the viewpoint of the user when the first virtual object is accessible to multiple users automatically ensures proper placement of the first virtual object relative to the viewpoints of the multiple users.

In some embodiments, while displaying the first virtual object from the second viewpoint, wherein the first virtual object has a first orientation relative to the second viewpoint of the user (e.g., has a particular angle relative to the normal from the second viewpoint of the user, or has a particular angle relative to a reference in the three-dimensional environment), such as displaying object 1508*a* from viewpoint 1526 in FIG. 15C, the computer system detects (1608*a*), via the one or more input devices, a respective input corresponding to a request to move the first virtual object relative to the second viewpoint of the user, such as the input from hand 1503 in FIG. 15C (e.g., a gaze, pinch and hand movement while pinched input from the user, such as described with reference to method 1400—in some embodiments, the position of the first virtual object in the three-dimensional environment changes corresponding to the magnitude and/or direction of the hand movement of the user while in the pinch hand shape). In some embodiments, in response to detecting an end of the pinch hand shape (e.g., the thumb and index finger of the hand of the user move apart), the computer system ceases moving the first virtual object in the three-dimensional environment, and the first virtual object remains at its last location in the three-dimensional environment.

In some embodiments, in response to detecting the respective input, the computer system moves (1608*b*) the first virtual object relative to the second viewpoint of the user in the three-dimensional environment in accordance with the respective input (e.g., based on the direction and/or magnitude of the hand movement of the user), including while moving the first virtual object relative to the second viewpoint of the user, displaying the first virtual object at one or more second orientations relative to the second viewpoint of the user, different from the first orientation relative to the second viewpoint of the user (e.g., normal to the second viewpoint of the user), wherein the one or more second orientations are based on a relative location of the first virtual object relative to the second viewpoint of the user, such as shown with object 1508*a* between FIGS. 15C and 15D. In some embodiments, while being moved by the user, the computer system automatically reorients the first virtual object to be oriented towards (e.g., normal to) the viewpoint of the user, such that the orientation of the first virtual object relative to the reference in the three-dimensional environment changes based on its current location in the three-dimensional environment. In some embodiments, the computer system automatically reorients the first virtual object to be normal to the second viewpoint of the user in response to detecting an initiation of the respective input (e.g., detecting the thumb and index finger of the user coming together and touching, before detecting movement of the hand of the user in the pinch hand shape). Reorienting the first virtual object during movement input causes the computer system to automatically orient the first virtual object appropriately relative to the viewpoint of the user.

In some embodiments, the second level of visual prominence of the first content is less than the first level of visual prominence of the first content, and reducing the visual prominence of the first content from the first level to the second level includes fading display of the first content in the three-dimensional environment (1610), such as shown with content 1507*a*, 1507*b*, 1509*a* and 1509*b* from FIG. 15A to FIG. 15B (e.g., reducing a brightness of the first content and/or reducing (color) saturation of the first content). Increasing a level of visual prominence of the first content (e.g., in response to the angle of visibility of the first content approaching being normal to the first content) optionally includes increasing the brightness and/or (color) saturation of the first content. Fading display of the first content based on the angle of visibility of the first virtual object for the user provides feedback about the relative locations of the object and the viewpoint and/or angle of visibility of the first virtual object.

In some embodiments, the second level of visual prominence of the first content is less than the first level of visual prominence of the first content, and reducing the visual prominence of the first content from the first level to the second level includes blurring display of (e.g., reducing the sharpness of) the first content in the three-dimensional environment (1612), such as shown with content 1507*a*, 1507*b*, 1509*a* and 1509*b* from FIG. 15A to FIG. 15B. Increasing a level of visual prominence of the first content (e.g., in response to the angle of visibility of the first content approaching being normal to the first content) optionally includes increasing the sharpness of and/or reducing the blurriness of the first content. Increasing the blurriness of the first content based on the angle of visibility of the first virtual object for the user provides feedback about the relative locations of the object and the viewpoint and/or angle of visibility of the first virtual object.

In some embodiments, the second level of visual prominence of the first content is less than the first level of visual prominence of the first content, and reducing the visual prominence of the first content from the first level to the second level includes reducing opacity of (e.g., increasing the transparency of) the first content in the three-dimensional environment (1614), such as shown with content 1507*a*, 1507*b*, 1509*a* and 1509*b* from FIG. 15A to FIG. 15B. Increasing a level of visual prominence of the first content (e.g., in response to the angle of visibility of the first content approaching being normal to the first content) optionally includes increasing the opacity of and/or decreasing the transparency of the first content. Reducing the opacity of the first content based on the angle of visibility of the first virtual object for the user provides feedback about the relative locations of the object and the viewpoint and/or angle of visibility of the first virtual object.

In some embodiments, the first content is displayed on a first side of the first virtual object (e.g., the first virtual object is a two-dimensional object with two opposite sides, or a three-dimensional object with one or more sides, and the first content is displayed on the first side of the virtual object), the second angle is oriented toward a second side, different from the first side, of the first virtual object (1616*a*), such as shown with respect to objects 1506*a* and 1508*a* in FIG. 15C (e.g., the angle of visibility of the first virtual object is from behind the side on which the first content is displayed. In some embodiments, the first angle is oriented toward the first side). In some embodiments, displaying the first virtual object from the second viewpoint includes (1616*b*), displaying the first virtual object with translucency without displaying the first content (1616*c*), such as shown with objects 1506*a* and 1508*a* in FIG. 15C. For example, portions of the second side of the first virtual object that are opposite portions of the first side of the first virtual object that do not include the first content are optionally translucent. Portions of the second side of the first virtual object that are opposite portions of the first side of the first virtual object that do include the first content are optionally equally as translucent. In some embodiments, no indication or portion of the first content is displayed or visible from the second angle of visibility of the first virtual object—the view through the second side of the first virtual object is optionally as if no content exists or existed on the first side of the first virtual object. Hiding display of the first content based on the angle of visibility of the first virtual object for the user provides feedback about the relative locations of the object and the viewpoint and/or angle of visibility of the first virtual object.

In some embodiments, displaying the first virtual object from the first viewpoint includes displaying the first virtual object in association with a user interface element for moving the first virtual object relative to the three-dimensional environment (1618*a*), such as if object 1506*a* in FIG. 15A was displayed with a bar or handle element below, next to, or above object 1506*a* that is selectable to move object 1506*a*. For example, the user interface element is optionally a selectable user interface element (e.g., a "grabber bar") that is displayed by the computer system in association with (e.g., below and/or adjacent to) the first virtual object to indicate that the first virtual object is movable in the three-dimensional environment. In some embodiments, selection and subsequent movement of the grabber bar (e.g., similar to movement inputs previously described) causes the computer system to move the first virtual object in the three-dimensional environment in accordance with the movement input. In some embodiments, the first virtual object is additionally movable in response to the selection and movement input being directed to the first virtual object (e.g., and not the grabber bar).

In some embodiments, displaying the first virtual object from the second viewpoint includes displaying the first virtual object in association with the user interface element for moving the first virtual object relative to the three-dimensional environment (1618*b*), such as if object 1506*a* in FIGS. 15B and/or 15C was displayed with the grabber bar. For example, the computer system does not hide display of the grabber bar from different viewpoints of the user even though it is optionally reducing the visual prominence of the content in the first virtual object as the viewpoint of the user changes. In some embodiments, the grabber bar is displayed with reduced or different visual prominence from the second viewpoint (e.g., as described herein with reference to the first virtual object). In some embodiments, the grabber bar is displayed with the same visual prominence from the second viewpoint. Maintaining display of the grabber bar from different angles of visibility of the first virtual object provides feedback that the first virtual object remains a movable object in the three-dimensional environment.

In some embodiments, while displaying the first virtual object from the second viewpoint and the first content with the respective visual characteristic having the second value corresponding to the second level of visual prominence of the first content in the three-dimensional environment, wherein the second level of visual prominence of the first content is less than the first level of visual prominence of the first content, such as shown with object 1508*a* in FIG. 15E on computer system 101*b*, the computer system detects (1620*a*), via the one or more input devices, a respective input corresponding to a request to move the first virtual object relative to the second viewpoint of the user, such as the input from hand 1503*b* in FIG. 15E directed to object 1508*a* (e.g., a gaze, pinch and movement input, such as described previously for moving the first virtual object). In some embodiments, in response to detecting the respective input (1620*b*), the computer system moves (1620*c*) the first virtual object relative to the second viewpoint of the user in the three-dimensional environment in accordance with the respective input, such as moving object 1508*a* in FIG. 15F based on the input from hand 1503*b* (e.g., changing the location of the first virtual object based on the direction and/or magnitude of the movement of the hand of the user). In some embodiments, the computer system displays (1620*d*) the first content in the first virtual object with the respective visual characteristic having a third value corresponding to a third level of visual prominence of the first content, greater than the second level of visual prominence of the first content, such as the increased visual prominence of content 1509*a*/1509*b* in FIG. 15F (e.g., increasing the level of visual prominence of the firsts content in response to the respective input). In some embodiments, the increase in the level of visual prominence is in response to detecting an initiation of the respective input (e.g., in response to detecting the thumb and index finger of the user coming together and touching, before detecting subsequent movement of the hand of the user in the pinch hand shape). Increasing the visual prominence of the first content in response to the movement input provides feedback about the content of the first virtual object during the movement input to facilitate proper placement of the first virtual object in the three-dimensional environment.

In some embodiments, before detecting the respective input and while displaying the first virtual object from the second viewpoint and the first content with the respective visual characteristic having the second value corresponding to the second level of visual prominence of the first content in the three-dimensional environment, the first virtual object has a first orientation relative to the second viewpoint of the user (and/or relative to a reference in the three-dimensional environment), the first orientation directed away from the second viewpoint (1622*a*), such as the orientation of object 1508*a* directed away from the viewpoint of computer system 101*b* in FIG. 15E (e.g., the first virtual object is oriented such that the normal of the first content is a first angle away from being directed to the second viewpoint). In some embodiments, in response to detecting the respective input (1622*b*), the computer system displays (1622*c*), in the three-dimensional environment, the first virtual object with a second orientation relative to the second viewpoint of the user (and/or relative to the reference in the three-dimensional environment), different from the first orientation, the second orientation directed towards the second viewpoint, such as the orientation of object 1508*a* directed towards the viewpoint of computer system 101*b* in FIG. 15F (e.g., the first virtual object is oriented such that the normal of the first content is a second angle, less than the first angle, away from being directed to the second viewpoint. In some embodiments, the normal of the first content is directed to the second viewpoint). As previously described, in some embodiments, the first virtual object is reoriented in response to detecting the initiation of the respective input before detecting the movement portion of the respective input. In some embodiments, the respective input causes the first virtual object and/or first content to become oriented more towards the second viewpoint of the user, thus resulting in the increased visual prominence of the first content. Automatically orienting the first virtual object towards the second viewpoint in response to the movement input provides feedback about the content of the first virtual object during the movement input to facilitate proper placement of the first virtual object in the three-dimensional environment.

In some embodiments, displaying the first virtual object includes (1624*a*), while the first virtual object is visible from a first range of angles, including the first angle (e.g., a range of angles relative to the normal of the first content, including zero degrees relative to the normal up to 90 degrees relative to the normal, such as angles corresponding to viewing the first content from the front. In some embodiments, the first range of angles is from 0 to 10, 0 to 20, 0 to 30, 0 to 45, 0 to 60, 0 to 75 or 0 to 90 (optionally reduced by a small amount, such as 0.1 degrees) degrees), displaying the first virtual object with a first appearance (1624*b*), such as the appearance of object 1506*a* in FIG. 15A (e.g., displaying the first virtual object including the first content, where the first content is displayed with relatively high visual prominence).

In some embodiments, while the first virtual object is visible from a second range of angles, different from the first range of angles, including the second angle (e.g., a range of angles relative to the normal of the first content, such as angles corresponding to viewing the first content from the side. In some embodiments, the second range of angles is from 10 to 90 (optionally reduced by a small amount, such as 0.1 degrees), 20 to 90, 30 to 90, 45 to 90, 60 to 90, or 75 to 90 degrees), the first virtual object is displayed with a second appearance different from the first appearance (1624*c*), such as the appearance of object 1506*a* in FIG. 15B (e.g., displaying the first virtual object including the first content, where the first content is displayed with relatively low visual prominence and/or the first virtual object is displayed with an application icon (e.g., corresponding to the first virtual object) being displayed overlaid on the first virtual object from the viewpoint of the user). Displaying the first virtual object with different visual appearances based on the angle of visibility of the first virtual object for the user provides feedback about the relative locations of the object and the viewpoint and/or angle of visibility of the first virtual object.

In some embodiments, displaying the first virtual object includes (1626*a*), while the first virtual object is visible from a third range of angles, different from the first range of angles and the second range of angles (e.g., a range of angles relative to the normal of the first content, such as angles corresponding to viewing the first content from behind. In some embodiments, the third range of angles is from 90 (optionally increased by a small amount, such as 0.1 degrees) to 180 degrees), displaying the first virtual object with a third appearance different from the first appearance and the second appearance (1626*b*), such as the appearance of object 1506*a* in FIG. 15C (e.g., displaying the first virtual object with translucency without displaying the first content, as previously described). Displaying the first virtual object with different visual appearances based on the angle of visibility of the first virtual object for the user provides feedback about the relative locations of the object and the viewpoint and/or angle of visibility of the first virtual object.

In some embodiments, while displaying, via the display generation component, the first virtual object in the three-dimensional environment from the first viewpoint, wherein respective visual characteristic of the first content has the first value corresponding to the first level of visual prominence of the first content in the three-dimensional environment and the first virtual object is a first distance, less than a threshold distance (e.g., 1, 3, 5, 10, 20, 50, 100, 500, 1,000, 5,000 or 10,000 cm), from the first viewpoint, such as the appearance of the content of objects 1506*a* and 1508*a* in FIG. 15A, the computer system detects (1628*a*), via the one or more input devices, a respective input corresponding to a request to move the first virtual object to a location that is a second distance, different from the first distance, from the first viewpoint of the user, such as an input to move object 1506*a* to the second distance from the viewpoint 1526 in FIG. 15A (e.g., the respective input optionally has one or more of the characteristics of previously described inputs for moving virtual objects in the three-dimensional environment). In some embodiments, in response to receiving the respective input (1628*b*), the computer system moves (1628*c*) the first virtual object to the location that is the second distance from the first viewpoint of the user in accordance with the respective input.

In some embodiments, in accordance with a determination that the second distance is greater than the threshold distance (e.g., 1, 3, 5, 10, 20, 50, 100, 500, 1,000, 5,000 or 10,000 cm) from the first viewpoint of the user, the computer system displays (1628*d*) the first content in the first virtual object with the respective visual characteristic having a third value corresponding to a third level of visual prominence of the first content in the three-dimensional environment, the third level of visual prominence of the first content being less than the first level of visual prominence of the first content, such as the visual prominence with which the content of object 1510*a* is displayed in FIG. 15B. In some embodiments, the third value and the third level of visual prominence are the same as the second value and the second level of visual prominence, respectively. In some embodiments, the distance of the first virtual object from the viewpoint of the user does not affect the visual prominence of the first content until the first virtual object is further than the threshold distance from the viewpoint of the user. In some embodiments, for distances greater than the threshold distance, the visual prominence of the first content decreases as the first virtual object moves further from the viewpoint of the user. In some embodiments, for distances greater than the threshold distance, the visual prominence of the first content remains the third level of visual prominence independent of distance from the viewpoint. Displaying the first content with different visual appearances based on the distance of the first virtual object from the viewpoint of the user provides feedback about the relative locations of the first virtual object and the viewpoint.

In some embodiments, while displaying, via the display generation component, the first virtual object in the three-dimensional environment from the first viewpoint, the computer system displays (1630*a*), in the three-dimensional environment, a second virtual object that includes second content from the first viewpoint (e.g., the second virtual object optionally has one or more of the characteristics of the first virtual object, and is optionally concurrently displayed with the first virtual object in the three-dimensional environment), the respective visual characteristic of the second content having a third value corresponding to a third level of visual prominence of the second content in the three-dimensional environment, such as the visual prominence of content 1509*a*/1509*b* in object 1508*a* in FIG. 15A (e.g., based on angle of visibility and/or distance from the first viewpoint, as previously described). In some embodiments, the third level of visual prominence is different from the first level of visual prominence. In some embodiments, the third level of visual prominence is the same as the first level of visual prominence.

In some embodiments, while displaying, via the display generation component, the first virtual object in the three-dimensional environment from the second viewpoint, the computer system displays (1630*b*), in the three-dimensional environment, the second virtual object from the second viewpoint, the respective visual characteristic of the second content having a fourth value corresponding to a fourth level of visual prominence of the second content in the three-dimensional environment, the fourth level of visual prominence being different from the third level of visual prominence, such as the visual prominence of content 1509*a*/1509*b* in object 1508*a* in FIG. 15B (e.g., based on angle of visibility and/or distance from the second viewpoint, as previously described). In some embodiments, the fourth level of visual prominence is different from the second level of visual prominence. In some embodiments, the fourth level of visual prominence is the same as the second level of visual prominence. Thus, in some embodiments, the computer system applies the angle and/or distance based visual prominence adjustments to multiple virtual objects concurrently that are concurrently visible from the viewpoint of the user. Changing the level of prominence of the content of multiple objects based on the angle of visibility of the objects for the user provides feedback about the relative locations of the objects and the viewpoint of the user and/or angle of visibility of the objects.

In some embodiments, while the three-dimensional environment, such as environment 1502, is visible via the display generation component from the first viewpoint of the user, such as viewpoint 1526 in FIG. 15G, and the first virtual object has a first orientation relative to the first viewpoint of the user, such as object 1518*a* in FIG. 15H, and a second orientation relative to the three-dimensional environment, such as relative to environment 1502, wherein the first orientation is directed towards the first viewpoint of the user, the computer system detects (1632*a*), via the one or more input devices, a respective input corresponding to a request to move the first virtual object, such as an input with hand 1503*b* in FIG. 15H, relative to the three-dimensional environment from a first location to a second location, such as movement of object 1518*a*. For example, the first virtual object optionally is a window corresponding to an application user interface oriented such that the window is directed towards a position of the user within the three-dimensional environment (e.g., the normal of the front surface of the virtual object is oriented towards the viewpoint of the user). In some embodiments, the first virtual object includes a viewing plane (e.g., corresponding to a real-world display such as a curved computing monitor and/or a flat-panel television) that is pointed towards the user's position in the three-dimensional environment, or a respective portion of the user (e.g., the user's head). For example, a vector extending orthogonally from the first virtual object is oriented towards the user and/or the viewpoint of the user. In addition to the first orientation with respect to the user, the first virtual object optionally also has a second orientation with respect to the three-dimensional environment. For example, the three-dimensional environment optionally is a mixed-reality or virtual reality environment, and the first virtual object displayed within the environment optionally is placed at a particular position and/or angle with respect to the dimensions of the environment (e.g., oriented generally parallel to a vertical axis of the three-dimensional environment, wherein the vertical axis extends parallel to the user's height and/or perpendicular to the floor). In some embodiments, while the first virtual object is oriented towards the user, the computer system detects an input to move the first virtual object, such as an air gesture of a respective portion (e.g., a hand) of the user. For example, the computer system optionally detects an air pinching gesture of a hand of the user, and in accordance with a determination that the user intends to select the first virtual object (e.g., the computer system detects that the user's attention is or previously was directed to the first virtual object), initiates a process to move the first virtual object. For example, in response to the air pinching gesture, the computer system optionally tracks further movement of the hand of the user while the hand of the user remains in a pinch hand shape (e.g., the thumb and index finger touching) and moves the first virtual object based on the additional movement of the hand (e.g., in a direction and/or with a magnitude based on the direction and/or magnitude of the movement of the hand). In some embodiments, the respective input includes an input such as a gesture on a trackpad device in communication with the computer system. In some embodiments, the respective input includes actuation of a physical and/or a virtual button.

In some embodiments, in response to the respective input, the computer system displays (1632*b*), via the display generation component, the first virtual object at the second location in the three-dimensional environment, such as a location of object 1516*a* in FIG. 15H, wherein the first virtual object has the first orientation relative to the first viewpoint of the user and a third orientation, such as an orientation of object 1516*a* in FIG. 15H with respect to object 1518*a*, different from the second orientation, relative to the three-dimensional environment. For example, while moving the first virtual object, the angular orientation of the first virtual object relative to the first viewpoint of the user is optionally maintained. While moving the previously described window, for example, the computer system optionally rotates the window in the three-dimensional environment such that even though the position of the first virtual object changes in the three-dimensional environment, content of the first virtual object is fully visible and/or oriented towards the viewpoint of the user. Thus, the first virtual object is optionally moved to a new, third orientation with respect to the three-dimensional environment, but maintains the first orientation relative to the first viewpoint of the user. In some embodiments, the respective input optionally includes actuation of a physical or virtual button, and in response to the actuation, the computer system begins to move the first virtual object. For example, in response to an upward movement of the first virtual object, the computer system optionally tilts the first virtual downwards in accordance with the upward movement. Additionally or alternatively, in some embodiments, in response to lateral movement in a respective direction relative to the viewpoint of the user, the first virtual object optionally is rotated to oppose the lateral movement (e.g., rotated leftwards in response to rightward movement of the first virtual object). Displaying the first virtual object with the first orientation relative to the first viewpoint of the user and the third orientation relative to the three-dimensional environment reduces the need to orient the first virtual object relative to the user's viewpoint after modifying the spatial orientation of the first virtual object.

In some embodiments, while the first virtual object, such as object 1514*a*, is visible from the second viewpoint, wherein the first virtual object is at a first position in the three-dimensional environment, such as object 1514*a* in FIG. 15G, the computer system detects (1634*a*), via the one or more input devices, an indication of an input selecting the first virtual object, such as input using hand 1503*b*. For example, while the first virtual object optionally is within the user's field of view, the computer system optionally detects an input selecting the first virtual object such as an air pinching gesture by the hand of the user (e.g., the tip of the thumb and index fingers coming together and touching) detected while the attention of the user is directed to the first virtual object, such as the respective input described with reference to step(s) 1632.

In some embodiments, in response to the indication of the input selecting the first virtual object (e.g., and before detecting a movement component of the input selecting the first virtual object, if any, and/or before detecting the index finger and thumb of the user moving apart from each other), in accordance with a determination that the first position of the first virtual object satisfies one or more criteria, including a criterion that is satisfied when the first position is less than a threshold distance, such as threshold 1530 in FIG. 15G, (e.g., 0.1, 0.25, 0.5, 1, 2.5, 5, or 10 meters) from the second viewpoint of the user, the computer system moves (1634*b*) the first virtual object from the first position in the three-dimensional environment to a second position in the three-dimensional environment, such as the position of object 1514*a* in FIG. 15H, wherein the second position is greater than the threshold distance from the second viewpoint of the user. For example, in response to the air pinching gesture selecting the first virtual object, the computer system optionally determines a relative spatial relationship between the first virtual object and the viewpoint of the user of the computer system. In some embodiments, the computer system is aware of the relative spatial relationship prior to detecting the input selecting the first virtual object. In some embodiments, in accordance with a determination that the first virtual object is within a threshold distance from the viewpoint of the user of the computer system, the computer system optionally moves the first virtual object further away from the user of the computer system to a second position in the three-dimensional environment, optionally to improve visibility of the first virtual object. In some embodiments, the movement of the first virtual object in response to the selection input is independent of an input including an amount of movement of a respective portion of the user. For example, in response to the input selecting the first virtual object and optionally while input(s) corresponding to a request to move the first virtual object are not received and/or ignored (e.g., movement of a predefined portion of the user optionally while maintaining an air gesture such as a pinch), the computer system optionally forgoes consideration of movement of a hand or arm of the user and optionally moves the first virtual object to the second position to a predetermined and/or calculated distance from the user viewpoint. In some embodiments, the second position is a predetermined distance away from the user (e.g., 2%, 5%, 10%, 15%, 25%, 50%, or 75% of the threshold distance). In some embodiments, the second position is determined in accordance with the dimensions of the three-dimensional environment or other virtual and/or real world objects. For example, if the first virtual object is in front of (e.g., relative to the viewpoint of the user) a real-world object (e.g., wall) or virtual wall of the three-dimensional environment, the computer system optionally moves the first virtual object no further than the real world object and/or wall. Additionally or alternatively, the first virtual object optionally is moved to prevent spatial and/or line-of-sight conflicts with physical and/or virtual objects within the three-dimensional environment from the second viewpoint of the user of the computer system. Moving the first virtual object to a second position greater than a threshold distance in response to an indication of selection of the first virtual object reduces the need for one or more inputs to manually position the first virtual object at an appropriate distance from the viewpoint of the user.

In some embodiments, while the first virtual object, such as object 1516*a* as shown in FIG. 15G, is visible from the second viewpoint, wherein the first virtual object is at a first position in the three-dimensional environment, such as the position object 1516*a* as shown in FIG. 15G, the computer system detects (1636*a*), via the one or more input devices, an indication of an input selecting the first virtual object, such as input with hand 1503*b*. The input selecting the first virtual object optionally has one or more of the characteristics of the input described with reference to step(s) 1634.

In some embodiments, in response to the indication of the input selecting the first virtual object, in accordance with a determination that the first position of the first virtual object satisfies one or more criteria, including a criterion that is satisfied when the first position is greater than a threshold distance from the second viewpoint of the user, such as threshold 1532 as shown in FIG. 15G, the computer system increases (1636*b*) a prominence (e.g., visual prominence) of the first virtual object relative to the three-dimensional environment, such as the prominence of object 1516*a* as shown in FIG. 15H. For example, the computer system optionally detects that the first virtual object is too far (e.g., greater than a threshold distance such as 0.1, 0.25, 0.5, 1, 2.5, 5, or 10 meters) from the user, and in response to the air pinching gesture, increases prominence of the first virtual object and/or contents within the first virtual object, such as described in more detail below with reference to step(s)s 1638-1640. In some embodiments, increasing prominence of the first virtual object includes increasing visibility of the first virtual object and/or its contents. In some embodiments, such increases in visibility opacifying the first virtual object. In some embodiments, the first virtual object is displayed with an additional visual effect such as a halo/glow, displayed with an added and/or modified border (e.g., a border including a specular highlight), or otherwise visually distinguished from the three-dimensional environment and/or other virtual objects. In some embodiments, the input selecting the first virtual object is separate from an input to explicitly increase visual prominence of the first virtual object. For example, in response to an indication of an input and in accordance with a determination that the input corresponds to a request to select the first virtual object, the computer system optionally increases visual prominence of the first virtual object in accordance with a predetermined or calculated increase in the visual prominence. In response to the indication of the input and in accordance with a determination that the input corresponds to a request to explicitly (e.g., manually) increase the visual prominence of the first virtual object, the computer system optionally modifies the visual prominence of the first virtual object in accordance with the input (e.g., proportionally based on movement of a respective portion of the user while maintaining a pose with the respective portion), optionally forgoing the selection and/or the predetermined or calculated increase in visual prominence. Increasing prominence of the first virtual object in response to an indication of an input selecting the first virtual object reduces the need for user inputs manipulating the first virtual object and/or other aspects of the three-dimensional environment to manually increase the prominence of the first virtual object.

In some embodiments, increasing the prominence of the first virtual object includes increasing a size of the first virtual object in the three-dimensional environment (1638), such as the scale of object 1508 a as shown in FIG. 15H compared to as shown in FIG. 15G. For example, the computer system optionally scales the first virtual object in response to the indication of the input selecting the first virtual object to increase the size of the first virtual object. In some embodiments, content included within the first virtual object (e.g., text and/or video) are similarly scaled or re-sized in accordance with the increased size. Increasing a size of the first virtual object when increasing the prominence of the first virtual object reduces the need for additional inputs for increasing the size of the first virtual object.

In some embodiments, increasing the prominence of the first virtual object includes moving the first virtual object to a second position in the three-dimensional environment that is less than the threshold distance from the second viewpoint of the user (1640*a*) such as the position of object 1516*a* as shown in FIG. 15H compared to as shown in FIG. 15G. For example, the computer system optionally moves the first virtual object from a second position that is closer to the second viewpoint than the first position within the three-dimensional environment (e.g., within 0.1, 0.25, 0.5, 1, 2.5, 5, or 10 meters of the user). Moving the first virtual object within a threshold distance of a viewpoint of the user when increasing the prominence of the first virtual object reduces the need for additional inputs to move the first virtual object.

In some embodiments, displaying the first virtual object from the first viewpoint, such as object 1518*a* as shown in FIG. 15G, includes displaying the user interface element with a second respective visual characteristic having a third value corresponding to a third level of visual prominence (1642*a*), such as a grabber associated with object 1518*a*. For example, the second respective visual characteristic optionally includes a size, translucency, lighting effect, and/or other visual effect applied to the user interface element, the third value of the second respective visual characteristic optionally indicative of a prominence or a current selection (e.g., after a user has selected the user interface element, optionally while a pose (e.g., an air pinch hand shape) of a respective portion of the user is maintained) of the user interface element.

In some embodiments, displaying the first virtual object from the second viewpoint includes displaying the user interface element with the second respective visual characteristic having a fourth value, different from the third value, corresponding to a fourth level of visual prominence, different from the third level of visual prominence (1642*b*), such as a lowered visual prominence of the grabber associated with object 1518*a*. For example, the computer system optionally detects that the user of the computer system optionally is viewing the first virtual object at the second orientation, and accordingly optionally displays the user interface element with the second respective visual characteristic with a fourth value, such as a smaller size, greater amount of translucency, and/or a relatively lesser visual effect compared to the third value of the second respective visual characteristic to indicate a reduced level of visual prominence. In some embodiments, the third value corresponds to a relatively lesser amount of visual prominence, and the fourth value corresponds to a relatively greater amount of visual prominence. In some embodiments, the user interface element is still interactable to move the first virtual object while displayed with the second respective visual characteristic having the fourth value—in some embodiments, the user interface element is no longer interactable to move the first virtual object while displayed with the second respective visual characteristic having the fourth value. Displaying the user interface element with the second respective visual characteristic with the third value while the first virtual object is visible from the first viewpoint and with the fourth value while the first virtual object is visible from the second viewpoint provides visual feedback about the orientation at which the first virtual object is being displayed relative to the viewpoint of the user, and reduces inputs erroneously directed to the first virtual object.

In some embodiments, in response to detecting the respective input, such as input from hand 1503*b* in FIG. 15G, displaying, in the three-dimensional environment, the first virtual object, such as object 1518A shown in FIG. 15G (e.g., a window corresponding to an application user interface) with the second orientation relative to the second viewpoint of the user includes (1644*a*) in accordance with a determination that the first orientation of the first virtual object relative to the second viewpoint is within a first range of orientations, such as the orientation of object 1518*a* in FIG. 15G, (e.g., 0.1, 0.5, 1, 5, 10, 15, 30, 45, or 60 degrees relative to vector extending normal to a surface of the virtual object and/or 0.025, 0.1, 0.5, 1, 2.5, 5, or 10 meters away from the first virtual object), displaying, in the three-dimensional environment, an animation of the first virtual object rotating from the first orientation to the second orientation relative to the second viewpoint (1644*b*), such as an animation of rotation of object 1518*a* to its orientation as shown in FIG. 15H. For example, the first range of orientations optionally include a first range of viewing angles of the user from the second viewpoint. As referred to herein, a respective "viewing angle" optionally corresponds to a difference in angle and/or orientation between a current viewpoint of the user and a vector extending normal and/or orthogonally to a first surface of the first virtual object. For example, a first virtual object optionally having a shape or profile similar to a rectangular prism optionally has a normal extending from a first face (e.g., a relatively larger rectangular face), and the viewing angle optionally is measured between the user's viewpoint and the normal. In some embodiments, the first virtual object does not include a relatively flat surface, and the viewing angle is measured relative to another vector—other than the normal and/or orthogonal vectors—extending from a respective portion of the first virtual object (e.g., from a center of the first virtual object and/or away from a relatively flat portion of the first virtual object). In some embodiments, the computer system animates the first virtual object gradually turning towards the user. In some embodiments, a cross-fading of the first virtual object from the first orientation to the second orientation is not displayed while animating the rotation of the first virtual object.

In some embodiments, in response to detecting the respective input, such as input with hand 1503*b*, displaying, in the three-dimensional environment, the first virtual object with the second orientation relative to the second viewpoint of the user, such as the orientation of object 1518*a*, in FIG. 15G includes in accordance with a determination that the first orientation of the first virtual object relative to the second viewpoint is within a second range of orientations (e.g., 0.5, 1, 5, 10, 15, 30, 45, 60, or 75 degrees relative to vector extending normal to a surface of the virtual object and/or 0.1, 0.5, 1, 2.5, 5, 10, or 15 meters away from the first virtual object), different from the first range of orientations, displaying, in the three-dimensional environment, a cross-fading of the first virtual object from the first orientation to the second orientation relative to the second viewpoint (1644*c*), such as cross-fading to the orientation of object 1518*a* in FIG. 15G. For example, the second range of orientations optionally include one or more viewing angles that are greater than the first range of viewing angles. In some embodiments, an animation rotating the first virtual object from the first orientation to the second orientation is not displayed while cross-fading the first virtual object. In some embodiments, the cross-fading includes displaying the first virtual object with a progressively reduced level of visual prominence of the first virtual object until the first virtual object is no longer, or barely visible (e.g., displayed with 0% and/or 5% opacity). In response to displaying the first virtual object with the above opacity and/or translucency, the computer system optionally begins displaying the first virtual object with a progressively increased level of opacity at the second orientation until the first virtual object is displayed with a final level of opacity (e.g., 100%), optionally corresponding to the opacity of the first virtual object when displayed at the first orientation (e.g., prior to the cross-fading). Displaying the first virtual object with an animation or cross-fading effect in accordance with a determination that the first orientation is within a first range or a second range of orientations reduces computational complexity and power consumption required to animate relatively larger rotations of the first virtual object.

In some embodiments, while the first virtual object, such as object 1518*a* is visible from the third range of angles, the third appearance includes display of a respective identifier of the first virtual object, such as the text on object 1518 as shown in FIG. 15G (1646*a*). For example, the first virtual object optionally is a window corresponding to an application user interface that is visible from a viewpoint of a user of the computer system within a third range of viewing angles, and the third appearance optionally includes a textual and/or graphical indicator identifying the first virtual object. Such an identifier optionally includes a graphical application icon, optionally including one or more colors based on content associated with the first virtual object (e.g., media content). In some embodiments, the textual and/or graphical indicator identifies the application of which the first virtual object is a user interface. In some embodiments, the third range of angles correspond to a range of viewing angles corresponding to a rear of the first virtual object. For example, the computer system optionally does not display the identifier while the computer system is displaying the front of the first virtual object, but as the viewpoint of the user within the three-dimensional environment changes towards the back of the first virtual object, the first virtual object appearance is modified to include the identifier. In some embodiments, the respective identifier is displayed above, in front of and/or nearby the first virtual object while the viewpoint of the user is relatively behind and/or to the side of the first virtual object, and not displayed while the viewpoint of the user is relatively in front of the first virtual object. In some embodiments, the respective identifier is displayed concurrently while the first virtual object is displayed with a second appearance (e.g., including a visual representation such as an icon) as described in more detail relative to step(s) 1624.

In some embodiments, while the first visual object is visible from the first range of angles (and/or the second range of angles), the first appearance does not include display of the respective identifier of the first virtual object (1646*b*). For example, while displaying the first virtual object from the first and/or second ranges of angles, the appearance of the first virtual object does not include the previously described identifier. In some embodiments, the first appearance includes the previously described identifier. Displaying the respective identifier while the first virtual object is visible from the third range of angles provides feedback about the orientation of the user viewpoint with respect to the first virtual object, thus reducing entry of erroneous user inputs directed to the virtual object when such user inputs may not be detected, and also provides feedback about the first virtual object when the content of the first virtual object is optionally faded and thus does not, itself, provide such feedback.

In some embodiments, while displaying the first virtual object, such as object 1518*a*, in the three-dimensional environment, the computer system detects, via the one or more input devices, an indication of an input directed to the first virtual object, such as input from hand 1503*b* (1648*a*). In some embodiments, the indication of the input has one or more characteristics of the respective input described in more detail with respect to step(s) 1632. In some embodiments, in response to detecting the indication of the input directed to the first virtual object (1648*b*), in accordance with a determination that the first virtual object is at a third angle, such as object 1518*a* as shown in FIG. 15H, (and/or within a first range of angles, and/or is a first orientation) with respect to the second viewpoint of the user, such as viewpoint 1526 in FIG. 15G, different from the second angle from the second viewpoint, the computer system initiates (1648*c*) one or more operations based on the indication of the input directed to the first virtual object, such as an operation with respect to object 1518G in FIG. 15H. For example, the computer system optionally detects that the user of the computer system is at a third angle relatively medial to the first virtual object, and in response to detecting the input, initiates a process to perform one or more operations in accordance with the input. The input optionally is an input entering text into a text field included within the first virtual object, an input to modify the appearance and/or orientation of the first virtual object, and/or an input to select content included within the first virtual object (e.g., input to select a button and/or input selecting a representation of media). In some embodiments, in response to the input, the computer system initiates text entry into the text field, initiates modification (e.g., scaling, rotating, and/or modifying opacity) of the first virtual object, and/or selects content (e.g., initiates playback of media corresponding to a section and/or enlarges the media). In some embodiments, in accordance with a determination that the viewpoint of the user is within a threshold angle (e.g., 1, 5, 10, 30, 45, or 60 degrees) of a respective portion (e.g., the center of a portion and/or the normal) of the first virtual object, the computer system initiates the one or more operations in response to detecting the indication of the input directed to the first virtual object.

In some embodiments, in response to detecting the indication of the input directed to the first virtual object, in accordance with a determination that the first virtual object is at the second angle (and/or is within a second range of angles, different from the first range of angles) with respect to the second viewpoint of the user, different from the first angle, such as the angle between object 1518*a* and viewpoint 1526*a* as shown in FIG. 15G, the computer system forgoes (1648*d*) initiation of the one or more operations based on the indication of the input directed to the first virtual object. For example, the second angle optionally corresponds to a relatively lateral angle to the first virtual object, compared to the first angle, and as such the computer system optionally modifies and/or prevents the interaction received after the first virtual object optionally is at the second angle with respect to the second viewpoint of the user. In some embodiments, the computer system forgoes performing the one or more operations in response to the input (e.g., a selection of a button) in accordance with a determination that the input was received when the second user viewpoint is outside a threshold angle (e.g., 0.5, 1, 5, 10, 15, 30, 45, 60, or 75 degrees) relative to the first virtual object. Forgoing one or more operations in accordance with a determination that the first virtual object is at a second angle with respect to the second viewpoint of the user prevents unintended interaction with the first virtual object while the user is not at an appropriate angle for interaction with the first virtual object.

In some embodiments, while displaying, via the display generation component, such as display generation component 120, the first virtual object, such as object 1506*a*, in the three-dimensional environment, such as three-dimensional environment 1502, from the first viewpoint, the computer system, such as computer system 101, detects (1650*a*) movement of the current viewpoint of the user from the first viewpoint, such as viewpoint 1526 as shown in FIG. 15I, to a third viewpoint, such as viewpoint 1526 as shown in FIG. 15J, wherein movement of the current viewpoint from the first viewpoint to the third viewpoint corresponds to transitioning from the first virtual object being visible from the first angle relative to a front surface of the first virtual object (e.g., relative to a normal of the front surface of the first virtual object, such as the surface of the first virtual object that is facing the viewpoint of the user) to being visible from a third angle relative to the front surface of the first virtual object, wherein the third angle is greater than the first angle. For example, as described with reference to thresholds with reference to method 2200, the computer system optionally determines one or more thresholds with hysteresis to improve consistency of user interaction and/or appearance of the first virtual object while the user changes the current viewpoint relative to the first virtual object. The transitioning of the first virtual object between being visible at the angles described herein (e.g., the third angle, the fourth angle) and the viewpoints described herein (e.g., the third viewpoint, the fourth viewpoint) optionally have one or more characteristics of the region(s), criteria/criterion, viewpoint(s), and/or changes in levels of visual prominence described with reference to method 2200. The front surface of the first virtual object optionally corresponds to a range of positions and/or orientations where the user of the computer system optionally changes their current viewpoint to view portion(s) of the first virtual object, similar to as the user is able to move to positions and/or orientations around a physical object such as a physical car and/or a physical display (e.g., television) to see surface(s) of the physical object.

In some embodiments, in response to (and/or while) detecting the movement of the current viewpoint of the user from the first viewpoint to the third viewpoint (1650*b*), in accordance with a determination that the third angle is greater than a first threshold angle (e.g., 5, 10, 15, 20, 25, 30, 35, 40, 45, 50, 55, 60, 65, 70, or 75 degrees), the computer system displays (1650*c*) the first virtual object with the respective visual characteristic of the first content having a third value corresponding to a third level of visual prominence of the first content in the three-dimensional environment, for example, the level of visual prominence of object 1506*a* as shown in FIG. 15J, less than the first level of visual prominence. For example, the first threshold angle optionally corresponds to a threshold past which the computer system optionally decreases visual prominence of the first virtual object in accordance with further changes in current viewpoint exacerbating the off-angle view of the first virtual object (e.g., away from a normal from the first virtual object). Similarly, the computer system optionally establishes a threshold distance relative to the first content and/or the first virtual object (e.g., 0.001, 0.01, 0.025, 0.05, 0.1, 0.25, 0.5, 1, 2.5, 5, 10, 15, 25, 50, 100, 250, or 500 m), and when the current viewpoint changes to a respective distance past the threshold distance relative to the first virtual object, displays the respective visual characteristic of the first content with the third value (or a fourth, different value).

In some embodiments, in accordance with a determination that the third angle is less than the first threshold angle, the computer system maintains (1650*d*) display of the first virtual object with the respective visual characteristic of the first content having the first value corresponding to the first level of visual prominence of the first content in the three-dimensional environment, for example, the level of visual prominence of object 1506*a* as shown in FIG. 15I. For example, when the current viewpoint is less than the first threshold angle, the respective visual characteristic is maintained at its current level of visual prominence.

In some embodiments, (after detecting the movement of the current viewpoint of the user from the first viewpoint to the third viewpoint) while displaying, via the display generation component, the first virtual object in the three-dimensional environment from the third viewpoint, the computer system detects (1650*e*) movement of the current viewpoint of the user from the third viewpoint to a fourth viewpoint, wherein movement of the current viewpoint from the third viewpoint to the fourth viewpoint corresponds to transitioning from the first virtual object being visible from the third angle relative to a front surface of the first virtual object to being visible from a fourth angle (e.g., the same or similar to the first angle) relative to the front surface of the first virtual object, wherein the fourth angle is less than the third angle, such as shown by viewpoint 1526 back to as shown in FIG. 15I. For example, the fourth viewpoint optionally corresponds to movement back toward the first viewing angle, thereby optionally moving back to a viewing angle less than the first threshold angle but greater than a second threshold angle (e.g., a relatively lesser threshold angle than the first threshold angle to introduce a threshold with hysteresis when changing visual prominence).

In some embodiments, in response to (and/or while) detecting the movement of the current viewpoint of the user from the third viewpoint to the fourth viewpoint (1650*f*), in accordance with a determination that the fourth angle is less than a second threshold angle (e.g., less than the first threshold angle), the computer system displays the first virtual object with the respective visual characteristic of the first content having a fourth value corresponding to a fourth level of visual prominence of the first content in the three-dimensional environment, wherein the fourth level of visual prominence is greater than the third level of visual prominence (1650*g*).

In some embodiments, in accordance with a determination that the fourth angle is greater than the second threshold angle (but optionally less than the first threshold angle), the computer system maintains display of the first virtual object with the respective visual characteristic of the first content having the third value corresponding to the third level of visual prominence of the first content in the three-dimensional environment (1650*h*). For example, when the fourth angle is less than the second threshold angle, the computer system determines that the user input (e.g., movement of the current viewpoint) optionally corresponds to an express request to initiate increasing of the level of visual prominence of the first virtual object. Accordingly, the computer system optionally increases the respective visual characteristic to have the fourth value (e.g., increasing a brightness, saturation, and/or opacity) of the respective characteristic. In contrast, when the fourth angle is greater than the second threshold angle, the computer system determines that the user input optionally corresponds to an ambiguity concerning whether or not the user desires a change in the respective visual characteristic. Accordingly, the computer system optionally maintains the respective visual characteristic with the third value. Similar description is optionally applied to threshold distance(s) relative to the first virtual object and/or the first content. For example, the computer system optionally decreases visual prominence of the content when the current viewpoint moves away from the first virtual object at a first threshold distance, and does not increase visual prominence of the content when the current viewpoint moves past (e.g., closer to, and/or within) the first threshold distance until the current viewpoint moves to within a second, relatively lesser threshold distance. Providing one or more thresholds with hysteresis associated with changing the level of visual prominence of the respective content reduces the likelihood that the user inadvertently changes the level of visual prominence of the respective content, thereby preventing needless inputs to correct for such inadvertent changes in visual prominence and reducing power consumed to display such inadvertent changes.

In some embodiments, while displaying the first virtual object, the computer system detects (1652*a*), via the one or more input devices, an input (e.g., a user input or an interaction input) directed to the first virtual object, such as indicated by cursor 1528-1. The interaction input, for example, is optionally a selection of a virtual button included in the first virtual object, a scrolling of virtual content included in the first virtual object, a copying operation with reference to media (e.g., photos, video, and/or text) included in the first virtual object, and/or a modification of one or more dimensions of the first virtual object (e.g., scaling of the object). For example, the computer system optionally detects one or more inputs selecting the content included in the first virtual object such as an air gesture (e.g., an air pinch gesture including contact between an index finger and thumb of a hand of the user of the computer system, a splaying of fingers of the hand, and/or a curling of one or more fingers of the hand), a contact between a touch-sensitive surface included in and/or in communication with the computer system, and/or a blink performed by the user of the computer system toggling a selection of the content, optionally while a cursor is displayed corresponding to the respective content and/or attention of the user is directed to the respective content. While the air gesture (e.g., the contact between index finger and thumb), the contact, and/or the selection mode is maintained, the computer system optionally detects one or more movements of the user's body, a second computer system in communication with the computer system (e.g., a stylus and/or pointing device), and/or the contact between the touch-sensitive surface and a finger of the user, and moves the respective content to an updated (e.g., second position) position based on the movement. For example, the second position optionally is based on a magnitude of the movement and/or a direction of the movement.

In some embodiments, in response to detecting the interaction input (1652*b*) in accordance with a determination that the current viewpoint corresponds to the first viewpoint, the computer system performs (1652*c*) one or more operations associated with the first virtual object in accordance with the input. For example, the computer system optionally selects the virtual button, scrolls content, copies media, and/or scales the first virtual object when the current viewpoint is the first viewpoint (e.g., corresponds to a region of permitted interaction relative to the first virtual object).

In some embodiments, in accordance with a determination that the current viewpoint corresponds to the second viewpoint, the computer system forgoes (1652*d*) initiation of the one or more operations associated with the first virtual object in accordance with the input, such as one or more operations described with reference to virtual content 1509*a* not initiating a text entry mode in FIG. 15I. For example, when the second viewpoint is associated with a more limited range of interactions relative to the first virtual object, the computer system optionally forgoes one or more operations (e.g., does not select the button, scroll the content, copy the media, and/or scale the object). In some embodiments, a first set of operations is not performed in response to the interaction input when the current viewpoint corresponds to the second viewpoint that are performed when the interaction input is received while the current viewpoint corresponds to the first viewpoint. In some embodiments, a second set of operations are performed in response to the interaction input when the current viewpoint corresponds to the first viewpoint and the second viewpoint. Thus, the first virtual object is optionally responsive to some—but not all—inputs while the current viewpoint corresponds to the second viewpoint. Ignoring one or more inputs when the current viewpoint is the second viewpoint reduces the likelihood the user of the computer system erroneously interacts with content included in the first virtual object based on a suboptimal viewing position and/or orientation relative to the first virtual object that is outside of designated operating parameters for viewing positions and/or orientations.

In some embodiments, displaying the first virtual object with the second level of visual prominence includes displaying one or more virtual elements concurrently with the first virtual object (1654), such as an edge surrounding object 1506*a* in FIGS. 15I and/or 15J, (e.g., that were not visible and/or displayed while displaying the first virtual object with the first level of visual prominence). For example, the one or more virtual elements optionally includes one or more edges surrounding the first virtual object, a virtual shadow cast underneath the first virtual object based on one or more real-world and/or simulated light sources, and/or a pattern overlaying portion(s) of the first virtual object. Such one or more virtual elements are optionally concurrently displayed to present an abstracted form of the first virtual object. The abstracted form optionally includes displaying the first virtual object with a less saturated appearance (e.g., with less prominent or vibrant colors), displaying the first virtual object with a reduced level of visual prominence including additional virtual elements (e.g., a border that was not previously visible), and/or reducing an opacity of one or more portions of the first virtual object. Further description of such one or more virtual elements is made with reference to method 2200. Adding a virtual element(s) when displaying the first virtual object with the third level of visual prominence reinforces the level of visual prominence of the virtual object, thereby reducing the likelihood the user erroneously directs input to the virtual object based on mistaken assumptions about interactivity of the virtual object and indicating further inputs to modify (e.g., improve) interactivity of the virtual object.

In some embodiments, the one or more virtual elements include a virtual border surrounding the first virtual object having a third level of visual prominence (1656), such as an edge surrounding object 1506*a* in FIGS. 15I and/or 15J. For example, the virtual border has one or more characteristics of the border(s) and/or edge(s) described with reference to method 2200. Displaying the border optionally includes additionally displaying one or more portions of a solid or pattern fill surrounding dimensions of the first virtual object, for example, a white and/or slightly translucent line surrounding some or all of the first virtual object to indicate an outline of the first virtual object. In some embodiments, the virtual border and/or edge is not visible before the first virtual object has the third level of visual prominence. In some embodiments, the virtual border is visible before the first virtual object has the third level of visual prominence (e.g., while the first virtual object is displayed with the first and/or second levels of visual prominence), but at a lower level of visual prominence. Adding a border reinforces the level of visual prominence of a corresponding virtual object, thereby reducing the likelihood the user erroneously directs input to the virtual object based on mistaken assumptions about interactivity of the virtual object and indicating further inputs to modify (e.g., improve) interactivity of the virtual object.

In some embodiments, the one or more virtual elements include a fill pattern overlaid over the first virtual object (1658), such as object 1508*a* in FIG. 15I. For example, the fill pattern has one or more characteristics of the pattern(s) described with reference to method 2200. The fill pattern optionally is a solid color, and/or optionally has a pattern of one or more colors such as a plaid, a diagonally striped, and/or a dotted fill pattern. Modifying the fill pattern reinforces the level of visual prominence of a corresponding virtual object, thereby reducing the likelihood the user erroneously directs input to the virtual object based on mistaken assumptions about interactivity of the virtual object and indicating further inputs to modify (e.g., improve) interactivity of the virtual object.

In some embodiments, displaying the first virtual object with the first level of visual prominence includes displaying a virtual shadow associated with the first virtual object with a third level of visual prominence (1660*a*), such as virtual shadows 1536, 1358, and/or 1540 shown in FIG. 15I, and (for example, the virtual shadow has one or more characteristics of the virtual shadow(s) described with reference to method 2200) displaying the first virtual object with the second level of visual prominence includes displaying the virtual shadow associated with the first virtual object with a fourth level of visual prominence, less than the third level of visual prominence (1660*b*). For example, a saturation, brightness, and/or opacity of the virtual shadow is optionally modified in accordance with a respective level of visual prominence, described further with reference to method 2200. Modifying the level of visual prominence of a virtual shadow reinforces the level of visual prominence of a corresponding virtual object, thereby reducing the likelihood the user erroneously directs input to the virtual object based on mistaken assumptions about interactivity of the virtual object and indicating further inputs to modify (e.g., improve) interactivity of the virtual object.

It should be understood that the particular order in which the operations in method 1600 have been described is merely exemplary and is not intended to indicate that the described order is the only order in which the operations could be performed. One of ordinary skill in the art would recognize various ways to reorder the operations described herein.

FIGS. 17A-17E illustrate examples of a computer system changing the visual prominence of content included in virtual objects based on attention of a user of the computer system in accordance with some embodiments.

Figure 17A:
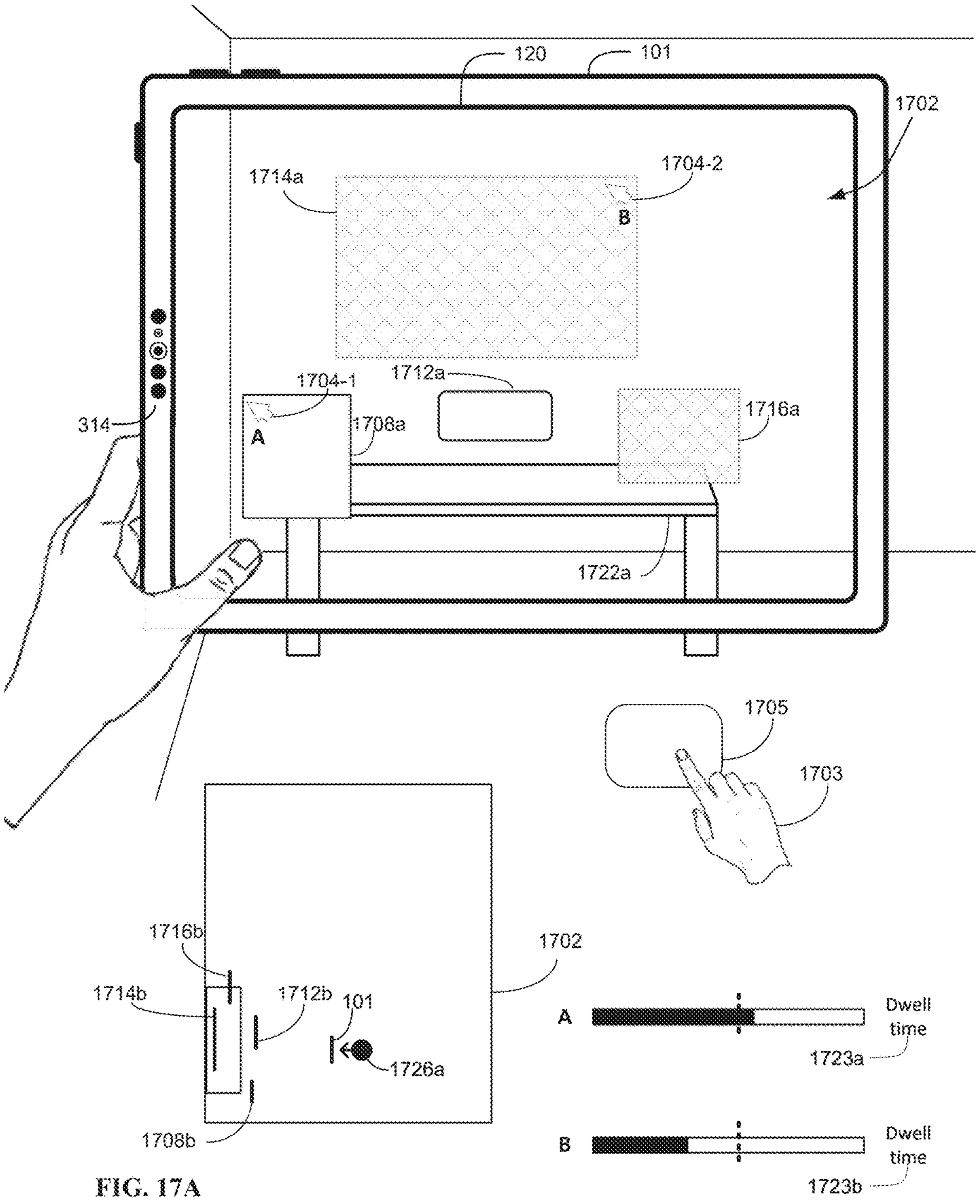
FIGS. 17A-17E illustrate examples of a computer system changing the visual prominence of content included in virtual objects based on attention of a user of the computer system in accordance with some embodiments.

FIG. 17A illustrates a three-dimensional environment 1702 visible via a display generation component (e.g., display generation component 120 of FIG. 1) of a computer system 101, the three-dimensional environment 1702 visible from a viewpoint 1726*a* of a user illustrated in the overhead view (e.g., facing the left wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the surface of the user).

As shown in FIG. 17A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1702 and/or the physical environment is visible in the three-dimensional environment 1702 via the display generation component 120. For example, three-dimensional environment 1702 visible via display generation component 120 includes representations of the physical floor and back and side walls of the room in which computer system 101 is located. Three-dimensional environment 1702 also includes table 1722*a* (corresponding to 1722*b* in the overhead view), which is visible via the display generation component 120 from the viewpoint 1726*a* in FIG. 17A.

In FIG. 17A, three-dimensional environment 1702 also includes virtual objects 1708*a* (corresponding to object 1708*b* in the overhead view), 1712*a* (corresponding to object 1712*b* in the overhead view), 1714*a* (corresponding to object 1714*b* in the overhead view), and 1716*a* (corresponding to object 1716*b* in the overhead view) that are visible from viewpoint 1726*a*. In FIG. 17A, objects 1708*a*, 1712*a*, 1714*a*, and 1716*a* are two-dimensional objects, but the examples of the disclosure optionally apply equally to three-dimensional objects. Virtual objects 1708*a*, 1712*a*, 1714*a*, and 1716*a* are optionally one or more of user interfaces of applications (e.g., messaging user interfaces and/or content browsing user interfaces), three-dimensional objects (e.g., virtual clocks, virtual balls, and/or virtual cars)

or any other element displayed by computer system 101 that is not included in the physical environment of computer system 101.

In some embodiments, computer system 101 modifies visual prominence of virtual content such as objects 1708*a*, 1712*a*, 1714*a*, and 1716*a* in response to detecting attention of a user of computer system 101 shift toward a respective object. Prior to as shown in FIG. 17A, computer system 101 optionally detects attention 1704-1 move toward object 1708*a*, and optionally detects attention 1704-1 dwell on object 1708*a* for a period of time 1723*a* greater than a threshold period of time (e.g., illustrated as the dashed line in time 1723*a*). In response to the dwelling of attention 1704-1 past the threshold period of time, computer system 101 optionally modifies a visual prominence of object 1708*a* (e.g., a size, a level of translucency, and/or one or more other visual characteristics described with reference to method 1800).

As referred to herein, visual prominence of virtual content optionally refers to display of one or more portions of the virtual content with one or more visual characteristics such that the virtual content is optionally distinct and/or visible relative to a three-dimensional as perceived by a user of the computer system. In some embodiments, visual prominence of virtual content has one or more characteristics described with reference to displaying virtual content at a level of immersion greater and/or less than an immersion threshold. For example, the computer system optionally displays respective virtual content with one or more visual characteristics having respective values, such as a virtual content that is displayed with a level of opacity and/or brightness. The level of opacity, for example, optionally is 0% opacity (e.g., corresponding to virtual content that is not visible and/or fully translucent), 100% opacity (e.g., corresponding to virtual content that is fully visible and/or not translucent), and/or other respective percentages of opacity corresponding to a discrete and/or continuous range of opacity levels between 0% and 100%. Reducing visual prominence of a portion of virtual content, for example, optionally includes decreasing an opacity of one or more portions of the portion of virtual content to 0% opacity or to an opacity value that is lower than a current opacity value. Increasing visual prominence of the portion of the virtual content, for example, optionally includes increasing an opacity of the one or more portions of the portion of virtual content to 100% or to an opacity value that is greater than a current opacity value. Similarly, reducing visual prominence of virtual content optionally includes decreasing a level of brightness (e.g., toward a fully dimmed visual appearance at a 0% level of brightness or another brightness value that is lower than a current brightness level), and increasing visual prominence of virtual content optionally includes increasing the level of brightness (e.g., toward a fully brightened visual appearance at a 100% level of brightness or another brightness value that is higher than a current brightness level) of one or more portions of the virtual content. It is understood that additional or alternative visual characteristics optionally are included in modification of visual prominence (e.g., saturation, where increased saturation increases visual prominence and decreased saturation decreases visual prominence; blur radius, where an increased blur radius decreases visual prominence and a decreased blur radius increases visual prominence; contrast, where an increased contrast value increases visual prominence and a decreased contrast value decreases visual prominence). Changing the visual prominence of an object can include changing multiple different visual properties (e.g., opacity, brightness, saturation, blur radius, and/or contrast). Additionally, when visual prominence of a first object is increased relative to visual prominence of a second object, the change in visual prominence could be generated by increasing the visual prominence of the first object, or decreasing the visual prominence of the second object, increasing the visual prominence of both objects with the first object increasing more than the second object, or decreasing the visual prominence of both objects with the first object decreasing less than the second object.

In some embodiments, if attention is directed to a virtual object for a period time that is less than a threshold period of time, computer system 101 does not modify visual prominence of the object. For example, attention 1704-2 is directed to object 1714*a* for a period of time 1723*b* that is less than the threshold period of time described with reference to time 1723A. As such, computer system 101 has not yet initiated modification of visual prominence of object 1714*a*.

Similarly, in some embodiments, computer system 101 reduces the visual prominence of objects that are not a target of the user's attention. For example, object 1716*a* is displayed and the user is not directing their attention toward object 1716*a*. As such, the visual prominence of object 1716*a* optionally is similar or the same to object 1714*a*, because computer system optionally treats objects that are not targets of the user's attention similar to objects that are targets of the user's attention, but have yet to satisfy one or more criteria (e.g., a time-based criterion). In some embodiments, the unmodified visual prominence of a respective virtual object corresponds to a relatively reduced level of visual prominence. For example, objects 1714*a* and 1716*a* are optionally displayed with a level of translucency, such as 80% translucency, such that the user's focus is not erroneously directed to objects 1714*a* and/or 1716*a*. Additionally or alternatively, a potential rationale for displaying the objects with a reduced level of translucency optionally is that respective virtual content included in the respective objects optionally is of lesser interest to a user of the computer system, and/or does not include information that the user necessarily desires to view at all times.

In contrast, in some embodiments, objects that are not target of the user's attention are displayed with a relatively high level of visual prominence that optionally are interest of the user while their attention is directed away from the object. For example, object 1712*a* optionally corresponds to a first type of virtual object that indicates and/or controls one or more characteristics of an operating system of the computer system. For example, the one or more characteristics optionally include a battery level of the computer system and/or one or more devices in communication with the computer system, notifications from respective application (s) stored in memory of the computer system, and/or one or more controls to modify characteristics of the computer system, such as a brightness of displayed virtual content, a toggle for wireless communication protocols (e.g., WiFi, or Bluetooth), and/or a notification suppression mode of computer system 101. Information concerning such one or more characteristics optionally are helpful to inform the user as to a state of the computer system 101, and thus optionally is displayed with a relatively higher level of visual prominence. In some embodiments, object 1712*a* maintains its respective visual prominence even if attention shifts to object 1712*a* (e.g., attention is not directed to object 1712*a*). For example, computer system 101 optionally detects attention of the user shift to object 1712*a* and dwell on object 1712*a* for an amount of time that would otherwise modify visual prominence (e.g., attention 1704-1 directed to object 1708*a*), but optionally forgoes an increase of visual prominence of object 1712*a* at least because object 1712*a* is already visually prominent.

Although illustrated as graphical objects similar to cursors of a computing mouse coupled to a personal computer, it is understood that attention indicators 1704-1, 1704-2, and other attention indicators described further below optionally correspond to indications of attention of the user, such as gaze-based indications of attention. Additionally or alternatively, computer system optionally determines attention of the user based on contact and/or movement of hand 1703 on trackpad 1705. For example, attention 1704-1 and 1704-2 optionally correspond to a displayed position of a cursor based on a position and/or movement of hand 1703 on the surface of trackpad 1705. In some embodiments, attention indicators 1704-1 and/or 1704-2 are not displayed in the three-dimensional environment 1702.

Figure 17B:
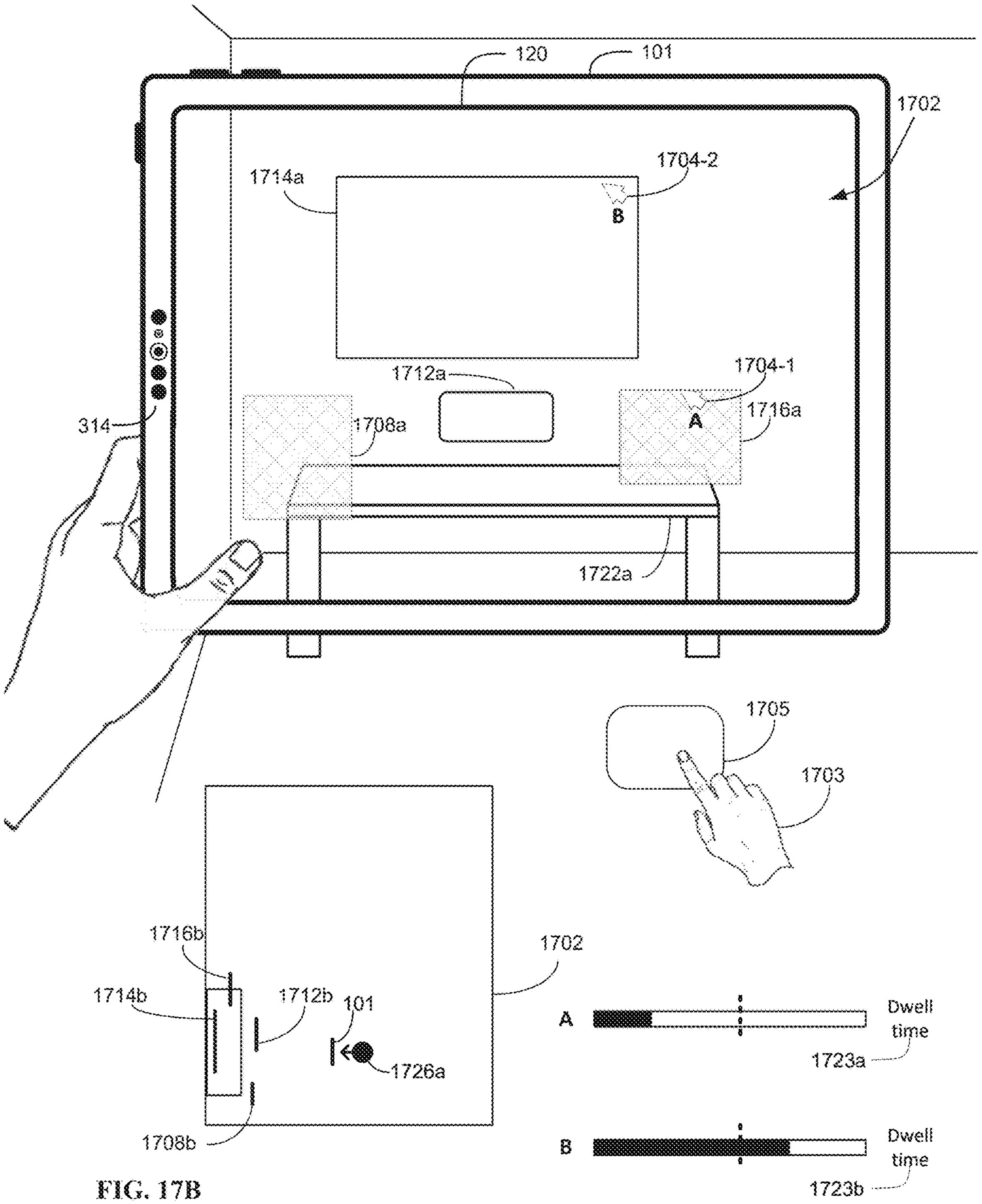

In FIG. 17B, computer system 101 detects attention of the user shift to respective objects that were not previously targets of the user's attention, and accordingly modifies visual prominence of those objects in environment 1702. For example, computer system 101 optionally determines attention 1704-2 has dwelled on object 1714*a* longer than the threshold amount of time, and optionally increases visual prominence of object 1714*a* to a similar or the same level of visual prominence of object 1708*a* as shown in FIG. 17A. Thus, in some embodiments, computer system 101 displays respective virtual objects with a level of visual prominence that is applied to any respective virtual object that is a target of the user's attention (e.g., for a period of time greater than the threshold period of time). In some embodiments, computer system 101 detects that attention 1704-1 shown in FIG. 17A is no longer directed to object 1708*a*, and accordingly reduces visual prominence of object 1708*a*. For example, attention 1704-1 is now directed to object 1716*a*, and despite time 1723*a* not reaching the threshold amount of time required to increase visual prominence of object 1716*a*, computer system 101 decreases visual prominence of object 1708*a*. Thus, in some embodiments, computer system 101 decreases visual prominence of a respective virtual object in response to detecting attention of the user shift away from a respective virtual object.

In some embodiments, the reducing in visual prominence of object 1704-1 does not occur until computer system 101 increases visual prominence of another respective object. For example, while object 1708*a* optionally is displayed with a relatively increased level of visual prominence as shown in FIG. 17A, attention of the user optionally shifts to object 1714*a*, and computer system 101 optionally detects the attention of the user dwell on object 1714*a* for an amount of time greater than the threshold amount of time. In response to detecting the dwelling of attention on object 1714*a* past the threshold amount of time, computer system 101 optionally decreases the visual prominence of object 1704*a*, and optionally increases the visual prominence of object 1714*a*. Thus, in some embodiments, computer system 101 only displays first respective virtual objects with a relatively increased visual prominence if the attention of the user is directed to the first respective virtual objects (e.g., for an amount of time greater than a threshold amount of time), and in response to increasing visual prominence of the first respective virtual objects, computer system 101 displays second respective objects that are not targets of the user's attention with a relatively reduced visual prominence. In some embodiments, if attention of the user moves from a first location corresponding to a first respective portion of a respective object to a second location corresponding to a second respective portion of the same respective object, computer system 101 optionally forgoes any modification of visual prominence of the respective virtual object, as described further with reference to method 1800.

Figure 17C:
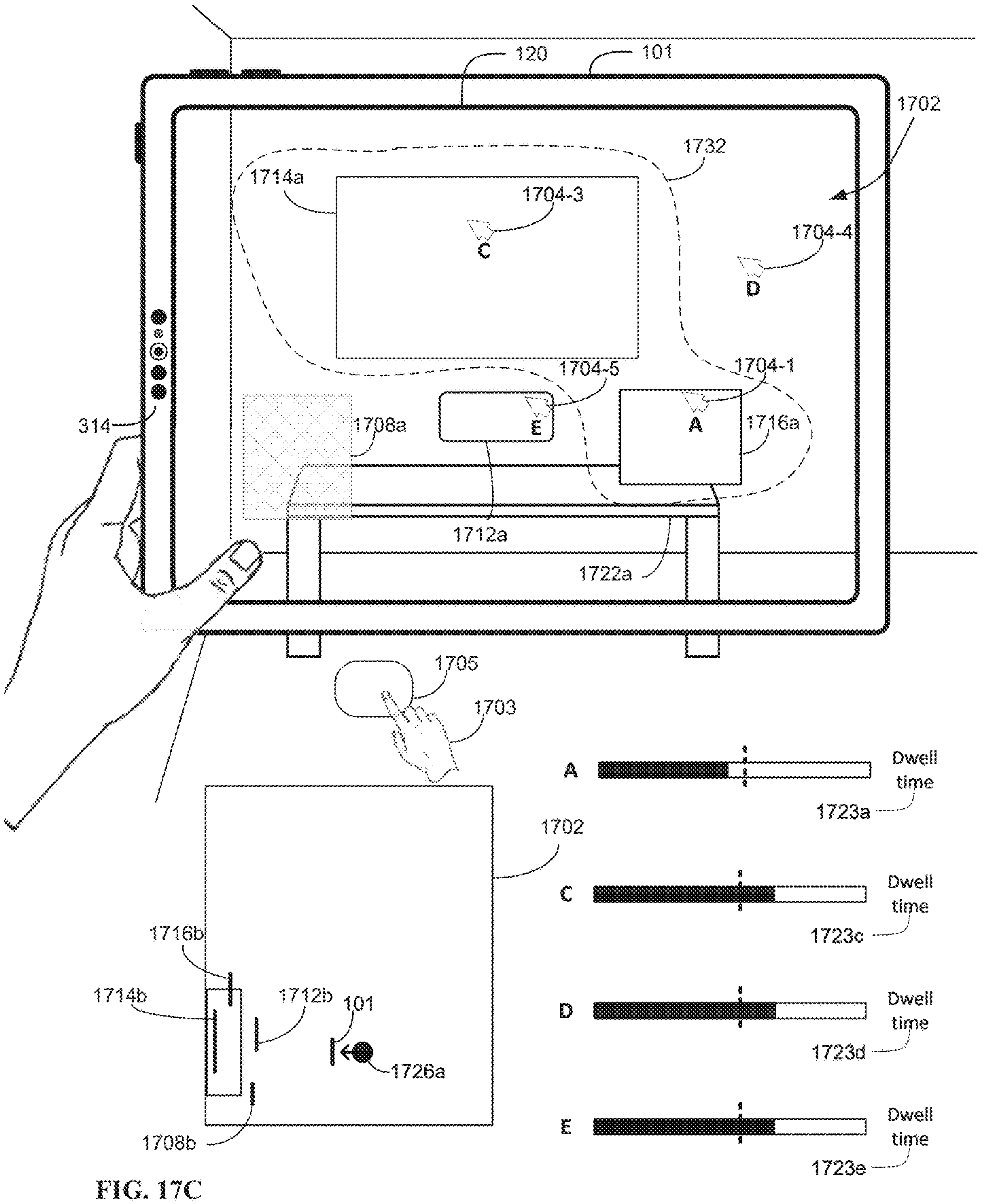

FIG. 17C illustrates examples of shifts of user attention to respective locations in three-dimensional environment 1702 and modifications of visual prominence of objects based on such shifts in attention. In some embodiments, computer system 101 detects an input to modify visual prominence of an object without detecting waiting for attention of the user to dwell on the object for an amount of time greater than the time threshold described with reference to FIG. 17B. For example, from FIG. 17B to FIG. 17C, while attention 1704-1 optionally remains directed to object 1716*a*, computer system 101 optionally detects an input such as an air pinch gesture performed by hand 1703, and in response to the input, increases the visual prominence of object 1716*a*. Thus, despite the fact that attention 1704-1 optionally has not yet remained directed toward object 1716*a* for a period of time greater than the time threshold, computer system 101 optionally increases the visual prominence of object 1716*a* due to an express input to increase the visual prominence. In some embodiments, the increase in visual prominence in response to the input is the same, or nearly the same as if computer system 101 had detected attention 1704-1 remain directed toward object 1716*a* for an amount of time greater than the threshold amount of time.

In some embodiments, computer system 101 modifies and/or forgoes modification of visual prominence of a grouping of respective objects. For example, computer system optionally recognizes grouping 1732 includes object 1714*a* and object 1716*a*, and optionally modifies visual prominence of one or both objects if computer system 101 detects an input to modify visual prominence of a respective object within the grouping. Grouping 1732 optionally corresponds to a plurality of objects that are related, such as multiple objects corresponding to a shared text document, optionally corresponds to a group that optionally was defined by the user of the computer system, and/or has another associated relating the plurality of objects. In some embodiments, computer system 101 modifies visual prominence of the plurality of objects together, in manner similar to as described with respect to individual objects. For example, in response to optionally detecting attention of the user shift toward a respective object (e.g., object 1714*a*) included in grouping 1732, computer system 101 optionally displays the plurality of objects (e.g., objects 1714*a* and 1716*a*) with an increased level of visual prominence. Similarly, in response to optionally detecting attention of the user shift away from a respective object in the plurality of objects, computer system 101 optionally decreases the level of visual prominence of the plurality of objects. Thus, if computer system 101 detects attention of the user shift toward a first object (e.g., object 1716*a*) of grouping 1732 while a second object (e.g., object 1714*a*) is displayed with a relatively increased degree of visual prominence, computer system 101 optionally forgoes modification of visual prominence of the second object (e.g., forgoes decreasing the displayed visual prominence) because user attention is merely shifting within the grouping 1732 of objects. As described previously, computer system 101 optionally modifies a first visual prominence of object 1716*a* optionally in response to an input (e.g., an air pinch gesture) to initiate such a modification in visual prominence. Additionally, in response to the input to modify visual prominence of object 1716*a*, computer system 101 optionally also modifies visual prominence of object 1714*a*. Similarly, in some embodiments, in response to determining that attention is not directed to object 1714*a* or to object 1716*a*, computer system 101 optionally reduces visual prominence of both objects, optionally simultaneously.

In some embodiments, computer system 101 detects attention of the user shift to a respective location in three-dimensional environment 1702 and maintains visual prominence of respective objects in three-dimensional environment 1702. For example, attention 1704-4 optionally corresponds to a respective location in three-dimensional environment 1702 that does not correspond to virtual objects and/or content. In response to the shift in attention 1704-4 to the respective location not corresponding to virtual objects, computer system 101 optionally maintains respective visual prominence of one or more objects in the three-dimensional environment. For example, if object 1716*a* is displayed with a relatively increased level of visual prominence before attention shifts to the respective location shown by attention 1704-4, computer system optionally maintains the display of object 1716*a* with the relatively increased level of visual prominence, even if attention 1704-4 is maintained at the respective location for an amount of time 1723*d* greater than the threshold amount of time.

In some embodiments, computer system 101 maintains visual prominence of one or more virtual objects in response to attention shifting toward a respective virtual object of a particular type. For example, a first type of virtual object 1712*a* optionally is a non-interactable type of object, a control user interface type of virtual object, or another type of virtual object described in further detail with reference to method 1800. For example, object 1712*a* optionally is an indication of a level of battery of computer system 101. In some embodiments, in response to detecting attention of the user to shift to an object of the first type, computer system 101 forgoes modification of visual prominence of another object that has a relatively increased visual prominence. For example, if object 1716*a* and/or object 1714*a* are displayed with a relatively increased level of visual prominence as described previously, and attention of the user shifts toward object 1712*a*—as indicated by attention 1704-5—computer system 101 optionally maintains the visual prominence of object 1716*a* and/or object 1714*a*, even if attention 1704-5 is directed to object 1712*a* for a time 1723*e* that is greater than a threshold amount of time that would otherwise be optionally interpreted as a request to increase a visual prominence of object 1712*a* (e.g., if object 1712*a* were a second type of virtual object such as a user interface of an application that is different from the first type). Thus, in some embodiments, computer system 101 maintains visual prominence of respective virtual objects despite shifts in attention away from a respective virtual object.

Figure 17D:
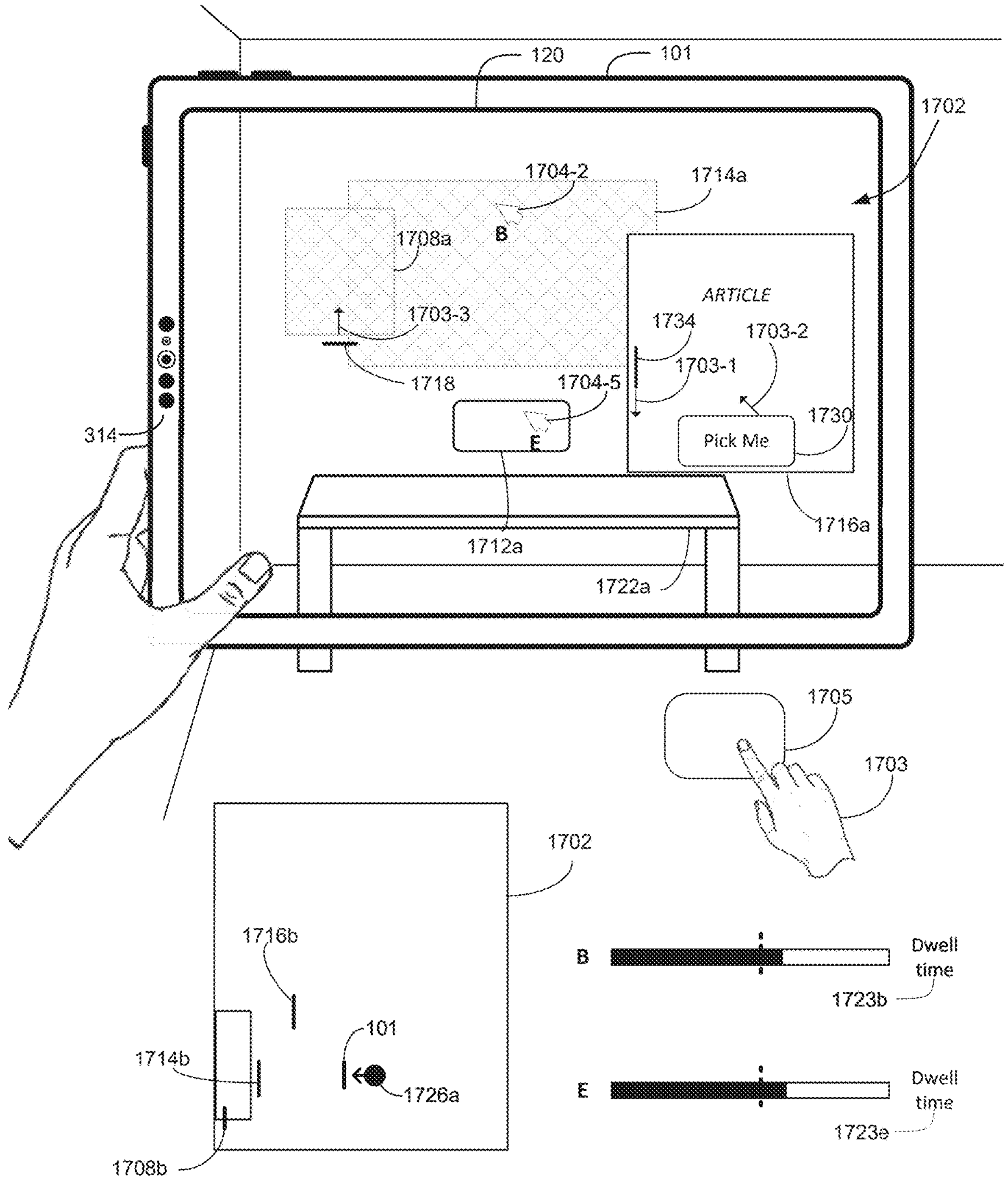

FIG. 17D illustrates examples of maintaining visual prominence of objects due to a current interaction with the object. In response to detecting attention 1704-2 shift toward, and dwell upon object 1714*a* for a period of time 1732*b* greater than a threshold amount of time, computer system 101 optionally increases a visual prominence of object 1714*a* and optionally decreases visual prominence of a respective virtual object other than object 1714*a* that is optionally currently displayed with a relatively increased degree of visual prominence. In some embodiments, however, if computer system 101 detects that a user of computer system 101 is currently interacting with respective virtual content included in the respective virtual object and/or with the respective virtual object itself when the period of time 1723*b* surpasses the threshold, the computer system 101 optionally forgoes modification of visual prominence of the object 1714*a* and/or of the respective virtual object with which the user is currently interacting.

For example, in FIG. 17D, computer system 101 detects ongoing input directed toward respective content within object 1716*a* when time 1723*b* surpasses the threshold amount of time of attention 1704-2 being directed to object 1714*a*, and optionally forgoes the modification of visual prominence of object 1714*a* and/or 1716*a* as described previously. Such input is described in further detail with reference to method 1800, but as shown includes a contact of hand 1703 with trackpad 1705 and movement of hand 1703 moving the contact. The input, for example, corresponds to a selection and movement of a visual element 1734 (e.g., a scrollbar) that optionally scrolls respective content in object 1716*a*, such as a scrollbar of a web browsing application. If computer system 101 detects scrolling movement 1703-1 is ongoing when time 1723*b* surpasses the threshold, computer system 101 optionally forgoes reducing visual prominence of object 1716*a* that would otherwise be performed were it not for the ongoing scrolling operation. Similarly, content 1730 included in object 1716*a* optionally is a target of a "drag and drop" operation performed by hand 1703 and trackpad 1705, similar to as a described with reference to the scrolling operation. For example, computer system 101 optionally detects a selection input (e.g., a contact of hand 1703 on trackpad 1705) while a cursor is directed to content 1730, and while the selection is maintained (e.g., the contact of hand 1703 is maintained), computer system 101 optionally moves content 1730 within object 1716*a* as shown by movement 1703-2 based on the movement of the selection input. In some embodiments, because computer system 101 detects that the drag and drop operation is ongoing when time 1723*b* surpasses the threshold amount of time, computer system 101 optionally forgoes the modification of visual prominence of object 1716*a*, similarly to as described previously.

In some embodiments, computer system 101 detects input directed to a visual element that is selectable to move a first virtual object, and in response to the input, forgoes modification of visual prominence of a second virtual object that is currently displayed with a relatively increased visual prominence. For example, the visual element 1718 optionally is a user interface element (e.g., a "grabber bar") that is displayed by the computer system 101 in association with (e.g., below and/or adjacent to) object 1708*a*—that is currently displayed with a relatively decreased level of visual prominence—to indicate that the object 1708*a* is movable in the three-dimensional environment 1702. In response to a selection and subsequent movement of the grabber bar (similar to other selection and movements previously described), computer system 101 optionally causes movement of object 1708*a* in the three-dimensional environment in accordance with the movement input. In some embodiments, computer system 101 detects an input (e.g., attention of the user shifting toward visual element 1718 and concurrent selection from a hand of the user such as an air pinch gesture) directed toward visual element 1718 while an object other than object 1708*a* is displayed with a relatively increased visual prominence. For example, while object 1716*a* is displayed with a relatively increased level of visual prominence, computer system 101 optionally detects the input directed toward visual element 1718, and in response to the input optionally maintains the relatively increased level of visual prominence of object 1716*a*. Further, computer system 101 optionally maintains a relatively reduced level of visual prominence of object 1708*a*, because in some embodiments, computer system 101 forgoes changing (e.g., increasing) visual prominence of a respective virtual object in accordance with a determination that the user is interacting with a respective grabber bar associated with the respective virtual object rather than the respective virtual object itself. Thus, in some embodiments, interactions with respective visual element(s) associated with respective virtual objects do not cause a modification of visual prominence of another respective virtual object that is currently displayed with a relatively increased degree of visual prominence.

In some embodiments, computer system 101 detects a second input that is similar or the same as the input directed to visual element 1718, but is instead directed to object 1708*a*, and increases visual prominence of object 1708*a* and decreases visual prominence of object 1716*a* in response to the second input. Such a second input optionally has one or more characteristics described with reference to FIG. 17C (but with respect to increasing visual prominence of object 1708*a*, instead of object 1716*a* as shown in FIG. 17C), in which computer system 101 detects an input such as an air pinch gesture performed by hand 1703, and in response to the input, optionally increases the visual prominence of object 1716*a* and/or decreases visual prominence of respective one or more virtual objects that are optionally not a target of the input. Thus, in some embodiments, computer system 101 modifies or forgoes modification of visual prominence of a respective virtual object in accordance with a determination that a target of an input associated with the respective virtual object is the virtual object itself or is the grabber bar associated with the virtual object. In some embodiments, computer system 101 detects that attention 1704-5 is directed to an object 1712*a*, and dwelled upon object 1712*a* for a time 1723*e* greater than a threshold amount of time.

Figure 17E:
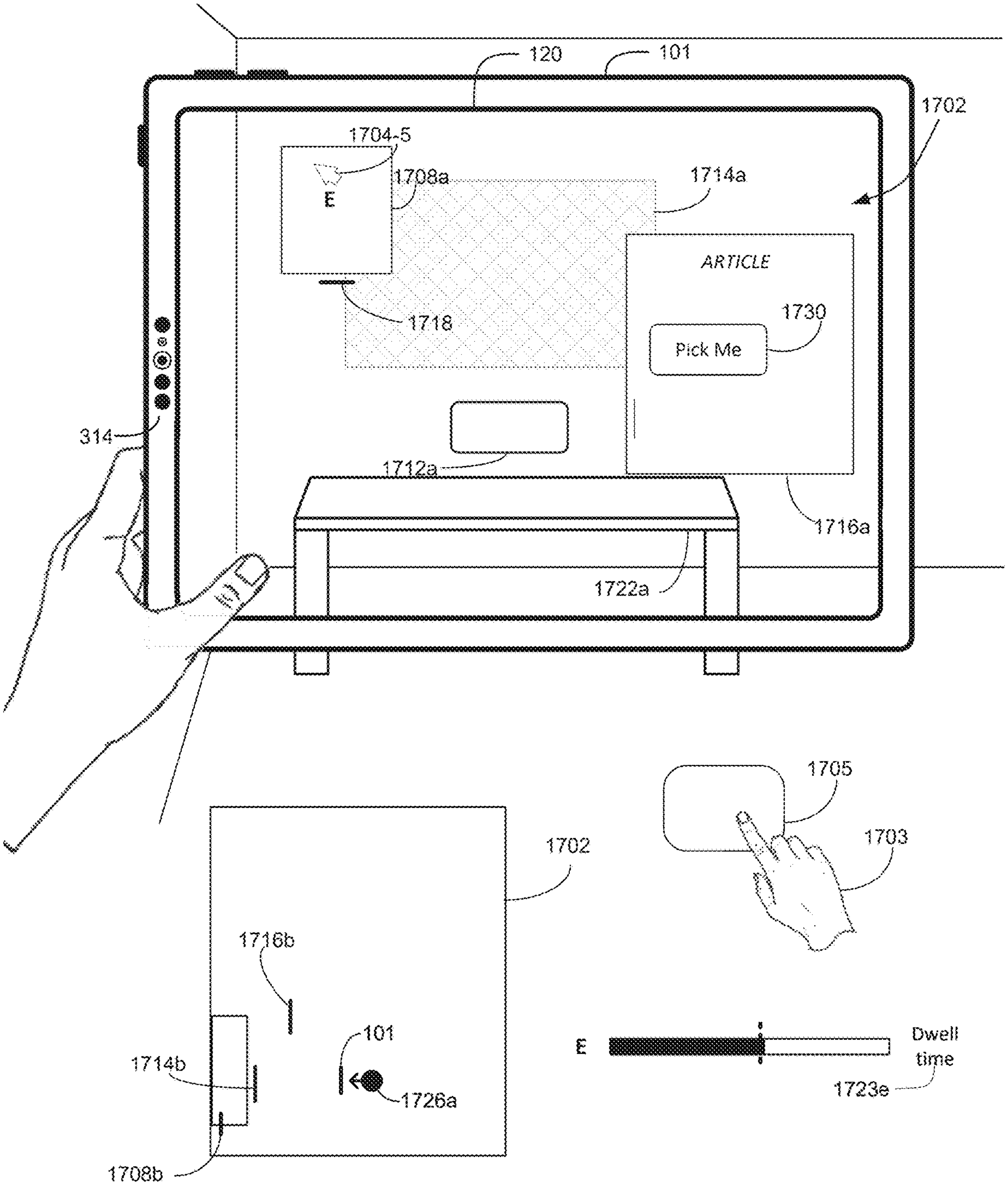
Figure 18A:
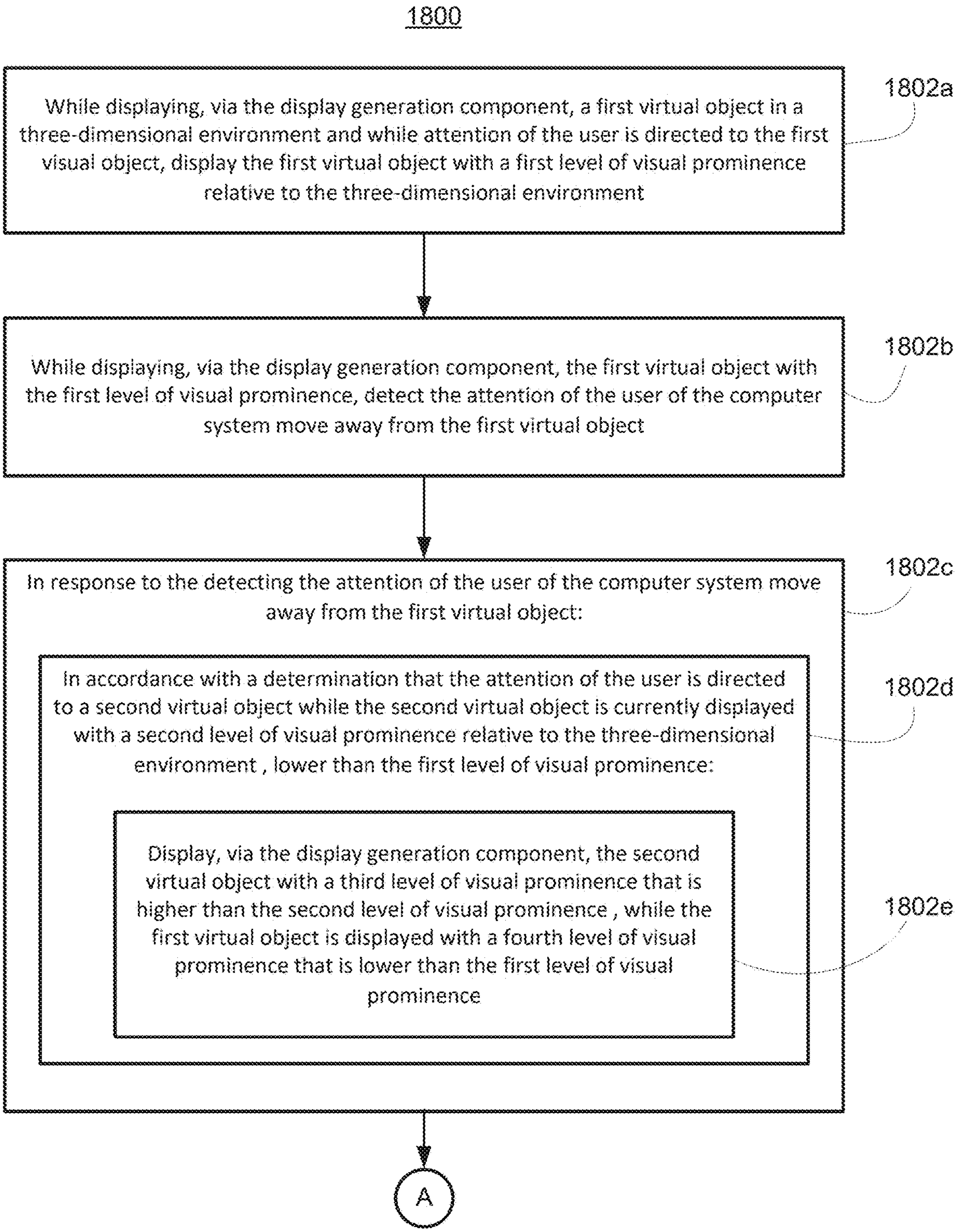
Figure 18B:
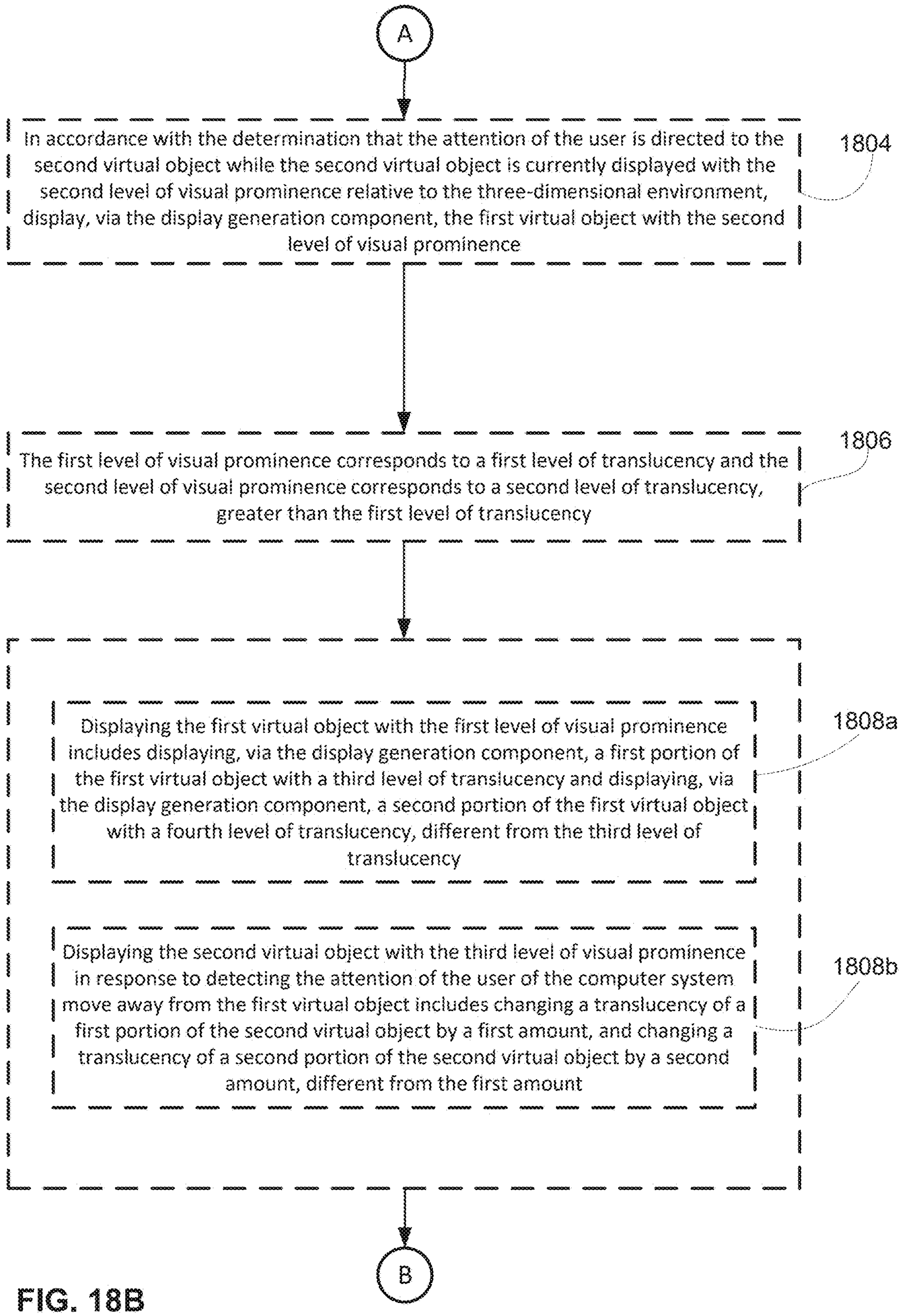
Figure 18C:
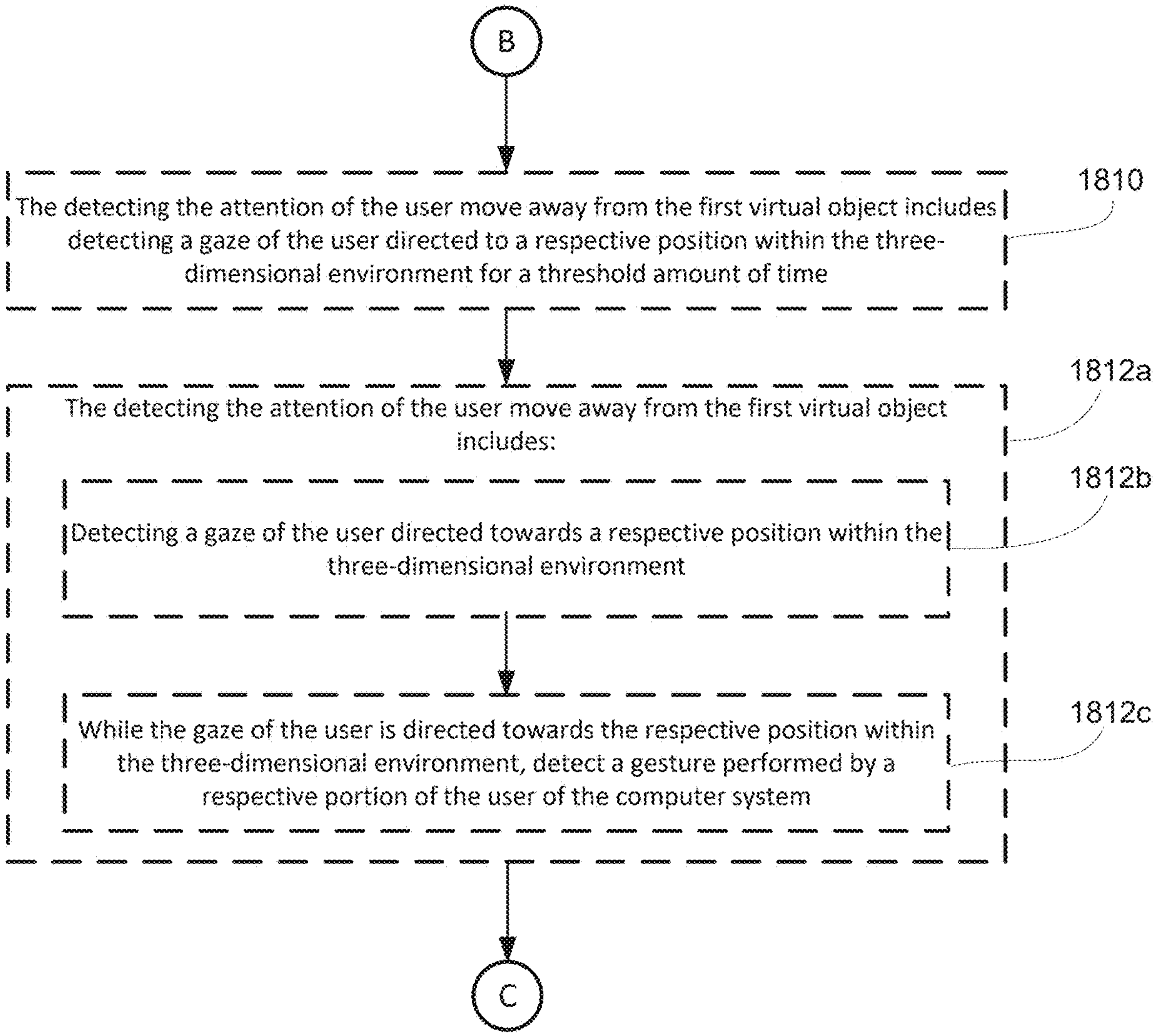
Figure 18D:
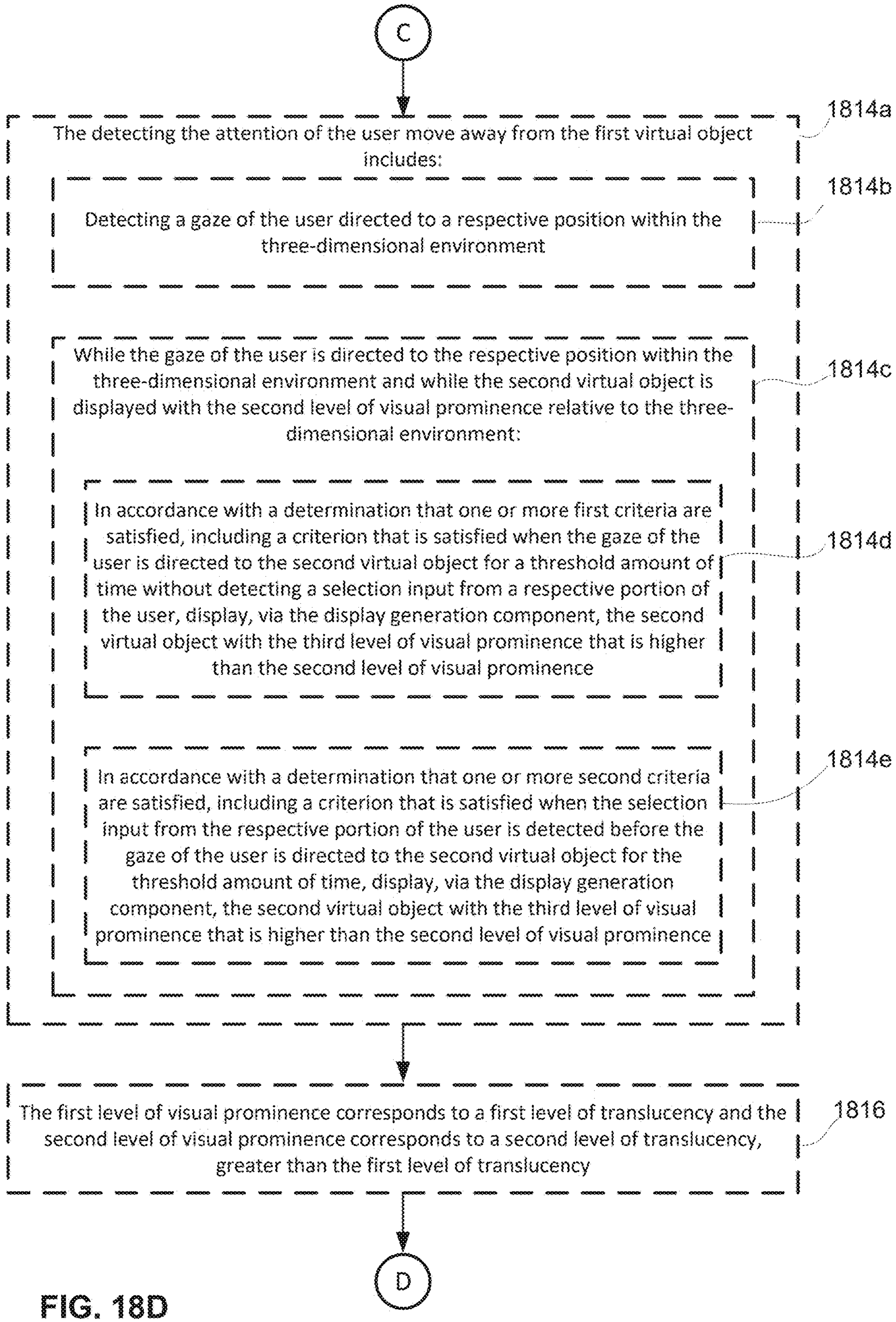
Figure 18E:
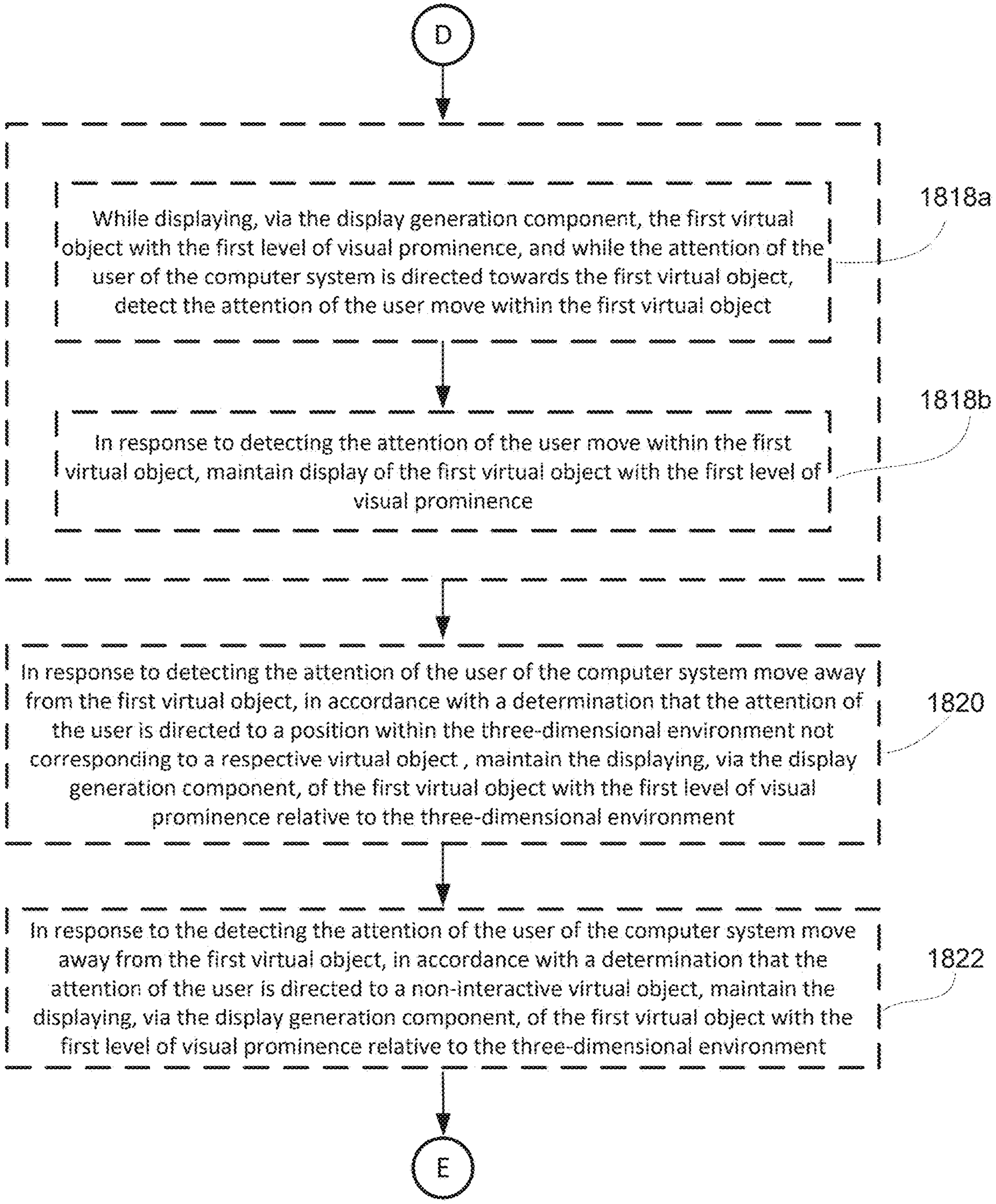
Figure 18F:
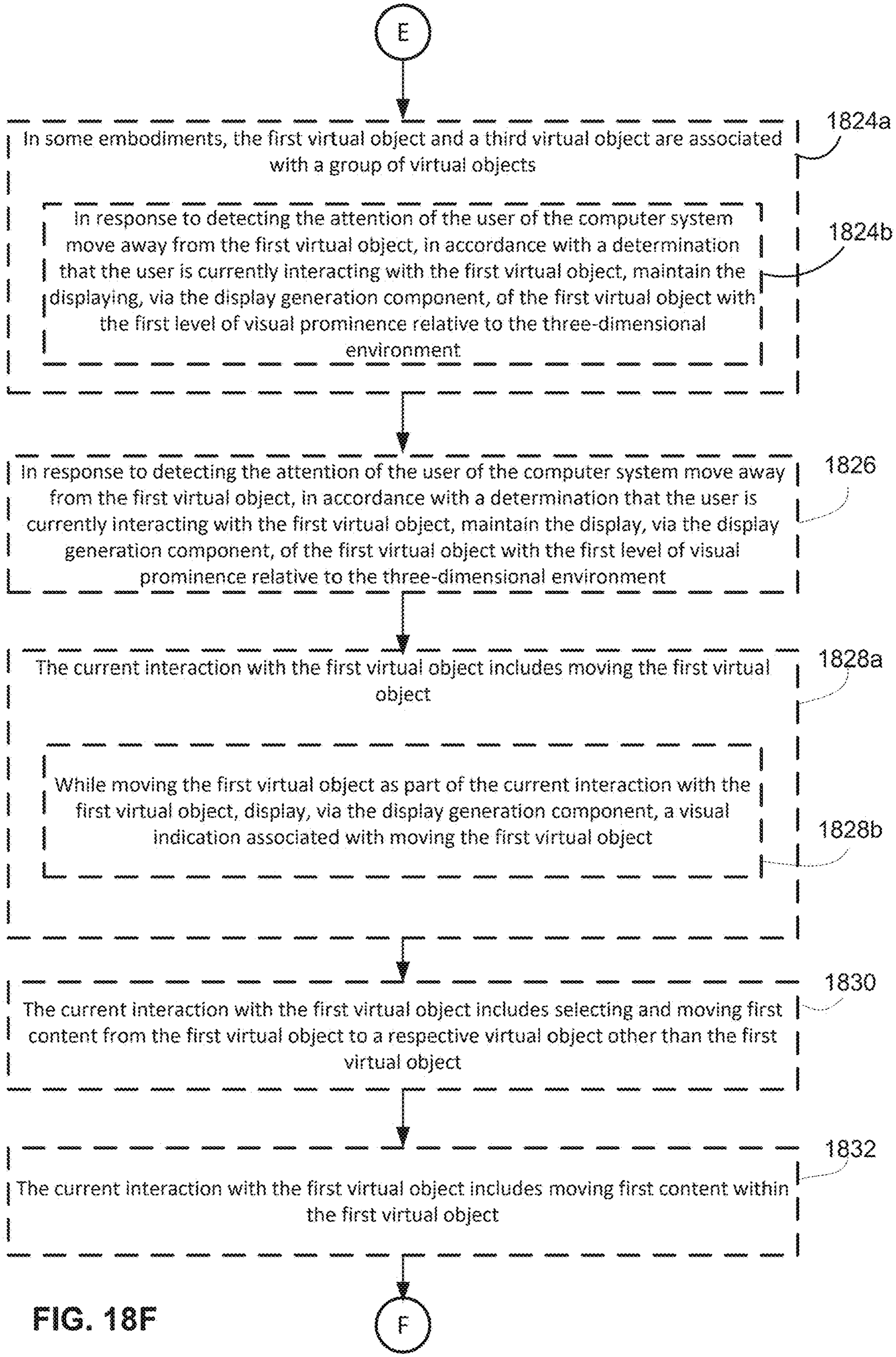
Figure 18G:
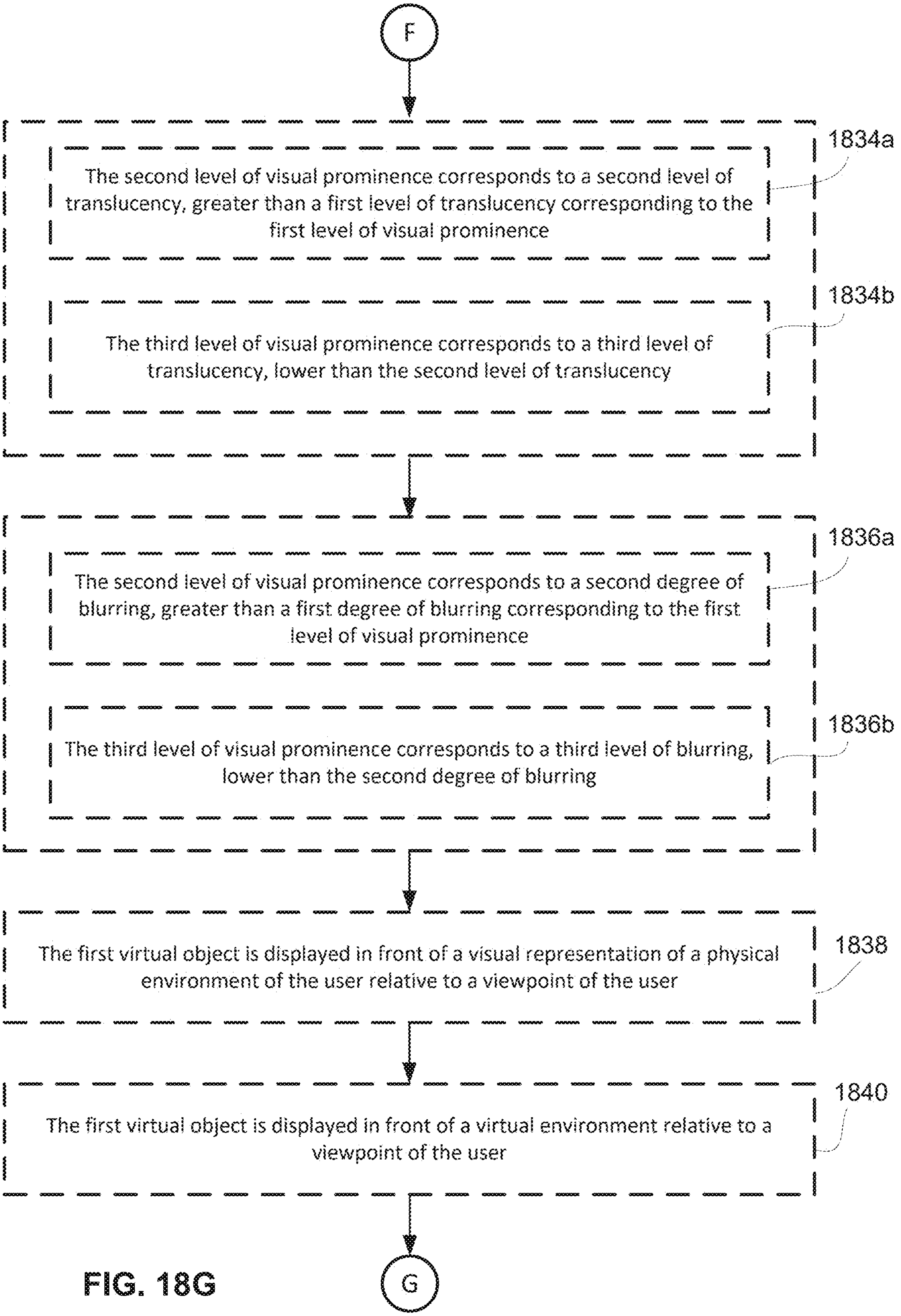
Figure 18H:
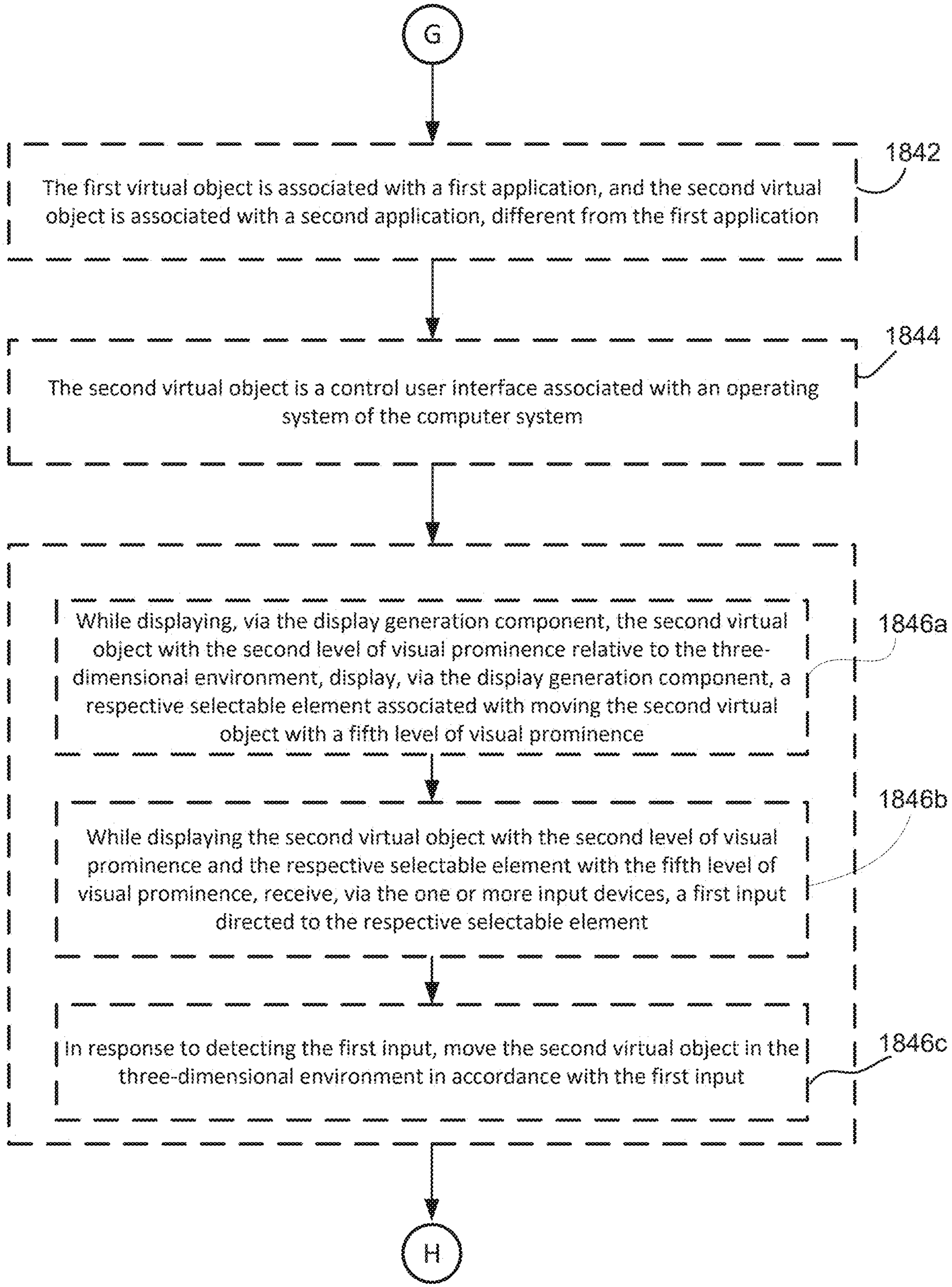
Figure 18J:
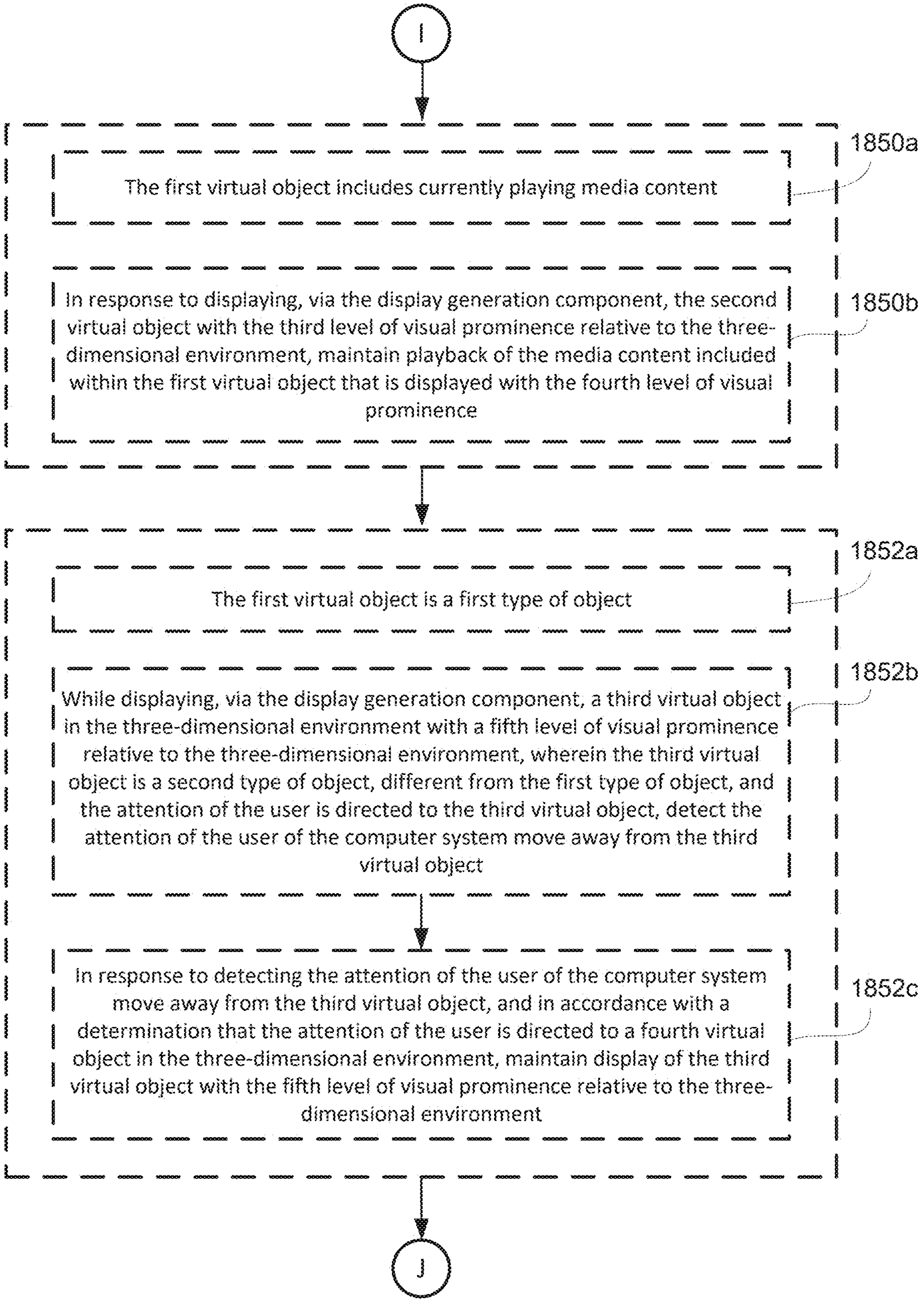
Figure 18K:
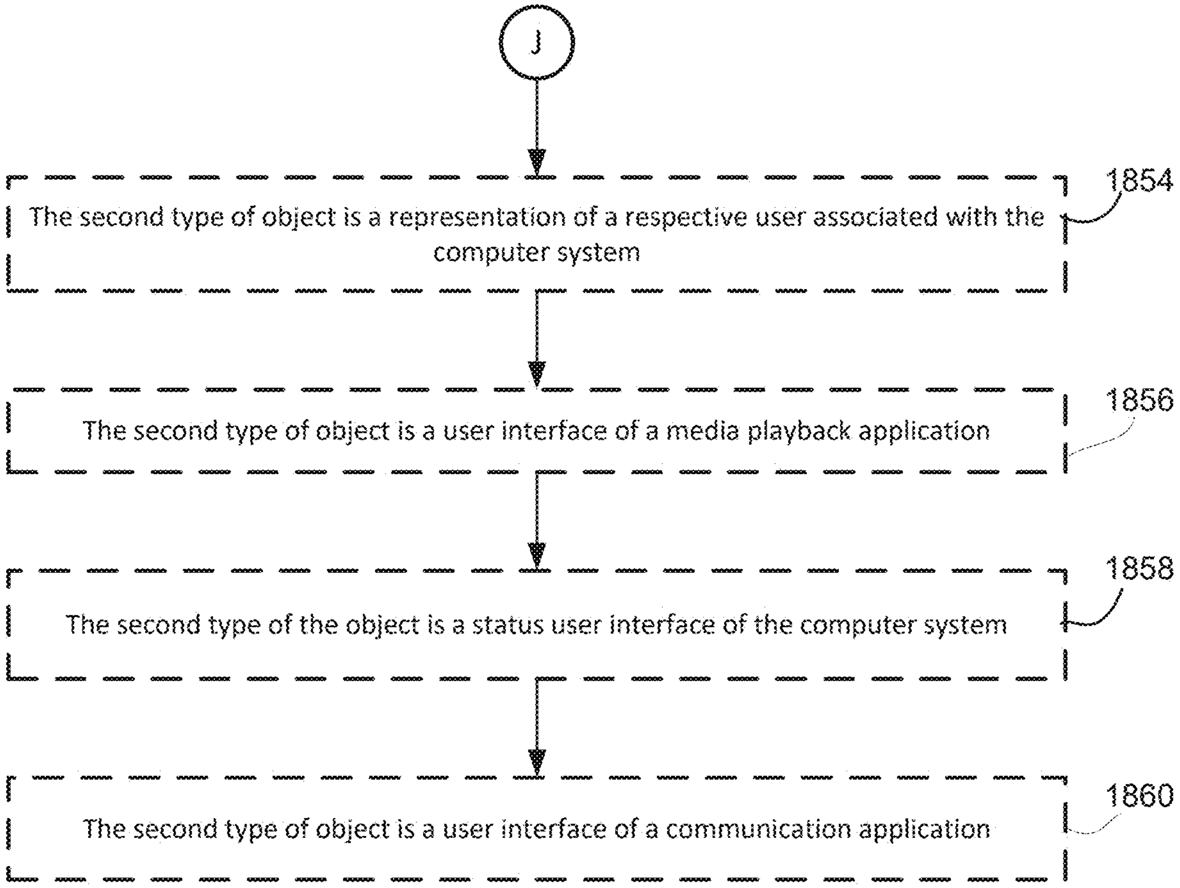

In FIG. 17E, computer system 101 detects attention 1704-5 shift away from object 1712*a*, but does not decrease visual prominence of object 1712*a*. In some embodiments, object 1712*a* is a first type of object, such as a system or control user interface, an avatar of a user of another computer system, a media player, and/or a communication application (e.g., email, messaging, and/or real-time communication including video). In some embodiments, computer system 101 maintains respective visual prominence of such a first type of object because such first types of objects are of potential interest to the user, regardless of a target of their attention. For example, a user of computer system 101 optionally desires full view of media they are watching and/or a real-time video conferencing application with which they are participating. As such, whether computer system 101 detects shifts in attention of the user toward object 1712*a*, away from object 1712*a*, and/or dwelling of attention 1704-5 for a time 1723*e* greater than a threshold amount of time, computer system 101 optionally maintains respective visual prominence of object 1712*a*.

FIGS. 18A-18K is a flowchart illustrating a method 1800 of modifying visual prominence of virtual objects based on attention of a user in accordance with some embodiments. In some embodiments, the method 1800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 1800 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1800 are, optionally, combined and/or the order of some operations is, optionally, changed.

In some embodiments, the method 1800 is performed at a computer system in communication with a display generation component and one or more input devices. In some embodiments, the computer system has one or more of the characteristics of the computer systems of methods 800, 1000, 1200, 1400 and/or 1600. In some embodiments, the display generation component has one or more of the characteristics of the display generation components of methods 800, 1000, 1200, 1400 and/or 1600. In some embodiments, the one or more input devices have one or more of the characteristics of the one or more input devices of methods 800, 1000, 1200, 1400 and/or 1600.

In some embodiments, while displaying, via the display generation component, a first virtual object, such as object 1708*a* as shown in FIG. 17A, in a three-dimensional environment and while attention of the user, such as attention 1704-1, is directed to the first visual object, the computer system displays (1802*a*) the first virtual object with a first level of visual prominence relative to the three-dimensional environment, such as the visual prominence of object 1708*a* in FIG. 17A. For example, the first virtual object optionally is a window or other user interface corresponding to one or more applications presented in a three-dimensional environment, such as a mixed-reality (XR), virtual reality (VR), augmented reality (AR), or real-world environment visible via visual passthrough (e.g., lens and/or camera). In some embodiments, the first virtual object has one or more of the characteristics of the three-dimensional environments of methods 800, 1000, 1200, 1400, 1600 and/or 2000. In some embodiments, the three-dimensional environment has one or more of the characteristics of the three-dimensional environments of methods 800, 1000, 1200, 1400, 1600 and/or 2000. In some embodiments, the first virtual environment is a simulated three-dimensional environment that is displayed in the three-dimensional environment, optionally instead of the representations of the physical environment (e.g., full immersion) or optionally concurrently with the representation of the physical environment (e.g., partial immersion). Some examples of a virtual environment include a lake environment, a mountain environment, a sunset scene, a sunrise scene, a nighttime environment, a grassland environment, and/or a concert scene. In some embodiments, a virtual environment is based on a real physical location, such as a museum, and/or an aquarium. In some embodiments, a virtual environment is an artist-designed location. Thus, displaying a virtual environment in the three-dimensional environment optionally provides the user with a virtual experience as if the user is physically located in the virtual environment. In some embodiments, the first virtual object is a user interface of an application, such as a media (e.g., video and/or audio and/or image) browsing and/or playback application, a web browser application, an email application or a messaging application. In some embodiments, one or more eye-tracking sensors in communication with and/or included in the computer system are configured to determine and monitor indications of user attention as described in this disclosure. In some embodiments, the first virtual object is an avatar representing a user of a second computer system or other device in communication with the computer system (e.g., while the computer system and the second computer system are in a communication session in which at least some or all of the three-dimensional environment is shared between the computer system and the second computer system), a representation of a virtual object (e.g., a three-dimensional model of an object such as a car, a tent, or a ball), a representation of a character, an animated and/or inanimate object, or an interactable visual element (e.g., a visual element that is selectable to initiate a corresponding operation, such as a selectable button). In response to a determination that the user's attention is directed to the first virtual object, the computer system optionally displays the first virtual object with a first visual appearance, optionally including the first level of visual prominence and/or emphasis to indicate the user's attention is directed to the first virtual object. Such first visual prominence optionally includes display of a border and/or outline surrounding the first virtual object, optionally includes displaying the first virtual object with a particular visual characteristic (e.g., displays with a first level of translucency, a first level of brightness, a first color saturation, and/or a first glowing effect), and/or optionally includes displaying the first virtual object at a first size (e.g., a size in the three-dimensional environment). In some embodiments, virtual object(s) in the environment are displayed with a first level of visual prominence if the virtual object(s) are currently selected (e.g., have been subject of the user's attention). In some embodiments, the computer system determines that the user's attention corresponds to the first virtual object and that the first virtual object corresponds to a group of a plurality of virtual objects (e.g., objects corresponding to the same application or related applications), and in response to such a determination displays some or all of the virtual objects included in the group of virtual objects with the first level of visual prominence. In some embodiments, the first level of visual prominence relative to the three-dimensional environment corresponds to a first appearance of the first virtual object. For example, the first virtual object optionally is displayed with a first level of transparency and/or with a blurring effect while the remainder of the three-dimensional environment and/or other objects in the environment are displayed with a second, different, level of transparency and/or blurring effect. In some embodiments, content included within the first virtual object, such as one or more applications included within the first virtual object, are displayed with the first level of transparency and/or the blurring effect while the remainder of the three-dimensional environment and/or other objects in the environment are displayed with a second, different, level of transparency and/or blurring effect. In some embodiments, the first level of transparency optionally corresponds to a complete or predominantly opaque appearance (e.g., 100%, 95%, 85%, 75% or 50% opaque), and the second level of transparency optionally corresponds to a predominantly translucent appearance (e.g., 70%, 60%, 50%, 30%, 20%, 10%, 5% or 0% opaque).

In some embodiments, while displaying, via the display generation component, the first virtual object with the first level of visual prominence, the computer system detects (1802*b*) the attention of the user of the computer system move away from the first virtual object, such as attention 1704-1 as shown in FIG. 17B. For example, the user's attention optionally moves to a position in the three-dimensional environment not corresponding to a virtual object (e.g., to a position not corresponding to or including any virtual object) or optionally moves to a position corresponding to another virtual object (e.g., to a position that includes the other virtual object). In some embodiments, the computer system determines that the user's attention has shifted away from the first virtual object in accordance with a determination that the user's attention dwells on a respective position in the three-dimensional environment not corresponding to the first virtual object for at least a threshold amount of time (e.g., 0.1, 0.5, 1, 3, 5, 7, 10, or 15 seconds). In some embodiments, after displaying the first virtual object with the first level of visual prominence, the first visual appearance (e.g., prominence) is maintained while the user's attention is not directed to the first virtual object until the computer system determines the user's attention is directed to another virtual object.

In some embodiments, in response to the detecting the attention of the user of the computer system move away from the first virtual object (1802*c*), in accordance with a determination that the attention of the user is directed to a second virtual object, such as object 1716*a* as shown in FIG. 17A, while the second virtual object is currently displayed with a second level of visual prominence relative to the three-dimensional environment, the visual prominence of the object 1716*a* as shown in FIG. 17A (e.g., was displayed with the second level of visual prominence when the attention of the user moved away from the first virtual object), lower than the first level of visual prominence (1802*d*), the computer system displays (1802*e*), via the display generation component, the second virtual object with a third level of visual prominence that is higher than the second level of visual prominence, such as the visual prominence of object 1716*a* as shown in FIG. 17B (e.g., the third level of visual prominence is different from or the same as or substantially the same as the first level of visual prominence), while the first virtual object is displayed with a fourth level of visual prominence that is lower than the first level of visual prominence, such as the visual prominence of object 1708*a* as shown in FIG. 17B (e.g., the fourth level of visual prominence is different from or the same as or substantially the same as the second level of visual prominence). For example, the second virtual object optionally is another window or user interface corresponding to a second application, different from the first application (e.g., a media (e.g., video and/or audio and/or image) browsing and/or playback application, a web browser application, an email application or a messaging application). In some embodiments, the second virtual object has one or more characteristics of the first virtual object. In some embodiments, respective virtual objects in the three-dimensional environment-including the second virtual object—are displayed with a second, different level of visual prominence in accordance with a determination that the user's attention is not directed to the respective virtual objects. The second level of visual prominence optionally includes displaying the second virtual object with a particular visual characteristic, different from the particular visual characteristic associated with the first level of visual prominence (e.g., a second level of translucency, a second level of brightness, a second color saturation, and/or a second glowing effect), and/or optionally includes displaying the second virtual object at a second size in the three-dimensional environment. It is understood that the visual characteristics described with respect to the second virtual object (and/or second level of visual prominence) optionally are different from the visual characteristics described with respect to the first virtual object (and/or first level of visual prominence) to visually distinguish the relative prominence of the virtual objects in the three-dimensional environment. For example, the second virtual object having the second level of visual prominence optionally is displayed with a more translucent appearance, optionally lacking a border or outline, and/or at a smaller size than the first virtual object having the first level of visual prominence to indicate that the computer system has optionally determined the user is not paying attention to the second virtual object. In response to determining the user's attention shifts to the second virtual object, however, the computer system optionally modifies display of the second virtual object, as described below. For example, the computer system optionally displays the second virtual object with the particular visual characteristic(s) associated with the first level of visual prominence, such as a more opaque appearance, with a border effect, and/or at a different (e.g., larger) size to indicate that the user is paying attention to the second virtual object. Displaying virtual objects with a first visual prominence in accordance with a determination that the attention of the user is directed to the virtual objects provides feedback about which object(s) will be the target of interactions by the user, thus reducing user input erroneously directed to objects that the user does not intend to interact with, and reduces visual clutter.

In some embodiments, in accordance with the determination that the attention of the user is directed to the second virtual object while the second virtual object is currently displayed with the second level of visual prominence relative to the three-dimensional environment, such as object 1716*a* as shown in FIG. 17A the computer system displays (1804), via the display generation component, the first virtual object with the second level of visual prominence, such as the visual prominence of object 1708*a* as shown in FIG. 17B. For example, the computer system optionally displays the first virtual object optionally with the particular visual characteristic(s) associated with the second level of visual prominence, such as a more translucent appearance, without a border, with less brightness, with less color saturation and/or at a smaller size to indicate that the user is no longer paying attention to the first virtual object. In some embodiments, the computer system displays the first virtual object with a fifth level, relatively greater level of visual prominence relative to the second level of visual prominence indicating attention has recently shifted away from the first virtual object for a period of time (e.g., 0.1, 0.5, 1, 5, 10, or 100 seconds) before displaying the first virtual object with the fourth level of visual prominence. Displaying the first virtual object with the second level of visual prominence while attention is directed away from the first virtual object guides a user away from erroneously interacting with the first virtual object, thus reducing needless user inputs.

In some embodiments, the first level of visual prominence corresponds to a first level of translucency, such as the translucency of object 1708*a* as shown in FIG. 17A and the second level of visual prominence corresponds to a second level of translucency, greater than the first level of translucency (1806), such as the translucency of object 1708*a* as shown in FIG. 17B. For example, the computer system optionally displays a first user interface of a first application (e.g., the first virtual object) as predominantly opaque (e.g., with a first level of translucency) such that the contents of the user interface are easily visible, corresponding to a first level of visual prominence while concurrently displaying a second user interface of a second application (e.g., the second virtual object) as predominantly translucent (e.g., with a second level of translucency different from the first level of translucency) such that the contents of the second user interface are faded and/or see-through. In some embodiments, respective virtual objects are displayed with varying levels of transparency, and a first respective virtual object is not predominantly opaque. It is understood that in some embodiments, displaying a respective object with a respective level of translucency facilitates viewing of virtual content and/or physical objects behind the respective object. For example, a physical object optionally located behind a respective virtual object displayed with a first level of translucency optionally is more visible if the computer system optionally displays the respective virtual object with more translucency, and the physical object optionally is less visible if the computer system displays the respective virtual object with a relatively lesser amount of translucency. Displaying virtual objects with respective levels of translucency based on user attention visually guides the user to interact with the subject of their attention, thus reducing erroneous inputs directed to virtual objects that the user does not wish to interact with, reduces visual clutter, and/or allows the user to view other aspects of the three-dimensional environment of potential interest.

In some embodiments, displaying the first virtual object with the first level of visual prominence includes displaying, via the display generation component, a first portion of the first virtual object with a third level of translucency (1808*a*), such as the translucency of a portion of object 1708*a* as shown in FIG. 17A, and displaying, via the display generation component, a second portion of the first virtual object with a fourth level of translucency, different from the third level of translucency, such as the translucency of a second portion of object 1708*a* as shown in FIG. 17A. For example, the computer system optionally displays a first window corresponding to a first user interface of an application (e.g., media playback, internet browser, and/or text-based) optionally with a uniform or a non-uniform level of opacity. In some embodiments, the non-uniform level of opacity optionally includes a first portion of the first virtual object displayed with the third level of translucency and a second portion of the first virtual object with the fourth level of translucency. In some embodiments, a respective portion (e.g., a central portion) of the first virtual object is relatively more transparent than a second respective portion of the first virtual object (e.g., between the central portion and a boundary of the first virtual object).

In some embodiments, displaying the second virtual object with the third level of visual prominence in response to detecting the attention of the user of the computer system move away from the first virtual object includes changing a translucency of a first portion of the second virtual object by a first amount, such as changing the translucency of a portion of object 1708*a* as shown in FIG. 17B, and changing a translucency of a second portion of the second virtual object by a second amount, different from the first amount (1808*b*), such as changing the translucency of a portion of object 1708*a* as shown in FIG. 17B. For example, the computer system optionally displays the second virtual object with a higher level of opacity in response to detecting the attention of the user shift away from the first virtual object. For example, an opacity of a central portion of the second virtual object relative to a viewpoint of a user of the computer system optionally is increased or decreased by a first amount (e.g., 0.1, 0.5%, 1%, 5%, 10%, 15%, 50%, or 75%) and an edge portion of the second virtual object relative to the viewpoint of the user of the computer system is increased or decreased by a second amount (e.g., 0.1, 0.5%, 1%, 5%, 10%, 15%, 50%, or 75%). In some embodiments the opacity levels of the respective portions of the second virtual object are increased or decreased by the same amount. Displaying respective portions of virtual objects with respective levels of translucency optionally guides the user's attention and/or inputs towards and/or away from such respective portions of virtual objects, thereby reducing the likelihood inputs are unintentionally directed to virtual objects (and their respective portions).

In some embodiments, the detecting the attention of the user move away from the first virtual object includes detecting a gaze of the user, such as indicated by attention 1704-1 in FIG. 17B, directed to a respective position within the three-dimensional environment for a threshold amount of time, such as the dashed line of time 1723*a* as shown in FIG. 17B (1810). For example, the computer system optionally detects a gaze of the user of the computer system and in accordance with a determination that the gaze of the user optionally is directed to an area within the three-dimensional environment for the threshold amount of time (e.g., 0.05, 0.1, 0.5, 1, 5, 10, or 15 seconds) other than a respective area including the first virtual object, the computer system optionally determines that the user's attention moved away from the first virtual object. In some embodiments, the respective area including the first virtual object corresponds to a portion of the three-dimensional environment visually including the first virtual object from the viewpoint of the user. For example, the respective area optionally includes a space that the first virtual object occupies relative to the viewpoint of the user, and optionally includes additional area(s) surrounding the first virtual object (e.g., 0.05, 0.1, 0.5, 1, 5, 10, 50, 100 or 1000 cm extending from an edge(s) or boundary of the first virtual object). In some embodiments, before the gaze of the user is determined to correspond to the respective position within the three-dimensional environment for the threshold amount of time, the attention of the user is determined to correspond to the first virtual object. Detecting gaze as part of detecting the user's attention moving away from the first virtual object, and requiring the gaze to have moved away for a threshold amount of time, reduces the need for inputs to indicate such a movement of attention, and reduces erroneous determination of attention having moved away from the first virtual object, thus improving the human-computer interaction efficiency.

In some embodiments, the detecting the attention of the user move away from the first virtual object includes (1812*a*) detecting a gaze of the user directed towards a respective position within the three-dimensional environment, such as indicated by attention 1704-1 in FIG. 17B (1812*b*). For example, the computer system optionally detects the user's gaze is directed or oriented towards a region of the three-dimensional environment not including the first virtual object, a respective virtual object, the second virtual object, and/or another respective virtual object. In some embodiments, while the gaze of the user is directed towards the respective position within the three-dimensional environment, the computer system detects a gesture performed by a respective portion of the user of the computer system, such as an air gesture performed by hand 1703 in FIG. 17C (1812*c*). For example, the computer system optionally detects that the user's gaze is currently directed towards the respective portion, or within a threshold amount of time (e.g., 0.001, 0.0025, 0.01, 0.05, 0.1, 0.5, 1, 2.5, or 5 seconds) was previously directed towards the respective portion (e.g., a region of the three-dimensional environment not including the first virtual object, a respective virtual object, the second virtual object, and/or another respective virtual object). While the computer system optionally detects that the users gaze is or previously was directed towards the respective portion, the computer system optionally detects a movement, pose, and/or some combination thereof of a respective portion of the user, such as one or more hands, fingers, arms, feet, or legs of the user such as an air pinching gesture (e.g., the tip of the thumb and index fingers coming together and touching), an air pointing gesture (e.g., within one or more fingers), and/or an air squeezing gesture (e.g., one or more fingers curling optionally simultaneously). Determining attentional shifts based on a combination of gaze and a gesture performed by the user reduces the likelihood the user erroneously shifts attention away from the first virtual object, thereby improving human-computer interaction efficiency.

In some embodiments, the detecting the attention of the user move away from the first virtual object includes (1814*a*) detecting a gaze of the user directed to a respective position within the three-dimensional environment, such as represented by attention 1704-1 in FIG. 17B (1814*b*). In some embodiments, the detecting the gaze of the user has one or more characteristics of similar detection described with respect to step(s) 1812. In some embodiments, while the gaze of the user is directed to the respective position within the three-dimensional environment and while the second virtual object is displayed with the second level of visual prominence relative to the three-dimensional environment, such as object 1714*a* in FIG. 17B (e.g., optionally as described with respect to step(s) 1812), in accordance with a determination that one or more first criteria are satisfied, including a criterion that is satisfied when the gaze of the user is directed to the second virtual object for a threshold amount of time, such as the dashed line of time 1723*b* as shown in FIG. 17B, without detecting a selection input from a respective portion of the user, the computer system displays (1814*d*), via the display generation component, the second virtual object with the third level of visual prominence that is higher than the second level of visual prominence, such as the visual prominence of object 1714*a* as shown in FIG. 17B. For example, if the computer system optionally detects that a selection input such as an air pinching gesture (e.g., described with respect to step(s) 1812) performed by a hand of the user is not detected within the threshold amount of time (e.g., 0.05, 0.1, 0.5, 1, 5, 10, or 15 seconds) of the gaze of the user being directed to the second virtual object, the computer system optionally displays the second virtual object with the third, relatively higher visual prominence relative to the three-dimensional environment. Thus, in some embodiments, the computer system increases visual prominence of a respective virtual object in accordance with a gaze dwelling on the respective virtual object for the threshold amount of time.

In some embodiments, in accordance with a determination that one or more second criteria are satisfied, including a criterion that is satisfied when the selection input from the respective portion of the user, such as input from hand 1703 as shown in FIG. 17C, is detected before the gaze of the user is directed to the second virtual object for the threshold amount of time, such as the time 1723A of attention 1704-1 directed to object 1716*a*, the computer system displays (1814*e*), via the display generation component, the second virtual object with the third level of visual prominence that is higher than the second level of visual prominence, such as the visual prominence of object 1716*a* as shown in FIG. 17C. For example, the computer system optionally detects that a selection input such as an air pinching gesture, an actuation of a virtual or physical button, and/or an air pointing gesture directed towards the first virtual object is performed by the user before the previously described threshold amount of time has elapsed. In some embodiments, the computer system detects the selection input while the user's gaze is directed towards the second virtual object.

In some embodiments, the computer system detects the selection input while the user's gaze is not directed towards the second virtual object. Thus, in some embodiments, the computer system increases visual prominence of a respective virtual object in response to a selection input directed to the respective virtual object even if the threshold amount of time has not been reached, and if such a selection input is not received within a threshold amount of time and the user's gaze dwells on the respective virtual object for the threshold amount of time, the computer system similarly increases the visual prominence of the respective virtual object. Changing visual prominence in response to a prolonged gaze and/or a selection input allows user flexibility to increase visual prominence of a respective virtual object, thus improving efficiency of interaction to cause such an increase.

In some embodiments, in accordance with the determination that the one or more second criteria are satisfied, respective content included in the second virtual object, such as object 1716*a* in FIG. 17C, is not selected in response to detecting the selection input from the respective portion of the user, such as input from hand 1703 (1816). For example, while a gaze of the user of the computer system is directed to a virtual button included within the second virtual object and in response to a selection input such as an air pinching gesture performed by the respective portion of the user (e.g., a hand) before the gaze of the user has been directed to the second virtual object for the threshold amount of time described in step(s) 1814, the computer system optionally increases visual prominence of the second virtual object and does not actuate the first virtual button. The virtual button, for example, optionally corresponds to a function associated with the second virtual object, such as a "refresh" function of a user interface of a web browsing application included within the second virtual object. Therefore, the computer system optionally does not perform the associated function of the virtual button, optionally because the selection input served to increase the visual prominence of the second virtual object rather than interact with content included within the second virtual object. In some embodiments, while the second virtual object is displayed with a third level of visual prominence (e.g., is currently a prominent window), the computer system detects an input corresponding to an interaction with content within the second virtual object (e.g., the virtual button), such as the same selection input described above, and in response to detecting the input, performs one or more functions associated with the second virtual object (e.g., refreshes a web browsing application). Not selecting content within a virtual object in response to a selection input in accordance with a determination that second one or more criteria are satisfied reduces the likelihood inputs are erroneously directed to content the user does not wish to interact with and/or select.

In some embodiments, while displaying, via the display generation component, the first virtual object, such as object 1708*a* in FIG. 17A, with the first level of visual prominence, such as the visual prominence of object 1708*a* in FIG. 17A, and while the attention of the user, such as attention 1704-1 in FIG. 17A, of the computer system is directed towards the first virtual object, the computer system detects the attention of the user move within the first virtual object (1818*a*), such as movement of attention 1704-1 within object 17A. For example, the first virtual object optionally includes a first user interface of a first application, and the computer system optionally detects attention shift from a first respective portion of the first user interface, such as a first element within the first user interface, to a second, optionally different respective portion of the first user interface, such as a second element within the first user interface. In some embodiments, computer system determines that the user's attention has continued to correspond to the first virtual object, despite the attention (e.g., gaze) straying outside the first virtual object. For example, the computer system optionally determines that the user's gaze briefly shifts away from the first virtual object but returns to the first virtual object within a threshold amount of time (e.g., 0.05, 0.1, 0.5, 1, 5, 10, or 15 seconds). In some embodiments, despite such brief deviations of user attention away from the first virtual object, the computer system determines that the user's attention effectively has remained within the first virtual object. In some embodiments, the computer system optionally detects one or more shifts in attention of the user moving within the first virtual object.

In some embodiments, in response to detecting the attention of the user move within the first virtual object, the computer system maintains display of the first virtual object with the first level of visual prominence, such as maintaining visual prominence of object 1708*a* in FIG. 17A (1818*b*). For example, the computer system optionally detects that the attention shifts to the second element within the first user interface, and accordingly forgoes changing the displayed level of visual prominence of the first virtual object. Maintaining visual prominence of a virtual object while user attention shifts within the virtual object reduces the likelihood user is unintentionally or erroneously directed to a second, different virtual object and focuses user attention, thereby improving interaction efficiency.

In some embodiments, in response to detecting the attention of the user of the computer system move away from the first virtual object, such as attention 1704-1 moving from as shown in FIG. 17A to as shown in FIG. 17B, in accordance with a determination that the attention of the user is directed to a position within the three-dimensional environment not corresponding to a respective virtual object, such as the position of attention 1704-4 in FIG. 17C (e.g., empty space within the three-dimensional environment), the computer system maintains the displaying, via the display generation component, of the first virtual object with the first level of visual prominence relative to the three-dimensional environment (1820), such as the visual prominence of object 1716A in FIG. 17C. For example, the computer system optionally detects user attention move to a region within the three-dimensional optionally not including a respective virtual object and/or not including any virtual objects, and in response, forgoes modification of a currently displayed level of visual prominence (e.g., a first level of visual prominence) of the first virtual object. In some embodiments, the computer system detects user attention shift towards a virtual object that has a fixed level of visual prominence and/or is designated as a non-interactable object (e.g., a visual representation of characteristics of or status of the computer system, such as a battery level of the computer system), and similarly forgoes modification of currently displayed level of visual prominence of the first virtual object. Maintaining a level of visual prominence of a first virtual object in response to detecting attention of the user shift to a region of the three-dimensional environment not corresponding to a virtual object clearly conveys to the user that the attention of the user is not directed to an element capable of receiving input, thereby reducing unnecessary inputs and improving interaction efficiency.

In some embodiments, in response to the detecting the attention of the user of the computer system move away from the first virtual object, such as attention 1704-1 moving from as shown in FIG. 17A, to the position of attention 1704-5 as shown in FIG. 17C, in accordance with a determination that the attention of the user is directed to a non-interactive virtual object, such as object 1712*a* in FIG. 17C, the computer system maintains the displaying, via the display generation component, of the first virtual object with the first level of visual prominence relative to the three-dimensional environment, such as maintaining the visual prominence of object 1708*a* as shown in FIG. 17A (1822). For example, the non-interactive virtual object optionally corresponds to a visual representation of a status of the computer system (e.g., network connection, battery level, time, and/or date). In some embodiments, the non-interactive virtual object is textual (e.g., "May the Fourth be with you") displayed within the three-dimensional environment, or a virtual representation of a real-world object, such as a racecar or a tent. Maintaining visual prominence of the first virtual object in response to detecting user attention shift to a non-interactable virtual object indicates that the first virtual object will continue to be the recipient of a subsequent interaction, thereby reducing the likelihood the user directs input towards the non-interactable virtual object.

In some embodiments, the first virtual object and a third virtual object are associated with a group of virtual objects, such as grouping 1732 as shown in FIG. 17C (1824*a*). For example, the computer system optionally has previously detected user input grouping the first virtual object and third virtual object together. Additionally or alternatively, the first virtual object and the third virtual object optionally are proactively grouped by the computer system—optionally regardless of user input—in accordance with a determination that the virtual objects are associated with one another. For example, the first virtual object and the third virtual object optionally are user interfaces of a same text editing application, wherein the respective user interfaces are optionally for editing a same document. In some embodiments, virtual objects that are user interface of different applications, or virtual objects that are optionally not grouped together by the user and/or are not user interface of the same application are optionally not associated as a group of virtual objects.

In some embodiments, in response to the detecting the attention of the user of the computer system move away from the first virtual object, such as attention 1704-3 shown in FIG. 17C moving from object 1716A, in accordance with the determination that the attention of the user is directed to the third virtual object, such as object 1714*a* in FIG. 17C, the computer system maintains (1824*b*) the displaying, via the display generation component, of the first virtual object with the first level of visual prominence relative to the three-dimensional environment, such as maintaining visual prominence of object 1716A in FIG. 17C. For example, as described with respect to step(s) 1822, the computer system optionally maintains the visual prominence of the first virtual object in response to detecting user attention shift towards particular virtual objects, such as a respective virtual object that the computer system understands as optionally grouped with the first virtual object. In some embodiments, while the grouped first virtual object and third virtual object are displayed with the first level of visual prominence, the computer system detects the attention of the user move away from the first and/or the third virtual object, and in accordance with a determination that the attention is not directed to a respective virtual object that is not associated with the group, maintains visual prominence of the first virtual object and the third virtual object. In some embodiments, the third virtual object is displayed with the first level of visual prominence, and the computer system maintains the first level of visual prominence before attention shifted to the third virtual object as previously described, while attention of the user is directed to the third virtual object, and/or after attention of the user shifts away from the third virtual object. Maintaining visual prominence of the first virtual object in response to detecting user attention shift to the third virtual object visually informs the user as to a relationship between the first and the third virtual object, thus inviting inputs directed to the group and discouraging inputs not intended for the group, the first virtual object, and/or the third virtual object.

In some embodiments, in response to detecting the attention of the user of the computer system move away from the first virtual object, such as shifting away from object 1716*a* to the position of attention 1704-2 as shown in FIG. 17D, in accordance with a determination that the user is currently interacting with the first virtual object (e.g., one or more respective portions of the user, such as one or more hands of the user, are providing gesture inputs-optionally air gesture inputs-directed towards the first virtual object when the attention of the user moves away from the first virtual object), the computer system maintains (1826) the displaying, via the display generation component, of the first virtual object with the first level of visual prominence relative to the three-dimensional environment, such as maintaining visual prominence of object 1716*a* in FIG. 17D. For example, while the computer system optionally detects that the user is interacting with the first virtual object, the computer system optionally forgoes modification of visual prominence of the first virtual object. Such interaction optionally includes moving the first virtual object, interacting with content within the first virtual object, and/or selecting the first virtual object as described with greater detail with respect to step(s)s 1828-1832. In some embodiments, description of maintaining and/or modifying visual prominence while a user is interacting with the first virtual object similarly applies to content included within the first virtual object. In some embodiments, the computer system determines that the user is currently interacting based on or more inputs directed towards the first virtual object. The one or more inputs optionally includes one or more air gestures, poses, actuation(s) of physical and/or virtual objects, contact(s) on a surface (e.g., a touch-sensitive surface), and/or movements of such contacts across the surface. For example, the computer system optionally detects an air pinching gesture while attention of the user is directed towards the first virtual object (or in some embodiments, not directed towards the first virtual object while the first virtual object is displayed with an increased visual prominence) and while the air pinch (e.g., contact between an index and a thumb of a hand) is maintained, the computer system optionally determines that the user continues to currently interact with the virtual object. In some embodiments, the computer system detects a splaying or closing of a plurality of fingers of a hand of the user, and while the plurality of fingers remains a relative spatial distance from one another, the computer system determines the user is currently interacting with the first virtual object. In some embodiments, in response to the splaying of the fingers, respective content within the first virtual object is arranged to allow the user to view different portions of the respective content simultaneously, optionally without a visual overlap (e.g., evenly spaced browser windows of web browsing application). In some embodiments, in response to an air gesture closing one or more fingers of a hand of a user, the computer system initiates an interaction mode (e.g., a movement mode) associated with the first virtual object, and until the computer system determines a second air gesture (e.g., a second closing of the one or more fingers), the computer system determines that the user is currently interacting with the first virtual object. Additionally, in some embodiments, while maintaining the interaction mode, the first virtual object is moved with a direction and/or magnitude in accordance with a respective direction and/or magnitude of movement of a portion (e.g., the hand) of the user. In some embodiments, while a contact on a surface (e.g., a touch sensitive surface) is maintained, the computer system determines that the user continues to interact with the first virtual object. Maintaining display of visual prominence of the first virtual object in accordance with a determination that the user is currently interacting the first virtual object reduces the likelihood that shifts in attention do not undesirably hinder visibility of the first virtual object and/or content within the first virtual object until such interaction is complete, thereby reducing errors in interaction with the first virtual object.

In some embodiments, the current interaction with the first virtual object includes moving the first virtual object, such as moving object 1708*a* as shown in FIG. 17D (1828). For example, the computer system optionally detects an indication of an input initiating movement of the first virtual object, such as an air gesture performed by a portion of the user (e.g., a hand of the user) directed towards (optionally a visual element associated with moving) the first virtual object and movement of the portion of the user, wherein a magnitude and/or direction of movement of the first virtual object optionally corresponds to a magnitude and/or direction of movement of the portion of the user. In some embodiments, the current interaction has one or more characteristics of the current interaction and the one or more inputs described with respect to step(s) 1826.

In some embodiments, while moving the first virtual object as part of the current interaction with the first virtual object, such as object 1708*a* in FIG. 17D, the computer system displays (1828*b*), via the display generation component, a visual indication associated with moving the first virtual object, such as visual element 1718 in FIG. 17D. For example the computer system optionally displays a visual representation such as a "+" in response to receiving the input indicating movement of the first virtual object. In some embodiments the visual indication is overlaid over the first virtual object. In some environments the visual indication is displayed in proximity to the first virtual object relative to a viewpoint of the user. In some embodiments, the visual indication includes a visual effect such as a brightness, halo effect, glowing effect, saturation, a translucency, and/or a specular highlight displayed on the first virtual object based on one or more optionally visible and optionally virtual light sources within the three-dimensional environment. Displaying a visual indication communicates the current movement of the virtual object, thus reducing receiving of user input that is not associated with the current movement of the first virtual object.

In some embodiments, the current interaction with the first virtual object includes selecting and moving first content from the first virtual object, such as object 1716*a* in FIG. 17D to a respective virtual object other than the first virtual object (1830), such as to object 1714*a* in FIG. 17D. For example, the first virtual object optionally corresponds to a user interface of a first application, such as a text editing application. The computer system optionally receives an input indicating a selection and a movement of first content (e.g., text) from the first virtual object to a second, respective virtual object visible in the three-dimensional environment. For example, the computer system optionally performs a drag and drop operation, optionally including detecting of a first air gesture (e.g., pinch) performed by a portion of the user (e.g., a hand) directed towards respective content, and while a pose corresponding to the first air gesture (e.g., the pinch) is maintained, moving the first virtual object with a magnitude and/or direction corresponding to (e.g., directly or inversely proportional to) a respective magnitude and/or direction of a movement of the first portion of the user. In some embodiments, the computer system moves, modifies, or otherwise uses the content selected and modifies the second respective virtual object. For example, the computer system optionally inserts text into the second respective virtual object in response to the selection and moving of the text from the first virtual object to the second respective virtual object. In some embodiments, the current interaction has one or more characteristics of the current interaction and the one or more inputs described with respect to step(s) 1826. Interpreting selection and movement of first content in a first virtual object as a current interaction such that visual prominence of the first virtual object is maintained during such an interaction visually emphasizes the first virtual object, thus improving user understanding of how the interaction may operate and thereby preventing inputs undesirably moving away from the first virtual object.

In some embodiments, the current interaction with the first virtual object includes moving first content within the first virtual object (1832), such as movement 1703-2 of content 1730 as shown in FIG. 17D. For example, the content optionally is a visual representation of user progress through content included in the virtual first virtual object. For example, the first virtual object optionally is an application of a web browsing interface, and the selection and moving of content within the first virtual object optionally scrolls the web browsing interface. In some embodiments, the selection and movement of the content corresponds to scrolling elements and/or moving respective content from a first position within the first virtual object to a second position within the first virtual object, for example arranging icons within the first virtual object. In some embodiments, the current interaction includes selection and movement—as described with respect to the drag and drop operation described with respect to step(s) 1830—of respective content within the first virtual object. For example, the computer system optionally detects a selection (e.g., an air pinch gesture) of text displayed within a first input field included in the first virtual object, movement of the text in accordance with a first portion of the user (e.g., the hand), and in response to a canceling of the selection (e.g., a release of the air pinch gesture pose), optionally inserts the text at a second input field in accordance with a determination that a position of the portion of the user corresponds to the second input field (e.g., based on the movement). In some embodiments, the current interaction has one or more characteristics of the current interaction and the one or more inputs described with respect to step(s) 1826. Maintaining visual prominence of the first virtual object while moving content within the first virtual object visually focuses the interaction such that the user focus is oriented towards the virtual object independent of a current attention of the user, thereby reducing the likelihood the user improperly interacts or loses a reference point of the moving of the content.

In some embodiments, the second level of visual prominence corresponds to a second level of translucency, greater than a first level of translucency corresponding to the first level of visual prominence, such as the translucency of object 1708*a* as shown in FIG. 17B (1834*a*). For example, the computer system optionally displays the first virtual object having a current attention of the user with a first level of translucency and the second virtual object with a second, relatively greater level of translucency, such that the second virtual object appears more transparent, thus indicating a relatively lesser degree of visual prominence.

In some embodiments, the third level of visual prominence corresponds to a third level of translucency, lower than the second level of translucency, such as the translucency of object 1708*a* as shown in FIG. 17A (1834*a*). In some embodiments, the third level of visual prominence has one or more characteristics of the third level of visual prominence described with respect to step(s) 1802. For example, the computer system optionally displays the second virtual object with the third level of translucency that is lower (e.g., more opaque) than the second level of translucency. Indicating a level of visual prominence with a corresponding level of translucency communicates a target of interaction to the user, thus reducing the likelihood of inputs erroneously directed to virtual objects that the user does not wish to interact with.

In some embodiments, the second level of visual prominence corresponds to a second degree of blurring, greater than a first degree of blurring corresponding to the first level of visual prominence, such as blurring of object 1708*a* as shown in FIG. 17B (1836*a*). For example, the computer system optionally displays the first virtual object having a current attention of the user with a first level of a blurring effect and the second virtual object with a second, relatively greater level of a blurring effect, such that the second virtual object appears more blurry, thus indicating a relatively lesser degree of visual prominence. In some embodiments, the blurring effect is uniformly or non-uniformly applied across respective portion(s) of respective virtual objects from the viewpoint of the user.

In some embodiments, the third level of visual prominence corresponds to a third level of blurring, lower than the second degree of blurring, such as blurring of object 1708*a* as shown in FIG. 17A (1836*b*). In some embodiments, the third level of visual prominence has one or more characteristics of the third level of visual prominence described with respect to step(s) 1802. For example, the computer system optionally displays the second virtual object with the third blurring effect that is lower (e.g., less blurry) than the second level of the blurring effect. In some embodiments, the blurring effect and the respective degrees of blurring correspond to a blurring of content included in a respective virtual object and/or blurring of content visible through the respective virtual object relative to a viewpoint of the user. Indicating a level of visual prominence with a corresponding level of a blurring effect communicates a target of interaction to the user, thus reducing the likelihood of inputs erroneously directed to virtual objects that the user does not wish to interact with.

In some embodiments, the first virtual object is displayed in front of a visual representation of a physical environment, such as environment 1702, of the user relative to a viewpoint of the user, such as viewpoint 1726*a* (1838). For example, the first virtual object optionally is a user interface of an application, such as a web browser, and the three-dimensional environment described with respect to step(s) 1800 optionally corresponds to a mixed-reality (XR) environment. In some embodiments, the representation of the physical environment at least partially includes a visual passthrough as described with respect to step(s) 1800. In some embodiments, the passthrough is passive (e.g., comprising one or more lenses and/or passive transparent optical materials) and/or digital (including one or more image sensors such as cameras). In some embodiments, the first object is at least partially not completely transparent and/or at least partially not completely opaque, and a respective portion of the physical environment is visible through the first virtual object relative to a viewpoint of the user. Displaying the first virtual object between a representation of a physical environment and the viewpoint of the user communicates a spatial arrangement of the first virtual object, thus visually guiding their inputs towards or away from the first virtual object.

In some embodiments, the first virtual object is displayed in front of a virtual environment, such as environment 1702 relative to a viewpoint of the user, such as viewpoint 1726*a* as shown in FIG. 17A (1840). In some embodiments, three-dimensional environment includes a virtual environment, and the virtual environment has one or more of the characteristics of the virtual environment described with reference to step(s) 1800. The virtual environment optionally includes a fully or partially immersive visual scene, such as a scene of a campground, a sky, of outer space, and/or other suitable virtual scenes. In some embodiments, the first virtual object is positioned within such a virtual environment such that the virtual object is visible from a viewpoint of the user; in some embodiments, the virtual object is positioned in front of the virtual environment in the three-dimensional environment relative to the viewpoint of the user. In some embodiments, the first virtual object has one or more characteristics as described with respect to step(s) 1838 such that the visibility of the virtual environment through the first virtual object from a viewpoint of the user is similar to the visibility to the physical environment of the user. Displaying the first virtual object between a virtual environment and the viewpoint of the user communicates a spatial arrangement of the first virtual object, thus visually guiding their inputs towards or away from the first virtual object.

In some embodiments, the first virtual object is associated with a first application, such as an application of object 1708*a* shown in FIG. 17A, and the second virtual object is associated with a second application, different from the first application, such as an application of object 1716*a* shown in FIG. 17A (1842). For example, the first virtual object optionally is a first user interface of a first application and the second virtual object optionally is a second user interface of a second application, different from the first application. In some embodiments, while the computer system concurrently displays the first and the second virtual object, the computer system detects an input corresponding to a request to initiate one or more functions of a respective application, and in response to the input, in accordance with a determination that the input is directed to the first virtual object, initiates first one or more functions associated with the first virtual object and forgoes initiation of second one or more functions associated with the second virtual object, and in accordance with a determination that the input is directed to the second virtual object, initiates the second one or more function associated with the second virtual object and forgoes the initiation of the first one or more functions. In some embodiments, respective virtual objects are different instances of the same application. Associating respective virtual objects with different respective applications reduces user inputs required to navigate to and interact with the different respective applications.

In some embodiments, the second virtual object, such as object 1712*a* shown in FIG. 17D, is a control user interface associated with an operating system of the computer system, such as an operating system of computer system 101 shown in FIG. 17D (1844). For example, the second virtual object optionally is a user interface associated with the operating system of the computer, such as a control center, a notification associated with the computer system, an application launching user interface, a display brightness, network connectivity, an interface for modifying peripheral device communication, media playback, data transfer, screen mirroring with a second display generation component, or a battery indicator of the computer system and/or devices in communication with the computer system. For example, the control user interface is a control center corresponding to a region of the user interface including one or more interactable options to modify characteristics of the computer system (e.g., increasing brightness, modifying network connections, launching an application, and/or setting a notification silencing mode). In some embodiments, the control user interface includes a notification (e.g., graphical and/or textual), such as a notification of a received message, a notification of a new operating system update, and/or a notification from an application. In some embodiments, the application launching user interface includes a plurality of representations of a plurality of applications, individually selectable to launch a respective application A control user interface reduces user input required to access and modify characteristics associated with the operating system of the computer system.

In some embodiments, while displaying, via the display generation component, the second virtual object with the second level of visual prominence relative to the three-dimensional environment, such as the visual prominence of object 1708*a* shown in FIG. 17D, the computer system displays (1846*a*), via the display generation component, a respective selectable element, such as visual element 1718, associated with moving the second virtual object with a fifth level of visual prominence, such as a level of visual prominence of visual element 1718. In some embodiments, one or more respective virtual objects are displayed with accompanying selectable elements, referred to herein as "grabbers," that are optionally selectable to move a corresponding respective virtual object. For example, the grabber optionally is a pill-shaped visual representation that optionally is displayed with a level of visual prominence that optionally corresponds, or optionally does not correspond to, a level of visual prominence of the corresponding second virtual object. In some embodiments, the fifth level of visual prominence is the same as the second level of visual prominence. In some embodiments, the fifth level of visual prominence is different from the second level of visual prominence. In some embodiments, a grabber is displayed in proximity to (e.g., below and centered with) a respective virtual object.

In some embodiments, while displaying the second virtual object with the second level of visual prominence, such as displaying object 1708*a* with respective visual prominence as shown in FIG. 17D, and the respective selectable element, such as visual element 1718, with the fifth level of visual prominence, the computer system receives (1846*b*), via the one or more input devices, a first input directed to the respective selectable element, such as hand 1703 contacting trackpad 1715 in FIG. 17D. For example, the computer system optionally detects that a movement, air gesture (e.g., air pinching gesture), and/or a pose of a respective portion of a user (e.g., hand) of the computer system (e.g., as described with respect to step(s) 1832) is optionally directed to a respective selectable element (e.g., grabber) associated with the second virtual object.

In some embodiments, in response to detecting the first input, the computer system moves (1846*c*) the second virtual object in the three-dimensional environment in accordance with the first input, such as movement of object 1708*a* to a position shown in FIG. 17E. For example, optionally in response to detecting an air pinching gesture optionally while user attention is directed to the respective visual element, the computer system optionally initiates a process to move the second virtual object. In some embodiments, while a particular pose of the respective portion of the user (e.g., hand) is maintained, the computer system remains in an object movement mode. For example, while a pinching pose made by a hand of the user is maintained, the computer system optionally detects movement of the hand of the user, and optionally moves the position of the second virtual object with a magnitude and/or direction in accordance with a magnitude and/or direction of the movement (e.g., upwards, downwards, leftwards, rightwards, closer to the user, and/or further away from the user relative to the viewpoint of the user within the three-dimensional environment). In some embodiments, the first input includes actuation of a physical or virtual button, and in response to such actuation, the computer system arranges one or more respective virtual objects. For example, the computer system optionally arranges one or more first objects to consume a defined portion of the user's viewpoint, such as a left half of the user's field of view, in response to the first input. Displaying a respective selectable element corresponding to a respective virtual object that is selectable to move the second virtual object indicates that the second virtual object can be moved despite being displayed with reduced visual prominence, thereby preventing the user from needlessly shifting attention to the second virtual object in order to move the first virtual object In some embodiments, while displaying, via the display generation component, the first virtual object with the fourth level of visual prominence, the computer system displays (1848*a*), via the display generation component, a respective selectable element associated with moving the first virtual object, such as visual element 1718 as shown in FIG. 17D associated with object 1708*a*. For example, the computer system optionally displays a first virtual object with a fourth level of visual prominence as described with respect to step(s) 1802, and optionally maintains the fourth level of visual prominence while the attention of the user is not directed to the first virtual object and or prior to detecting a selection of the first virtual object. In some embodiments, the respective element has one or more characteristics of the respective selectable element(s) described with respect to step(s) 1826.

In some embodiments, while displaying, via the display generation component, the first virtual object with the fourth level of visual prominence and the respective selectable element associated with moving the first virtual object, the computer system detects (1848*b*) an input, such as hand 1703 contacting trackpad 1705 in FIG. 17D, directed to a respective element associated with the first virtual object. For example, the computer system optionally detects an attention of the user is directed to a first respective element (e.g., grabber) associated with the first virtual object or detects that the attention of the user is directed to a second respective element (body and/or content) included within and associated with the first virtual object.

In some embodiments, in response to detecting the input directed to the respective element associated with the first virtual object (1848*c*), in accordance with a determination that the respective element is the respective selectable element, such as visual element 1718 in FIG. 17D, (e.g., the computer system optionally detects an input selecting a grabber associated with the first virtual object. In some embodiments, the input directed to the respective element (e.g., the grabber) has one or more characteristics of the input(s) such as the first input directed to respective selectable element(s) described with respect to step(s) 1826), the computer system initiates (1848*d*) a process to move the first virtual object in accordance with the input, such as moving object 1708*a* to a location as shown in FIG. 17E. In some embodiments, the process to move the first virtual object has one or more characteristics of the moving of respective virtual object(s) described with respect to step(s) 1826.

In some embodiments, in accordance with a determination that the respective element corresponds to respective content included within the first virtual object, such as within object 1708*a* in FIG. 17D, the computer system displays (1848*e*), via the display generation component, the first virtual object with a fifth level of visual prominence, greater than the fourth level of visual prominence, without performing an operation associated with the respective content in accordance with the input, such as the visual prominence of object 1708*a* shown in FIG. 17E, without the movement of object 1708*a* shown in FIG. 17E compared to FIG. 17D. For example, the computer system optionally detects an attention of the user is directed to content included in the first virtual object or to the outline or the body of the first virtual object and optionally detects an air pinch performed by a hand of the user. In response to the attention and the pinch, the computer system optionally displays the first virtual object with a fifth level of visual prominence optionally corresponding to an increased level of visual prominence of the first virtual object, but does not perform an operation associated with the respective content. In some embodiments, while displaying the first virtual object with the fifth level of visual prominence, the computer system detects an input the respective element, and in accordance with a determination that the respective element corresponds to the respective content included within the first virtual object, initiates performance of one or more operations of the first virtual object. For example, the input optionally corresponds to a selection of a virtual button to refresh a web browser, and the one or more operations include a refresh and/or reload operation of a current webpage of the web browser. Additionally or alternatively, the input optionally corresponds to initiation of a content entry mode, and the one or more operations include an initiation of a content entry mode (e.g., entry of text into a text field and/or entry of a virtual drawing mode wherein movement of a respective portion of the user is trailed by a representation of a drawing). Initiating movement of the first virtual object or increasing visual prominence without performing an operation associated with content in accordance with a determination that user input is directed to a corresponding element associated with the first virtual object reduces the likelihood the user erroneously initiates the operation associated with the content, without limiting the ability to rearrange virtual objects in the three-dimensional environment.

In some embodiments, the first virtual object includes currently playing media content (1850*a*), such as media content playing within object 1708*a* in FIG. 17A. For example, the first virtual object optionally includes a media player optionally including currently playing media content (e.g., audio, video, and/or some combination of the two).

In some embodiments, in response to displaying, via the display generation component, the second virtual object with the third level of visual prominence relative to the three-dimensional environment, such as the object 1714*a* and its visual prominence as shown in FIG. 17B, the computer system maintains (1850*b*) playback of the media content included within the first virtual object that is displayed with the fourth level of visual prominence, such as maintaining media playback of media in object 1708*a* as shown in FIG. 17B. For example, the computer system optionally continues playback of the media content such that the media content continues to be audible and/or visible while the first virtual object is optionally displayed with the fourth, optionally reduced level of visual prominence. In some embodiments, while the second virtual object is relatively prominent and the first virtual object is relatively not prominent, the media is visually obscured (e.g., transparent and/or blurry), but continues to play. Continuing playback of media content included within a first virtual object while displaying the first virtual object with a reduced visual prominence reduces inputs required for the user to continue such playback and/or to update a playback position to correspond to a desired playback position while the second virtual object has a relatively greater level of visual prominence.

In some embodiments, the first virtual object is a first type of object (1852*a*), such as a type of object 1708*a* shown in FIG. 17C. For example, the first type of the first virtual object optionally corresponds to a user interface of an application, such as a web browsing and/or media playback application. In some embodiments, the first type of object includes respective content from a respective virtual object (e.g., a photograph dragged and dropped—as described with respect to step(s) 1830—to a position within the three-dimensional environment outside of the respective virtual object). For example, the respective content optionally is a representation of a communication (e.g., a text message) from a user of another device in communication with the computer system.

In some embodiments, while displaying, via the display generation component, a third virtual object in the three-dimensional environment with a fifth level of visual prominence relative to the three-dimensional environment, wherein the third virtual object is a second type of object, such as the type of object 1712A shown in FIG. 17C, different from the first type of object, and the attention of the user is directed to the third virtual object, the computer system detects (1852*b*) the attention of the user of the computer system move away from the third virtual object, such as detecting movement of attention 1704-1 shift to a position as shown in FIG. 17C. For example, the second type of virtual object corresponds to a control or system user interface virtual object as described with respect to step(s) 1844, an avatar virtual object, and/or a representation of a virtual landmark. In some embodiments, the second type of virtual object corresponds to a type of virtual object (whether or not the virtual object is interactable) that maintains a level of visual prominence when the user of the computer system has a current attention directed to another virtual object, or makes an explicit request to increase visual prominence of the alternative virtual object.

In some embodiments, in response to detecting the attention of the user of the computer system move away from the third virtual object, and in accordance with a determination that the attention of the user is directed to a fourth virtual object in the three-dimensional environment, such as object 1714*a* in FIG. 17B, the computer system maintains (1852*c*) display of the third virtual object with the fifth level of visual prominence relative to the three-dimensional environment, such as a maintaining of visual prominence of object 1712*a* as shown in FIG. 17D. For example, in response to detecting the attention of the user move away from a control user interface associated with an operating system of the computer system, the computer system optionally maintains a level of visual prominence of the control user interface. Maintaining visual prominence of the third virtual object indicates a characteristic of the third virtual object (e.g., interactivity and/or control of settings of the computer system) and visually communicates the type of the third virtual object, thus indicating to the user a potential type of interaction or input the computer system permits interacting with the third virtual object, indicating that the third virtual object remains interactable, and thereby reducing erroneous inputs directed to the environment.

In some embodiments, the second type of object is a representation of a respective user associated with the computer system (1854), such as a type of object 1712*a* shown in FIG. 17C. For example, the second type of object optionally includes an avatar of a current user of the computer system, another user of the computer system, a user of a second computer system in communication with the computer system (e.g., as part of a communication session), and/or a representation of a virtual helpdesk representative corresponding to a plurality of users of respective computer systems. The communication session including the computer system (e.g., a first communication system) and a second, optionally different computer system is optionally a communication session in which audio and/or video of the users of the various computer systems involved are accessible to other computer systems/users in the communication session. In some embodiments, during the communication session, a given computer system participating in the communication session displays one or more avatars of the one or more other users participating in the communication session, where the avatars are optionally animated in a way that corresponds to the audio (e.g., speech audio) transmitted to the communication session by the corresponding computer systems. In some embodiments, during the communication session, the first computer system displays the one or more avatars of the one or more other users participating in the communication session in the virtual environment being displayed by the first computer system, and the second computer system displays the one or more avatars of the one or more other users participating in the communication session in the virtual environment being displayed by the second computer system. Maintaining visual prominence of a representation of a user guides the user as to the type of interactions the computer system allows with the representation of the user and indicates that the respective user is active in the environment.

In some embodiments, the second type of object is a user interface of a media playback application (1856), such as a type of object 1712*a* shown in FIG. 17C. For example, the second type of object optionally is a user interface of a textual, audio, and/or video playback application such as a read-aloud application, and/or a web video browsing application. Providing a media application that maintains visual prominence guides the user as to the type of interactions the computer system allows with the media playback application and indicates that the media playback application is active in the environment.

In some embodiments, the second type of the object is a status user interface of the computer system, such as a type of object 1712*a* shown in FIG. 17C (1858). For example, the second type of object optionally includes information about a status of the computer system, one or more respective components included within the computer system, a status of a second computer system in communication with the computer system, and/or one or more second respective components associated with the second computer system. For example, the status of a network connection, a status of one or more batteries of the computer system and/or another device in communication with the computer system, an indication of access to respective circuitry (e.g., camera, microphone, and/or location sensor(s)) included within or in communication with the computer system. Providing a status user interface application that maintains visual prominence continuously provides visible respective statuses of one or more components of the computer system such that the user does not provide inputs conflicting with a current status of a respective component of the computer system.

In some embodiments, the second type of object is a user interface of a communication application, such as a type of object 1712*a* shown in FIG. 17C (1860). For example, the second type of object optionally is a user interface of a messaging application, an electronic mail application, a voice and/or video application, a videoconferencing or video chat application, a photographic exchange application, and/or a real-time communication application. Providing a type of virtual object corresponding to a communication application that maintains visual prominence guides the user as to the type of interactions the computer system allows with the communication application and maintains visibility of such communication, reducing inputs required to view such communication.

It should be understood that the particular order in which the operations in method 1800 have been described is merely exemplary and is not intended to indicate that the described order is the only order in which the operations could be performed. One of ordinary skill in the art would recognize various ways to reorder the operations described herein.

FIGS. 19A-19E illustrate examples of a computer system modifying visual prominence of respective virtual objects to modify apparent obscuring of the respective virtual objects by virtual content in accordance with some embodiments.

Figure 19A:
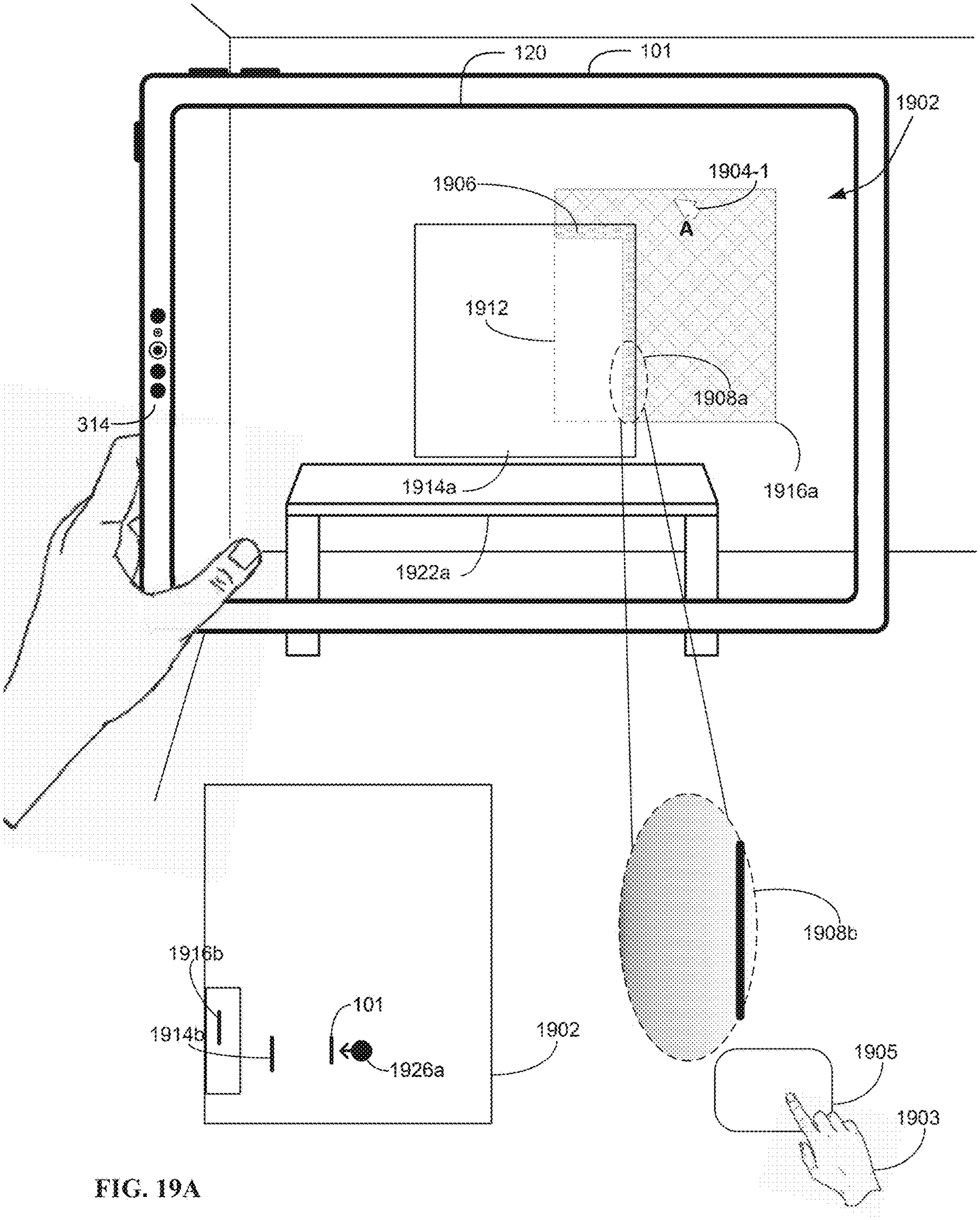
FIGS. 19A-19E illustrate examples of a computer system modifying visual prominence of respective virtual objects to modify apparent obscuring of the respective virtual objects by virtual content in accordance with some embodiments.

FIG. 19A illustrates a three-dimensional environment 1902 visible via a display generation component (e.g., display generation component 120 of FIG. 1) of a computer system 101, the three-dimensional environment 1902 visible from a viewpoint 1926*a* of a user illustrated in the overhead view (e.g., facing the left wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 19A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1902 and/or the physical environment is visible in the three-dimensional environment 1902 via the display generation component 120. For example, three-dimensional environment 1902 visible via display generation component 120 includes representations of the physical floor and back and side walls of the room in which computer system 101 is located. Three-dimensional environment 1902 also includes table 1922*a*, which is visible via the display generation component from the viewpoint 1926*a* in FIG. 19A.

In FIG. 19A, three-dimensional environment 1902 also includes virtual objects 1914*a* (corresponding to object 1914*b* in the overhead view) and 1916*a* (corresponding to object 1916*b* in the overhead view), that are visible from viewpoint 1926*a*. In FIG. 19D, three-dimensional environment 1902 also includes virtual object 1918*a* (corresponding to object 1918*b* in the overhead view). In FIGS. 19A and 19D, objects 1914*a*, 1916*a* and 1918*a* are two-dimensional objects, but the examples of the disclosure optionally apply equally to three-dimensional objects. Virtual objects 1914*a*, 1916*a* and 1918*a* are optionally one or more of user interfaces of applications (e.g., messaging user interfaces and/or content browsing user interfaces), three-dimensional objects (e.g., virtual clocks, virtual balls, and/or virtual cars) or any other element displayed by computer system 101 that is not included in the physical environment of computer system 101.

In FIG. 19A, a portion of object 1914*a* partially obscures a portion of object 1916*a*. For example, object 1914*b* shown in the top-down view is displayed at a first position in the three-dimensional environment 1902 that is relatively closer to viewpoint 1926*a* of the user than a second position of object 1916*b* relative to viewpoint 1926*a*. In such an arrangement, a first physical object placed at the first location having the size and/or dimensions of object 1914*a* would optionally visually obscure a second physical object placed at the second location having the size and/or dimensions of object 1916*a*. As such, in some embodiments, computer system 101 displays object 1914*a* and object 1916*a* to reflect such an arrangement, but with respect to virtual content.

Prior to as shown in FIG. 19A, computer system 101 has previously detected attention of the user that was previously directed to object 1914*a*, and in response to that previously detected attention, displayed the object 1914*a* with a first degree of prominence (e.g., a first level of opacity, such as 100% opacity). Similarly, because the computer system did not detect attention was directed to object 1916*a*, computer system 101 optionally displayed and continues to display object 1916*a* with a second level of visual prominence (e.g., with a second level of opacity, such as 60% opacity). In FIG. 19A, computer system 101 detects attention 1904-1 directed to object 1916*a*, but has yet to satisfy one or more criteria (e.g., has yet to dwell upon object 1916*a* for a period of time greater than a threshold amount of time). In some embodiments, attention 1904-1 is not displayed by the computer system.

In some embodiments, computer system 101 modifies visual appearance of a respective portion of a first virtual object (e.g., object 1914*a*) that is obscuring a first portion of a second virtual object (e.g., object 1916*a*). As described previously, it is understood that such obscuring is an apparent obscuring caused by the manner with which computer system 101 displays the respective objects. For example, computer system 101 optionally displays a plurality of portions of object 1914*a* within effect region 1906, within which computer system 101 optionally displays a first portion of object 1914*a* that is within a region overlapping with a portion of object 1916*a* with a first level of visual prominence (e.g., a first level of opacity, such as 100% opacity) such that the first portion optionally is visually prominent in three-dimensional environment 1902. In some embodiments, computer system 101 displays a second portion of object 1914*a* within effect region 1906, other than the first portion, that is closer to object 1916*a* with a second level of visual prominence (e.g., a second level of opacity, such as 10% opacity). In some embodiments, the first portion includes portions closer to the center of object 1914*a* and the second portion includes portions of object 1914*a* is closer to an edge of object 1916*a*, such that the portions of object 1914*a* closest to the edges of 1914*a* optionally are more translucent, thus creating a gradual visual transition from respective content included in object 1914*a* to respective content included in object 1916*a*. In some embodiments, the first and the second portions of object 1914*a* are included in an overlapping region 1912 between object 1914*a* and 1916*a*.

In some embodiments, an overlapping region 1912 includes an area relative to viewpoint 1926*a* within which object 1914*a* and 1916*a* have a virtual intersection, as described previously, and includes an effect region 1906, within which the visual prominence of the first and the second portion of object 1914*a* are modified by computer system 101. Within effect region 1906, computer system 101 optionally displays a gradual transition in visual prominence of object 1914*a*. For example, subregion 1908*a* (and the corresponding enlarged view of subregion 1908*b* corresponding to subregion 1908*a*) included in effect region 1906 optionally is displayed with a gradient of opacity. For example, rather than display effect region 1906 with two distinct portions of respective opacity, computer system 101 displays a gradual increase and/or decrease of opacity starting from one or more inner edges of effect region 1906 relative to a center of object 1914*a* extending toward one or more outer edges of effect region 1906 relative to the center of object 1914*a*. In some embodiments, effect region 1906 is based on the dimensions of intersection and/or overlap between object 1914*a* and object 1916*a*. For example, computer system 101 optionally detects an area of the overlapping region 1912 between object 1914*a* and object 1916*a*, and optionally modifies visual prominence along one or more edges of the intersection area that are closest to the object 1916*a* that optionally is displayed with reduced visual prominence. In some embodiments overlapping region 1912 and/or effect region 1906 are a shape other than a rectangular shape, and computer system 101 modifies visual prominence of intersections and/or overlapping regions between respective virtual objects (e.g., within an oval-shaped overlapping region).

In some embodiments, computer system 101 detects an input directed to object 1916*a* in FIG. 19A. For example, hand 1903 contacts trackpad 1905 while a cursor is directed toward object 1916*a*. Additionally or alternatively, the input optionally includes attention-based inputs and/or air gestures performed by one or more portions of the user's body. For example, computer system 101 optionally detects gaze and/or attention of the user directed toward object 1916*a*, and optionally detects a concurrent air gesture (e.g., an air pinch gesture including contacting of respective fingers of the user's hand, an air swipe of the user's hand, squeezing of multiple fingers, a splaying and/or opening of multiple fingers, and/or another air gesture). In response to the input, computer system 101 optionally initiates a process to modify the visual prominences of object 1914*a* and/or object 1916*a*, as shown in FIG. 19B.

Figure 19B:
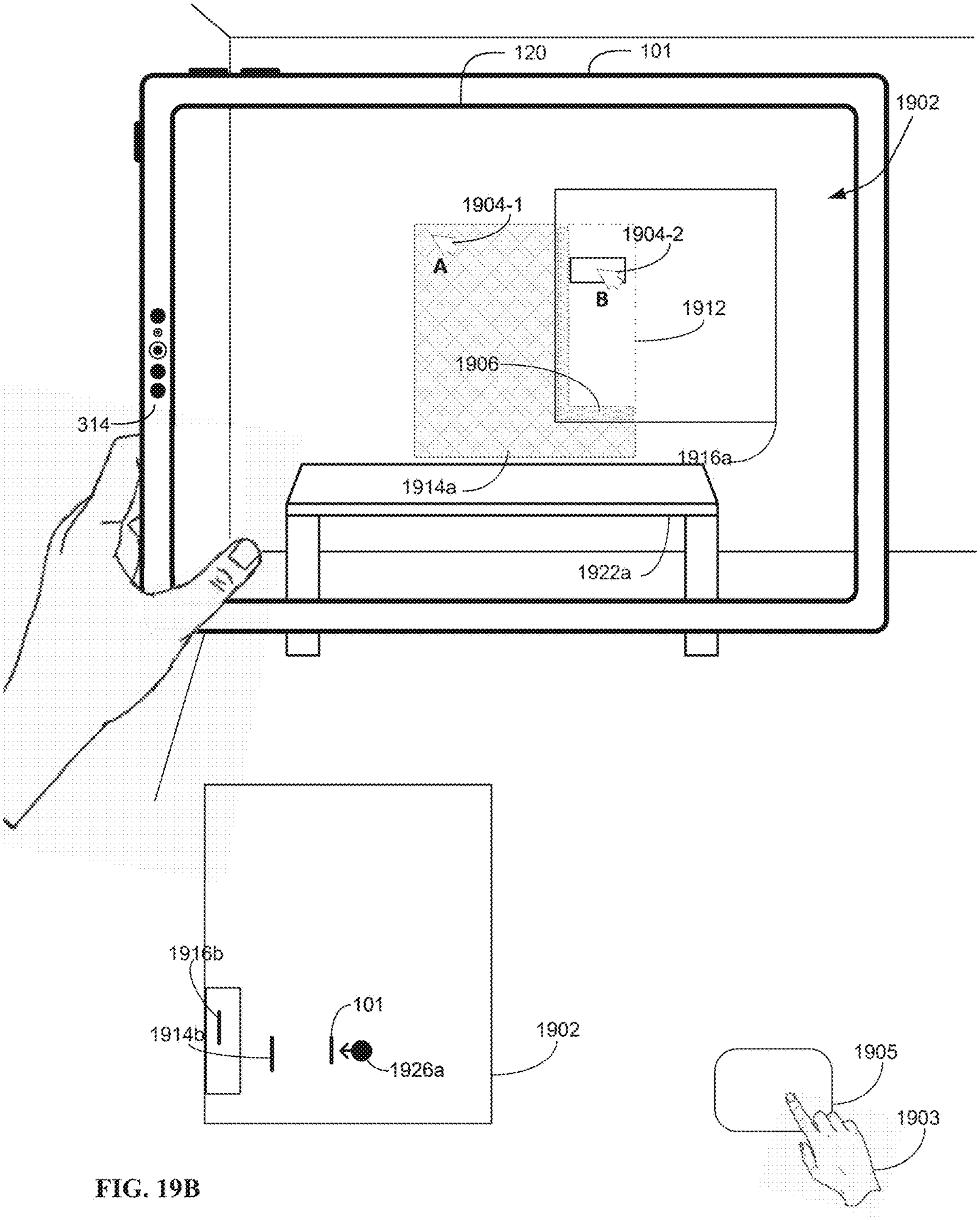

In FIG. 19B, in response to the input described previously in FIG. 19A, computer system 101 optionally displays object 1916*a* with an increased visual prominence (e.g., the first level of visual prominence), and optionally displays object 1914*a* with a decreased visual prominence (e.g., the second level of visual prominence), and optionally displays a respective portion of object 1914*a* with a third degree of visual prominence (e.g., with 0% opacity) to allow the user to view a object 1916*a* through the respective portion of object 1914*a*. In some embodiments, computer system 101 does not move the respective objects in response to the input. In some embodiments, computer system 101 applies a visual effect (e.g., a reduction in visual prominence) to one or more portions of object 1916*a* to indicate overlap between object 1916*a* and 1914*a* within effect region 1906, similar or the same to as described with reference to object 1914*a* in FIG. 19A. For example, computer system 101 optionally displays object 1916*a* with a relatively increased level of visual prominence and reduces respective visual prominence of respective content included in object 1916*a* within effect region 1906. In some embodiments, a boundary of effect region 1906 at least partially is bounded by an edge of object 1916*a*. In some embodiments, the effect region 1906 includes a least a portion of object 1914*a* and/or 1916*a*. In some embodiments, effect region 1906 is outside a boundary corresponding to an edge of 1916*a*. Computer system 101 additionally or alternatively displays effect region with a gradient effect, such that portions of object 1916*a* within effect region 1906 closer to a center of object 1916*a* optionally are displayed with a relatively higher level of opacity and portions of object 1916*a* closer to an edge of an overlapping region 1912 between object 1914*a* and/or 1916*a* optionally are displayed with a relatively lower level of opacity. In some embodiments, when effect region 1906 extends beyond a boundary of object 1916*a*, computer system 101 displays portions of additional virtual content (e.g., a portion of object 1914*a*) with a visual effect having one or more characteristics described with reference to the portions of object 1906*a* that are displayed with the visual effect(s) (e.g., a gradient of opacity levels).

In FIG. 19B, attention 1904-2 corresponds to input that is detected by computer system 101 and is directed to content included in object 1916*a* that is within overlapping region 1912. For example, the input optionally corresponds to interaction with respective virtual content of object 1916*a* in the overlapping region 1912, such as selection of a virtual button, a toggling of a setting of the computer system, and/or a selection of a notification represented by virtual content within the overlapping region 1912. Because object 1916*a* optionally is displayed with the relatively increased level of visual prominence, computer system 101 optionally permits interaction with the respective virtual content that would otherwise be forgone if object 1914*a* were displayed with the relatively increased level of visual prominence. Thus, the previous input(s) to display object 1916*a* described with reference to FIG. 19A have allowed user interaction with the respective virtual content that otherwise would not have been visible and/or interactable. In some embodiments, computer system 101 detects that attention 1904-1 has shifted from object 1916*a* back to 1914*a*, and in response to the input, displays the respective objects in a similar or the same manner as described with reference to FIG. 19A.

Figure 19C:
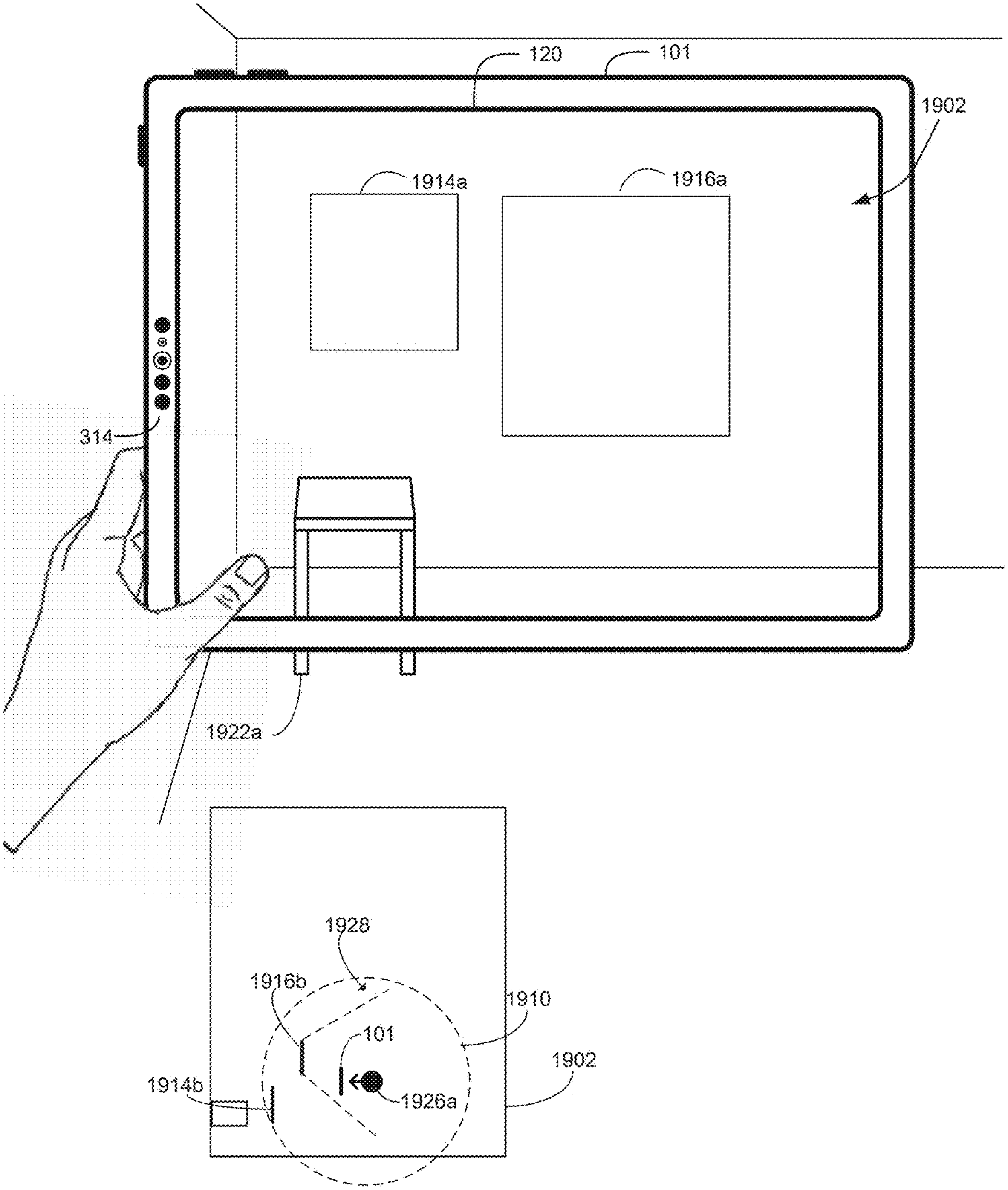
Figure 19D:
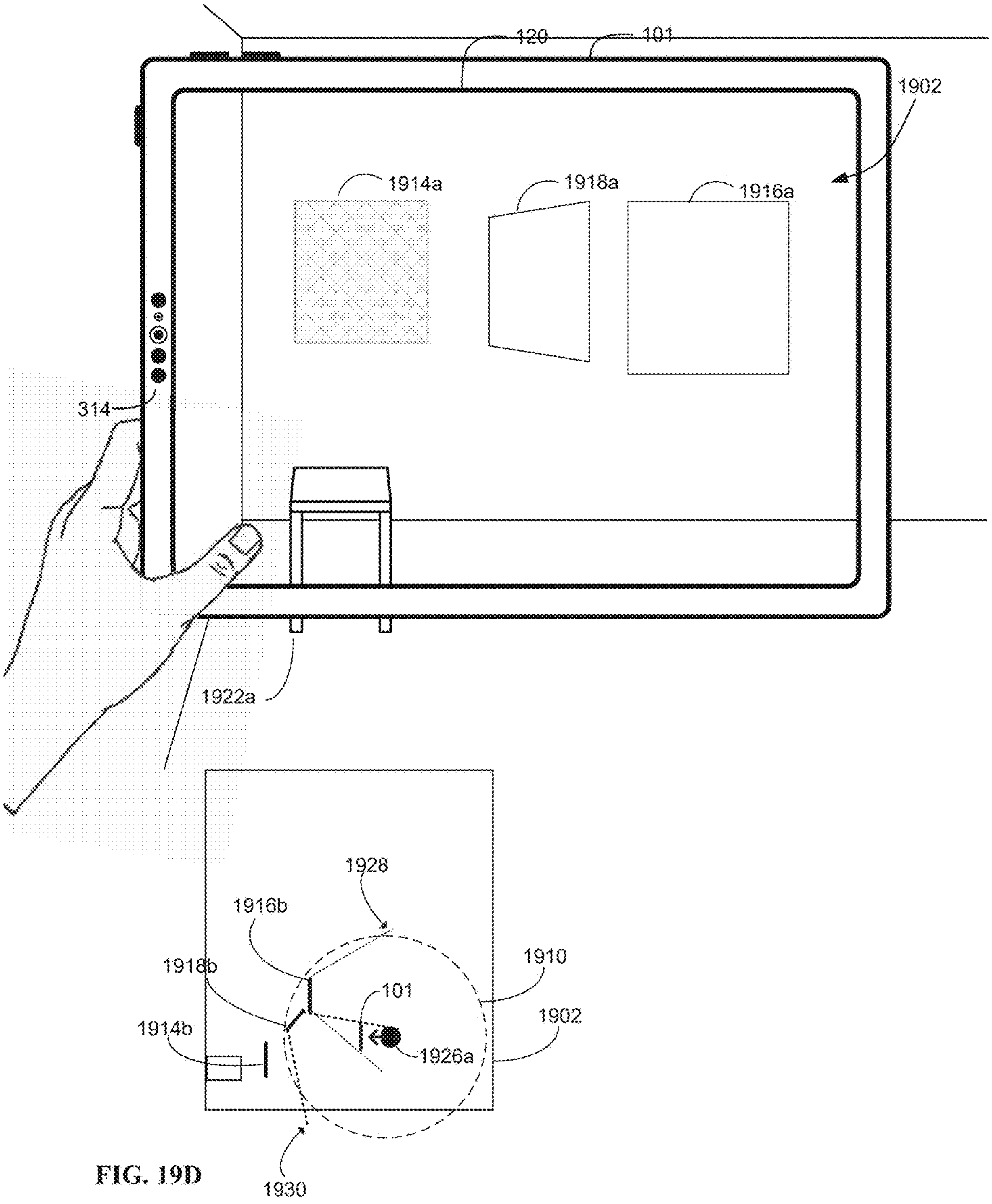
Figure 19E:
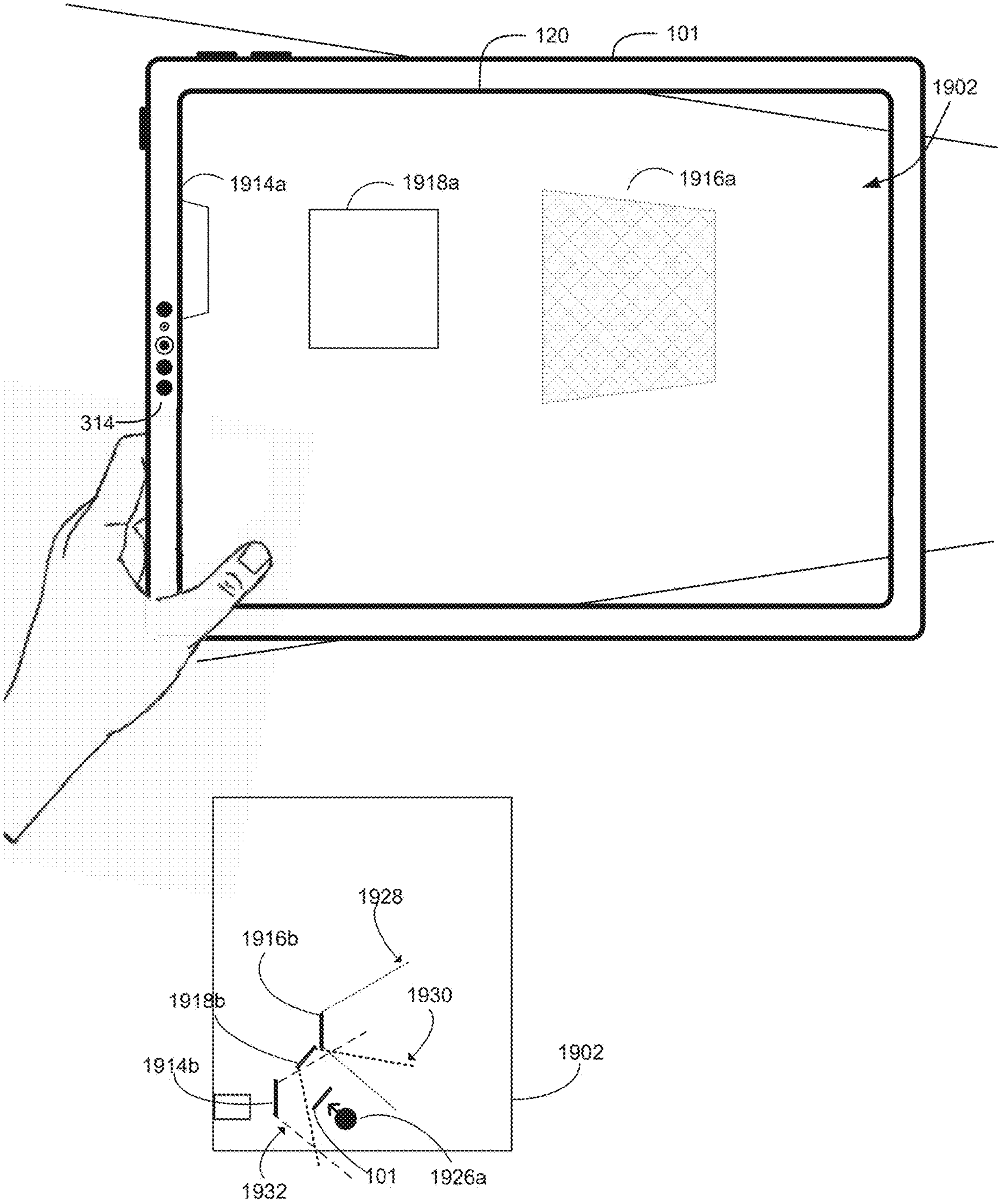
Figure 20A:
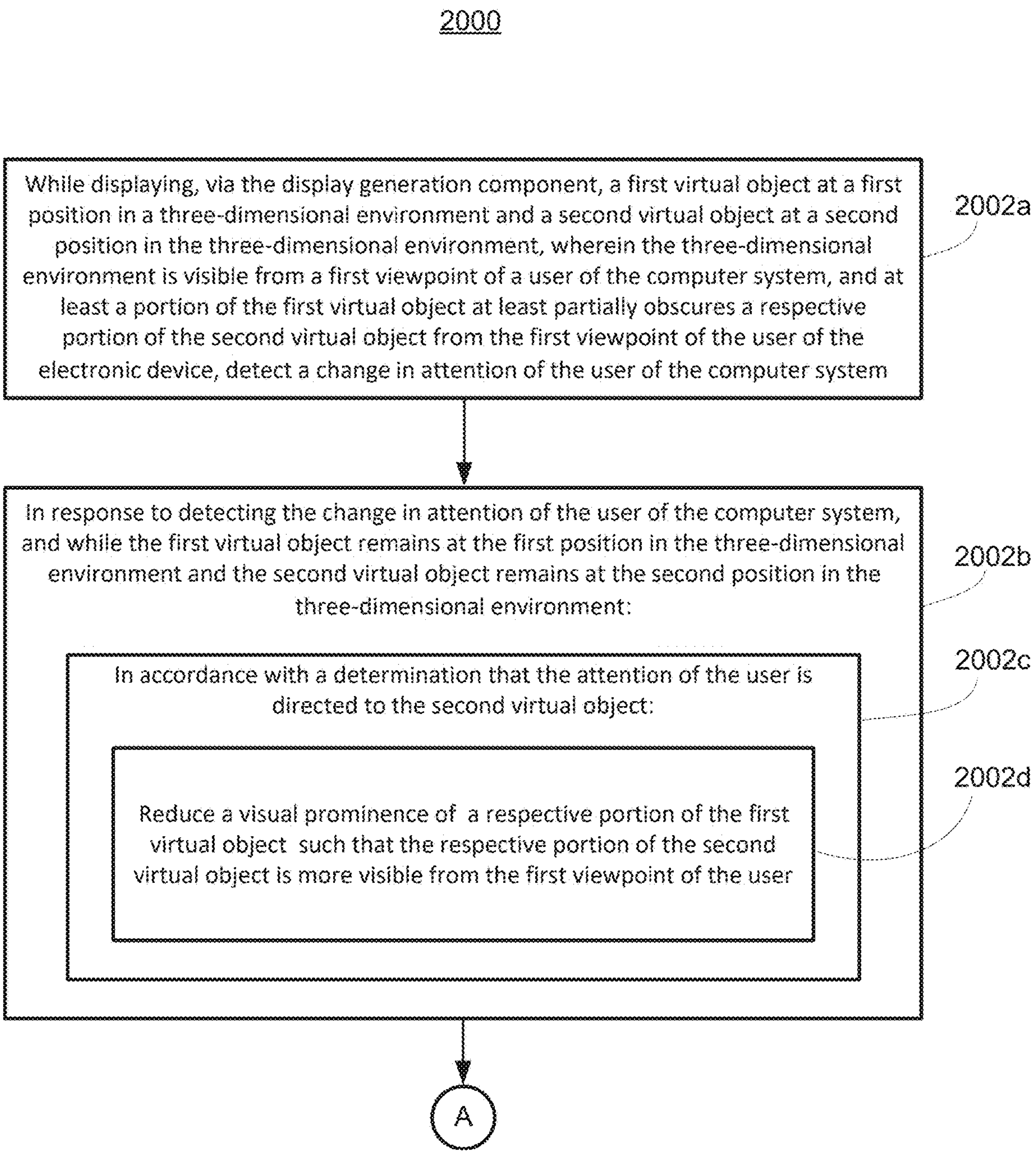
FIGS. 20A-20F is a flowchart illustrating a method of modifying visual prominence of respective virtual objects to modify apparent obscuring of the respective virtual objects by virtual content in accordance with some embodiments.
Figure 20B:
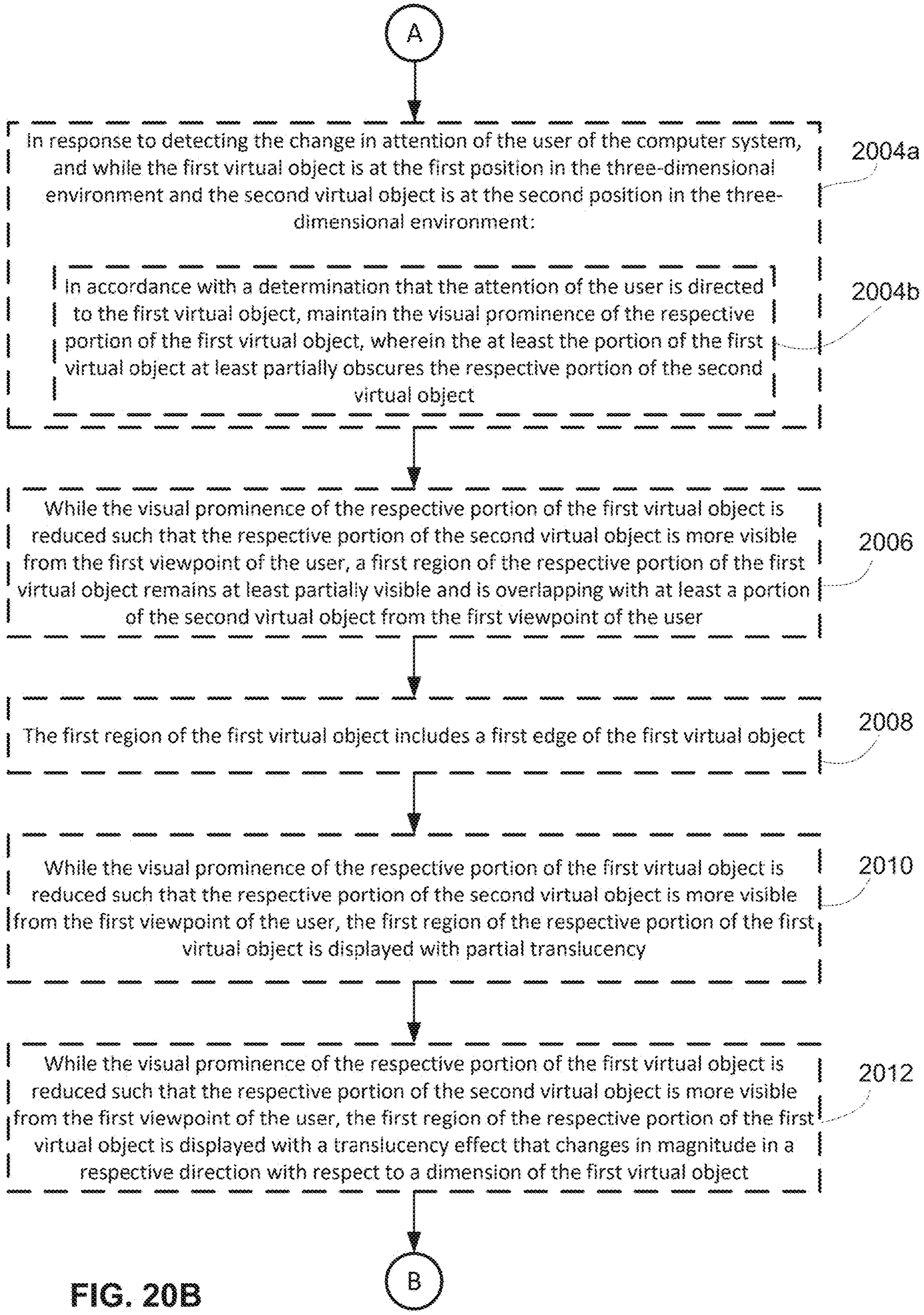
Figure 20C:
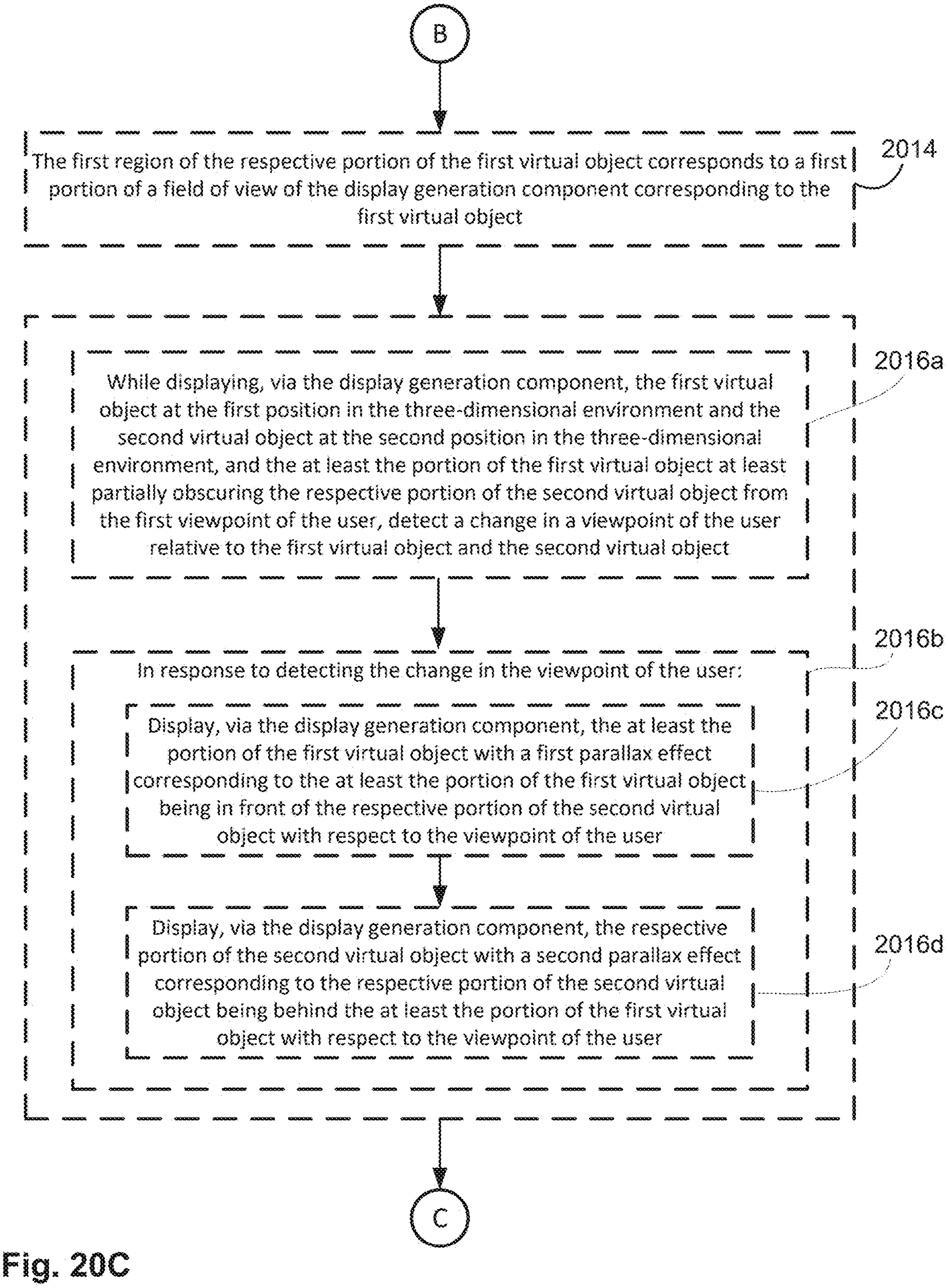
Figure 20D:
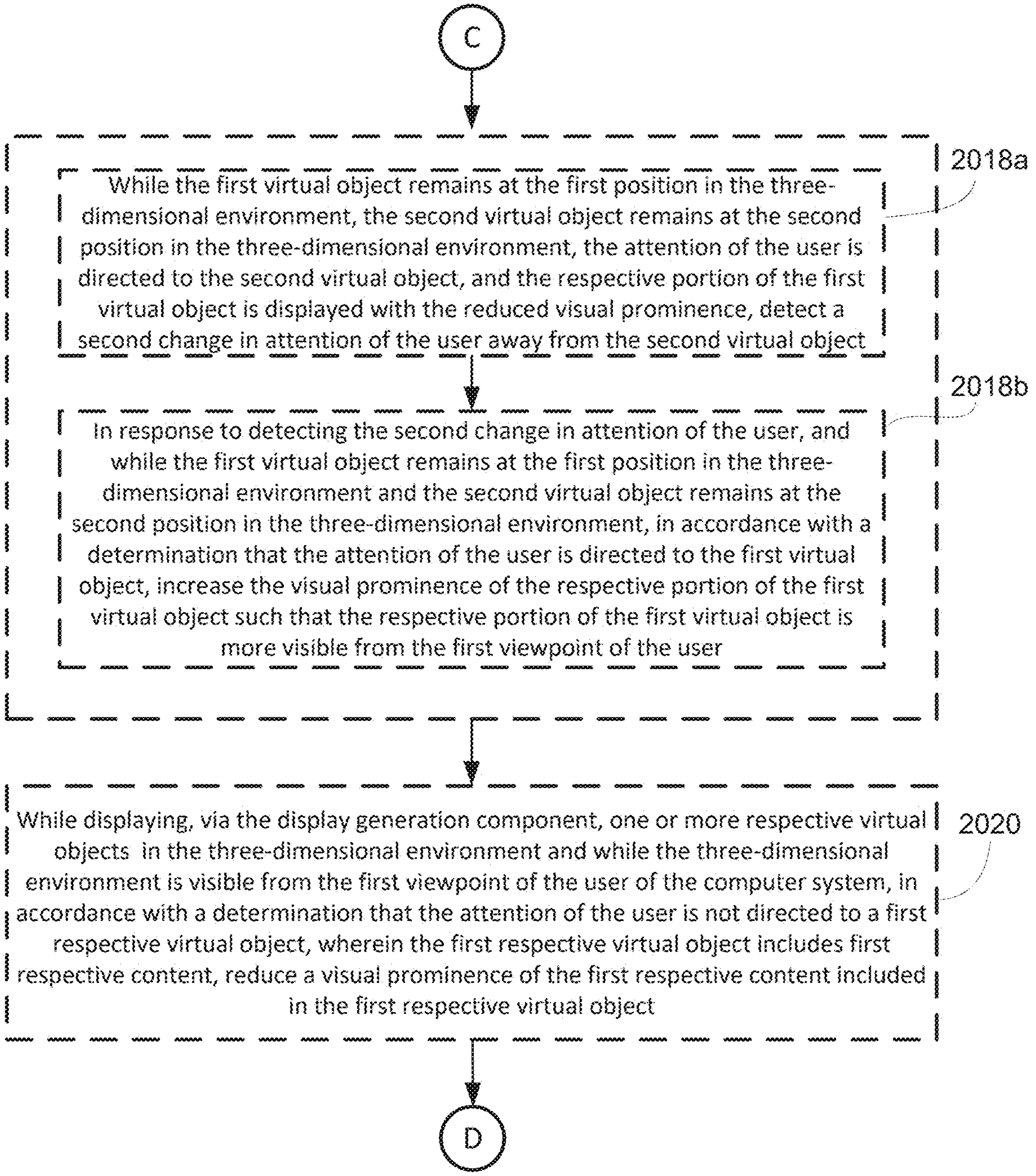
Figure 20E:
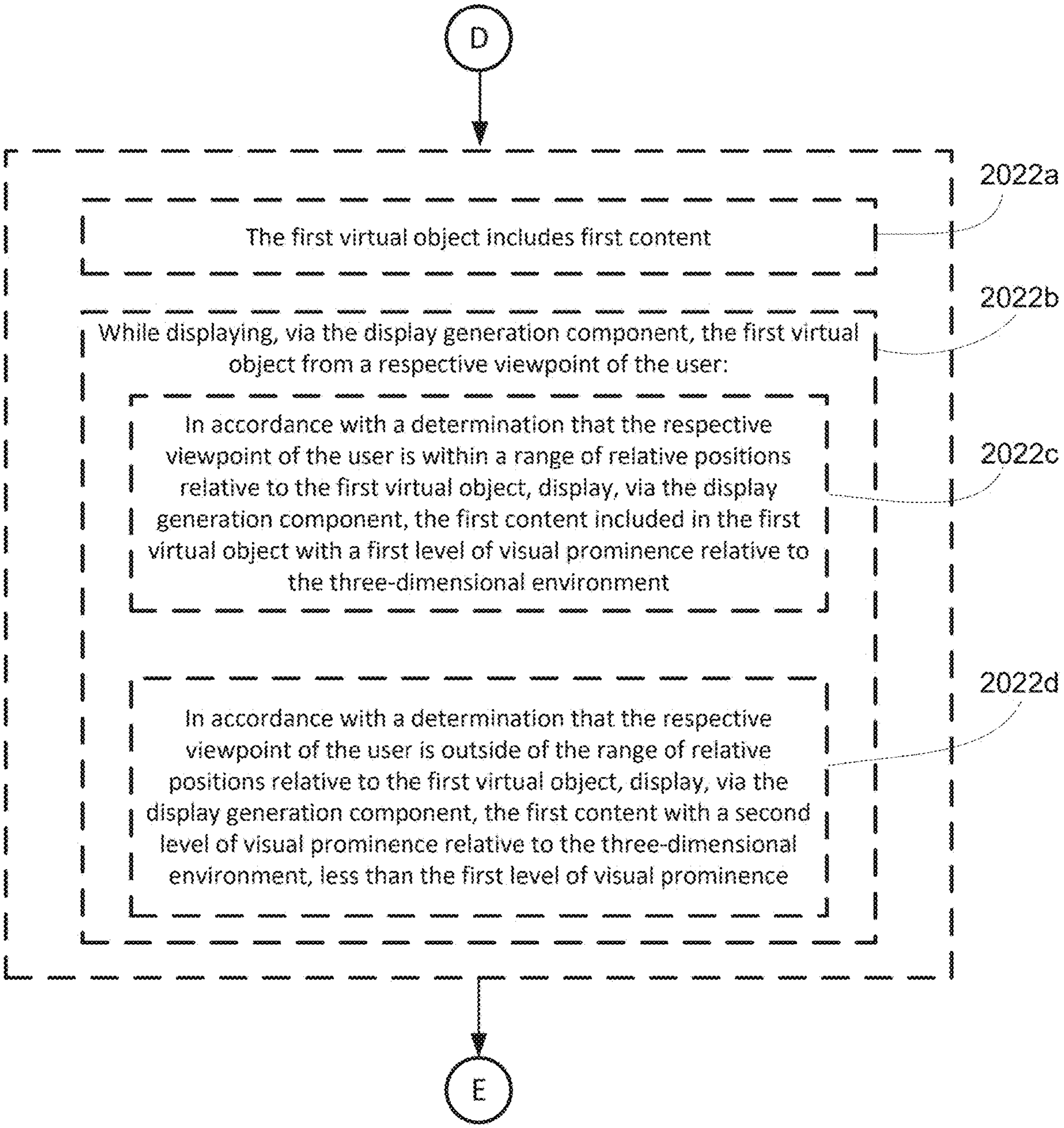
Figure 20F:
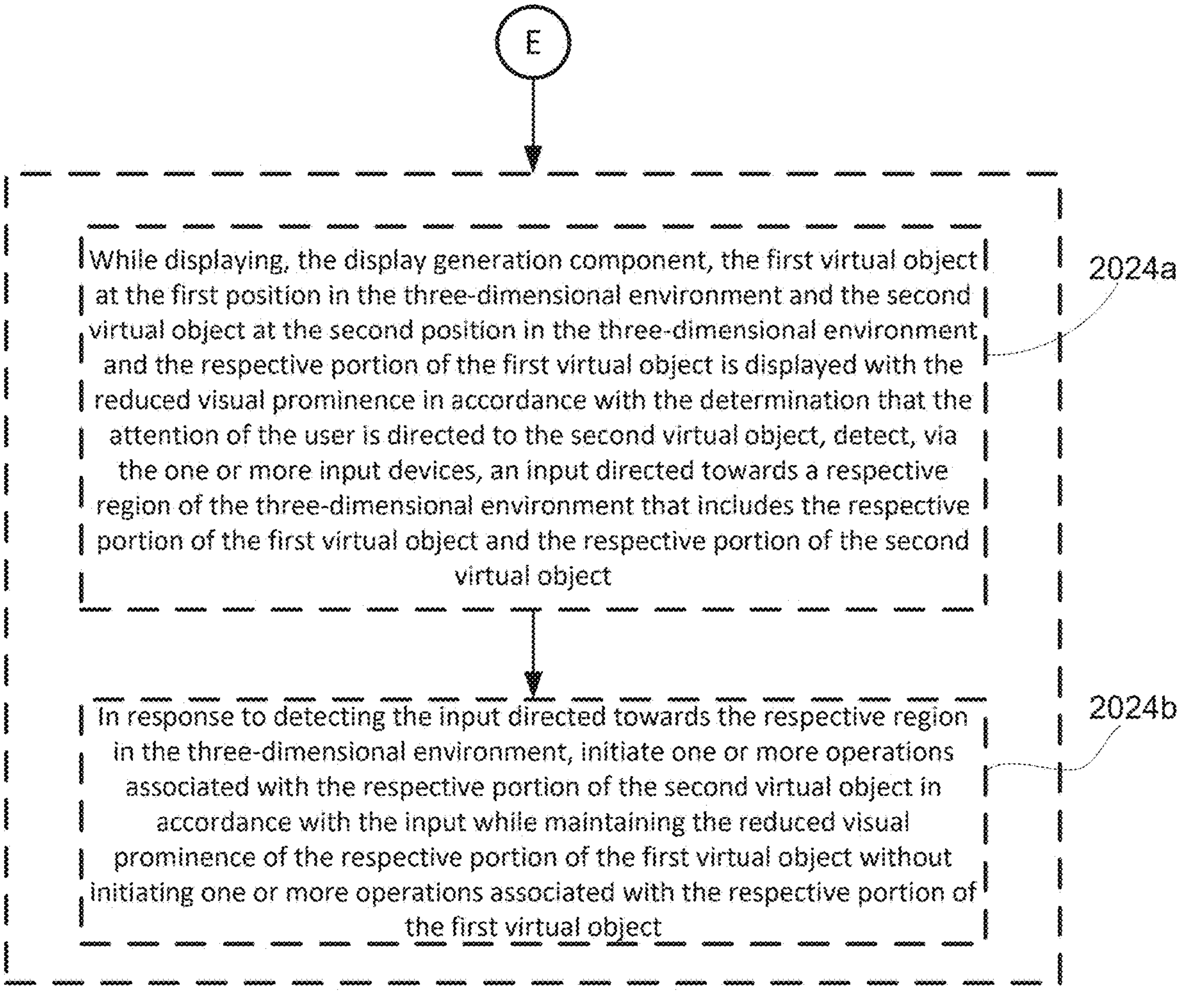

FIGS. 19C-19E illustrate examples of modifying visual prominence of objects based on orientation of the user's viewpoint relative to the objects, described in further detail with reference to method 2000. It is understood that in some embodiments, the embodiments described below additionally or alternatively apply to the embodiments described with reference to FIGS. 19A-19B. In some embodiments, computer system 101 detects input directed to one or more objects having respective orientations relative to viewpoint 1926*a*. In some embodiments, the input corresponds to an interaction with respective content of the one or more objects, rather than an express input to merely move and/or reorient the one or more objects. In some embodiments, in response to detecting the input, computer system 101 optionally initiates interaction with the respective virtual content (e.g., actuating of virtual buttons, playback of media content, and/or loading of web-based content included in a respective object), and simultaneously—or nearly simultaneously—initiates a process to modify respective orientations of the one or more objects relative to viewpoint 1926*a* to improve visibility and/or interactivity of the respective virtual content with the user. For example, in response to detecting an input to initiate text entry directed to a text entry field within a respective object far away from viewpoint 1926*a*, computer system 101 optionally initiates text entry, and moves and/or scales the respective object to facilitate further interaction (e.g., text entry) directed to the text entry field.

In FIG. 19C, objects 1914*a* and 1916*a* optionally are within a threshold distance (illustrated by threshold 1910) of viewpoint 1926*a* of the user. In some embodiments, if one or more objects are within the threshold distance of the viewpoint 1926*a*, computer system 101 displays the one or more objects respectively with a first level of visual prominence (e.g., 100% opacity and/or 100% brightness). In some embodiments, if one or more objects are not within the threshold distance of viewpoint 1926*a*, computer system 101 displays the one or more objects respectively with a second level of visual prominence, less than the first (e.g., 10% opacity and/or 10% brightness). For example, if objects 1914*a* and/or 1916*a* were outside threshold 1910, computer system 101 would display the objects 1914*a* and/or 1916*a* respectively with the second level of visual prominence. In some embodiments, computer system 101 modifies visual prominence based on an angular relationship between respective virtual objects and viewpoint 1926*a*. For example, zone 1928 associated with object 1916*b* as shown in the top-down view illustrates a region of environment 1902 within which object 1916*a* optionally is displayed with the first level of visual prominence. Because viewpoint 1926*a* is within the angles illustrated by zone 1928 relative to object 1916*b* in FIG. 19C, computer system 101 optionally displays the object 1916*a* with the first level of visual prominence.

From FIG. 19C to FIG. 19D, computer system 101 detects one or more inputs to move objects 1914*a* and/or 1916*a*, and initiate display of object 1918*a*. In FIG. 19D, object 1914*a* is outside threshold 1910 of viewpoint 1926*a*, and as such, computer system 101 displays object 1914*a* with a second level of visual prominence less than the first level of visual prominence. In some embodiments, computer system 101 displays object 1916*a* with a first level of visual prominence because viewpoint 1926*a* is within zone 1928 associated with object 1916*b* shown in the top-down view, and because object 1916*b* is within threshold 1910 of viewpoint 1926*a*. Similarly, computer system 101 displays object 1918*a* with the first level of visual prominence because viewpoint 1926*a* is within zone 1930 associated with object 1918*a* and within threshold 1910 of object 1918*a*.

From FIG. 19D to FIG. 19E, computer system 101 detects viewpoint 1926*a* shifts such that object 1914*a* and object 1918*a* are within the threshold distance of viewpoint 1926*a*, and viewpoint 1926*a* is outside of zone 1930 associated with object 1916*a*. As such, computer system 101 optionally displays object 1916*a* with the second level of visual prominence, lower than the first level of visual prominence, because viewpoint 1926*a* is outside a range of allowable viewing angles relative to object 1916*a*. In FIG. 19E, computer system 101 maintains display of objects 1914*a* and 1918*a* at their respective positions relative to environment 1902. In some embodiments, because the respective positions are both within a threshold distance of viewpoint 1926*a*, and viewpoint 1926*a* is within zones 1930 and 1932 of the objects 1914*a* and 1918*a*, computer system 101 modifies visual prominence of object 1914*a* to correspond to the first level of visual prominence, and maintains the display of 1918*a* with the first level of visual prominence.

FIGS. 20A-20F is a flowchart illustrating a method 2000 of modifying visual prominence of respective virtual objects to modify apparent obscuring of the respective virtual objects by virtual content in accordance with some embodiments. In some embodiments, the method 2000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2000 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1200 are, optionally, combined and/or the order of some operations is, optionally, changed.

In some embodiments, the method 2000 is performed at a computer system, such as computer system 101 in FIG. 19A, in communication with a display generation component, such as display generation component 120 as shown in FIG. 19A, and one or more input devices, such as trackpad 1905 as shown in FIG. 19A. In some embodiments, the computer system has one or more of the characteristics of the computer systems of methods 800, 1000, 1200, 1400, 1600 and/or 1800. In some embodiments, the display generation component has one or more of the characteristics of the display generation components of methods 800, 1000, 1200, 1400, 1600 and/or 1800. In some embodiments, the one or more input devices have one or more of the characteristics of the one or more input devices of methods 800, 1000, 1200, 1400, 1600 and/or 1800.

In some embodiments, while displaying, via the display generation component, a first virtual object, such as object 1914*a* as shown in FIG. 19A, at a first position in a three-dimensional environment, such as the position of object 1914*a* as shown in FIG. 19A, and a second virtual object, such as object 1916*a* as shown in FIG. 19A, at a second position in the three-dimensional environment (e.g., the first and/or second virtual objects optionally have one or more of the characteristics of the virtual objects of methods 800, 1000, 1200, 1400, 1600 and/or 1800), wherein the three-dimensional environment is visible from a first viewpoint of a user of the computer system, such as computer system viewpoint 1926*a* as shown in FIG. 19A, and at least a portion of the first virtual object at least partially obscures (e.g., the portion of the first virtual object has an opacity of greater than 0%, such as 10%, 20%, 50% or 100%) a respective portion of the second virtual object from the first viewpoint of the user of the electronic device, such as overlapping region 1912 as shown in FIG. 19A, the computer system detects (2002*a*) a change in attention of the user of the computer system, such as attention 1904-1 shown in FIG. 19A, (e.g., without detecting a change in the positions and/or orientations and/or relative spatial arrangements of the viewpoint of the user, the first virtual object and the second virtual object in the three-dimensional environment). In some embodiments, attention of the user is directed to the first virtual object. In some embodiments, the three-dimensional environment has one or more of the characteristics of the three-dimensional environments of methods 800, 1000, 1200, 1400, 1600 and/or 1800. For example, the first virtual object and the second virtual object optionally are user interfaces of respective applications including respective content (e.g., as described with respect to the first user interface object and/or second user interface object described with respect to method 1800) placed in the three-dimensional environment (XR, AR, or VR, as described with respect to method 1800) such that the first virtual object is positioned in between the second virtual object and the user in the three-dimensional environment, and a portion of the first virtual object obscures a portion of the second virtual object from the current viewpoint of the user. Thus, from the viewpoint of the user, the portion of the first virtual object optionally visually blocks viewing of the portion of the second virtual object, optionally dependent on opacity levels of the respective virtual objects. In some embodiments, the portion of the first virtual object visually blocking the portion of the second virtual object includes a first region and a second region, such that the first region visually blocks the portion of the second virtual object and the second region does not visually block the portion of the second virtual object. For example, the portion of the first virtual object optionally is displayed with a feathering visual effect, and the edge of the portion of the first visual object is optionally more/less translucent than a region of the portion of the first virtual object relatively closer to a center of the first virtual object. It is understood that the visual blocking is a simulated effect displayed by the computer system to mimic the appearance of a first physical object corresponding to the first virtual object that would visually block a second physical object corresponding to the second virtual object. The mimicked blocking, for example, optionally includes displaying a respective portion of the second virtual object with a degree of translucency such that relative to the user's viewpoint, it appears that the first virtual object is in front of the respective portion of the second virtual object. In some embodiments, in response to detecting that the user's attention shifts to the second virtual object, the computer system optionally initiates a process to present (e.g., reduce or eliminate the obstruction of) the obscured content in the second virtual object while maintaining the relative spatial arrangement of the respective virtual objects in the environment, as will be described below.

In some embodiments, in response to detecting the change in attention of the user of the computer system, and while the first virtual object remains at the first position in the three-dimensional environment and the second virtual object remains at the second position in the three-dimensional environment (2002*b*), such as shown in FIG. 19A, (e.g., the viewpoint of the user, the first virtual object and the second virtual object maintain their positions/orientations and/or their relative spatial arrangement in the three-dimensional environment), in accordance with a determination that the attention of the user is directed to the second virtual object (2002*c*), such as virtual object 1916*a* as shown in FIG. 19A, (e.g., the computer system optionally determines that the user's attention is directed to the second virtual object for at least a threshold amount of time (e.g., 0.1, 0.5, 1, 3, 5, 7, 10, or 15 seconds)), the computer system reduces (2002*d*) a visual prominence of (e.g., decreasing an opacity of, decreasing a size of, ceasing display of and/or one or more of the manners of reducing a visual prominence of, as described with reference to method 1800) a respective portion of the first virtual object, such as a reduction in visual prominence within effect region 1906 shown in FIG. 19B, (e.g., while maintaining the visual prominence, as described with reference to method 1800, of one or more other portions of the three-dimensional environment and/or other objects in the three-dimensional environment) such that the respective portion of the second virtual object is more visible from the first viewpoint of the user, such as a portion of object 1916*b* as shown in FIG. 19B (e.g., through the portion of the three-dimensional environment that is and/or was occupied by the respective portion of the first virtual object). In some embodiments, the first virtual object and the second virtual object are not necessarily static when the change in the user's attention is detected. For example, the respective (relative) positions of the respective virtual objects are optionally generally maintained, but optionally are subject to an animation (e.g., subtle scaling upwards, scaling downwards, and/or sliding upwards or downwards in the environment) to emphasize the shift in attention while maintaining at least partial obstruction of the second virtual object by the first virtual object from the first viewpoint of the user. In some embodiments, in response to detecting the user's attention is directed to the second virtual object, the computer system optionally displays respective one or more portions of the first virtual object that otherwise would obscure at least part of the second virtual object with a higher degree of translucency (e.g., a lower degree of opacity, such as decreasing from 100%, 80%, 50% or 30% opacity to 90%, 60%, 20%, 10% or 0% opacity), or optionally ceases display of the respective one or more portions. In this way, the respective one or more portions of the first virtual object optionally serve as a visual passthrough such that the entirety of the second virtual object (or at least a greater portion of the second virtual object than before the attention of the user was directed to the second virtual object) is visible from the viewpoint of the user while the spatial arrangement of the virtual objects is maintained. Reducing a visual prominence of a respective portion of the first virtual object obscuring a respective portion of the second virtual object based on attention of the user reduces the need for separate inputs to make the respective portion of the second virtual object visible from the viewpoint of the user.

In some embodiments, in response to detecting the change in attention (e.g., gaze) of the user of the computer system, such as attention 1904-2 as shown in FIG. 19B, and while the first virtual object is at the first position in the three-dimensional environment and the second virtual object is at the second position in the three-dimensional environment, such as objects 1914*a* and 1916*a* as shown in FIG. 19B, (e.g., as described with respect to step(s) 2002), in accordance with a determination that the attention of the user is directed to the first virtual object (2004*a*), such as attention 1904-2 as shown in FIG. 19B, (e.g., the attention of the user has moved within the first virtual object, rather than from the first virtual object to another object or portion of the three-dimensional environment), the computer system maintains (2004*b*) the visual prominence of the respective portion of the first virtual object, wherein the at least the portion of the first virtual object at least partially obscures the respective portion of the second virtual object, such as maintaining visual prominence within effect region 1906 as shown in FIG. 19B. In some embodiments, the computer system detects that the attention of the user is oriented towards the first virtual object (e.g., the respective portion of the first virtual object or a second, optionally different respective portion of the first virtual object), and forgoes modification of the visual prominence of the first respective portion of the first virtual object and/or a second respective portion of the second virtual object. Maintaining visual prominence of the respective portion of the first virtual object while user attention is directed to the first virtual object provides continued feedback that the first virtual object will receive inputs from the user when those inputs are provided, reducing the likelihood of erroneous inputs provided to the computer system.

In some embodiments, while the visual prominence of the respective portion of the first virtual object is reduced such that the respective portion of the second virtual object is more visible from the first viewpoint of the user, such as overlapping region 1912 corresponding to object 1914*a* as shown in FIG. 19B, a first region of the respective portion of the first virtual object, such as within effect region 1906 as shown in FIG. 19A remains at least partially visible and is overlapping with at least a portion of the second virtual object from the first viewpoint of the user (2006). For example, visual prominence of an edge of the first virtual object included within a region of the first virtual object and overlapping with a portion of the second virtual object optionally is displayed with a relatively lesser degree of transparency compared to a body (or remainder) of the respective portion of the first virtual object. In some embodiments, the respective portion of the first virtual object—referred to herein as an "first overlapping portion" of the first virtual object—visually conflicting with the respective portion of the second virtual object—referred to herein as a "second overlapping portion" of the second virtual object—optionally includes a first region (e.g., one or more edges) of the first virtual object that remains visible from the viewpoint of the user of the computer system while a second, different region of the overlapping portion of the first virtual object optionally is displayed with a reduced visual prominence as compared with the one or more edges of the first virtual object. In some embodiments, visual prominence of the first region included within the first overlapping portion of the first virtual object is displayed with a first reduced level of visual prominence and visual prominence of a second region (e.g., not an edge) included within the first overlapping portion of the first virtual object is displayed with a second reduced level of visual prominence, optionally more reduced (e.g., more transparent) than the first reduced level of visual prominence. In some embodiments, the second region within the first overlapping portion of the first virtual object are fully transparent and/or not visible from the first viewpoint of the user. In some embodiments, visual prominence of first respective region(s) of the first virtual object not included within the first overlapping portion of the first virtual object are maintained in response to the attention of the user shifting to the second virtual object. Maintaining visibility of a first region of a portion of the first virtual object indicates an amount of visual overlap between the first virtual object and the second virtual object, thus improving user understanding of an amount of re-orientation and/or virtual object movement required to reduce such an overlap, thereby improving interaction efficiency when re-orientating the viewpoint of the user and/or moving virtual objects.

In some embodiments, the first region of the first virtual object includes a first edge of the first virtual object (2008), such as an edge of object 1914*a* as shown in FIG. 19A. For example, the computer system optionally displays one or more portions of one or more edges of the first overlapping portion (e.g., described with respect to step(s) 2006) of the first virtual object with a relatively increased (e.g., third level of) visual prominence while attention of the user is directed to the second virtual object and a second region of first overlapping portion optionally is displayed with a decreased (e.g., fourth level of) visual prominence. In some embodiments, the one or more portions include first one or more portions of a first respective edge of the first region. In some embodiments, the one or more portions are displayed with a visual effect such as a brightness, halo effect, glowing effect, saturation, a translucency, and/or a specular highlight effect based on one or more optionally visible light sources within the three-dimensional environment to visually distinguish the one or more portions from the visible portion of the second respective object. For example, the one or more portions optionally are displayed with a visual appearance to simulate the effect of a light source placed above the viewpoint of the user and the first virtual object optionally at a depth between a respective position of the first virtual object and the viewpoint of the user. Including an edge in the region of the first virtual object that is at least partially visible indicates a boundary of an overlapping area, thus reducing visual clutter.

In some embodiments, while the visual prominence of the respective portion of the first virtual object, such a visual prominence of object 1914*a* as shown in FIG. 19B is reduced such that the respective portion of the second virtual object is more visible from the first viewpoint of the user, such as a respective portion of object 1916*a* as shown in FIG. 19B, the first region of the respective portion of the first virtual object is displayed with partial translucency, such as a partial translucency within effect region 1906 as shown in FIG. 19B (2010). For example, a first region of the respective portion of the first virtual object is optionally translucent (e.g., 5%, 10%, 15%, 20%, 25%, 30%, or 40% translucent) such that the first region does not distract from the visible, respective portion of the second virtual object sharing a visual region with the first region of the respective portion of the first virtual object. In some embodiments, the translucency is non-uniform (e.g., comprising a gradient) within the region, as will be described with more detail with reference to step(s) 2012. Displaying the first region with a partial translucency improves visibility of respective content included within the respective portion of the second virtual object, thus reducing the likelihood the user will incorrectly direct inputs towards or away from the region and ensuring that the content of the respective portion of the second virtual object is accurately displayed and/or visible.

In some embodiments, while the visual prominence of the respective portion of the first virtual object is reduced such that the respective portion of the second virtual object is more visible from the first viewpoint of the user, such as the visual prominence of effect region 1906 of object 1916*a* as shown in FIG. 19B the first region of the respective portion of the first virtual object is displayed with a translucency effect that changes in magnitude in a respective direction with respect to a dimension of the first virtual object (2012), such as the translucency effect within subregion 1908*b* as shown in FIG. 19A. For example, the computer system optionally displays an overlapping portion of the first virtual object with a gradient of translucency and/or a gradually increasing degree of translucency. In some embodiments, the translucency is relatively greater towards one or more edges that are closest to (e.g., conflicting with) one or more portions of the second virtual object. For example, an edge of a first overlapping portion of the first virtual object (described with respect to step(s) 2006) optionally is displayed with a first degree of transparency, and a region of the first overlapping portion of the first virtual object other than the edge (e.g., towards a center of the first virtual object) optionally is displayed with a second, relatively lesser degree of translucency. In some embodiments, the translucency is relatively lesser towards an edge of the first overlapping portion of the first virtual object. For example, the edge of the first overlapping portion of the first virtual object optionally is displayed with a third degree of transparency, and a region of the first overlapping portion away from the edge (e.g., towards the center) of the first virtual object is displayed with fourth, relatively greater degree of transparency. For example, a corner region of a rectangular or semi-rectangular first virtual object optionally overlaps with a corner region of a second rectangular or semi-rectangular second virtual object, and the computer system optionally displays areas of the corner region vertically and/or laterally proximate to the edges bordering the corner region with a relatively higher translucency than areas of the corner region further away from the edges of the corner region. In some embodiments, the computer system displays areas closer to the second virtual object with a higher opacity than areas further away from the second virtual object. In some embodiments, the translucency gradient increases or decreases in magnitude along a dimension of the first virtual object, such as a height, a width, towards the center, and/or away from an edge of the first virtual object relative to a viewpoint of the user. Displaying a gradually increasing degree of translucency indicates a direction of overlap, thus indicating an overlapping orientation between respective virtual objects and thereby guiding user focus to respective portions (e.g., centers) of respective virtual objects, thereby reducing cognitive burden of the user to gain an understanding of an overlapping arrangement and facilitating proper input for reducing or resolving the overlapping arrangement.

In some embodiments, the first region of the respective portion of the first virtual object corresponds to a first portion of a field of view of the display generation component corresponding to the first virtual object (2014), such as a field of view of display generation component 120 with respect to object 1914*a* as shown in FIG. 19A. In some embodiments, the first region—referred to herein as a "breakthrough region"—is at least partially visible while the respective portion of the first virtual object is displayed with a reduced prominence as described with respect to step(s) 2006. In some embodiments, at least the relative size or actual size of the breakthrough region is based on the field of view of the display generation component of the computer system. For example, the breakthrough region optionally consumes and/or corresponds to 0.01, 0.05, 0.1, 0.5, 1, 5, 10, 15 or 30 degrees of an optical field of view of the display generation component. In some embodiments, the breakthrough region consumes/corresponds an area based on the optical field of view of the display generation component and measured from a respective portion (e.g., an edge) of the first virtual object visually overlapping the second virtual object, optionally extending towards a second respective portion (e.g., a center) of the first virtual object. In some embodiments, the relative size and/or actual size of the breakthrough region is based on a percentage of an optical field of view of the display generation component. For example, the breakthrough region optionally consumes and/or corresponds to 0.01%, 0.05%, 0.1%, 0.5%, 1%, 5%, 10%, 15% or 30% of the optical field of view of the display generation component. Thus, in some embodiments, the breakthrough region is smaller from the user viewpoint if the user is closer to the first virtual object (e.g., the breakthrough region consumes more of the user's field of view) and the breakthrough region is larger from the user viewpoint if the user is further away from the first virtual object (e.g., the breakthrough region consumes less of the user's field of view). Displaying a first region of respective portion of the first virtual object based on a portion of a field of view of the display generation component lends a visually consistency to visually conflicting portions of respective objects, thus guiding user attention to respective portions of respective virtual objects and improving efficiency of interaction.

In some embodiments, while displaying, via the display generation component, the first virtual object at the first position in the three-dimensional environment and the second virtual object at the second position in the three-dimensional environment, such as the first position of object 1914*a* and the second position of object 1916*a* as shown in FIG. 19A, and the at least the portion of the first virtual object at least partially obscuring the respective portion of the second virtual object from the first viewpoint of the user, such as overlapping region 1912 as shown in FIG. 19A, the computer system detects (2016*a*) a change in a viewpoint of the user relative to the first virtual object and the second virtual object, such as a shift in viewpoint 19126*a* in FIG. 19A. For example, the computer system optionally detects movement of the viewpoint of the user to a new position within the three-dimensional environment (e.g., due to movement of the user in the physical environment) and/or a re-orienting of the viewpoint (e.g., due to head movement of the user) of the user of the computer system. In some embodiments, the change in viewpoint of the user results from inputs provided by one or more hands of the user (e.g., one or more hands of the user performing air pinch gestures in which the tips of the thumbs and index fingers come together and touch, followed by movement of the one or more hands while the index fingers and thumbs remain in contact—and the direction and/or magnitude of the change in the viewpoint optionally corresponding to the direction and/or magnitude of the movement of the one or more hands).

In some embodiments, in response to detecting the change in the viewpoint of the user (2016*b*), the computer system displays (2016*c*), via the display generation component, the at least the portion of the first virtual object with a first parallax effect corresponding to the at least the portion of the first virtual object being in front of the respective portion of the second virtual object with respect to the viewpoint of the user, such as a respective parallax effect respectively applied to portions of object 1914*a* as shown in FIG. 19A. In some embodiments, the computer system applies respective parallax effects to respective portions of virtual objects. For example, while a user walks radially from a center point between the first virtual object and the second virtual object, the computer system optionally displays a breakthrough region of the first virtual object with a first amount of parallax. In some embodiments, a level of parallax applied to a respective virtual object while the viewpoint of the user is changed is based upon the relative distance between the user and the respective virtual object. For example, in response to a detected change in viewpoint of the user, the computer system optionally visually displaces the respective portion of the first virtual object with a relatively lesser amount compared to the respective portion of the second virtual object, optionally to emulate the visual appearance of corresponding real-world objects in a similar arrangement as the first and second virtual objects.

In some embodiments, the computer system displays (2016*d*), via the display generation component, the respective portion of the second virtual object, such as object 1916*a* as shown in FIG. 19A with a second parallax effect corresponding to the respective portion of the second virtual object being behind the at least the portion of the first virtual object with respect to the viewpoint of the user, such as a parallax effect applied to portions of object 1916*a* as shown in FIG. 19A. In some embodiments, the computer system applies a second, optionally lesser or optionally greater level of parallax corresponding to a second parallax effect to the respective portion of the second virtual object. For example, the computer system optionally determines that the respective portion of the second virtual object optionally is relatively further away relative to the user compared to the respective portion of the first virtual object. As such, optionally in response to detecting a change in viewpoint of the user, the computer system optionally displays the respective portion of the second virtual object with a relatively lesser amount of parallax. Displaying respective parallax effects based on a relative depth between portions of virtual objects and a viewpoint of a user improves intuition and perception of the spatial arrangement of the virtual objects, thus improving the user's ability to visually focus on the virtual objects during and after changing the user viewpoint.

In some embodiments, while the first virtual object remains at the first position in the three-dimensional environment, the second virtual object remains at the second position in the three-dimensional environment, such as objects 1914*a* and 1916*a* as shown in FIG. 19B, the attention of the user is directed to the second virtual object, such as attention 1904-2 as shown in FIG. 19B, and the respective portion of the first virtual object is displayed with the reduced visual prominence, such as object 1914*a* as shown in FIG. 19A, the computer system detects (2018*a*) a second change in attention of the user away from the second virtual object, such as attention 1904-1 as shown in FIG. 19B. In some embodiments, the detection of the second change in attention of the user has one or more characteristics of detecting the change in attention of the user described with respect to step(s) 2002.

In some embodiments, in response to detecting the second change in attention of the user, and while the first virtual object remains at the first position in the three-dimensional environment and the second virtual object remains at the second position in the three-dimensional environment, in accordance with a determination that the attention of the user is directed to the first virtual object, the computer system increases (2018*b*) the visual prominence of the respective portion of the first virtual object such that the respective portion of the first virtual object is more visible from the first viewpoint of the user, such as the visual prominence of object 1914*a* as shown in FIG. 19A. For example, user attention previously shifted away from the first virtual object, and the computer system optionally detects a second shift in user attention back to the first virtual object. In some embodiments, the viewpoint of the user and/or the spatial arrangement of respective virtual objects are not modified between the initial detection of shift in attention and the second detection of shift in attention. In some embodiments, in response to detecting the second shift in attention, visual prominence of the respective portion of the first virtual object is increased similarly to the increase in the respective portion of the second virtual object described with respect to step(s) 2002 and/or opposite to the reduction of visual prominence the respective portion of the first virtual object described with respect to step(s) 2002. In some embodiments, the increase in visual prominence of the first virtual object differs from the increase in prominence of the second virtual object (e.g., is relatively lesser or greater). In some embodiments, the increasing of visual prominence is relative to a second visual prominence of the respective portion of the second virtual object. In some embodiments, the visual prominence of the respective portion of the second virtual object is reduced in response to the second shift in attention, such as described with reference to the reduction in visual prominence of the first virtual object described with reference to step(s) 2002 and/or the opposite of the increase in visual prominence of the second virtual object described with reference to step(s) 2002. Increasing visual prominence of the respective portion of the first virtual object indicates user focus has shifted back to the first virtual object, and allows the user better visibility of contents included within the respective portion, thus guiding user inputs to the subject of the user's attention.

In some embodiments, while displaying, via the display generation component, one or more respective virtual objects (e.g., the first virtual object, the second virtual object and/or one or more other virtual objects) in the three-dimensional environment and while the three-dimensional environment is visible from the first viewpoint of the user of the computer system, such as objects 1914*a* and 1916*a* as shown in FIG. 19A, in accordance with a determination that the attention of the user is not directed to a first respective virtual object, wherein the first respective virtual object includes first respective content, such as object 1916*a* as shown in FIG. 19A, the computer system reduces (2020) a visual prominence of the first respective content included in the first respective virtual object, such as content included in object 1916*a* as shown in FIG. 19A. In some embodiments, the computer system visually deemphasizes one or more respective virtual objects and/or content included within the one or more respective virtual objects in response to determining that user attention is not directed to the one or more respective virtual objects. For example, while an XR environment optionally is visible via the display generation component, the computer system optionally detects attention of the user directed to a region within the environment, such as empty space within the environment, a non-interactable object within the environment, and/or a first window including a user interface of a first application within the environment. In response to detecting user attention is directed towards the region (e.g., not directed to one or more respective windows that are not the first window), the computer system optionally displays the one or more respective windows and/or the content of the respective windows with a reduced visual prominence. For example, in response to detecting user attention shift to the region (e.g., to a second window of the respective one or more virtual objects) within the three-dimensional environment (e.g., away from the previously described first window), the computer system optionally displays respective content included within the respective one or more objects with a similarly reduced visual prominence (e.g., respective content within the first window). Similarly, as described with respective to step(s) 2002, in some embodiments, content within the second virtual object is displayed with a reduced visual prominence while attention of the user is directed to the first virtual object. In some embodiments, the reduced visual prominence has one or more characteristics of the reduction of visual prominence described with respect to the first virtual object in step(s) 2002. Displaying respective virtual objects and/or content that are not subject of user attention with a reduced visual prominence visually guides the user to direct inputs towards targets of user attention, thereby reducing inputs erroneously directed to virtual objects and/or content that are not subject of user attention.

In some embodiments, the first virtual object includes first content (2022*a*) (e.g., corresponding to respective content described with respect to step(s)s 2010 and 2020). In some embodiments, while displaying, via the display generation component, the first virtual object from a respective viewpoint of the user (2022*b*), such as object 1914*a* as shown in FIG. 19C from viewpoint 1926*a* (e.g., the respective viewpoint of the user is a current viewpoint of the user wherein the first virtual object and the second virtual object described with respect to step(s) 2002 are optionally visible), in accordance with a determination that the respective viewpoint of the user is within a range of relative positions relative to the first virtual object, the computer system displays (2022*c*), via the display generation component, the first content included in the first virtual object with a first level of visual prominence relative to the three-dimensional environment, such as content included in object 1914*a* as shown in FIG. 19A. In some embodiments, displaying and/or modifying visual prominence of respective content included in respective virtual object(s) in accordance with a determination that the user viewpoint is within a range of relative positions relative to the first virtual object is similar or the same as described with respect to display of visual prominence of respective virtual objects as described with respect to method 1600.

In some embodiments, in accordance with a determination that the respective viewpoint of the user is outside of the range of relative positions relative to the first virtual object, such as outside of zone 1928 as shown in FIG. 19E and/or outside of threshold 1910 as shown in FIG. 19E, the computer system displays (2022*d*), via the display generation component, the first content with a second level of visual prominence relative to the three-dimensional environment, less than the first level of visual prominence, such as object 1916*a* as shown in FIG. 19E. In some embodiments, displaying and/or modifying visual prominence of respective content included in respective virtual object(s) in accordance with a determination that the user viewpoint is outside of the range of relative positions relative to the first virtual object is similar or the same as described with respect to display of visual prominence of respective virtual objects as described with respect to method 1600. Modifying visual prominence of content within the first virtual object based on a viewpoint of the user improves the likelihood the user can properly view the content prior to interacting with the first virtual object and/or the content, thereby reducing the likelihood the user undesirably interacts with the first virtual object and/or content without sufficient visibility of the content.

In some embodiments, while displaying, the display generation component, the first virtual object at the first position in the three-dimensional environment and the second virtual object at the second position in the three-dimensional environment and the respective portion of the first virtual object is displayed with the reduced visual prominence (e.g., as described with respect to step(s) 2002), such as objects 1914*a* and 1916*a* as shown in FIG. 19B in accordance with the determination that the attention of the user is directed to the second virtual object, the computer system detects (2024*a*), via the one or more input devices, an input directed towards a respective region of the three-dimensional environment that includes the respective portion of the first virtual object and the respective portion of the second virtual object, such as input from hand 1903 directed to trackpad 1905 while attention 1904-2 is directed to a portion of object 1916*a* within overlapping region 1912 as shown in FIG. 19B (optionally through the respective portion of the first virtual object). For example, the computer system optionally detects user attention (e.g., gaze) is directed to the respective portion of the second virtual object, and optionally detects a concurrent input directed to the respective portion of the second virtual object. The input optionally includes any manner of interaction with the second virtual object and/or content within the second virtual object, such as selection of a virtual button, initiation of text entry, and/or manipulation of the second virtual object in position and/or scale. In some embodiments, the respective region of the three-dimensional environment includes a rectangular elliptical, or circular region relative to a current viewpoint of the user. In some embodiments, the respective region additionally includes a depth (e.g., the respective region is shaped similarly to a rectangular prism). In some embodiments, the profile of the respective region is based on one or more dimensions of respective portions of the first virtual object and/or the second virtual object. For example, the respective region optionally is centered on a lateral and/or vertical center of the respective portion of the first virtual object and the respective portion for the second virtual object relative to a current viewpoint of the user when the input directed towards the respective region optionally is received. In some embodiments, the input directed towards the respective portion of the second virtual object has one or more of the characteristics of the input(s) described with reference to method 1800.

In some embodiments, in response to detecting the input directed towards the respective region in the three-dimensional environment, the computer system initiates (2024*b*) one or more operations associated with the respective portion of the second virtual object in accordance with the input, such as one or more operations associated with object 1916*a* as shown in FIG. 19B. while maintaining the reduced visual prominence of the respective portion of the first virtual object without initiating one or more operations associated with the respective portion of the first virtual object, such as maintaining the visual prominence of objects 1914*a* and 1916*a* as shown in FIG. 19B. For example, in response to detecting the input, the computer system optionally performs one or more operations associated with the virtual button such as a refresh of a web browsing application, an initiation of text entry, a scaling of the second virtual object, and/or a movement of the second virtual object. Thus, in some embodiments, although the respective portion of the first virtual object is between and visually overlapping the respective portion of the second virtual object relative to the viewpoint of the user, user input directed to the region that otherwise would interact with the first virtual object (e.g., content within the first virtual object such as a virtual button) instead interacts with the second virtual object (e.g., content within the second virtual object) as indicated by the relatively reduced prominence of the respective portion of the first virtual object, thereby effectively bypassing the overlapping portion of the first virtual object. In some embodiments, if the input optionally is directed to the same region and/or the same position while the first virtual object is displayed with a relatively increased (e.g., not reduced) visual prominence (e.g., is the subject of the user's attention), the computer system optionally initiates one or more functions associated with the first virtual object (e.g., actuates a virtual button within the respective region of the first virtual object), and forgoes initiation of one or more functions associated with the second virtual object. In some embodiments, if the input includes a movement of the second virtual object such that the respective portion of the second virtual object is relatively closer to a viewpoint of the user than the respective portion of the first virtual object, the computer system optionally modifies visual prominence of the first virtual object and/or the second virtual object. For example, the first virtual object and the second virtual object optionally are displayed with respective visual prominence as described with respect to step(s) 2002, however, the second virtual object optionally is "between" the user viewpoint and the first virtual object, at least partially obscuring the first virtual object (e.g., in one or more of the manners and/or having one or more of the characteristics of the first virtual object as described with reference to step(s) 2002). As described with respect to step(s) 2018, in some embodiments, user attention shifts back to the first virtual object, and the respective portion of the first virtual object is increased in visual prominence. In some embodiments, while displaying, via the display generation component, the first virtual object at the first position in the three-dimensional environment and the second virtual object at the second position in the three-dimensional environment and the respective portion of the first virtual object is displayed with an increased visual prominence (e.g., is not reduced), in accordance with a determination that the attention of the user is directed to the first virtual object, the computer system detects, via the one or more input devices, an input directed towards the respective portion of the first virtual object, and in response to detecting the input directed towards the respective portion of the first virtual object, initiates one or more operations associated with the respective portion of the first virtual object in accordance with the input while maintaining the visual prominence of the respective portion of the first virtual object and without initiating one or more operations associated with the respective portion of the second virtual object. Initiating operations in response to input directed to the respective portion of the second virtual object that is behind the respective portion of the first virtual object reduces user input required to rearrange the virtual objects and/or update the user viewpoint that would otherwise be required to interact with the respective portion of the second virtual object.

It should be understood that the particular order in which the operations in method 2000 have been described is merely exemplary and is not intended to indicate that the described order is the only order in which the operations could be performed. One of ordinary skill in the art would recognize various ways to reorder the operations described herein.

In some embodiments, a computer system 101 determines one or more regions of the three-dimensional environment 2102 relative to a virtual object associated with changing or maintaining levels of visual prominence of one or more portions of the virtual object. A level of visual prominence is optionally indicative of a spatial and/or visual relationship between a current viewpoint of a user of the computer system 101 relative to the virtual object, and is optionally further indicative of a level of interaction available to the user with the virtual object while the user is positioned and/or oriented at the current viewpoint.

In some embodiments, one or more first regions are associated with maintaining level(s) of visual prominence in response to detecting movement of a current viewpoint of the user within a respective region of the one or more first regions. In some embodiments, one or more second regions are associated with changing the level(s) of visual prominence in response to detecting movement of a current viewpoint, including a change in a viewing angle (described further below) of the user relative to the virtual object within a respective region of the one or more second regions. In some embodiments, one or more third regions are associated with changing the level(s) of visual prominence in response to detecting movement of a current viewpoint, including a change in a distance of the user relative to the virtual object within a respective region of the one or more third regions. In some embodiments, one or more fourth regions are associated with changing the level(s) of visual prominence in response to detecting movement of a current viewpoint, including a change in a viewing angle and/or distance of the user relative to the virtual object within a respective region of the one or more second regions. In some embodiments, one or more fifth regions—other than the one or more first, second, third, and/or fourth regions—are associated with displaying the virtual object and maintaining the virtual object with a relatively reduced level of visual prominence.

In some embodiments, the various one or more regions described herein are respectively associated with one or more thresholds in viewing angle and/or distance between the current viewpoint and the virtual object. In some embodiments, a level of interactivity with the virtual object is based on a determination that user input is detected while the current viewpoint corresponds to the first, second, third, fourth, and/or fifth one or more regions.

FIGS. 21A-21L illustrate examples of a computer system 101 modifying or maintaining levels of visual prominence of one or more virtual objects in response to detecting changes in a current viewpoint of a user of a computer system 101.

Figure 21A:
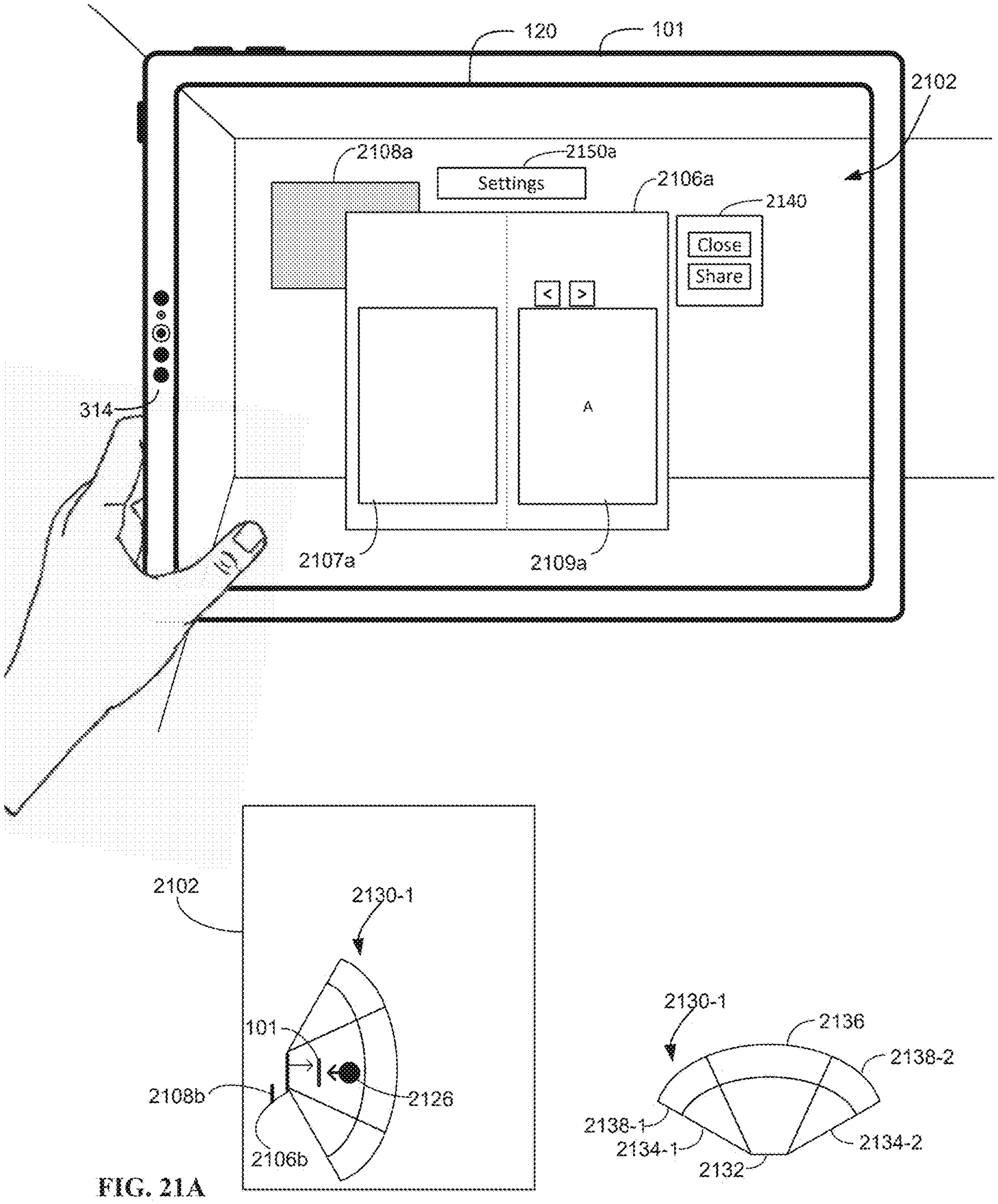
FIGS. 21A-21L illustrate examples of a computer system gradually modifying visual prominence of respective virtual objects in accordance with changes in viewpoint of a user in accordance with some embodiments.

FIG. 21A illustrates a three-dimensional environment 2102 visible via a display generation component (e.g., display generation component 120 of FIG. 1) of a computer system 101, the three-dimensional environment 2102 visible from a viewpoint 2126 of a user illustrated in the overhead view (e.g., facing the back wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 21A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2102 and/or the physical environment is visible in the three-dimensional environment 2102 via the display generation component 120. For example, three-dimensional environment 2102 visible via display generation component 120 includes representations of the physical floor and back walls of the room in which computer system 101 is located.

In FIG. 21A, three-dimensional environment 2102 includes virtual objects 2106*a* (corresponding to object 2106*b* in the overhead view), 2108*a* (corresponding to object 2108*b* in the overhead view), 2150*a* (corresponding to object 2150*b*, not yet shown in the overhead view), and 2140. In some embodiments, objects are associated with one another. For example, object 2106*a* optionally included virtual content, and object 2140 optionally includes one or more selectable options to interact with (e.g., share, close, copy, and/or scale) content included in object 2106*a*. In FIG. 21A, the visible virtual objects are two-dimensional objects. It is understood that the examples of the disclosure optionally apply equally to three-dimensional objects. The visible virtual objects are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101 101.

Object 2106*a* is optionally a virtual object including virtual content, such as content 2107*a* and content 2109*a*. Such content is optionally one or more user interfaces of applications, one or more virtual windows of an internet browsing applications, and/or one or more instances of media. Object 2106*a* is associated with one or more virtual objects, such as object 2140 (e.g., object 2140 optionally includes a menu of selectable options, selectable to initiate operations to modify and/or interact with content included in object 2106*a* and/or other interactions with object 2106*a*). Object 2150*a* optionally includes one or more user configurable settings and is optionally associated with an operating system of the computer system 101. Object 2150*a* optionally additionally or alternatively includes one or more notifications associated with the operating system of computer system 101 and/or other software applications included in computer system 101 and/or in communication with computer system 101. Object 2108*a* is optionally a virtual object including respective virtual content, displayed at a relatively reduced level of visual prominence relative to the three-dimensional environment 2102 (e.g., a reduced opacity, brightness, saturation, obscured by a blurring effect, and/or another suitable visual modification) because object 2108*a* is beyond a threshold distance (e.g., 0.01, 0.1, 1, 10, 100, or 1000 m) from the current viewpoint 2126.

Object 2106*a* is optionally associated with one or more regions of the three-dimensional environment 2102 associated with changing the level of visual prominence of object 2106*a*. For example, viewing region 2130-1 includes a plurality of such regions, and is illustrated in the overhead view—overlaid over an overhead view of an extended reality environment (e.g., the left-hand instance of viewing region 2130-1) and reproduced for visual clarity (e.g., the right-hand instance of viewing region 2130-1). As shown in FIG. 21A, viewpoint 2126 corresponds to (e.g., is located within) primary region 2132. While a current viewpoint of the user of the computer system 101 remains within the primary region 2132, the computer system 101 optionally determines that a user of the computer system 101 has a relatively improved view of object 2106*a* and/or is within one or more operating parameters for viewing and/or interacting with object 2106*a*. Accordingly, the computer system 101 optionally displays object 2106*a* with a first level of visual prominence (e.g., with a 100%, or nearly 100% level of brightness, opacity, saturation, and/or not including a blurring effect), in contrast to the relatively reduced level of visual prominence of object 2108*a*. While the current viewpoint of the user changes within the primary region 2132, the computer system 101 optionally maintains the first level of visual prominence. Although not shown, in some embodiments, an additional sub-region of primary region 2132 is associated with decreasing visual prominence (e.g., if the current viewpoint moves within a threshold distance of object 2108*a*, as described further with reference to method 2200). It is understood that the description of the one or more regions presented herein optionally apply to other objects (e.g., object 2108*a*). Embodiments associated with object(s) and region(s) of the three-dimensional environment, and describing changes in level of visual prominence based on user viewpoint relative to objects are described with reference to method 2200.

Figure 21B:
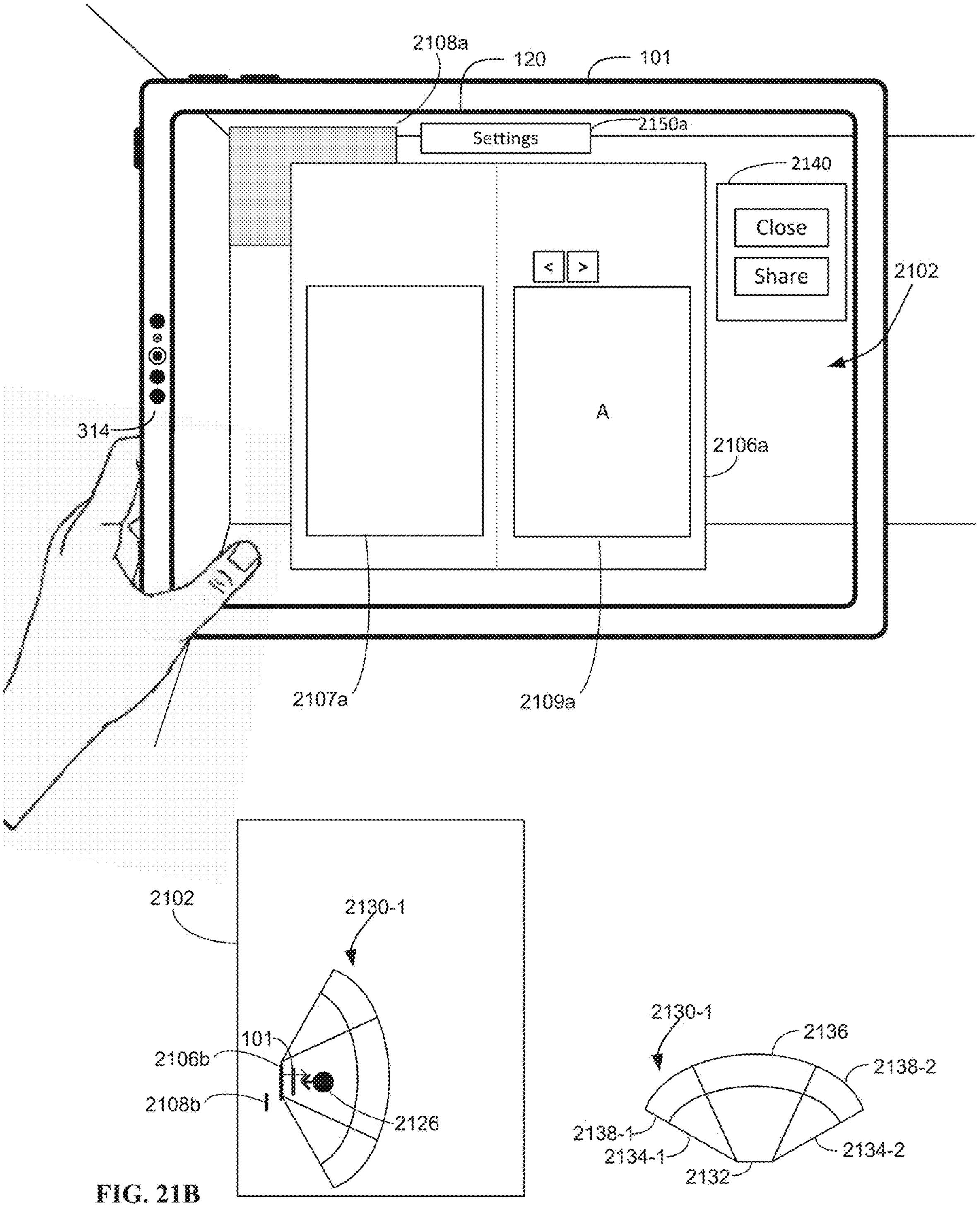

In FIG. 21B, the current viewpoint of the user of the computer system 101 moves within the primary region. For example, viewpoint 2126 moves closer to object 2106*b* in the overhead view, and the first level of visual prominence is maintained as shown by object 2106*a*, content 2107*a*, and content 2109*a*. While displaying object 2106*a* and its respective content with the first level of visual prominence, the user is able to interact with the respective content and initiate one or more operations associated with the respective content and/or object 2106*a*, as described further with reference to method 2200. For example, the computer system 101 optionally detects one or more text entry inputs directed to content 2107*a*, and in response, optionally displays text based on the one or more text entry input(s). Additionally or alternatively, the computer system 101 optionally detects one or more inputs initiating media playback of media included in content 2109*a*, and in response, initiates playback of the media. Similarly, object 2140 includes one or more selectable options to perform one or more operations relative to object 2106*a*, such as closing one or more instances of respective content included in object 2106*a*, and/or sharing object 2106*a* and/or its respective content with another user of another computer system 101.

In FIG. 25C, the current viewpoint of the user moves outside of the primary region into an off-angle region. For example, viewpoint 2126 moves within a first off-angle region, optionally corresponding to off-angle region 2134-2 included in viewing region 2130-1, optionally past an initial threshold angle defining a viewing angle boundary between primary region 2132 and the respective off-angle region. As described with reference to method 2200, while the current viewpoint changes in viewing angle within a respective off-angle region (e.g., region 2134-2 and/or 2134-1), the computer system 101 optionally modifies the level of visual prominence of object 2106*a* in accordance with the changes in viewing angle.

Figure 21C:
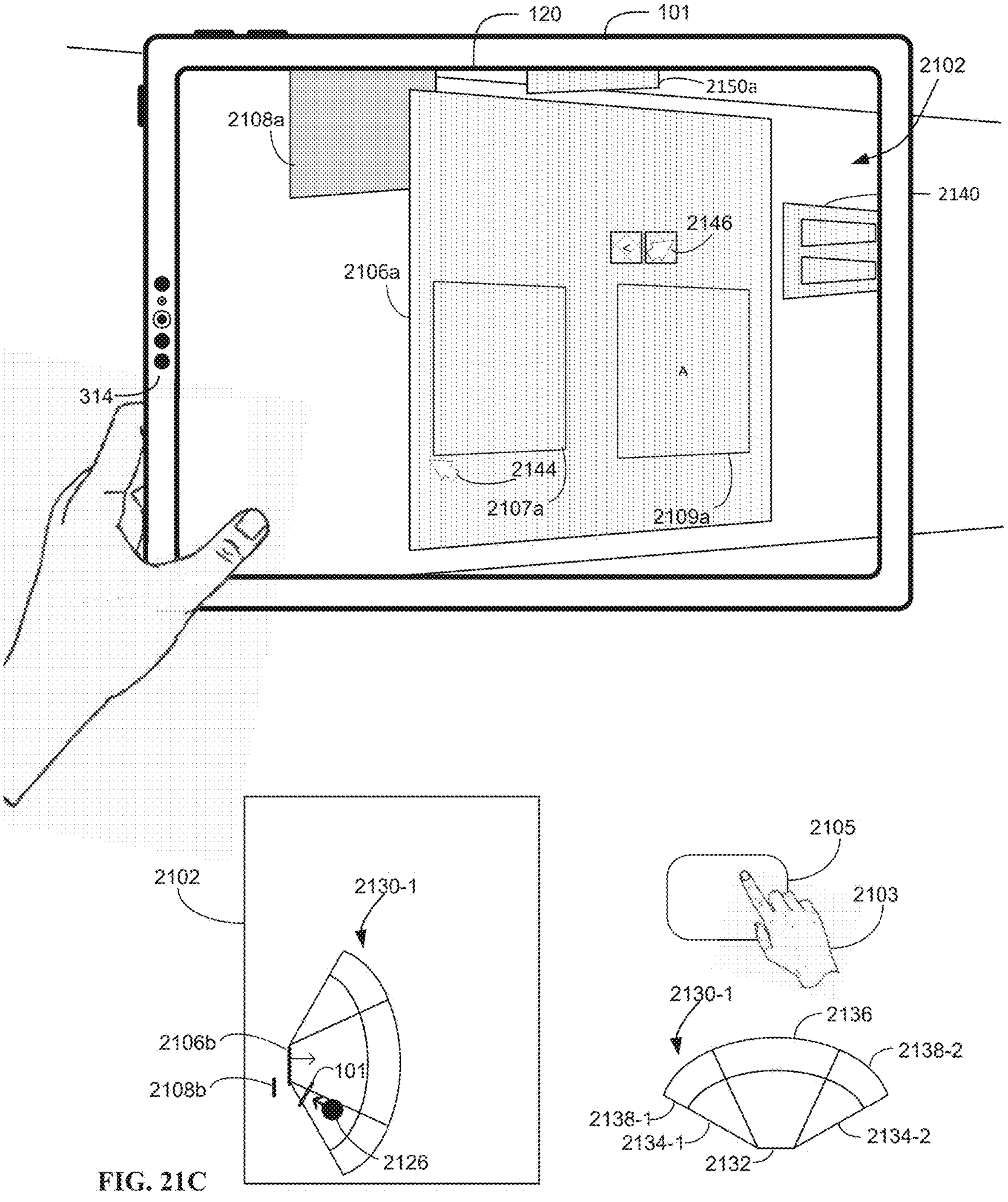

As described herein, the computer system 101 optionally determines a viewing angle based on the angle formed between a vector (optionally not displayed) extending from a respective portion (e.g., a center and/or on a first side) of an object and a vector (optionally not displayed) extending from a respective portion (e.g., a center) of a current viewpoint of the user, optionally projected onto a plane associated with the three-dimensional environment 2102. For example, the computer system 101 as shown in FIG. 21C determines the viewing angle based on a normal vector extending from a front surface of object 2106*a* and a center of the user's viewpoint, projected onto a plane parallel to the floor of the three-dimensional environment 2102 and/or tangent to the lowest edge of object 2106*a*.

In response to changes in current viewpoint decreasing such a viewing angle, the computer system 101 optionally increases the level of visual prominence of object 2106*a*. In response to changes in current viewpoint increasing such a viewing angle, the computer system 101 optionally decreases the level of visual prominence of object 2106*a*. Thus, changes in current viewpoint toward or away from primary region 2132 optionally are determined to be and/or correspond to inputs requesting an increase or decrease in the level of visual prominence of object 2106*b*. In some embodiments, when the viewing angle of the current viewpoint 2126 exceeds a second threshold (e.g., greater than the threshold defining the transition from the primary region 2132 and off-angle region 2134-2), the computer system 101 further decreases a level of visual prominence and/or further limits interaction with object 2106*a*, described further below and with reference to method 2200.

In some embodiments, the computer system 101 concurrently changes the level of visual prominence of other objects associated with object 2106*a*, such as object 2140 and/or object 2150*a* based on changes of respective viewing angles formed between the respective objects and the current viewpoint. In some embodiments, the computer system 101 maintains the visual prominence of objects such as object 2150*a*. For example, object 2150*a* is maintained at the first level of visual prominence because one or more system settings are optionally always interactable provided its contents are at least partially visible (e.g., a virtual button is visible), optionally independent of a distance and/or viewing angle between viewpoint 2126 and object 2150*a*.

In some embodiments, computer system 101 detects one or more inputs directed to content included in object 2106*a* while the current viewpoint corresponds to an off-angle regions 2134-1 and/or 2134-2. While the current viewpoint corresponds to a respective off-angle region, the computer system 101 optionally is responsive to user input directed to the content. For example, cursor 2144 is optionally indicative of a movement (e.g., scrolling) operation directed to content 2107*a*. In some embodiments, hand 2103 of the user of the computer system 101 contacts surface 2105, and based on detected movement of the contact, the computer system 101 accordingly moves (e.g., scrolls) content 2107*a*. In some embodiments, surface 2105 is included in the computer system 101, and/or another computer system 101 in communication with computer system 101.

Cursor 2146 is optionally indicative of a selection of a selectable option associated with content 2109*a*. For example, cursor 2146 optionally selects a selectable option to advance a queue of web browsing pages, modify a currently playing media item, and/or advance through a queue of media content included in content 2109*a*. Input(s) indicated by cursor 2146 are optionally performed based on input between hand 2103 and surface 2105, similar to as described with reference to cursor 2144. It is understood that additional or alternative inputs (e.g., air gestures, other stylus or pointing devices, mouse devices, and/or attention of the user) optionally can be used to perform such one or more operations, as described further with reference to method 2200.

Figure 21D:
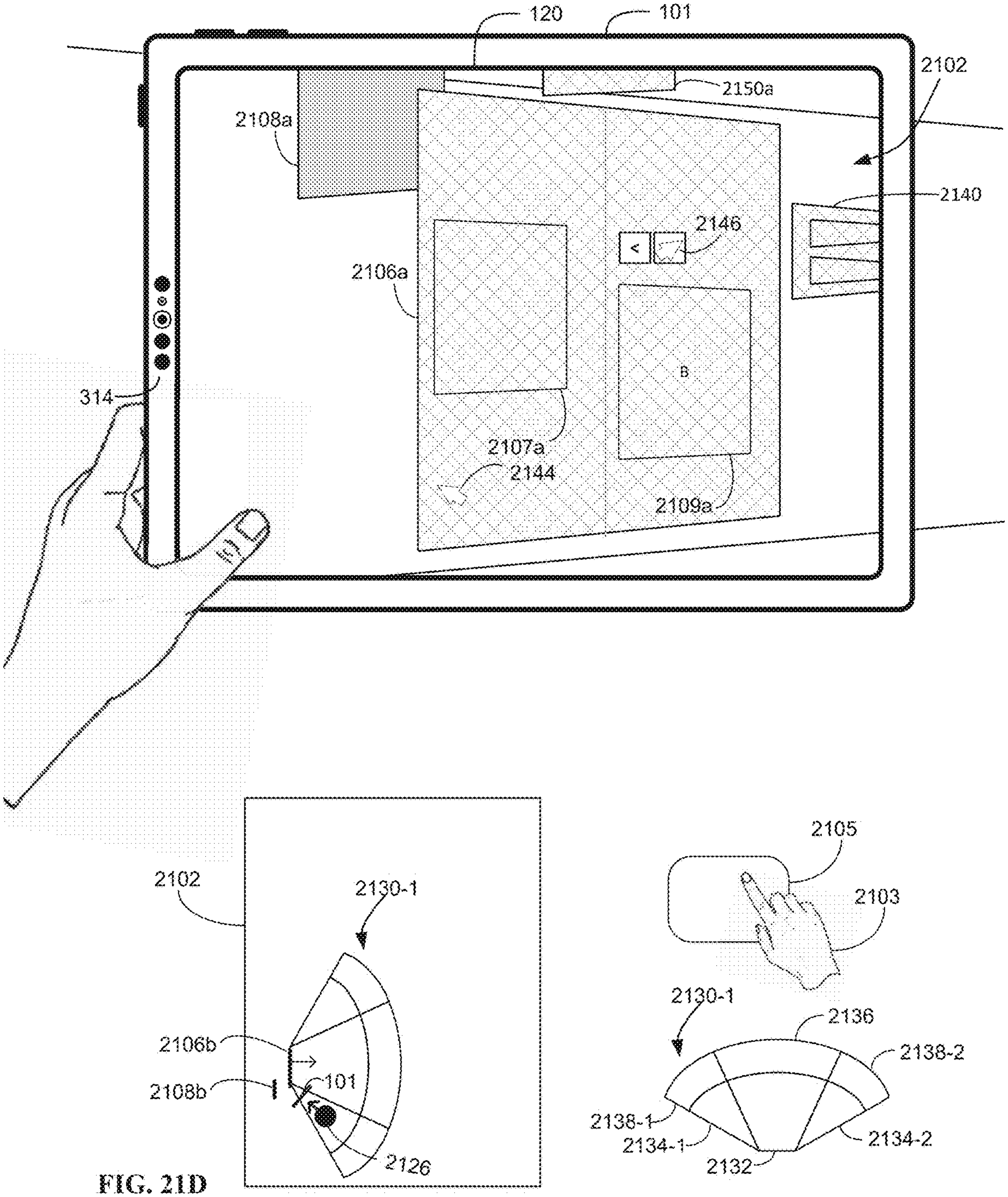

In FIG. 21D, viewpoint 2126 moves further off-angle into off-angle region 2134-2, past a threshold angle while the scrolling initiated in FIG. 21C continues. In response to the detected changes increasing the viewing angle, the computer system 101 optionally further decreases the level of visual prominence of object 2106*a*, object 2108*a*, and/or object 2140. In response to the previous scrolling input received in FIG. 21C, content 2107*a* is optionally moved (e.g., scrolled). Additionally or alternatively, in response to the previous selection input indicated by cursor 2146 in FIG. 21C, content 2109*a* is changed to include new content. Additionally or alternatively, the computer system 101 optionally further decreases the level visual prominence of object 2140, optionally concurrently with the changes to object 2106*a*.

As described above, the computer system 101 optionally determines that the current viewpoint of the user has exceeded a viewing angle when the inputs indicated by cursor 2144 (e.g., a continuous scrolling) and cursor 2146 (e.g., a new, discrete selection of a selectable option). As described further below, the computer system 101 optionally continues ongoing inputs (e.g., cursor 2144) initiated prior to exceeding the threshold viewing angle, but ignores new inputs (e.g., cursor 2146) detected after exceeding the threshold.

Figure 21E:
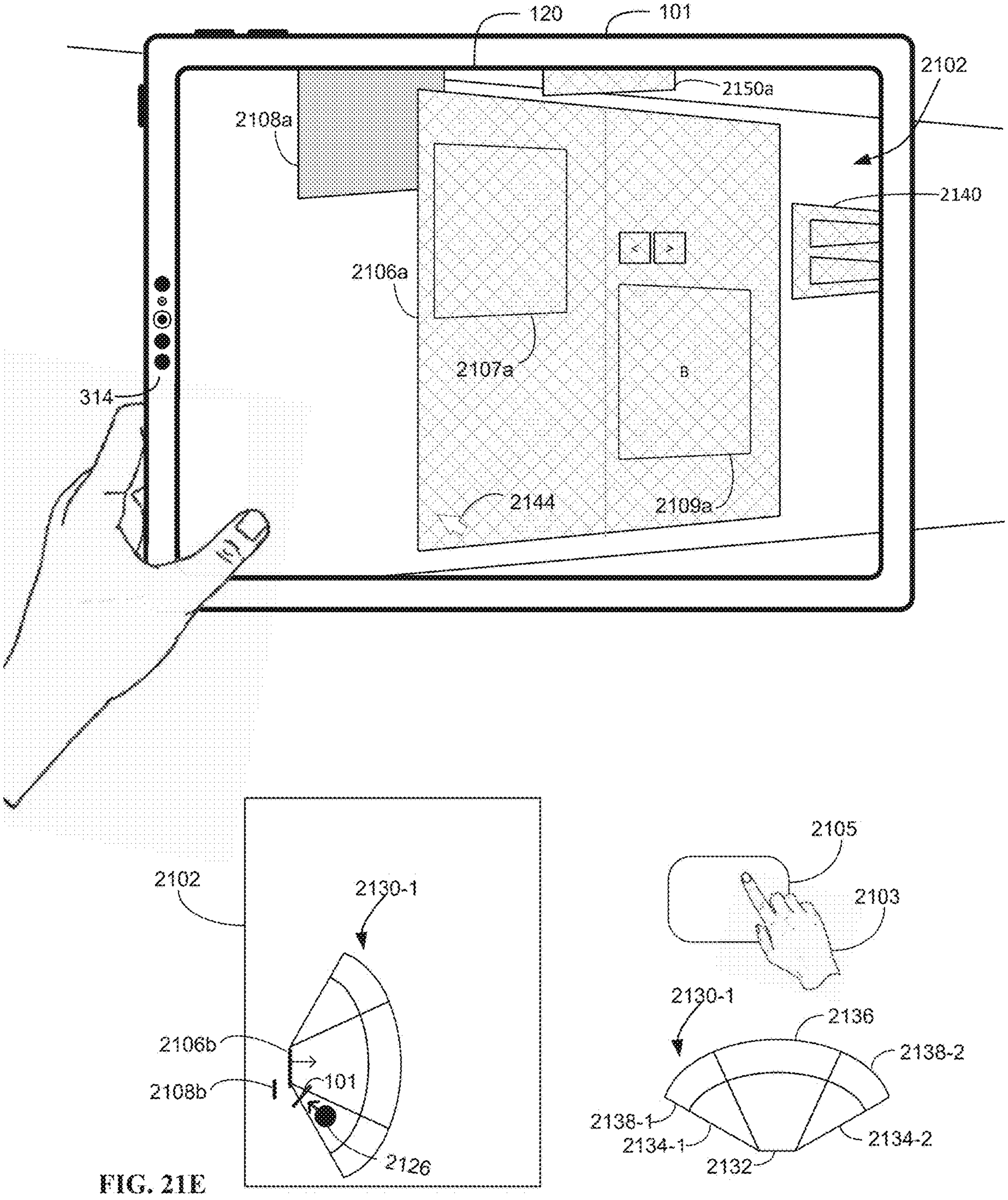

In FIG. 21E, in response to the inputs corresponding to cursor 2144 in FIG. 21D, content 2107*a* is moved (e.g., scrolled). In response to the input corresponding to cursor 2146 in FIG. 21D, content 2109*a* is unchanged, whereas the movement of content 2107*a* continues. In some embodiments, the computer system 101 remains responsive to inputs (e.g., similar to as described with reference to FIG. 21B and/or FIG. 21C) while the current viewpoint corresponds to a respective off-angle region, and does not limit interaction (e.g., consideration of newly detected input such as the selection of the selectable option) until the current viewpoint exceeds an upper bound threshold of the off-angle region, described further with reference to FIG. 21G and method 2200. In some embodiments, the level of visual prominence of object 2106*a* is independent of a distance between the current viewpoint and object 2106*a* while the current viewpoint corresponds to a respective off-angle region.

Figure 21F:
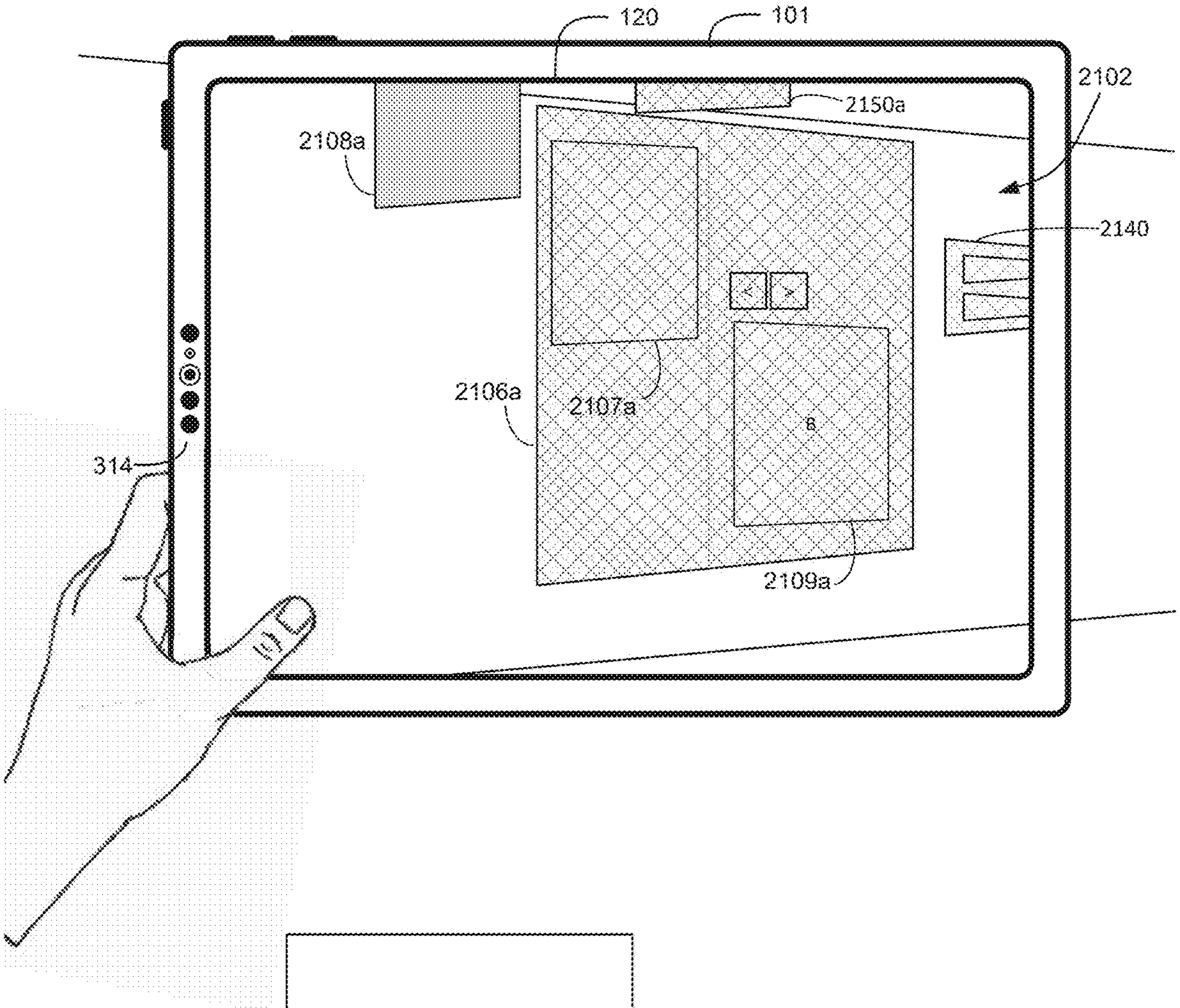
Figure 21F:
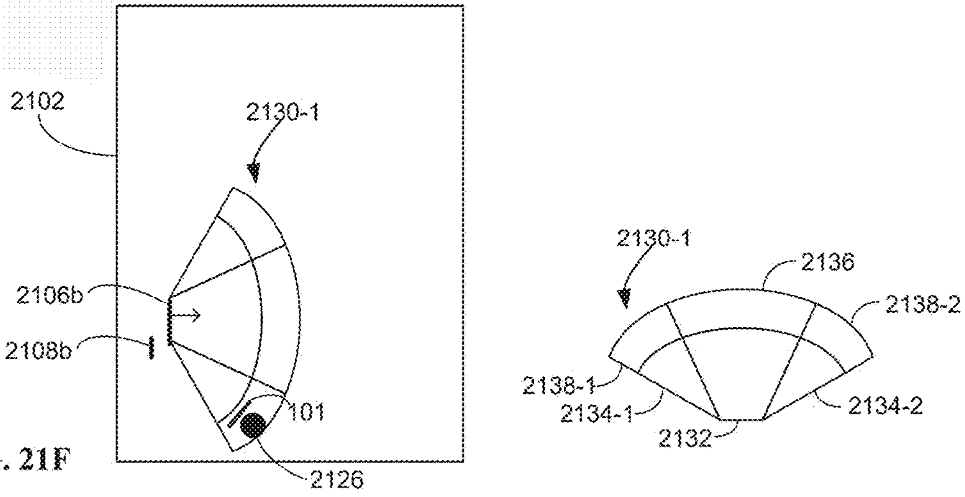

In FIG. 21F, the computer system 101 detects the current viewpoint of the user of the computer system 101 move into a hybrid off-angle and distance-based region of the three-dimensional environment 2102. For example, viewpoint 2126 optionally corresponds to (e.g., is located in) hybrid region 2138-2 as shown in the overhead view. In some embodiments, the computer system 101 decreases the level of visual prominence of object 2106*a* based on the viewing angle described above, and additionally based on a change in viewing distance from object 2106*a*. The viewing distance optionally corresponds to a distance extending from a portion of a virtual object (e.g., object 2106*a*) to a portion of the computer system 101 and/or a user of the computer system 101 (e.g., computer system 101 and/or the user's body). For example, from FIG. 21E to FIG. 21F, the viewing angle of viewpoint 2126 is maintained, but a distance between the object 2106*a* and viewpoint 2126 increases. During such a movement of the current viewpoint, the level of visual prominence of object 2106*a* is optionally maintained while the current viewpoint is within off-angle region 2134-2 (e.g., not yet within hybrid region 2138-2). In accordance with a determination that viewpoint 2126 exceeds a threshold distance, and with the determination that the current viewpoint already has exceeded the threshold viewing angle described with reference to off-angle region 2134-2, the computer system 101 begins to reduce the level of visual prominence of object 2106*a* based on the continuing increase in viewing distance between viewpoint 2126 and object 2106*a*. For example, the object 2106*a* as shown in FIG. 21F is relatively more transparent, dimmer, and/or less saturated compared to as shown in FIG. 21E.

While viewpoint 2126 moves within the hybrid region 2134-2, the computer system 101 optionally decreases the level of visual prominence in response to detecting increases in the viewing distance between viewpoint 2126 and object 2106*a*, optionally increases the level of visual prominence in response to detecting decreases of the viewing distance, and optionally changes the level of visual prominence in response to changes in the viewing angle in ways similar to as described with reference to the off-angle region 2134-2 previously. In some embodiments, the net effect to the level of visual prominence of object 2106*a* is the same as a sum of comparable changes in viewing distance (e.g., while changing viewing distance within distance region 2136, described further below) and changes in viewing angle (e.g., while changing viewing angle within viewing region 2134-2). In some embodiments, the net effect to the level of visual prominence is greater or less than the sum of such comparable changes, described further with reference to method 2200. Similar description of hybrid region 2138-2 applies to hybrid region 2138-1.

Figure 21G:
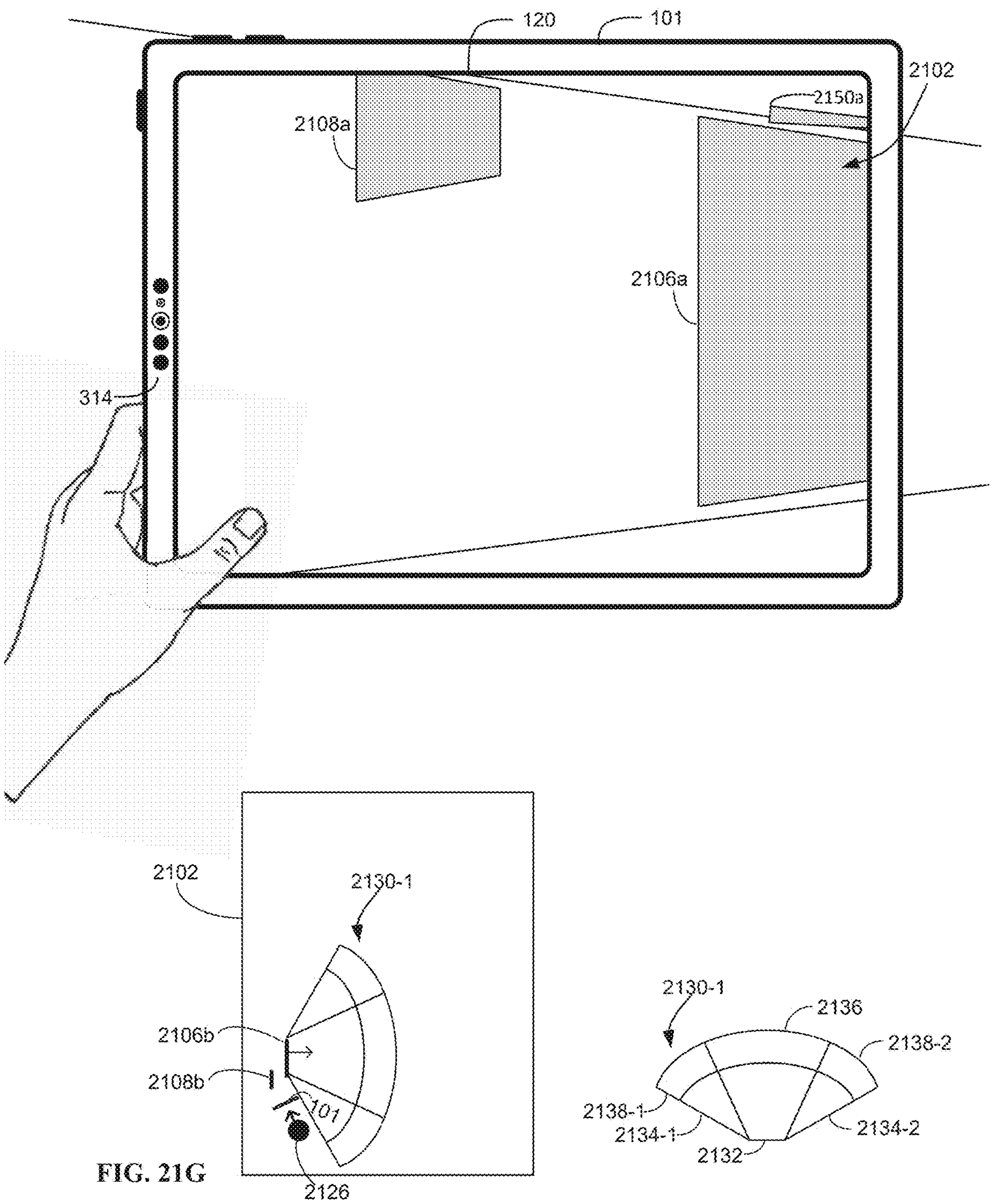

In FIG. 21G, the current viewpoint of the user shifts outside of the off-angle regions, the hybrid regions, and the distance-based region(s), to an abstraction region. For example, viewpoint 2126 has exceeded an upper bound threshold viewing angle associated with off-angle region 2134-2. It is understood that similar description of the abstraction region related to viewing angle additionally or alternatively applies to viewing distance from object 2106*a*. In some embodiments, the computer system 101 determines that the current viewpoint is far off-angle, far away, and/or close to a virtual object such that interactivity with the virtual object should be severely limited, and/or levels of visual prominence should be significantly changed.

As shown in FIG. 21G, the computer system 101 optionally applies a color or pattern fill over object 2106*a*, and optionally adds additional visual elements (e.g., a border and/or edge), and/or modifies an opacity, brightness, and/or saturation of the object 2106*a*, and/or ceases display of content included in object 2106*a*, described further with reference to method 2200. Thus, computer system 101 optionally presents an abstracted form of object 2106*a* to indicate that the object is not optimized for interaction at the current viewpoint, and/or limits interaction (e.g., selection of buttons, display of media, and/or movement of content) with the object and its virtual content. In some embodiments, media playback continues, such as audio that was previously playing prior to the current viewpoint entering the abstraction region.

Figure 21H:
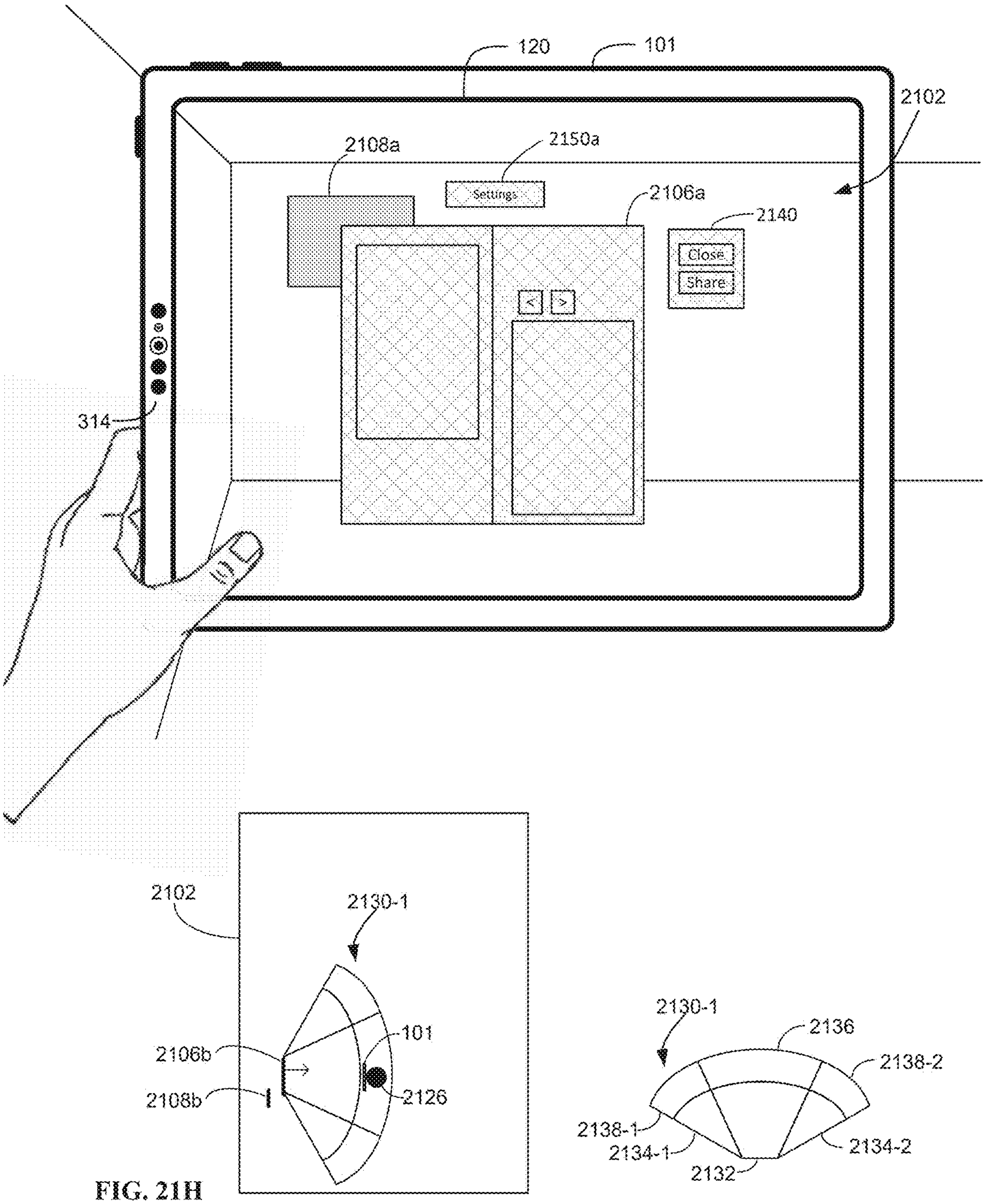

In FIG. 21H, the current viewpoint of the user shifts to a distance-based region corresponding to a range of not preferred viewing distances relative to object 2106*a*. For example, the computer system 101 optionally determines one or more viewing distance thresholds relative to the object 2106*a* (optionally bounded by viewing angle threshold associated with adjacent hybrid regions 2138-1 and 2138-2). While the current viewpoint of the user changes within the distance region 2136, the computer system 101 optionally decreases the level of visual prominence of object 2106*a* (and/or object 2140) in accordance with changes in viewing distance, optionally independently of changes in viewing angle.

Figure 21I:
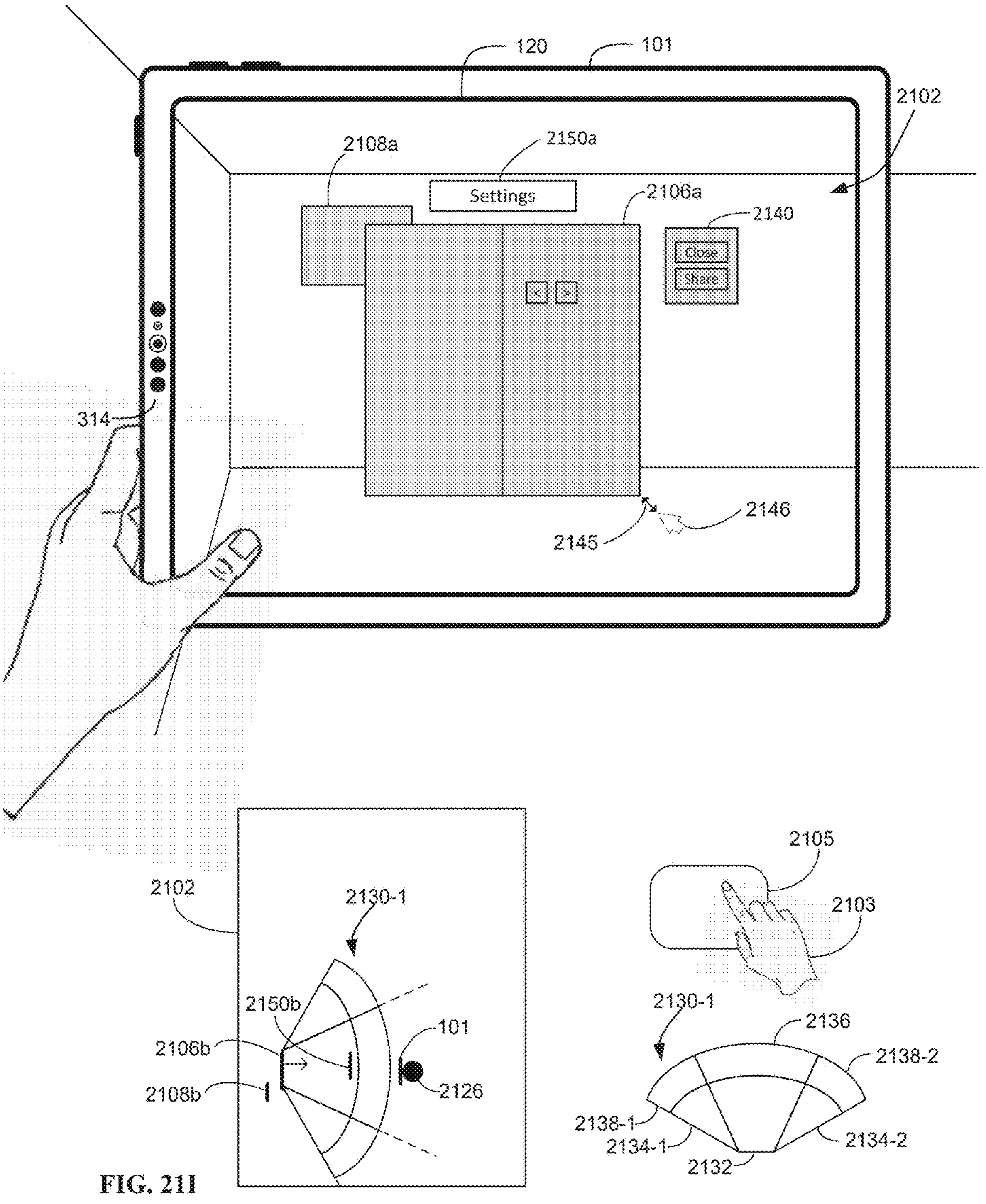

In FIG. 21I, the current viewpoint of the user changes past a second viewing distance threshold (e.g., an upper bound of viewing distance of distance region 2136), and thus enters the abstraction region described previously. In response to the change in viewpoint 2126, the computer system 101 optionally decreases the level of visual prominence of object 2106*a* and/or object 2140, and/or optionally limits interaction with content included in such objects, described further with reference to method 2200. Additionally or alternatively, in some embodiments, some virtual objects are displayed at an updated position in response to changes in the current viewpoint of the user. For example, object 2150*a* is displayed an updated position following the change of the current viewpoint that is closer to the updated position of viewpoint 2126 having an arrangement similar to or the same as shown in FIG. 21A.

In FIG. 21I, the computer system 101 detects an input to scale one or more dimensions of object 2106*a* (e.g., enlarge or shrink), as indicated by cursor 2146 directed to grabber 2145. Grabber 2145 is an optionally displayed—or not displayed—virtual element that when selected (e.g., as described previously with reference to selection input(s)) optionally scales the one or more dimensions of object 2106*a* in accordance with one or more inputs, such as movement of contact between hand 2103 and surface 2105.

Figure 21J:
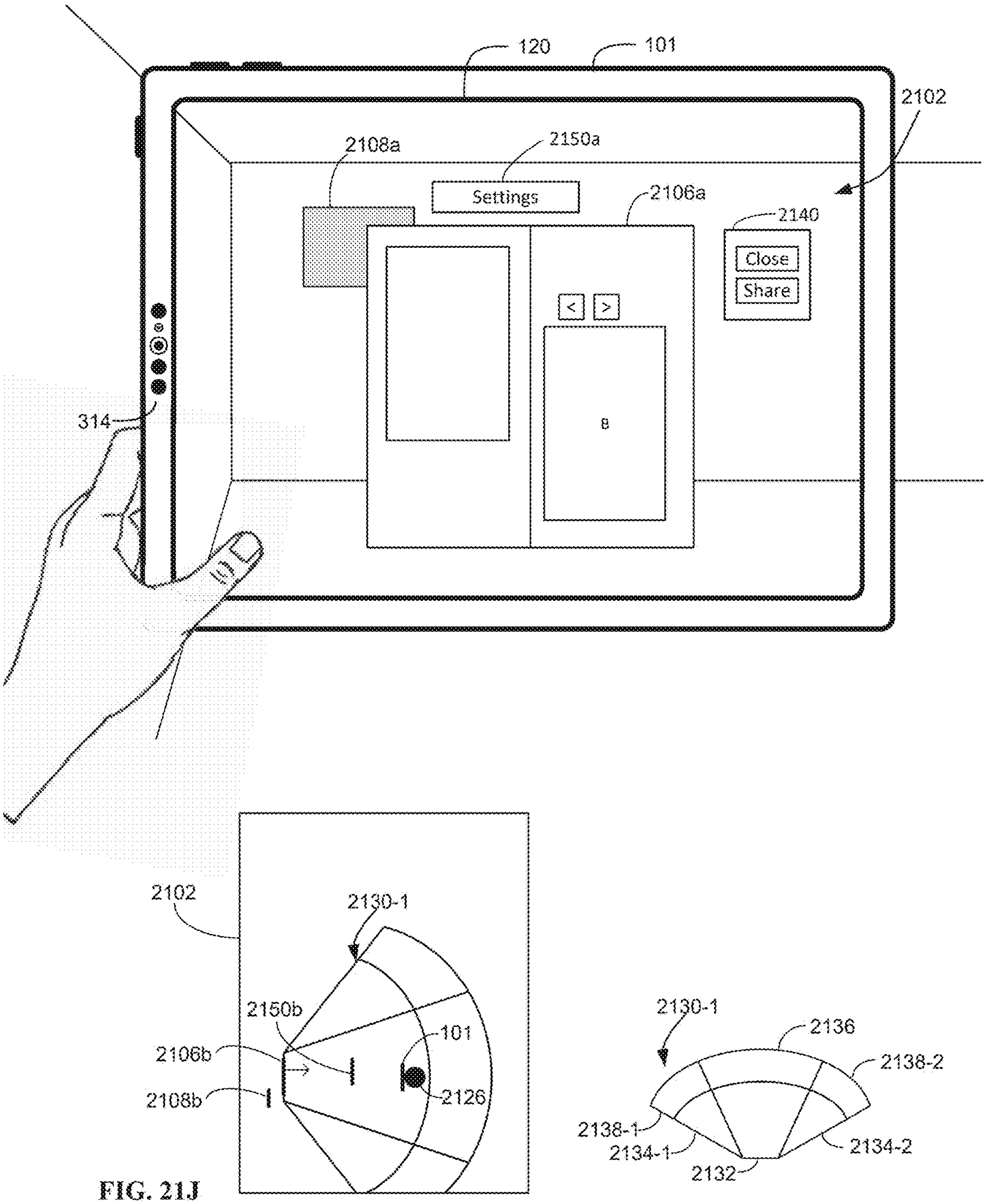

In FIG. 21J, object 2106*a* and its associated viewing region 2130-1 is moved in response to the one or more inputs to scale object 2106*a*. For example, the computer system 101 scales viewing region 2130-1 such that viewpoint 2126 corresponds to a primary region 2132. In some embodiments, the computer system 101 accordingly increases the level of visual prominence of the object and/or its respective content. In some embodiments, the amount of scaling of the respective regions included in viewing region 2130-1 are scaled by different or the same amount. In some embodiments, in response to scaling of object 2106*a*, the corresponding size of regions within viewing region 2130-1 change. For example, increasing the scale of object 2106*a* increases the scale of the respective regions of viewing region 2130-1, and decreasing the scale of object 2106*a* decreases the scale of respective region, optionally proportionally or otherwise based on the scaling of object 2106*a*.

Figure 21K:
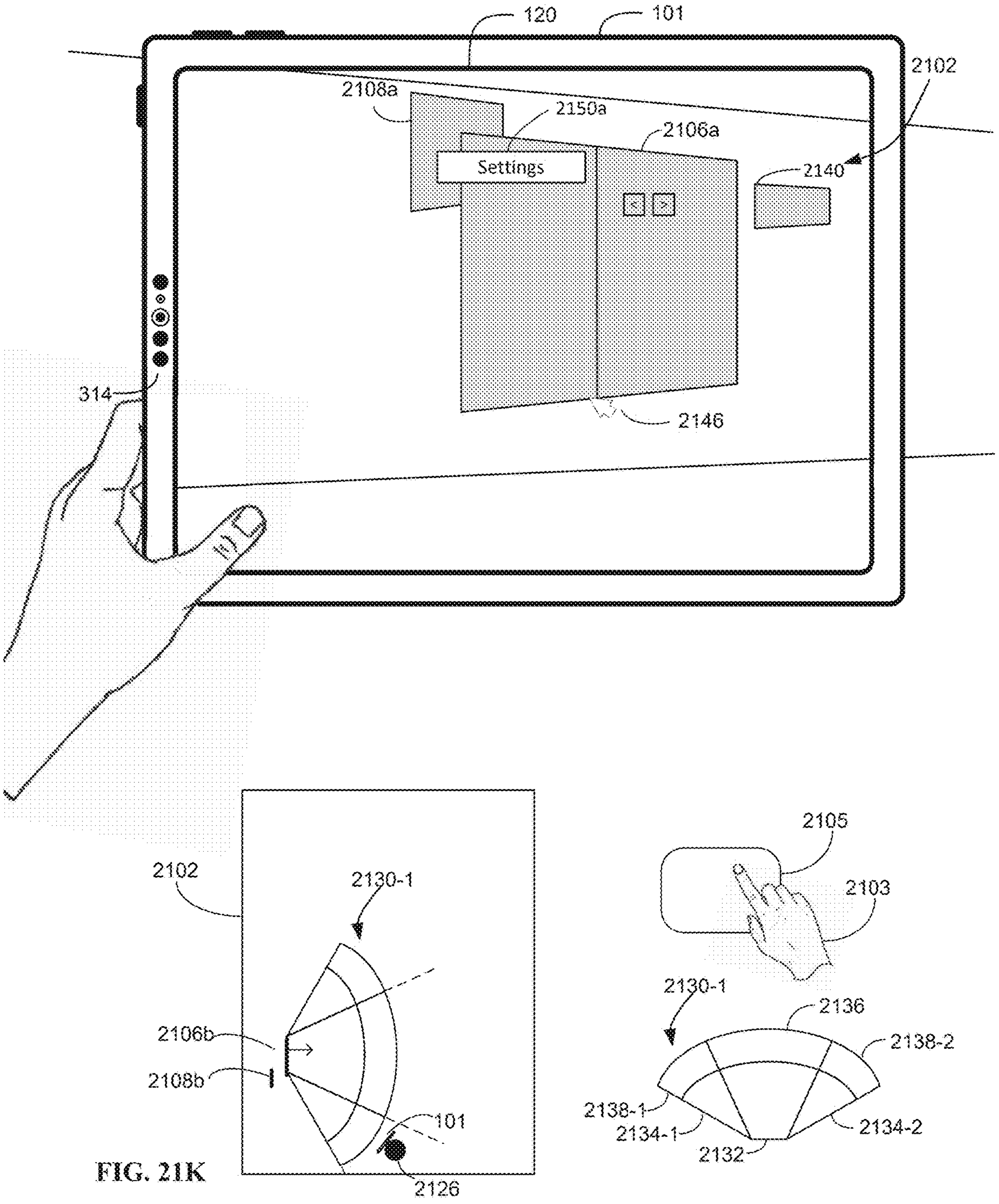

In FIG. 21K, viewpoint 2126 moves within the abstraction region (e.g., past viewing threshold distance(s) and/or angle(s)), and again is displayed with the significantly reduced level of visual prominence indicative of the current viewpoint's correspondence with (e.g., location in) the abstraction region. In response to the moved current viewpoint, the computer system 101 optionally displays object 2150*a* "following" the current viewpoint, as described previously.

In FIG. 21K, computer system 101 detects one or more inputs to corresponding to a request to move object 2106*a*, and in response, moves (e.g., translates) the object 2106*a* to an updated position similar to as described with reference to FIG. 21J. For example, in FIG. 21K, cursor 2146 optionally corresponds to initiation of a movement operation (e.g., translation) of the object 2106*a* within the three-dimensional environment 2102, such as a movement of a maintained contact with a surface, a maintained air gesture, and/or of a pointing device oriented toward object 2106, similar to the air gesture(s) and contact(s) with surfaces described previously.

Figure 21L:
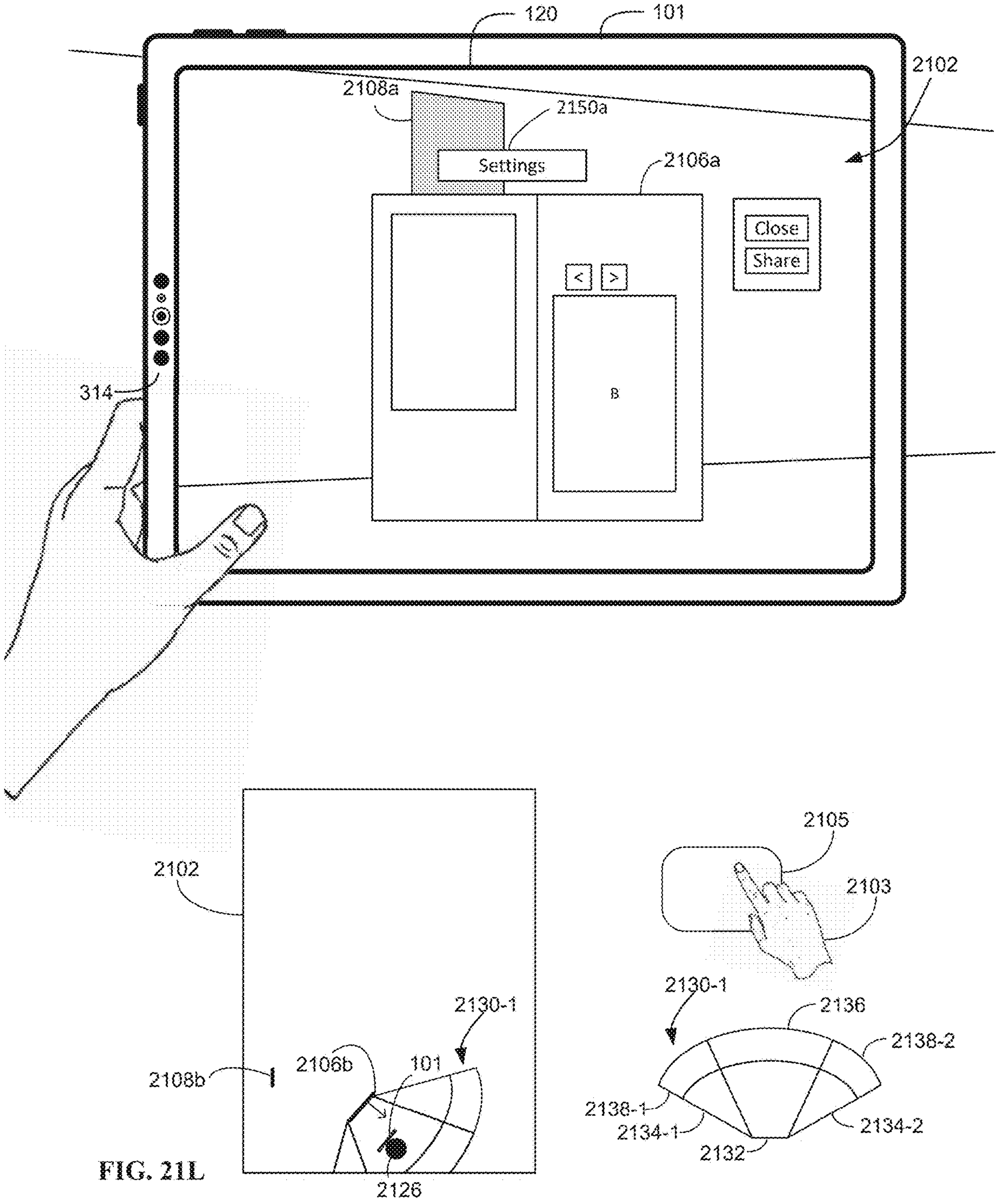
Figure 22A:
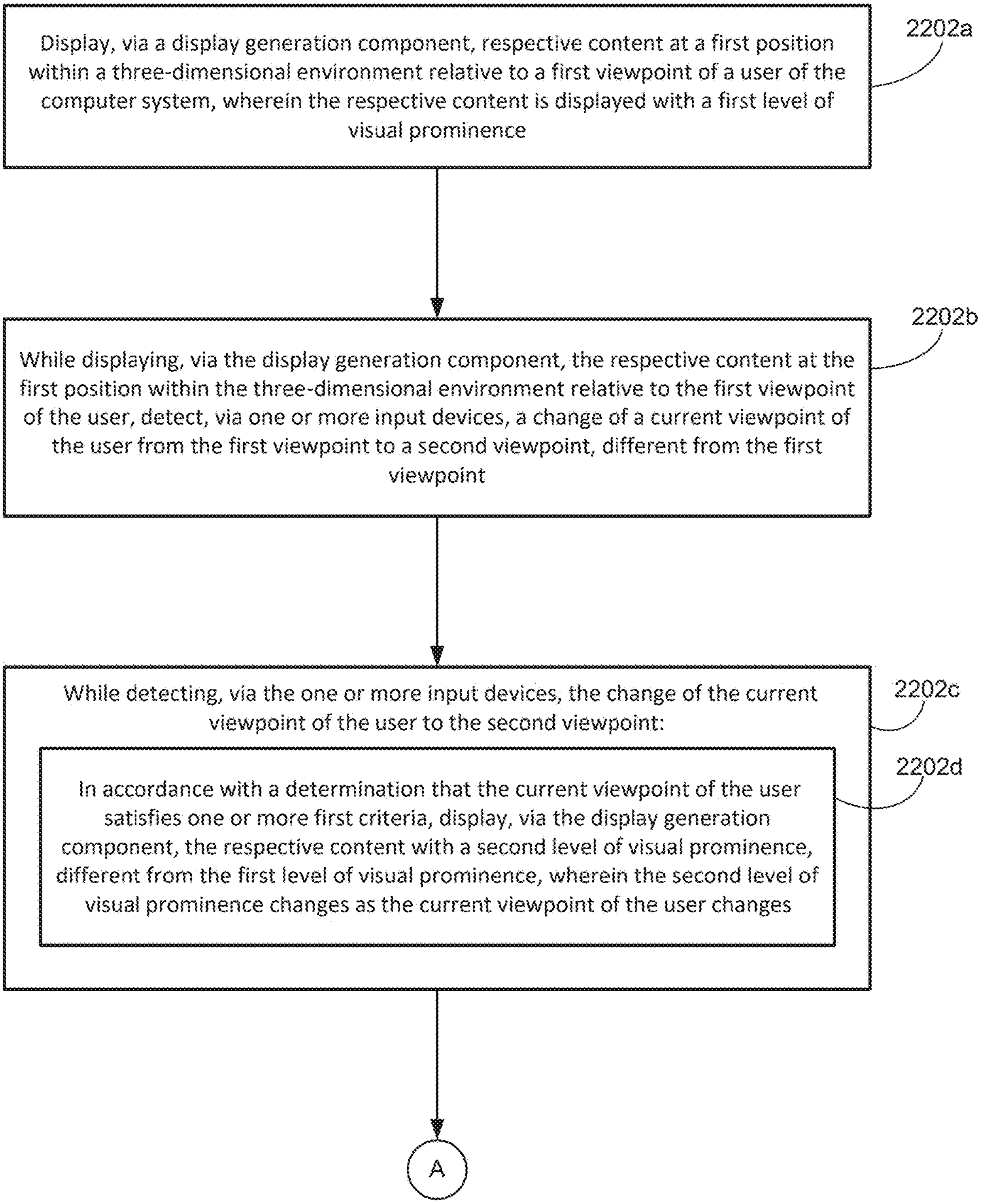
Figure 22B:
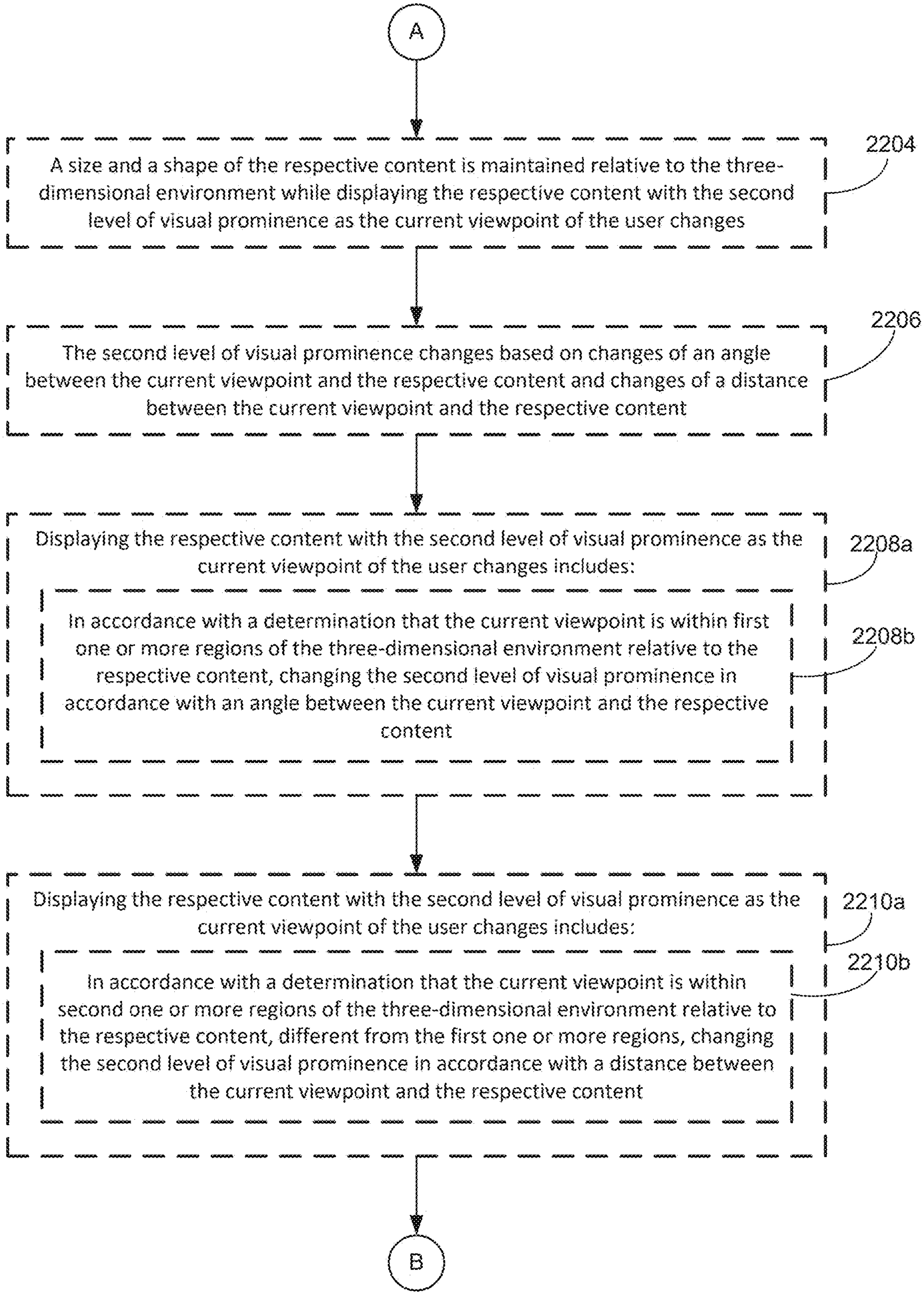
Figure 22D:
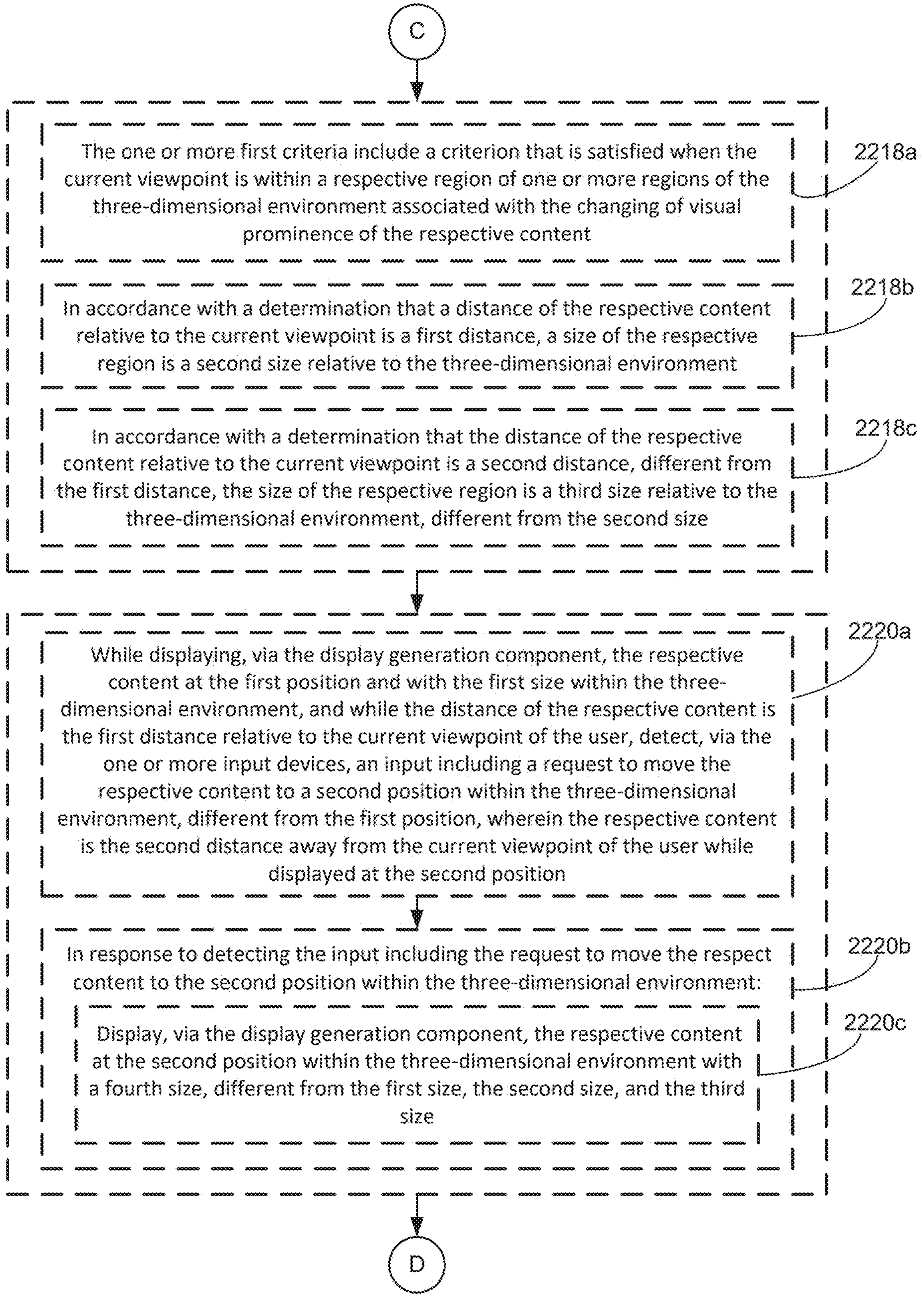
Figure 22F:
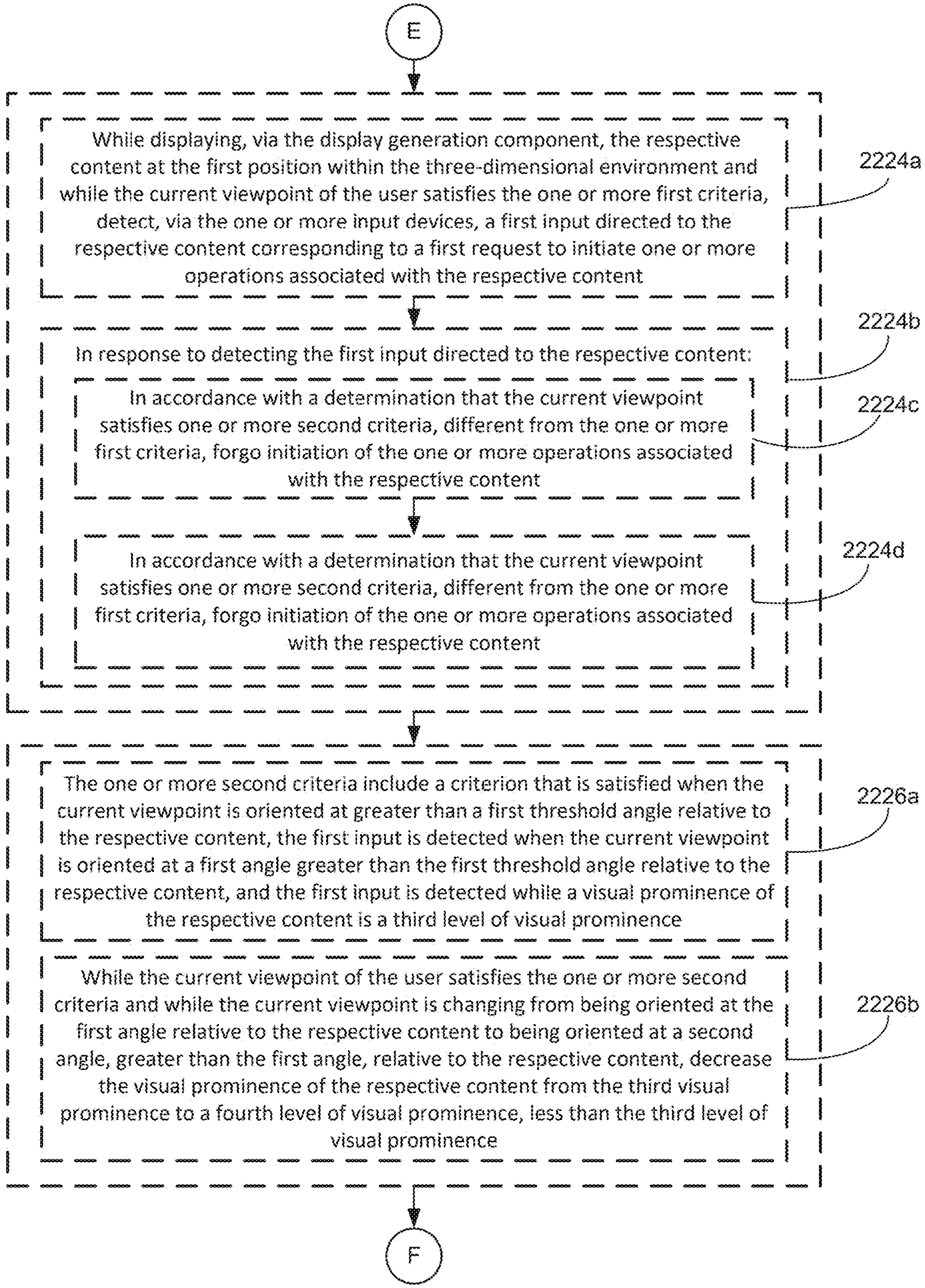
Figure 22G:
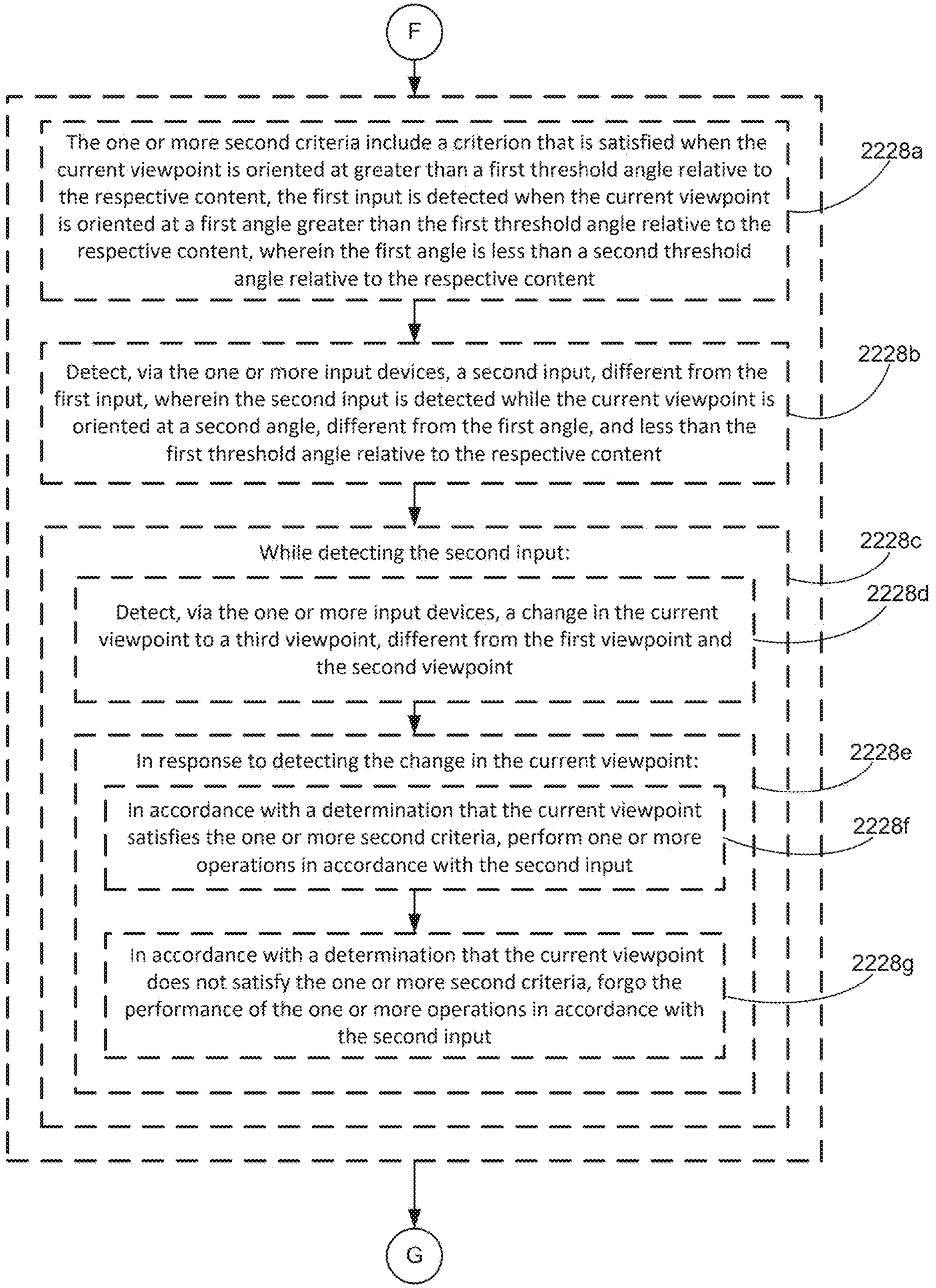
Figure 22I:
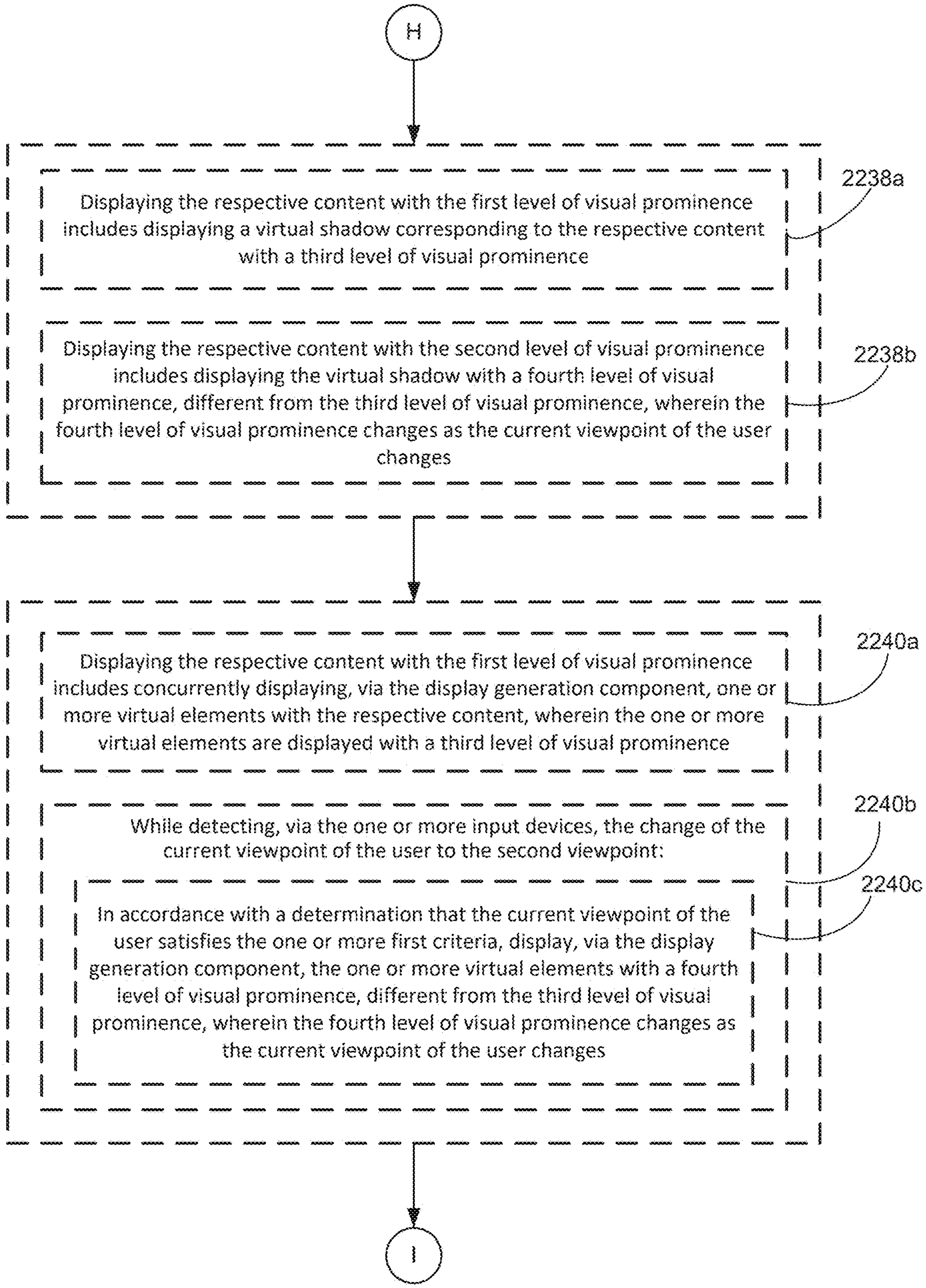
Figure 22J:
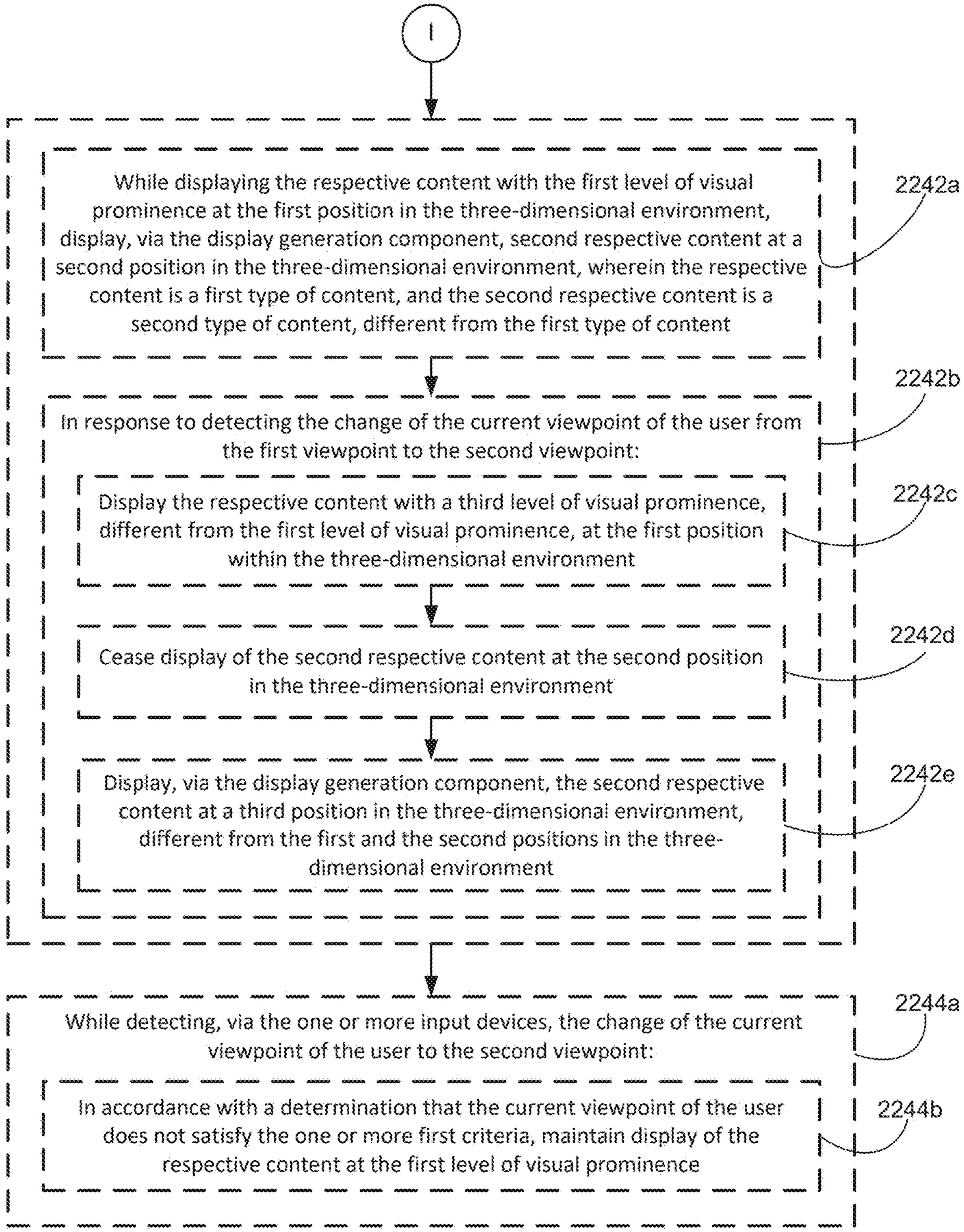

In FIG. 21L, in response to the one or more inputs requesting movement of object 2106*a*, the computer system 101 optionally displays object 2106*a* and/or object 2140 such that viewpoint 2126 corresponds again to primary region 2132. Object 2140 is optionally moved concurrently with the movement of object 2106*a* because object 2140 is optionally associated (e.g., a menu with selectable options) with object 2106*a*. Similarly, in response the one or more inputs requesting movement of object 2106*a*, computer system 101 determines a moved position and orientation of viewing region 2130-1 based on the position and/or orientation of viewpoint 2126 relative to three-dimensional environment 2102 when the request for movement was received. For example, in response to the one or more input(s) requesting movement, computer system 101 moves and/or rotates viewing region 2130-1 such that viewpoint 2126 is in the primary region 2132. For example, viewpoint 2126 is optionally aligned with a center of object 2106*b* and rotated accordingly.

In some embodiments, in response to initiating the movement operations, but before moving object 2106*a* (e.g., before moving the object in accordance with movement of hand 2103 contacting surface 2105), the computer system 101 optionally displays the object 2106*a* with increased visual prominence as shown in FIG. 21L to provide improved visibility of content 2107*a* and/or 2109*a* (included in object 2106*a*, described previously) before and/or during movement of objects 2106*a* and 2140*a*. In some embodiments, computer system 101 updates the position and/or orientation of viewing region 2130-1 similarly or the same in response to detecting different inputs. For example, in response to the scaling input(s) detected in FIG. 21D and/or in response to the movement input(s) detected in FIG. 21K, computer system 101 optionally determines an updated position and/or dimensions of viewing region 2130-1 such that viewpoint 2126 is relatively centered within primary region 2130 (e.g., in depth and/or laterally centered relative to object 2106*a*).

FIGS. 22A-22J is a flowchart illustrating a method of gradually modifying visual prominence of respective virtual objects in accordance with changes in viewpoint of a user in accordance with some embodiments. In some embodiments, the method 2200 is performed at a computer system, such as computer system 101, in communication with one or more input devices and a display generation component, such as display generation component 120. In some embodiments, the computer system has one or more of the characteristics of the computer systems of methods 800, 1000, 1200, 1400, 1600, 1800, and/or 2000. In some embodiments, the display generation component has one or more of the characteristics of the display generation components of methods 800, 1000, 1200, 1400, 1600, 1800, and/or 2000. In some embodiments, the one or more input devices have one or more of the characteristics of the one or more input devices of methods 800, 1000, 1200, 1400, 1600, 1800, and/or 2000.

In some embodiments, the computer system displays (2202*a*), via the display generation component, respective content, such as object 2106*a*, at a first position within a three-dimensional environment, such as three-dimensional environment 2102, relative to a first viewpoint of a user of the computer system, such as object 2106*b* in the overhead view relative to viewpoint 2126, wherein the respective content is displayed with a first level of visual prominence, such as the prominence of object 2106*a* in FIG. 21A, (e.g., relative to one or more other real or virtual objects in the three-dimensional environment). For example, the respective content optionally is a virtual window or other user interface corresponding to one or more applications presented in a three-dimensional environment, such as a mixed-reality (XR), virtual reality (VR, augmented reality (AR), or real-world environment visible via a visual passthrough (e.g., one or more lenses and/or one or more cameras). In some embodiments, the respective content and/or the three-dimensional environment have one or more characteristics of the virtual objects and/or three-dimensional environments described with reference to methods 800, 1000, 1200, 1400, 1600, 1800, and/or 2000. In some embodiments, the respective content includes a user interface of an application such as a media browsing and/or playback application, a web browsing application, an electronic mail application, and/or a messaging application. In some embodiments, the respective content is displayed at a first position relative to the first viewpoint of the user. For example, the respective content optionally is displayed at a first position (e.g., a world-locked position) within an XR environment of the user at a first position and/or orientation from a current viewpoint of the user (e.g., the first viewpoint of the user). The first position, for example, optionally is a location within the three-dimensional environment. In some embodiments, the computer system displays the respective content with the first level of visual prominence in accordance with a determination that the first viewpoint of the user is within a first region optionally including a first range of positions and/or orientations relative to the respective content. In some embodiments, displaying the respective content with a respective (e.g., first) level of visual prominence relative to the three-dimensional environment of the user includes displaying one or more portions of the respective content with a first level of opacity, brightness, saturation, and/or a with a visual effect such as a blurring effect, as described further with reference to method 1800.

In some embodiments, while displaying, via the display generation component, the respective content at the first position within the three-dimensional environment relative to the first viewpoint of the user, the computer system detects (2202*b*), via the one or more input devices, a change of a current viewpoint of the user from the first viewpoint to a second viewpoint, different from the first viewpoint, such as the change in viewpoint 2126 from FIG. 21A-21B and/or FIG. 21B-21C. For example, the computer system optionally detects a change in current viewpoint of the user from a first viewpoint optionally normal to a first portion (e.g., a first surface) of the respective content (e.g., a rectangular or semi-rectangular shaped virtual window) to a second viewpoint optionally askew from the normal of the first portion of the respective content, and/or further away from and/or closer to the first portion of the respective content. As an example, the first viewpoint optionally corresponds to a first angle (e.g., less than a threshold angle such as 1, 3, 5, 7, or 10 degrees) relative to the normal of the respective content and the second orientation optionally corresponds to a second angle (e.g., greater than a threshold angle such as 1, 3, 5, 7, 10, 30, or 60 degrees) relative to the normal. Additionally or alternatively, the computer system optionally detects a change in the current viewpoint of the user from a first distance (e.g., depth) relative to the respective content to a second distance, different from the first distance, relative to the respective content, while an angle between the current viewpoint and the respective content optionally is maintained.

In some embodiments, while (e.g., in response to) detecting, via the one or more input devices, the change of the current viewpoint of the user to the second viewpoint (for example, the computer system optionally continuously and/or in rapid succession detects changes of the current viewpoint of the user as the current viewpoint changes from the first viewpoint to the second viewpoint) (2202*c*) in accordance with a determination that the current viewpoint of the user (e.g., the current viewpoint as the viewpoint is changing from the first viewpoint to the second viewpoint, such as an intermediate viewpoint (e.g., intermediate orientation relative to the respective content and/or intermediate distance from the respective content) between the first and second viewpoints) satisfies one or more first criteria, the computer system displays (2202*d*), via the display generation component, the respective content with a second level of visual prominence, such as the level of visual prominence of object 2106*a* as shown in FIG. 21C, different from the first level of visual prominence, wherein the second level of visual prominence changes (e.g., through a plurality of intermediate prominence values) as the current viewpoint of the user changes (e.g., through a plurality of intermediate viewpoint positions). For example, the computer system optionally detects that the current viewpoint of the user optionally corresponds to a second range of positions and/or orientations (e.g., corresponds to a second region and/or set of regions) relative to the respective content, and optionally displays the respective content with second level of visual prominence, which optionally includes displaying the respective content with a different (e.g., relatively lesser) degree of opacity, brightness, saturation, degree of contrast, and/or a different (e.g., relatively greater) degree of a blurring effect (e.g., a blurring effect with a relatively greater radius of effect). In some embodiments, while the computer system detects the current viewpoint of the user move from the first viewpoint toward the second viewpoint, the computer system gradually displays the respective content with one or more respective levels of visual prominence intermediate to the first level of visual prominence and an updated level of visual prominence corresponding to the second viewpoint. For example, the computer system optionally gradually decreases opacity of the respective content from a first level of opacity to a series of intermediate (e.g., one or more), relatively lesser levels of opacity as the current viewpoint of the user progressively changes from the first viewpoint to the second viewpoint, such that the computer system optionally displays the respective content with a second level of opacity (e.g., lesser than the first and the intermediate levels of opacity) in response to the current viewpoint reaching the second viewpoint. In some embodiments, the one or more criteria include a criterion that is satisfied based on the position of the second viewpoint relative to one or more regions of the three-dimensional environment defined relative to the respective content. For example, the computer system optionally determines a first region of the three-dimensional environment within which visual prominence of the respective content optionally is maintained if the computer system detects the current viewpoint of the user change to a respective viewpoint that is within the first region (e.g., within a first range of positions and/or a first range of orientations relative to the respective content), as described further below. It is understood that "regions" of the three-dimensional environment as referred to herein optionally correspond to one or more ranges of positions and/or orientations of the viewpoint of the user relative to the respective content. Additionally, the computer system optionally determines a second region, different from the first region, relative to the respective content within which the computer system optionally modifies (e.g., decreases and/or increases) visual prominence of the respective content relative to the first level of visual prominence in accordance with detected changes to the current viewpoint of the user. In some embodiments, the computer system increases visual prominence of the respective content as the current viewpoint is (optionally within a second region) moving closer to the first region and decreases visual prominence of the respective content as the current viewpoint is (optionally within the second region and) moving further away from the first region. For example, the computer system optionally defines a second region of the three-dimensional environment, different from the first region, optionally corresponding to a second range of positions and/or orientations of the viewpoint of the user at which viewing of the respective content optionally is suboptimal. For example, a viewing angle optionally formed from a first vector extending normal from a respective portion (e.g., a center) of the respective content and a second, different vector extending from the respective portion of the respective content toward the user's viewpoint (e.g., the user's field-of-view, a center of the user's head, and/or a center of the computer system) is optionally determined by the computer system. In accordance with a determination that such an angle from the user's viewpoint—referred to herein as a "viewing angle" between the user's viewpoint and the respective content—optionally is outside a first range of angles (e.g., 5, 10, 15, 20, 25, 30, 35, 40, 45, 50, 55, 60, 65, 70, or 75 degrees) relative to the normal of the content and optionally is within a second range of angles (e.g., 5, 10, 15, 20, 25, 30, 35, 40, 45, 50, 55, 60, 65, 70, or 75 degrees) relative to the normal of the content, the computer system optionally displays the respective content with a different (e.g., relatively lesser) degree of visual prominence. Additionally or alternatively, in accordance with a determination that the viewing angle is outside of the first and the second range of angles relative to the normal of the content, the computer system optionally further displays the respective content with a different (e.g., relatively lesser or greater) degree of visual prominence. In some embodiments, while the current viewpoint of the user moves within the second range of angles, the computer system gradually increases visual prominence in response to detecting movement toward an upper bound of the first range of viewing angles. For example, the first range of angles optionally spans from 0 degrees from a vector normal of the respective content to 15 degrees from the vector normal, and the computer system optionally gradually increases visual prominence in response to detecting movement from a first viewing angle (e.g., 20, 25, 30, 35, 40, 45, 50, 55, 60, 65, 70, or 75 degrees from the normal) to a second, relatively lesser viewing angle (e.g., 17, 20, 25, 30, 35, 40, 45, 50, 55, 60, 65, or 70 degrees). Such movement optionally is along an arc subtended by the respective content, such that a distance between the current viewpoint and the respective content is maintained throughout the movement from the first viewing angle. In contrast, while the current viewpoint of the user moves within the second range of angles, the computer system optionally gradually decreases visual prominence of the respective content in response to detecting movement away from the upper bound of the first range of viewing angles. For example, the computer system optionally detects a current viewpoint shift from a first viewing angle (e.g., 20, 25, 30, 35, 40, 45, 50, 55, 60, 65, 70, or 75 degrees from the normal) to a second, relatively greater viewing angle (e.g., 25, 30, 35, 40, 45, 50, 55, 60, 65, 70, or 75 degrees from the normal), and in response, optionally gradually decreases visual prominence of the respective content. In some embodiments, in response to detecting the viewing angle exceed the first and second range of viewing angles, the computer system displays the respective content with a significantly reduced visual prominence (e.g., with a pattern fill and/or mask to occlude the respective content, with a low degree of opacity, and/or lacking detail of silhouettes of virtual objects included in the respective content). In response to detecting the current viewpoint of the user move further outside of the first and second range of viewing angles, the computer system optionally maintains the significantly reduced visual prominence of the respective content (e.g., forgoes further reduction of visual prominence of the respective content in response to detecting shifts of the current viewpoint outside of the first and the second range of viewing angles). Additionally or alternatively, in accordance with a determination that a distance between the viewpoint of the user and the respective content (e.g., a respective portion of the respective content) is within a second range of distances (e.g., 0.01, 0.025, 0.05, 0.1, 0.25, 0.5, 1, 2.5, 5, 10, 15, 25, 50, 100, 250, 500, or 1000 m) relative to the respective content greater than a first range of distances (e.g., 0.001, 0.01, 0.025, 0.05, 0.1, 0.25, 0.5, 1, 2.5, 5, 10, 15, 25, 50, 100, 250, or 500 m), the computer system optionally displays the respective content with the different (e.g., relatively lesser) degree of visual prominence. In some embodiments, the computer system progressively modifies visual prominence of the respective content in accordance with detected changes in a current viewpoint of the user within the second region of the three-dimensional environment, as described previously. In some embodiments, the computer system defines one or more second regions relative to the respective content that are arranged symmetrically from one another. For example, a respective first region of the one or more second regions optionally correspond to a range of suboptimal angles to the left of the respective content, and a respective second region of the one or more second regions optionally corresponds to a range of suboptimal angles to the right of the respective content. In some embodiments, the visual prominence of the respective content is modified symmetrically, or nearly symmetrically, within the respective first region and the respective second region. For example, the computer system optionally detects the current viewpoint of the user situated at a first depth relative to the respective content and at a boundary of the first respective region (e.g., a rightmost boundary of a region to the left of the respective content) change by a first distance in a first direction (e.g., leftward by 0.01, 0.025, 0.05, 0.1, 0.25, 0.5, 1, 2.5, 5, 10, 15, 25, 50, 100, 250, 500, or 1000 m), and progressively modifies the visual prominence of the respective virtual content until the virtual content is displayed with the second level of visual prominence. Additionally or alternatively, the computer system detects the current viewpoint of the user is optionally situated at the first depth relative to the respective content and at a boundary of the second respective region (e.g., a leftmost boundary of a region to the right of the respective content) change by the first distance, but in a second direction (e.g., rightward by 0.01, 0.025, 0.05, 0.1, 0.25, 0.5, 1, 2.5, 5, 10, 15, 25, 50, 100, 250, 500, or 1000 m), different from the first direction, and optionally progressively modifies the visual prominence of the respective virtual content until the virtual content is displayed with the second level of visual prominence. Thus, in some embodiments, the computer system modifies the visual prominence of the respective content in accordance with a change in viewing angle, independent of a polarity of the change in viewing angle (e.g., 30 degrees or −30 degrees from a normal extending from the respective content). In some embodiments, the computer system gradually increases the visual prominence of the respective content in accordance with detected changes in the current viewpoint of the user. For example, the computer system optionally detects a current viewpoint of the user move from a second viewpoint that is outside the first region (e.g., an improved viewing region), toward the first region (e.g., closer to the respective content), and gradually increases visual prominence of the respective content in accordance with the changes in the viewpoint. In some embodiments, similar treatment is afforded to detected changes improving a viewing angle (e.g., movement of the current viewpoint toward a viewing angle closer to the normal extending from the respective content) while the current viewpoint moves within a respective region of the one or more second regions. For example, while within a respective region of the one or more second regions, the computer system optionally detects movement of the user toward the first region and/or the vector normal extending from the respective content, and optionally gradually increases the visual prominence of the respective content in accordance with the detected changes in the current viewpoint. Gradually changing a displayed visual prominence of respective content from a first level of visual prominence to a second level of visual in accordance with a determination that the second viewpoint satisfies one or more criteria improves visual feedback about user position relative to the respective content, thereby informing the user as to how subsequent changes may impact the visibility and intractability of the respective content, indicating further changes in viewpoint that can improve viewing of the respective content, decreasing visual clutter, and reducing the likelihood inputs are erroneously directed to the respective content.

In some embodiments, a size and a shape of the respective content, such as the size and/or shape of object 2106*a*, is maintained relative to the three-dimensional environment while displaying the respective content with the second level of visual prominence as the current viewpoint of the user changes, such as the changing in level of visual prominence of object 2106*a* from FIG. 21B to FIG. 21C (2204). For example, the respective content optionally includes a user interface of an application displayed within a rectangular, elliptical, square, circular, and/or another similar shaped window displayed in the three-dimensional environment with a size (e.g., a scale) that is maintained relative to the three-dimensional environment while the visual prominence of the respective content is changed and/or maintained. As an example, as the current viewpoint changes from the first viewpoint to the second viewpoint as described with reference to step(s) 2202, the size of the respective content relative to the three-dimensional environment, the orientation of the respective content relative to the three-dimensional environment, and/or the shape of the respective content relative to the three-dimensional environment is optionally maintained in response to the changes in the current viewpoint and while displaying the respective content with the first and/or second level of visual prominence, even as the second level of visual prominence changes as the current viewpoint of the user changes. In some embodiments, the second level of visual prominence changes proportionally, inversely proportionally, and/or otherwise based on an amount of change in position and/or viewing angle of the current viewpoint relative to the respective content. For example, the computer system optionally decreases the visual prominence of the respective content based on a distance moved between the first viewpoint and the second viewpoint. Maintaining the size and the shape of the respective content relative to the three-dimensional environment provides visual feedback regarding the orientation between the current viewpoint and the respective content and the relative position of the respective content in the three-dimensional environment, thereby guiding future input to further modify the visual prominence of the respective content and future viewpoints to interact—or not interact—with the respective content.

In some embodiments, the second level of visual prominence changes based on changes of an angle between the current viewpoint and the respective content and changes of a distance between the current viewpoint and the respective content, such as the change in viewpoint 2126 within hybrid region 2138-1 and 2138-2, such as shown in FIG. 21F and the corresponding changes in levels of visual prominence of object 2106*a* (2206). For example, the computer system optionally modifies the second level of visual prominence based on the viewing angle described with reference to step(s) 2202, and additionally or alternatively modifies the second level of visual prominence based on a distance between the current viewpoint and the respective content (e.g., between a respective portion of the respective content, such as a center of a face of a window including an application user interface). In some embodiments, the computer system increases or decreases the second level of visual prominence by a first amount in response to detecting a change in the viewing angle between the current viewpoint and the respective content, and increases or decreases the second level of visual prominence by a second amount in response to detecting a change in distance between the current viewpoint and the respective content. For example, similar as described with reference to step(s) 2204, the computer system optionally decreases and/or increases the visual prominence of the respective content based on a distance moved (e.g., further away or closer) relative the respective content and/or a change in viewing angle (e.g., away or toward the normal extending from the respective content). Changing the second level of visual prominence based on the changes of angle and distance between the current viewpoint and the respective content provides visual feedback on the visibility and/or interactability of the respective content, thereby guiding the user in changing the current viewpoint to improve the visibility and/or change interactability of the respective content.

In some embodiments, displaying the respective content, such as object 2106*a*, with the second level of visual prominence as the current viewpoint of the user changes, such as viewpoint 2126 changing from FIG. 21B to FIG. 21C, includes (2208*a*), in accordance with a determination that the current viewpoint is within first one or more regions of the three-dimensional environment relative to the respective content, such as off-angle region 2134-1 and/or 2134-2, changing the second level of visual prominence in accordance with an angle between the current viewpoint and the respective content, such as the change in viewpoint 2126 and the corresponding change in the level of visual prominence of object 2106*a* from FIG. 21B to FIG. 21C (optionally independently of a change in distance between the current viewpoint and the respective content) (2208*b*). In some embodiments, the first one or more regions have one or more characteristics of the one or more regions described with reference to step(s) 2202. For example, the first one or more regions optionally includes a first and/or a second region of the three-dimensional environment, within which the computer system optionally modifies the second level of visual prominence based on a viewing angle (optionally having one or more characteristics of the viewing angle described with reference to step(s) 2202) relative to a respective portion of the respective content. In some embodiments, visual prominence monotonically changes with an increase in the viewing angle. For example, as the computer system optionally detects the current viewpoint shift from a first viewing angle (e.g., 5, 10, 15, 20, 25, 30, 35, 40, 45, 50, 55, 60, 65, 70, or 75 degrees) to a second viewing angle, greater than the first viewing angle, the computer system optionally changes (e.g., decreases and/or increases) the second level of visual prominence. As described with reference to step(s) 2202, in some embodiments, the first region and the second region of the three-dimensional environment are arranged symmetrically, or nearly symmetrically relative to the respective content, and the second level of visual prominence is modified based on a change in magnitude of the viewing angle relative to the respective content. In some embodiments, the first and the second region are not symmetric, but corresponding changes in viewing angle while the computer system is within the first region affects a similar or a same change in the visual prominence of the respective content while the computer system detects similar changes in viewing angle while the computer system is within the second region. For example, in response to detecting the current viewpoint shift within the first region from a first viewing angle (e.g., −5, −10, −15, −20, −25, −30, −35, −40, −45, −50, −55, −60, −65, −70, or −75 degrees) to a second viewing angle, with a greater magnitude (e.g., −10, −15, −20, −25, −30, −35, −40, −45, −50, −55, −60, −65, −70, −75, or −80 degrees), the computer system optionally modifies the second level of visual prominence by a first amount. In response to detecting the current viewpoint shift within the second region from a third viewing angle symmetric to the first viewing angle relative to a vector extending from the respective content (e.g., normal to a respective portion such as a center of the respective content optionally parallel to a physical floor of the physical environment) to a fourth viewing angle symmetric to the second viewing angle, the computer system optionally modifies the second level of visual prominence by the first amount. In some embodiments, in response to detecting a decrease in the magnitude of the viewing angle when the current viewpoint shifts within the first and/or second region, the computer system gradually modifies the visual prominence of the respective content opposing the modification of visual prominence based on the increase in the magnitude of the viewing angle. For example, the computer system optionally decreases the visual prominence of the respective content in response to detecting the viewing angle magnitude increases, and optionally increases the visual prominence of the respective content in response to detecting the viewing angle magnitude decreases. In some embodiments, while the current viewpoint corresponds to the first and/or second region, the computer system maintains visual prominence (e.g., forgoes modification of visual prominence) of the respective content in response to detecting increases or decreases in a distance between the respective content and the current viewpoint while a viewing angle is maintained. Modifying the second level of visual prominence based on the angle between the current viewpoint and the respective content provides visual feedback about orientation of the computer system relative to the respective content, thereby reducing erroneous user input that are not operative while the current viewpoint is unsuitable to initiate operations based on the user input, and additionally indicates further user input (e.g., movement) to improve interactability with the respective content.

In some embodiments, displaying the respective content, such as object 2106*a*, with the second level of visual prominence as the current viewpoint of the user changes includes (2210*a*), such as the level of visual prominence of object 2106*a* in FIG. 21I, in accordance with a determination that the current viewpoint is within second one or more regions of the three-dimensional environment relative to the respective content, different from the first one or more regions, such as distance region 2136 as shown in FIG. 21H, changing the second level of visual prominence in accordance with a distance between the current viewpoint and the respective content (2210*b*), such as the changes to object 2106*a* in response to viewpoint 2126 moving within distance region 2136 (optionally independently of a change in angle between the current viewpoint and the respective content). In some embodiments, the first one or more regions have one or more characteristics of the one or more regions described with reference to step(s) 2202. For example, the first one or more regions optionally include a third region of the three-dimensional environment in addition or alternative to the first and the second region described with reference to step(s) 2208, within which the computer system optionally modifies the second level of visual prominence based on the distance between the current viewpoint and the respective content. The distance, for example, optionally is based on a distance between a respective portion of the respective content (e.g., the center of the respective content) and a respective portion of the computer system and/or a respective portion of a body of a user of the computer system (e.g., the center of the user's head, the center of the user's eyes, and/or a center of a display generation component of the computer system). In some embodiments, in response to detecting the distance between the respective content and the current viewpoint decrease by a first distance, the computer system modifies (e.g., increases and/or decreases) the second level of visual prominence by a corresponding amount; in response to detecting the distance increase by the first distance, the computer system optionally modifies (e.g., decreases and/or increases) the second level of visual prominence by a corresponding amount. Thus, the computer system optionally decreases (or increases) visual prominence of the respective content in response to detecting the respective content is further away from the current viewpoint and optionally increases (or decreases) visual prominence of the respective content in response to detecting the respective content is closer to the current viewpoint. In some embodiments, while the viewing angle between the respective content and the current viewpoint is modified and the distance between the respective content and the current viewpoint is maintained, the visual prominence of the respective content is maintained (e.g., modification of visual prominence is forgone). Modifying the second level of visual prominence based on the distance between the current viewpoint and the respective content provides visual feedback about visibility of the respective content, thereby reducing erroneous user input that are not operative while the current viewpoint is unsuitable to initiate operations based on the user input, and additionally indicates further user input (e.g., movement) to improve interactability with the respective content.

In some embodiments displaying the respective content, such as object 2106*a*, with the second level of visual prominence as the current viewpoint of the user changes includes (2212*a*), such as shown in FIG. 21F, in accordance with a determination that the current viewpoint is within third one or more regions of the three-dimensional environment, different from the first one or more regions and the second one or more regions, relative to the respective content, such as the change in viewpoint 2126 within hybrid region 2138-1 and 2138-2, such as shown in FIG. 21F, changing the second level of visual prominence in accordance with changes to the angle between the current viewpoint and the respective content and changes to the distance between the current viewpoint and the respective content (2212*b*), such as the distance and angle between object 2106*a* and viewpoint 2126. In some embodiments, in addition or alternative to the one or more regions described with reference to step(s) 2202, step(s) 2208, and/or step(s) 2210, the computer system modifies visual prominence based on the viewing angle and the distance between the respective content and the current viewpoint in response to detecting the current viewpoint change within third one or more regions. For example, in response to detecting a first change in viewpoint within a respective region of the third one or more regions, including a change in viewing angle while maintaining a distance between the respective content and the current viewpoint, the computer system optionally modifies the level of visual prominence of the respective content by a first amount based on the change in the viewing angle. Additionally or alternatively, in response to detecting a second change in viewpoint within the respective region including a change in the distance between the respective content and the current viewpoint while maintaining the viewing angle, the computer system optionally modifies the level of visual prominence by a second amount, optionally the same as the first amount, based on the change in distance. In response to detecting a change in viewpoint including the first change in viewpoint and the second change in viewpoint (e.g., including the change in viewing angle and including the change in distance), the computer system optionally modifies the level of visual prominence by an amount that is based on both of the first and the second amount. Thus, in some embodiments, the gradual changing of the second level of visual prominence is based on a combined effect of a first rate of change (e.g., due to a change in the viewing angle) and a second rate of change (e.g., due to a change in the distance). In some embodiments, the computer system defines a plurality of the third one or more regions relative to the respective content. For example, the computer system optionally modifies the second level of visual prominence based on a change in viewing angle as described with reference to the first viewing angle and the second viewing angle of step(s) 2208 within a respective first and second region of the third one or more regions. In response to detecting the magnitude of the viewing angle change while the current viewpoint corresponds to the respective first or second region, the computer system optionally symmetrically changes the second level of visual prominence based on the magnitude of change of the viewing angle. In some embodiments, the respective regions described herein and with reference to step(s) 2202, step(s) 2208, and/or step(s) 2210 are contiguous and non-overlapping. Modifying the second level of visual prominence based on the distance and viewing angle between the current viewpoint and the respective content provides visual feedback about visibility of the respective content, thereby reducing erroneous user input that are not operative while the current viewpoint is unsuitable to initiate operations based on the user input, and additionally indicates further user input (e.g., movement) to improve interactability with the respective content.

In some embodiments, while (e.g., in response to) detecting, via the one or more input devices, the change of the current viewpoint of the user to the second viewpoint (2214*a*), such as the change in viewpoint 2126 from FIG. 21A to FIG. 21B, in accordance with a determination that the current viewpoint does not satisfy the one or more first criteria, the computer system maintains display of the respective content with the first level of visual prominence as the current viewpoint of the user changes (2214*b*), such as the level of visual prominence of object 2106*a* shown and maintained from FIG. 21A to FIG. 21B. For example, as described with reference to step(s) 2202, the one or more first criteria include a criterion that is satisfied when the computer system detects a change in the current viewpoint to a viewpoint that does not correspond to (e.g., is not within) a first region of the three-dimensional environment, within which visual prominence is optionally maintained (e.g., modification to the level of visual prominence is forgone) in response to detecting changes in viewpoint. Maintaining visual prominence of the respective content if the one or more criteria are not satisfied provides flexibility in viewing angles and/or positions preserving visibility and/or interactability of the respective content.

In some embodiments, the one or more first criteria include a criterion that is satisfied when the current viewpoint, such as viewpoint 2126, is within a respective region of one or more regions of the three-dimensional environment associated with the changing of visual prominence of the respective content (2216*a*) (e.g., as described with reference to step(s) 2202), such as viewing regions 2130-1 in FIG. 21I, and wherein in accordance with a determination that a size of the respective content is a first size in the three-dimensional environment, a size of the respective region is a second size in the three-dimensional environment (2216*b*), such as the size of object 2106*a* in FIG. 21I and the corresponding size of viewing region 2130-1 in FIG. 21A. For example, the size of the respective region optionally corresponds to the one or more dimensions of the respective content relative to the three-dimensional environment such as a height and a width of a virtual window. The size additionally or alternatively optionally includes the depth of the respective content (e.g., if the respective content includes a three-dimensional virtual object). As described previously, the one or more regions of the three-dimensional environment optionally correspond to a range of positions and/or orientations of the current viewpoint of the user; in some embodiments, the range of positions and/or orientations are based on the size of the respective content.

In some embodiments, in accordance with a determination that the size of the respective content is a third size, different from the first size, in the three-dimensional environment, a size of the respective region is a fourth size, different from the second size (2216*c*), such as the size of object 2106*a* in FIG. 21J and the corresponding size of viewing region 2130-1 in FIG. 21J. For example, if respective first virtual content and respective second virtual content are optionally displayed with different respective sizes, a first size of a first region associated with changing visual prominence of the respective first virtual content is optionally different from (e.g., larger or smaller than) a second size of a second region associated with changing visual prominence of the respective second virtual content. In some embodiments, a size of a respective region of the one or more regions corresponds to the range of positions and/or orientations. For example, while displaying the respective content with the first size, a second size of the respective region associated with the respective content optionally corresponds to a first range of positions relative to the respective virtual content (e.g., greater than or equal to 0.001, 0.01, 0.025, 0.05, 0.1, 0.25, 0.5, 1, 2.5, 5, 10, 15, 25, 50, 100, 250, or 500 m and less than or equal to e.g., 0.01, 0.01, 0.025, 0.05, 0.1, 0.25, 0.5, 1, 2.5, 5, 10, 15, 25, 50, 100, 250, 500, or 1000 m from the respective virtual content) and a first range of viewing angles relative to the respective content, as described with reference to step(s) 2202. Similarly, while displaying the respective content with the third size, a fourth size of the respective region optionally corresponds to a second range of positions relative to the respective virtual content (e.g., greater than or equal to 0.01, 0.01, 0.025, 0.05, 0.1, 0.25, 0.5, 1, 2.5, 5, 10, 15, 25, 50, 100, 250, 500, or 1000 m and less than or equal to 0.01, 0.025, 0.05, 0.1, 0.25, 0.5, 1, 2.5, 5, 10, 15, 25, 50, 100, 250, 500, 1000, or 5000 m from the respective virtual content), and a second, different range of viewing angles relative to the respective content. In some embodiments, the computer system detects one or more inputs to resize the content, and in response to the one or more resizing inputs, changes the size of the respective region in accordance with the resizing inputs. For example, the computer system optionally detects an input scaling one or more dimensions of the respective content from the first size to the third or fourth size, and in response to the input scaling the one or more dimensions, changes (e.g., decreases or increases) the size of the respective region. As an example, the computer system optionally increases a size of the respective region in accordance with a scaling up of the respective content, and vice-versa decreases the size of the respective region in accordance with a scaling down of the respective content. In some embodiments, the magnitude and/or dimensions of resizing of the respective region is based on a magnitude and/or dimensions of the resizing of the respective content. For example, the computer system optionally detects an air pinch gesture (e.g., a contacting of an index finger and thumb of the user) directed to a corner of the respective content, and while the air pinch gesture (e.g., the contact) is maintained, the computer system detects a movement downward toward the floor of the three-dimensional environment and rightward, away from a rightmost edge of the respective content. The computer system optionally scales a length of the respective region (e.g., extending from the current viewpoint of the user toward the respective content) based on the magnitude of the downward movement, and optionally scales the width of the respective region (e.g., extending from a leftmost edge of the respective region toward a rightmost edge of the respective region) based on the magnitude of the rightward movement. Similarly, the computer system optionally decreases the length of the respective region based on upward movement of the air pinch gesture and/or decreases the width of the respective region based on leftward movement of the air pinch gesture. It is understood that different combinations of movement of such an air pinch gesture optionally affect different changes in the dimensions of the respective region. In some embodiments, the computer system concurrently changes the dimensions of a plurality of the one or more regions associated with changing visual prominence of the respective content in accordance with the air pinch gesture. In some embodiments, the computer system detects other inputs to cause changes in the dimensions of the respective content and/or the respective region(s), such as a contacting and movement between the user's body and a surface (e.g., touch-sensitive surface) in communication with the computer system and/or in accordance with movement of a stylus and/or pointing device in communication with the computer system. In some embodiments, as described further with reference to step(s) 2218, the respective region(s) and/or content scale in accordance with changes in distance between the current viewpoint and the respective content, optionally increases or decreases in that distance. Associating the respective content with one or more regions of the three-dimensional environment having a size based on the size of the respective content provides visual feedback concerning the range of optimal viewing positions and/or orientations relative to the respective content, thereby reducing the likelihood the user erroneously In some embodiments, the one or more first criteria include a criterion that is satisfied when the current viewpoint, such as viewpoint 2126, is within a respective region of one or more regions of the three-dimensional environment associated with the changing of visual prominence of the respective content (2218*a*), such as viewing region 2130-1, and wherein, in accordance with a determination that a distance of the respective content, such as object 2106*a*, relative to the current viewpoint is a first distance, a size of the respective region is a second size relative to the three-dimensional environment (2218*b*), such as the size of viewing region 2130-1 in FIG. 21K. For example, the computer system optionally displays the respective content optionally at a first (e.g., world-locked) position relative to the three-dimensional environment, and determines the size of the respective region (e.g., the second size and/or having one or more characteristics of the respective region described with reference to step(s) 2216) based on the first distance between the respective content and the current viewpoint. In some embodiments, in response to detecting a change in the distance of the current viewpoint and the respective content (e.g., in response to one or more moving operations of the respective content), the computer system changes (e.g., increases or decreases) the size of the respective region of the one or more regions and/or respective sizes of the one or more regions of the three-dimensional environment.

In some embodiments, in accordance with a determination that the distance of the respective content relative to the current viewpoint is a second distance, different from the first distance, the size of the respective region is a third size relative to the three-dimensional environment, different from the second size (2218*c*), such as an enlarged viewing region 2130-1 in FIG. 21L. For example, the computer system optionally displays the respective content at a second (e.g., world-locked) position relative to the three-dimensional environment, and determines the size of the respective region (e.g., the third size and/or having one or more characteristics of the respective region described with reference to step(s) 2216) based on the second distance between the respective content and the current viewpoint. Thus, the computer system optionally determines the respective size of the respective region based on the distance between the respective content and the current viewpoint. In some embodiments, the respective distance is based on a distance between a respective portion (e.g., a center, corner, and/or border) of the respective content and the current viewpoint. In some embodiments, the distance between the respective content and the current viewpoint of the user is changed in response to input(s) moving the respective content and/or changing the current viewpoint of the user. For example, the determined distance between the respective content optionally decreases in response to one or more inputs moving the respective content closer to the current viewpoint of the user, and in response, the computer system optionally decreases or increases the size of the respective region. In contrast, in response to one or more inputs moving the respective content further from the current viewpoint, the computer system optionally increases or decreases the size of the respective region. Similarly, in response to determining the current viewpoint change such that the distance between the respective content and the current viewpoint increases, the computer system optionally decreases or increases the size of the respective region. In response to determining the current viewpoint change such that the distance decreases, the computer system optionally increases or decreases the size of the respective region. Assigning the size of the respective region in accordance with the distance of the respective content and the current viewpoint improves interactability with the respective content when the respective content is relatively further away (or closer to) the current viewpoint, thus improving consistency of user feedback concerning how movement of the current viewpoint modifies the visual prominence of virtual content relative to various virtual content displayed at various distances from the current viewpoint.

In some embodiments, while displaying, via the display generation component, the respective content, such as object 2106*a* in FIG. 21K, at the first position and with the first size within the three-dimensional environment, and while the distance of the respective content is the first distance relative to the current viewpoint of the user, the computer system detects (2220*a*), via the one or more input devices, an input including a request to move the respective content to a second position within the three-dimensional environment, different from the first position, such as cursor 2146 shown in FIG. 21K, wherein the respective content is the second distance away from the current viewpoint of the user while displayed at the second position. For example, the computer system optionally detects one or more inputs selecting the respective content such as an air gesture (e.g., an air pinch gesture including contact between an index finger and thumb of a hand of the user of the computer system, a splaying of fingers of the hand, and/or a curling of one or more fingers of the hand), a contact between a touch-sensitive surface included in and/or in communication with the computer system, and/or a blink performed by the user of the computer system toggling a selection of the respective content, optionally while a cursor is displayed corresponding to the respective content and/or attention of the user is directed to the respective content. While the air gesture (e.g., the contact between index finger and thumb), the contact, and/or the selection mode is maintained, the computer system optionally detects one or more movements of the user's body, a second computer system in communication with the computer system (e.g., a stylus and/or pointing device), and/or the contact between the touch-sensitive surface and a finger of the user, and moves the respective content to an updated (e.g., second position) position based on the movement. For example, the second position optionally is based on a magnitude of the movement and/or a direction of the movement.

In some embodiments, in response to detecting the input including the request to move the respect content to the second position within the three-dimensional environment (2220*b*), the computer system displays (2220*c*), via the display generation component, the respective content at the second position within the three-dimensional environment with a fourth size, different from the first size, the second size, and the third size, such as the size and position of object 2106*a* in FIG. 21L. In some embodiments, the computer system changes the size (e.g., scale) of the respective content based on the respective distance (e.g., having one or more characteristics of the distance(s) described with reference to step(s) 2218) between the respective content and the current viewpoint. The changed, fourth size optionally corresponds to a relatively larger or smaller scale of the respective content, thereby improving visibility or reducing occlusion caused by the respective content. In some embodiments, the size of the respective content is related to and/or proportional to the distance between the respective content and the current viewpoint, as described further with reference to step(s) 2218. Displaying the respective content with a respective size based on the distance between the respective content and the current viewpoint improves visibility of the respective content, thereby reducing the likelihood input is erroneously directed to the respective content.

In some embodiments, the one or more first criteria include a criterion that is satisfied when, as the current viewpoint, such as viewpoint 2126, of the user changes from the first viewpoint to the second viewpoint, such as change from FIG. 21B to FIG. 21C, the current viewpoint of the user is within a first region, such as primary region 2132 of the three-dimensional environment (2222*a*). For example, the first region optionally corresponds to a preferred viewing region of the respective content. Such a preferred region optionally allows the user to view most or all virtual content within the respective content, as if the respective content is similar to a virtual window displayed full-screen, or nearly full-screen, via the display generation component.

In some embodiments, while the current viewpoint of the user is the second viewpoint and while a visual prominence of the respective content is a third level of visual prominence, such as shown in FIG. 21C, the computer system detects (2222*b*), via the one or more input devices, a change in the current viewpoint of the user from the second viewpoint to the first viewpoint, such as a change in viewpoint from FIG. 21C to FIG. 21B. For example, the third level of visual prominence optionally is less than the first level of visual prominence because the second viewpoint is optionally within a second region of the three-dimensional environment corresponding to a range of not preferred viewing orientation(s) and position(s). In some embodiments, the change of current viewpoint from the second viewpoint to the first viewpoint corresponds to a same amount (or different amount) of movement described with reference to changing viewpoint from the first viewpoint to the second viewpoint with reference to step(s) 2202, in an opposing one or more directions. For example, the change from the first to the second viewpoint is optionally leftward movement by a distance, and the change from the second to the first viewpoint is optionally rightward movement by the same (or different) distance. In some embodiments, as described further below, the computer system establishes one or more thresholds with hysteresis to improve visual feedback while the current viewpoint changes between viewpoints.

In some embodiments, while detecting, via the one or more input devices, the change of the current viewpoint of the user to the first viewpoint (2222*c*) (e.g., while moving from the second viewpoint to the first viewpoint), in accordance with a determination that the current viewpoint of the user satisfies one or more second criteria, different from the first criteria, wherein the one or more second criteria include a criterion that is satisfied when, as the current viewpoint of the user changes from the second viewpoint to the first viewpoint, the current viewpoint of the user is within a second region, different from the first region, of the three-dimensional environment, such as off-angle region 2134-2 (e.g., as described previously), the computer system displays, via the display generation component, the respective content with a fourth level of visual prominence, different from (e.g., greater than) the third level of visual prominence, wherein the fourth level of visual prominence changes as the current viewpoint of the user changes while the one or more second criteria are satisfied (2222*d*), for example, the visual prominence of object 2106*a* intermediate to prominence shown between FIGS. 21B and 21C. For example, the computer system optionally begins displaying the respective content with the second level of visual prominence when the current viewpoint reaches a first threshold (e.g., a threshold position and/or threshold angle) relative to the respective content while the current viewpoint changes from the first viewpoint to the second viewpoint, and the computer system optionally begins displaying the respective content with the fourth level of visual prominence when the current viewpoint reaches a second threshold, different from the first threshold. For example, the second threshold optionally corresponds to a second threshold distance (e.g., 0.001, 0.01, 0.025, 0.05, 0.1, 0.25, 0.5, 1, 2.5, 5, 10, 15, 25, 50, 100, 250, or 500 m) from the respective content, and the first threshold optionally corresponds to a first threshold distance (e.g., 0.01, 0.025, 0.05, 0.1, 0.25, 0.5, 1, 2.5, 5, 10, 15, 25, 50, 100, 250, 500, or 1000 m) different from (e.g., greater than) the first. Thus, when moving in a first direction (e.g., backward or leftward), the computer system optionally begins changing the level of visual prominence of the respective content in response to a relatively lesser or greater change in position as compared to when moving the same amount in a second direction (e.g., forward or rightward), optionally opposing the first. Similar embodiments are optionally applicable with respect to different threshold angles (e.g., 5, 10, 15, 20, 25, 30, 35, 40, 45, 50, 55, 60, 65, 70, or 75 degrees), and/or a combination of threshold distances and/or angles relative to the respective content. Providing one or more thresholds with hysteresis associated with changing the level of visual prominence of the respective content reduces the likelihood that the user inadvertently changes the level of visual prominence of the respective content, thereby preventing needless inputs to correct for such inadvertent changes in visual prominence.

In some embodiments, while displaying, via the display generation component, the respective content, such as object 2106*a* at the first position within the three-dimensional environment and while the current viewpoint of the user satisfies the one or more first criteria (e.g., while the current viewpoint is within a respective region of the one or more regions of the three-dimensional environment associated with modifying the level of visual prominence of the respective content), such as viewpoint 2126 in FIG. 21D, the computer system detects (2224*a*), via the one or more input devices, a first input directed to the respective content corresponding to a first request to initiate one or more operations associated with the respective content, such as indicated by cursor 2146 in FIG. 21D. The first input optionally has one or more characteristics of the manner of input (e.g., air gestures, contact with a touch-sensitive surface, and/or attention of the user) described with reference to the selection and/or movement of the respective content described with reference to step(s) 2218, and optionally associated with a different one or more operations (e.g., different from selection and/or movement of the respective content). For example, the first input optionally includes a scrolling operation directed to text and/or images, selection of one or more virtual buttons included in the respective content, a copying of media included in the respective content, and/or selection of a link included in the respective content.

In some embodiments, in response to detecting the first input directed to the respective content (2224*b*) in accordance with a determination that the current viewpoint satisfies one or more second criteria, different from the one or more first criteria, the computer system forgoes (2224*c*) initiation of the one or more operations associated with the respective content, such as shown in FIG. 21E. For example, the one or more second criteria optionally include a criterion that is satisfied when the current viewpoint corresponds to a position and/or orientation within a respective region of the one or more regions of the three-dimensional environment associated with changing the level of visual prominence of the respective content. As an additional example, while the current viewpoint changes to more "extreme" positions within the respective region (e.g., at a relatively greater viewing angle and/or relatively greater distance from the respective content), the computer system optionally forgoes initiation of one or more operations associated with the first input directed to the respective content, such as the scrolling operation, the selection of buttons, the copying of media, and/or the selection of links described previously. In some embodiments, in accordance with a determination that the current viewpoint satisfies the one or more second criteria, the computer system initiates (2224*d*) the one or more operations associated with the respective content, such as shown by content 2109*a* from FIG. 21C to FIG. 21D. For example, if the current viewpoint corresponds to an orientation within the respective region described previously at a viewing angle that is less than a threshold viewing angle (e.g., 5, 10, 15, 20, 25, 30, 35, 40, 45, 50, 55, 60, 65, 70, or 75 degrees) and/or less than a threshold distance (e.g., 0.001, 0.01, 0.025, 0.05, 0.1, 0.25, 0.5, 1, 2.5, 5, 10, 15, 25, 50, 100, 250, or 500 m) from the respective content (e.g., corresponding to a "preferred viewing angle"), the computer system optionally initiates the one or more operations described previously. In some embodiments, the computer system detects a second input similar to or the same as the first input when the current viewpoint corresponds to a preferred viewing region of the one or more regions of the environment, and initiates the one or more operations associated with the respective content. The preferred viewing region optionally corresponds to a range of orientations relative to the respective content that preserve visibility of the respective content (e.g., not too far or close to the respective content, and/or not at an angle deviating too greatly from a normal extending from the respective content). For example, the first and second inputs optionally correspond to a scrolling operation of text by a first amount, and the amount of scrolling displayed in response the first and the second input optionally are the same despite the first input being detected while the current viewpoint is within a suboptimal viewing region relative to the respective content and the second input being detected while the current viewpoint is within an optimal viewing region relative to the respective content. In some embodiments, the computer system forgoes initiation of the one or more operations in accordance with a determination that the current viewpoint of the user is changing and the visual prominence of the respective content has been reduced due to the change in the current viewpoint. For example, while displaying the respective content at the first position within the three-dimensional environment and while the current viewpoint satisfies the one or more first criteria, the computer system optionally detects the first input. In response to detecting the first input, in accordance with a determination that the current viewpoint satisfies one or more third criteria, including a criterion that is satisfied when the current viewpoint is changing from the first viewpoint to a second viewpoint and that the visual prominence of the respective content has been reduced (e.g., from full visual prominence) due to the change in the current viewpoint, the computer system forgoes initiating one or more operations in accordance with the first input. In accordance with a determination that the current viewpoint does not satisfy the one or more third criteria (e.g., because the visual prominence of the respective content has not been reduced (e.g., is still at a higher level of visual prominence)), the computer system optionally performs the one or more operations. Initiating or forgoing initiation of the one or more operations associated with the respective content when the one or more second criteria are or are not satisfied reduces user input erroneously directed to the respective content while the current viewpoint is suboptimal for interaction.

In some embodiments, the one or more second criteria include a criterion that is satisfied when the current viewpoint, such as viewpoint 2126, is oriented at greater than a first threshold angle relative to the respective content, such as the threshold of off-angle region 2134-2 medial to the center of object 2106*a* in FIG. 21C the first input is detected when the current viewpoint is oriented at a first angle greater than the first threshold angle relative to the respective content, and the first input is detected while a visual prominence of the respective content is a third level of visual prominence (2226*a*), such as indicated by cursor 2146 in FIG. 21C (e.g., different from or the same as the second level of visual prominence). For example the criterion is optionally satisfied when the first input is detected while the current viewpoint is greater than a first threshold angle (e.g., 5, 10, 15, 20, 25, 30, 35, 40, 45, 50, 55, 60, 65, 70, or 75 degrees) and/or less than a second threshold angle (e.g., 10, 15, 20, 25, 30, 35, 40, 45, 50, 55, 60, 65, 70, 75, or 80 degrees). Additionally or alternatively, the one or more second criteria optionally include a criterion satisfied when the first input is detected while the respective content is displayed with the third level of visual prominence (e.g., less than or greater than the first level of visual prominence). In some embodiments, the third level of visual prominence includes displaying one or more portions or all of the respective content with a modified level of brightness, opacity, blurring effect, a radius of the blurring effect, color and/or pattern fill applied to the portion(s) or entirety of the respective content. For example, the computer system optionally displays the respective content with a fully opaque and 100% brightness without a blurring effect while the current viewpoint is within the preferred viewing region of the three-dimensional environment described with reference to step(s) 2224, and optionally displays the respective content with a partially translucent and dimmer appearance and includes a blurring effect while the current viewpoint satisfies the one or more second criteria.

In some embodiments, while the current viewpoint of the user satisfies the one or more second criteria and while the current viewpoint is changing from being oriented at the first angle relative to the respective content to being oriented at a second angle, greater than the first angle, relative to the respective content, such as the threshold of off-angle region 2134-2 lateral relative to the center of object 2106*a* in FIG. 21C, the computer system, decreases the visual prominence of the respective content from the third visual prominence to a fourth level of visual prominence, less than the third level of visual prominence (2226*b*), such as the visual prominence of object 2109*a* in FIG. 21D. For example, the computer system optionally reduces the level of visual prominence of the respective content (e.g., decreases visual prominence) gradually from the third level of visual prominence described above to the fourth level of visual prominence as the current viewpoint exceeds the second threshold angle described above, optionally increasing a blurring effect and/or a radius of the blurring effect, increasing the opacity of color and/or pattern fill applied to the respective content, and/or decreasing brightness and/or opacity of the one or more portions of the respective content. In some embodiments, in response to and/or while decreasing the visual prominence of the respective content from the third level to the fourth level of visual prominence and/or while receiving the first input, the computer system optionally continues to perform one or more operations in accordance with the first input (e.g., continuing to scroll, continuing to move virtual content, and/or continuing to scale virtual content). Such continued operation is optionally possible because the computer system detected initiation of the first input while displaying the respective content with the third level of visual prominence, and would otherwise ignore the first input if received while displaying the respective content with the fourth level of visual prominence. In some embodiments, the fourth level of visual prominence includes ceasing display and/or obscuring portions of the respective content (e.g., with a pattern fill). When the first input is continued—even while displaying the respective content with the fourth level of visual prominence—the computer system continues to perform the one or operations in accordance with the first input. Thus, after detecting the first input cease and/or while the first input is ongoing, in response to detecting a change in viewpoint such that visual prominence of the respective content is again increased, the computer system optionally displays the results of the previously ongoing first input performed while the computer system displayed the respective content with the fourth level of visual prominence. In some embodiments, the third and the fourth levels of visual prominence correspond to different respective levels of a visual characteristic (e.g., the level of brightness, opacity, blurring effect, radius of the blurring effect, and/or the color and/or pattern fill) applied to the respective content. In some embodiments, the third level of visual prominence includes a plurality of such visual characteristics having respective levels, and the fourth level of visual prominence includes changing (e.g., increasing or decreasing) one or more of the respective levels. For example, the computer system optionally displays the respective content with a blurring effect at the third level, and optionally displays the respective content with a greater degree of the blurring effect and with a reduced opacity at the fourth level. In some embodiments, the second angle corresponds to the same respective region of the three-dimensional environment as the first angle. In some embodiments, displaying the respective content with the fourth level of visual prominence includes ceasing display of one or more visual elements included in the respective content. For example, the computer system optionally ceases display of media included in a photos user interface and/or text included in the respective content. Performing one or more operations based on the first input when the first input is received beyond the first threshold angle allows continued user interaction, despite initiating changes in a level of visual prominence of the respective content, thereby improving a speed and ease of user interaction with the respective content.

In some embodiments, the one or more second criteria include a criterion that is satisfied when the current viewpoint, such as viewpoint 2126, is oriented at greater than a first threshold angle relative to the respective content (e.g., 5, 10, 15, 20, 25, 30, 35, 40, 45, 50, 55, 60, 65, 70, or 75 degrees), the first input, such as the angle based on viewpoint 2126 when detecting input indicated by cursor 2144 in FIG. 21C, is detected when the current viewpoint is oriented at a first angle greater than the first threshold angle relative to the respective content, wherein the first angle is less than a second threshold angle (e.g., 5, 10, 15, 20, 25, 30, 35, 40, 45, 50, 55, 60, 65, 70, or 75 degrees) relative to the respective content (e.g., as described with reference to step(s) 2226).

In some embodiments, the computer system detects (2228*b*), via the one or more input devices, a second input, different from the first input, such as indicated by cursor 2146, wherein the second input is detected while the current viewpoint is oriented at a second angle, different from the first angle, such the angle based on viewpoint 2126 when detecting input indicated by cursor 2146 in FIG. 21D, and less than the first threshold angle relative to the respective content (2228*a*). In some embodiments, the second input is similar but distinct from the first input described previously. For example, the first input optionally includes a scrolling operation of text, a moving of a visual element, and/or selection of one or more buttons, and the second input optionally includes similar operation(s), with respect to different portion(s) and/or visual elements of the respective content. In some embodiments, the first and the second input correspond to different operations associated with the respective content. For example the first input optionally is a scrolling operation, and the second input optionally is a moving of a visual element.

In some embodiments, while detecting the second input (2228*c*): (e.g., while a scrolling operation is ongoing, a movement operation of a portion of the respective content is ongoing, input simulating handwriting is directed to the respective content, and/or input entering font-based text is ongoing), the computer system detects (2228*d*), via the one or more input devices, a change in the current viewpoint to a third viewpoint, different from the first viewpoint and the second viewpoint, such as the change in viewpoint 2126 from FIG. 21C to FIG. 21D, and in response to detecting the change in the current viewpoint (2228*e*), in accordance with a determination that the current viewpoint satisfies the one or more second criteria, the computer system performs (2228*f*) one or more operations in accordance with the second input, such as the scrolling of content 2107*a* in FIG. 21D. For example, when the third viewpoint satisfies the one or more second criteria while a scrolling and/or selection input is ongoing, the computer system optionally continues to scroll and/or select at least a portion of the respective content. In some embodiments, the one or more second criteria include a criterion that is satisfied when the current viewpoint corresponds to a respective region of the three-dimensional environment permitting user interaction with the respective content. For example, the computer system optionally detects an air gesture is maintained while the current viewpoint changes, such as a continuous or nearly continuous contact between an index finger and thumb of a user of the computer system.

In some embodiments, in accordance with a determination that the current viewpoint does not satisfy the one or more second criteria, the computer system forgoes (2228*g*) the performance of the one or more operations in accordance with the second input, such as the lack of change to content 2109*a*. For example, the one or more second criteria are optionally not satisfied when the current viewpoint changes to a viewing angle that exceeds the second threshold angle that is different (e.g., greater than) than the first threshold angle associated with changing visual prominence of the respective content. In some embodiments, the one or more second criteria optionally are not satisfied when the current viewpoint changes to a distance from the respective content greater than a second threshold distance that is different (e.g., greater than) a first threshold distance associated with changing visual prominence of the respective content. Such thresholds optionally have one or more characteristics of the threshold distances and/or angles described at least with reference to step(s) 2224 and/or step(s) 2226. In some embodiments, if an input is initially detected while the current viewpoint is beyond the second threshold angle and/or the second threshold distance, the computer system forgoes performance of the one or more operations. In some embodiments, if the input is ongoing while the current viewpoint changes to a respective viewpoint that does not satisfy the one or more second criteria, the computer system optionally ceases the one or more operations, and additionally or alternatively is not responsive to further inputs until the current viewpoint satisfies the one or more second criteria again. The performing or forgoing performance of operations in accordance with a determination the one or more second criteria are satisfied reduces the likelihood user input is erroneously directed to the respective content while the current viewpoint is unsuitable for interacting with the respective content and/or enables the user to continue an ongoing previous input if the current viewpoint is sufficient for interaction.

In some embodiments, displaying the respective content, such as object 2106*a*, with the second level of visual prominence includes displaying, via the display generation component, one or more virtual elements associated with the respective content, wherein the one or more virtual elements were not displayed when the respective content was displayed with the first level of visual prominence (2320), such as a border surrounding object 2106*a*. For example, the computer system optionally displays virtual content (e.g., one or more virtual elements) such as one or more menu items, one or more portions of a border surrounding the respective content, lighting effects associated with the respective content, patterned and/or solid fill overlays over the respective content, and/or lighting effects associated with the border surrounding the respective content. In some embodiments, the one or more menu items are associated with the respective content such as one or more selectable icons to cease display of the respective content, share the respective content, move the respective content, minimize the respective content, and/or one or more other operations associated with the respective content. For example, the one or virtual elements optionally include a selectable option to recenter the respective content based on the user's current viewpoint when selecting the selectable option. The lighting effect optionally includes a simulated one or more light sources that mimic the appearance of a real-world light source shining toward the respective content and/or border. In some embodiments, the computer system changes the level of visual prominence of an edge and/or border that was previously displayed at the first level of visual prominence when displaying the respective content with the second level of visual prominence. In some embodiments, the one or more virtual elements include a visual representation of an application and/or of the respective content, such as a text label, a graphical icon, and/or an overlay (e.g., including the aforementioned visual representations) over the respective content. Displaying the one or more virtual elements provides interactivity that can be undesirable while the respective content is displayed with the first level of visual prominence and provides visual feedback about the user's current viewpoint relative to the respective content, thereby preventing erroneous input erroneously directed to the respective content when displayed with the first level of visual prominence and providing added interactivity while displaying the respective content with the first level of visual prominence.

In some embodiments, the displaying of the one or more virtual elements associated with the respective content includes changing respective visual prominences of the one or more virtual elements, such as object 2140, concurrently with the changes of the second level of prominence as the viewpoint of the user changes (2232), such as the changes in viewpoint 2126 from FIG. 21C to FIG. 21D. For example, the computer system optionally displays the respective content with one or more virtual elements such as a virtual border (e.g., a line having a color, translucency, and/or amount of brightness surrounding portion(s) of the respective content) gradually and concurrently with the changes of the second level of visual prominence. Such gradual changes optionally include increasing a brightness and/or opacity of the border while the brightness and/or opacity of the respective content decreases. Although such gradual changes of the one or more virtual elements are described with reference to the virtual border, it is understood that the one or more virtual elements described with reference to step(s) 2230 optionally are gradually changed similarly or the same as the virtual border. Additionally or alternatively, the one or more virtual elements optionally share a level of brightness and/or opacity that changes by a shared amount in response to the gradual changes in visual prominence of the respective content. Concurrently changing visual prominence of the respective content with the changes of the level of visual prominence of the respective content provides additional visual feedback concerning the user's changes in viewpoint relative to the respective content, thereby preventing input erroneous directed to the one or more visual elements and/or the respective content as the current viewpoint changes and/or settles.

In some embodiments, the displaying the respective content with the second level of visual prominence includes displaying a virtual border (and/or edge) surrounding one or more portions of the respective content with a third level of visual prominence (2334*a*), and wherein displaying the respective content with the first level of visual prominence does not include displaying the virtual border surrounding the one or more portions of the respective content with the third level of visual prominence (2334*b*). For example, the virtual border has one or more characteristics of the border(s) described with reference to step(s) 2230 and step(s) 2232. In some embodiments, the computer system does not display the virtual border while the respective content is displayed with the first level of visual prominence. In some embodiments, the virtual border and the respective content are displayed with different respective levels of visual prominence. In some embodiments, the third level of visual prominence associated with the virtual border opposes changes to the level of visual prominence of the respective content. For example, the computer system optionally fades out the respective content while concurrently fading in the virtual border (e.g., in brightness and/or opacity). Displaying the virtual border with the third level of visual prominence conveys user orientation relative to the respective content, thereby decreasing erroneous interaction with the respective content as the current viewpoint of the user changes.

In some embodiments, the displaying the respective content with the second level of visual prominence includes displaying the respective content with a pattern fill (2336), such as the pattern fill of object 2106*a* in FIG. 21C. For example, as described with reference to step(s) 2230 and/or step(s) 2232. The pattern fill is optionally a solid color and/or one or more patterns (e.g., cross hatching, dotting, vertical/horizontal/diagonal lines, a gradient fill, and/or another similar pattern). In some embodiments, the pattern fill is optionally displayed when displaying the respective content with the first level of visual prominence, at a different (e.g., lower) level of visual prominence, or is not displayed when displaying the respective content with the first level of visual prominence. Displaying the respective content with the pattern fill conveys user orientation relative to the respective content, thereby decreasing erroneous interaction with the respective content as the current viewpoint of the user changes.

In some embodiments, displaying the respective content, such as object 2106*a* in FIG. 21A, with the first level of visual prominence includes displaying a virtual shadow corresponding to the respective content with a third level of visual prominence (2338*a*), such as shadow cast beneath object 2106*a* in FIG. 21A, and displaying the respective content with the second level of visual prominence, such as object 2106*a* in FIG. 21B, includes displaying the virtual shadow with a fourth level of visual prominence, different from (e.g., less than) the third level of visual prominence, wherein the fourth level of visual prominence changes as the current viewpoint of the user changes (2338*b*), such as a shadow cast beneath object 2106*a* in FIG. 21B. For example, the computer system optionally displays a virtual shadow cast below the respective content with an appearance similar to a shadow cast by a real-world light source oriented toward content. In some embodiments, the computer system displays the virtual shadow based on one or more virtual light sources (e.g., placed above the respective content relative to a floor of the three-dimensional environment) and/or one or more physical light sources (e.g., in the physical environment of the user). Such one or more virtual light sources are optionally placed at different angles relative to the respective content, and in some embodiments, one or more instances of virtual content (e.g., one or more virtual windows) respectively have one or more light sources positioned at the different angle(s) relative to the one or more instances of virtual content. For example, a first virtual window (e.g., the respective content and/or including the respective content) is optionally displayed with a first virtual light placed directly above the first virtual window creating a first virtual shadow beneath the first virtual window, and a second virtual window optionally is displayed with a second virtual light placed directly above the second virtual window creating a second virtual shadow beneath the second virtual window. In some embodiments, the shape and/or size of the virtual shadow is different or the same as the virtual content, and in some embodiments, is based on the size and/or shape of the respective content. For example, a flat or nearly flat virtual window is optionally associated with a virtual shadow having an oval shape to improve visibility of the virtual shadow. In some embodiments, the visual prominence of the shadow changes (e.g., increases or decreases) as the level of visual prominence changes and/or the current viewpoint of the user changes (e.g., increases or decreases). Displaying a virtual shadow associated with the respective content provides visual feedback concerning the user orientation relative to the respective content, thereby decreasing the likelihood of erroneous interaction with the respective content.

In some embodiments, displaying the respective content with the first level of visual prominence includes concurrently displaying, via the display generation component, one or more virtual elements with the respective content, wherein the one or more virtual elements are displayed with a third level of visual prominence (2240*a*), such as object 2140 in FIG. 21A (e.g., as described with reference to step(s) 2230). In some embodiments, the one or more virtual elements include one or more selectable options (e.g., a menu) associated with the respective content. In some embodiments, a respective selectable option is selectable to modify the displayed respective content at least partially, initiate playback of media, modify a currently playing piece of media, and/or cause playback of additional media. In some embodiments, in response to input moving the respective content in the three-dimensional environment, the computer system additionally correspondingly moves the one or more virtual elements in the three-dimensional environment (e.g., in the direction and/or magnitude of the movement of the respective content).

In some embodiments, while (e.g., in response to) detecting, via the one or more input devices, the change of the current viewpoint of the user to the second viewpoint (2240*b*), such as the change in viewpoint 2126 from FIG. 21B to FIG. 21C, in accordance with a determination that the current viewpoint of the user satisfies the one or more first criteria, the computer system displays, via the display generation component, the one or more virtual elements with a fourth level of visual prominence, different from (e.g., less than) the third level of visual prominence, wherein the fourth level of visual prominence changes as the current viewpoint of the user changes (2240*c*), such as the changed level of visual prominence of object 2140 in FIG. 21C relative to as shown in FIG. 21B. For example, the computer system optionally displays the one or more virtual elements with respective levels of visual prominence (e.g., optionally a shared level of visual prominence) that change concurrently as the current viewpoint changes (e.g., increases or decreases). Such changes optionally follow or oppose the changes to the level of visual prominence of the respective content. For example, the computer system optionally decreases the level of visual prominence of the respective content when the one or more first criteria are satisfied and optionally increases the level(s) of the visual prominence of the one or more virtual elements when the one or more first criteria are satisfied. Displaying the one or more virtual elements with respective levels of visual prominence provides visual feedback of the current viewpoint of the user relative to the respective content, thereby reducing the likelihood the user erroneously interacts with the respective content and guides the user to change (e.g., increase) the level of visual prominence of the respective content.

In some embodiments, while displaying the respective content with the first level of visual prominence at the first position in the three-dimensional environment, the computer system displays (2242*a*), via the display generation component, such as object 2106*a* in FIG. 21B, second respective content at a second position in the three-dimensional environment, such as object 2150*a*, wherein the respective content is a first type of content, and the second respective content is a second type of content, different from the first type of content. For example, the computer system optionally categorizes types of virtual content, such as a type including one or more menus, a type associated with a system user interface associated with an operating system of the computer system, a type associated with substantive virtual content (e.g., media user interfaces, web browsing user interfaces, multi-window content user interfaces), and/or a type including a three-dimensional virtual object (e.g., a sphere, a car, and/or an icon) that are associated with the respective virtual content displayed within the three-dimensional environment. The respective content, for example, is optionally a first type (e.g., a media playback user interface) and the second respective content is optionally a second, different type of virtual content (e.g., one or more selectable menu icons having one or more characteristics described with reference to step(s) 2230). In some embodiments, due to the differences in type of the respective content and the second respective content, the computer system modifies the level of visual prominence of the respective and/or second respective content differently, as described further below. In some embodiments, the first type of virtual objects is not operative to modify aspects of the operating system of the user interface (e.g., the first type of virtual objects are non-system or non-operating system user interfaces, such as being application user interfaces). In some embodiments, the second type of virtual objects are system or operating system user interfaces (e.g., user interfaces of the operating system of the computer system as opposed to being user interfaces of applications on the computer system).

In some embodiments, in response to detecting the change of the current viewpoint of the user from the first viewpoint to the second viewpoint (2242*b*), such as viewpoint 2126 from FIG. 21H to FIG. 21I, the computer system displays (2242*c*) the respective content with a third level of visual prominence, different from the first level of visual prominence, at the first position within the three-dimensional environment, ceases (2242*d*) display of the second respective content at the second position in the three-dimensional environment, displays (2242*e*), via the display generation component, the second respective content at a third position in the three-dimensional environment, different from the first and the second positions in the three-dimensional environment, such as object 2150*a* in FIG. 21*a*, and displays (2242*f*), via the display generation component, the second respective content at a third position in the three-dimensional environment, different from the first and the second positions in the three-dimensional environment. For example, the computer system optionally displays the respective content with the third level of visual prominence (e.g., a decreased or increased visual prominence) in response to the change in current viewpoint and optionally maintains the position of the respective content relative to the three-dimensional environment (e.g., as described further with reference to step(s) 2202). For example, the computer system optionally fades out and/or abruptly stops displaying the second respective content at the second position in response to the change in current viewpoint. For example, the computer system optionally fades in the second respective content at the third position optionally based on the changed user viewpoint in response to the change in the current viewpoint because the second respective content is optionally the second type of virtual content. The second respective virtual content, for example, optionally includes one or more system user interfaces and/or one or more selectable menu items associated with the respective content that the user optionally interacts with, independent of the position and/or orientation of the respective content, such as a selectable option to close the respective content (e.g., cease display and/or terminate processes associated with the respective content). In some embodiments, the positions and/or orientations of the second respective content is the same prior to and after detecting the change in current viewpoint of the computer system. In some embodiments, the second respective content does not change in visual prominence in the same way (or at all). For example, a menu including a plurality of notifications is optionally maintained at a level of brightness, opacity, and/or saturation regardless of changes in position of the current viewpoint. Displaying the second respective content at third position within the three-dimensional environment in response to detecting changes in the current viewpoint to the second viewpoint provides constant—or near constant—accessibility to the second respective content, thereby reducing user input such as movement to cause display of the second respective content.

In some embodiments, while (e.g., in response to) detecting, via the one or more input devices, the change of the current viewpoint, such as viewpoint 2126, of the user to the second viewpoint (2244*a*), such as from FIG. 21A to FIG. 21B in accordance with a determination that the current viewpoint of the user does not satisfy the one or more first criteria, the computer system maintains (2244*b*) display of the respective content at the first level of visual prominence, such as the visual prominence of object 2106*a* in FIG. 21B. In some embodiments, the computer system determines that the current viewpoint has changed between respective positions within a viewing region associated with preferred viewing the respective content (e.g., within one or more threshold angles and/or distance described with reference to step(s) 2222). In response to detecting the change in the current viewpoint within the viewing region, the computer system optionally forgoes changing of the level of visual prominence of the respective content (e.g., maintains display of the first level of visual prominence). Maintaining the first level of visual prominence when the one or more first criteria are not satisfied provides feedback that the user is optionally able to continue interaction with the respective content, thereby reducing the likelihood the user needlessly modifies their current viewpoint and/or an orientation of the respective content to enable such interaction.

It should be understood that the particular order in which the operations in method 2200 have been described is merely exemplary and is not intended to indicate that the described order is the only order in which the operations could be performed. One of ordinary skill in the art would recognize various ways to reorder the operations described herein.

FIGS. 23A-23E illustrate examples of a computer system modifying or maintaining levels of visual prominence of one or more portions of one or more virtual objects in response to detecting changes in a current viewpoint of a user of a computer system.

Figure 23A:
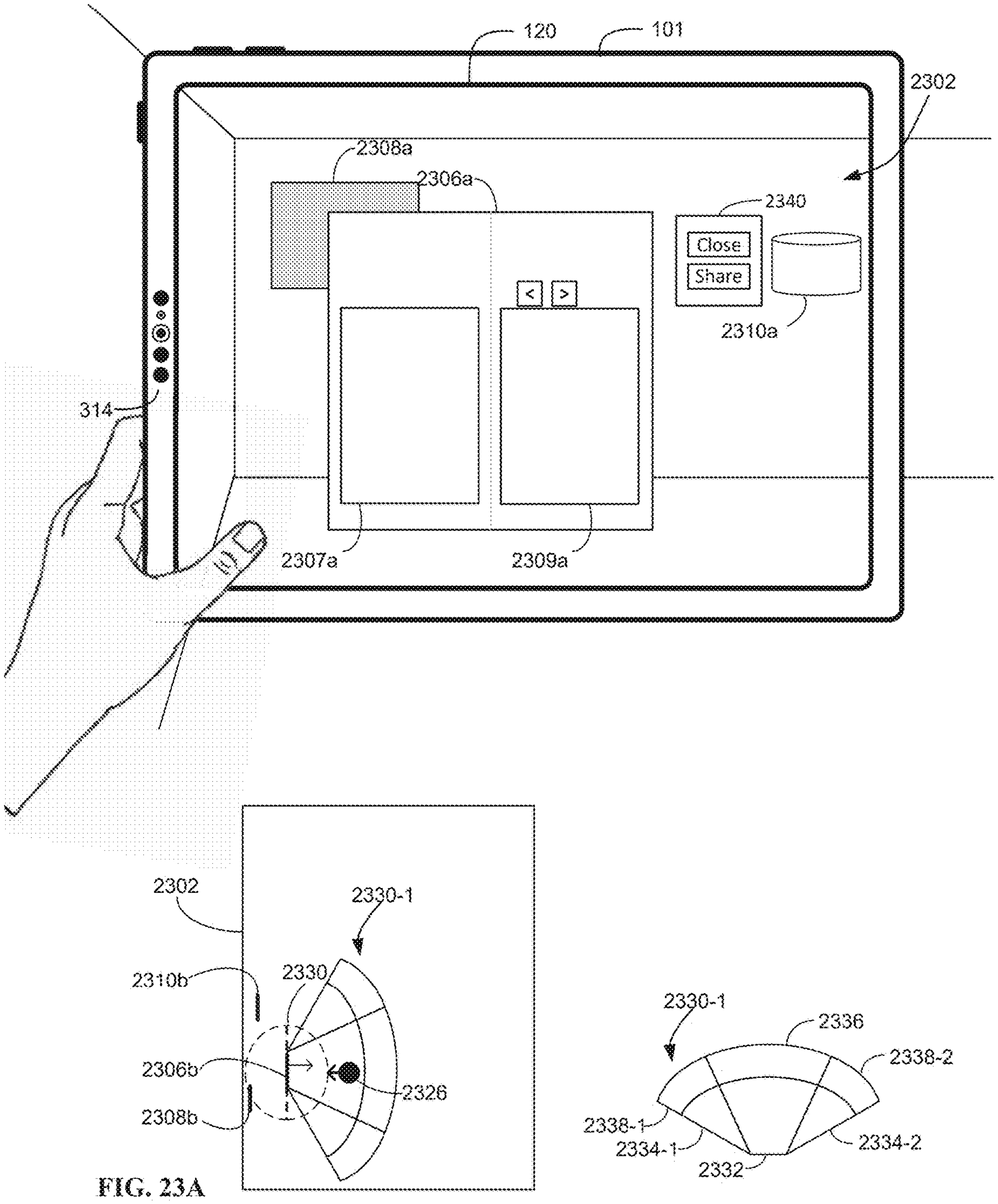
FIGS. 23A-23E illustrate examples of a computer system modifying visual prominence of respective virtual objects based on proximity of a user to the respective virtual objects in accordance with some embodiments.

FIG. 23A illustrates a three-dimensional environment 2302 visible via a display generation component (e.g., display generation component 120 of FIG. 1) of a computer system 101, the three-dimensional environment 2302 visible from a viewpoint 2326 of a user illustrated in the overhead view (e.g., facing the back wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 23A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2302 and/or the physical environment is visible in the three-dimensional environment 2302 via the display generation component 120. For example, three-dimensional environment 2302 visible via display generation component 120 includes representations of the physical floor and back walls of the room in which computer system 101 is located.

In FIG. 23A, three-dimensional environment 2302 includes virtual objects 2306*a* (corresponding to object 2306*b* in the overhead view), 2308*a* (corresponding to object 2308*b* in the overhead view), 2310*a* (corresponding to object 2310*b* in the overhead view), 2350*a* (corresponding to object 2350*b*, not yet shown), and 2340. In FIG. 23A, the visible virtual objects are two-dimensional objects (e.g., optionally with the exception of 2310*a*). In some embodiments, object 2340 is optionally associated with (e.g., includes selectable menu options for) content and/or object 2306*a* itself. It is understood that the examples of the disclosure optionally apply equally to three-dimensional objects. The visible virtual objects are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101. Three-dimensional environment 2302 includes virtual object 2310*a*, which is optionally a three-dimensional virtual object, similar to a comparable physical object having similar size and/or dimensions. Such a three-dimensional virtual object is optionally one or more of a geometric shape, prism, artistic renderings of comparable physical object, three-dimensional graphical icon, and/or representation of a virtual environment.

Object 2306*a* is optionally a virtual object including virtual content, such as content 2307*a* and content 2309*a*. Such content is optionally one or more user interfaces of applications, one or more virtual windows of an internet browsing applications, and/or one or more instances of media. Object 2308*a* is optionally a virtual object including respective virtual content, displayed at a relatively reduced level of visual prominence relative to the three-dimensional environment (e.g., a reduced opacity, brightness, saturation, obscured by a blurring effect, and/or another suitable visual modification) because object 2308*a* is beyond a threshold distance (e.g., 0.01, 0.1, 1, 10, 100, or 1000*m*) from viewpoint 2326, described with reference to method 2200. Object 2308*a* is optionally displayed at a position such that a similar physical object would obscure another physical object similar to object 2306*a* relative to viewpoint 2326. To mimic such an obscuring, the computer system optionally reduces levels of visual prominence of one or more portions of object 2306*a*, such as reducing an opacity of the one or more portions.

In some embodiments, one or more portions of object 2306*a*, object 2308*a*, and/or object 2340 respectively change in level of visual prominence in accordance with a determination that a current viewpoint 2326 of a user of the computer system moves within a threshold 2330 (e.g., distance) of the respective object, described further below. Object 2310*a* is optionally a virtual object that is a three-dimensional object with one or more characteristics that are similar or the same as a two-dimensional object (e.g., including respective virtual object), optionally displayed with a respective level of visual prominence that is independent of whether or not the viewpoint 2326 moves within the threshold distance of object 2310*a*, as will be described later.

In some embodiments, the computer system 101 determines a range of positions and/or orientations relative to object 2306*b* that are outside operating parameters for viewing and/or interacting with object 2306*b*. Accordingly, the computer system optionally decreases a level of visual prominence of one or more portions of the object 2306*b* to reduce erroneous interaction with object 2306*b* (e.g., reducing an opacity, brightness, and/or saturation of the one or more portions) while viewpoint 2326 corresponds to such a position outside operating parameters, and allows the user of the computer system to view other portions of three-dimensional environment 2302, such as portions of object 2308*a* and/or representations of the user's physical environment, such as the back wall of the physical environment. The range of positions and/or orientations are optionally represented by threshold 2330, illustrated as an elliptical border surrounding object 2306*b* in the overhead view.

As described with reference to FIGS. 21A-21L the computer system optionally determines a viewing region 2330-1 associated with changing the level of visual prominence of object 2306*a*. It is understood that viewing region 2330-1 has one or more characteristics of the region(s) of the three-dimensional environment associated with changing the level of visual prominence of virtual objects described with reference to method 2200 and its corresponding figures (e.g., FIGS. 21A-21L), such as viewing region 2130-1. Description of such viewing region(s) are omitted here for brevity.

Figure 23B:
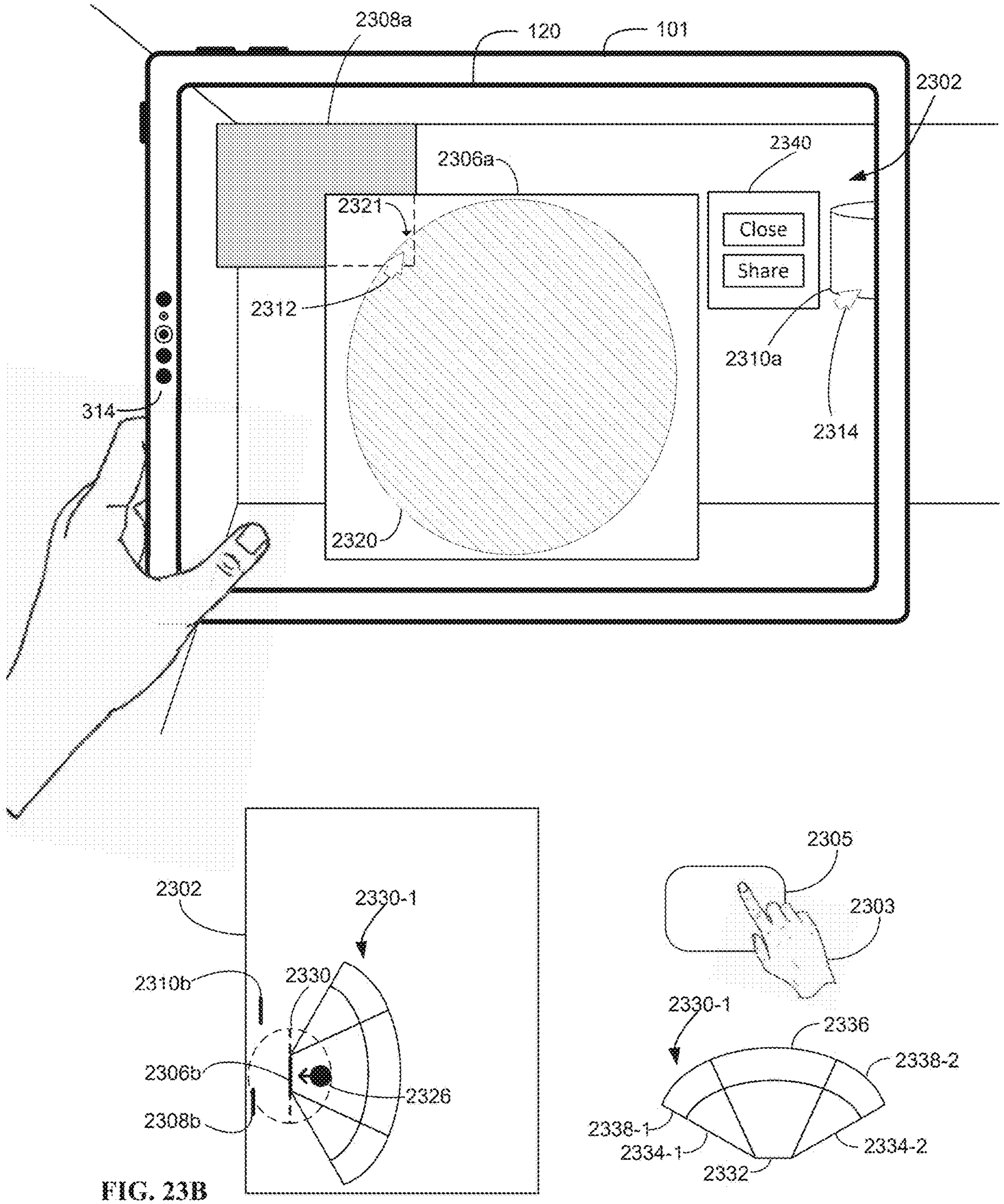

In FIG. 23B, the computer system 101 detects movement of the user's current viewpoint 2326 to within the thresholds associated with a virtual object. For example, viewpoint 2326 in the overhead view moves closer to object 2306*b* to a position within threshold 2330 associated with object 2306*b*. In response to detecting the movement, the computer system optionally displays object 2306*a* with a punch-through region 2320 (optionally abruptly such that object 2306*a* is displayed instantaneously, or nearly instantaneously including punch-through region 2320). Punch-through region 2320 optionally corresponds to the one or more portions of object 2306*b* displayed with the reduced level of visual prominence described previously. For example, within the portion of object 2306*a* included in punch-through region 2320, computer system 101 optionally decreases opacity of respective content and/or object 2306*a* (e.g., such that the portion is transparent, or nearly transparent), decreases a brightness of the respective content and/or object 2306*a*, decreases a saturation of the respective content and/or object 2306*a*, and/or applies a non-uniform modification of the level of visual prominence of the respective content and/or object 2306*a* (e.g., a gradient of decreases in transparency, brightness, and/or saturation extending toward the edge of punch-through region 2320).

Due to the decreased level of visual prominence of punch-through region 2320—referred to herein as "punch-through region prominence"—the computer system optionally presents a view of a portion of object 2308*a* through punch-through region 2320, as if the user is able to peer through a transparent physical window corresponding to portion(s) bound by punch-through region 2320 to view object 2308*a* that continues to be behind object 2306*a* relative to viewpoint 2326, as shown in the overhead view in FIG. 23B. In some embodiments, the threshold 2330 is determined based on one or more characteristics of object 2306*a*, such as a size and/or shape of object 2306*a*. In some embodiments, computer system 101 maintains the level of visual prominence of portions of object 2306*a* not included in punch-through region 2320.

In some embodiments, while object 2308*a* is visible due to the decreased punch-through region prominence, the computer system 101 detects user input directed to object 2308*a* and initiates one or more operations associated with object 2308*a* that would otherwise be directed to object 2306*a* if punch through region prominence was not decreased. For example, as described further with reference to method 2400, in FIG. 23B computer system 101 optionally detects one or more inputs represented by cursor 2312 directed to object 2308*a* at region 2321 of the three-dimensional environment. Such one or more inputs optionally include detecting attention of the user directed to region 2321 concurrently with detecting an air gesture from hand 2303 (e.g., a pinching of a thumb and index finger of the user's hand), detecting a selection input directed to a virtual button or a physical button while detecting the attention directed to region 2321, and/or a detecting selection input while a pointing device such as a mouse in communication with computer system 101 is directed to region 2321.

In response to the inputs while object 2306*a* and object 2308*a* are displayed as shown in FIG. 23B, the computer system 101 optionally initiates one or more operations associated with object 2308*a* (and does not initiate operations associated with object 2306*a*) such as initiating media playback, selecting selectable options such as virtual buttons, selecting text and/or hyperlinks included in object 2308*a*, and/or modifying a position, orientation, and/or size of object 2308*a*. When object 2306*a* does not include punch-through region 2320 (e.g., as shown in FIG. 23A because viewpoint 2326 is not within threshold 2330, or if threshold 2330 had a different magnitude such that viewpoint 2326 is not within threshold 2330 while at the position shown in FIG. 23B), the computer system 101 optionally detects a comparable and/or the same input (e.g., to the upper-left hand portion of object 2306*a* similar to as indicated by cursor 2312 in FIG. 23B), and the computer system optionally initiates one or more operations relative to object 2306*a* instead of the one or more operations associated with object 2308*a*, such as a selection of content included in object 2306*a*, and/or the one or more operations described as associated with object 2308*a* but based on the content of object 2306*a*.

In some embodiments, computer system 101 detects one or more inputs directed to object 2310*a*, represented by cursor 2314 in FIG. 23B. The one or more inputs optionally correspond to a request to translate a position of object 2310*b* shown in the overhead view to an updated position. For example, the one or more inputs optionally include the air pinch gesture from hand 2303 described previously, and optionally include movement of the hand of the user (e.g., while the thumb and index finger remain in contact). The direction and magnitude of the translation optionally are based on the direction and magnitude of the movement of the hand; for example, object 2310*a* optionally moves closer the current viewpoint 2326 of the user in accordance with the air pinch moving closer to the user's body and/or such that the magnitude of object movement is proportional, inversely proportional, or otherwise based on the movement of the hand.

Figure 23C:
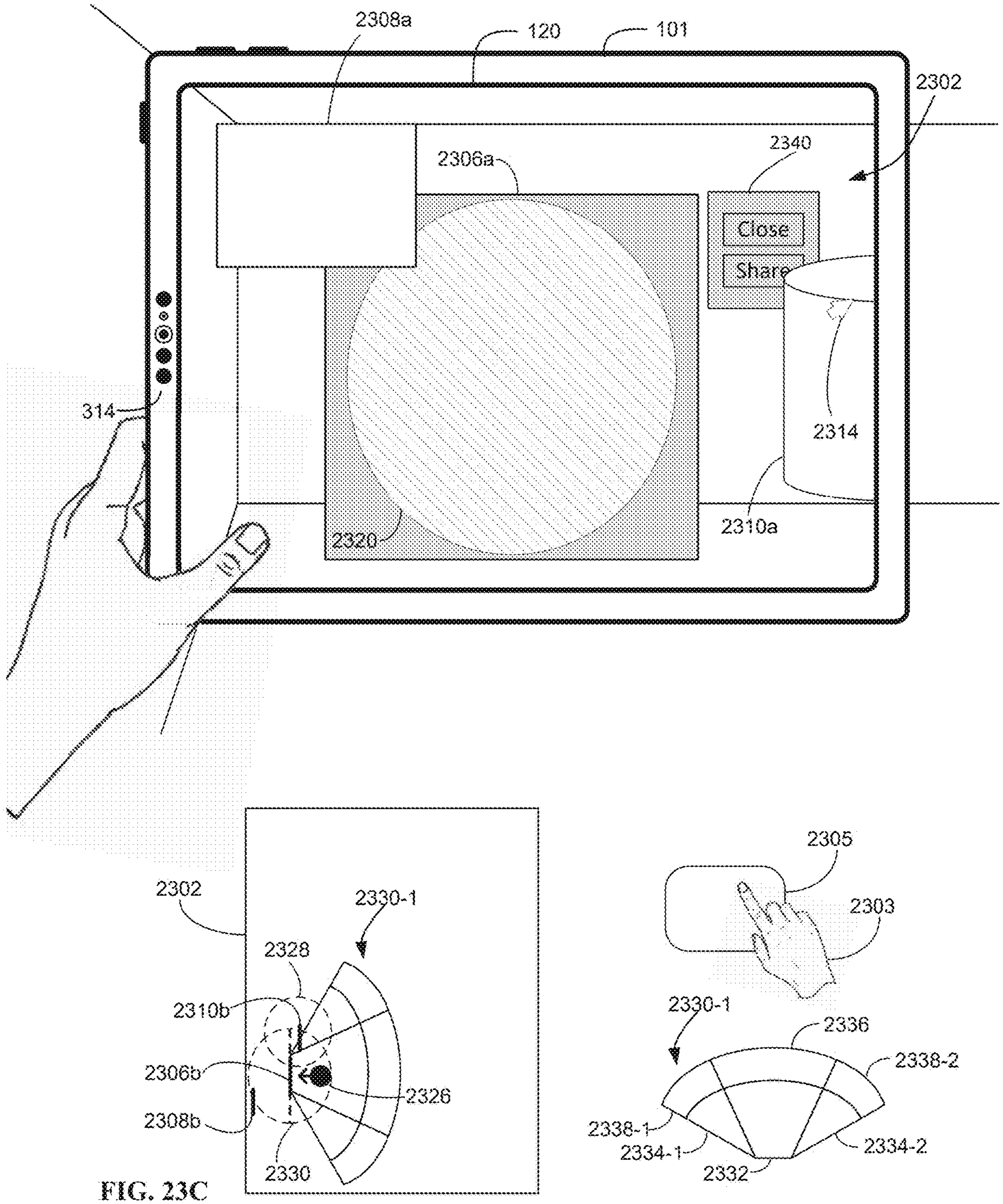

In FIG. 23C, in response to the one or more inputs directed to object 2308*a* in FIG. 23B, the computer system 101 increases the level of visual prominence of object 2308*a*, and decreases level of visual prominence of one or more portions of object 2306*a*, while maintaining the relative positions of objects 2306*a* and 2308*a* in three-dimensional environment 2302, described with reference to method 2000.

In some embodiments, one or more levels of visual prominence of one or more portions of object 2306*a* are maintained in response to the current viewpoint of the user entering the thresholds associated with object 2306*a*. For example, computer system 101 optionally reduces punch-through region prominence described previously, but maintains the opacity, brightness, and/or saturation of portion(s) of object 2306*a* not within punch-through region 2320. In some embodiments, the level of visual prominence of object 2340 changes concurrently with the change in levels of visual prominence of object 2306*a* by a corresponding (e.g., the same or similar) amount and/or direction of change as the punch-through region prominence, because object 2340 is optionally associated with object 2340 (described previously). For example, object 2340 is optionally more transparent/darker/less saturated in accordance with the similar changes to punch-through region prominence.

In FIG. 23C, computer system 101 optionally also moves the object 2310*a* in response to the one or more inputs translating object 2310*a* in FIG. 23B, as shown in the overhead view by object 2310*b* in FIG. 23C. A threshold 2328, having one or more characteristics described with reference to threshold 2330, is optionally determined based on characteristics of object 2310*a*, such as a size, shape, and/or type of object. For example, because object 2310*a* is relatively smaller than object 2306*a*, threshold 2328 is optionally proportionally relatively smaller than threshold 2330. In some embodiments, the threshold 2328 and/or threshold 2330 are based on a threshold distance (e.g., radius) measured from a center, or a respective portion (e.g., an outermost point) of their respective virtual objects. In some embodiments, because object 2310*a* is a three-dimensional virtual object, computer system 101 optionally determines that object 2310*a* is a first type of virtual object (in contrast to object 2306*a* being a two-dimensional and therefore a second, different type of virtual object).

In FIG. 23C, computer system 101 detects additional one or more inputs, similar to the one or more inputs described with reference to FIG. 23B, requesting translation of object 2310*a* toward viewpoint 2326. In some embodiments, however, computer system 101 does not move objects (e.g., virtual objects) closer than a threshold distance from viewpoint 2326 of the user.

Figure 23D:
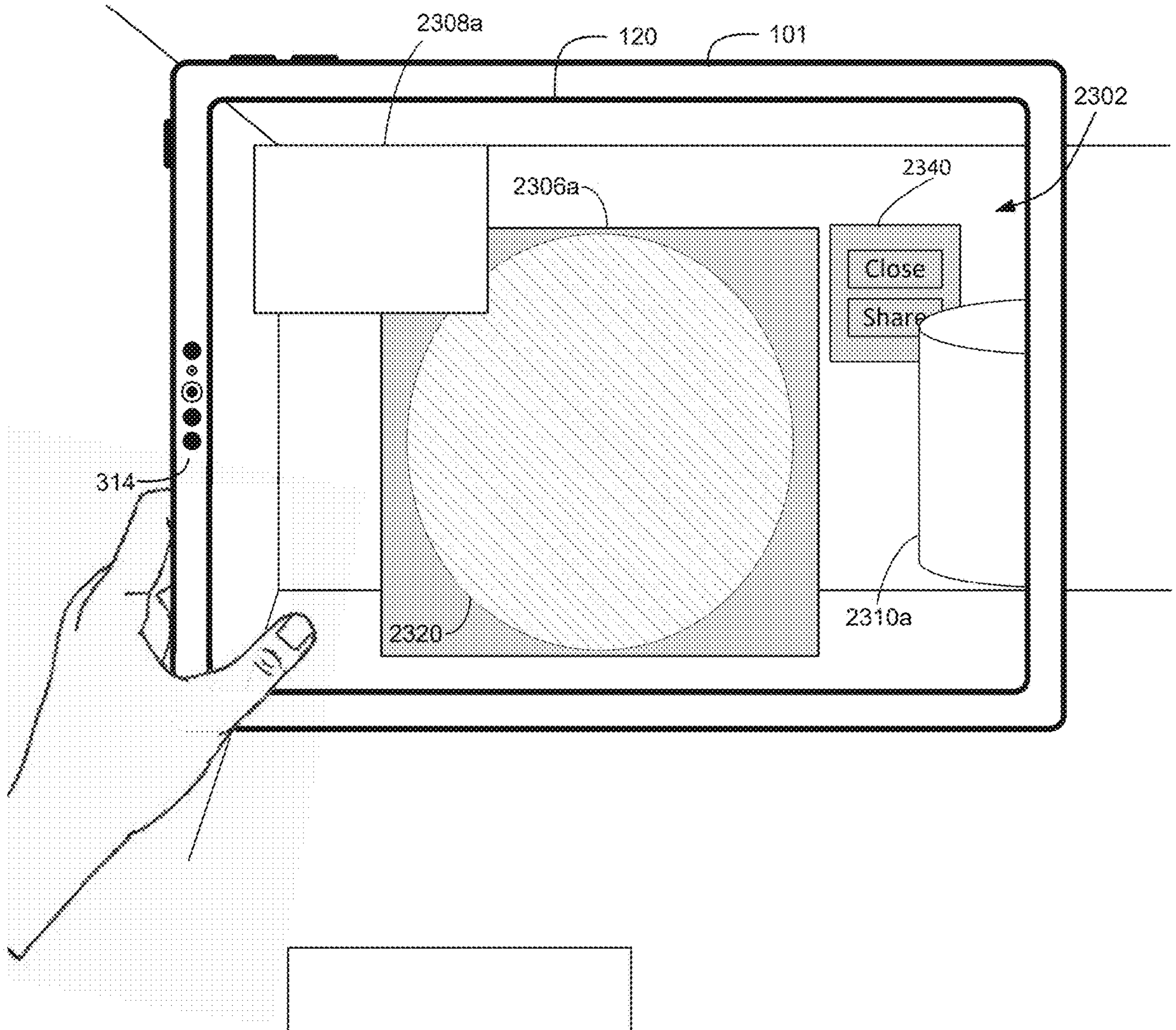
Figure 23D:
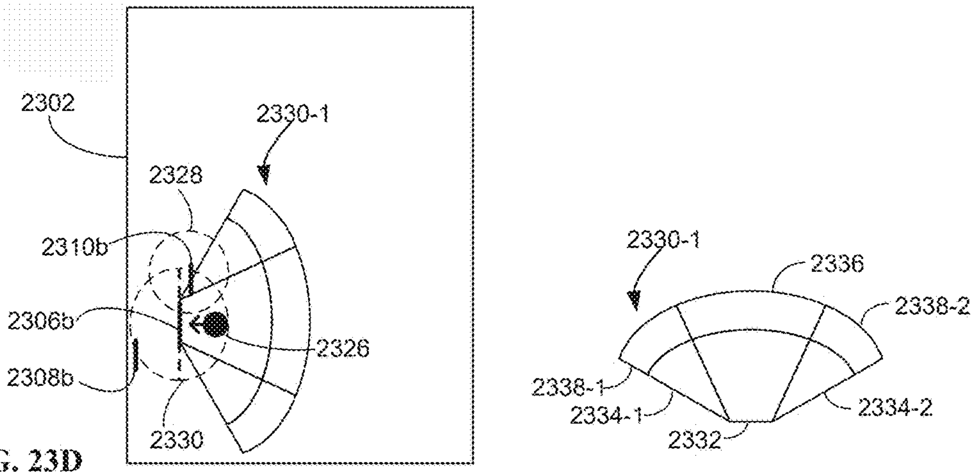

For example, in FIG. 23D, in response to the additional request to translate object 2310*a* in FIG. 23C, the computer system does not move object 2310*a* because viewpoint 2326 is at threshold 2328 from object 2310*b*, as shown in the overhead views in FIGS. 23C and 23D. As described previously, the computer system 101 optionally determines characteristics of threshold 2328 based on characteristics and/or the type of object of object 2310*a*, such as the dimensions of object 2310*a*. For example, the computer system 101 optionally determines a characteristic including a minimum proximity (e.g., threshold 2328) between viewpoint 2326 and object 2310*a*, but it is understood additional or alternative characteristics are assigned to object 2310*a* based on its type.

Figure 23E:
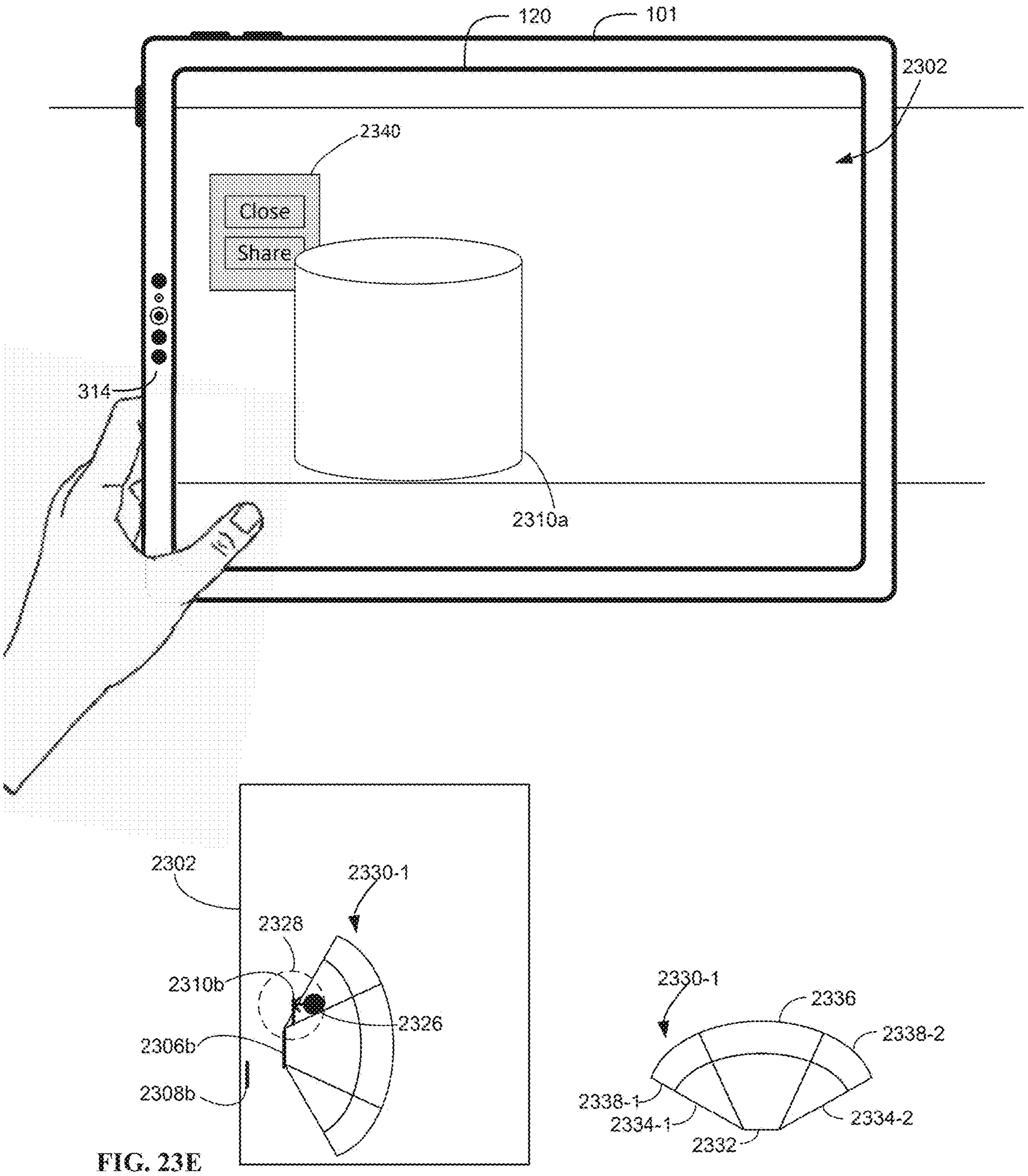
Figure 24B:
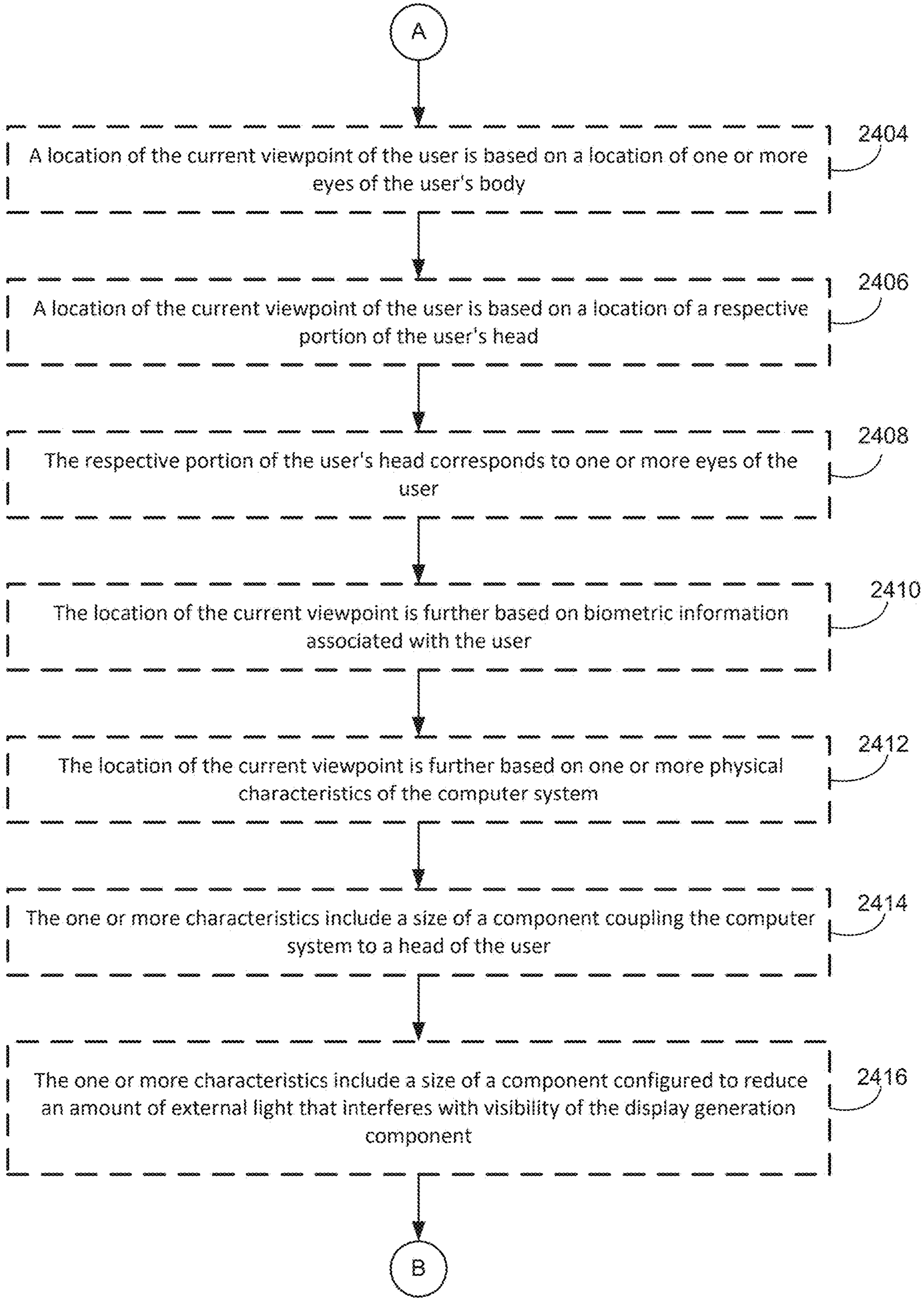
Figure 24F:
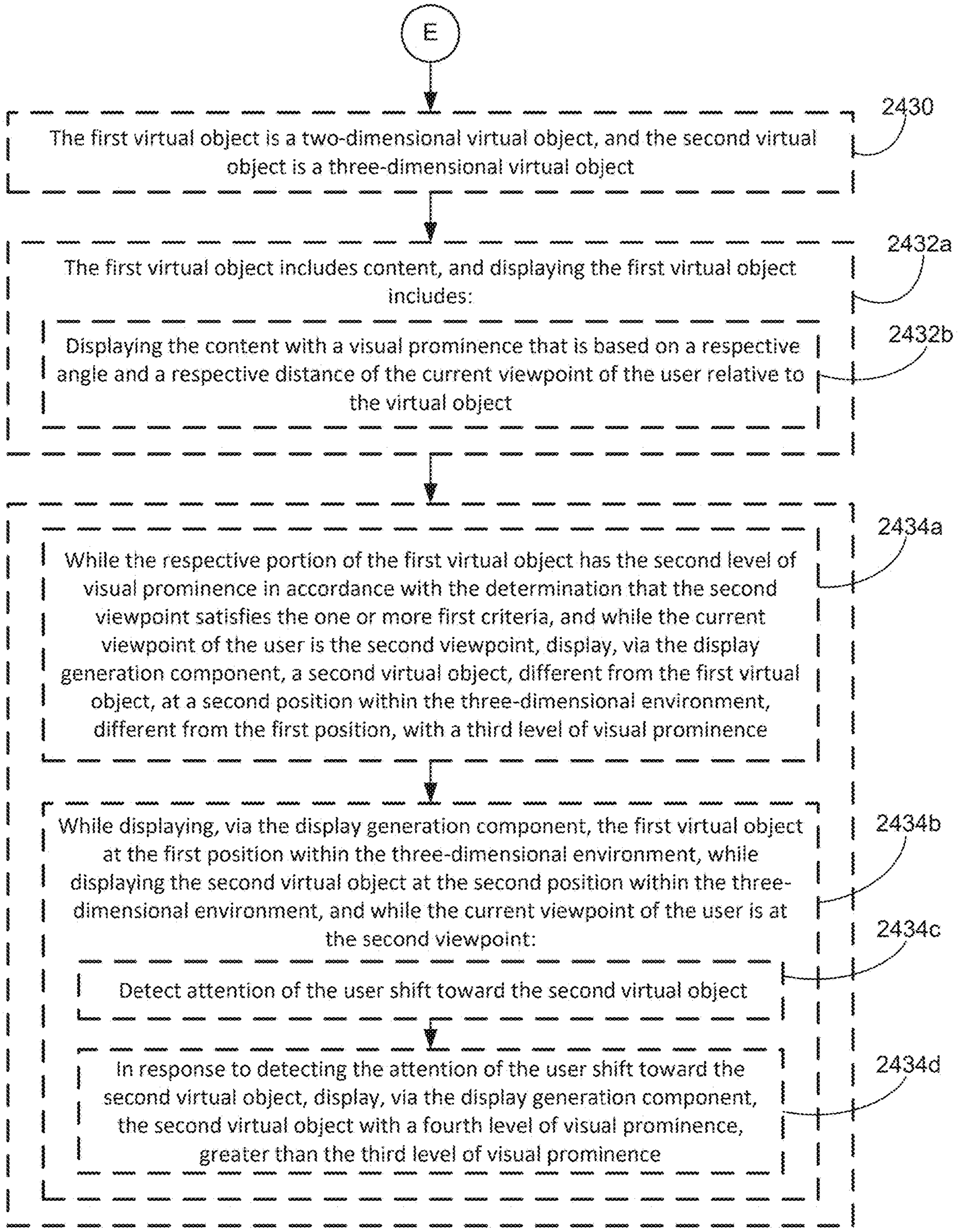

In FIG. 23E, computer system 101 detects movement of viewpoint 2326 within threshold 2328 of object 2310*b* shown in the overhead view, but forgoes modification of levels of visual prominence of one or more portions of object 2310 because it is the first type of virtual object (e.g., three-dimensional rather than two-dimensional). For example, as shown in FIG. 32E, viewpoint 2326 is changed such that object 2310*a* is immediately in front of the user's current viewpoint 2326, but computer system 101 has not modified visual prominence (e.g., decreased opacity, brightness, and/or saturation) of object 2310*a*, and has not displayed a corresponding punch-through region through which the back wall of the physical environment is visible.

It is understood that the classification of virtual object type described herein is merely exemplary, and not limiting in any way. For example, a virtual object associated with an operating system (e.g., controls for modifying computer system 101 brightness, wireless connectivity status, and/or battery consumption mode) are optionally the first type of virtual object, and another virtual object associated with a third-party application developer (e.g., a media streaming playback application and/or a third-party developed video game) is the second type of virtual object.

In some embodiments, threshold 2330 has a different shape and/or is comprised of one or more discrete regions, rather than the elliptical shape shown in FIGS. 23A-23E. For example, as described further with reference to method 2400, threshold 2330 optionally corresponds to a side of object 2306*b*, such as a semi-circle shaped region such that the flat edge of the semi-circle is parallel to the plane of object 2306*b*. As an example, object 2306*b* optionally corresponds to and/or includes a user interface of an application, such as a media playback and streaming application. The arrow extending from the right-hand side of object 2306*b* optionally corresponds to a first side of the object, such as a surface on which media of the media playback and streaming application is visible. When viewpoint 2326 optionally moves within the half circle threshold (e.g., corresponding to the media side of object 2306*b*), the computer system 101 optionally changes levels of visual prominence of one or more portions of the media. While viewpoint 2326 corresponds to the opposite side of object 2306*b* outside of the semi-circle threshold, the media is optionally not displayed at all, and accordingly, changes in viewpoint 2326 do not change the level of visual prominence of the one or more portions of the un-displayed media. In some embodiments, the level of visual prominence of object 2340 changes in a corresponding amount concurrently with the change in levels of visual prominence of object 2306*a*.

FIGS. 24A-24F is a flowchart illustrating a method of modifying visual prominence of respective virtual objects based on proximity of a user to the respective virtual objects in accordance with some embodiments. In some embodiments, method 2400 is performed at a computer system, such as computer system 101, in communication with one or more input devices and a display generation component, such as display generation component 120: In some embodiments, the computer system has one or more of the characteristics of the computer systems of methods 800, 1000, 1200, 1400, 1600, 1800, 2000, and/or 2200. In some embodiments, the display generation component has one or more of the characteristics of the display generation components of methods 800, 1000, 1200, 1400, 1600, 1800, 2000, and/or 2200. In some embodiments, the one or more input devices have one or more of the characteristics of the one or more input devices of methods 800, 1000, 1200, 1400, 1600, 1800, 2000, and/or 2200.

In some embodiments, the computer system displays (2402*a*), via the display generation component, a first virtual object at a first position within a three-dimensional environment, such as object 2306*a* in three-dimensional environment 2302, relative to a first viewpoint of a user of the computer system, such as viewpoint 2326, wherein the first virtual object is displayed with a first level of visual prominence (e.g., having one or more characteristics of visual prominence and respective levels of visual prominence described with reference to method 1800) relative to the three-dimensional environment, such as the level of visual prominence of object 2306*a* in FIG. 23A, and the first viewpoint of the user is within a respective range of positions relative to a respective portion of the first virtual object, such as a range of positions within or outside of threshold 2330. For example, the virtual object has one or more characteristics of the respective content described with reference to method 2200 and/or one or more characteristics of virtual content and/or virtual objects described with reference to methods 1600, 1800, 2000, 2200, and 2400. In some embodiments, the first position is world-locked relative to the three-dimensional environment, such that the virtual object is displayed at the first position and/or orientation, similar to the appearance of a similarly sized and/or shaped physical object that is optionally placed at the first position. In some embodiments, the virtual object is displayed with a first level of opacity, brightness, contrast, and/or saturation corresponding to the first level of visual prominence, such that one or more portions of the virtual object are readily visible by a user of the computer system. In some embodiments, the respective range (e.g., a first set) of positions relative to the respective portion of the virtual object are included in a first region of the three-dimensional environment relative to the virtual object. For example, the computer system optionally determines a respective portion of the virtual object, such as a first surface of a rectangular, semi-rectangular, or rectangular prism-shaped virtual object and optionally determines a respective range (e.g., first set) of one or more positions within the three-dimensional environment relative to the respective portion of the virtual object, such that if the computer system detects the user's current viewpoint change to a respective position within the respective range (e.g., first set) of positions, the computer system optionally displays at least the respective portion of the virtual object with the first level of visual prominence. The respective portion, for example, optionally includes a first surface of the virtual object. The first surface optionally is a respective surface of the virtual object having the greatest amount of surface area and/or a surface within which respective content associated with the virtual content (e.g., virtual buttons, text, media, and/or additional virtual objects) optionally is displayed by the computer system. For example, the virtual object optionally is a semi-rectangular shaped virtual window including a user interface of a web browsing application, and the contents of the web browser are optionally displayed on a first surface of the window (e.g., a front surface of the window) and not on the second, opposite surface of the window (e.g., the back surface of the window). In some embodiments, the computer system defines the respective range (e.g., first set) of positions relative to such a first surface to provide a range of positions within which the user is able to move toward and/or between while the first level of visual prominence is maintained. For example, the computer system optionally determines that the first surface corresponds to respective content with which the user will likely interact, and as such, defines a respective range (e.g., first set) and/or range of positions relative to the first surface of the previously described virtual window such that the computer system forgoes modification of visual prominence of one or more portions of the virtual object in response to detecting changes in the user's current viewpoint to a respective viewpoint within the respective range (e.g., first set) and/or range of positions. For example, in response to detecting a current viewpoint of the user move from a first position within the respective range (e.g., first set) and/or range of positions to a second position within the respective range (e.g., first set) and/or range of positions, the computer system optionally maintains display of the visual prominence (e.g., forgoes modification of the visual prominence of the virtual object). In some embodiments, the respective range (e.g., first set) of positions is at least partially bounded by one or more vectors extending from a respective portion of the virtual object (e.g., a left and/or a right edge of the virtual object). For example, the respective range (e.g., first set) of positions optionally is bounded by a vector extending 45 degrees from a left edge of a first surface of the virtual object skewed away from a vector normal of the first surface, and optionally is bounded by a second vector extending 45 degrees from a right edge of the first surface of the virtual object skewed away from the vector normal of the first surface. Further, the respective range (e.g., first set) of positions optionally is bounded by a threshold distance, described further below. As an additional example, in some embodiments, the computer system determines a second set of positions relative to the virtual object (e.g., beyond the boundaries described previously), such that if the computer system detects the current viewpoint of the user shift to a respective position within the second set of positions, the computer system reduces visual prominence of one or more portions of the virtual object. Thus, in some embodiments, the computer system optionally determines a "side" of the virtual object (e.g., the respective range (e.g., first set) of positions relative to the surface of the virtual window described previously), and determines the respective range (e.g., first set) of positions relative to the "side" of the virtual object to convey a sense that the user is properly positioned and/or oriented relative to the virtual object in a respective position that the computer system expects to detect interaction with the virtual object. It is understood that other virtual objects having other shapes are optionally treated similarly or the same as described with reference to rectangular and/or semi-rectangular shaped virtual objects (e.g., a flat, or nearly flat virtual objects having a curved surface for viewing respective content of the virtual object). Moreover, it is understood that three-dimensional virtual objects (e.g., a cube, a sphere, and/or a representation of a physical object such as a truck) optionally are treated similarly or the same as described with reference to the rectangular and/or semi-rectangular shaped virtual objects. For example, a first and/or second surface of a rectangular prism bounding the dimensions of the three-dimensional virtual objects optionally are determined by the computer system, and the respective range (e.g., first set) of positions optionally are determined based on the first and/or second surface of the rectangular prism.

In some embodiments, while displaying, via the display generation component, the first virtual object at the first position within the three-dimensional environment relative to the first viewpoint of the user, such as shown in FIG. 23A, the computer system detects (2402*b*), via the one or more input devices, a change in a current viewpoint of the user from the first viewpoint to a second viewpoint, different from the first viewpoint, wherein the second viewpoint of the user is within the respective range of positions relative to the respective portion of the first virtual object, such as movement of viewpoint 2326 to within threshold 2330 shown in FIG. 23B. For example, the computer system optionally detects the current viewpoint of the user move to a respective position that is within or outside of the respective range (e.g., first set) of positions. In some embodiments, the computer system detects the current viewpoint change from the first viewpoint to the second viewpoint relative to a respective portion of the virtual object, such as a center of the virtual object, an edge of the virtual object, and/or a point within a body of the virtual object. In some embodiments, the second viewpoint is within the respective range of positions (e.g., corresponding to a first side of the virtual object).

In some embodiments, in response to detecting, via the one or more input devices, the change in the current viewpoint of the user from the first viewpoint to the second viewpoint and while the second viewpoint of the user is within the respective range of positions relative to the respective portion of the first virtual object (2402*c*), in accordance with a determination that the second viewpoint satisfies one or more first criteria, including a first criterion that is satisfied when the second viewpoint is within a threshold distance (e.g., 0.001, 0.01, 0.025, 0.05, 0.1, 0.25, 0.5, 1, 2.5, 5, 10, 15, 25, 50, 100, 250, 500, 1000, or 5000 cm) of the first virtual object, such as threshold 2330, the computer system reduces (2402*d*) a visual prominence of the respective portion of the first virtual object, such as punch-through region 2320, to a second level of visual prominence that is less than the first level of visual prominence, such as shown in FIG. 23B (e.g., increasing a transparency and/or ceasing to display the respective portion of the virtual object). For example, the computer system optionally displays one or more portions or the entirety of the virtual object with the second level of visual prominence (e.g., a reduced level of opacity, brightness, contrast, saturation, and/or with a greater degree of a blurring effect described further with reference to method 2200) in accordance with a determination that the second viewpoint is too close (e.g., within the threshold distance) to the respective portion of the virtual object to easily view the respective content and/or visual aspects of the virtual object. Thus, in some embodiments, the computer system reduces the visual prominence of the virtual object if the one or more first criteria are satisfied. In some embodiments, the second level of visual prominence includes ceasing display of the respective portion of the virtual object. In some embodiments, the one or more portions correspond to one or more respective portions of the user of the computer system and/or the computer system itself. For example, the one or more portions of the virtual object optionally include a respective portion of the virtual object that is within a threshold distance of the user, the viewpoint of the user and/or the computer system, such as an oval-shaped region of the virtual object corresponding to shape of a respective portion of the user (e.g., the user's head) and/or corresponding the dimensions of the computer system. Accordingly, in some embodiments, the computer system forgoes modification of visual prominence of one or more second portions of the virtual object—which are not within the threshold distance of the viewpoint and/or head of the user—while displaying the one or more portions of the virtual object with a modified (e.g., increased or decreased) visual prominence. For example, the computer system optionally displays an oval-shaped or circular region of the virtual object corresponding to the user and/or the computer system with a reduced visual prominence, and otherwise does not modify the remaining one or more portions of the virtual object. In some embodiments, the one or more portions correspond to respective portions of the user's body. For example, the computer system optionally concurrently reduces visual prominence of a first portion of the virtual object corresponding to a first hand of the user and optionally reduces visual prominence of a second portion of the virtual object corresponding to a second, different hand of the user, optionally to the same level of reduced visual prominence in accordance with a determination that the first and second hand are within a threshold distance of respective portions of the virtual object or the same portion of the virtual object. As such, the computer system optionally decreases the visual prominence of the virtual object to the second level of visual prominence to allow the user to better view other virtual content (e.g., virtual objects) and/or representations of the user's physical environment (e.g., a room that the user is within). In some embodiments, the transition from the first level of visual prominence to the second level of visual prominence is gradual in accordance with the changing of the current user viewpoint (e.g., the transition has one or more characteristics of the gradually changing visual prominence described with reference to method 2200). In some embodiments, the transition from the first level of visual prominence to the second level of visual prominence is abrupt, such that the transition rapidly occurs in response to determining the current viewpoint of the user corresponding to the second viewpoint is outside the respective range (e.g., first set) of positions and/or is within the threshold distance of the virtual object (e.g., the transition is optionally independent of movement of the viewpoint of the user once the viewpoint of the user is within the threshold distance of the virtual object). In some embodiments, the computer system displays the one or more portions with the second level of visual prominence in response to detecting, and in accordance with a determination that the current viewpoint of the user is less than a threshold distance of the virtual object. For example, the computer system optionally displays the virtual object with the second level of visual prominence in response to detecting the current viewpoint corresponds to a respective viewpoint aligned with a vector normal extending from the virtual object within a threshold distance of the object, and optionally displays the virtual object in response to detecting the current viewpoint corresponds to a respective viewpoint angled away from the vector normal and also within the threshold distance of the object in a similar or the same manner.

In some embodiments, in accordance with a determination that the second viewpoint does not satisfy the one or more first criteria because the second viewpoint is not within the threshold distance of the first virtual object, such as viewpoint 2326 in FIG. 23A, the computer system forgoes (2402*e*) the reducing the visual prominence of the respective portion of the first virtual object to the second level of visual prominence, such as shown in FIG. 23A. For example, because the current viewpoint of the user optionally is not within the respective range (e.g., first set) of positions relative to the virtual object and/or is further than a threshold distance from the virtual object (e.g., 0.001, 0.01, 0.025, 0.05, 0.1, 0.25, 0.5, 1, 2.5, 5, 10, 15, 25, 50, 100, 250, 500, 1000, or 5000 m), the computer system optionally forgoes display of the respective portion of the virtual object with the second level of visual prominence (e.g., maintains visual prominence of the respective portion of the virtual object). Thus, in some embodiments, the computer system detects the second viewpoint is greater than a threshold distance from the virtual object (e.g., 0.001, 0.01, 0.025, 0.05, 0.1, 0.25, 0.5, 1, 2.5, 5, 10, 15, 25, 50, 100, 250, 500, 1000, or 5000 m) and within a second set of positions (e.g., a second respective range, different from the previously described respective range of positions) relative to the virtual object (e.g., is not within the respective range (e.g., first set) of positions), and in response, forgoes the displaying of the respective portion of the virtual object with the second level of visual prominence (e.g., forgoes reducing the visual prominence of the virtual object). The computer system thus optionally maintains display of the virtual object with the first level of visual prominence if the second viewpoint is within the threshold distance and within the respective range (e.g., first set) of positions (e.g., is within a set of positions on a first side of the virtual object to improve viewing of the virtual object and/or respective virtual content included in the virtual object). In some embodiments, the computer system determines that the second viewpoint is not within the threshold distance described previously, and accordingly forgoes displaying the respective portion of the virtual object with the second level of visual prominence and maintains the first level of visual prominence. Displaying a respective portion of the virtual object with the second level of visual prominence in accordance with a determination that the second viewpoint of the user satisfies the one or more criteria reduces the need for inputs to cause such a change in visual prominence and improves visibility of the user's environment including virtual objects other than the virtual object.

In some embodiments, a location of the current viewpoint of the user is based on a location of one or more eyes of the user's body, such as the eyes of the user corresponding to viewpoint 2326 in FIG. 23A (2404). For example, the location of the current viewpoint of the user is optionally determined based on the detected position of eyes of the user, such as a center point between the eyes of the user. In some embodiments, the computer system determines the location based on the location of a determined plane or axis intersecting the eyes and perpendicular to the floor. In some embodiments, the location is based on one or more facial features associated with the eyes of the user, such as eyebrows of the user, and/or the most lateral and/or medial portions of the eyes. Determining the location of the current viewpoint based on the location of one or more eyes of the user's body improves visual consistency between the arrangement of virtual content and the user's field of view, thereby reducing the need for input to modify the arrangement of virtual content and reducing erroneous input directed to virtual content displayed at not preferred positions and/or orientations.

In some embodiments, a location of the current viewpoint of the user is based on a location of a respective portion of the user's head, such as the head of the user corresponding to viewpoint 2326 in FIG. 23A (2406). For example, the computer system optionally determines the location of the current viewpoint to correspond to a center of the head of the user, a position corresponding to an interior position within the user's head, or a position along the periphery of the user's head. In some embodiments, the location of the current viewpoint is along an axis central to the user's head and normal to the floor of the three-dimensional environment, and the computer system does not determine that the location of the current viewpoint changes in response to turning of the user's head. For example, while a head of the user is at a first position, the computer system optionally detects movement (e.g., rotation) of the user's head turning toward the left or right, and determines that the location of the current viewpoint is maintained in response to the detected movement. In some embodiments, the respective portion of the user's head is used to improve estimation of user location relative to the three-dimensional environment. Determining the location of the current viewpoint based on the location of the respective portion of the user's head improves visual consistency between the arrangement of virtual content and the user's field of view and the three-dimensional environment, thereby reducing the need for input to modify the arrangement of virtual content and reducing erroneous input directed to virtual content displayed at not preferred positions and/or orientations.

In some embodiments, the respective portion of the user's head corresponds to one or more eyes of the user (2408), such as the eyes of the user corresponding to viewpoint 2326 in FIG. 23A. For example, the computer system optionally estimates the location of the current viewpoint based on the location of one or more eyes of the user (e.g., similar to as described with reference to step(s) 2404). In some embodiments, the computer system estimates the location of the current viewpoint by extrapolating from detected positions of the one or more eyes. For example, the computer system optionally determines a center of the head based on the position of the computer system relative to the position of the eye(s) of the user. The extrapolation is optionally based on a predetermined distance measured from the position of the eyes toward the respective portion of the user's head and/or is a determined distance based on further biometric information, described with reference to step(s) 2410. Determining the location of the current viewpoint based on the location of the respective portion of the user's head improves visual consistency between the arrangement of virtual content and the user's field of view, thereby reducing the need for input to modify the arrangement of virtual content and reducing erroneous input directed to virtual content displayed at not preferred positions and/or orientations.

In some embodiments, the location of the current viewpoint is further based on biometric information associated with the user (2410), such as the biometric information of the user corresponding to viewpoint 2326 in FIG. 23A. For example, the location of the current viewpoint is optionally based on an interpupillary distance (IPD) of the eyes of the user. The computer system, for example, optionally determines the IPD of the eyes and projects a ray piercing (optionally not displayed) through the center of a line extending between the user's pupils at the midpoint of the IPD to improve determination of a center of the user's head. Additionally or alternatively, the biometric information optionally includes the arrangement and relative positions of one or more facial features of the face of the user. For example, the computer system optionally determines the position of the eyebrows, eyes, mouth, cheeks, cheekbones, nostrils, nose, and/or chin of the user, using such facial features determines an understanding of an arrangement of the user's face and/or head. Based on the determined arrangement of the user's face, the computer system optionally determines the location of the current viewpoint based on one or more rays extending from the computer system and intersecting various targets (e.g., an estimated center of the user's head). In some embodiments, the biometric information is entered by a user of the computer system. In some embodiments, the biometric information is collected by the computer system and/or a second computer system in communication with the computer system. For example, the computer system optionally determines the biometric information using information from one or more image sensors (e.g., cameras), capacitive sensors, acoustic sensors, and/or physiological sensors. Using biometric information to determine the location of the current viewpoint improves detection of the user's head relative to the three-dimensional environment and computer system, thereby reducing the likelihood virtual content is displayed at positions not preferred that are not preferred for viewing and interaction relative to the user's field-of-view (e.g., head and/or eyes)

and additionally reducing the likelihood the user erroneously interacts with the virtual content due to not preferred viewing positions.

In some embodiments, the location of the current viewpoint is further based on one or more physical characteristics of the computer system (2412), such as the physical characteristics of the user corresponding to viewpoint 2326 in FIG. 23A. For example, the location of the current viewpoint is optionally based on physical characteristics of the computer system, such as characteristics of a housing, a light seal, a headband, and/or a watchband of the computer system. The physical characteristics optionally include a size of a headband or watchband, a relative position of the housing and/or the light seal, and/or the headband relative to the head and/or facial features of the user. Using characteristics of the computer system to determine the location of the current viewpoint improves consistency in determining the location of the computer system relative to the three-dimensional environment and/or the user's body, thereby reducing the likelihood virtual content is displayed at positions not preferred for viewing and interaction and additionally reducing the likelihood the user erroneously interacts with the virtual content due to the not preferred viewing positions.

In some embodiments, the one or more characteristics include a size of a component coupling the computer system to a head of the user (2414), such as the size of the component of the computer system corresponding to viewpoint 2326 in FIG. 23A. For example, the computer system optionally determines a length of a headband mechanically coupled to a housing of the computer system, configured to wrap around a head of the user. In some embodiments, the computer system determines that the location of the current viewpoint based on a determined position of a respective portion (e.g., a center) of the user's head using the size of the headband. For example, the computer system optionally determines the location of the computer system relative to the three-dimensional environment and determines the length of the headband wrapping around the head of the user, and determines the center of the user's head based on a midpoint between the computer system and the further portion of the headband (e.g., a point at the back of the user's head). For example, a relatively larger head band indicates that the user's head is relatively larger; thus the computer system optionally determines the location of the current viewpoint that is relatively further away from the user's eyes and/or the position of the computer system to take the user's relatively larger head into account. Additionally or alternatively, the center of the headband is optionally indicative of the center of the user's head. Accordingly, the computer system optionally determines the center of an oval formed by the headband wrapped around the user's head to correspond to a center of the user's head (e.g., an improved estimate of the user's location relative to the three-dimensional environment). Using a size of the component coupling the computer system to the head of the user improves consistency in determining the location of the computer system relative to the user's body, thereby reducing the likelihood virtual content is displayed at positions not preferred for viewing and interaction and additionally reducing the likelihood the user erroneously interacts with the virtual content due to not preferred viewing positions.

In some embodiments, the one or more characteristics include a size of a component configured to reduce an amount of external light that interferes with visibility of the display generation component (2416), such as the size of the component configured to reduce external light interfering with the display generation component corresponding to viewpoint 2326 in FIG. 23A. For example, the computer system optionally determines the size of a light seal coupled to and/or included in a housing of the electronic device, and optionally extrapolates the location of a respective portion of the user's head (e.g., the center of the head) based on the relative position of the computer system, the relative position of the light seal, and the size of the light seal. In some embodiments, a size of a light seal is selected to accommodate the dimensions of the user's head. For example, the height of the light seal optionally indicates the elevation of the computer system relative to a center of a portion of the user's head, such as the elevation of the eyes. Additionally or alternatively, the length of the light seal extending from the computer system toward the back of the user's head optionally indicates the depth of the user's head relative to the computer system, thereby indicating a location of a center of a head of the user. The characteristics of the size of the component configured to reduced light transmission between the display generation component and the head of the user optionally indicates a size and/or position of one or more portions of the user's body such as the user's head relative to the computer system and the three-dimensional environment, thereby reducing the likelihood virtual content is displayed at positions not preferred for viewing and interaction and additionally reducing the likelihood the user erroneously interacts with the virtual content due to not preferred viewing positions.

In some embodiments, while displaying, via the display generation component, the first virtual object at the first position within the three-dimensional environment relative to the first viewpoint of the user, such as viewpoint 2326 in FIG. 23A, wherein the first virtual object includes content displayed at a third level of visual prominence, such as the level of visual prominence of object 2306*a* in FIG. 23A, the computer system detects (2418*a*), via the one or more input devices, a change in the current viewpoint of the user from the first viewpoint to a third viewpoint, different from the first viewpoint and the second viewpoint, such as a change in viewpoint 2326 further from object 2306*a* than as shown in FIG. 23A. For example, the virtual object optionally includes content such as a user interface for a media playback application, a web browsing application, and/or a simulated drawing application.

In some embodiments, in response to detecting the change in the current viewpoint of the user from the first viewpoint to the third viewpoint (2418*b*) in accordance with a determination that the third viewpoint satisfies one or more second criteria, different from the one or more criteria, wherein the one or more second criteria include a criterion that is satisfied when the third viewpoint is greater than a threshold distance from the first virtual object, such as a threshold included in viewing region 2130-1, the computer system displays (2418*c*) the first virtual object at the first position within the three-dimensional environment, including displaying the content at a fourth level of visual prominence, less than the third level of visual prominence, such as the level of visual prominence of object 2308*a* in FIG. 23A. In some embodiments, the computer system reduces a level of visual prominence of the content in accordance with a determination that the content and/or the virtual object is too far away, as described further with reference to method 1600. Maintaining display of the first virtual object at the first position within the three-dimensional environment provides visual feedback for future input to improve visibility and interactivity with the virtual object.

In some embodiments, while detecting the change in the current viewpoint, such as viewpoint 2326, of the user from the first viewpoint to the third viewpoint, and in accordance with a determination that the one or more second criteria are satisfied, the displaying of the content from the third level of visual prominence to the fourth level of visual prominence occurs gradually in accordance with the change in the current viewpoint (2420), such as gradual changes in the level of visual prominence of object 2306*a*. For example, the computer system gradually decreases the brightness, the opacity, and/or the saturation of the content as the current viewpoint progressively moves further from the virtual object, as described further with reference to method 1600. Gradually decreasing the visual prominence of the change in current viewpoint of the user of the computer system provides visual feedback for future input to improve visibility and interactivity with the virtual object.

In some embodiments, the threshold distance, such as included in viewing region 2330-1, is based on a depth of respective content, such as content 2307*a* included in object 2306*a*, included in the first virtual object relative to the current viewpoint (2422), as shown in FIG. 23B. For example, the threshold distance is optionally based on a relative depth of a respective virtual object and/or content included in the virtual object relative to the user's current viewpoint. For example, a virtual car is optionally associated with a first threshold distance, and a much smaller virtual soda can is optionally associated with a second threshold distance, different (e.g., greater or less than) the first threshold distance. In some embodiments, the depth of a three-dimensional virtual object included in the first virtual object optionally affects the threshold distance (e.g., a three-dimensional virtual pushbutton, a three-dimensional rendering of a product for potential purchase, and/or a computer-aided design (CAD) model associated with a CAD application user interface included in the first virtual object). For example, the computer system optionally determines a CAD (or other three-dimensional) model of a gear displayed in front of a virtual window including a CAD application user interface relative to the current viewpoint is a first depth (e.g., distance) away from the current viewpoint of the user, and determines the threshold distance based on the first depth. The first depth, for example, is optionally based on the most proximate point of the CAD model and/or the least proximate point of the CAD model relative to the current viewpoint. Assigning the threshold distance associated with a respective virtual object based on the depth of respective content included in the respective virtual object improves visual intuition concerning how input (e.g., movement) can modify the level of visual prominence of larger, smaller, and/or deeper objects relative to the user's current viewpoint, thereby reducing erroneous inputs such as movements of current viewpoint too far, or not far away enough from the respective virtual object.

In some embodiments, while displaying, via the display generation component, the first virtual object at the first position within the three-dimensional environment and while the current viewpoint of the user is the first viewpoint, such as object 2310*a* in FIG. 23B, 23C, and/or 23D, the computer system detects (2424*a*), via the one or more input devices, an input corresponding to a request to move the first virtual object towards the current viewpoint of the user within the three-dimensional environment, such as indicated by cursor 2314. For example, the computer system optionally detects a selection of the virtual object such as an air gesture directed to the virtual object (e.g., an air pinch contacting an index finger and thumb, a splaying of fingers of a hand, a squeezing of one or more fingers, and/or a pointing of one or more fingers), a contact on a surface (e.g., touch-sensitive surface) while a cursor and/or attention of the user is directed to the virtual object, a voice command indicating selection of the virtual object, and/or a dwelling of attention on the virtual object for a period of time greater than a threshold period of time (e.g., 0.001, 0.005, 0.01, 0.05, 0.1, 0.5, 1, 5, 10, 50, 100, 500, or 1000 seconds). In some embodiments, while the selection is maintained, the computer system moves the virtual object in accordance with one or more inputs requesting such movement. For example, the computer system optionally detects that the air gesture is maintained—such as maintained contact between the thumb and the index finger during an air pinch, a maintained posture of the splaying of fingers and/or the squeezing of the one or more fingers, and/or a maintained pointing of finger(s) toward the virtual object—and moves the virtual object in accordance with the movement of a hand maintaining the air gesture. Additionally or alternatively, while contact between the surface is maintained, the computer system optionally moves the virtual object based on movement of the contact along the surface. In some embodiments, the voice command and/or the dwelling of attention initiates a movement mode of the virtual object, and the computer system moves the virtual object in accordance with movement of a portion of the user's body (e.g., their hand(s)) until one or more inputs terminating the movement mode are received, such as a second voice command and/or a dwelling of attention to another virtual object.

In some embodiments, in response to detecting the input corresponding to the request to move the first virtual object (2424*b*), in accordance with a determination that the input to move the first virtual object towards the current viewpoint of the user corresponds to a request to move the first virtual object to within a second threshold distance (e.g., 0.001, 0.01, 0.025, 0.05, 0.1, 0.25, 0.5, 1, 2.5, 5, 10, 15, 25, 50, 100, 250, 500, 1000, or 5000 cm, similar, different from, or the same as the first threshold distance) of the current viewpoint of the user, such as threshold 2328, the computer system moves (2424*c*) the first virtual object to a second position within the three-dimensional environment that is outside of the second threshold distance of the current viewpoint of the user, such as shown in FIG. 23D relative to FIG. 23B. For example, the request to move the virtual object optionally corresponds to a placement of the virtual object that is too close for the user to a preferred view of virtual content included in the virtual object. Therefore, the computer system moves the virtual object based on the request (e.g., in a same direction as the requested movement), however, the computer system optionally prevents the virtual object from moving within the second threshold distance of the current viewpoint of the user. In some embodiments, while input(s) requesting movement of the virtual object is ongoing, the computer system optionally ceases movement of the virtual object in accordance with a determination that a portion of the virtual object is at the second threshold. For example, the computer system optionally detects movement of a hand maintaining an air pinch gesture requesting movement of a virtual window, moving the virtual window in a direction and magnitude based on the direction and magnitude of hand movement, until a corner of the virtual window reaches the second threshold. In response to detecting further movement requesting the virtual window be moved closer to the current viewpoint, the computer system forgoes the movement of the virtual window.

In some embodiments, in accordance with a determination that the input to move the first virtual object towards the current viewpoint of the user corresponds to a request to move the first virtual object to outside of the second threshold distance of the current viewpoint of the user, the computer system moves (2424*d*) the first virtual object to a third position within the three-dimensional environment that is outside of the second threshold distance of the current viewpoint of the user in accordance with the input to move the first virtual object such as shown in FIG. 23C relative to FIG. 23B. For example, in response to detecting a similar or same movement of the air pinch gesture directed to the virtual window described previously, but requesting the virtual window be moved to a position (e.g., the third position), the computer system optionally moves the virtual window in accordance with the request when no portion (e.g., a corner) of the virtual window reaches the second threshold distance. Moving—or not moving—the virtual object to the third position based on a determination that the virtual object is within the second threshold distance reduces the likelihood that user input undesirably moves the virtual object to a position that is too close for preferred viewing and/or interaction.

In some embodiments, the computer system displays (2426*a*), via the display generation component, a second virtual object, such as object 2310*a*, different from the first virtual object, at a second position within the three-dimensional environment, different from the first position, with a third level of visual prominence, such as shown in FIGS. 23C, 23D, and 23E. For example, the second virtual object optionally has one or more characteristics of the first virtual object, and respectively optionally includes user interfaces for applications (e.g., media playback, web browsing, and/or text editing user interfaces. The third level of visual prominence is optionally similar or the same as the first level of visual prominence. In some embodiments, the first and the second virtual objects additionally or alternatively are positioned at similar depths with respect to the three-dimensional environment and the current viewpoint of the user, and additionally or alternatively are concurrently displayed.

In some embodiments, while displaying, via the display generation component, the second virtual object at the second position within the three-dimensional environment with the third level of visual prominence, the computer system detects (2426*b*), via the one or more input devices, a second change in the current viewpoint, such as viewpoint 2326, of the user of the computer system (e.g., similar to the change in the current viewpoint to the second viewpoint described with reference to step(s) 2402, but with respect to the second virtual object), relative to the three-dimensional environment to a third viewpoint relative to the three-dimensional environment, wherein the third viewpoint of the user is within the respective range of positions relative to a respective portion of the second virtual object such as movement from FIG. 23D to FIG. 23D. In some embodiments, the computer system does not cease display of one or more portions of a respective virtual object when the current viewpoint of the user moves within the threshold distance of the respective virtual object described with reference to step(s) 2402. For example, while displaying the second virtual object, the computer system optionally detects the current viewpoint of the user of the computer system change to a third viewpoint within the threshold distance of the second virtual object. In response to detecting the change to the third viewpoint, the computer system optionally maintains display of some or all of the second virtual object. Thus, in some embodiments, while the level of visual prominence of portion(s) of the first virtual object are decreased when the user moves too close for improved viewing and interaction with first virtual object, the visual prominence of portion(s) of the second virtual object are maintained when the user moves to a similar or the same proximity to the second virtual object. In some embodiments, the third viewpoint corresponds to (e.g., is within) a second respective range of positions relative to a respective portion of the second virtual object, similar to the respective range of positions relative to a respective portion of the first virtual object described with reference to step(s) 2402.

In some embodiments, in response to detecting, via the one or more input devices, the second change in the current viewpoint of the user of the computer system from the first viewpoint to the third viewpoint (2426*c*), in accordance with a determination that the third viewpoint satisfies the one or more first criteria, the computer system maintains display (2426*d*), via the display generation component, of the respective portion of the second virtual object at the second position within the three-dimensional environment with the second level of visual prominence, for example, maintains the level of visual prominence of object 2310 from FIG. 23D to FIG. 23E. For example, as described further with reference to step(s) 2428 and step(s) 2430, the computer system optionally forgoes a reducing of brightness, opacity, and/or saturation of one or more portions of the second virtual object in response to detecting the current viewpoint optionally change to the third viewpoint, despite the third viewpoint satisfying the one or more criteria. In some embodiments, if another virtual object with similar or the same size and/or shape were placed at the second position within the three-dimensional environment (e.g., the first virtual object and/or another virtual object optionally displayed concurrently with the first virtual object), the computer system reduces a level of visual prominence of a portion of the other virtual object in response to detecting the current viewpoint change to the third viewpoint. Maintaining a level of visual prominence of a respective portion of the second virtual object improves visibility of the respective portion of the second virtual object, thereby reducing the likelihood the user of the computer system erroneously interacts with the respective portion of the second virtual object and reducing user input required to change (e.g., increase) the level of visual prominence of the respective portion of the second virtual object.

In some embodiments, the first virtual object is associated with a first application that is associated with a first setting that is enabled, and second virtual object is associated with a second application, different from the first application, that is associated with the first setting that is disabled (2428), such as object 2306*a* associated with a first application and object 2310*a* that is associated with a second application. For example, the first virtual object and the second virtual object are optionally associated with applications being executed at least partially by an operating system of the computer system, such as an application on memory included in the computer system and/or an application user interface optionally displayed via the display generation component of the computer system and provided by a second computer system in communication with the computer system (e.g., a server). In some embodiments, the first setting corresponds to an enabling or a disabling of changing visual prominence of portion(s) of the respective based on user proximity to a respective virtual object (e.g., when the user is too close to the virtual object). In some embodiments, the first virtual object and the second virtual object respectively include user interfaces for the first application and/or the second application. For example, the first application is optionally a media playback application, and the second application is optionally a simulated magnifying glass application. In such an example, an application developer and/or the user of the computer system optionally enables a proximity-prominence setting to reduce visual prominence of one or more portions of the first application user interface when the viewpoint of the user is within the threshold distance of the first virtual object. Such an arrangement is optionally beneficial to allow the user of the computer system to more readily view one or more portions of the three-dimensional environment (e.g., to decrease visual prominence of portion(s) of the media playback application user interface) without requiring user input to move the first virtual object and/or decrease visual prominence of the first virtual object. On the other hand, the simulated magnifying glass application is optionally configured to magnify representations of the three-dimensional environment in accordance with user proximity to the second virtual object, and thus user proximity to the second virtual object is optionally expected and desired. As such, an application developer and/or user optionally disables proximity-prominence settings of the second virtual object. Providing a first setting to enable or disable changes in visual prominence of the first and/or second virtual objects improves flexibility of user interaction with various virtual objects, thereby reducing user inputs required to change visual prominence of the first and/or second virtual objects if changes in visual prominence based on user proximity to respective virtual objects were globally uniform.

In some embodiments, the first virtual object is a two-dimensional virtual object, such as object 2306*a*, and the second virtual object is a three-dimensional virtual object (2430), such as object 2310*a*. For example, the first virtual object optionally includes a user interface for a media playback application, and is optionally completely lacking, or nearly lacking in depth relative to the three-dimensional environment, similar to a nearly infinitely flat-panel television display. In contrast, the second virtual object is optionally a three-dimensional virtual car, book, and/or graphical icon. As described previously with reference to step(s) 2426, in some embodiments, the computer system displays one or more portions of the first virtual object with a partially or completely transparent appearance such that one or more portions of the three-dimensional environment (e.g., the physical environment and/or objects) are visible through the one or more portions. When the second virtual object corresponds to a position that is behind the first virtual object, the computer system optionally displays one or more portions of the second virtual object, at the one or more transparent or partially transparent portions of the first virtual object to simulate a depth of virtual content relative to the three-dimensional environment. As an example, the computer system optionally displays the first virtual object with a transparent oval in response to detecting the user move close to the first virtual object, but optionally does not display the second virtual object with a similar transparent oval because the user potentially desires a closer view of details of the three-dimensional object. Moreover, it is optionally visually confusing to view a transparent hole through a three-dimensional virtual object meant to mimic a solid and opaque physical object. In some embodiments, the computer system does not strictly dictate changes in portions of visual prominence based on the dimensions of the respective virtual object, but rather based on a type of virtual object. For example, the media playback user interface is not optionally a completely "flat" virtual object—it optionally includes a curve, similar to a curved computer monitor display, and/or has a relative depth. In such an example, the computer system optionally decreases visual prominence of one or more portions of the media playback user interface when the user moves too close to the user interface as described relative to the two-dimensional virtual objects. Changing visual prominence of the virtual objects based on the dimensions of the virtual object indicates the dimensions of the virtual object without requiring user input such as movement to investigate the dimensions of the virtual object.

In some embodiments, the first virtual object includes content (2432*a*), such as content 2307*a* in object 2306*a*, and displaying the first virtual object includes displaying the content with a visual prominence that is based on a respective angle and a respective distance of the current viewpoint of the user relative to the virtual object (2432*b*), such as a level of visual prominence of content 2307*a* based on a change in viewing angle of viewpoint 2326. For example, as described with reference to method 2200. Displaying the content with a level of visual prominence based on an angle and/or distance between the current viewpoint and the virtual object provides feedback about user orientation relative to the virtual object, thereby preventing input erroneously directed to the virtual object when the content is not interactable and/or suggesting inputs such as movement to improve visibility of and/or interactivity with the content.

In some embodiments, while the respective portion of the first virtual object has the second level of visual prominence, such as punch-through region 2320 in FIG. 23B, in accordance with the determination that the second viewpoint satisfies the one or more first criteria, and while the current viewpoint of the user is the second viewpoint, the computer system displays (2434*a*), via the display generation component, a second virtual object, such as object 2308A in FIG. 23C, different from the first virtual object, at a second position within the three-dimensional environment, different from the first position, with a third level of visual prominence. In some embodiments, the second virtual object has one or more characteristics of the first virtual object, the second position has one or more characteristics similar or the same as the first position within the three-dimensional environment, and the third level of visual prominence has one or more characteristics similar or the same as the first and/or the second levels of visual prominence. As described with reference to step(s) 2426 and/or step(s) 2430, in some embodiments, the second virtual object is displayed at a position behind the first virtual object. As described herein, in some embodiments, the computer system modifies visual prominence of portion(s) of virtual objects to allow interaction with the three-dimensional environment that is apparently "behind" the modified virtual objects. In some embodiments, the computer system thus provides a method of interacting "through" objects that present an apparent obscuring of other aspects of the three-dimensional objects (e.g., physical and/or virtual objects).

In some embodiments, while displaying, via the display generation component, the first virtual object at the first position within the three-dimensional environment, while displaying the second virtual object at the second position within the three-dimensional environment, and while the current viewpoint of the user is at the second viewpoint (2434*b*), the computer system detects (2434*c*) attention of the user shift toward the second virtual object, such as indicated by cursor 2312 (e.g., from the first virtual object or from another location in the three-dimensional environment). For example, the computer system optionally detects gaze of the user of the computer system shift toward the second virtual object and/or a position within the three-dimensional environment within a threshold distance (e.g., e.g., 0.001, 0.01, 0.025, 0.05, 0.1, 0.25, 0.5, 1, 2.5, 5, 10, 15, 25, 50, 100, 250, 500, 1000, or 5000 cm) of the second virtual object. In some embodiments, the location of the target of the attention would otherwise correspond to the first virtual object instead of the second virtual object when the first virtual object is displayed at the first level of visual prominence. In some embodiments, the target of the attention shifts to a respective portion of the second virtual object that is displayed because the portion of the first virtual object is displayed with the second level of visual prominence. For example, the first and second virtual objects are optionally nearly rectangular from the user's current viewpoint, and the second virtual object is optionally apparently "behind" the first virtual object having a lower-left corner that coincides with the center of the first virtual object relative to the current viewpoint. In such an example, when the computer system detects attention shift to an upper-right hand and interior portion of the first virtual object while portion(s) of the first virtual object are visually prominent, the computer system determines attention is directed to the first virtual object. When, however, the upper-right hand and interior portion of the first virtual object is partially translucent (e.g., displayed with the second level of visual prominence) the computer system concurrently displays the lower-lefthand portion of the second virtual object, and in response to the attention shift determines that the second virtual object is directed to the second virtual object. As another example, the respective portion of the first virtual object is optionally displayed with a level of reduced visual prominence (e.g., with a reduced opacity and/or brightness) to resolve an apparent visual conflict, as described with reference to method 2000. An apparent visual conflict referred to herein describes an arrangement of virtual objects configured to mimic the appearance of a first physical object (e.g., corresponding to the first virtual object) obscuring (e.g., blocking) view of at least a portion of a second physical object (e.g., corresponding to the second virtual object), as described further with reference to method 2000.

In some embodiments, in response to detecting the attention of the user shift toward the second virtual object, the computer system displays (2434*d*), via the display generation component, the second virtual object with a fourth level of visual prominence, greater than the third level of visual prominence, such as object 2308*a* in FIG. 23C. For example, the computer system optionally changes (e.g., increases or decreases) the level of visual prominence of the second virtual object in response to detecting gaze of the user directed to the second virtual object, described further with reference to method 1800. In some embodiments, the computer system forgoes such a change in visual prominence of the second virtual object when the respective portion of the first virtual object is displayed with the first level of visual prominence. For example, the computer system optionally forgoes display of the second virtual object with the fourth level of visual prominence when attention is directed to where the first virtual object presents an apparent visual conflict with the second virtual object. In some embodiments, in response to detecting an interaction input directed to the second virtual object while the current viewpoint is the second viewpoint and the second virtual object is displayed at the second position within the three-dimensional environment, the computer system initiates one or more operations in accordance with the interaction input directed to the second virtual object instead of the first virtual object (e.g., "through" the first virtual object as described previously) and forgoes performance of one or more operations in accordance with the interaction input relative to the first virtual object. Changing the level of visual prominence of the second virtual object in response to detecting attention shift to the second virtual object provides an opportunity to better interact with the second virtual object without requiring one or more inputs to manually move and/or change the level of visual prominence of the first virtual object.

It should be understood that the particular order in which the operations in method 2400 have been described is merely exemplary and is not intended to indicate that the described order is the only order in which the operations could be performed. One of ordinary skill in the art would recognize various ways to reorder the operations described herein.

FIGS. 25A-25C illustrate examples of a computer system 101 modifying or maintaining levels of visual prominence of one or more virtual objects in response to detecting one or more events corresponding to one or more types of optionally concurrent user interactions.

FIG. 25A illustrates a three-dimensional environment 2502 visible via a display generation component (e.g., display generation component 120 of FIG. 1) of a computer system 101, the three-dimensional environment 2502 visible from a viewpoint 2526 of a user illustrated in the overhead view (e.g., facing the back wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment 2502 to the user, and sensors to detect the physical environment and/or movements of the user's hands (e.g., external sensors facing outwards from the user), and/or gaze of the user (e.g., internal sensors facing inwards towards the face of the user).

As shown in FIG. 25A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2502 and/or the physical environment is visible in the three-dimensional environment 2502 via the display generation component 120. For example, three-dimensional environment 2502 visible via display generation component 120 includes representations of the physical floor and back walls of the room in which computer system 101 is located. Three-dimensional environment 2502 also includes table 2522*b* (shown in the overhead view), corresponding to table 2522*a* visible via display generation component 120.

In FIG. 25A, three-dimensional environment 2502 also includes virtual objects 2510*a* (corresponding to object 2510*b* in the overhead view), 2512*a* (corresponding to object 2512*b* in the overhead view), 2514*a* (corresponding to object 2514*b* in the overhead view), 2516*a* (corresponding to object 2516*b* in the overhead view), 2518*a* (corresponding to object 2518*b* in the overhead view), and 2520*a* (corresponding to object 2520*b* in the overhead view), that are visible from viewpoint 2526 (referred herein as the "visible virtual objects" collectively, for brevity). In FIG. 25A, the visible virtual objects are two-dimensional objects. It is understood that the examples of the disclosure optionally apply equally to three-dimensional objects. The visible virtual objects are optionally one or more of user interfaces of applications (e.g., messaging user interfaces or content browsing user interfaces), three-dimensional objects (e.g., virtual clocks, virtual balls, or virtual cars) or any other element displayed by computer system 101 that is not included in the physical environment of computer system 101.

In some embodiments, as described previously, computer system 101 changes levels of visual prominence of objects when such objects are or are not targets of user attention (e.g., as described above with reference to method 1800) too close (e.g., as described above with reference to method 2400), too far away (e.g., as described above with reference to method 2200), too far off-angle (e.g., as described above with reference to method 1600 and/or method 2200), present apparent visual and/or spatial conflicts with other objects (e.g., as described above with reference to method 2000), and/or meet one or more other criteria described with reference to methods 800-2200. The computer system 101 optionally applies one or more changes in levels of visual prominence of respective objects, optionally concurrently, based on one or more events meeting such one or more criteria (e.g., the object is relatively far away and is the target of the user's attention and/or the object is off-angle and is not the target of the user's attention).

Prior to the state of three-dimensional environment 2502 as illustrated by FIG. 25A, the computer system 101 optionally detects one more events, including one or more types of user interactions with the three-dimensional environment and/or the computer system 101. Such one or more events optionally include detecting one or more inputs to begin display of the virtual objects, to translate the virtual objects, to arrange the virtual objects, to select the virtual objects, to change viewpoint 2526 relative to the virtual objects, and/or indicate attention shifting toward or away from the virtual objects. Virtual object 2510*a*, for example, is displayed having an apparent visual conflict with virtual object 2512*a*, and is relatively more visually prominent because virtual object 2510*a* is closer to viewpoint 2526 than virtual object 2512*a*, does not suffer from an apparent visual conflict, and/or is a target of attention of the user as illustrated by attention 2544-1 (a first indication of attention that is in addition or alternative to attentions 2544-2, 2544-3, 2544-4, and/or 2544-5). An apparent visual conflict is described further with reference to method 2600, and optionally refers to display of virtual content (e.g., objects) such that a first object (e.g., virtual object 2512*a*) optionally mimics a physical occlusion of a second object (e.g., virtual object 2510*a*) similar to as if two physical objects of similar or the same size, shape, and position were inserted in place of the first and the second object, the first physical object obscuring and/or occluding one or more portions of the second object. As such, the computer system 101 optionally displays one or more portions of virtual object 2510*a* with a decreased level of visual prominence relative to the three-dimensional environment, and optionally displays virtual object 2512*a* with a relatively higher level of visual prominence due to the apparent visual conflict. It is understood that although virtual object 2510*a* is illustrated with a uniform fill pattern indicative of a level of visual prominence, respective levels of visual prominence of the one or more portions of the virtual object optionally vary. For example, the portion of virtual object 2510*a* apparently obscured by virtual object 2512*a* is optionally displayed with a low opacity (e.g., near 0%, or 0% opacity).

Turning back to the more visually prominent object 2510*a*, attention 2544-1 is directed to virtual object 2512*a*, in addition to being relatively closer to the current viewpoint 2526. Thus, in response to an event including a request to display virtual object 2510*a* relatively proximal to the current viewpoint (e.g., relatively increasing the level of visual prominence), determining that the virtual object is not subject to an apparent visual conflict (e.g., maintaining the level of visual prominence), and/or targeted by attention of the user (e.g., relatively increasing the level of visual prominence), optionally concurrently in some combination, the computer system 101 relatively increases the level of visual prominence of object 2510*a* as compared to the level of visual prominence of object 2512*a* and optionally changes the level of visual prominence in some combination, described further with reference to method 2600. Alternatively, when attention of the user is directed to virtual object 2510*a* as illustrated by attention 2544-5 (e.g., in alternative to the effect of attention 2544-1), the computer system 101 optionally increases a level of visual prominence of virtual object 2510*a* and/or decreases the level of visual prominence of virtual object 2152*a*, concurrently with changes in respective levels of visual prominence due to the apparent visual conflict, described further with reference to method 2600.

In FIG. 25A, virtual object 2514*a* is displayed with a respective, relatively reduced level of visual prominence due to an event including an attention-type of interaction and/or an apparent-conflict type of interaction. For example, virtual object 2514*a* is optionally not a target of attention of the user, and is accordingly relatively decreased in visual prominence by computer system 101. Additionally or alternatively, because virtual object 2514*a* is displayed presenting an apparent spatial conflict with table 2522*a*, the computer system 101 decreases levels of visual prominence of one or more portions (e.g., some or all) of virtual object 2514*a*. An apparent spatial conflict optionally refers to an arrangement of virtual content at a position that would collide and/or intersect with another object (e.g., real or virtual object) if a comparably sized and shaped physical object were replaced with the virtual content. Computer system 101 thus optionally decreases visual prominence of the intersecting portion 2517 of virtual object 2514*a* to emphasize the apparent spatial conflict, described with reference to method 2600.

As described previously, the computer system 101 optionally detects an event including displaying the virtual object with an apparent spatial conflict while attention of the user is not directed to the virtual object (e.g., in response to attention shifting away from the virtual object while the virtual object presents the apparent spatial conflict) and accordingly changes a level of visual prominence of virtual object 2514*a* in some combination based on such types of user interaction (optionally concurrently).

In FIG. 25A, virtual object 2516*a* is displayed with a respective, relatively reduced level of visual prominence due to an event including an off-angle type of interaction with the three-dimensional environment 2502 and/or the virtual object. For example, virtual object 2516*a* is optionally displayed such that a vector normal to a surface of virtual object 2516*a* is past a threshold angle (e.g., described with reference to method 1600) relative to a vector parallel to a center of viewpoint 2526. Thus, the computer system 101 optionally determines that visual prominence of virtual object 2516*a* should be reduced. On the other hand, attention

2544-4 is directed to virtual object 2516*a* concurrent with the off-angle displaying of virtual object 2516*a*, thereby increasing a level of visual prominence of virtual object 2516*a*. Thus, the computer system 101 optionally detects an event including a concurrent request to display virtual object 2516*a* off-angle relative to the user's current viewpoint (e.g., decreasing the level of visual prominence) and attention of the user targeting virtual object (e.g., increasing the level of visual prominence), and optionally changes the level of visual prominence in some combination, described further with reference to method 2600.

Virtual object 2518*a* is optionally similar to virtual object 2516*a*. For example, virtual object 2518*a* is optionally off-angle from the center of viewpoint 2526, and is optionally a target of alternative attention 2544-3. The computer system 101 thus optionally detects an event similar to as described with reference to virtual object 2516*a*, but based on a respective angle of virtual object 2518*a* relative to viewpoint 2526, and optionally changes the level of visual prominence of virtual object 2518*a* in some combination, described further with reference to method 2600.

Virtual object 2520*a* is displayed with a respective, relatively reduced level of visual prominence due to an event including a proximity type of interaction with the three-dimensional environment (e.g., described with reference to method 2200 and/or 2400). For example, virtual object 2520*a* is outside a threshold distance from viewpoint 2526 (e.g., threshold not shown, and corresponding to a decreasing of a level of visual prominence of virtual object 2520*a*), is relatively aligned with the current viewpoint of the user (e.g., maintaining the level of visual prominence, described with reference to method 1600) and is a target of attention 2544-2 (e.g., corresponding to an increasing of a level of visual prominence of virtual object 2520*a*, described with reference to method 1800). Accordingly, the computer system 101 optionally detects an event including one or more inputs corresponding to a request to display the virtual object 2520*a* beyond a threshold distance from viewpoint 2526 and attention of the user targeting virtual object 2520*a*, and optionally changes the level of visual prominence of virtual object 2520*a* in some combination, described further with reference to method 2600.

As shown in FIG. 25A, attentions 2544-1, 2544-2, 2544-3, 2544-4, 2544-5 optionally move away from respective virtual objects to positions within the three-dimensional environment 2502 corresponding to other portions of the environment (e.g., another virtual object, a physical object, and/or a representation of the physical environment and/or a virtual environment not including an object). Such movements in attention are represented by hand 2503 contacting trackpad 2505, which optionally correspond to a finger of a hand contacting a surface (e.g., touch-sensitive surface) in communication and/or detected by computer system 101, and movement of the contact. It is understood additional or alternative methods of changing attention optionally apply, such as one or more air gestures performed by the user's body (e.g., an air pinch contacting a thumb and finger of a hand moving through the air), movement of a computer system 101 or device in communication with the computer system 101 such as a stylus and/or pointing device, movement of a mouse peripheral, and/or a changing of a target of gaze of the user of the computer system 101.

From FIG. 25A to FIG. 25B, one or more events including the changing of attention described above relative to the visible virtual objects are detected. For example, object virtual 2510*a* is optionally decreased in visual prominence relative to as shown in FIG. 25A because it is subject of an apparent visual conflict and attention 2544-5 shifts away from virtual object 2510*a*. Similarly, virtual objects 2512*a*, 2516*a*, 2518*a*, and 2520*a* are optionally decreased in visual prominence relative to as shown in FIG. 25A due to attentions 2544-1, 2544-4, 2544-3, and 2544-2 respectively shifting away from the respective virtual objects. The computer system 101 optionally increases visual prominence of virtual object 2514*a* in response to detecting attention targeting virtual object 2514*a*. It is understood that the events illustrated in FIG. 25B have one or more characteristics described with reference to the events described with reference to FIG. 25A, however, relative to the changes in attention illustrated in FIG. 25B.

From FIG. 25B to FIG. 25C, viewpoint 2526 of the user of the computer system 101 changes, shifting leftward and rotating rightward relative to the three-dimensional environment 2502 shown in the overhead view. In response to detecting an event including changing of the current viewpoint in FIG. 25C, the computer system 101 optionally changes respective levels of visual prominence of the visible virtual objects relative to as shown in FIG. 25B. For example, the computer system 101 optionally reduces respective levels of visual prominence of virtual objects 2510*a*, 2512*a*, 2514*a*, 2518*a*, and 2520*a* because the current viewpoint is outside the threshold angle corresponding to the respective virtual objects. In contrast, the computer system 101 detects that viewpoint 2526 has changed to within the respective threshold angle associated with virtual object 2516*a*, and accordingly relatively increases the level of visual prominence of virtual object 2516*a*.

In some embodiments, the changes in levels of visual prominence are based on some combination of the types of detected user interaction with the three-dimensional environment. Such changes optionally include a summing or a subtracting of two quantitative measures of changes in levels of visual prominence (e.g., moving outside a threshold angle causes a 10% decrease in opacity of an object, but shifting attention to the object causes a 50% increase in opacity, thus the computer system 101 increases opacity of the object by 40%). In some embodiments, such changes are positively or negatively synergistic. For example, attention shifting to an object optionally increases the level of visual prominence of the object by a first amount, concurrent movement of the current viewpoint toward the object optionally increases the level of visual prominence by a second amount, and the overall level of visual prominence increases by a third amount, greater than a sum of the first and second amounts. Similarly, decreasing the level of visual prominence based on a first type of interaction by a first amount and decreasing the level of visual prominence based on a second type of interaction by a second amount optionally results in the computer system 101 decreasing the level of visual prominence by a third amount, greater in magnitude than the first and the second amount combined.

In some embodiments, the computer system 101 changes the level of visual prominence of a respective virtual object based on competing types of user interactions. For example, a first type of interaction optionally increases the level of visual prominence while a second type of interaction decreases the level of visual prominence, and the computer system 101 optionally changes the level of visual prominence of the virtual object based on the net change in level of visual prominence.

In some embodiments, a plurality of types of user interaction are detected during an event, and in response, the computer system 101 changes the level of visual prominence of an associated virtual object based on a net effect—or a subset of the net effect—of the respective types of user interaction included in the event. For example, the computer system 101 optionally detects two, three, four, five, six, seven, or more types of concurrent user interaction, and determines a net change in level of visual prominence based on the contributions of the respective types of concurrent interaction (optionally ignoring consideration of one or more contributions of respective types of user interaction).

FIGS. 26A-26D is a flowchart illustrating a method of modifying visual prominence of respective virtual objects based on one or more concurrent types of user interaction in accordance with some embodiments. In some embodiments, the method 2600 is performed at a computer system, such as computer system 101, in communication with one or more input devices and a display generation component, such as display generation component 120. In some embodiments, the computer system has one or more of the characteristics of the computer systems of methods 800, 1000, 1200, 1400, 1600, 1800, 2000, 2200, and/or 2400. In some embodiments, the display generation component has one or more of the characteristics of the display generation components of methods 800, 1000, 1200, 1400, 1600, 1800, 2000, 2200, and/or 2400. In some embodiments, the one or more input devices have one or more of the characteristics of the one or more input devices of methods 800, 1000, 1200, 1400, 1600, 1800, 2000, 2200, and/or 2400.

In some embodiments, the computer system displays (2602*a*), via the display generation component, a virtual object within a three-dimensional environment, such as object 2512A in three-dimensional environment 2502, wherein the virtual object has a first visual appearance, such as object 2512*a* in FIG. 25A. In some embodiments, the virtual object has one or more of the characteristics of the virtual objects described with reference to methods 800, 1000, 1200, 1400, 1600, 1800, 200, 2200, and/or 2400. In some embodiments, the three-dimensional environment has one or more of the characteristics of the three-dimensional environments described with reference to methods 800, 1000, 1200, 1400, 1600, 1800, 200, 2200, and/or 2400. For example, the computer system optionally displays a virtual object that is a virtual window including a user interface of an application (e.g., a messaging application, a media playback application, and/or a real-time video communication application). In some embodiments, the computer system displays the virtual object with a visual appearance (e.g., the first visual appearance) including displaying one or more visual characteristics of the virtual object with one or more respective values. For example, the computer system optionally displays the virtual object with a first degree of opacity (e.g., 0% opacity corresponds to a fully transparent appearance, 100% opacity corresponds to a fully opaque visual appearance, and intermediate degrees of opacity corresponds to a partially opaque and/or partially translucent appearance). In some embodiments, a respective portion (e.g., a border, one or more corners, one or more portions of a body of the virtual object and/or one or more portions of the border) of the virtual object is displayed with the first visual characteristic having the first value. For example, the first visual appearance optionally includes displaying the virtual object with a translucent border (e.g., 0% opacity) and displaying one or more portions of the virtual object with a significantly higher (e.g., 90 or 100%) degree of opacity. Additionally or alternatively, the computer system optionally displays the virtual object with the first visual appearance such that additional visual characteristics have respective values. For example, the first visual appearance optionally includes displaying the virtual object with a degree of opacity (e.g., 100% opacity) and further optionally includes displaying the virtual effect with a first degree of brightness (e.g., 100% brightness). It is understood that other visual characteristics, such as brightness, saturation, contrast, and/or a degree of a blurring effect optionally are optionally included in defining a respective visual appearance of the virtual object (e.g., the first visual appearance and/or other visual appearances described below). In some embodiments, the virtual object is displayed with a first visual appearance including a first visual characteristic (e.g., opacity) corresponding to a first value and a second visual characteristic (e.g., brightness) corresponding to a second value. In some embodiments, the first and second visual characteristics are one or more of any visual characteristics (e.g., opacity, brightness, size, color, color saturation, clarity or blurriness, virtual shadows, virtual lighting effects and/or edge appearance), such as visual characteristics of virtual content and/or objects that are described with reference to methods 1600, 1800, 2000, 2200, and/or 2400. In some embodiments, the first and second visual characteristics are different visual characteristics.

In some embodiments, while displaying, via the display generation component, the virtual object with the first visual appearance, the computer system detects (2602*b*) an event that corresponds to interaction of a user of the computer system with the three-dimensional environment, such as the change in attention 2544-1 shown in FIG. 25A. For example, the computer system optionally detects an event that includes detection of one or more inputs received from a user of the computer system and/or a second computer system in communication with the computer system. In some embodiments, the one or more inputs include a movement detected by the computer system of a respective portion of the user (e.g., movement of the user's hand, movement of the user's body to an updated position in the three-dimensional environment, and/or movement of the user's head). In some embodiments, the event includes a selection input of a virtual or physical button. For example, the computer system optionally detects an event including an air gesture performed a respective portion of the user (e.g., an air pinch gesture, an air swiping gesture, an air squeezing gesture, an air pointing gesture, and/or another suitable air gesture performed by a hand, one or more fingers, an arm, and/or some combination of such portions of the user) while attention of the user is optionally directed to a virtual button. In some embodiments, the event includes an event such as movement of the user to a position that is within or outside of a threshold distance (e.g., 0.01, 0.025, 0.05, 0.1, 0.25, 0.5, 1, 2.5, 5, 10, 15, 25, 50, 100, 250, 500, 1000, or 5000 m) of the virtual object. In some embodiments, the computer system detects an event including attention shifting from, toward, away from and/or within the virtual object. For example, the computer system optionally detects an event including attention shifting from a respective virtual object to the virtual object and/or optionally detects an event including attention shifting from the virtual object to the respective virtual object. In some embodiments, the event corresponds to a type of user interaction with the three-dimensional environment, as described further below, that optionally satisfies one or more respective criteria. In some embodiments, the event and/or the type of user interaction with the three-dimensional environment have one or more characteristics of the embodiments described with reference to methods 1600, 1800, 2000, 2200, and/or 2400, such as it relates to changing the visual prominence of virtual content, inputs relative to virtual content and/or the satisfaction of one or more criteria that factor into displaying virtual content with a modified or maintained visual prominence.

In some embodiments, in response to detecting the event that corresponds to interaction of the user with the three-dimensional environment (2602*c*), in accordance with a determination that the event includes a first type of user interaction with the three-dimensional environment, the computer system modifies (2602*d*) a visual appearance of the virtual object based on the first type of user interaction with the three-dimensional environment, such as the modification of object 2512*a* shown in FIG. 25B relative to FIG. 25A (optionally without modifying the visual appearance of the virtual object based on the second type of user interaction with the three-dimensional environment, as described below in accordance with a determination that the event does not include a second type of user interaction with the three-dimensional environment). For example, the computer system optionally modifies the visual appearance of the virtual object from the first visual appearance to the second visual appearance, optionally including a first degree of change of the first visual characteristic from the first value to the third value in accordance with a determination that the event includes a first type of user interaction. As referred to herein, a type of user interaction optionally includes movement of the user's viewpoint (e.g., position and/or orientation), changes in user attention, apparent spatial conflicts between respective virtual object(s) and/or other virtual and/or physical objects, and/or apparent visual conflicts between respective virtual objects and/or between a respective virtual object and a physical object. In some embodiments, the computer system modifies the visual appearance of the virtual object based on the event including the first type of user interaction. Such a modification based on the event including the first type of user interaction optionally is referred to as modifying the virtual object in the first manner. In some embodiments, modifying the virtual object in the first manner includes maintaining the value of the second visual characteristic (e.g., at the second value). For example, the first manner optionally includes modifying an opacity of the virtual object from an initial value (e.g., the first value) to an updated value (e.g., the third value) while a brightness of the virtual object optionally is maintained (e.g., at the second value). In some embodiments, modifying the virtual object in the first manner includes changing the second visual characteristic from the second value to a fourth value, different from the second value. As described previously, it is understood that any suitable visual characteristic (e.g., opacity, brightness, size, color, color saturation, clarity or blurriness, virtual shadows, virtual lighting effects and/or edge appearance) optionally is modified similarly, such as visual characteristics of virtual content and/or objects that are described as changing with reference to methods 1600-2400. In some embodiments, modifying the virtual object additionally includes modifying an additional visual characteristic other than the first and the second visual characteristics from an initial to an updated value. Description of the one or first criteria, modification of visual appearance of virtual content such as virtual objects, displaying such virtual content with a first visual appearance and/or another visual appearance, visual characteristic(s) of virtual content, and/or value(s) of visual characteristic(s) optionally have one or more characteristics described in further detail with reference to methods 1600, 1800, 2000, 2200, and/or 2400.

In some embodiments, in accordance with a determination that the event includes a second type of user interaction with the three-dimensional environment, wherein the second type of user interaction with the three-dimensional environment is different from the first type of user interaction with the three-dimensional environment, such as the movement of viewpoint 2526 from FIG. 25B to FIG. 25C, the computer system modifies (2602*e*) the visual appearance of the first virtual object based on the second type of user interaction with the three-dimensional environment, such as the modification of object 2512*a* shown in FIG. 25C relative to FIG. 25B (optionally without modifying the visual appearance of the virtual object based on the first type of user interaction with the three-dimensional environment, as described above in accordance with a determination that the event does not include the first type of user interaction with the three-dimensional environment). For example, the second type of user interaction optionally corresponds to one or more types of user interaction described with reference to the first type of user interaction. As an example, the first type of user interaction optionally corresponds to detecting a change in user viewpoint change from a first distance from the virtual object to a second (e.g., greater or lesser) distance from the virtual object while maintaining a fixed angle between a respective portion (e.g., a center) of the virtual object and user's viewpoint, and the second type of user interaction optionally corresponds to a change in viewing angle from a first viewing angle to a second, different viewing angle while maintaining a fixed distance between a respective portion of the virtual object and the user's viewpoint. In some embodiments, the first and the second types of user interaction with the three-dimensional environment correspond to different modes of interaction. For example, the first type of user interaction optionally includes movement of the user's viewpoint (e.g., changes in distance from the virtual object, changes in angles relative to the virtual object, and/or some combination thereof) and the second type of user interaction optionally includes an apparent spatial conflict between the virtual object and a physical object and/or virtual content other than the virtual object. The apparent spatial conflict optionally includes an input moving the virtual object from a first position (e.g., without an apparent spatial conflict) to a second position (e.g., including an apparent spatial conflict). Similar to as described with reference to the first manner, the computer system optionally detects an event including the second type of user interaction with the three-dimensional environment and optionally changes the visual prominence of the virtual object based on the second type of user interaction in a second manner. Modifying the virtual object in the second manner optionally has one or more characteristics similar to or the same as described with respect to modifying the virtual object in the first manner, such as modification of visual characteristics described with reference to methods 1600-2400. For example, if manipulating the visual appearance of the virtual object in the first manner includes modifying an opacity of the virtual object, manipulating the visual appearance of the virtual object in the second manner optionally includes modifying a brightness of the virtual object. In some embodiments, modifying the virtual object in the first manner includes modifying the first visual characteristic from a first value to a second value (e.g., by a first amount or degree of change) and modifying the virtual object in the second manner includes modifying the first visual characteristic from the first value to a third value, different from the second value (e.g., by a second amount, different from the first amount). In some embodiments, modifying the visual appearance of the virtual object in the first manner is similar to or the same as modifying the virtual object in the second manner. Thus, in some embodiments the computer system modifies the first visual characteristic by a first degree or a second degree of change in accordance with satisfaction of the first one or more criteria or in accordance with satisfaction of the second one or more criteria, respectively.

In some embodiments, in accordance with a determination that the event includes both the first type of user interaction with the three-dimensional environment and the second type of user interaction with the three-dimensional environment, the computer system concurrently modifies (2602*f*) the first visual appearance of the virtual object based on both the first type of user interaction with the three-dimensional environment and the second type of user interaction with the three-dimensional environment, such as the concurrent modification of the level of visual prominence of object 2512*a* shown in FIG. 25C. For example, the computer system optionally modifies the virtual object in the first and the second manners concurrently to optionally display the virtual object with a visual appearance based on the first type of user interaction and based on the second type of user interaction. As described previously, modifying the virtual object in the first manner optionally is based on the first type of user interaction with the three-dimensional environment and modifying the virtual object in the second manner optionally is based on the second type of user interaction with the three-dimensional environment. The first manner, for example, optionally corresponds to displaying the virtual object with a modified opacity, and the second manner optionally corresponds to displaying the virtual object with a modified brightness, as described previously. As another example, concurrently modifying the first type of user interaction optionally corresponds to movement of the computer system to a position that is too close to the virtual object as described with reference to method 2400, and the second type of user interaction optionally corresponds to attention change from a respective virtual object to the virtual object and/or from the virtual object to the respective virtual object. It is understood that any suitable type of user interaction with the three-dimensional environment described previously optionally applies as a first and/or second type of user interaction. In terms of visual appearance, the computer system optionally displays the virtual object with 100% opacity (e.g., the first visual characteristic at the first value) and a 100% level of brightness (e.g., the second visual characteristic at the second value) while the user is sufficiently close to the virtual object at a first position and oriented toward the virtual object at a first orientation. In response to detecting movement away from the virtual object to a second position (e.g., the movement and/or second position satisfying the one or more first criteria) and a rotating of the computer system and/or the user of the computer system away from the virtual object to a second orientation (e.g., the rotation and/or second orientation satisfying the one or more second criteria), the computer system optionally displays the virtual object with a reduced opacity (e.g., the first characteristic at the third value, corresponding to the first manner of modification) and a reduced brightness (e.g., the second characteristic at the fourth value, corresponding to the second manner of modification). The movement from the first position to the second position thus optionally corresponds to a first type of interaction with the three-dimensional environment and the rotation from the from the first orientation to the second orientation optionally corresponds to a second type of interaction with the three-dimensional environment. Independently, if the computer system detects the movement from the first position to the second position, the computer system optionally displays the virtual object with the reduced opacity (e.g., the first characteristic at the third value), and/or if the computer system detects the movement from the first orientation to the second orientation, the computer system optionally displays the virtual object with the reduced brightness (e.g., the second characteristic at the fourth value). Thus, the change in the visual appearance based on the first and the second type of user interaction optionally is based on the modification of the virtual object in the first and the second manner working in concert. In some embodiments, modifying the virtual object in the first manner and the second manner (e.g., in a third manner including the first and the second manner) includes modifying the first or the second visual characteristic synergistically or antagonistically based on the first and the second manner. For example, in response to detecting a change in user viewpoint closer to the virtual object (e.g., corresponding to a first type of user interaction), the computer system optionally increases opacity of the virtual object by a first amount, and in response to detecting a change in user viewpoint rotating toward the virtual object (e.g., corresponding to a second type of user interaction) optionally increases the opacity by a second amount. In response to concurrently detecting the change in user viewpoint moving closer to and rotating toward the virtual object, the computer system optionally compounds the first and the second amount of opacity modification. In response to concurrently detecting the change in viewpoint moving further away from the virtual object while rotating toward the virtual object, the computer system optionally decreases the opacity by the first amount and optionally increases the opacity by the second amount. Similarly, in response to detecting the change in viewpoint moving closer toward the virtual object while rotating away from the virtual object, the computer system optionally increases the opacity by the first amount and optionally decreases the opacity by the second amount. In response to detecting the change in viewpoint moving and rotating away from the virtual object, the computer system optionally decreases the opacity by the first and the second amount. It is understood that the change in opacity is optionally not strictly additive or subtractive, and optionally includes modification in varying degrees and/or in accordance with a general increase and/or decrease in the value of the shared visual characteristic. For example, the change in viewpoint optionally is one of one or more factors causing a logarithmic and/or exponential change in visual prominence. Modifying the visual appearance of the virtual object in the first manner, the second manner, or a combination of the first and the second manner in accordance with satisfaction of respective criteria visually indicates a state of the virtual object relevant to user interaction with the virtual object, such as an interactivity of the virtual object, and provides visual feedback for modifying the state, such as resolving one of more of the factors causing the first and/or second criteria to be satisfied.

In some embodiments, the computer system modifies (2604) the visual appearance of the virtual object, such as object 2512*a*, based on the first type (and/or second type) of user interaction with the three-dimensional environment includes modifying the visual appearance of the virtual object based on an angle between a current viewpoint, such as viewpoint 2526, of the user relative to the virtual object or a distance between the current viewpoint of the user and the virtual object, such as an angle of viewpoint 2526 from FIG. 25B to FIG. 25C. For example, as described with reference to method 1600, the first type (and/or second type) of user interaction optionally includes detecting movement of the current viewpoint of the user of the computer system, and in response to the detected movement, changing a level of visual prominence of the virtual object in accordance with the movement, optionally in accordance with a distance between the current viewpoint and the virtual object. In some embodiments, the modifying of the visual appearance is based on the angle and/or the distance between the current viewpoint and the virtual object. Modifying visual prominence of the virtual object based on the type of user interaction with the three-dimensional environment provides visual feedback about the user's orientation relative to the virtual object, thereby indicating input required to improve visibility and/or interactability of the virtual object and reducing user input erroneously directed to the virtual object when interactability is limited or different from user expectations.

In some embodiments, modifying the visual appearance of the virtual object based on the first type (and/or second type) of user interaction with the three-dimensional environment includes modifying the visual appearance of the virtual object, such as object 2512*a*, based on whether attention of the user of the computer system is directed to the virtual object (2606), such as attention 2544-1 in FIG. 25A. For example, as described with reference to method 1800, the computer system optionally increases a level of visual prominence of the virtual object in response to detecting attention of the user target the virtual object, and optionally decreases the level of visual prominence in response to detecting attention of the user target another virtual object and/or portion of the three-dimensional environment. Modifying visual prominence of the virtual object based on the attention of the user provides visual feedback about the computer system's understanding of targets of user input, thereby indicating input required to improve visibility and/or interactability of the virtual object and reducing user input erroneously directed to the virtual object when interactability is limited or different from user expectations.

In some embodiments, modifying the visual appearance of the virtual object, such as object 2514*a*, based on the first type (and/or second type) of user interaction with the three-dimensional environment includes modifying the visual appearance of the virtual object based on a spatial conflict between the virtual object and a second object, different from the virtual object (2608), such as the conflict between object 2514*a* and table 2522*a*. In some embodiments, the computer system displays the virtual object at a position within the three-dimensional environment that presents an apparent spatial conflict between the virtual object and another physical or virtual object as described with reference to method 2000. In some embodiments, the event corresponding to interaction of the user of the computer system with the three-dimensional environment includes a change in objects within the three-dimensional environment that cause an apparent spatial conflict that was not present before the event, such as one or more inputs requesting movement of a virtual object to a position presenting an apparent spatial conflict. For example, the computer system optionally displays a virtual window at a position that would cause a physical object of similar or the same dimensions to collide and/or intersect with the other physical or virtual object in response to one or more requests to move the virtual object to the position (e.g., a selection of a virtual or physical button centering one or more windows relative to the current viewpoint). To resolve such an apparent conflict, the computer system optionally modifies one or more portions of the virtual object that present an apparent intersection with the other object and/or are within a threshold distance (e.g., 0.01, 0.025, 0.05, 0.1, 0.25, 0.5, 1, 2.5, 5, 10, 15, 25, 50, 100, 250, 500, 1000, or 5000 m) of the apparent intersection. As another example, when two virtual circles included in a Venn diagram optionally correspond to distinct virtual objects, the intersecting portion of the two virtual circles is optionally displayed with a modified (e.g., increased or decreased) visual prominence relative to the virtual environment. In some embodiments, the computer system visually deemphasizes a first portion of the virtual object relative to a second portion (e.g., the unconflicted portion) of the virtual object and/or relative to other portions of the three-dimensional environment surrounding the object. In some embodiments, the computer system displays the first portion of the virtual object with an animation effect that causes the first portion of the object to be visible relative to the viewpoint of the user when the first portion of the virtual object contacts or intersects with the first portion of the other object in response to the input. For example, as described below, the animation effect includes a feathering effect that, when the first portion of the object is in contact with the first portion of the other object, veils (e.g., occludes or partially occludes) the first portion of the other object by a respective amount (e.g., and/or with a respective speed or immediacy of occlusion and/or respective extension away from the first portion of the object that has the depth conflict). In some embodiments, characteristics of the second visual properties do not include and/or are different from a size of the object, a lighting of the object, shadows associated with the object (e.g., cast onto the object by other objects), or other visual characteristics that automatically and/or would otherwise change based on changes in relative placement of the object in the three-dimensional environment relative to the viewpoint of the user. In some embodiments, the computer system displays the first portion of the object with the second visual properties while the first portion of the object remains in contact with the first portion of the other object. For example, if the computer system detects movement of the object to a third location in the three-dimensional environment that causes the first portion of the object to no longer occupy the same portion of the three-dimensional environment as the first portion of the other object or portions of other objects, the computer system redisplays the first portion of the object with the first visual properties. In some embodiments, when the computer system displays the first portion of the object with the second visual properties in response to detecting the depth conflict between the first portion of the object and the first portion of the other object, the computer system does not display other portions of the three-dimensional environment (e.g., objects surrounding the object or portions of the physical environment) with the second visual properties and/or does not modify the visual properties of other portions of the three-dimensional environment. Modifying the visual appearance of the virtual object based on a spatial conflict with the second virtual object provides visual feedback about the arrangement of the virtual object, thus indicating user input required to resolve the spatial conflict and preventing user interaction erroneously directed to the region of the spatial conflict that presents ambiguous or unexpected behavior.

In some embodiments, the second object is a physical object in a physical environment of the user of the computer system (2610), such as table 2522*a* in FIG. 25A. For example, the second object is optionally a physical shelf, couch, and/or desk in the physical environment of the user of the computer system. Modifying the visual appearance of the based on the type of user interaction when the virtual object conflicts with a physical object raises user awareness of their physical environment, reduces visual discomfort associated with apparent conflicts, and visually indicates the nature of the spatial conflict, thereby indicating user input to resolve the spatial conflict that is distinct from resolution of spatial conflicts with virtual content.

In some embodiments, the second object is a respective virtual object concurrently displayed with the virtual object within the three-dimensional environment (2612), such as object 2510*a* in FIG. 25A. For example, the second object is optionally a virtual shelf, virtual couch, and/or virtual desk in an extended reality (XR) environment of the user of the computer system. Modifying the visual appearance of the based on the type of user interaction when the virtual object conflicts with a virtual object visually indicates the nature of the spatial conflict, thereby indicating user input to resolve the apparent spatial conflict that is distinct from resolution of spatial conflicts with physical objects.

In some embodiments, modifying the visual appearance of the virtual object based on the first type (and/or second type) of user interaction with the three-dimensional environment includes modifying the visual appearance of the virtual object based on a determination that a current viewpoint, such as viewpoint 2526, of the user is within a threshold distance of the virtual object (2614), such as a threshold associated with object 2512*a* in FIG. 25A. For example, as described further with reference to method 2200, the first (and/or the second) type of user interaction optionally includes movement of the current viewpoint of the user of the computer to within the threshold distance of the virtual object, such as movement to a position immediately in front of the virtual object. In response to the event, the computer system optionally modifies (e.g., decreases or increases) the level of visual prominence of one or more portions of the virtual object. Modifying the visual appearance of the virtual object based on a determination that the current viewpoint has changed to within the threshold distance of the virtual object reduces the likelihood user input is erroneously directed to the virtual object due to suboptimal visibility and/or interactivity with the virtual object.

In some embodiments, in response to detecting the event that corresponds to interaction of the user with the three-dimensional environment (2616*a*) in accordance with a determination that the event includes a third type of user interaction with the three-dimensional environment, different from the first type of interaction and the second type of interaction with the three-dimensional environment, the computer system modifies (2616*b*) the visual appearance of the virtual object based on the third type of user interaction with the three-dimensional environment, such as the change in viewpoint 2526 in FIG. 25C relative to FIG. 25B. The third type of user interaction optionally has one or more characteristics of the first type and/or the second type of user interactions with the three-dimensional environment. For example, as described with reference to step 2602 of method 2600, the computer system optionally modifies the visual appearance of the virtual object in the first manner (e.g., based on the first type of user interaction with the three-dimensional environment), in the second manner (e.g., based on the second type of user interaction with the three-dimensional environment), and/or further in the third manner (e.g., based on a third type of user interaction with the three-dimensional environment). The first manner optionally includes modifying the visual appearance of the virtual object based on a decreased distance between the current viewpoint of the user and the virtual object, the second manner optionally includes modifying the visual appearance of the virtual object based on a change in angle between the current viewpoint and the virtual object, and the third manner optionally includes modifying the visual appearance of the virtual object based on an apparent spatial conflict between the virtual object and another object. In some embodiments, the third type of user interaction and/or the third manner of modifying the visual appearance of the virtual object has one or more characteristics of the first and/or second types of user interaction described with reference to methods 1600-2400. It is understood that the computer system optionally detects event(s) including a plurality of types of user interaction (e.g., a first, second, third, fourth, fifth, and/or sixth type of user interaction, optionally concurrently in some combination), and modifies the visual appearance of the virtual object based on such event(s), similar to described as the combinations of types of user interactions described with reference to method 2600 herein. Modifying the visual appearance of the virtual object based on the third type of user interaction provides feedback for additional types of user interaction, thereby indicating user input required to improve visibility of and/or interactability with the virtual object.

In some embodiments, in response to detecting the event that corresponds to interaction of the user with the three-dimensional environment (2618*a*), in accordance with a determination that the event includes both the first type of user interaction with the three-dimensional environment and the third type of user interaction with the three-dimensional environment, the computer system concurrently modifies (2618*b*) the first visual appearance of the virtual object based on both the first type of user interaction with the three-dimensional environment and the third type of user interaction with the three-dimensional environment, such as the modification in level of visual prominence of object 2512*a* in FIG. 25C relative to FIGS. 25A-B. For example, similar or the same as the concurrent modification of the visual appearance of the virtual object based on the first type and the second type of user interaction with the three-dimensional environment, but based on the first type and the third type of user interaction. In some embodiments, when the event includes both the first and the third type of user interaction, the computer system modifies the visual appearance differently from when the event includes the first type of user interaction and/or the second type of user interaction. For example, the first and the second type of user interaction optionally includes detecting attention change to the virtual object and movement of the user off-angle relative to the virtual object and optionally results in a respective first change in visual appearance of the virtual object, and the first and the third type of user interaction optionally includes a similar detection of attention change and movement of the user closer to the virtual object and optionally results in a respective second change in visual appearance of the virtual object. Modifying the visual appearance of the virtual object based on the first type and the third type of user interactions provides feedback for additional types of user interaction, thereby indicating user input required to improve visibility of and/or interactability with the virtual object.

In some embodiments, in response to detecting the event that corresponds to interaction of the user with the three-dimensional environment (2620*a*), in accordance with a determination that the event includes both the second type of user interaction with the three-dimensional environment and the third type of user interaction with the three-dimensional environment, the computer system concurrently modifies (2620*b*) the first visual appearance of the virtual object based on both the second type of user interaction with the three-dimensional environment and the third type of user interaction with the three-dimensional environment, such as the modification in level of visual prominence of object 2512*a* in FIG. 25C relative to FIGS. 25A-B. For example, similar or the same as the concurrent modification of the visual appearance of the virtual object based on the first type and the second type of user interaction with the three-dimensional environment, but based on the second type and the third type of user interaction. Similar to as described with reference to step(s) 2618, the event including the second and the third type of user interaction optionally results in a different modification of visual appearance relative to other events (e.g., including the first, second and/or third types of user interaction standalone, and/or combinations of the first, second and/or third types of user interaction other than the second and the third type of user interaction). Modifying the visual appearance of the virtual object based on the second type and the third type of user interactions provides feedback for additional types of user interaction, thereby indicating user input required to improve visibility of and/or interactability with the virtual object.

In some embodiments, in response to detecting the event that corresponds to interaction of the user with the three-dimensional environment (2622*a*), in accordance with a determination that the event includes first type of user interaction with the three-dimensional environment, the second type of user interaction with the three-dimensional environment and the third type of user interaction with the three-dimensional environment, the computer system concurrently modifies (2622*b*) the first visual appearance of the virtual object based on the first type of user interaction with the three-dimensional environment, the second type of user interaction with the three-dimensional environment, and the third type of user interaction with the three-dimensional environment, such as the modification in level of visual prominence of object 2512*a* in FIG. 25C relative to FIGS. 25A-B. For example, similar or the same as the concurrent modification of the visual appearance of the virtual object based on the first type and the second type of user interaction with the three-dimensional environment, but based on the first type, the second type, and the third type of user interaction. Similar to as described with reference to step(s) 2618, the event including the first, the second, and the third type of user interaction optionally results in a different modification of visual appearance relative to other events (e.g., including the first, second and/or third types of user interaction standalone, and/or combinations of the first, second and/or third types of user interaction other than all three types of user interactions). Modifying the visual appearance of the virtual object based on the first type, the second type, and the third type of user interactions provides feedback for additional types of user interaction, thereby indicating user input required to improve visibility of and/or interactability with the virtual object.

In some embodiments, modifying the visual appearance of the virtual object based on the first type of user interaction and modifying the visual appearance of the virtual object based on the second type of user interaction both include increasing a visual prominence of the virtual object relative to the three-dimensional environment (2624), such as the level of visual prominence of object 2512*a* in FIG. 25A. For example, in response to detecting the current viewpoint of the user shift from a position that is relatively too far for improved visibility of the virtual object to a position an improved, smaller-distance position for visibility of the virtual object, the computer system optionally increases a brightness, translucency, and/or a saturation of content included in the virtual object. Additionally, in response to detecting the current viewpoint shift from a suboptimal viewing angle toward the side of the virtual object to align with a normal extending from the virtual object, the computer system optionally increases the brightness, translucency, and/or the saturation of the content included in the virtual object. In some embodiments, the combined amount of increase in the level of visual prominence of the virtual object is greater than respective constituent amounts of increasing in the level of visual prominence (e.g., based on only the first type or the second type of user interaction). Increasing the visual prominence of the virtual object based on the first type of user interaction and the second type of user interaction facilitates interactions with the virtual object without express inputs to cause such increases in the visual prominence.

In some embodiments, modifying the visual appearance of the virtual object based on the first type of user interaction and modifying the visual appearance of the virtual object based on the second type of user interaction both include decreasing a visual prominence of the virtual object relative to the three-dimensional environment (2626), such as the modification in level of visual prominence of object 2512*a* in FIG. 25C relative to FIGS. 25A-B. For example, in response to detecting the attention of the user shift away from the virtual object and concurrently detecting the current viewpoint move to a position relatively far away from the virtual object, the computer system optionally decreases a brightness, translucency, and/or a saturation of content included in the virtual object. Additionally, in response to detecting the current viewpoint shift from an alignment with a normal extending from the virtual object to a viewing angle toward the side of the virtual object, the computer system optionally decreases the brightness, translucency, and/or the saturation of the content included in the virtual object. In some embodiments, the combined amount of decrease in the level of visual prominence of the virtual object is greater in magnitude than respective constituent amounts of decreasing in the level of visual prominence (e.g., based on only the first type or the second type of user interaction) Decreasing the visual prominence of the virtual object based on the first type of user interaction and the second type of user interaction facilitates interactions with the virtual object without express inputs to cause such increases in the visual prominence.

In some embodiments, modifying the visual appearance of the virtual object based on the first type of user interaction includes decreasing a visual prominence of the virtual object relative to the three-dimensional environment, and modifying the visual appearance of the virtual object based on the second type of user interaction includes increasing the visual prominence of the virtual object relative to the three-dimensional environment (2628), such as the modification in level of visual prominence of object 2514*a* in FIG. 25C relative to FIGS. 25A-B. For example, as described with reference to step 2602 of method 2600, the computer system optionally increases the visual prominence of the virtual object based on a first type of user interaction, and optionally decreases the visual prominence of the virtual object based on the second type of user interaction (optionally concurrently). In response to detecting an event including user interactions causing opposing changes in level of visual prominence of the virtual object, the computer system optionally modifies the level visual prominence of the virtual object in accordance with net change in level of visual prominence. Similarly, if the first type of user interaction corresponds to a decrease in the level of visual prominence that exceeds the increase in level of visual prominence corresponding to the second type of user interaction, the computer system optionally decreases the level of visual prominence of the virtual object. As described with reference to step 2602 of method 2600, the computer system optionally changes the level of visual prominence based on a difference between the respective changes in the level of visual prominence of the virtual object (e.g., in a subtractive manner, and/or based on some combination that is not strictly a subtraction of the respective changes in level of visual prominence.) For example, the first type of user interaction (e.g., increasing the level of visual prominence) optionally is smaller in magnitude than the second type of user interaction (e.g., decreasing the level of visual prominence); therefore, the computer system optionally increases the level of visual prominence of the virtual object (e.g., because the degree of increased visual prominence is greater than the degree of decreased visual prominence). In some embodiments, the net change in level of visual prominence is more or less equal, and the modification of the virtual appearance of the virtual object is forgone. Increasing or decreasing the visual prominence of the virtual object relative to the three-dimensional environment based on the type of user interaction provides visual feedback about the regime dictating changes in visual prominence, thereby providing visual feedback about potential inputs to increase (or decrease) the visual prominence of virtual objects.

It should be understood that the particular order in which the operations in method 2600 have been described is merely exemplary and is not intended to indicate that the described order is the only order in which the operations could be performed. One of ordinary skill in the art would recognize various ways to reorder the operations described herein.

FIGS. 27A-27J generally illustrate examples of the computer system 101 displaying virtual content and dynamically displaying environmental effects with different amounts of visual impact on a three-dimensional environment in response to the computer system 101 detecting inputs (e.g., user attention) shifting to different elements in the three-dimensional environment, in accordance with some embodiments of the present disclosure.

Figure 27A:
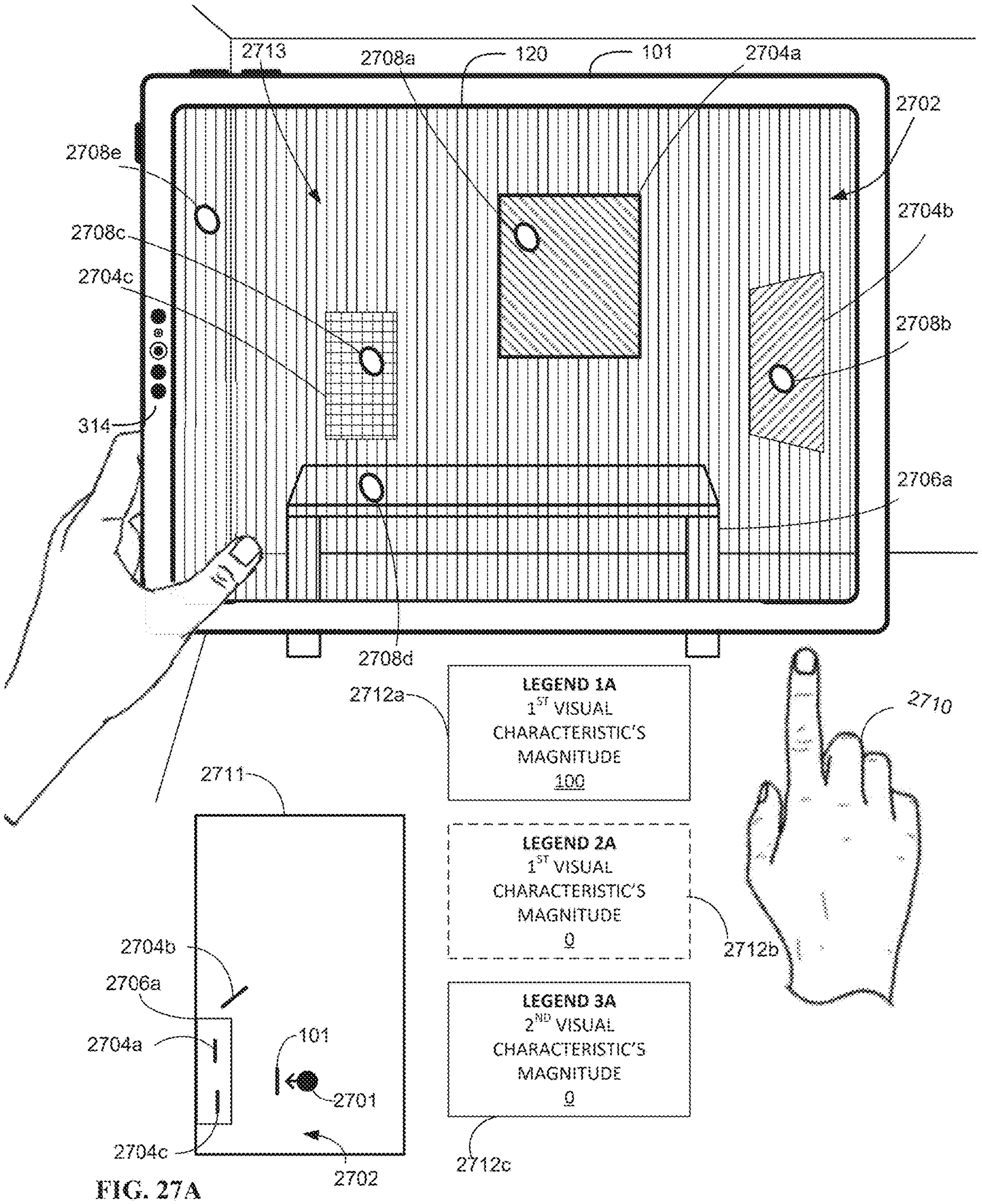
FIGS. 27A-27J illustrate examples of a computer system concurrently displaying virtual content and environmental effects with different amounts of visual impact on a three-dimensional environment in response to the computer system detecting inputs (e.g., user attention) shifting to different elements in the three-dimensional environment in accordance with some embodiments.

FIG. 27A illustrates a three-dimensional environment 2702 including virtual and physical objects in different positions within the three-dimensional environment 2702. In particular, the three-dimensional environment 2702 includes virtual content 2704*a* through 2704*c*. Virtual content 2704*a* through 2704*c* are respectively user interfaces of different applications. For example, virtual content 2704*a* is optionally a user interface associated with a gaming application, virtual content 2704*b* is optionally associated with a messaging application, and virtual content 2704*c* is optionally associated with an Internet browsing application. Further examples of virtual content are described with reference to method 2800. The three-dimensional environment 2702 of FIG. 27A also includes a physical table 2706*a* that is visible, such as via passthrough. In some embodiments, the physical table 2706*a* is not visible in the three-dimensional environment of FIG. 27A but is fully obscured from display. As shown in the overhead view 2711, the viewpoint of the user 2701 of the computer system 101 is within a physical room, and the three-dimensional environment 2702 is visible via the computer system 101.

In FIG. 27A, the three-dimensional environment 2702 also includes an environmental effect 2713 represented by the vertical bar pattern (e.g., a visual effect or a visual characteristic of the environment in which the virtual content 2704*a*, virtual content 2704*b*, and/or virtual content 2704*c* are displayed), different from the virtual content 2704*a* through 2704*c*. In FIG. 27A, while user attention 2708*a* is directed to virtual content 2704*a*, the computer system 101 concurrently displays the virtual content 2704*a* and the environmental effect 2713. In FIG. 27A, environmental effect 2713 has a visual impact on the appearance of the three-dimensional environment 2702. The environmental effect 2713 and its amount (e.g., magnitude) of visual impact on the appearance of the three-dimensional environment 2702 is optionally associated with (and/or defined by) virtual content 2704*a*, the operating system of the computer system 101, or a combination thereof. For example, the virtual content 2704*a* optionally requests that while user attention 2708*a* is directed to the virtual content 2704*a*, the computer system 101 display the environmental effect 2713 with a specific amount of visual impact on the appearance of the three-dimensional environment 2702 to result in the computer system 101 displaying both the environmental effect 2713 with the specific amount of visual impact on the appearance of the three-dimensional environment 2702 and the virtual content 2704*a* concurrently. As another example, the operating system of the computer system 101 optionally defaults to displaying the environmental effect with a specific amount of visual impact on the appearance of the three-dimensional environment 2702 in accordance with a determination that the virtual content 2704*a* is the subject of user attention and in accordance with a determination that the virtual content 2704*a* is content of a first type (e.g., video content). The environmental effect 2713 of FIG. 27A optionally includes a visual darkening of the three-dimensional environment 2702 to increase a visual prominence of the virtual content 2704*a* while user attention 2708*a* is directed to the virtual content 2704*a*. For example, when the virtual content 2704*a* is video content, the computer system 101 concurrently displaying the visual darkening at a specific amount while user attention 2708*a* is directed to the virtual content 2704*a* optionally increases focus and or visual prominence of the virtual content 2704*a* while user attention 2708*a* is directed to the virtual content 2704*a*, which optimally results in enhanced interaction with the virtual content 2704*a*, among other things discussed further with reference to method 2800. In FIG. 27A, the computer system 101 visually emphasizes the virtual content 2704*a* (as represented by the bolded boundaries of virtual content 2704*a* relative to other portions of the three-dimensional environment 2702 optionally including the virtual content 2704*b* and virtual content 2704*c*). In some embodiments, the virtual content 2704*b* and 2704*c* are partially obscured due to (and/or are affected in visual appearance based on) the environmental effect 2713 having its specific visual impact on the appearance of the three-dimensional environment 2702 while user attention 2708*a* is directed to virtual content 2704*a*.

In FIG. 27A, user attention 2708*b* through 2708*e* are respectively alternatively directed to virtual content 2704*b*, 2704*c*, the physical table 2706*a*, and another background portion (e.g., a passthrough portion) of the three-dimensional environment 2702 and input from a hand 2710 of the user 2701 is directed to the virtual content 2704*b*. The computer system 101 optionally changes amounts of visual impact of one or more environmental effects on the appearance of the three-dimensional environment 2702 in response to these different example inputs, and more generally in response to detecting shifting of the user attention and/or other user inputs to these elements, as will be discussed in detail with reference to FIGS. 27B-27J.

FIG. 27A also includes legends 2712*a* through 2712*c*, which respectively detail respective amounts of visual impact of environmental effects on the appearance of the three-dimensional environment 2702 due to virtual content 2704*a* through 2704*c*, respectively, that the computer system 101 displays while user attention 2708*a* is directed to the virtual content 2704*a*. In particular, legend 2712*a* of FIG. 27A notes that the amount of visual impact of environmental effect 2713 on the appearance of the three-dimensional environment 2702 that is due to virtual content 2704*a* is at a first level (e.g., a maximum level relative to a level of visual impact associated with the virtual content 2704*a* and/or relative to a system maximum level, indicated by the value 100); legend 2712*b* notes that the amount of visual impact of another environmental effect on the appearance of the three-dimensional environment 2702 that is due to virtual content 2704*b* is at a minimum level (e.g., relative to a level of visual impact associated with the virtual content 2704*b* and/or relative to a system minimum level, indicated by the value 0); legend 2712*c* of FIG. 27A notes that the amount of visual impact of another environmental effect (discussed below with reference to FIG. 27H), different from the environmental effect 2713, on the appearance of the three-dimensional environment 2702 that is due to virtual content 2704*c* is at a minimum level (e.g., relative to a level of visual impact associated with the virtual content 2704*c* and/or relative to a system minimum level, indicated by the value 0).

Figure 27B:
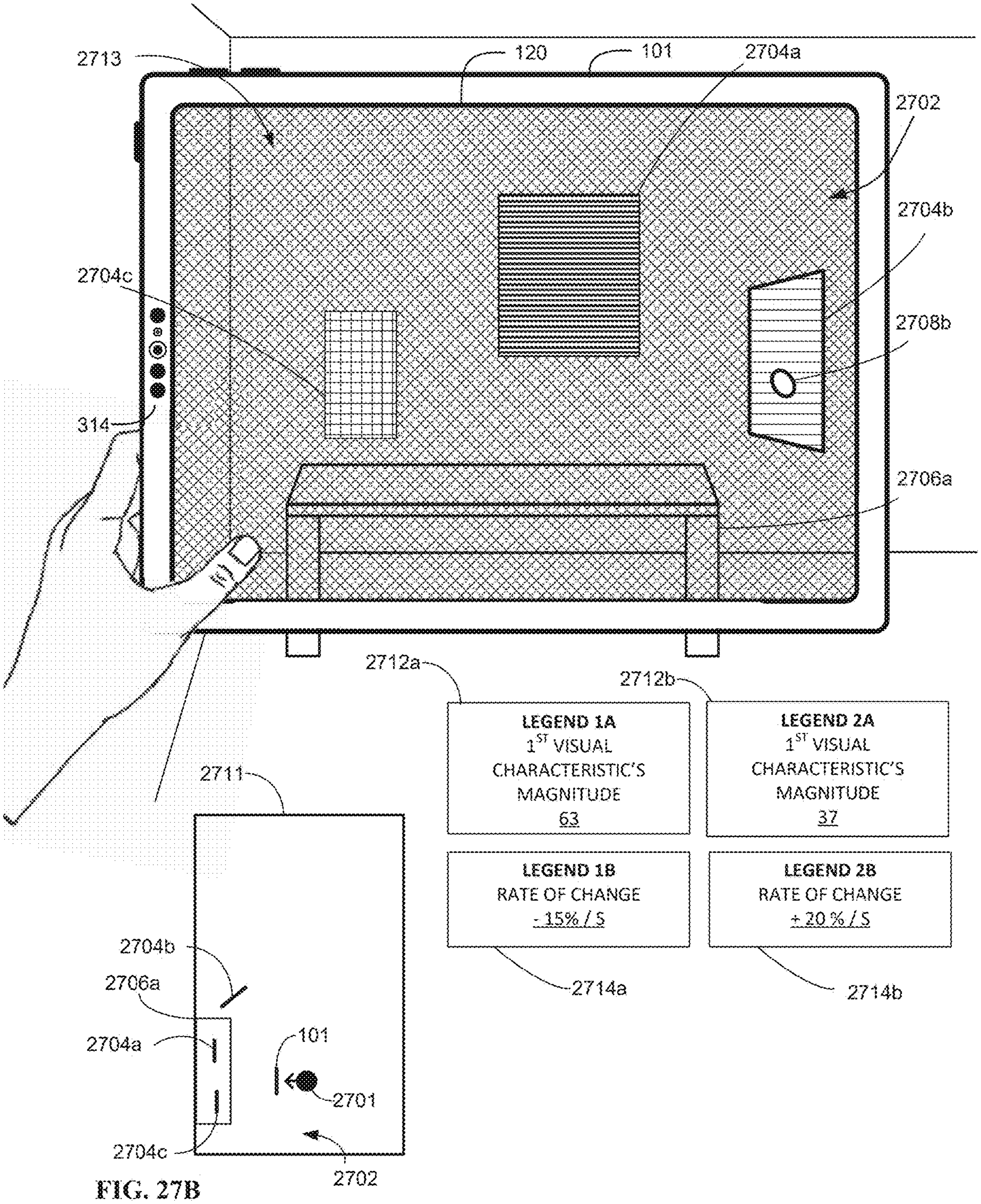
Figure 27C:
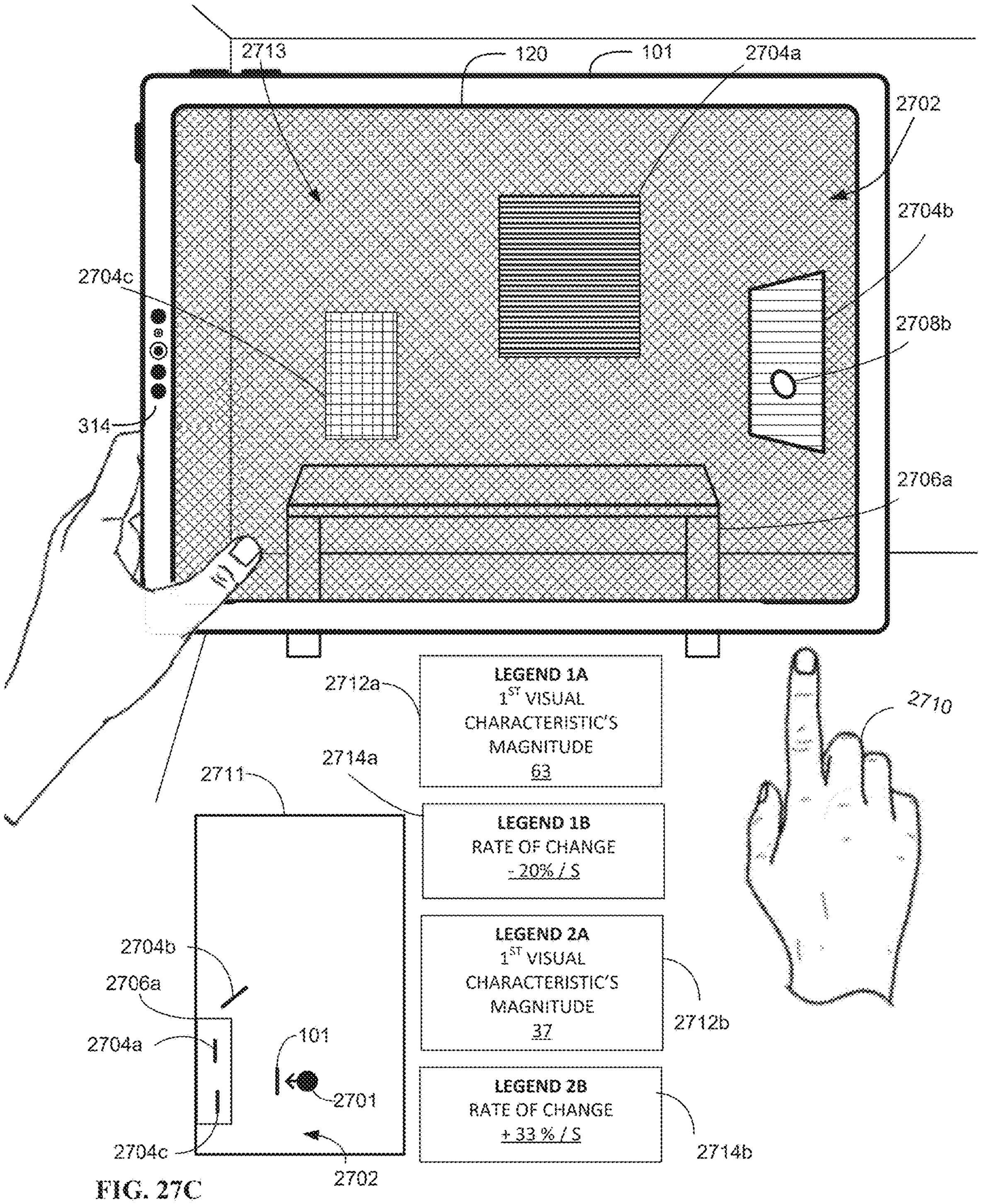
Figure 27D:
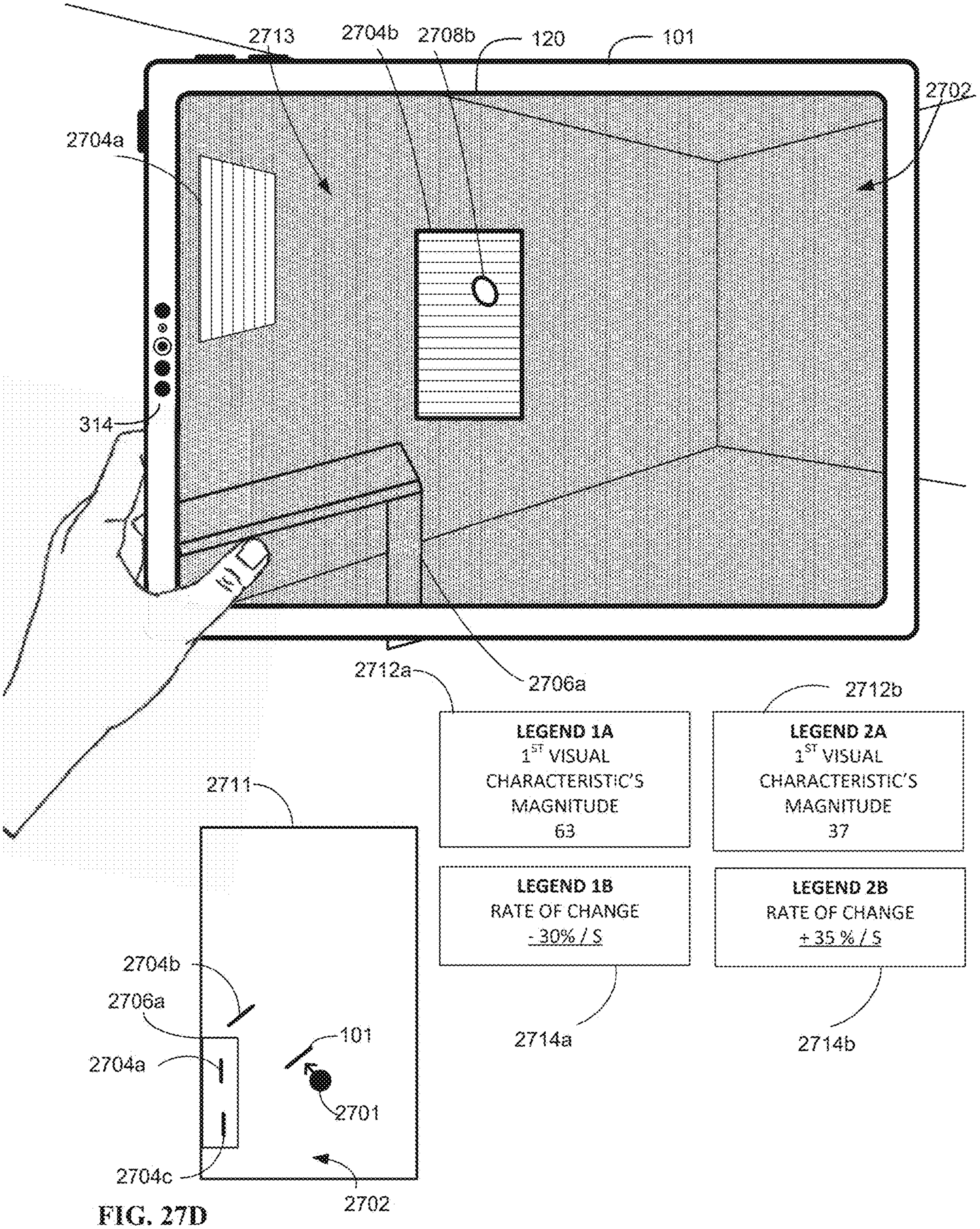

FIGS. 27B-27D illustrate the computer system 101 changing the amount of visual impact of the environmental effect 2713 on the appearance of the three-dimensional environment 2702 that is due to virtual content 2704*a* and virtual content 2704*b* in response to detecting user attention shifting from virtual content 2704*a* of FIG. 27A to virtual content 2704*b* of FIG. 27A (e.g., from user attention 2708*a* of FIG. 27A to user attention 2708*b* of FIG. 27A) and/or other input(s), different from user attention, directed to virtual content 2704*b*, and in accordance with a determination that the virtual content 2704*b* is associated with the same environmental effect 2713, but a different amount of visual impact on the appearance of the three-dimensional environment 2702 than the amount of visual impact on the appearance of the three-dimensional environment 2702 in FIG. 27A.

FIG. 27B illustrates the computer system 101 changing the amount of visual impact that the environmental effect 2713 has on the appearance of the three-dimensional environment 2702 that is due to virtual content 2704*a* and virtual content 2704*b* in response to detecting user attention shifting from virtual content 2704*a* of FIG. 27A to virtual content 2704*b* of FIG. 27A (e.g., from user attention 2708*a* of FIG. 27A to user attention 2708*b* of FIG. 27A) and in accordance with a determination that the virtual content 2704*b* is associated with the same environmental effect 2713. For example, the computer system 101 optionally changes the amounts because the virtual content 2704*b*, the operating system, or a combination thereof requests a different amount of visual impact of the environmental effect 2713 on the appearance of the three-dimensional environment 2702 while user attention 2708*b* is directed to virtual content 2704*b* compared with the amount requested by the virtual content 2704*b*, the operating system, or a combination thereof while user attention 2708*a* is directed to virtual content 2704*a* of FIG. 27A. For example, the virtual content 2704*b* optionally requests that the computer system 101 display the environmental effect with less visual darkening than requested by the virtual content 2704*a* while user attention 2708*b* is directed to the virtual content 2704*b*. As shown in the legends 2712*a* and 2712*b* in FIG. 27B, which are respectively associated with virtual content 2704*a* and virtual content 2704*b*, in response to detecting user attention shifting from virtual content 2704*a* of FIG. 27A to virtual content 2704*b* of FIG. 27B, the computer system 101 decreases the amount of visual impact of the environmental effect 2713 on the appearance of the three-dimensional environment 2702 due to the virtual content 2704*a* compared with the amount in legend 2712*a* of FIG. 27A, and the computer system 101 increases the amount of visual impact of the environmental effect 2713 on the appearance of the three-dimensional environment 2702 due to the virtual content 2704*b* compared with the amount in legend 2712*b* of FIG. 27A.

In addition, FIG. 27B shows legends 2714*a* and 2714*b*, which are respectively associated with a respective rate of change of the amount of visual impact of the environmental effect 2713 on the appearance of the three-dimensional environment 2702 by which the computer system 101 changes the amount of visual impact of the environmental effect 2713 on the appearance of the three-dimensional environment 2702 due to the virtual content 2704*a* and virtual content 2704*b*. In particular, legend 2714*a* indicates a rate of change of the amount of visual impact of the environmental effect 2713 on the appearance of the three-dimensional environment 2702 due to the virtual content 2704*a* being −15%/s; as such, in the example of FIG. 27B, the computer system 101 decreases, at a rate of −15%/s, the amount of visual impact of environmental effect 2713 on the appearance of the three-dimensional environment 2702 due to the virtual content 2704*a* to arrive at its amount of visual impact illustrated in legend 2712*a* of FIG. 27B. Legend 2714*b* indicates a rate of change of the amount of visual impact of the environmental effect 2713 on the appearance of the three-dimensional environment 2702 due to virtual content 2704*b* being +20%/s; as such, in the example of FIG. 27B, the computer system 101 increases, at a rate of +20%/s, the amount of visual impact of environmental effect 2713 on the appearance of the three-dimensional environment 2702 due to the virtual content 2704*b* to arrive at its amount of visual impact illustrated in legend 2712*b* of FIG. 27B.

FIG. 27C illustrates the computer system 101 changing the amount of visual impact that the environmental effect 2713 has on the appearance of the three-dimensional environment 2702 in response to detecting input from the hand 2710 of FIG. 27A directed to the virtual content 2704*b* and user attention shifting from virtual content 2704*a* of FIG. 27A to virtual content 2704*b* of FIG. 27C (e.g., from user attention 2708*a* in FIG. 27A to user attention 2708*b* in FIG. 27C). For example, the user optionally shifts the user's gaze away from the virtual content 2704*a* and to virtual content 2704*b*, in addition to performing an air gesture with hand 2710 such as described in method 2800, such as an air pinch gesture with the hand 2710 directed to virtual content 2704*b*.

In FIG. 27C, in response to detecting input from the hand 2710 directed to the virtual content 2704*b* and user attention 2708*b* directed to virtual content 2704*b* (e.g., from user attention 2708*a* in FIG. 27A), the computer system 101 changes the amount of visual impact that the environmental effect 2713 has on the appearance of the three-dimensional environment 2702 at a greater rate of change than the rate of change illustrated in FIG. 27B (which was performed as a result of the computer system 101 detecting user attention shifting from virtual content 2704*a* of FIG. 27A to virtual content 2704*b* of FIG. 27A without input from the hand 2710 and in accordance with the determination the virtual content 2704*b* is associated with the same environmental effect 2713 that was displayed when the computer system

101 detected the input to the virtual content 2704*b*); such as shown by the legend 2714*a* of FIG. 27C indicating a value of −20%/s, which is a greater rate of change (e.g., rate of change that is larger in absolute value) than the legend 2714*a* of FIG. 27B, which indicates −15%/s. Also, in FIG. 27C, legend 2714*b* indicates a positive rate of change of 20%/s of the amount of visual impact of the environmental effect 2713 on the appearance of the three-dimensional environment 2702 due to virtual content 2704*b*. In FIG. 27C, the resulting amount of change of the visual impact of the environmental effect 2713 on the appearance of the three-dimensional environment 2702 due to virtual content 2704*a* and virtual content 2704*b* is the same as in FIG. 27B, as illustrated by the legends 2712*a* and 2712*b* in FIGS. 27B and 27C, but the rate of change is different, such as illustrated by the legends 2714*a* and 2714*b* in FIGS. 27B and 27C; although in some embodiments, the resulting amount of change is different, in addition to the difference of the rate of change of the amount of visual impact of the environmental effect 2713 on the appearance of the three-dimensional environment 2702 due to virtual content 2704*a* and/or virtual content 2704*b*. As such, in some embodiments, the computer system 101 detecting input from a hand 2710 or another portion of a user, other than user attention, accelerates a rate at which the computer system 101 changes the visual impact of the environmental effect on the appearance of the three-dimensional environment.

FIG. 27D illustrates the computer system 101 changing the amount of visual impact that the environmental effect 2713 has on the appearance of the three-dimensional environment 2702 in response to detecting gaze directed to the virtual content 2704*b* and a turn of the viewpoint of the user 2701 of FIG. 27A (e.g., an input from a predefined portion of the user different from gaze) away from the normal of the virtual content 2704*a* of FIG. 27A and to the normal of virtual content 2704*b* of FIG. 27A. For example, in FIG. 27D, the user has shifted the user's head and gaze away from the virtual content 2704*a* and to the virtual content 2704*b*. In response, in FIG. 27D, the computer system 101 changes the amount of visual impact that the environmental effect 2713 has on the appearance of the three-dimensional environment 2702 at a greater rate of change compared with the rate of change illustrated in FIG. 27B (which was performed as a result of the computer system detecting user attention shifting from virtual content 2704*a* of FIG. 27A to virtual content 2704*b* of FIG. 27A without detecting the turn of the viewpoint of the user 2701 of FIG. 27A), as shown by the legend 2714*a* of FIG. 27C indicating a greater rate of change (e.g., rate of change that is larger in absolute value) than the legend 2714*a* of FIG. 27B. Also, in FIG. 27D, legend 2714*b* indicates a positive rate of change of 30%/s of the amount of visual impact of the environmental effect 2713 on the appearance of the three-dimensional environment 2702 due to virtual content 2704*b*. Further, in FIG. 27D, the resulting amount of change of the visual impact of the environmental effect 2713 on the appearance of the three-dimensional environment 2702 due to virtual content 2704*a* and virtual content 2704*b* is the same as in FIG. 27C, as illustrated by the legends 2712*a* and 2712*b* in FIGS. 27C and 27D, but the rates of change are different, such as illustrated by the legends 2714*a* and 2714*b* in FIGS. 27C and 27D; although in some embodiments, the resulting amount of change is different, in addition to the difference of the rate of change of the amount of visual impact of the environmental effect 2713 on the appearance of the three-dimensional environment 2702 due to virtual content 2704*a* and/or virtual content 2704*b*. As such, in some embodiments, the computer system 101 detecting input from a portion of the user other than user attention toward different virtual content accelerates a rate at which the computer system 101 changes the visual impact of the environmental effect on the appearance of the three-dimensional environment.

Figure 27E:
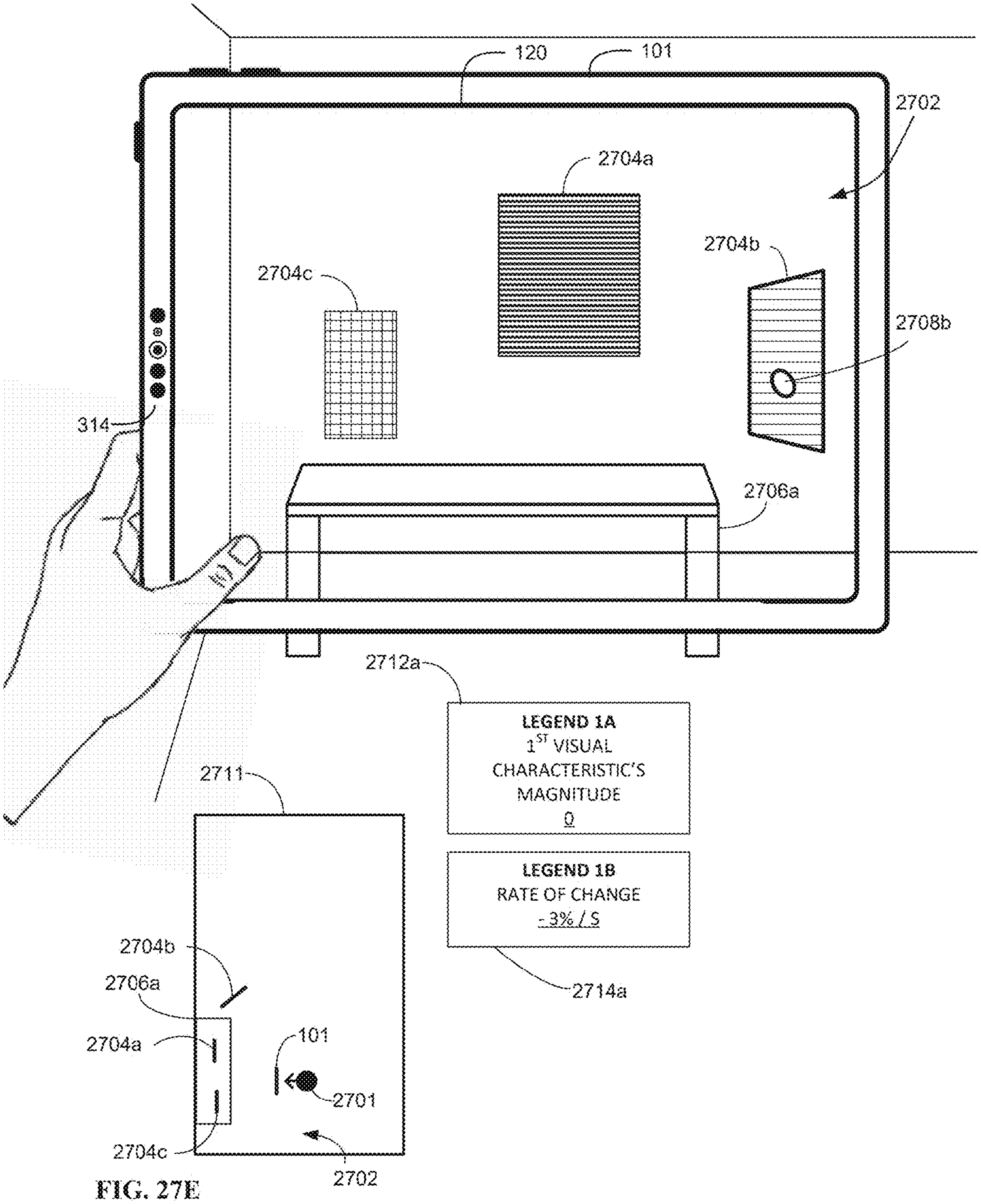
Figure 27F:
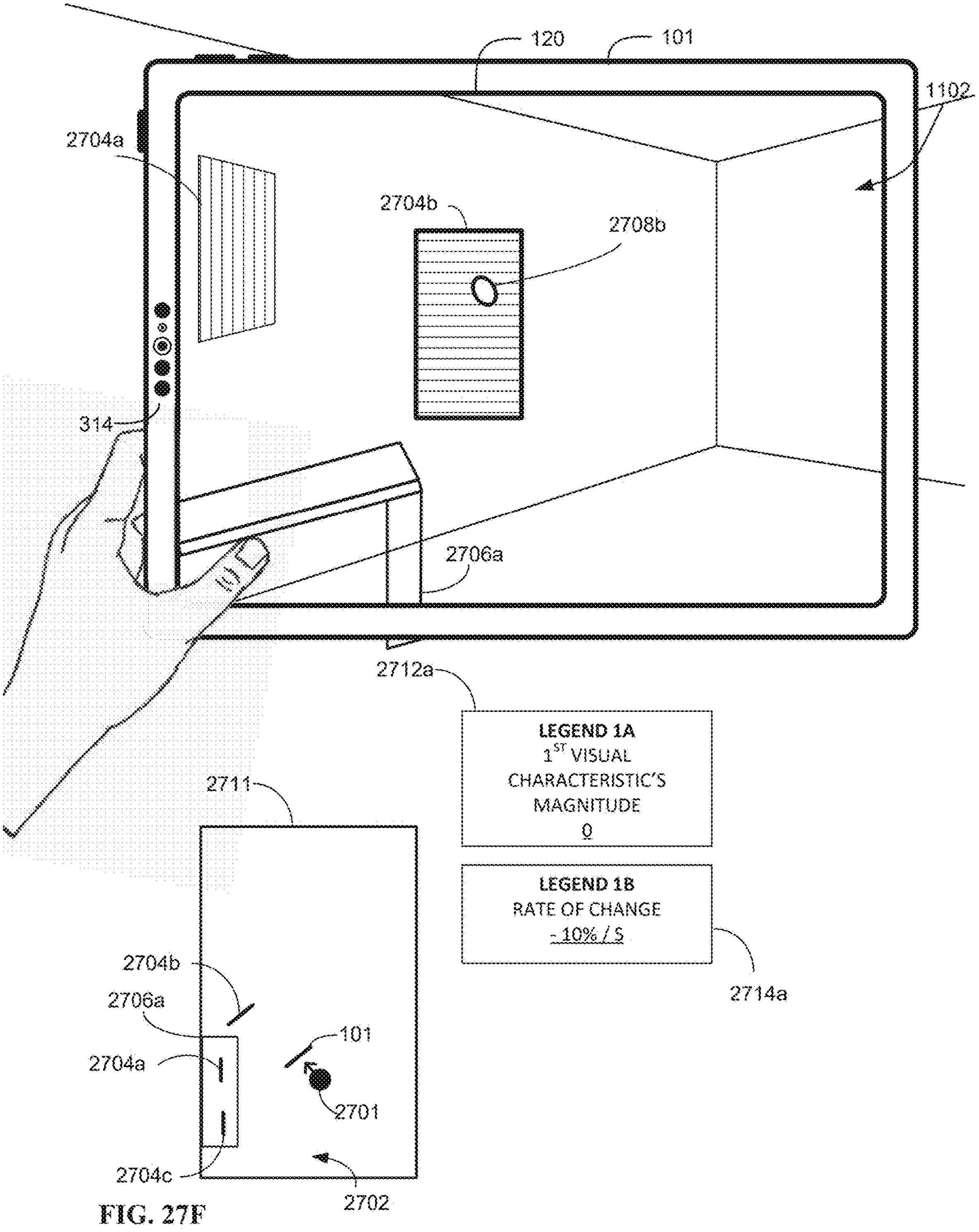

FIGS. 27E and 27F illustrate the computer system 101 changing the amount of visual impact of the environmental effect 2713 on the appearance of the three-dimensional environment 2702 that is due to virtual content 2704*a* in response to detecting user attention shifting from virtual content 2704*a* of FIG. 27A to virtual content 2704*b* of FIG. 27A (e.g., from user attention 2708*a* of FIG. 27A to user attention 2708*b* of FIG. 27E) and/or inputs, different from user attention, directed to virtual content 2704*b*, and in accordance with a determination that the virtual content 2704*b* is not associated with an environmental effect. For example, in FIGS. 27E and 27F, the virtual content 2704*b* is optionally not associated with the environmental effect 2713 of FIGS. 27A-27D (e.g., virtual content 2704*b* does not call for display of an environmental effect when user attention 2708*b* is directed to it), whereas the virtual content 2704*b* of FIGS. 27B-27D is optionally associated with the environmental effect 2713.

FIG. 27E illustrates the computer system 101 changing the amount of visual impact of the environmental effect 2713 on the appearance of the three-dimensional environment 2702 that is due to virtual content 2704*a* in response to detecting user attention shifting from virtual content 2704*a* of FIG. 27A to virtual content 2704*b* of FIG. 27E (e.g., from user attention 2708*a* of FIG. 27A to user attention 2708*b* of FIG. 27E) and in accordance with a determination that the virtual content 2704*b* is not associated with any environmental effect. As shown in the legend 2712*a* in FIG. 27E, which is associated with virtual content 2704*a*, in response to detecting user attention shifting from virtual content 2704*a* of FIG. 27A to virtual content 2704*b* of FIG. 27E, the computer system 101 decreases to a value of 0 the amount of visual impact of the environmental effect 2713 on the appearance of the three-dimensional environment 2702 due to the virtual content 2704*a* compared with the amount in legend 2712*a* of FIG. 27A.

Also, in FIG. 27E, in response to detecting user attention shifting from virtual content 2704*a* of FIG. 27A to virtual content 2704*b* of FIG. 27E and in accordance with the determination that the virtual content 2704*b* is not associated with any environmental effect, the computer system 101 changes the amount of visual impact that the environmental effect 2713 has on the appearance of the three-dimensional environment 2702 at a slower rate of change than the rate of change illustrated in FIG. 27B (which was performed as a result of the computer system 101 detecting user attention shifting from virtual content 2704*a* of FIG. 27A to virtual content 2704*b* of FIG. 27B and in accordance with a determination that the virtual content 2704*b* is associated with an environmental effect), as shown by the legend 2714*a* of FIG. 27E indicating a slower rate of change (e.g., rate of change that is lower in absolute value) than the legend 2714*a* of FIG. 27B. As such, in some embodiments, in response to detecting input directed to specific virtual content that is not associated with any environmental effect or the same environmental effect 2713 that was displayed when the computer system detected that input shifted to the specific virtual content, the computer system 101 changes the visual impact of the environmental effect on the appearance of the three-dimensional environment at a slower rate than if the computer system 101 detected input directed to virtual content that is associated with an environmental effect or the same environmental effect that was displayed when the computer system detected that input shifted to the specific virtual content.

FIG. 27F illustrates the computer system 101 changing the amount of visual impact that the environmental effect 2713 has on the appearance of the three-dimensional environment 2702 in response to detecting user attention shifting to virtual content 2704*b* from virtual content 2704*a* of FIG. 27A and a turn of the viewpoint of the user 2701 of FIG. 27A (e.g., a turn of a portion of the user) away from the normal of the virtual content 2704*a* of FIG. 27A and to the normal of virtual content 2704*b* of FIG. 27F, and in accordance with a determination that the virtual content 2704*b* is not associated with an environmental effect. For example, in FIG. 27F, the user has shifted the user's head and gaze away from the virtual content 2704*a* and to the virtual content 2704*b*. In response, in FIG. 27F, the computer system 101 changes the amount of visual impact that the environmental effect 2713 has on the appearance of the three-dimensional environment 2702 at a greater rate of change compared with the rate of change illustrated in FIG. 27E (which was performed as a result of the computer system 101 detecting user attention shifting from virtual content 2704*a* of FIG. 27A to virtual content 2704*b* of FIG. 27E without detecting the turn of the viewpoint of the user 2701), as shown by the legend 2714*a* of FIG. 27F indicating a value of −10%/s, which is a greater rate of change (e.g., rate of change that is larger in absolute value) than the value of −3%/s indicated by legend 2714*a* of FIG. 27E. Also, in FIG. 27F, the resulting amount of change of the visual impact of the environmental effect 2713 on the appearance of the three-dimensional environment 2702 due to virtual content 2704*a* is the same as in FIG. 27E, as illustrated by the legend 2712*a* in FIGS. 27E and 27F indicating the value of 0, but the rate of change is different, such as illustrated by the legends 2714*a* in FIGS. 27E and 27F; although in some embodiments, the resulting amount of change is different, in addition to the difference of the rate of change of the amount of visual impact of the environmental effect 2713 on the appearance of the three-dimensional environment 2702 due to virtual content 2704*a*. As such, in some embodiments, the computer system 101 detecting input, different from user attention, such as head-turn, toward different virtual content accelerates a rate at which the computer system 101 changes the visual impact of the environmental effect on the appearance of the three-dimensional environment.

Figure 27G:
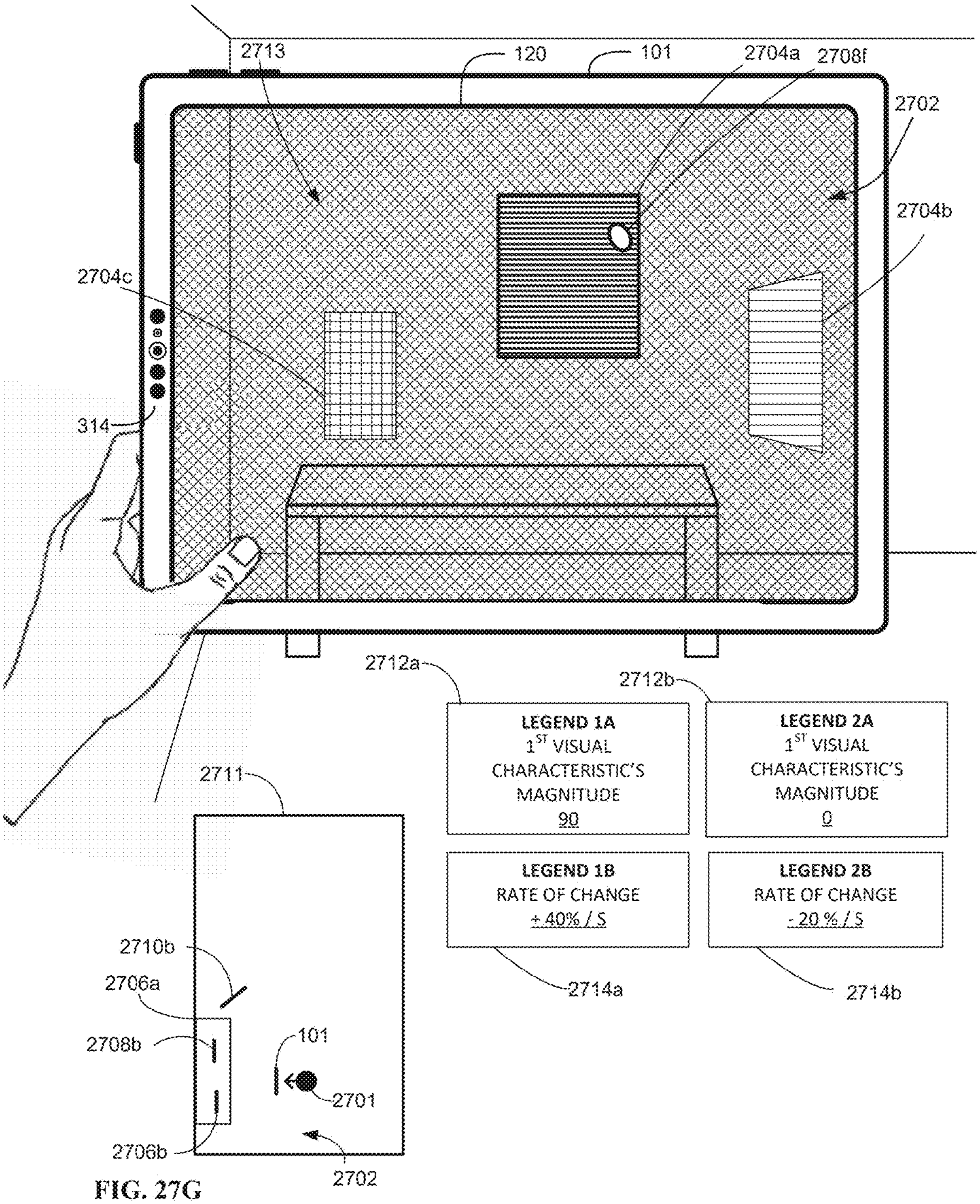

As discussed herein, the computer system 101 optionally gradually changes the amount of visual impact of the environmental effect 2713 on the appearance of the three-dimensional environment 2702, optionally at a user observable rate of change. FIG. 27G illustrates a result of the computer system 101 effectively changing in an opposite direction and/or canceling out at least some or all of the changes incurred via the changes to the magnitude of visual impact of the environmental effect 2713 on the appearance of the three-dimensional environment 2702. For example, in FIG. 27G, the gaze of the user or user attention 2708*f* shifts back to the virtual content 2704*a* after being directed to the virtual content 2704*b* of FIG. 27B and before the computer system displays the environmental effect 2713 at the amounts indicated by legends 2712*a* and 2712*b* in FIG. 27B. In FIG. 27G, in response to detecting user attention 2708*f* returning back to the virtual content 2704*a* and before changing the amount of visual impact of the environmental effect 2713 on the appearance of the three-dimensional environment to the specified amounts in legends 2712*a* and 2712*b* in FIG. 27B, the computer system 101 changes the amount of visual impact of the environmental effect on the appearance of the three-dimensional environment in a direction opposite to the direction of the change that was in progress when the computer system 101 detected user attention returning back to the virtual content 2704*a* from the virtual content 2704*b*. In the illustrated embodiment of FIG. 27G, the computer system performs the changing of the visual impact of the environment effect 2713 on the appearance of the three-dimensional environment 2702 due to virtual content 2704*a* at a rate of positive 40%/s and performs the changing of the visual impact of the environment effect 2713 on the appearance of the three-dimensional environment 2702 due to virtual content 2704*b* at a negative of negative 20%/s. Thus, the computer system 101 optionally reverses at least some of the changes that were in progress or already occurred when the computer system detected user attention returning back to the virtual content 2704*a* from the virtual content 2704*b*.

Figure 27H:
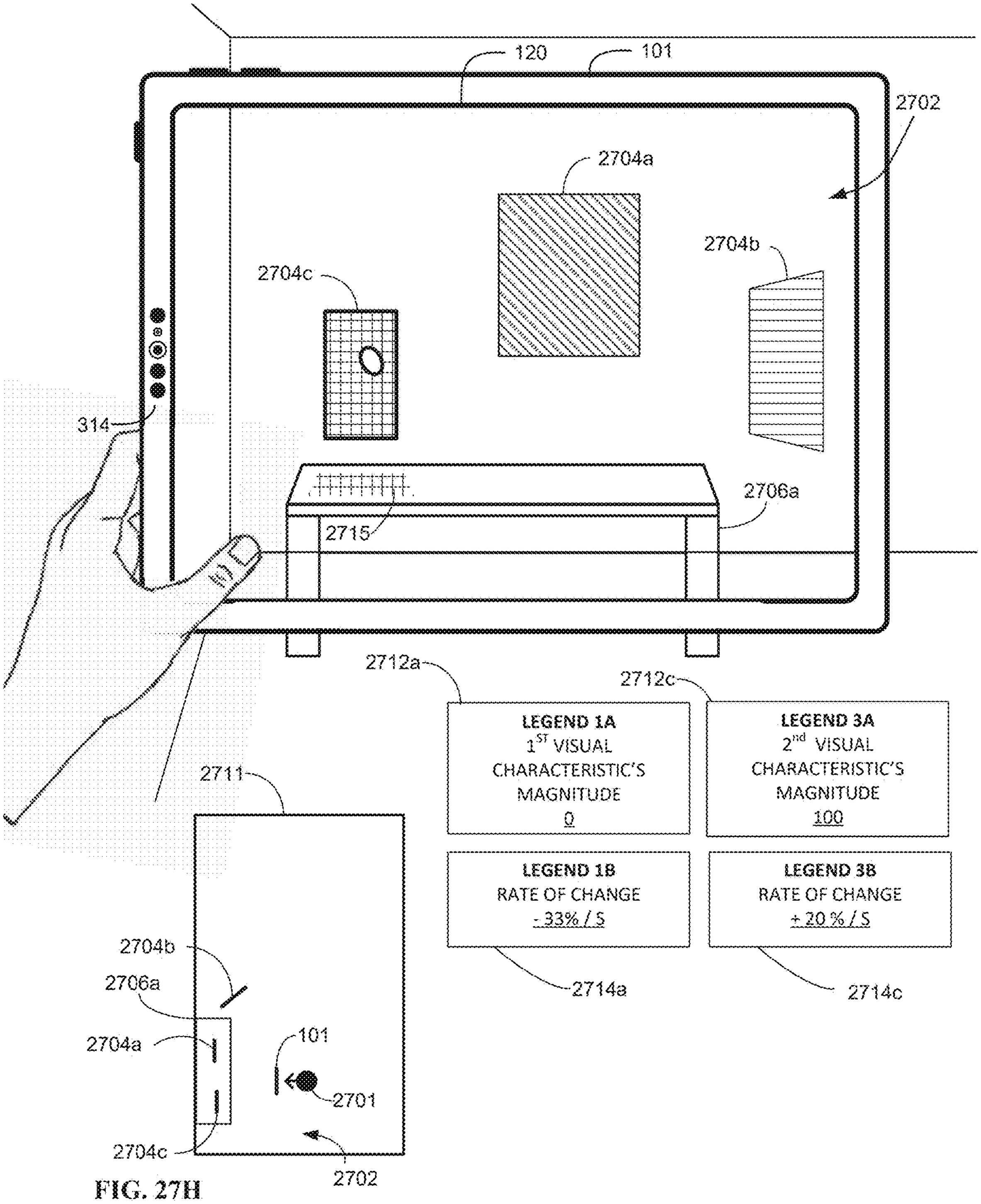

FIG. 27H illustrates the computer system 101 changing the amount of visual impact that the environmental effect 2713 of FIG. 27A has on the appearance of the three-dimensional environment 2702 of FIG. 27A in response to detecting user attention shifting away from virtual content 2704*a* and to virtual content 2704*c* of FIG. 27A and in accordance with a determination that the virtual content 2704*c* is associated with environmental effect 2715 rather than the environmental effect 2713 of FIG. 27A. The environmental effect 2715 of FIG. 27H optionally includes a simulation of the divergence of light of the virtual content 2704*c* outside of the virtual content into other parts of the three-dimensional environment 2702, such that the light of the virtual content 2704*c* pollutes one or more areas beyond the virtual content in the three-dimensional environment 2702, such as with a glare and/or another lighting effect of the light of the virtual content 2704*c* being displayed in the background, such as the environmental effect 2715 being displayed on the physical table 2706 in FIG. 27H.

In FIG. 27H, in response to detecting user attention shifting away from virtual content 2704*a* of FIG. 27A and to virtual content 2704*c* of FIG. 27H and in accordance with a determination that the virtual content 2704*c* is associated with environmental effect 2715 rather than the environmental effect 2713 of FIG. 27A, the computer system 101 changes the amount of visual impact that the environmental effect 2713 has on the appearance of the three-dimensional environment 2702 at a greater rate of change compared with the rate of change illustrated in FIG. 27B (which was performed as a result of the computer system 101 detecting user attention shifting from virtual content 2704*a* of FIG. 27A to virtual content 2704*b* of FIG. 27B and in accordance with the determination the virtual content 2704*b* is associated with the same environmental effect 2713 that was displayed when the computer system detected that input shifted from the virtual content 2704*a* to the virtual content 2704*b*), as shown by the legend 2714*a* of FIG. 27H indicating a greater rate of change (e.g., rate of change that is larger in absolute value) of the environmental effect 2713 than the legend 2714*a* of FIG. 27B. As such, when the virtual content is associated with an environmental effect that is not displayed when the computer system 101 detects input directed to the virtual content, and when the computer system 101 displays a different environmental effect than the environmental effect that was displayed when the computer system 101 detects the input directed to the virtual content, the computer system 101 accelerates the rate of change of visual impact of the different environmental effect. In addition, in FIG. 27H, the computer system 101 increases the amount of visual impact of environmental effect 2715, as shown by the increase shown from the amount of visual impact of the environmental effect 2715 in legend 2712*c* in FIGS. 27A and 27H, at a positive rate of change of 20%/s, as indicated by legend 2714*c* of FIG. 27H.

In some embodiments, virtual content is associated with multiple environmental effects, such as both the environmental effect 2713 of FIG. 27A and the environmental effect 2715 of FIG. 27H, and the computer system 101 concurrently displays the multiple environmental effects and the virtual content while detecting user attention directed to the virtual content. In response to detecting user attention directed to a different element (e.g., different virtual or physical objects), the computer system optionally changes the visual impacts of the multiple environmental effects by similar or different amounts that are respectively in accordance with whether the different element is associated with the respective multiple environmental effects. Therefore, in some embodiments, operations of the method 2800 are performed by the computer system 101 when virtual content is associated with multiple environmental effects.

Figure 27I:
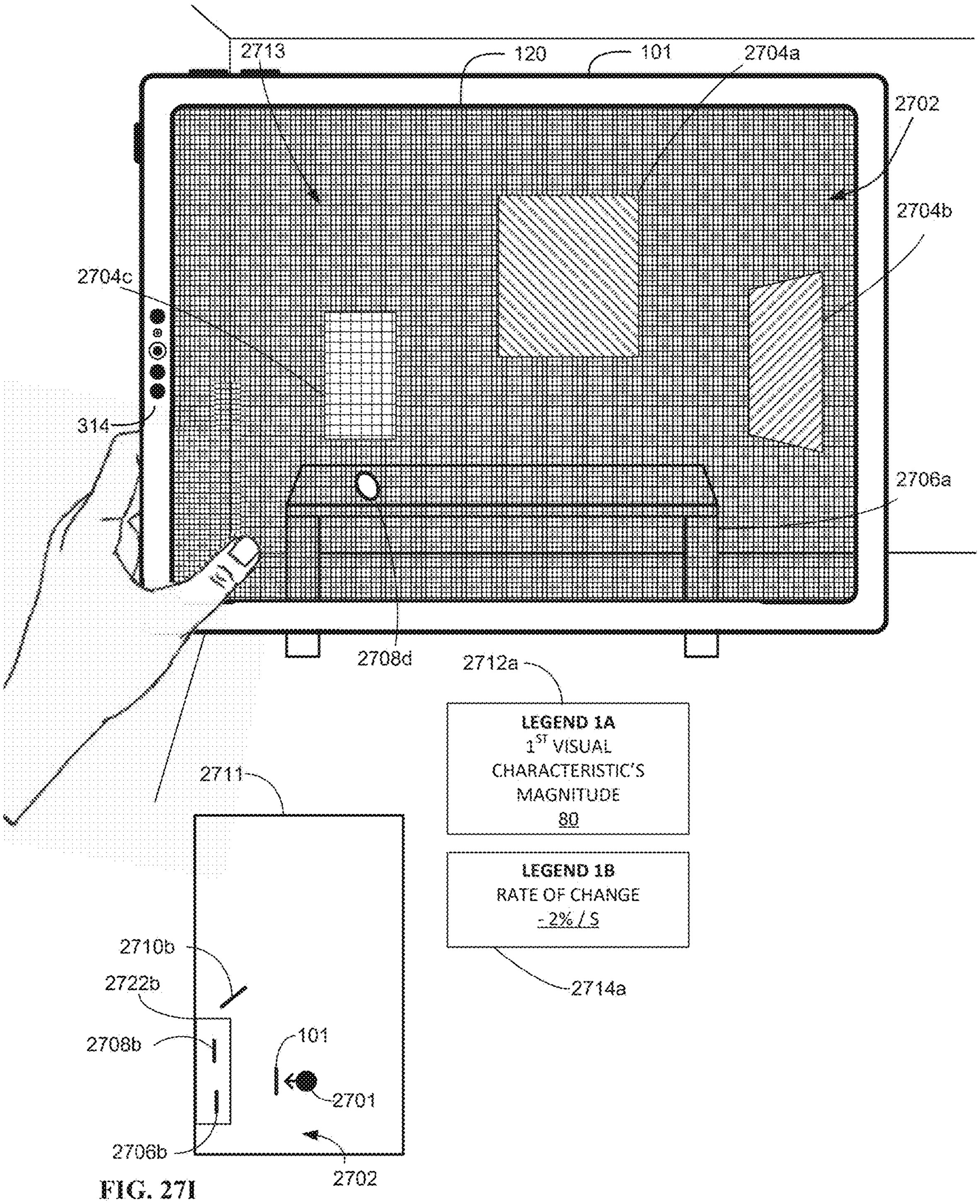

FIG. 27I illustrates the computer system 101 changing the amount of visual impact that the environmental effect 2713 of FIG. 27A has on the appearance of the three-dimensional environment 2702 of FIG. 27A in response to detecting user attention shifting away from virtual content 2704*a* and to physical table 2706*a* of FIG. 27A, which is optionally visible in the three-dimensional environment 2702 via passthrough. In FIG. 27A, the computer system 101 displays the environmental effect 2713 in the same location as the passthrough of the physical table 2706*a*, among other places. In FIG. 27I, the location of user attention 2708*d* is representative of an equidistant location from the virtual content 2704*a* of FIG. 27A as the distance between the location of user attention 2708*b* and the virtual content 2704*a* of FIG. 27B. In response to detecting user attention shifting away from virtual content 2704*a* and to physical table 2706*a* of FIG. 27I, which is optionally visible in the three-dimensional environment via passthrough, the computer system 101 reduces the amount of visual impact of the environmental effect 2713 to an amount, as shown by the legend 2712*a* of FIG. 27H, that is less that the reduction of visual impact of the environmental effect 2713, as shown by the legend 2712*a* of FIG. 27B. As such, in some embodiments, the computer system changes the environmental effect less when detecting user attention shifting to passthrough as compared with virtual content. Additionally, in FIG. 27I, the computer system 101 changes the amount of visual impact that the environmental effect 2713 has on the appearance of the three-dimensional environment 2702 at a slower rate of change compared with the rate of change illustrated in FIG. 27B (which was performed as a result of the computer system 101 detecting user attention shifting from virtual content 2704*a* of FIG. 27A to virtual content 2704*b* of FIG. 27B), as shown by the legend 2714*a* of FIG. 27I indicating negative 2%/s, which is a slower rate of change (e.g., rate of change that is smaller in absolute value) of the environmental effect 2713 than the rate of change indicated by legend 2714*a* of FIG. 27B.

Figure 27J:
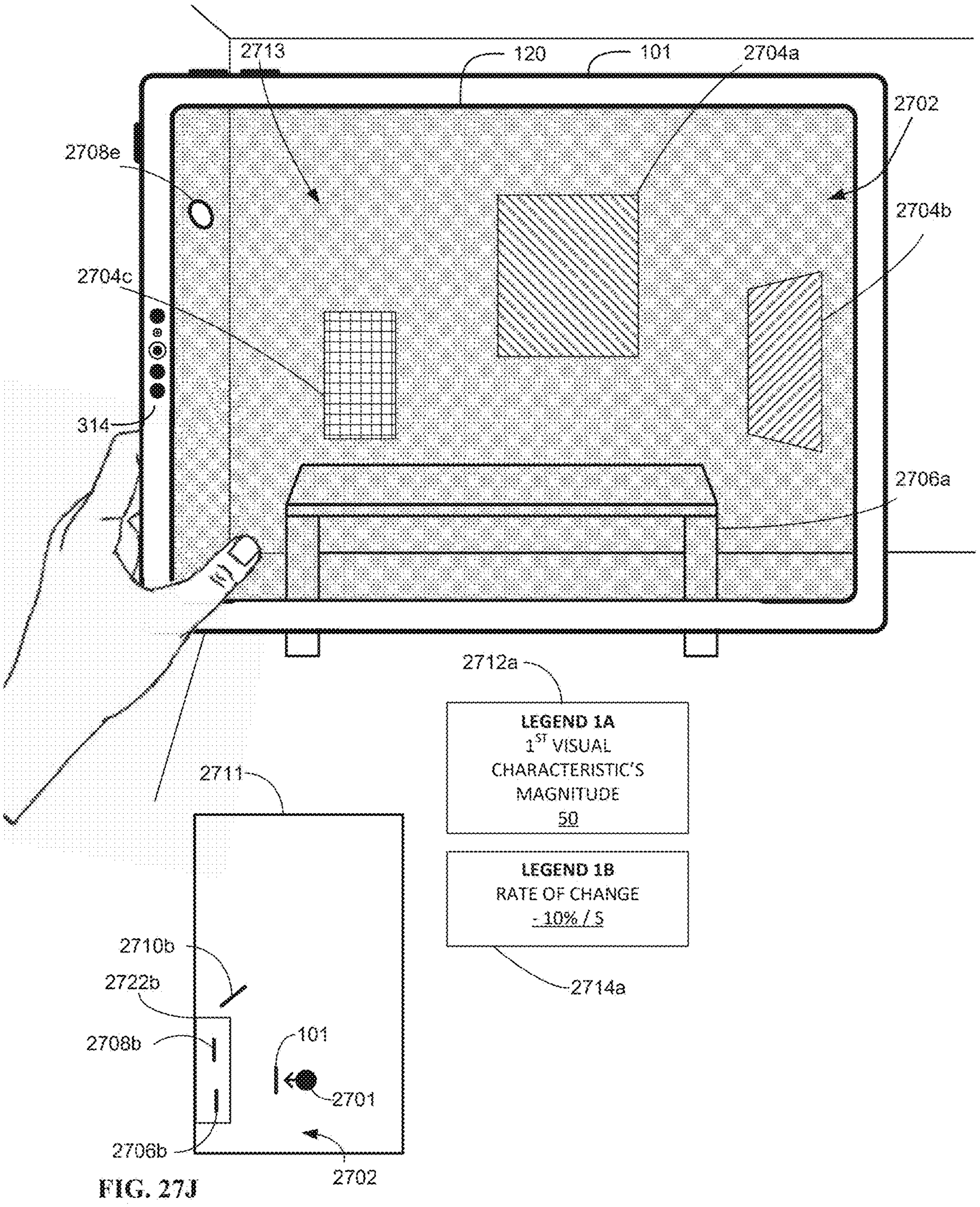
Figure 28A:
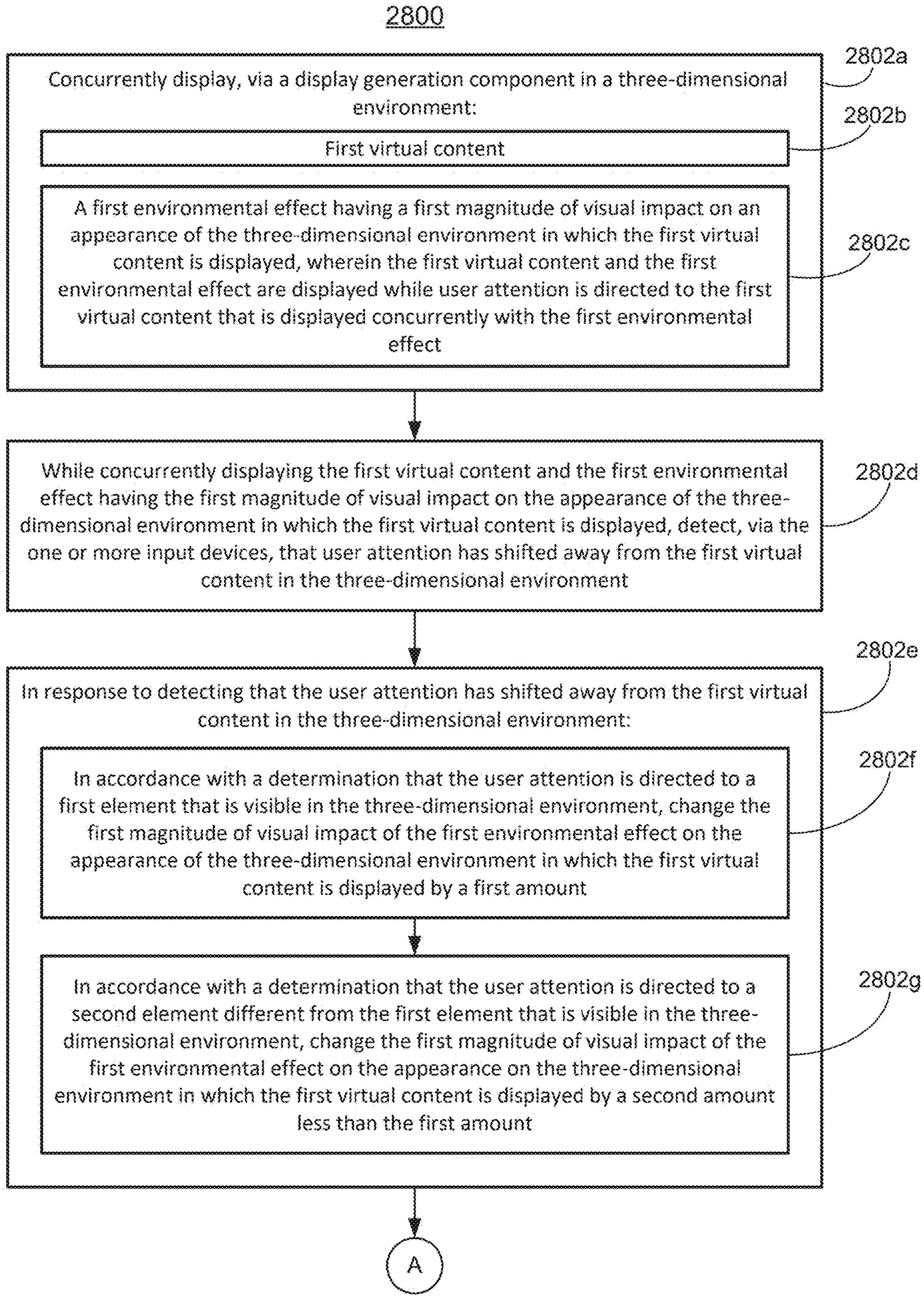
Figure 28B:
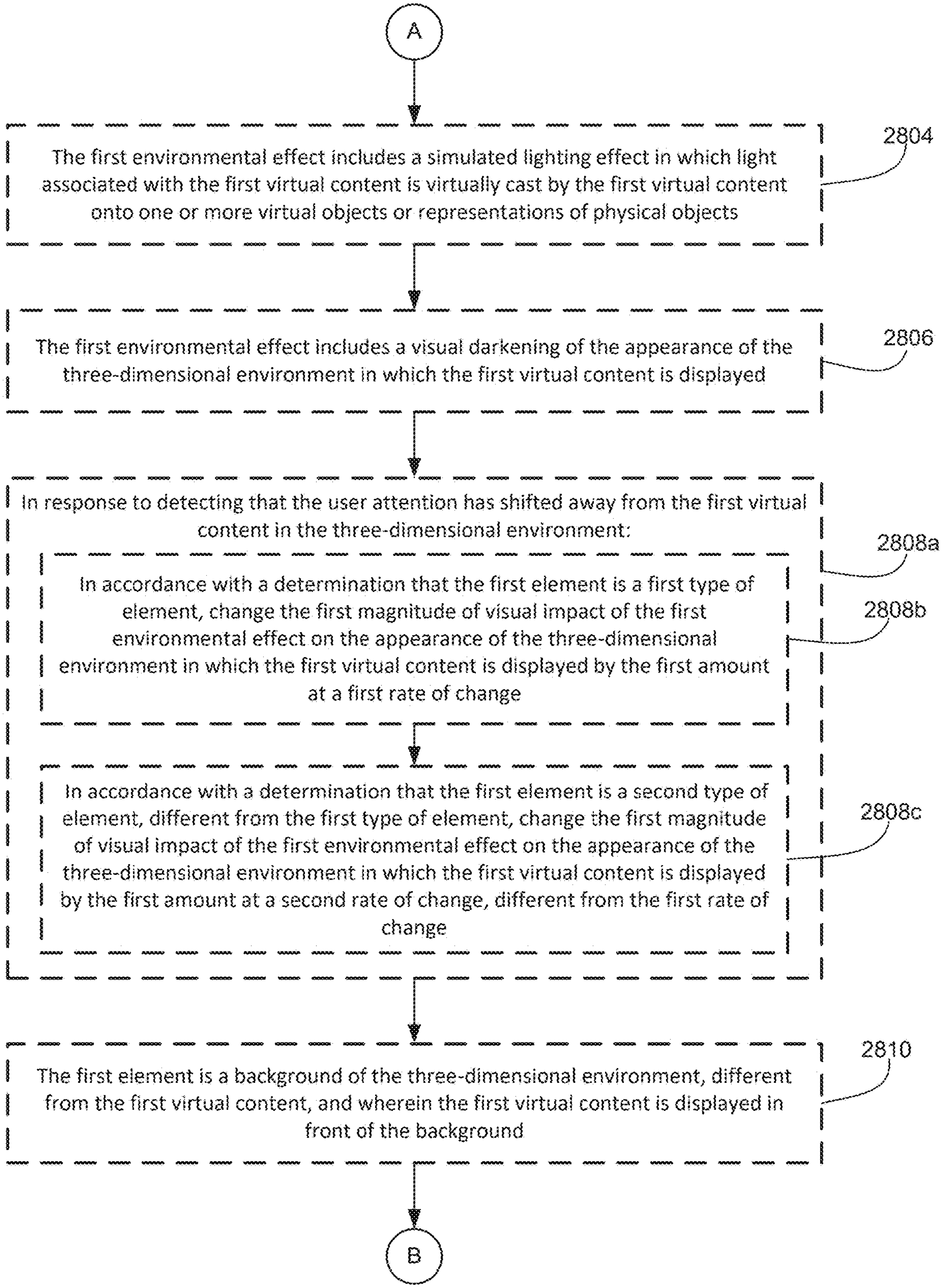
Figure 28C:
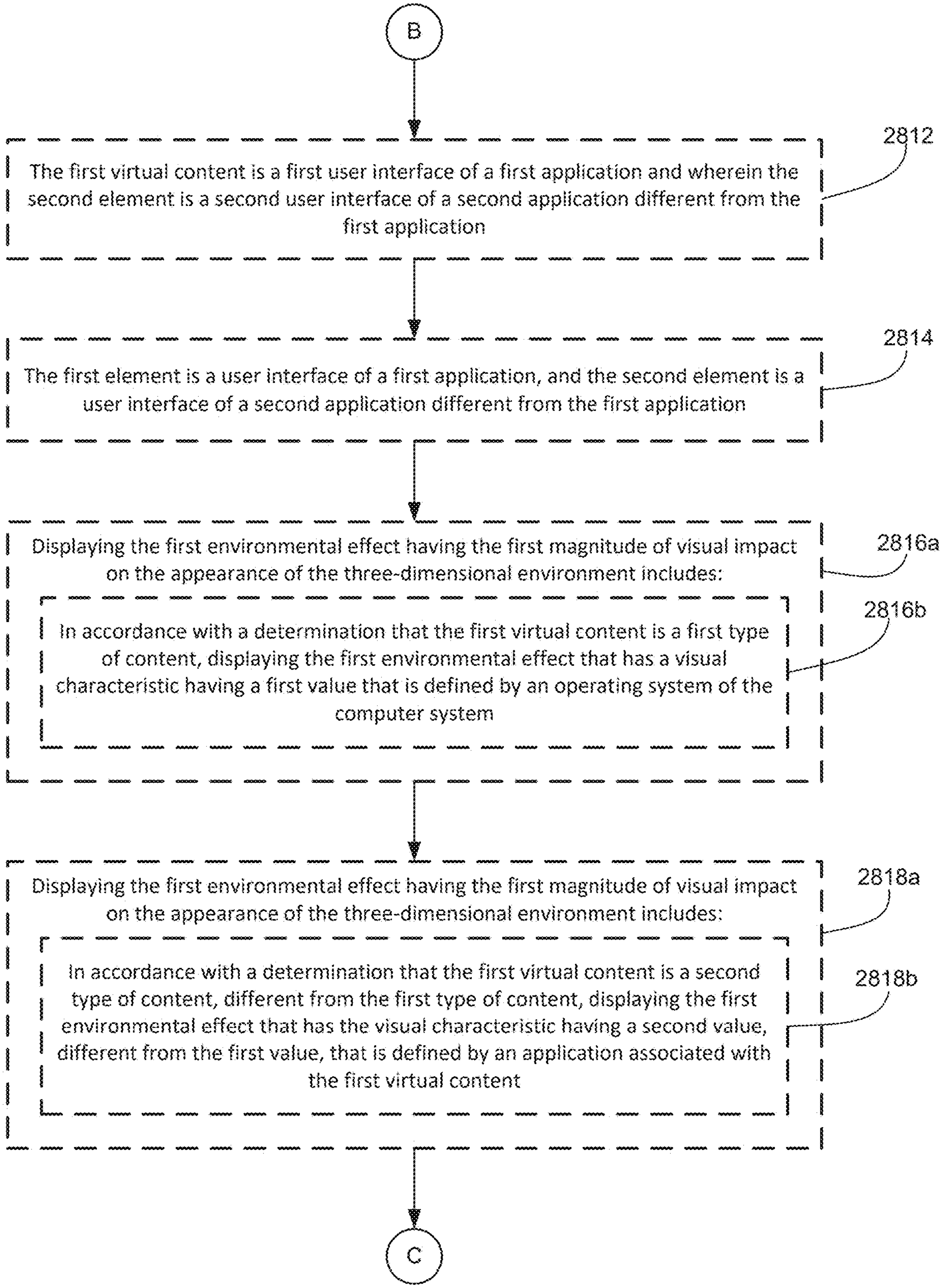
Figure 28D:
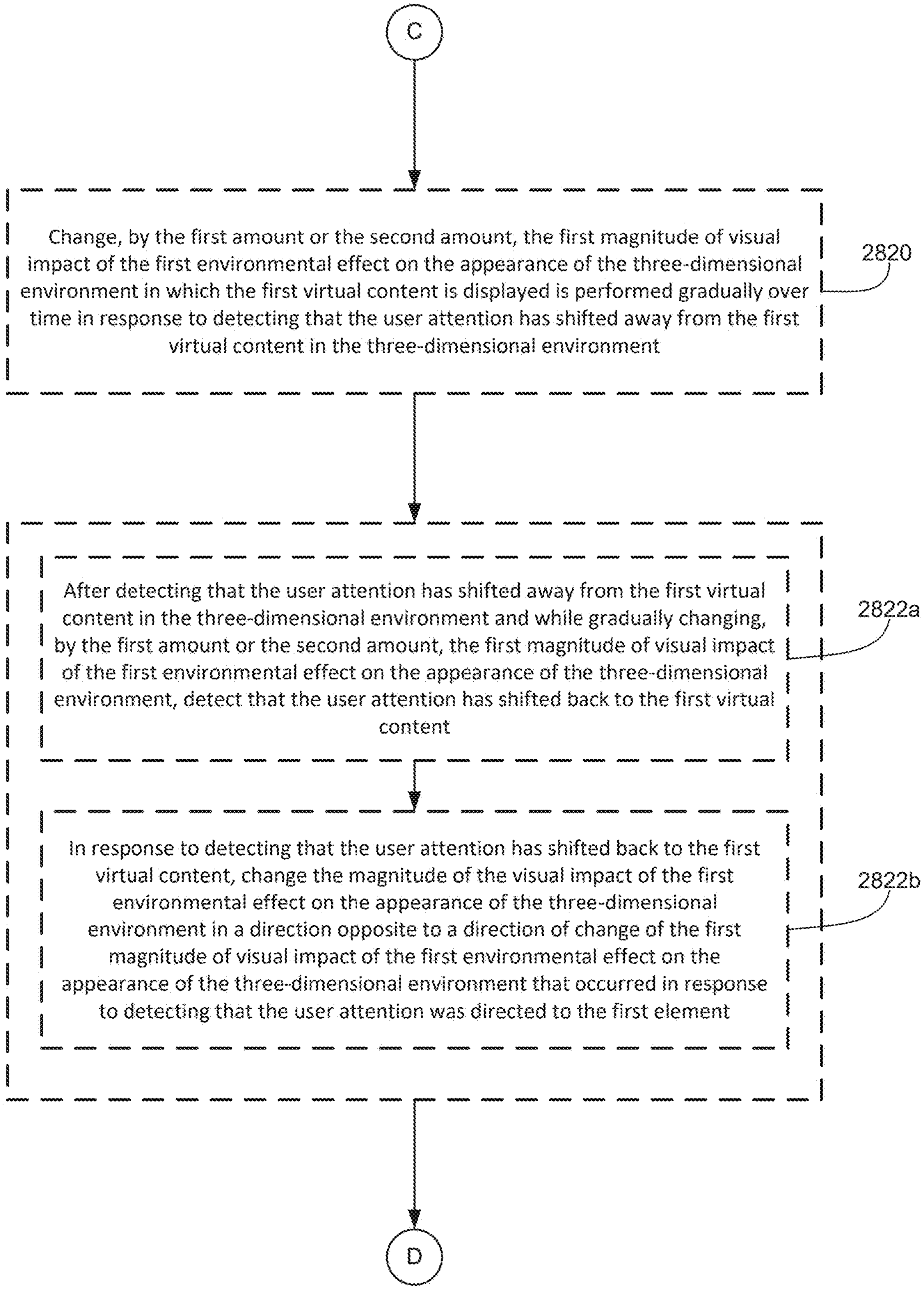
Figure 28H:
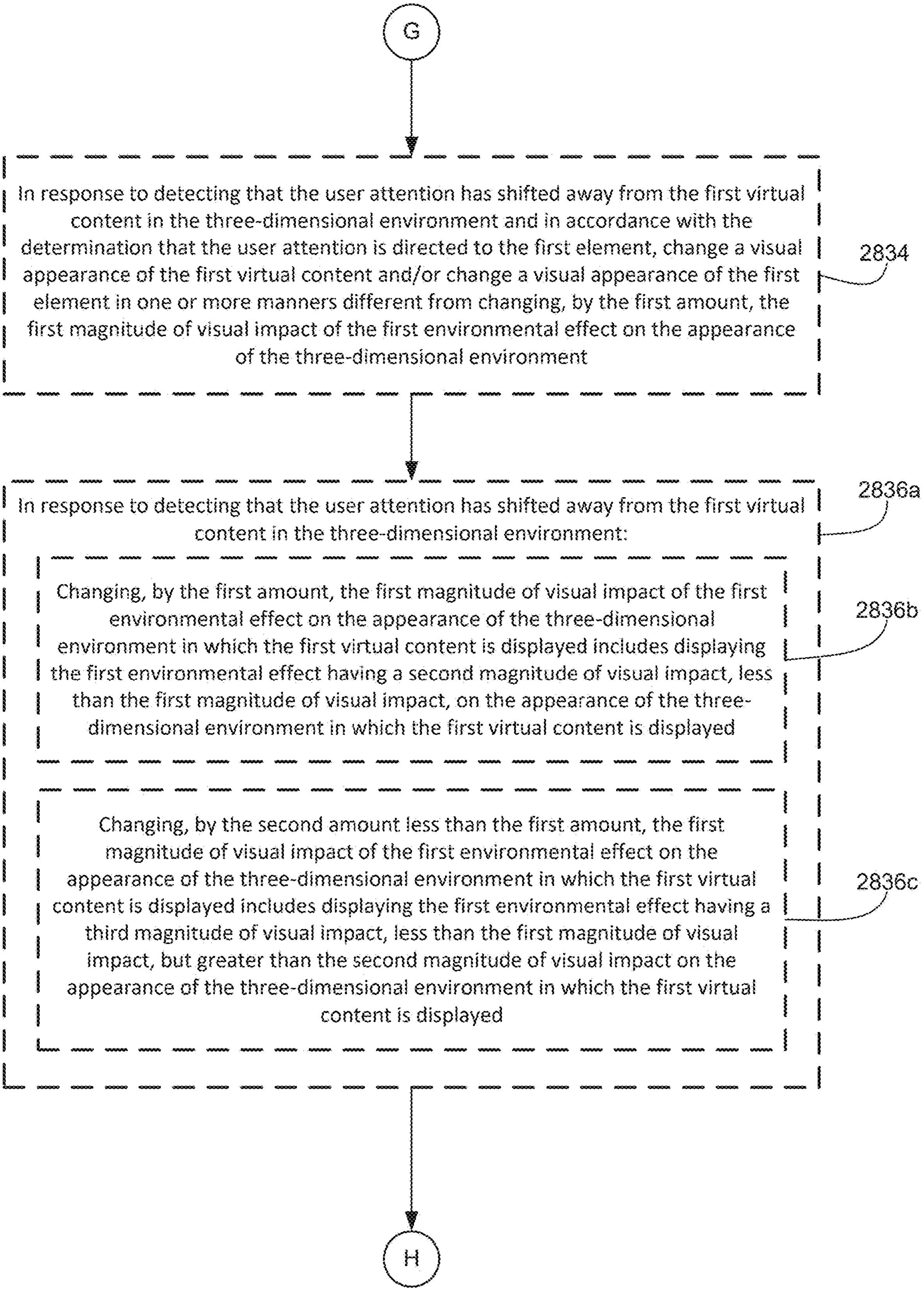
Figure 28I:
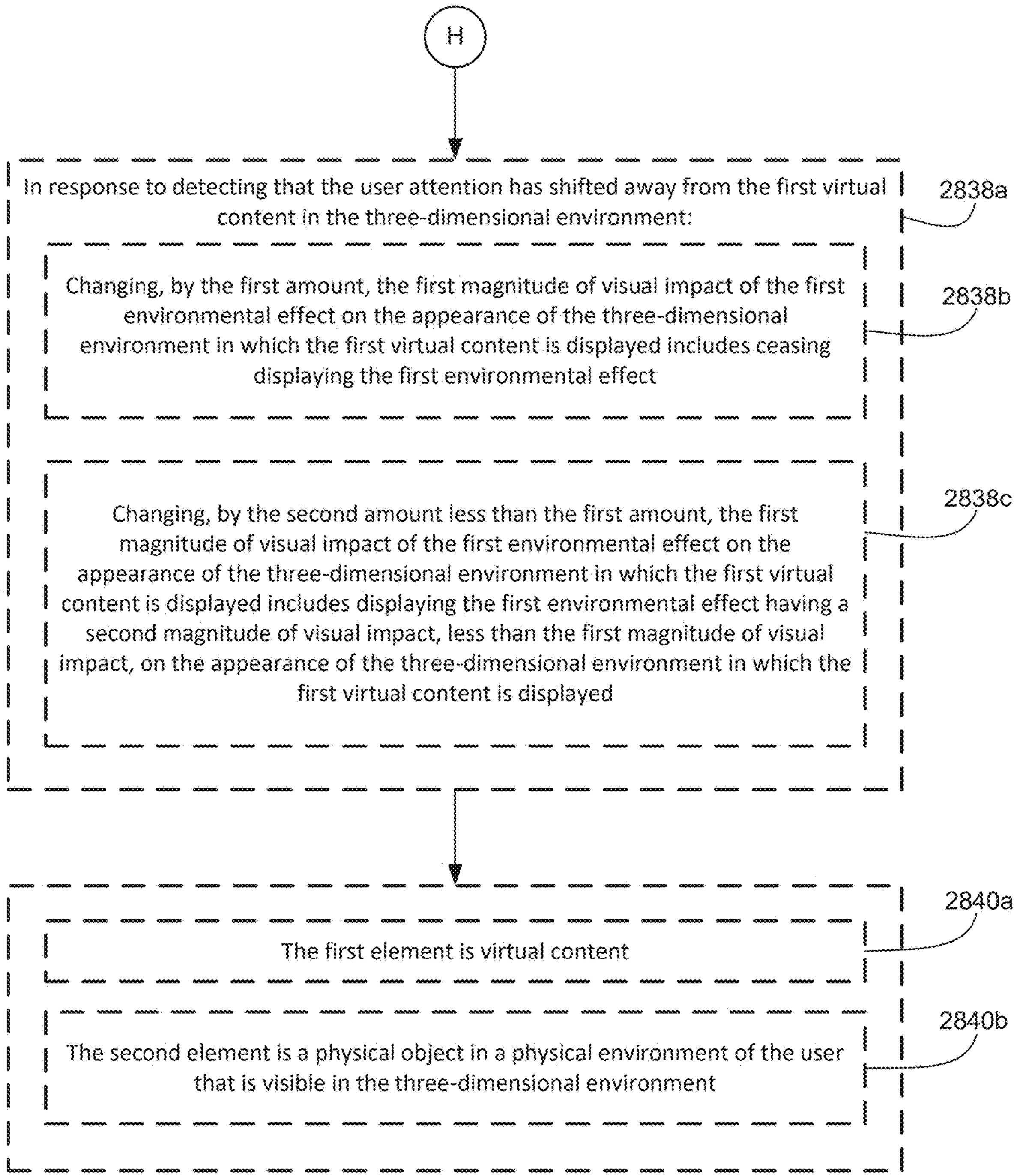

FIG. 27J illustrates the computer system 101 changing the amount of visual impact that the environmental effect 2713 of FIG. 27A has on the appearance of the three-dimensional environment 2702 of FIG. 27A in response to detecting user attention shifting further away from virtual content 2704*a* and to a location including passthrough that is greater in distance from the virtual content 2704*a* than the distance between the user attention 2708*d* and the virtual content 2704*a* in FIG. 27I. In response to detecting user attention shifting further away from virtual content 2704*a* than the user attention 2708*d*, the computer system 101 reduces, at a negative rate of 10%/s, as indicated by the legend 2714*a* of FIG. 27J, the amount of visual impact of the environmental effect 2713 to an amount, as shown by the legend 2712*a* of FIG. 27J, that is greater that the reduction of visual impact of the environmental effect 2713, as shown by the legend 2712*a* of FIG. 27I. As such, in some embodiments, the computer system changes the environmental effect more based on the distance between the user attention and virtual content 2704*a*.

Further details regarding features illustrated in FIGS. 27A-27J, in addition to other features of presently disclosed embodiments, are described with reference to method 2800.

FIGS. 28A-28I is a flowchart illustrating a method 2800 of dynamically displaying environmental effects with different amounts of visual impact on an appearance of a three-dimensional environment in which virtual content is displayed in response to detecting inputs (e.g., user attention) shifting to different elements in the three-dimensional environment in accordance with some embodiments. In some embodiments, the method 2800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2800 is governed by instructions that are stored in a non-transitory computer-readable storage medium and that are executed by one or more processors of a computer system, such as the one or more processors 202 of computer system 101 (e.g., controller 110 in FIG. 1A). Some operations in method 2800 are, optionally, combined and/or the order of some operations is, optionally, changed.

In some embodiments, method 2800 is performed at a computer system in communication with a display generation component and one or more input devices. In some embodiments, the computer system has one or more of the characteristics of the computer systems of methods 800, 1000, 1200, 1400, 1600, 1800, 2000, 2200, 2400, and/or 2600. In some embodiments, the display generation component has one or more of the characteristics of the display generation components of methods 800, 1000, 1200, 1400, 1600, 1800, 2000, 2200, 2400, and/or 2600. In some embodiments, the one or more input devices have one or more of the characteristics of the one or more input devices of methods 800, 1000, 1200, 1400, 1600, 1800, 2000, 2200, 2400, and/or 2600.

In some embodiments, the computer system concurrently displays (2802*a*), via the display generation component in a three-dimensional environment, such as three-dimensional environment 2702 of FIG. 27A, first virtual content (2802*b*), such as virtual content 2704*a* of FIG. 27A, and a first environmental effect having a first magnitude of visual impact on an appearance of the three-dimensional environment in which the first virtual content is displayed, such as environmental effect 2713 of FIG. 27A, wherein the first virtual content and the first environmental effect are displayed while user attention is directed to the first virtual content that is displayed concurrently with the first environmental effect (2802*c*). The first virtual content and/or the first environmental effect are optionally world-locked. The first virtual content optionally is a virtual window or other user interface corresponding to one or more applications presented in a three-dimensional environment, such as a mixed-reality (XR), virtual reality (VR), augmented reality (AR), or real-world environment visible via an optical passthrough (e.g., one or more lenses and/or one or more cameras). In some embodiments, the first virtual content and/or the three-dimensional environment have one or more characteristics of the virtual objects and/or three-dimensional environments described with reference to methods 800, 1000, 1200, 1400, 1600, 1800, 2000, 2200, 2400, and/or 2600. In some embodiments, the first virtual content includes a user interface of an application such as a gaming application, a photo viewer application, media browsing application, an audio or video playback application, a web browsing application, an electronic mail application, and/or a messaging application. In some embodiments, the first environmental effect is a system environmental effect (e.g., an environmental effect controlled by the operating system of the computer system), and the first virtual content requests, with or without current user input, the computer system to display the system environmental effect having the first magnitude of visual impact on the appearance of the three-dimensional environment in which the first virtual content is displayed. The first environmental effect is optionally a visual effect applied in the three-dimensional environment outside of the boundaries (e.g., one, two, or three dimensional boundaries) of first virtual content to increase or decrease distraction from areas of the three-dimensional environment other than the first virtual content (e.g., in one or more portions of the three-dimensional environment different from the first virtual content). In some embodiments, one or more portions of the three-dimensional environment outside of the first virtual content include other virtual content, optionally having one or more characteristics similar to the first virtual content described above but different from the first virtual content, virtual or optical passthrough content and/or objects, and/or include physical object(s) that are visible in the three-dimensional environment. In some embodiments, the first environmental effect is a brightness (or dimness) level, opacity, clarity, blurriness, color saturation, and/or another lighting setting. In some embodiments, the computer system displaying the first environmental effect includes the three-dimensional environment other than the first virtual content having a reduced or minimal brightness level, opacity level, clarity level, color saturation level, and/or lighting level, and/or an increased blurriness level compared to the corresponding visual characteristic of the first virtual content in the three-dimensional environment and/or of the corresponding visual characteristic of the three-dimensional environment other than the first virtual content that is displayed via or visible through the display generation component when the computer system forgoes displaying the environmental effect. The computer system optionally detects, via the one or more input devices, user attention directed to the first virtual content, and in response to the user attention directed to the first virtual content, the computer system initiates a process to display the first environmental effect currently with the first virtual content.

In some embodiments, while concurrently displaying the first virtual content and the first environmental effect having the first magnitude of visual impact on the appearance of the three-dimensional environment in which the first virtual content is displayed (and/or optionally after detecting the user attention directed to the first virtual content), the computer system detects (2802*d*), via the one or more input devices, that user attention has shifted away from the first virtual content in the three-dimensional environment, such as shifting away from user attention 2708*a* of FIG. 27A. In some embodiments, user attention away from the first virtual content is user attention toward a portion of the three-dimensional environment that includes the first environmental effect. In some embodiments, user attention away from the first virtual content includes user attention ceasing from being directed at any of the three-dimensional environment (e.g., a cease of gaze via eyelid closure and a reopening of eyelid away from the first virtual content). In some embodiments, the user attention satisfies one or more criteria, including a criterion that is satisfied when the user attention discussed herein is directed away from the first virtual content of the three-dimensional environment for a threshold amount of time, such as e.g., 0.5 s, 1 s, 5 s, 10 s, or another time threshold.

In some embodiments, in response to detecting that the user attention has shifted away from the first virtual content in the three-dimensional environment (2802*e*) (and optionally toward the portion of the three-dimensional environment that includes the first environmental effect that has the first magnitude of visual impact on the appearance of the three-dimensional environment and optionally in accordance with a determination that the attention satisfies the one or more criteria), in accordance with a determination that the user attention is directed to a first element (e.g., a first physical and/or virtual object) that is visible in the three-dimensional environment, such as user attention 2708*b* directed to virtual content 2704*b* of FIG. 27B, the computer system changes (2802*f*) (e.g., increasing or decreasing) the first magnitude of visual impact of the first environmental effect on the appearance of the three-dimensional environment in which the first virtual content is displayed by a first amount, such as illustrated by the difference in amount shown by legends 2712*a* of FIGS. 27A and 27B. The first element is optionally located at a position in the three-dimensional environment that is different from the first virtual content. The first element is optionally located at and/or visible at a position in the three-dimensional environment that corresponds to a first position of the first environmental effect. In some embodiments, the computer system partially or fully obscures from display via the display generation component in the three-dimensional environment or from visibility through the display generation component in the three-dimensional environment (e.g., displays partially such as with one or more first characteristics or forgoes display) the first element by way of displaying the environmental effect having the first magnitude of visual impact on the appearance of the three-dimensional environment, and in response to detecting user attention is directed to the first element, the computer system partially or fully reduces the obscuring from display via the display generation component in the three-dimensional environment or from visibility through the display generation component in the three-dimensional environment (e.g., displays the one or more first characteristics and additional characteristics or increases a visibility of) the first element by the first amount. In some embodiments, changing the first magnitude of visual impact of the first environmental effect on the appearance of the three-dimensional environment by the first amount includes changing one or more of a brightness, opacity, clarity, blurriness, color saturation, and/or another lighting setting of the appearance of the three-dimensional environment in which the first virtual content is displayed by a first amount. For example, the computer system optionally increases a brightness level and/or reduces a blurriness level of the appearance of the three-dimensional environment in which the first virtual content is displayed, optionally to increase a clarity of display or visibility of the first element. The first amount is optionally represented by a first percentage (0.5, 0.9, 1.2, 5, 8, 15, 30, 45, 60, 100, or another percentage) that is relative to display of the first environmental effect with the first magnitude of visual impact on the appearance of the three-dimensional environment. The first amount is optionally a positive amount or a negative amount.

In some embodiments, in response to detecting that the user attention has shifted away from the first virtual content in the three-dimensional environment (2802*e*) (and optionally toward the portion of the three-dimensional environment that includes the first environmental effect that has the first magnitude of visual impact on the appearance of the three-dimensional environment and optionally in accordance with a determination that the attention satisfies the one or more criteria), in accordance with a determination that the user attention is directed to a second element (e.g., a second physical and/or virtual object, such as described above) different from the first element that is visible in the three-dimensional environment, such as user attention 2708*d* directed to physical table 2706*a* of FIG. 27I, the computer system changes (2802*g*) (e.g., increasing or decreasing) the first magnitude of visual impact of the first environmental effect on the appearance on the three-dimensional environment in which the first virtual content is displayed by a second amount less than the first amount, such as illustrated by the difference in amount as shown by legend 2712*a* in FIGS. 27A and 27I. The second element is optionally located at a position in the three-dimensional environment that is different from the first virtual content. The second element is optionally located at and/or visible at a position in the three-dimensional environment that corresponds to a second position of the first environmental effect. In some embodiments, the computer system partially or fully obscures from display via the display generation component in the three-dimensional environment or from visibility through the display generation component in the three-dimensional environment (e.g., displays partially such as with one or more first characteristics or forgoes display) the second element by way of displaying the first environmental effect having the first magnitude of visual impact on the appearance of the three-dimensional environment, and in response to detecting that the user attention is directed to (e.g., has shifted to) the second element, the computer system partially or fully reduces the obscuring from display via the display generation component in the three-dimensional environment or from visibility through the display generation component in the three-dimensional environment (e.g., displays the one or more first characteristics and additional characteristics or increases a visibility of) the second element by the second amount, which is less than the first amount. In some embodiments, changing the first magnitude of visual impact of the first environmental effect on the appearance of the three-dimensional environment by the second amount includes changing one or more of a brightness, opacity, clarity, blurriness, color saturation, and/or another lighting setting of the appearance of the three-dimensional environment in which the first virtual content is displayed by a second amount. For example, the computer system optionally increases a brightness level and/or reduces a blurriness level of the appearance of the three-dimensional environment in which the first virtual content is displayed, optionally to increase a clarity of display or visibility of the second element. In some embodiments, the computer system controls the magnitude of visual impact of the first environmental effect on the three-dimensional environment in which the first virtual content is displayed concurrently with applying one or more of the visual effects, treatments, and/or changes described with reference to methods 800, 1000, 1200, 1400, 1600, 1800, 2000, 2200, 2400, and/or 2600. The second amount is optionally represented by a second percentage (0.5, 0.9, 1.2, 5, 8, 15, 30, 45, 60, 90, or another percentage) that is relative to display of the first environmental effect with the first magnitude of visual impact on the appearance of the three-dimensional environment. Changing the magnitude of visual impact of an environmental effect on the three-dimensional environment in which the first virtual content is displayed by different amounts in response to detecting user attention directed to different elements corresponds specific environmental effect configurations to specific objects of user attention, increases the computer system's responsiveness to user attention during interaction with the computer system, and reduces involvement of specialized user inputs for controlling the environmental effect differently for different elements.

In some embodiments, the first environmental effect includes a simulated lighting effect in which light associated with the first virtual content is virtually cast by the first virtual content onto one or more virtual objects or representations of physical objects (2804), such as illustrated by the environmental effect 2715 of FIG. 27H. In some embodiments, the lighting effect includes simulating the divergence of light of the first virtual content outside of the first virtual content into other parts of the three-dimensional environment, such that the computer system simulates light of the first virtual content polluting one or more areas beyond the first virtual content in the three-dimensional environment, such as with a glare. Changing the first magnitude of visual impact of a simulated lighting effect that is virtually cast by the first virtual content by different amounts in response to detecting user attention directed to different elements corresponds specific simulated lighting effect configurations to specific elements of user attention, and reduces involvement of user inputs for controlling simulated lighting effects differently for different elements.

In some embodiments, the first environmental effect includes a visual darkening of the appearance of the three-dimensional environment in which the first virtual content is displayed (2806), such as illustrated by the environmental effect 2713 of FIG. 27A, and such as a tinting, shadow, and/or dark hue applied to the three-dimensional environmental other than the first virtual content optionally to increase a visual prominence of the first virtual content relative to other parts of the three-dimensional environment. Changing the first magnitude of visual impact of a visual darkening of the appearance of the three-dimensional environment in which the first virtual content is displayed by different amounts in response to detecting user attention directed to different elements corresponds specific visual darkening configurations to specific elements of user attention, and reduces involvement of user inputs for controlling visual darkening values differently for different elements.

In some embodiments, in response to detecting that the user attention has shifted away from the first virtual content in the three-dimensional environment (2808*a*), in accordance with a determination that the first element is a first type of element, the computer system changes (2808*b*) the first magnitude of visual impact of the first environmental effect on the appearance of the three-dimensional environment in which the first virtual content is displayed by the first amount at a first rate of change, such as shown by legend 2714*a* of FIG. 27B. In some embodiments, the first type of element is a physical or virtual object of a first type. The first type of element optionally has an association with an operating system of the computer system, such as a default application included with the current install of the operating system of the computer system (e.g., without manual installation specifically installing the default application). Changing the first magnitude of the visual impact of the environmental effect on the appearance of the three-dimensional environment by the first amount optionally includes changing the first magnitude of the visual impact of the environmental effect on the appearance of the three-dimensional environment by a first percentage, such as by 20% below the first magnitude of the visual impact of the first environmental effect on the appearance of the three-dimensional environment (or another percentage relative to the first magnitude of the visual impact of the first environmental effect on the appearance of the three-dimensional environment). In this example, reducing by 20% the first magnitude of the visual impact of the first environmental effect on the appearance of the three-dimensional environment is optionally performed at a first rate of change, such as at 0.5%/s, 1%/s, 2%/s, 6%/s, 10%/s, 19%/s, 27%/s, 30%/s, 50%/s, 60%/s, 70%/s, or another percentage over a unit of time, until the computer system displays the first environmental effect having a magnitude of the visual impact of the environmental effect on the appearance three-dimensional environment that is 20% below the first magnitude.

In some embodiments, in response to detecting that the user attention has shifted away from the first virtual content in the three-dimensional environment (2808*a*), in accordance with a determination that the first element is a second type of element, different from the first type of element, the computer system changes (2808*c*) the first magnitude of visual impact of the first environmental effect on the appearance of the three-dimensional environment in which the first virtual content is displayed by the first amount at a second rate of change, different from the first rate of change, such as shown by the legend 2714*a* of FIG. 27H. In some embodiments, the second type of element is a physical or virtual object of a second type. The second type of element optionally does not include association with an operating system of the computer system, but rather, is optionally associated with content or an application downloaded or installed by user selection or preference. For example, changing the first magnitude of the visual impact of the environmental effect on the appearance three-dimensional environment by the first amount optionally includes changing the first magnitude of the visual impact of the environmental effect on the appearance of the three-dimensional environment by a first percentage, such as by 20% below the first magnitude of the visual impact of the first environmental effect on the appearance of the three-dimensional environment (or another percentage relative to the first magnitude of the visual impact of the first environmental effect on the appearance of the three-dimensional environment). In this example, reducing by 20% the first magnitude of the visual impact of the first environmental effect on the appearance of the three-dimensional environment is optionally performed at a second rate of change, such as at 0.5%/s, 1%/s, 2%/s, 6%/s, 10%/s, 19%/s, 27%/s, 30%/s, 50%/s, 60%/s, 70%/s, or another percentage over a unit of time, that is difference from the first rate of change, until the computer system displays the first environmental effect having a magnitude of the visual impact of the environmental effect on the appearance three-dimensional environment that is 20% below the first magnitude. In some embodiments, step(s) 2808 additionally or alternatively includes: in response to detecting that the user attention has shifted away from the first virtual content in the three-dimensional environment, in accordance with a determination that the second element is the first type of element, changing the first magnitude of visual impact of the first environmental effect on the appearance of the three-dimensional environment in which the first virtual content is displayed by the second amount at a third rate of change, and in accordance with a determination that the second element is the second type of element, different from the first type of element, changing the first magnitude of visual impact of the first environmental effect on the appearance of the three-dimensional environment in which the first virtual content is displayed by the second amount at a fourth rate of change, different from the third rate of change. Changing the magnitude of visual impact of an environmental effect on the three-dimensional environment in which the first virtual content is displayed at different rates for different types of elements in response to detecting user attention directed to different elements corresponds specific rates of change to specific elements of user attention and reduces involvement of user inputs for controlling the rates of change of the magnitude of the visual impact of the environmental effect on the three-dimensional environment differently for different elements.

In some embodiments, the first element is a background of the three-dimensional environment, different from the first virtual content, and the first virtual content is displayed in front of the background (2810), such as shown by the left wall to which user attention 2708*f* of FIG. 27J is directed. The background is optionally physical passthrough (e.g., the physical environment of the user) and/or a virtual environment background. The background is optionally a physical object in a physical environment of the user that is visible in the three-dimensional environment, or is virtual content that the computer system displays. Changing the magnitude of visual impact of the first environmental effect on the three-dimensional environment in response to detecting user attention directed to a background of the three-dimensional environment corresponds a specific environmental effect to the background, reduces involvement of specialized user inputs for controlling the environmental effect differently for when user attention is directed to the background, and reduces distraction which optimally results in reduction of error in interaction with the computer system when user attention is directed to the background.

In some embodiments, the first virtual content is (optionally displayed in) a first user interface of a first application and the second element is a second user interface of a second application different from the first application (2812), such as shown by virtual content 2704*a* and 2704*b* of FIG. 27A. In some embodiments, while the user attention is directed to the first virtual content, the computer system concurrently displays the first virtual content, the first environmental effect, and at least an outline of the second element. For example, the computer system optionally displays at least the outline of the second user interface of the second application while concurrently displaying the first virtual content and the environmental effect, as described with reference to step(s) 2802. In some embodiments, while the user attention is directed to the first virtual content, the computer system optionally concurrently displays the first virtual content, the environmental effect, and at least an outline of the second element, optionally with the background discussed with reference to step(s) 2810. As such, the computer system optionally detects the type of element to which the user attention is directed, and performs step(s) 2802 directed to changing the magnitude of visual impact of the first environmental effect on the three-dimensional environment based on such detection. Changing the magnitude of visual impact of the first environmental effect on the three-dimensional environment in response to detecting user attention directed to a background of the three-dimensional environment or to a user interface of an application that is different from the first virtual content corresponds a specific environmental effect to the background and to the user interface of the application, reduces involvement of specialized user inputs for controlling the environmental effect differently for when user attention is directed to the background or to the user interface of the application, and reduces distraction which optimally results in reduction of error in interaction with the computer system when user attention is directed to the background or to the user interface of the application.

In some embodiments, the first element is a user interface of a first application, and the second element is a user interface of a second application different from the first application (2814), such as shown by virtual content 2704*b* and 2704*c* of FIG. 27A. In some embodiments, while the user attention is directed to the first virtual content and in accordance with a determination that one or more criteria are satisfied, the computer system concurrently displays the first virtual content, the environmental effect, at least the outline of the first element, and/or at least the outline of the second element. For example, the computer system optionally displays at least the outline of the first and second user interfaces while concurrently displaying the first virtual content and the environmental effect, as described with reference to step(s) 2802. The one or more criteria optionally include a first criterion that is satisfied when the first element is within a field-of-view of the user while user attention is directed to the first virtual content. In some embodiments, while the user attention is directed to the first virtual content and in accordance with a determination that at least the first criteria are satisfied, the computer system concurrently displays the first virtual content, the environmental effect, and at least the outline of the first element. Further, the one or more criteria optionally include a second criterion that is satisfied when the second element is within a field-of-view of the user while user attention is directed to the first virtual content. In some embodiments, while the user attention is directed to the first virtual content and in accordance with a determination that at least the second criteria is satisfied, the computer system concurrently displays the first virtual content, the environmental effect, and at least the outline of the second element. As such, the computer system optionally detects the type of application to which the user attention is directed, and performs step(s) 2802 directed to changing the magnitude of visual impact of the first environmental effect on the three-dimensional environment based on such detection. Changing the magnitude of visual impact of the first environmental effect on the three-dimensional environment by different amounts in response to detecting user attention directed to different applications corresponds specific environmental effect configurations to specific applications, reduces involvement of specialized user inputs for controlling the environmental effect differently for different applications, and reduces distraction which optimally results in reduction of error in interaction with the computer system when user attention is directed to a specific user interface of a specific application.

In some embodiments, displaying the first environmental effect having the first magnitude of visual impact on the appearance of the three-dimensional environment includes (2816*a*) in accordance with a determination that the first virtual content is a first type of content, displaying the first environmental effect that has a visual characteristic (e.g., contrast, brightness, visual emphasis level, saturation, opacity, or another visual characteristic) having a first value (e.g., a first amount of contrast, a first amount of brightness, a first amount of visual emphasis relative to other parts of the three-dimensional environment, a first amount of saturation, or a first amount of opacity) that is defined by an operating system of the computer system (2816*b*) (e.g., as opposed to being defined by the application that is displaying the content). For example, in accordance with a determination that the virtual content 2704*a* of FIG. 27A is of the first type of content, the computer system 101 displays the environmental effect 2713 at the amount shown by legend 2712*a* in FIG. 27A. For example, when the first virtual content is video content (e.g., displayed by a video playback application), and user attention is directed to the video content, the computer system optionally displays the first environmental effect having the visual characteristic having the first respective value, optionally without regard to the application (e.g., TV application, Internet application, photo application, music application, or another application) that hosts the user interface containing the video content. For example, the computer system displays the first environmental effect having the visual characteristic having the first value when a first user interface of a first application includes the first type of content, and the computer system displays the first environmental effect having the visual characteristic having the first value when a second user interface of a second application includes the first type of content. Other examples of the first type of content optionally includes textual content, audio content, background content, or another type of content. Displaying the first environmental effect with a visual characteristic having the first value defined by an operating system of the computer system while user attention is directed to the first virtual content provides consistency in appearance of visual effects across different items of content of a particular type, thereby reducing likelihood of errors in interaction.

In some embodiments, displaying the first environmental effect having the first magnitude of visual impact on the appearance of the three-dimensional environment includes (2818*a*) in accordance with a determination that the first virtual content is a second type of content, different from the first type of content, displaying the first environmental effect that has the visual characteristic having a second value (e.g., a second amount of contrast, a second amount of brightness, a second amount of visual emphasis relative to other parts of the three-dimensional environment, a second amount of saturation, or a second amount of opacity), different from the first value, that is defined by an application associated with the first virtual content (2818*b*) (e.g., as opposed to being defined by the operating system of the computer system). For example, in accordance with a determination that the virtual content 2704*a* of FIG. 27A is of the second type of content, the computer system 101 displays the environmental effect 2713 at the amount shown by legend 2712*a* in FIG. 27B. For example, when the first virtual content is different from video content, and user attention is directed to the first virtual content, the computer system optionally displays the first environmental effect having the visual characteristic having the second value, optionally in accordance with settings associated with the application (e.g., Internet application, photo viewer application, messaging application, presentation application, or another application) that hosts the second type of content. For example, the computer system displays the first environmental effect having the visual characteristic having the second value when a first user interface of a first application includes the second type of content, and the computer system displays the first environmental effect having the visual characteristic having the second value when a second user interface of a second application includes the second type of content Other examples of the second type of content optionally includes health-related content, message effects of a messaging application, a presenter view and/or an audience view, other textual content, audio content, background content, or another type of content, different from the first type of content. Displaying the first environmental effect with a visual characteristic having the second value defined by an application associated with the first virtual content while user attention is directed to the first virtual content provides flexibility/customizability for different applications to provide different environmental effect appearances.

In some embodiments, changing, by the first amount or the second amount, the first magnitude of visual impact of the first environmental effect on the appearance of the three-dimensional environment in which the first virtual content is displayed is performed gradually over time (e.g., over 0.5, 1, 2, 3, 5, 10, 20 or 30 seconds, or another time period) in response to detecting that the user attention has shifted away from the first virtual content in the three-dimensional environment (2820), such as shown by legend 2714*b* of FIG. 27B. The computer system optionally reduces discomfort experienced by a user of the computer system by way of gradually changing the first magnitude of visual impact of the first environmental effect. Gradually changing the magnitude of visual impact of an environmental effect on the three-dimensional environment in response to detecting that the user attention has shifted away from the first virtual content in the three-dimensional environment increases user safety during interaction with the computer system and provides feedback about the change in display that provides time for subsequent user input to counter the change if desired.

In some embodiments, after detecting that the user attention has shifted away from the first virtual content in the three-dimensional environment and while gradually changing, by the first amount or the second amount, the first magnitude of visual impact of the first environmental effect on the appearance of the three-dimensional environment (and before reaching the first amount or the second amount of change to the first magnitude of visual impact of the first environmental effect on the appearance of the three-dimensional environment), the computer system detects (2822*a*) that the user attention has shifted back to the first virtual content, such as shown by user attention 2708*f* of FIG. 27G.

In some embodiments, in response to detecting that the user attention has shifted back to the first virtual content, the computer system changes (2822*b*) the magnitude of the visual impact of the first environmental effect on the appearance of the three-dimensional environment in a direction opposite to a direction of change of the first magnitude of visual impact of the first environmental effect on the appearance of the three-dimensional environment that occurred in response to detecting that the user attention was directed to the first element, such as shown by the legends 2714*a* and 2714*b* of FIG. 27G indicating rates of change that are opposite the direction indicated by the legends 2714*a* and 2714*b* of FIG. 27B, respectively. If user attention returns to the first virtual content before the computer system performs the changing, by the first amount or the second amount, the first magnitude of visual impact of the first environmental effect on the appearance of the three-dimensional environment, the computer system optionally at least partially effectively cancels out or reverses at least some changes to the magnitude of the visual impact of the first environmental effect on the appearance of the three-dimensional environment. As such, in response to detecting that the user attention has shifted back to the first virtual content, the computer system concurrently displays the first virtual content and the first environmental effect having a second magnitude of visual impact on the appearance of the three-dimensional environment different from the first magnitude of visual impact on the appearance of the three-dimensional environment. The second magnitude of visual impact of the first environmental effect on the appearance of the three-dimensional environment is optionally less than, equal to or greater than the first magnitude of visual impact (e.g., 0.3%, 1%, 2%, 6%, 10%, 19%, 27%, 30%, 50%, 60%, 70%, 90%, or another percentage less than, equal to or greater than the first magnitude of visual impact of the first environmental effect on the appearance of the three-dimensional environment). At least partially undoing at least some changes to the first magnitude of the visual impact of the first environmental effect on the appearance of the three-dimensional environment that were performed increases the computer system's responsiveness to user attention during interaction with the computer system, and reduces involvement of specialized user inputs for controlling the environmental effect differently as the object of user attention changes.

In some embodiments, changing, by the first amount or the second amount, the first magnitude of visual impact of the first environmental effect on the appearance of the three-dimensional environment includes reducing, at a first rate of change, the first magnitude of visual impact of the first environmental effect on the appearance of the three-dimensional environment by the first amount or the second amount (2824*a*), such as shown by legend 2714*a* of FIG. 27B, such as described with reference to step(s) 2808. In some embodiments, after detecting that the user attention has shifted away from the first virtual content in the three-dimensional environment, after detecting that the user attention has shifted to the first element or the second element, after performing at least some of the changing, by the first amount or the second amount, of the first magnitude of visual impact of the first environmental effect on the appearance of the three-dimensional environment in which the first virtual content is displayed (2824*b*), and in response to detecting that the user attention has shifted to the first virtual content or to a third element that is either the first element or the second element or is different from both the first element and the second element, the computer system changes (2824*c*), by a third amount that is either the first amount or the second amount or is different from both the first amount and the second amount, a magnitude of visual impact of the first environmental effect on the appearance of the three-dimensional environment, wherein changing, by the third amount, the magnitude of visual impact of the first environmental effect on the appearance of the three-dimensional environment includes increasing, at a second rate of change, greater in absolute value than the first rate of change, the magnitude of visual impact of the first environmental effect on the appearance of the three-dimensional environment, such as shown by legend 2714*a* of FIG. 27G. For example, the computer system optionally reduces the first magnitude of the visual impact of the environmental effect on the appearance three-dimensional environment by a first percentage at a first rate of change, such as described with reference to step(s) 2808, and the computer system optionally increases, by the third amount, the magnitude of visual impact of the first environmental effect on the appearance of the three-dimensional environment at the second rate of change faster rate than the first rate of change. As such, the computer system optionally changes the magnitude of visual impact of the first environmental effect on the appearance of the three-dimensional environment at a faster positive rate than negative rate. Accordingly, the computer system optionally increases the magnitude of visual impact of the first environmental effect on the appearance of the three-dimensional environment at a rate that is faster than a rate of decrease of the magnitude of visual impact of the first environmental effect on the appearance of the three dimensional environment. Changing the magnitude of visual impact of the environmental effect on the three-dimensional environment a faster positive rate than negative rate (e.g., the positive rate is greater in absolute value than the negative rate) reduces a time delay of display of the environmental effect having the specific magnitude of visual impact on the three-dimensional environment while providing opportunity for attention of the user to change in the three-dimensional environment without significantly reducing the first environmental effect.

In some embodiments, in response to detecting that the user attention has shifted away from the first virtual content in the three-dimensional environment and in accordance with the determination that the user attention is directed to the first element (2826*a*) and in accordance with a determination that the first element is associated with concurrent display of a respective environmental effect (optionally different from the first environmental effect) with the first element while user attention is directed to the first element (e.g., the first element has its own environmental effect—the respective environmental effect—that is to be displayed by the computer system while attention is directed to the first element), the computer system changes (2826*b*), by the first amount, the first magnitude of visual impact of the first environmental effect on the appearance of the three-dimensional environment at a first rate of change (such as at the second rate of change described with reference to step(s) 2824), such as shown by legend 2714*a* of FIG. 27B. The first element is optionally associated with an application that requests that the computer system displays the respective environmental effect with a second magnitude of visual impact, different from the first magnitude of visual impact, on the three dimensional environment. In some embodiments, "while user attention is directed to" used in this present disclosure includes "while detecting user attention directed to".

In some embodiments, in response to detecting that the user attention has shifted away from the first virtual content in the three-dimensional environment and in accordance with the determination that the user attention is directed to the first element (2826*a*) and in accordance with a determination that the first element is not associated with concurrent display of the respective environmental effect with the first element while user attention is directed to the first element (e.g., the first element does not have its own environmental effect that is to be displayed by the computer system while attention is directed to the first element), the computer system changes (2826*c*), by the first amount, the first magnitude of visual impact of the first environmental effect on the appearance of the three-dimensional environment in which the first virtual content is displayed at a second rate of change (such as at the first rate of change described with reference to step(s) 2824) less than the first rate of change, such as shown by legend 2714*a* of FIG. 27E. For example, the first element is optionally not associated with an application that requests that the computer system displays the respective environmental effect with the second, a third, or any magnitude of visual impact on the three-dimensional environment. In some embodiments, step(s) 2826 additionally or alternatively includes steps of: in response to detecting that the user attention has shifted away from the first virtual content in the three-dimensional environment and in accordance with the determination that the user attention is directed to the second element, in accordance with a determination that the second element is associated with concurrent display of a respective environmental effect with the second element while user attention is directed to the second element, changing, by the second amount, the first magnitude of visual impact of the first environmental effect on the appearance of the three-dimensional environment at a third rate of change, and in accordance with a determination that the second element is not associated with concurrent display of the respective environmental effect with the second element while user attention is directed to the second element, changing, by the second amount, the first magnitude of visual impact of the first environmental effect on the appearance of the three-dimensional environment in which the first virtual content is displayed at a fourth rate of change less than the third rate of change. In some embodiments, the second element is optionally associated with an application that requests that the computer system displays the respective environmental effect with a second magnitude of visual impact, different from the first magnitude of visual impact, on the three-dimensional environment. In some embodiments, the second element is optionally not associated with an application that requests that the computer system displays the respective environmental effect with the second, a third, or any magnitude of visual impact on the three-dimensional environment. As such, when a specific object of user attention is associated with concurrent display of an environmental effect with the specific object of user attention while the user attention is directed to the specific object of user attention, the computer system optionally changes the first magnitude of visual impact of the first environmental effect on the appearance of the three dimensional environment at a faster rate of change compared with when the specific object of user attention is not associated with concurrent display of an environmental effect with the specific object of user attention while the user attention is directed to the object of user attention. Changing the magnitude of visual impact of the environmental effect on the three-dimensional environment a faster rate in response to detecting that user attention has shifted to an object that is associated with concurrent display of the respective environmental effect than when the object is not associated with concurrent display of a respective environmental effect increases the computer system's responsiveness to user attention during interaction with the computer system, reduces involvement of user inputs for controlling the respective rates of environmental effect change based on whether the object is associated or not with the concurrent display of the respective environmental effect, and reduces an amount of time involved with switching (e.g., fully switching) between respective environmental effects for different elements.

In some embodiments, while concurrently displaying the first virtual content and the first environmental effect having the first magnitude of visual impact on the appearance of the three-dimensional environment, the first virtual content has a second magnitude of visual prominence in the three-dimensional environment (2828*a*), in response to detecting that the user attention has shifted away from the first virtual content in the three-dimensional environment, the computer system reduces (2828*b*), by a third amount, the second magnitude of visual prominence of the first virtual content in the three-dimensional environment, such as shown by the difference in appearance of virtual content 2704*a* in FIGS. 27A and 27D. The third amount is optionally represented by a third percentage (0.5%, 0.9%, 1.2%, 5%, 8%, 15%, 30%, 45%, 60%, 100%, or another percentage) that is relative to the second magnitude of visual prominence of the first virtual content in the three-dimensional environment. As such, the computer system optionally reduces the visual prominence of the first virtual content in the three-dimensional environment. In some embodiments, detecting that the user attention has shifted away from the first virtual content in the three-dimensional environment includes detecting gaze and/or head angle (e.g., viewpoint angle) having shifted away from the first virtual content in the three-dimensional environment. In some embodiments, step(s) 2828 additionally or alternatively includes: in accordance with a determination that the user attention is directed to the first virtual content, the user attention is associated with a first angle relative to the first virtual content, in accordance with a determination that the user attention is directed to the first element, the user attention is associated with a second angle relative to the first virtual content, different from the first angle, and further, in response to detecting that the user attention has shifted away from the first virtual content in the three-dimensional environment, in accordance with a determination that the user attention is directed to the first element, in accordance with a determination that an angular distance between the first angle and the second angle is a first angular distance, reducing, by a third amount, the second magnitude of visual prominence of the first virtual content in the three-dimensional environment, and in accordance with a determination that an angular distance between the first angle and the second angle is a second angular distance, greater than the first angular distance reducing, by a fourth amount, greater than the third amount, the second magnitude of visual prominence of the first virtual content in the three-dimensional environment. Similar operations are optionally performed with respect to the second element instead of the first element. In some embodiments, step(s) 2828 additionally or alternatively includes: in response to detecting that the user attention has shifted away from the first virtual content in the three-dimensional environment, in accordance with a determination that the user attention is directed to the first element, in accordance with a determination that an angular distance between the first virtual content and the first element is a first angular distance, reducing, by a third amount, the second magnitude of visual prominence of the first virtual content in the three-dimensional environment, and in accordance with a determination that an angular distance between the first angle and the second angle is a second angular distance, greater than the first angular distance, reducing, by a fourth amount, greater than the third amount, the second magnitude of visual prominence of the first virtual content in the three-dimensional environment. Similar operations are optionally performed with respect to the second element instead of the first element. Reducing the visual prominence of the first virtual content in response to detecting that the user attention has shifted away from the first virtual content corresponds specific visual prominences of the first virtual content based on whether the first virtual content is the object of the user's attention and reduces user errors when interacting with the computer system.

In some embodiments, in response to detecting that the user attention has shifted away from the first virtual content in the three-dimensional environment (2830*a*), in accordance with a determination that an angular distance between the user attention and the first virtual content is a first angular distance, the computer system changes (2830*b*), by a third amount, the first magnitude of visual impact of the first environmental effect on the appearance of the three-dimensional environment, such as shown by the difference in amount in the legend 2712*a* in FIGS. 27A and 27I. The third amount is optionally represented by a third percentage (0.5%, 0.9%, 1.2%, 5%, 8%, 15%, 30%, 45%, 60%, 88%, or another percentage) that is relative to the first magnitude of visual prominence of the first environmental effect on the appearance of the three-dimensional environment.

In some embodiments, in response to detecting that the user attention has shifted away from the first virtual content in the three-dimensional environment (2830*a*), in accordance with a determination that the angular distance between the user attention and the first virtual content is a second angular distance, greater than the first angular distance, the computer system changes (2830*c*), by a fourth amount greater than the third amount, the first magnitude of visual impact of the first environmental effect on the appearance of the three-dimensional environment, such as shown by the difference in amount in the legend 2712*a* in FIGS. 27A and 27J. The fourth amount is optionally represented by a fourth percentage (0.5%, 0.9%, 1.3%, 5%, 10%, 15%, 30%, 50%, 60%, 89%, 100%, or another percentage) that is relative to the first magnitude of visual prominence of the first environmental effect on the appearance of the three-dimensional environment. For example, as the angular distance between the user attention in the first virtual content increases, the computer system optionally increases the amount by which the first magnitude of visual impact of the first environmental effect on the appearance of the three-dimensional environment reduces. As such, the computer system optionally reduces the magnitude of visual impact of the first environmental effect on the appearance of the three-dimensional environment based on a viewing angle between the first virtual content and the object of the user attention. Reducing the first magnitude of visual impact of the first environmental effect on the appearance of the three-dimensional environment as a function of angular distance between the user attention and the first virtual content virtual content in response to detecting that the user attention has shifted away from the first virtual content corresponds specific magnitudes of visual impact of the first environmental effect on the appearance of the three-dimensional environment to specific angular distances, reduces distraction from the first virtual content as a function of angular distance between user attention and the first virtual content, thus reducing user errors when interacting with the computer system.

In some embodiments, in response to detecting that the user attention has shifted away from the first virtual content in the three-dimensional environment, in accordance with the determination that the user attention is directed to the first element (2832*a*), in accordance with a determination that input, other than user attention, directed to the first element is detected by the computer system, such as shown by input from hand 2710 directed to virtual content 2704*b* in FIG. 27C, the computer system changes (2832*b*), by the first amount, the first magnitude of visual impact of the first environmental effect on the appearance of the three-dimensional environment at a first rate of change, such as shown by legend 2714*a* of FIG. 27C, such as a rate of change described with reference to step(s) 2808, step(s) 2824, and/or step(s) 2826. The input other than user attention optionally includes an air gesture described within this disclosure (e.g., air pinch inputs (e.g., an air gesture that includes movement of two or more fingers of a hand to make contact with one another, that is, optionally, followed by an immediate (e.g., within 0-1 seconds) break in contact from each other), or another type of air pinch, tap inputs ((e.g., directed to the first element in the three-dimensional environment) performed as an air gesture that includes movement of a user's finger(s) optionally toward the first element, movement of the user's hand toward the first element optionally with the user's finger(s) extended toward the first element, a motion of a user's finger (e.g., mimicking a tap on a screen), or another predefined movement of the user's hand), air pinch and drag gestures (e.g., an air gesture includes an air pinch gesture (e.g., an air pinch gesture or a long air pinch gesture) performed in conjunction with (e.g., followed by) a drag input that changes a position of the user's hand from a first position (e.g., a start position of the drag) to a second position (e.g., an end position of the drag)), or another type of air gesture).

In some embodiments, in response to detecting that the user attention has shifted away from the first virtual content in the three-dimensional environment, in accordance with the determination that the user attention is directed to the first element (2832*a*), in accordance with a determination that input, other than user attention, directed to the first element is not detected by the computer system, the computer system changes (2832*c*), by the first amount, the first magnitude of visual impact of the first environmental effect on the appearance of the three-dimensional environment at a second rate of change, such as a rate of change described with reference to step(s) 2808, step(s) 2824, and/or step(s) 2826, less than the first rate of change, such as shown by legend 2714*a* of FIG. 27B. For example, the computer system detecting input other than user attention directed to a user interface of an application, different from the first virtual content, optionally results in the computer system changing, by the first amount, the first magnitude of visual impact of the first environmental effect on the appearance of the three-dimensional environment at a first rate of change that is greater than the second rate of change. As such, in accordance with a determination that the computer system detects input other than user attention, the computer system changes the first magnitude of visual impact of the first environmental effect on the appearance of the three-dimensional environment at a first rate of change that is faster than a rate of change of the first magnitude of visual impact of the first environmental effect on the appearance of the three-dimensional environment that is associated with the changing, by the first amount, the first magnitude of visual impact of the first environmental effect on the appearance of the three-dimensional environment in accordance with a determination that the computer system does not detect input other than user attention. In some embodiments, step(s) 2832 additionally or alternatively includes: in response to detecting that the user attention has shifted away from the first virtual content in the three-dimensional environment, and in accordance with the determination that the user attention is directed to the second element, in accordance with a determination that input, other than user attention, directed to the second element is detected by the computer system, changing, by the second amount, the first magnitude of visual impact of the first environmental effect on the appearance of the three-dimensional environment at a third rate of change, such as a rate of change described with reference to step(s) 2808, step(s) 2824, and/or step(s) 2826, and in accordance with a determination that input, other than user attention, directed to the second element is not detected by the computer system, changing, by the second amount, the first magnitude of visual impact of the first environmental effect on the appearance of the three-dimensional environment at a fourth rate of change, such as a rate of change described with reference to step(s) 2808, step(s) 2824, and/or step(s) 2826, less than the third rate of change. Accelerating changing the first magnitude of visual impact of the first environmental effect on the appearance of the three-dimensional environment in accordance with a determination that the computer system detects the input other than the user attention reduces a time delay of display of the environmental effect having the specific magnitude of visual impact on the three-dimensional environment.

In some embodiments, in response to detecting that the user attention has shifted away from the first virtual content in the three-dimensional environment and in accordance with the determination that the user attention is directed to the first element, the computer system changes a visual appearance of the first virtual content and/or changes (2834) a visual appearance of the first element in one or more manners different from changing, by the first amount, the first magnitude of visual impact of the first environmental effect on the appearance of the three-dimensional environment optionally concurrently with the changing, by the first amount, of the first magnitude of visual impact of the first environmental effect on the appearance of the three-dimensional environment, such as shown by the change in appearance of virtual content 2704*a* in FIGS. 27A and 27B and/or the change in the border width of the virtual content 2704*b* in FIGS. 27A and 27B, which is representative of modifications to the appearance of virtual content 2704*b* and is nonlimiting. In some embodiments, step(s) 2834 additionally or alternatively includes: in response to detecting that the user attention has shifted away from the first virtual content in the three-dimensional environment and in accordance with the determination that the user attention is directed to the second element, changing a visual appearance of the first virtual content and/or changing a visual appearance of the second element in one or more manners different from changing, by the first amount, the first magnitude of visual impact of the first environmental effect on the appearance of the three-dimensional environment optionally concurrently with the changing, by the second amount, of the first magnitude of visual impact of the first environmental effect on the appearance of the three-dimensional environment. In some embodiments, the computer system changes the visual appearance of the first virtual content, the visual appearance of the first element, and/or the visual appearance of the second element based on attention, viewpoint movement, spatial and/or visual conflict, and/or other factors in one or more manners described with reference to methods 1600, 1800, 2000, 2200, 2400 and/or 2600. As such, the computer system optionally performs one or more steps of method 2800 along with one or more steps of the methods 1600, 1800, 2000, 2200, 2400 and/or 2600. Combining changes in visual appearances due to different factors provides concurrent feedback to the user about the states of those multiple factors and indicates to a user how to provide input to change those factors.

In some embodiments, in response to detecting that the user attention has shifted away from the first virtual content in the three-dimensional environment (2836*a*), changing, by the first amount, the first magnitude of visual impact, such as shown by the amount in legend 2714*a* of FIG. 27A, of the first environmental effect on the appearance of the three-dimensional environment in which the first virtual content is displayed includes displaying the first environmental effect having a second magnitude of visual impact (such as 0.3%, 1%, 2%, 6%, 10%, 19%, 27%, 30%, 50%, 60%, 70%, 90%, or another percentage less than first magnitude of visual impact of the first environmental effect on the appearance of the three-dimensional environment), less than the first magnitude of visual impact, on the appearance of the three-dimensional environment in which the first virtual content is displayed (2836*b*), such as shown by the amount in legend 2714*a* of 27J. In some embodiments, in response to detecting that the user attention has shifted away from the first virtual content in the three-dimensional environment (2836*a*), changing, by the second amount less than the first amount, the first magnitude of visual impact of the first environmental effect, such as shown by the amount in legend 2714*a* of FIG. 27A, on the appearance of the three-dimensional environment in which the first virtual content is displayed includes displaying the first environmental effect having a third magnitude of visual impact (such as 2%, 6%, 10%, 19%, 27%, 30%, 50%, 60%, 70%, 90%, or 95% or another percentage less than first magnitude of visual impact of the first environmental effect on the appearance of the three-dimensional environment and greater than the second magnitude of visual impact of the first environmental effect on the appearance of the three-dimensional environment), less than the first magnitude of visual impact, but greater than the second magnitude of visual impact on the appearance of the three-dimensional environment in which the first virtual content is displayed (2836*c*), such as shown by the amount in legend 2714*a* of 271. Maintaining different amounts of magnitude of visual impact of the first environmental on the appearance of the three-dimensional environment effect based on which element the user attention is directed corresponds specific environmental effect configurations to specific objects of user attention and reduces involvement of user inputs for controlling the environmental effect differently for different elements when user attention is directed to the different elements.

In some embodiments, in response to detecting that the user attention has shifted away from the first virtual content in the three-dimensional environment (2838*a*), changing, by the first amount, the first magnitude of visual impact of the first environmental effect on the appearance of the three-dimensional environment in which the first virtual content is displayed includes ceasing displaying the first environmental effect (2838*b*), such as shown by legend 2712*a* of FIG. 27E, and changing, by the second amount less than the first amount, the first magnitude of visual impact of the first environmental effect on the appearance of the three-dimensional environment in which the first virtual content is displayed includes displaying the first environmental effect having a second magnitude of visual impact (such as 0.3%, 1%, 2%, 6%, 10%, 19%, 27%, 30%, 50%, 60%, 70%, 90%, or another percentage less than first magnitude of visual impact of the first environmental effect on the appearance of the three-dimensional environment), less than the first magnitude of visual impact, on the appearance of the three-dimensional environment in which the first virtual content is displayed (2838*c*), such as shown by the amount indicated by legend 2712*a* of FIG. 27I. Ceasing displaying the first environmental effect by way of changing the first magnitude of visual impact of the first environmental effect on the appearance of the three-dimensional environment and displaying the first environmental effect having the second magnitude of visual impact, less than the first magnitude of visual impact, on the appearance of the three-dimensional environment corresponds specific environmental effect configurations to specific objects of user attention and reduces involvement of user inputs for controlling the environmental effect differently for different elements when user attention is directed to the different elements.

In some embodiments, the first element is virtual content (2840*a*), such as virtual content 2704*b* of FIG. 27A, and the second element is a physical object in a physical environment of the user that is visible in the three-dimensional environment (2840*b*), such as the physical table 2706*a* of FIG. 27A. In some embodiments, the computer system changes the first magnitude of visual impact of the first environmental effect on the appearance of the three-dimensional environment by a greater amount when the object of user attention is a physical object (e.g., a physical table, chair, pencil, or another physical object or portion of the physical environment of the user) in the physical environment of the user that is visible in the three-dimensional environment as compared with the when the object of user attention is virtual content. Changing the magnitude of visual impact of the first environmental effect on the three-dimensional environment in response to detecting user attention directed to the second element by an amount less than an amount of change of visual impact of the first environmental effect on the three-dimensional environment in response to detecting user attention directed to the second element different amounts in response to detecting user attention directed to different elements indicates to the user whether the object of user attention is passthrough or virtual content, corresponds specific environmental effect configurations to specific objects of user attention based on whether the object of user attention is virtual content or is a physical object, increases user safety during interaction with the computer system, and reduces involvement of specialized user inputs for controlling the environmental effect differently between virtual and physical objects.

It should be understood that the particular order in which the operations in method 2800 have been described is merely exemplary and is not intended to indicate that the described order is the only order in which the operations could be performed. One of ordinary skill in the art would recognize various ways to reorder the operations described herein.

In some embodiments, aspects/operations of methods 800, 1000, 1200, 1400, 1600, 1800, 2000, 2200, 2400, 2600 and/or 2800 may be interchanged, substituted, and/or added between these methods. For example, the virtual objects of methods 800, 1000, 1200, 1400, 1600, 1800, 2000, 2200, 2400, 2600 and/or 2800, the environments of methods 800, 1000, 1200, 1400, 1600, 1800, 2000, 2200, 2400, 2600 and/or 2800, the inputs for repositioning virtual objects of methods 800, 1000, 1200, 1400, 1600, 1800, and/or 2000, the viewpoints of methods 800, 1000, 1200, 1400, 1600, 1800, 2000, 2200, 2400, 2600 and/or 2800, and/or the communication sessions of methods 800, 1000, 1200, 1400, 1600, 1800, 2000, 2200, 2400, 2600 and/or 2800 and/or the modification of the visual appearances of the virtual objects of methods 800, 1000, 1200, 1400, 1600, 1800, 2000, 2200, 2400, 2600 and/or 2800 are optionally interchanged, substituted, and/or added between these methods. For brevity, these details are not repeated here.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with a display generation component and one or more input devices:

while a three-dimensional environment is visible via the display generation component, the three-dimensional environment including a first virtual object having a first spatial arrangement relative to a first viewpoint of a user of the three-dimensional environment which is a current viewpoint of the user of the computer system, receiving, via the one or more input devices, a first input corresponding to a request to update a spatial arrangement of one or more virtual objects relative to the first viewpoint of the user to satisfy a first set of one or more criteria that specify a range of distances or a range of orientations of the one or more virtual objects relative to the first viewpoint of the user; and in response to receiving the first input and while maintaining the current viewpoint of the user as the first viewpoint:

in accordance with a determination that the first virtual object satisfies a second set of one or more criteria while the first virtual object is not visible from the first viewpoint, displaying, in the three-dimensional environment, the first virtual object having a second spatial arrangement, different from the first spatial arrangement, relative to the first viewpoint of the user, wherein the second spatial arrangement of the first virtual object satisfies the first set of one or more criteria; and in accordance with a determination that the first virtual object does not satisfy the second set of one or more criteria while the first virtual object is not visible from the first viewpoint, maintaining the first spatial arrangement of the first virtual object in the three-dimensional environment relative to the first viewpoint of the user.

2. The method of claim 1, wherein:

when the first input is detected, the three-dimensional environment includes the first virtual object and a second virtual object, the second virtual object having a third spatial arrangement relative to the first viewpoint of the user, and in response to receiving the first input, the first virtual object has the second spatial arrangement relative to the first viewpoint of the user and the second virtual object has the third spatial arrangement relative to the user.

3. The method of claim 1, wherein the second set of one or more criteria include a criterion that is not satisfied when the first virtual object was last placed or moved in the three-dimensional environment from a viewpoint that satisfies a third set of one or more criteria relative to the first viewpoint of the user.

4. The method of claim 3, wherein the third set of one or more criteria include a criterion that is satisfied when the viewpoint is within a threshold distance of the first viewpoint.

5. The method of claim 3, wherein the third set of one or more criteria include a criterion that is satisfied when the viewpoint has an orientation in the three-dimensional environment that is within a threshold orientation of an orientation of the first viewpoint in the three-dimensional environment.

6. The method of claim 1, wherein the second set of one or more criteria include a criterion that is not satisfied when the first virtual object is anchored to a portion of a physical environment of the user.

7. The method of claim 6, further comprising:

while displaying the first virtual object in the three-dimensional environment:

in accordance with a determination that the first virtual object is anchored to the portion of the physical environment of the user, displaying, in the three-dimensional environment, a visual indication that the first virtual object is anchored to the portion of the physical environment; and in accordance with a determination that the first virtual object is not anchored to the portion of the physical environment of the user, displaying, in the three-dimensional environment, the first virtual object without displaying the visual indication.

8. The method of claim 1, wherein:

the first virtual object is part of a collection of a plurality of virtual objects in the three-dimensional environment that satisfy the second set of one or more criteria, the collection has a first respective spatial arrangement relative to the first viewpoint when the first input is received, and in response to receiving the first input, the collection is displayed with a second respective spatial arrangement, different from the first respective spatial arrangement, relative to the first viewpoint, wherein a spatial arrangement of the plurality of virtual objects in the collection relative to the first viewpoint after the first input is received satisfies the first set of one or more criteria.

9. The method of claim 8, wherein:

before receiving the first input and while the collection has the first respective spatial arrangement relative to the first viewpoint, the plurality of virtual objects within the collection have a respective positional arrangement relative to each other, and after receiving the first input and while the collection has the second respective spatial arrangement relative to the first viewpoint, the plurality of virtual objects within the collection have the respective positional arrangement relative to each other.

10. The method of claim 8, wherein:

before receiving the first input and while the collection has the first respective spatial arrangement relative to the first viewpoint, the plurality of virtual objects within the collection have a respective orientational arrangement relative to each other, and after receiving the first input and while the collection has the second respective spatial arrangement relative to the first viewpoint, the plurality of virtual objects within the collection have the respective orientational arrangement relative to each other.

11. The method of claim 8, wherein:

the plurality of virtual objects in the collection were last placed or moved in the three-dimensional environment from a second viewpoint of the user, different from the first viewpoint of the user, before the first input was received, an average orientation of the plurality of virtual objects relative to the second viewpoint while the collection has the first respective spatial arrangement relative to the first viewpoint is a respective orientation, and while the collection has the second respective spatial arrangement relative to the first viewpoint in response to receiving the first input, the collection has the respective orientation relative to the first viewpoint of the user.

12. The method of claim 1, wherein:

the first virtual object was last placed or moved in the three-dimensional environment from a second viewpoint of the user, different from the first viewpoint of the user, before the first input was received, while the first virtual object has the first spatial arrangement relative to the first viewpoint of the user, the first virtual object is a first distance from the second viewpoint, and while the first virtual object has the second spatial arrangement relative to the first viewpoint of the user, the first virtual object is the first distance from the first viewpoint.

13. The method of claim 1, wherein before receiving the first input, the first virtual object was last placed or moved in the three-dimensional environment from a second viewpoint of the user, different from the first viewpoint of the user, the method further comprising:

before receiving the first input:

while the three-dimensional environment was visible via the display generation component from the second viewpoint of the user, displaying, via the display generation component, a simulated environment and the first virtual object;

while displaying the simulated environment in the three-dimensional environment, detecting movement of a viewpoint of the user from the second viewpoint to the first viewpoint; and in response to detecting the movement of the viewpoint of the user from the second viewpoint to the first viewpoint, maintaining the first virtual object in the three-dimensional environment and ceasing inclusion of at least a portion of the simulated environment in the three-dimensional environment.

14. The method of claim 13, further comprising:

in response to receiving the first input while the viewpoint of the user is the first viewpoint, displaying, from the first viewpoint in the three-dimensional environment, the simulated environment.

15. The method of claim 13, further comprising:

while the viewpoint of the user is the first viewpoint and before receiving the first input, detecting, via the one or more input devices, a second input corresponding to a request to increase a level of immersion of the three-dimensional environment; and in response to receiving the second input, displaying, from the first viewpoint in the three-dimensional environment, the simulated environment.

16. The method of claim 15, further comprising:

in response to receiving the second input, maintaining the first spatial arrangement of the first virtual object in the three-dimensional environment relative to the first viewpoint of the user.

17. The method of claim 1, wherein the three-dimensional environment includes a first set of one or more virtual objects whose spatial arrangement relative to the first viewpoint is changed in response to receiving the first input, and a second set of one or more virtual objects whose spatial arrangement relative to the first viewpoint is not changed in response to receiving the first input, the method further comprising:

after receiving the first input, detecting movement of a viewpoint of the user from the first viewpoint to a second viewpoint, different from the first viewpoint, in the three-dimensional environment, wherein in response to detecting the movement of the viewpoint of the user, the three-dimensional environment is visible via the display generation component from the second viewpoint of the user and positions or orientations of the first and second sets of one or more virtual objects in the three-dimensional environment are not changed;

while the three-dimensional environment is visible via the display generation component from the second viewpoint of the user, receiving, via the one or more input devices, a second input corresponding to the request to update the spatial arrangement of one or more virtual objects relative to the second viewpoint of the user to satisfy the first set of one or more criteria that specify the range of distances or the range of orientations of the one or more virtual objects relative to the second viewpoint of the user; and in response to receiving the second input, changing positions or orientations of the first and second sets of one or more virtual objects in the three-dimensional environment such that updated positions and orientations of the first and second sets of one or more virtual objects satisfy the first set of one or more criteria relative to the second viewpoint of the user.

18. A non-transitory computer-readable storage medium storing one or more programs configured to be executed by one or more processors of a computer system that is in communication with a display generation component and one or more input devices, the one or more programs including instructions for:

while a three-dimensional environment is visible via the display generation component, the three-dimensional environment including a first virtual object having a first spatial arrangement relative to a first viewpoint of a user of the three-dimensional environment which is a current viewpoint of the user of the computer system, receiving, via the one or more input devices, a first input corresponding to a request to update a spatial arrangement of one or more virtual objects relative to the first viewpoint of the user to satisfy a first set of one or more criteria that specify a range of distances or a range of orientations of the one or more virtual objects relative to the first viewpoint of the user; and in response to receiving the first input and while maintaining the current viewpoint of the user as the first viewpoint:

in accordance with a determination that the first virtual object satisfies a second set of one or more criteria while the first virtual object is not visible from the first viewpoint, displaying, in the three-dimensional environment, the first virtual object having a second spatial arrangement, different from the first spatial arrangement, relative to the first viewpoint of the user, wherein the second spatial arrangement of the first virtual object satisfies the first set of one or more criteria; and in accordance with a determination that the first virtual object does not satisfy the second set of one or more criteria while the first virtual object is not visible from the first viewpoint, maintaining the first spatial arrangement of the first virtual object in the three-dimensional environment relative to the first viewpoint of the user.

19. The non-transitory computer-readable storage medium of claim 18, wherein:

when the first input is detected, the three-dimensional environment includes the first virtual object and a second virtual object, the second virtual object having a third spatial arrangement relative to the first viewpoint of the user, and in response to receiving the first input, the first virtual object has the second spatial arrangement relative to the first viewpoint of the user and the second virtual object has the third spatial arrangement relative to the user.

20. The non-transitory computer-readable storage medium of claim 18, wherein the second set of one or more criteria include a criterion that is not satisfied when the first virtual object was last placed or moved in the three-dimensional environment from a viewpoint that satisfies a third set of one or more criteria relative to the first viewpoint of the user.

21. The non-transitory computer-readable storage medium of claim 20, wherein the third set of one or more criteria include a criterion that is satisfied when the viewpoint is within a threshold distance of the first viewpoint.

22. The non-transitory computer-readable storage medium of claim 20, wherein the third set of one or more criteria include a criterion that is satisfied when the viewpoint has an orientation in the three-dimensional environment that is within a threshold orientation of an orientation of the first viewpoint in the three-dimensional environment.

23. The non-transitory computer-readable storage medium of claim 18, wherein the second set of one or more criteria include a criterion that is not satisfied when the first virtual object is anchored to a portion of a physical environment of the user.

24. The non-transitory computer-readable storage medium of claim 23, the one or more programs including instructions for:

while displaying the first virtual object in the three-dimensional environment:

in accordance with a determination that the first virtual object is anchored to the portion of the physical environment of the user, displaying, in the three-dimensional environment, a visual indication that the first virtual object is anchored to the portion of the physical environment; and in accordance with a determination that the first virtual object is not anchored to the portion of the physical environment of the user, displaying, in the three-dimensional environment, the first virtual object without displaying the visual indication.

25. The non-transitory computer-readable storage medium of claim 18, wherein:

the first virtual object is part of a collection of a plurality of virtual objects in the three-dimensional environment that satisfy the second set of one or more criteria, the collection has a first respective spatial arrangement relative to the first viewpoint when the first input is received, and in response to receiving the first input, the collection is displayed with a second respective spatial arrangement, different from the first respective spatial arrangement, relative to the first viewpoint, wherein a spatial arrangement of the plurality of virtual objects in the collection relative to the first viewpoint after the first input is received satisfies the first set of one or more criteria.

26. The non-transitory computer-readable storage medium of claim 25, wherein:

before receiving the first input and while the collection has the first respective spatial arrangement relative to the first viewpoint, the plurality of virtual objects within the collection have a respective positional arrangement relative to each other, and after receiving the first input and while the collection has the second respective spatial arrangement relative to the first viewpoint, the plurality of virtual objects within the collection have the respective positional arrangement relative to each other.

27. The non-transitory computer-readable storage medium of claim 25, wherein:

before receiving the first input and while the collection has the first respective spatial arrangement relative to the first viewpoint, the plurality of virtual objects within the collection have a respective orientational arrangement relative to each other, and after receiving the first input and while the collection has the second respective spatial arrangement relative to the first viewpoint, the plurality of virtual objects within the collection have the respective orientational arrangement relative to each other.

28. The non-transitory computer-readable storage medium of claim 25, wherein:

the plurality of virtual objects in the collection were last placed or moved in the three-dimensional environment from a second viewpoint of the user, different from the first viewpoint of the user, before the first input was received, an average orientation of the plurality of virtual objects relative to the second viewpoint while the collection has the first respective spatial arrangement relative to the first viewpoint is a respective orientation, and while the collection has the second respective spatial arrangement relative to the first viewpoint in response to receiving the first input, the collection has the respective orientation relative to the first viewpoint of the user.

29. The non-transitory computer-readable storage medium of claim 18, wherein:

the first virtual object was last placed or moved in the three-dimensional environment from a second viewpoint of the user, different from the first viewpoint of the user, before the first input was received, while the first virtual object has the first spatial arrangement relative to the first viewpoint of the user, the first virtual object is a first distance from the second viewpoint, and while the first virtual object has the second spatial arrangement relative to the first viewpoint of the user, the first virtual object is the first distance from the first viewpoint.

30. The non-transitory computer-readable storage medium of claim 18, wherein before receiving the first input, the first virtual object was last placed or moved in the three-dimensional environment from a second viewpoint of the user, different from the first viewpoint of the user, the one or more programs including instructions for:

before receiving the first input:

while the three-dimensional environment was visible via the display generation component from the second viewpoint of the user, displaying, via the display generation component, a simulated environment and the first virtual object;

while displaying the simulated environment in the three-dimensional environment, detecting movement of a viewpoint of the user from the second viewpoint to the first viewpoint; and in response to detecting the movement of the viewpoint of the user from the second viewpoint to the first viewpoint, maintaining the first virtual object in the three-dimensional environment and ceasing inclusion of at least a portion of the simulated environment in the three-dimensional environment.

31. The non-transitory computer-readable storage medium of claim 30, the one or more programs including instructions for:

in response to receiving the first input while the viewpoint of the user is the first viewpoint, displaying, from the first viewpoint in the three-dimensional environment, the simulated environment.

32. The non-transitory computer-readable storage medium of claim 30, the one or more programs including instructions for:

while the viewpoint of the user is the first viewpoint and before receiving the first input, detecting, via the one or more input devices, a second input corresponding to a request to increase a level of immersion of the three-dimensional environment; and in response to receiving the second input, displaying, from the first viewpoint in the three-dimensional environment, the simulated environment.

33. The non-transitory computer-readable storage medium of claim 32, wherein the one or more programs further include instructions for:

in response to receiving the second input, maintaining the first spatial arrangement of the first virtual object in the three-dimensional environment relative to the first viewpoint of the user.

34. The non-transitory computer-readable storage medium of claim 18, wherein the three-dimensional environment includes a first set of one or more virtual objects whose spatial arrangement relative to the first viewpoint is changed in response to receiving the first input, and a second set of one or more virtual objects whose spatial arrangement relative to the first viewpoint is not changed in response to receiving the first input, wherein the one or more programs further include instructions for:

after receiving the first input, detecting movement of a viewpoint of the user from the first viewpoint to a second viewpoint, different from the first viewpoint, in the three-dimensional environment, wherein in response to detecting the movement of the viewpoint of the user, the three-dimensional environment is visible via the display generation component from the second viewpoint of the user and positions or orientations of the first and second sets of one or more virtual objects in the three-dimensional environment are not changed;

while the three-dimensional environment is visible via the display generation component from the second viewpoint of the user, receiving, via the one or more input devices, a second input corresponding to the request to update the spatial arrangement of one or more virtual objects relative to the second viewpoint of the user to satisfy the first set of one or more criteria that specify the range of distances or the range of orientations of the one or more virtual objects relative to the second viewpoint of the user; and in response to receiving the second input, changing positions or orientations of the first and second sets of one or more virtual objects in the three-dimensional environment such that updated positions and orientations of the first and second sets of one or more virtual objects satisfy the first set of one or more criteria relative to the second viewpoint of the user.

35. A computer system that is in communication with a display generation component and one or more input devices, the computer system comprising:

one or more processors; and memory storing one or more programs configured to be executed by the one or more processors, the one or more programs including instructions for:

while a three-dimensional environment is visible via the display generation component, the three-dimensional environment including a first virtual object having a first spatial arrangement relative to a first viewpoint of a user of the three-dimensional environment which is a current viewpoint of the user of the computer system, receiving, via the one or more input devices, a first input corresponding to a request to update a spatial arrangement of one or more virtual objects relative to the first viewpoint of the user to satisfy a first set of one or more criteria that specify a range of distances or a range of orientations of the one or more virtual objects relative to the first viewpoint of the user; and in response to receiving the first input and while maintaining the current viewpoint of the user as the first viewpoint:

in accordance with a determination that the first virtual object satisfies a second set of one or more criteria while the first virtual object is not visible from the first viewpoint, displaying, in the three-dimensional environment, the first virtual object having a second spatial arrangement, different from the first spatial arrangement, relative to the first viewpoint of the user, wherein the second spatial arrangement of the first virtual object satisfies the first set of one or more criteria; and in accordance with a determination that the first virtual object does not satisfy the second set of one or more criteria while the first virtual object is not visible from the first viewpoint, maintaining the first spatial arrangement of the first virtual object in the three-dimensional environment relative to the first viewpoint of the user.

36. The computer system of claim 35, wherein:

when the first input is detected, the three-dimensional environment includes the first virtual object and a second virtual object, the second virtual object having a third spatial arrangement relative to the first viewpoint of the user, and in response to receiving the first input, the first virtual object has the second spatial arrangement relative to the first viewpoint of the user and the second virtual object has the third spatial arrangement relative to the user.

37. The computer system of claim 35, wherein the second set of one or more criteria include a criterion that is not satisfied when the first virtual object was last placed or moved in the three-dimensional environment from a viewpoint that satisfies a third set of one or more criteria relative to the first viewpoint of the user.

38. The computer system of claim 37, wherein the third set of one or more criteria include a criterion that is satisfied when the viewpoint is within a threshold distance of the first viewpoint.

39. The computer system of claim 37, wherein the third set of one or more criteria include a criterion that is satisfied when the viewpoint has an orientation in the three-dimensional environment that is within a threshold orientation of an orientation of the first viewpoint in the three-dimensional environment.

40. The computer system of claim 35, wherein the second set of one or more criteria include a criterion that is not satisfied when the first virtual object is anchored to a portion of a physical environment of the user.

41. The computer system of claim 40, the one or more programs including instructions for:

while displaying the first virtual object in the three-dimensional environment:

in accordance with a determination that the first virtual object is anchored to the portion of the physical environment of the user, displaying, in the three-dimensional environment, a visual indication that the first virtual object is anchored to the portion of the physical environment; and in accordance with a determination that the first virtual object is not anchored to the portion of the physical environment of the user, displaying, in the three-dimensional environment, the first virtual object without displaying the visual indication.

42. The computer system of claim 35, wherein:

the first virtual object is part of a collection of a plurality of virtual objects in the three-dimensional environment that satisfy the second set of one or more criteria, the collection has a first respective spatial arrangement relative to the first viewpoint when the first input is received, and in response to receiving the first input, the collection is displayed with a second respective spatial arrangement, different from the first respective spatial arrangement, relative to the first viewpoint, wherein a spatial arrangement of the plurality of virtual objects in the collection relative to the first viewpoint after the first input is received satisfies the first set of one or more criteria.

43. The computer system of claim 42, wherein:

before receiving the first input and while the collection has the first respective spatial arrangement relative to the first viewpoint, the plurality of virtual objects within the collection have a respective positional arrangement relative to each other, and after receiving the first input and while the collection has the second respective spatial arrangement relative to the first viewpoint, the plurality of virtual objects within the collection have the respective positional arrangement relative to each other.

44. The computer system of claim 42, wherein:

before receiving the first input and while the collection has the first respective spatial arrangement relative to the first viewpoint, the plurality of virtual objects within the collection have a respective orientational arrangement relative to each other, and after receiving the first input and while the collection has the second respective spatial arrangement relative to the first viewpoint, the plurality of virtual objects within the collection have the respective orientational arrangement relative to each other.

45. The computer system of claim 42, wherein:

the plurality of virtual objects in the collection were last placed or moved in the three-dimensional environment from a second viewpoint of the user, different from the first viewpoint of the user, before the first input was received, an average orientation of the plurality of virtual objects relative to the second viewpoint while the collection has the first respective spatial arrangement relative to the first viewpoint is a respective orientation, and while the collection has the second respective spatial arrangement relative to the first viewpoint in response to receiving the first input, the collection has the respective orientation relative to the first viewpoint of the user.

46. The computer system of claim 35, wherein:

the first virtual object was last placed or moved in the three-dimensional environment from a second viewpoint of the user, different from the first viewpoint of the user, before the first input was received, while the first virtual object has the first spatial arrangement relative to the first viewpoint of the user, the first virtual object is a first distance from the second viewpoint, and while the first virtual object has the second spatial arrangement relative to the first viewpoint of the user, the first virtual object is the first distance from the first viewpoint.

47. The computer system of claim 35, wherein before receiving the first input, the first virtual object was last placed or moved in the three-dimensional environment from a second viewpoint of the user, different from the first viewpoint of the user, the one or more programs including instructions for:

before receiving the first input:

while the three-dimensional environment was visible via the display generation component from the second viewpoint of the user, displaying, via the display generation component, a simulated environment and the first virtual object;

while displaying the simulated environment in the three-dimensional environment, detecting movement of a viewpoint of the user from the second viewpoint to the first viewpoint; and in response to detecting the movement of the viewpoint of the user from the second viewpoint to the first viewpoint, maintaining the first virtual object in the three-dimensional environment and ceasing inclusion of at least a portion of the simulated environment in the three-dimensional environment.

48. The computer system of claim 47, the one or more programs including instructions for:

in response to receiving the first input while the viewpoint of the user is the first viewpoint, displaying, from the first viewpoint in the three-dimensional environment, the simulated environment.

49. The computer system of claim 47, the one or more programs including instructions for:

while the viewpoint of the user is the first viewpoint and before receiving the first input, detecting, via the one or more input devices, a second input corresponding to a request to increase a level of immersion of the three-dimensional environment; and in response to receiving the second input, displaying, from the first viewpoint in the three-dimensional environment, the simulated environment.

50. The computer system of claim 49, wherein the one or more programs further include instructions for:

in response to receiving the second input, maintaining the first spatial arrangement of the first virtual object in the three-dimensional environment relative to the first viewpoint of the user.

51. The computer system of claim 20, wherein the three-dimensional environment includes a first set of one or more virtual objects whose spatial arrangement relative to the first viewpoint is changed in response to receiving the first input, and a second set of one or more virtual objects whose spatial arrangement relative to the first viewpoint is not changed in response to receiving the first input, wherein the one or more programs further include instructions for:

after receiving the first input, detecting movement of a viewpoint of the user from the first viewpoint to a second viewpoint, different from the first viewpoint, in the three-dimensional environment, wherein in response to detecting the movement of the viewpoint of the user, the three-dimensional environment is visible via the display generation component from the second viewpoint of the user and positions or orientations of the first and second sets of one or more virtual objects in the three-dimensional environment are not changed;

while the three-dimensional environment is visible via the display generation component from the second viewpoint of the user, receiving, via the one or more input devices, a second input corresponding to the request to update the spatial arrangement of one or more virtual objects relative to the second viewpoint of the user to satisfy the first set of one or more criteria that specify the range of distances or the range of orientations of the one or more virtual objects relative to the second viewpoint of the user; and in response to receiving the second input, changing positions or orientations of the first and second sets of one or more virtual objects in the three-dimensional environment such that updated positions and orientations of the first and second sets of one or more virtual objects satisfy the first set of one or more criteria relative to the second viewpoint of the user.

* * * * *